US006046523A

United States Patent [19]

Bailey

[11] Patent Number: 6,046,523

[45] Date of Patent: Apr. 4, 2000

[54] COMPUTER CONTROLLED ELECTRIC MOTOR AND METHOD THEREFOR

[75] Inventor: James Lee Bailey, Spanish Fork, Utah

[73] Assignee: 1-O-X Corporation, Shreveport, La.

[21] Appl. No.: 08/919,049

[22] Filed: Aug. 27, 1997

[51] Int. Cl.[7] .......................... H02K 29/00; H02K 37/00

[52] U.S. Cl. ........................ 310/156; 318/138; 310/49 R; 310/112

[58] Field of Search ................................ 310/49 R, 265, 310/156, 261, 46, 112; 318/555, 557, 529, 523, 138

[56] References Cited

U.S. PATENT DOCUMENTS

| | | | |
|---|---|---|---|
| 3,497,730 | 2/1970 | Doolittle | 310/13 |
| 3,586,942 | 6/1971 | McMahon | 310/156 |
| 3,795,854 | 3/1974 | Kobayashi et al. | 318/696 |
| 3,962,593 | 6/1976 | Bowen | 310/46 |
| 4,145,644 | 3/1979 | Liu | 318/696 |
| 4,268,783 | 5/1981 | Murray | 318/632 |
| 4,357,551 | 11/1982 | Dulondel | 310/46 |
| 4,424,463 | 1/1984 | Musil | 310/49 R |
| 4,831,315 | 5/1989 | Hammond et al. | 318/657 |
| 4,857,786 | 8/1989 | Nihei et al. | 310/156 |
| 5,151,640 | 9/1992 | Sakamoto et al. | 318/696 |

*Primary Examiner*—Nestor Ramirez
*Assistant Examiner*—B. Mullins
*Attorney, Agent, or Firm*—Harry M. Weiss; Jeffrey Weiss; Paul W. Davis

[57] ABSTRACT

A section of the rotor of an electric motor includes a Neodymium plastic bonded magnetic material annulus having a plurality of permanent magnets having magnetic poles alternately disposed thereon and pressed onto the periphery of a plastic disc. The annulus is magnetized to provide thirty six evenly spaced similar permanent magnets with their north and south poles alternately disposed along the periphery of the rotor section. Five rotor sections are provided to provide the rotor. Each rotor section is coaxially connected to the shaft of the electric motor. A stator of the electric motor preferably has five stator sections with each having thirty two stator coils that each have one end proximal to the periphery of the annulus. Each stator of the electric motor is disposed about a corresponding rotor section and separated therefrom by an air gap. When a stator coil of each stator section has an angular position that is intermediate to the angular positions of a pair of adjacent permanent magnets of an adjacent rotor section, a coil excitation current through the stator coil causes it to have a magnetic field that attracts one magnet of the pair and repels the other thereby causing the rotor section and the attached shaft to rotate in a given selected direction.

6 Claims, 4 Drawing Sheets

COMPUTER CONTROLLED ELECTRIC MOTOR AND METHOD THEREFOR

BACKGROUND OF THE INVENTION

1. Field of Invention

This invention relates generally to electric motors and methods of operation therefor and, more specifically, to an efficient, reliable computer controlled electric motor and method of operation therefor.

2. Description of the Prior Art

Various types of electric motors have been developed, in the past, for different types of applications. One such electric motor is known as a stepper motor. A defining quality of the stepper motor is that a distinct quantum of rotation of a rotor occurs in response to an electrical input pulse. The discrete quantum is known as a step. Desirable features of the stepper motor include its not having either a commutator, brushes, slip rings or rotor windings.

Like most electric motors, the stepper motor is comprised of a rotor and a stator that are separated by an air gap. In one type of stepper motor, the rotor is a permanent magnet. The stator includes a plurality of stator coils. The electrical input pulse is applied to the stator coils.

When a train of electrical input pulses is applied, a rotating field is produced that causes continual rotation of the rotor. The continual rotation is conveniently thought of as sequential stepping. Another desirable feature of the stepper motor is that by controlling the application of the electrical input pulses, any of a multiplicity of desired rotor positions are achievable without the use of a feedback loop.

To produce the rotation, the electrical input pulse causes the stator coils to magnetize a portion of the stator that resembles teeth of a gear. The permanent magnet of the rotor also has a portion that resembles the teeth of the gear. When a stator tooth and a rotor tooth are proximal to each other and there is a slight angular displacement therebetween, a magnetic force of repulsion (or attraction) causes the rotor to rotate relative to the stator.

Although the stepper motor has several desirable features, it is not efficient and does not develop sufficient power for propelling a battery powered motor vehicle (i.e. electric car, a truck, etc.), for example.

Because a step occurs in response to the input electrical pulse, the rotor may not have a smooth, constant rotation suitable for rotating a workpiece in a lathe, for example. Accordingly, there is a need for an electric motor that is efficient, has a capability of producing sufficient power, can rotate a workpiece smoothly and has the desirable features of the stepper motor.

SUMMARY OF THE INVENTION

An object of the invention is to provide an improved efficient electric motor and method therefor that has the desirable features of a stepper motor.

Another object of the invention is to provide an improved electric motor and method therefor that develops sufficient power for propelling a motor vehicle and has the desirable features of a stepper motor.

Another object of the invention is to provide an improved electric motor and method therefor that is suitable for rotating a workpiece smoothly and has the desirable features of a stepper motor.

BRIEF DESCRIPTION OF THE PREFERRED EMBODIMENTS

According to one aspect of this invention, an electric motor has a rotor with a circular periphery. The rotor is magnetized to provide a group of similar permanent magnets that have an equal angular spacing therebetween. The north and south poles of the permanent magnets are alternately disposed along the periphery of the rotor. The rotor is coaxially connected to the shaft of the electric motor. A stator of the electric motor has a plurality of circularly disposed, evenly spaced, electrical coils. The stator is maintained about the rotor with each stator coil having a proximal end separated from the rotor by an air gap. When a stator coil has an angular position that is intermediate to the angular positions of a pair of the permanent magnets that are adjacent to each other, an electrical current through the stator coil causes it to have a magnetic field that attracts one magnet of the pair and repels the other. Because of the attraction and repulsion caused by the electrical current through the stator coil, the electric motor of the present invention develops more power then has heretofore been developed by a stepper motor. Additionally, the electric motor of this invention is an electric motor that can have multiple rotor and stator sections that facilitates providing a small least resolvable increment of rotation of a motor shaft.

According to another aspect of this invention, a method is provided for rotating a shaft connected to a load which comprises the steps of providing a rotor with a plurality of similar rotor sections that each have a circular periphery with north and south poles of a plurality of permanent magnets alternately disposed with equal spacing along the periphery; coaxially connecting the rotor to the shaft; providing a stator with a plurality of similar stator sections equal in number to the rotor sections, the stator sections each having a group of stator coils; coaxially disposing the stator coils about the shaft with equal angular spacing; coaxially maintaining the stator sections about the rotor sections, respectively, with proximal ends of the stator coils being separated from the rotor by an air gap; and magnetically polarizing the proximal end of selected stator coils that are each angularly positioned between two of the permanent magnets that are adjacent to each other on each rotor section to cause rotation of the shaft.

Other objects, features, and advantages of the invention should be apparent from the following description of the preferred embodiments as illustrated in the accompanying drawing.

DESCRIPTION OF THE PREFERRED EMBODIMENTS

Figure 1:
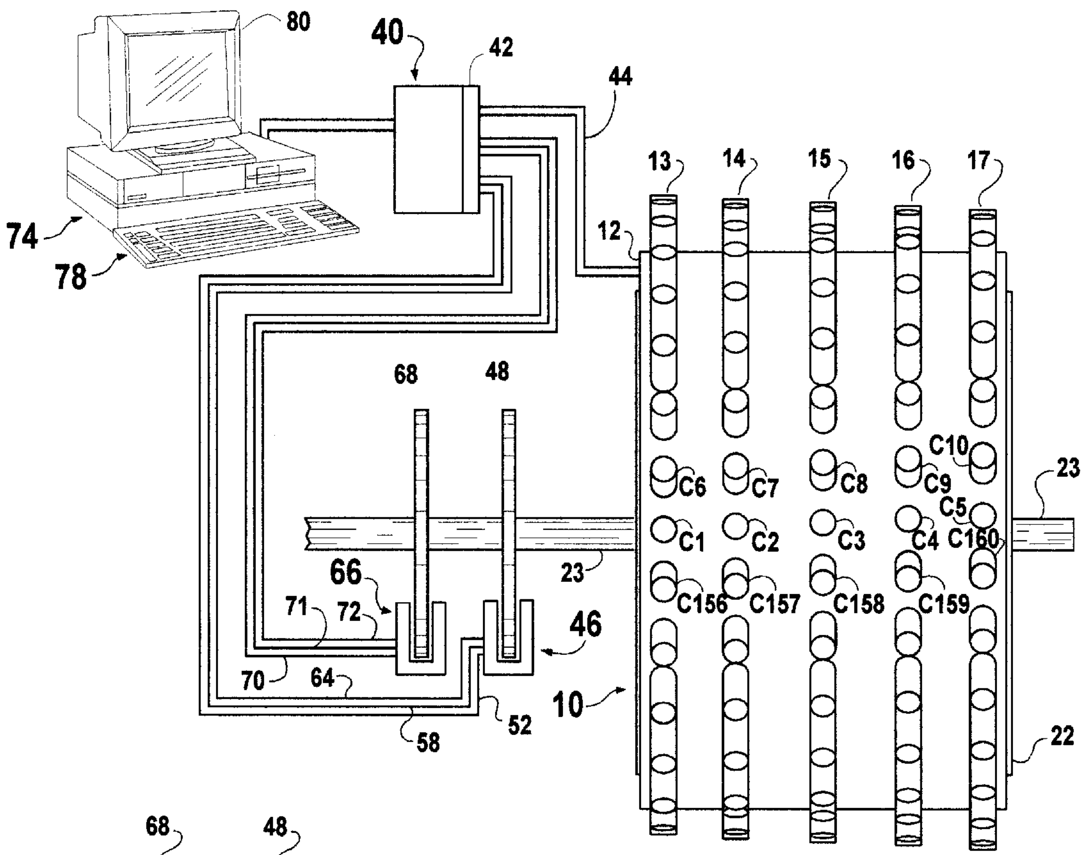
FIG. 1 is a side elevation and perspective view of the preferred embodiment of the present invention.
Figure 6:
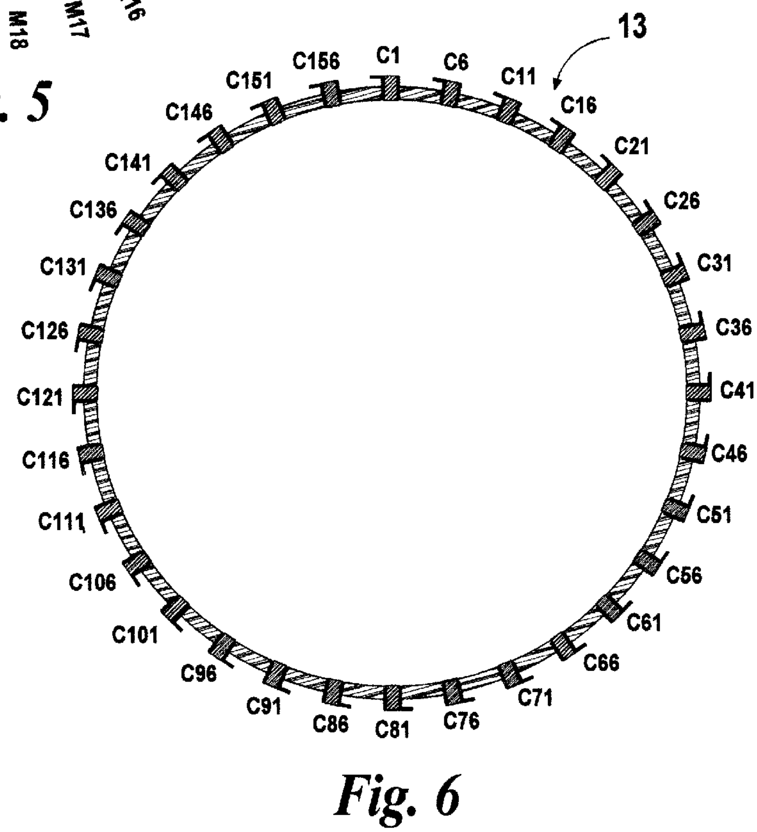
FIG. 6 is a plan view, partly in section, of a section of a stator assembly for use in the embodiment of FIG. 1.

As shown in FIGS. 1 and 6, an electric motor 10 (FIG. 1) has a stator generally designated by reference number 12 which is comprised of similar stator sections 13–17. Exemplary of the stator sections 13–17, the stator section 13 (see FIG. 6) is comprised of thirty two stator coils circularly disposed with equal angular spacing (FIG. 1). Therefore, the stator 12 is comprised of 160 stator coils (five stator sections of thirty two coils each). The angular spacing between adjacent stator coils of each of the stator sections 13–17 is 11.25 degrees. Thus for any of the stator sections 13–17 which are circular, the separation between adjacent stator coils is 11.25 degrees thereby providing a total of 360 degrees (11.25 times 32 stator coils per stator section) for each stator section.

The stator coils of the stator 12 have consecutive designations C1–C160 for the five stator sections. As explained hereinafter, excitation of the stator coils C1–C160 is separately controlled to efficiently provide a variable amount of torque to a load.

The stator coils of stator sections 13, 14 have an angular displacement from each other of 2.25 degrees. Thus, for example, the stator coil C1, which is included in the stator section 13, has an angular separation of 2.25 degrees from the stator coil C2 which is included in the stator section 14 (see FIG. 1). In a similar manner, each two adjacent stator coils of the stator sections 15, 14, the stator sections 16, 15, the stator sections 17, 16 and the stator sections 17, 13 have the angular displacement from each other of 2.25 degrees. It should be appreciated that 2.25 degrees is one fifth of the angular spacing (11.25 degrees) between adjacent stator coils of any of the stator sections 13–17. In other words, the displacement between the stator coils of adjacent stator sections is in accordance with a relationship which is given as:

$d=S/n$ where d is the angular displacement between stator coils of adjacent stator sections;

S is the angular spacing between adjacent stator coils of a stator section; and n is the number of stator sections.

It should be understood that the stator coils C1, C2, for example, are angularly adjacent although they are included in the stator sections 13, 14, respectively. Therefore, the stator sections 13–17 form an entire stator assembly with 160 stator coils where angularly adjacent stator coils of any two adjacent stator sections have the angular separation of 2.25 degrees.

It should be understood that in this embodiment, the 2.25 degree separation is identical to what the separation of the angularly adjacent stator coils would be if the stator coils C1–C160 were circularly disposed in a single stator section (2.25 degrees times 160 (total number of stator coils)=360 degrees which is the total degrees for each circular stator section). However, mechanical space problems would arise because such a single stator section would have to have a very large diameter to provide sufficient circumferential space for 160 stator coils. The space problems are obviated by providing the five stator sections 13–17, each having 32 circularly disposed stator coils. Another way of describing the relationship of the stator coils of the five stator sections 13–17 is to view each of the five adjacent stator coils (i.e. C6, C7, C8, C9 and C10) as being located on a slanted line relative to the central axis of the shaft 23. Similarly, adjacent stator coils C1, C2, C3, C4 and C5 are on a slanted line parallel to the slanted line containing stator coils C6, C7, C8, C9 and C10 are located and also parallel to the slanted line containing stator coils C156, C157, C158, C159 and C160 are located (see FIG. 1). All of these slanted lines form, in essence, a continuous helix.

Figure 5:
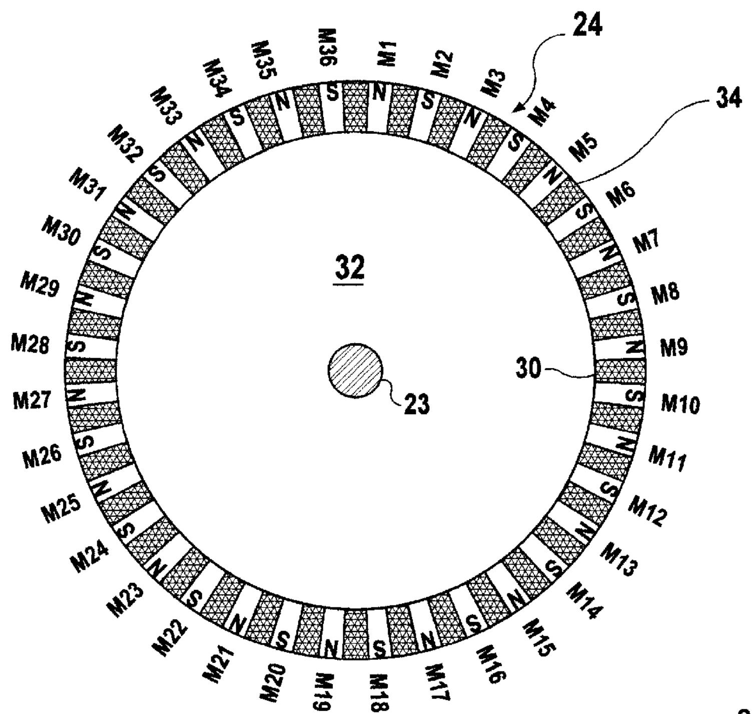
FIG. 5 is a plan view of a section of a rotor assembly for use in the embodiment of FIG. 1.
Figure 8:
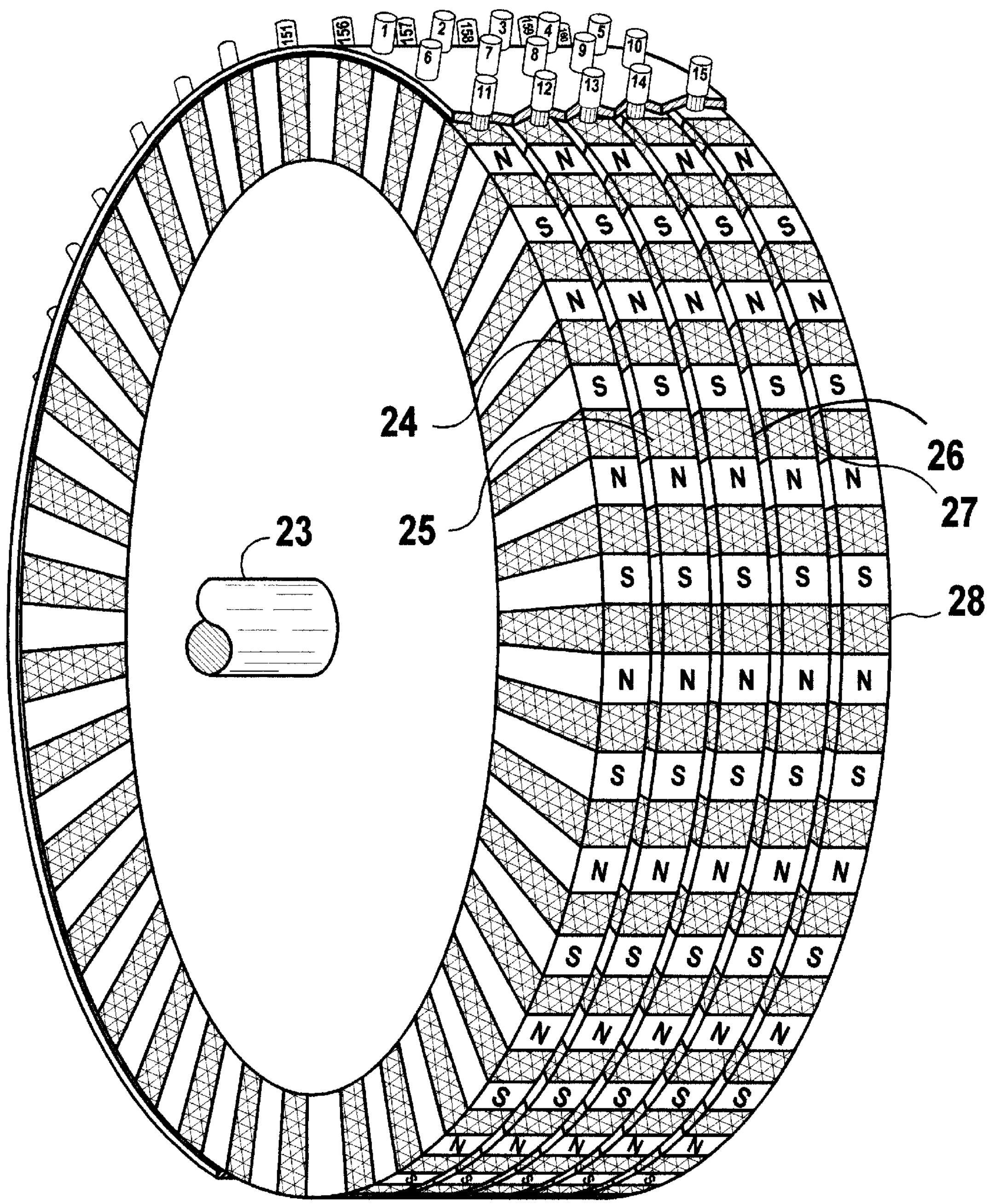
FIG. 8 is a perspective view, with parts broken away, of an electric motor assembly for use in the embodiment of FIG. 1.

As shown in FIGS. 1, 5 and 8, the electric motor 10 has a rotor 22 with five similar rotor sections 24–28 (FIG. 8) that are all coaxially connected to a shaft 23 of the electric motor 10. Therefore, when the rotor 22 rotates, it correspondingly rotates the shaft 23.

The rotor section 24 (FIG. 5) is comprised preferably of a Neodymium plastic bonded magnetic material annulus 30 that is pressed onto a preferably plastic disc 32. The annulus 30 is magnetized to provide thirty six evenly spaced similar permanent magnets that bear the designations M1–M36, respectively. Therefore, radial center lines (not shown) of the permanent magnets M1–M36 that are adjacent to each other have an angular separation of ten degrees.

The north and south poles of the permanent magnets M1–M36 are alternately disposed along a circular periphery 34 of the section 24. For purposes of simplicity in illustration, the inner pole designation of each of the magnets is omitted. The alternate disposition of the north and south poles is used in all embodiments. Since a rotor section has a circular periphery, one aspect of the present invention is that a rotor section has an even number of permanent magnets, whereby the alternate disposition of the north and south poles is preserved.

It should be understood that the five rotor sections 24–28 are connected together with like poles of the permanent magnets thereof in angular alignment. Thus, for example, each of the five rotor sections 24–28 has a permanent magnet that bears the designation, M1. Because of the angular alignment, the permanent magnets that bear the designation, M1, have no angular separation. Similarly, each of the five rotor sections 24–28 has thirty six permanent magnets M1–M36 located as shown for the rotor section 24 shown in FIG. 5.

Figure 7:
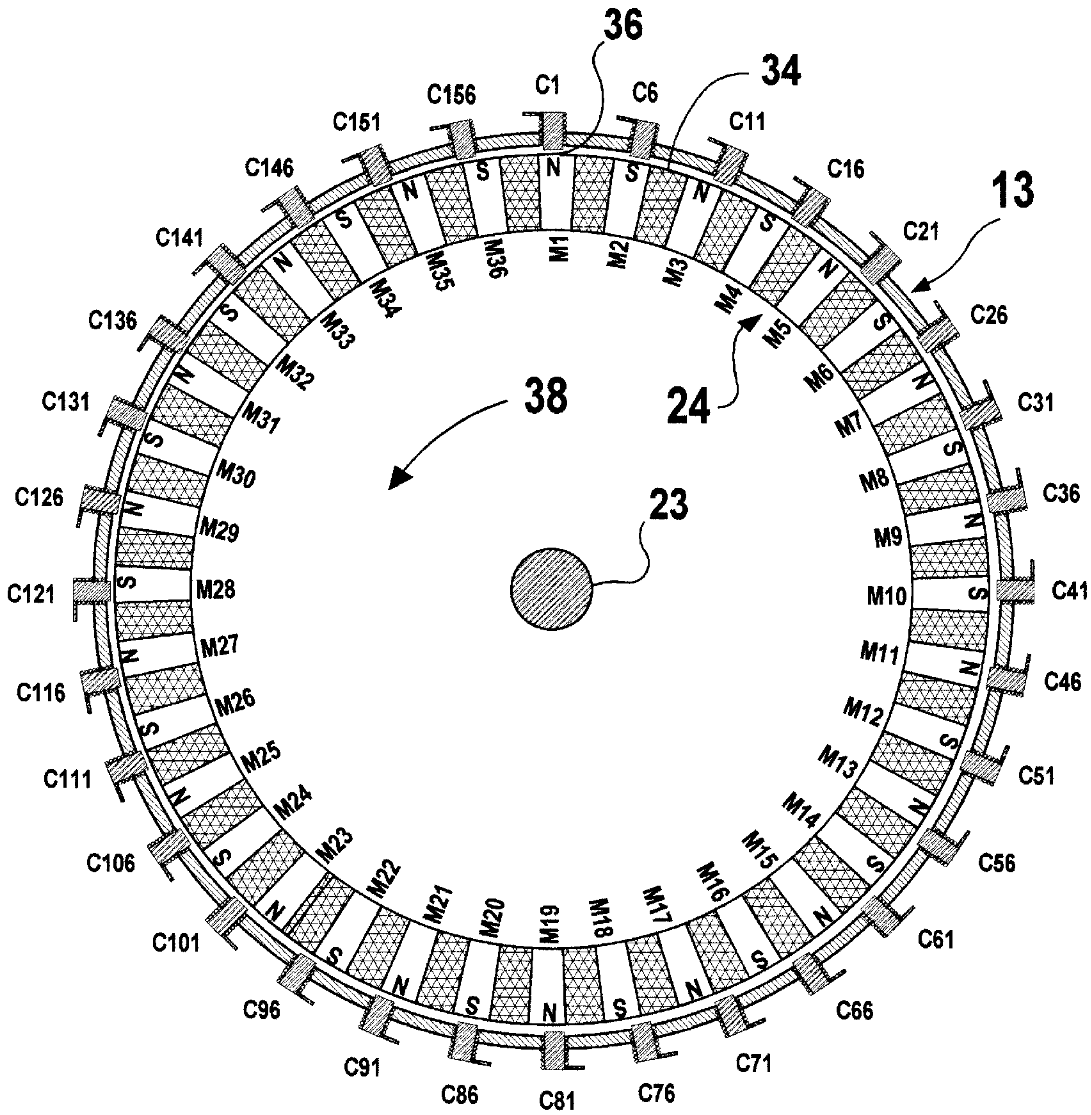
FIG. 7 is a plan view, partly in section, of the stator section of FIG. 6 disposed about the rotor section of FIG. 5.

As shown in FIGS. 1 and 7, the stator section 13 is coaxially maintained about the rotor section 24 (FIG. 7). The two stator, rotor sections 13, 24, respectively, are separated by an air gap. In a similar manner, the stator sections 14–17 are coaxially maintained about the corresponding rotor sections 25–28, respectively.

Because of the consecutive stator coil designations C1–C160 and the stator 12 being comprised of five stator sections, each of the stator coils of the stator section 13 have a designation with a numerical suffix or ending numeral of either 1 or 6 (FIG. 1). Correspondingly, stator coils of the stator sections 14, 15, 16, 17 have a numerical designation with a suffix or ending numeral that is either 2 or 7, 3 or 8, 4 or 9, 5 or 0, respectively.

The stator coil C1 (FIG. 7) has a proximal end 36 that is separated from the periphery 34 by the air gap. In a similar manner, all of the stator coils of the stator sections 13–17 have respective proximal ends that are separated from periphery of the corresponding five rotor sections 24–28 of the rotor 22 by the air gap. When there is substantially no angular displacement between, for example, the stator coil C1 of the stator section 13 and the corresponding permanent magnet M1 of the rotor section 24, the rotor 22 is at a reference position. Accordingly, FIG. 7 is a showing of the rotor 22 at the reference position and illustrates how the stationary stator section 13 is positioned relative to the rotatable rotor section 24 in this reference position.

As an example of how an excitation current through one of the stator coils C1–C160 causes the rotor 22 to rotate, with the rotor 22 at the reference position, the stator coil C21 is disposed intermediate to the permanent magnets M5, M6 (see FIG. 7). When the stator coil C21 conducts the excitation current in a direction that causes its proximal end to have a north magnetic polarization, the permanent magnets M5, M6 of the section 24 are respectively repelled and attracted, thereby developing a torque that rotates the rotor 22 in the direction of an arrow 38. When the stator coil 21 conducts the excitation current in a direction that causes its proximal end to have a south magnetic polarization, the magnets M5, M6 of the stator section 24 are respectively attracted and repelled, thereby developing a torque that rotates the rotor 22 in a direction opposite from the direction of the arrow 38.

When the rotor 22 is positioned to cause an exemplary one of the stator coils C1–C160 to have substantially no angular displacement from one of the permanent magnets of the rotor 22, the excitation current through the exemplary stator coil cannot develop torque. Thus, with the rotor 22 at the reference position (as shown in FIG. 7), magnetic polarization of the stator coil C1 is irrelevant because no torque is thereby developed. Therefore, input power and electrical energy is conserved by not providing the stator coil excitation current when it does not result in torque being developed.

An important consideration in deciding that each of the rotor sections 24–28 should include thirty six permanent magnets and that each of the stator sections 13–17 should include thirty two stator coils is that there are always four of the total stator coils C1–C160 that have substantially no angular displacement from a corresponding four permanent magnets of the rotor 22 comprising the five rotor sections 24–28. The identity of these four of the stator coils C1–C160 changes with every least resolvable increment of rotation of the rotor 22. The least resolvable increment of rotation of the rotor 22 is 0.25 degrees to achieve lining up another set of four permanent magnets that have no angular displacement. The four of the stator coils C1–C160 are always on one of the stator sections 13–17.

Therefore, in this embodiment, torque may be developed by each of the remaining 156 of the stator coils C1–C160 with the rotor 22 at the reference position (see FIG. 7) and at every 0.25 degree increment of rotation therefrom. With the rotor 22 at the reference position, for example, the stator coils C1, C41, C81, C121 (see FIG. 7) have substantially no angular displacement from the corresponding permanent magnets M1, M10, M19, M28, respectively. Similarly, with the rotor 22 displaced 0.25 degrees from the reference position, the stator coils C10, C50, C90, C130 of the stator section 17 would have substantially no angular displacement from the corresponding permanent magnets M3, M12, M21, M30, respectively. In this connection see appended Coil Excitation table page Row 1, Page Column 1 (line 2 thereof) where a "0" is shown for stator coil 10 when there is a 0.25 degree displacement of the rotor. Line 2 of Page Row 1, Page Column 3 shows a "0" for stator coil 50. See also Page Row 1, Page Column 6 (line 2) for the "0" designation for the stator coil 90. Line 2 of Page Row Page Column shows a "0" for the stator coil 130.

It should be appreciated that the four (non-angularly displaced) of the stator coils C1–C160 are in pairs that have a displacement of 180 degrees from each other. Because of the 180 degree displacement, there is substantially no dynamic imbalance caused by the four of the stator coils C1–C160 not developing torque. Therefore, to prevent the undesired dynamic imbalance, in each of the stator sections 13–17 there are an even number of stator coils on each of the stator sections with the number of stator coils on each of the stator sections less than the number of permanent magnets on a corresponding rotor section.

A table of least resolvable increments for the motor 10 with stator coils and permanent magnets on each of five stator sections and five rotor sections, respectively, is in accordance with the following least resolvable increment table. It should be understood that the least resolvable increment table is provided as an illustrative example and is not exhaustive. Following the table, it can be seen that the least resolvable increment for a rotor section having 36 permanent magnets (X axis) aligned with a corresponding stator section having 32 stator coils (Y axis) is 0.25 degrees for the specific case of five rotor and five stator sections.

| Coils/section | Magnets/section | | | | | | | | | | | |
|---|---|---|---|---|---|---|---|---|---|---|---|---|
| | 10 | 12 | 16 | 18 | 20 | 24 | 30 | 32 | 36 | 40 | 48 | 50 |
| 8 | x | 3 | x | 1 | x | 3 | x | 2.25 | 1 | x | 1.5 | 1.8 |
| 10 | x | 1.2 | 0.9 | 0.8 | x | 0.6 | 2.4 | 0.9 | 0.8 | 1.8 | 0.3 | x |
| 12 | x | x | 1.5 | 2 | x | x | x | 0.75 | 2 | x | 1.5 | 1.2 |
| 16 | x | x | x | 0.5 | x | 1.5 | x | x | 0.5 | x | x | 0.9 |
| 18 | x | x | x | x | x | 1 | x | 0.25 | x | 1 | 0.5 | 0.8 |
| 20 | x | x | x | x | x | 0.6 | 1.2 | 0.45 | 0.4 | x | 0.3 | x |
| 24 | x | x | x | x | x | x | x | 0.75 | 1 | x | x | 0.6 |
| 30 | x | x | x | x | x | x | x | 0.15 | 0.4 | 0.6 | 0.6 | x |
| 32 | x | x | x | x | x | x | x | x | 0.25 | x | 0.75 | 0.45 |
| 36 | x | x | x | x | x | x | x | x | x | x | 0.5 | 0.8 |
| 40 | x | x | x | x | x | x | x | x | x | x | 0.3 | x |
| 48 | x | x | x | x | x | x | x | x | x | x | x | 0.3 |

The letter, x, indicates a combination coils/section and magnets/section that is not useable.

Appended hereto is a coil excitation table (from Page Row 1, Page Column 10 to Page Row 30, Page Column 10) that lists magnetic polarizations of the proximal ends of the stator coils C1–C160, respectively, to cause the rotor 22 to rotate in the direction of the arrow 38. The magnetic polarizations are listed for cumulative least resolvable increments of angular displacement (0.25 degrees) of the rotor 22 from the reference position.

EXAMPLE 1

To achieve a maximum torque and minimum velocity of the rotor 22 in the direction of the arrow 38, magnetic polarizations of the proximal ends of the stator coils C1–C160 are in accordance with successive lines of the coil excitation table.

A first line on Page Row 1, Page Column 1 of the coil excitation table indicates desired magnetic polarizations when the rotor 22 is positioned at the angle 0.00 (the reference position). Entries on the first line for the stator coils C1, C41, C81 and C121 are 0, thereby indicating that the magnetic polarizations of the stator coils C1, C41, C81 and C121 is irrelevant. Accordingly, the stator coils C1, C41, C81 and C121 do not receive the excitation current when the rotor 22 is at the reference position.

An entry of S for a given stator coil indicates a south magnetic polarization of the proximal end of the given stator coil. Accordingly, when the entry is S for the given stator coil, a desired excitation current through the given stator coil causes its proximal end to have the south magnetic polarization. Correspondingly, an entry of N for the given stator coil indicates a north magnetic polarization. Accordingly, when the entry is N for the given stator coil, the desired excitation through the given stator coil causes its proximal end to have the north magnetic polarization. Entries on the first line are S for the following ones of the stator coils C1–C160:

| | | | | |
|---|---|---|---|---|
| C2–C5 | C10–C14 | C19–C23 | C28–C32 | C37–C40 |
| C46–C49 | C55–C58 | C64–67 | C73–C76 | C82–C85 |
| C90–C94 | C99–C103 | C108–C112 | C117–120 | C126–C129 |
| C135–C138 | C144–C147 | C153–C156 | | |

The entries on the first line are N for all others of the stator coils C1–C160, with the exception of the stator coils C1, C41, C81 and C121 for which polarizations are irrelevant.

As the rotor 22 rotates in increments of 0.25 degrees from the reference position, the excitation currents are provided through the stator coils C1–C160 to cause polarizations in accordance with successive lines of the coil excitation table. It should be understood that all polarizations are reversed from the entries in the excitation table when rotation in a direction, opposite from the direction of the arrow 38, is desired.

EXAMPLE 2

To achieve a reduced torque and a maximum velocity of the rotor 22 in the direction of the arrow 38, the excitation current is provided through each of the stator coils C1–C160 when they are disposed with a five degree displacement from each of two of the permanent magnets M1–M36 that are adjacent to each other. Thus, according to the coil excitation table, a desired excitation current through the stator coils C1, C81 causes their proximal ends to have the north magnetic polarization when the rotor 22 is rotated 5, 25, 45, 65, 85, 105, 125, 145, 165, 185, 205, 225, 245, 265, 285, 305, 325 and 345 degrees from the reference position.

In further accord with the coil excitation table, the desired excitation current through the stator coils C1, C81 causes their proximal ends to have a south magnetic polarization when the rotor 22 is rotated 15, 35, 55, 75, 95, 115, 135, 155, 175, 195, 215, 235, 255, 275, 295, 315, 335 and 355 degrees from the reference position. In a similar manner, polarizations caused by a desired excitation current through all others of the stator coils C1–C160 can be extracted from the coil excitation table. Similar to Example 1, all polarizations are reversed from the entries in the coil excitation table when rotation in a direction, opposite from the direction of the arrow 38, is desired.

As shown in FIG. 1, a special purpose computer 40 has stored therein a signal representation of the coil excitation table. The computer 40 additionally has a program stored therein for controlling the coil excitation for each one of the C1–C160 stator coils. Computer storage is well known to those skilled in the art. As explained hereinafter, the program is interactive.

The computer 40 includes an interface section 42 that is electrically connected to the stator 12 through a cable 44. The interface section 42 provides excitation to the stator coils C1–C160 via the cable 44 in accordance with the computer program.

From the Examples 1 and 2, a program for providing excitation current to the stator coils C1–C160 is predicated upon the computer 40 acquiring a signal representation of the angular displacement of the rotor 22 from the reference position as well as its direction of rotation. In accordance with the coil excitation table, the signal representation of the rotor 22 displacement should be accurate to within 0.25 degrees.

The signal representation of the rotor 22 displacement is acquired by a processing of signals provided by an optical encoder 46 that includes an encoding disc 48 coaxially mounted upon the shaft 23 proximal to an end thereof that is connected to a load (not shown). Therefore, the disc 48 rotates when the shaft 23 is rotated by the rotor 22.

Figure 2:
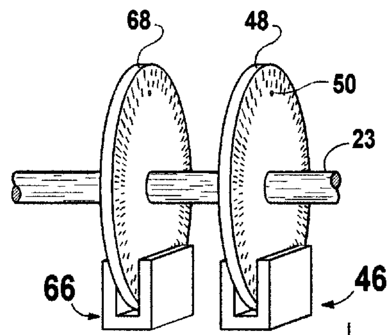
FIG. 2 is a perspective view of an optical encoder used in the embodiment of FIG. 1.
Figure 4:
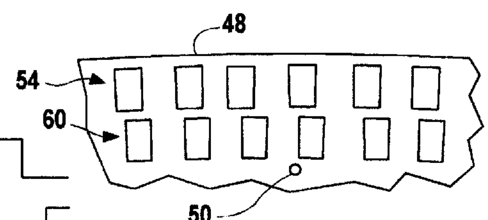
FIG. 4 is a plan view of a portion of an encoding disc of the encoder of FIG. 2.

As shown in FIGS. 2 and 4, a hole 50 passes through the disc 48. A displacement of the hole 50 from the center of disc 48 is referred to as a reference radius.

The encoder 46 includes a light source (not shown) on one side of the disc 48 that provides a reference beam of light that is directed to the disc 48 at the reference radius. A reference photo cell (not shown) positioned on the other side of the disc 48 receives the reference beam, but only when it passes through the hole 50. In response to receiving the reference beam, the reference photo cell provides a reset reference signal. Preferably, the disc 48 is angularly aligned with respect to the rotor 22 to cause the reference signal to be provided only when the rotor 22 is at the reference position. The encoder 46 is electrically connected to the interface section 42 through a signal line 52 (see FIG. 1) whereby the reference signal is provided to the computer 40 when the reference photo cell senses light going through the hole 50.

An in-phase group 54 (FIG. 4) of 1,440 evenly spaced similar holes pass through the disc 48. Because there are 1,440 holes, the holes of the group 54 have a spacing of 0.25 degrees. A displacement of holes of the group 54 from the center of the disc 48 is referred to as an in-phase radius.

The encoder 46 includes a light source (not shown) on one side of the disc 48 that provides an in-phase beam of light directed to the disc 48 at the in-phase radius. An in-phase photo cell (not shown) positioned on the other side of the disc 48 receives the in-phase beam when it passes through a hole of the group 54.

Figure 3:
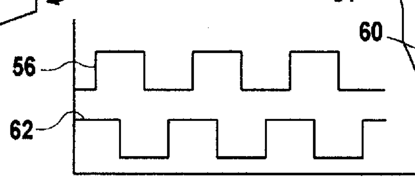
FIG. 3 is a showing of waveforms for use in the embodiment of FIG. 1.

As shown in FIG. 3, in response to the in-phase beam successively passing through holes of the group 54 while the rotor 22 rotates at a constant velocity, the in-phase photo cell provides an in-phase signal having a waveform 56. More particularly, one cycle of the in-phase signal (see FIG. 3) is representative of 0.25 degrees of rotation of the rotor 22. The encoder 46 (FIG. 1) is also electrically connected to the interface section 42 through a signal line 58 whereby the in-phase signal is provided to the computer 40.

A quadrature group 60 (FIG. 4) of 1,440 evenly spaced similar holes pass through the disc 48. Like the group 54, the holes of the group 60 have a spacing of 0.25 degrees. However, the group 60 has an angular displacement of 0.0625 degrees from the group 54. A displacement of holes of the group 54 from the center of the disc 48 is referred to as a quadrature radius.

The encoder 46 includes a light source (not shown) on one side of the disc 48 that provides a quadrature beam of light directed to the disc 48 at the quadrature radius. A quadrature photo cell (not shown) positioned on the other side of the disc 48 receives the quadrature beam when it passes through a hole of the group 60.

In response to the quadrature beam successively passing through holes of the group 60 while the rotor 22 rotates at the constant velocity, the quadrature photo cell provides a quadrature signal having a waveform 62 (see FIG. 3).

The encoder 46 (FIG. 1) is also electrically connected to the interface section 42 through a signal line 64 whereby the quadrature signal is provided to the computer 40. As shown by the waveforms 56, 62 (see FIG. 3), there is a 90 degree phase difference between the in-phase and quadrature signals.

It should be understood that the encoder 46 is of a type well known in the art. Moreover, providing a signal representation of the position of a shaft and its direction of rotation from signals such as the reference, in-phase and quadrature signals is also well known in the art.

An optical encoder 66, similar to the encoder 46, has an encoding disc 68 connected to the shaft 23. The encoder 66 is connected to the interface section 42 through signal lines 70, 71, 72. The optical encoders 46, 66 provide signals respectively representative of where the discs 48, 68 are connected to the shaft 23. The computer 40 compares the encoder signals to measure a deformation of the shaft 23 due to a load (not shown) being driven.

The computer 40 is connected to a console 74 through a cable 76. The console includes a keyboard 78 and a video display unit 80.

Although the excitation of the stator coils C1–C160 is determined by the stored program, the console 74 is used to alter the stored program to achieve a desired result, such as an increased velocity of the rotor 22. Therefore, the stored program is of a type that is interactive. In an alternative embodiment the stored program is changed in response to depression of an accelerator peddle of an automobile that is propelled by the rotating shaft 23 rotated by the electric motor 10.

While the invention has been particularly shown and described with reference to a preferred embodiment thereof, it should be understood by those skilled in the art that changes in form and detail may be made therein without departing from the spirit and scope of the invention. For example, the electric motor of this invention is extremely variable in the power it uses which is between a fraction of an amp to over 300 amps. The following are the ways this is achieved:

1. The stator coils can be turned on and off intermittently so the battery usage amps per second can go from fractions of an amp to 300 amps.
2. 1–156 stator coils can be used at any given time. Stator coils noted in the coil excitation table while using fewer numbers than maximum will be chosen by the computer based on RPM, torque and battery usage at that given time. For example: low RPM would require 0.25 degree steps to 1 degree steps. A higher RPM would require 1 degree to 3 degrees and up. These stator coils are located near the midpoint between the north and south positions on the rotor.

This electric motor can also be used as a generator to recharge batteries. It can also be used as a generator in a power plant situation when using a turbine or other power source to spin it. When reducing the speed of the electric motor, it actually generates power. This is controlled by the computer. It can generate either AC or DC. The AC Hz is controlled by the computer regardless of the speed of the electric motor with the bottom limit of 100 RPM and up. Turning the electric motor into a generator in a vehicle application is good for slowing the electric motor down when driving on a hill. This turns the motor into a generator. It creates a drag on the electric motor and slows the vehicle down. This process is achieved by using the computer. It phase shifts the on and off sequences on the stator coils to energize before the magnets reach the opposite polarity whereby the magnet passing by the core of the stator coil makes electron flow on the stator coil in the other direction which charges the battery.

Coil Excitation

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 0.00 | O | S | S | S | S | N | N | N | N | S | S | S | S | S | N | N | N |
| 0.25 | N | S | S | S | S | N | N | N | N | O | S | S | S | S | N | N | N |
| 0.50 | N | S | S | S | S | N | N | N | N | N | S | S | S | S | N | N | N |
| 0.75 | N | S | S | S | S | N | N | N | N | N | S | S | S | S | N | N | N |
| 1.00 | N | S | S | S | S | N | N | N | N | N | S | S | S | S | N | N | N |
| 1.25 | N | S | S | S | S | O | N | N | N | N | S | S | S | S | N | N | N |
| 1.50 | N | S | S | S | S | S | N | N | N | N | S | S | S | S | O | N | N |
| 1.75 | N | S | S | S | S | S | N | N | N | N | S | S | S | S | S | N | N |
| 2.00 | N | S | S | S | S | S | N | N | N | N | S | S | S | S | S | N | N |
| 2.25 | N | O | S | S | S | S | N | N | N | N | S | S | S | S | S | N | N |
| 2.50 | N | N | S | S | S | S | N | N | N | N | O | S | S | S | S | N | N |
| 2.75 | N | N | S | S | S | S | N | N | N | N | N | S | S | S | S | N | N |
| 3.00 | N | N | S | S | S | S | N | N | N | N | N | S | S | S | S | N | N |
| 3.25 | N | N | S | S | S | S | N | N | N | N | N | S | S | S | S | N | N |
| 3.50 | N | N | S | S | S | S | O | N | N | N | N | S | S | S | S | N | N |
| 3.75 | N | N | S | S | S | S | S | N | N | N | N | S | S | S | S | O | N |
| 4.00 | N | N | S | S | S | S | S | N | N | N | N | S | S | S | S | S | N |
| 4.25 | N | N | S | S | S | S | S | N | N | N | N | S | S | S | S | S | N |
| 4.50 | N | N | O | S | S | S | S | N | N | N | N | S | S | S | S | S | N |
| 4.75 | N | N | N | S | S | S | S | N | N | N | N | O | S | S | S | S | N |
| 5.00 | N | N | N | S | S | S | S | N | N | N | N | N | S | S | S | S | N |
| 5.25 | N | N | N | S | S | S | S | N | N | N | N | N | S | S | S | S | N |
| 5.50 | N | N | N | S | S | S | S | N | N | N | N | N | S | S | S | S | N |
| 5.75 | N | N | N | S | S | S | S | O | N | N | N | N | S | S | S | S | N |
| 6.00 | N | N | N | S | S | S | S | S | N | N | N | N | S | S | S | S | O |
| 6.25 | N | N | N | S | S | S | S | S | N | N | N | N | S | S | S | S | S |
| 6.50 | N | N | N | S | S | S | S | S | N | N | N | N | S | S | S | S | S |
| 6.75 | N | N | N | O | S | S | S | S | N | N | N | N | S | S | S | S | S |
| 7.00 | N | N | N | N | S | S | S | S | N | N | N | N | O | S | S | S | S |
| 7.25 | N | N | N | N | S | S | S | S | N | N | N | N | N | S | S | S | S |
| 7.50 | N | N | N | N | S | S | S | S | N | N | N | N | N | S | S | S | S |
| 7.75 | N | N | N | N | S | S | S | S | N | N | N | N | N | S | S | S | S |
| 8.00 | N | N | N | N | S | S | S | S | O | N | N | N | N | S | S | S | S |

-continued

| Coil Excitation | | | | | | | | | | | | | | | | | |
|---|---|---|---|---|---|---|---|---|---|---|---|---|---|---|---|---|---|
| 8.25 | N | N | N | N | S | S | S | S | S | N | N | N | N | S | S | S | S |
| 8.50 | N | N | N | N | S | S | S | S | S | N | N | N | N | S | S | S | S |
| 8.75 | N | N | N | N | S | S | S | S | S | N | N | N | N | S | S | S | S |
| 9.00 | N | N | N | N | O | S | S | S | S | N | N | N | N | S | S | S | S |
| 9.25 | N | N | N | N | N | S | S | S | S | N | N | N | N | O | S | S | S |
| 9.50 | N | N | N | N | N | S | S | S | S | N | N | N | N | N | S | S | S |
| 9.75 | N | N | N | N | N | S | S | S | S | N | N | N | N | N | S | S | S |
| 10.00 | O | N | N | N | N | S | S | S | S | N | N | N | N | N | S | S | S |
| 10.25 | S | N | N | N | N | S | S | S | S | O | N | N | N | N | S | S | S |
| 10.50 | S | N | N | N | N | S | S | S | S | S | N | N | N | N | S | S | S |
| 10.75 | S | N | N | N | N | S | S | S | S | S | N | N | N | N | S | S | S |
| 11.00 | S | N | N | N | N | S | S | S | S | S | N | N | N | N | S | S | S |
| 11.25 | S | N | N | N | N | O | S | S | S | S | N | N | N | N | S | S | S |
| 11.50 | S | N | N | N | N | N | S | S | S | S | N | N | N | N | O | S | S |
| 11.75 | S | N | N | N | N | N | S | S | S | S | N | N | N | N | N | S | S |

Page Row 1, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 0.00 | N | S | S | S | S | S | N | N | N | N | S | S | S | S | S | N | N |
| 0.25 | N | S | S | S | S | S | N | N | N | N | S | S | S | S | S | N | N |
| 0.50 | N | O | S | S | S | S | N | N | N | N | S | S | S | S | S | N | N |
| 0.75 | N | N | S | S | S | S | N | N | N | N | O | S | S | S | S | N | N |
| 1.00 | N | N | S | S | S | S | N | N | N | N | N | S | S | S | S | N | N |
| 1.25 | N | N | S | S | S | S | N | N | N | N | N | S | S | S | S | N | N |
| 1.50 | N | N | S | S | S | S | N | N | N | N | N | S | S | S | S | N | N |
| 1.75 | N | N | S | S | S | S | O | N | N | N | N | S | S | S | S | N | N |
| 2.00 | N | N | S | S | S | S | S | N | N | N | N | S | S | S | S | O | N |
| 2.25 | N | N | S | S | S | S | S | N | N | N | N | S | S | S | S | S | N |
| 2.50 | N | N | S | S | S | S | S | N | N | N | N | S | S | S | S | S | N |
| 2.75 | N | N | O | S | S | S | S | N | N | N | N | S | S | S | S | S | N |
| 3.00 | N | N | N | S | S | S | S | N | N | N | N | O | S | S | S | S | N |
| 3.25 | N | N | N | S | S | S | S | N | N | N | N | N | S | S | S | S | N |
| 3.50 | N | N | N | S | S | S | S | N | N | N | N | N | S | S | S | S | N |
| 3.75 | N | N | N | S | S | S | S | N | N | N | N | N | S | S | S | S | N |
| 4.00 | N | N | N | S | S | S | S | O | N | N | N | N | S | S | S | S | N |
| 4.25 | N | N | N | S | S | S | S | S | N | N | N | N | S | S | S | S | O |
| 4.50 | N | N | N | S | S | S | S | S | N | N | N | N | S | S | S | S | S |
| 4.75 | N | N | N | S | S | S | S | S | N | N | N | N | S | S | S | S | S |
| 5.00 | N | N | N | O | S | S | S | S | N | N | N | N | S | S | S | S | S |
| 5.25 | N | N | N | N | S | S | S | S | N | N | N | N | O | S | S | S | S |
| 5.50 | N | N | N | N | S | S | S | S | N | N | N | N | N | S | S | S | S |
| 5.75 | N | N | N | N | S | S | S | S | N | N | N | N | N | S | S | S | S |
| 6.00 | N | N | N | N | S | S | S | S | N | N | N | N | N | S | S | S | S |
| 6.25 | N | N | N | N | S | S | S | S | O | N | N | N | N | S | S | S | S |
| 6.50 | N | N | N | N | S | S | S | S | S | N | N | N | N | S | S | S | S |
| 6.75 | N | N | N | N | S | S | S | S | S | N | N | N | N | S | S | S | S |
| 7.00 | N | N | N | N | S | S | S | S | S | N | N | N | N | S | S | S | S |
| 7.25 | N | N | N | N | O | S | S | S | S | N | N | N | N | S | S | S | S |
| 7.50 | N | N | N | N | N | S | S | S | S | N | N | N | N | O | S | S | S |
| 7.75 | N | N | N | N | N | S | S | S | S | N | N | N | N | N | S | S | S |
| 8.00 | N | N | N | N | N | S | S | S | S | N | N | N | N | N | S | S | S |
| 8.25 | O | N | N | N | N | S | S | S | S | N | N | N | N | N | S | S | S |
| 8.50 | S | N | N | N | N | S | S | S | S | O | N | N | N | N | S | S | S |
| 8.75 | S | N | N | N | N | S | S | S | S | S | N | N | N | N | S | S | S |
| 9.00 | S | N | N | N | N | S | S | S | S | S | N | N | N | N | S | S | S |
| 9.25 | S | N | N | N | N | S | S | S | S | S | N | N | N | N | S | S | S |
| 9.50 | S | N | N | N | N | O | S | S | S | S | N | N | N | N | S | S | S |
| 9.75 | S | N | N | N | N | N | S | S | S | S | N | N | N | N | O | S | S |
| 10.00 | S | N | N | N | N | N | S | S | S | S | N | N | N | N | N | S | S |
| 10.25 | S | N | N | N | N | N | S | S | S | S | N | N | N | N | N | S | S |
| 10.50 | S | O | N | N | N | N | S | S | S | S | N | N | N | N | N | S | S |
| 10.75 | S | S | N | N | N | N | S | S | S | S | O | N | N | N | N | S | S |
| 11.00 | S | S | N | N | N | N | S | S | S | S | S | N | N | N | N | S | S |
| 11.25 | S | S | N | N | N | N | S | S | S | S | S | N | N | N | N | S | S |
| 11.50 | S | S | N | N | N | N | S | S | S | S | S | N | N | N | N | S | S |
| 11.75 | S | S | N | N | N | N | O | S | S | S | S | N | N | N | N | S | S |

Page Row 1, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 0.00 | N | N | S | S | S | S | O | N | N | N | N | S | S | S | S | N | N |
| 0.25 | N | N | S | S | S | S | S | N | N | N | N | S | S | S | S | O | N |
| 0.50 | N | N | S | S | S | S | S | N | N | N | N | S | S | S | S | S | N |
| 0.75 | N | N | S | S | S | S | S | N | N | N | N | S | S | S | S | S | N |
| 1.00 | N | N | O | S | S | S | S | N | N | N | N | S | S | S | S | S | N |
| 1.25 | N | N | N | S | S | S | S | N | N | N | N | O | S | S | S | S | N |

-continued

| | Coil Excitation | | | | | | | | | | | | | | | | |
|---|---|---|---|---|---|---|---|---|---|---|---|---|---|---|---|---|---|
| 1.50 | N | N | N | S | S | S | S | N | N | N | N | N | S | S | S | S | N |
| 1.75 | N | N | N | S | S | S | S | N | N | N | N | N | S | S | S | S | N |
| 2.00 | N | N | N | S | S | S | S | N | N | N | N | N | S | S | S | S | N |
| 2.25 | N | N | N | S | S | S | S | O | N | N | N | N | S | S | S | S | N |
| 2.50 | N | N | N | S | S | S | S | S | N | N | N | N | S | S | S | S | O |
| 2.75 | N | N | N | S | S | S | S | S | N | N | N | N | S | S | S | S | S |
| 3.00 | N | N | N | S | S | S | S | S | N | N | N | N | S | S | S | S | S |
| 3.25 | N | N | N | O | S | S | S | S | N | N | N | N | S | S | S | S | S |
| 3.50 | N | N | N | N | S | S | S | S | N | N | N | N | O | S | S | S | S |
| 3.75 | N | N | N | N | S | S | S | S | N | N | N | N | N | S | S | S | S |
| 4.00 | N | N | N | N | S | S | S | S | N | N | N | N | N | S | S | S | S |
| 4.25 | N | N | N | N | S | S | S | S | N | N | N | N | N | S | S | S | S |
| 4.50 | N | N | N | N | S | S | S | S | O | N | N | N | N | S | S | S | S |
| 4.75 | N | N | N | N | S | S | S | S | S | N | N | N | N | S | S | S | S |
| 5.00 | N | N | N | N | S | S | S | S | S | N | N | N | N | S | S | S | S |
| 5.25 | N | N | N | N | S | S | S | S | S | N | N | N | N | S | S | S | S |
| 5.50 | N | N | N | N | O | S | S | S | S | N | N | N | N | S | S | S | S |
| 5.75 | N | N | N | N | N | S | S | S | S | N | N | N | N | O | S | S | S |
| 6.00 | N | N | N | N | N | S | S | S | S | N | N | N | N | N | S | S | S |
| 6.25 | N | N | N | N | N | S | S | S | S | N | N | N | N | N | S | S | S |
| 6.50 | O | N | N | N | N | S | S | S | S | N | N | N | N | N | S | S | S |
| 6.75 | S | N | N | N | N | S | S | S | S | O | N | N | N | N | S | S | S |
| 7.00 | S | N | N | N | N | S | S | S | S | S | N | N | N | N | S | S | S |
| 7.25 | S | N | N | N | N | S | S | S | S | S | N | N | N | N | S | S | S |
| 7.50 | S | N | N | N | N | S | S | S | S | S | N | N | N | N | S | S | S |
| 7.75 | S | N | N | N | N | O | S | S | S | S | N | N | N | N | S | S | S |
| 8.00 | S | N | N | N | N | N | S | S | S | S | N | N | N | N | O | S | S |
| 8.25 | S | N | N | N | N | N | S | S | S | S | N | N | N | N | N | S | S |
| 8.50 | S | N | N | N | N | N | S | S | S | S | N | N | N | N | N | S | S |
| 8.75 | S | O | N | N | N | N | S | S | S | S | N | N | N | N | N | S | S |
| 9.00 | S | S | N | N | N | N | S | S | S | S | O | N | N | N | N | S | S |
| 9.25 | S | S | N | N | N | N | S | S | S | S | S | N | N | N | N | S | S |
| 9.50 | S | S | N | N | N | N | S | S | S | S | S | N | N | N | N | S | S |
| 9.75 | S | S | N | N | N | N | S | S | S | S | S | N | N | N | N | S | S |
| 10.00 | S | S | N | N | N | N | O | S | S | S | S | N | N | N | N | S | S |
| 10.25 | S | S | N | N | N | N | N | S | S | S | S | N | N | N | N | O | S |
| 10.50 | S | S | N | N | N | N | N | S | S | S | S | N | N | N | N | N | S |
| 10.75 | S | S | N | N | N | N | N | S | S | S | S | N | N | N | N | N | S |
| 11.00 | S | S | O | N | N | N | N | S | S | S | S | N | N | N | N | N | S |
| 11.25 | S | S | S | N | N | N | N | S | S | S | S | O | N | N | N | N | S |
| 11.50 | S | S | S | N | N | N | N | S | S | S | S | S | N | N | N | N | S |
| 11.75 | S | S | S | N | N | N | N | S | S | S | S | S | N | N | N | N | S |

Page Row 1, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 0.00 | N | N | N | S | S | S | S | N | N | N | N | N | S | S | S | S | N |
| 0.25 | N | N | N | S | S | S | S | N | N | N | N | N | S | S | S | S | N |
| 0.50 | N | N | N | S | S | S | S | O | N | N | N | N | S | S | S | S | N |
| 0.75 | N | N | N | S | S | S | S | S | N | N | N | N | S | S | S | S | O |
| 1.00 | N | N | N | S | S | S | S | S | N | N | N | N | S | S | S | S | S |
| 1.25 | N | N | N | S | S | S | S | S | N | N | N | N | S | S | S | S | S |
| 1.50 | N | N | N | O | S | S | S | S | N | N | N | N | S | S | S | S | S |
| 1.75 | N | N | N | N | S | S | S | S | N | N | N | N | O | S | S | S | S |
| 2.00 | N | N | N | N | S | S | S | S | N | N | N | N | N | S | S | S | S |
| 2.25 | N | N | N | N | S | S | S | S | N | N | N | N | N | S | S | S | S |
| 2.50 | N | N | N | N | S | S | S | S | N | N | N | N | N | S | S | S | S |
| 2.75 | N | N | N | N | S | S | S | S | O | N | N | N | N | S | S | S | S |
| 3.00 | N | N | N | N | S | S | S | S | S | N | N | N | N | S | S | S | S |
| 3.25 | N | N | N | N | S | S | S | S | S | N | N | N | N | S | S | S | S |
| 3.50 | N | N | N | N | S | S | S | S | S | N | N | N | N | S | S | S | S |
| 3.75 | N | N | N | N | O | S | S | S | S | N | N | N | N | S | S | S | S |
| 4.00 | N | N | N | N | N | S | S | S | S | N | N | N | N | O | S | S | S |
| 4.25 | N | N | N | N | N | S | S | S | S | N | N | N | N | N | S | S | S |
| 4.50 | N | N | N | N | N | S | S | S | S | N | N | N | N | N | S | S | S |
| 4.75 | O | N | N | N | N | S | S | S | S | N | N | N | N | N | S | S | S |
| 5.00 | S | N | N | N | N | S | S | S | S | O | N | N | N | N | S | S | S |
| 5.25 | S | N | N | N | N | S | S | S | S | S | N | N | N | N | S | S | S |
| 5.50 | S | N | N | N | N | S | S | S | S | S | N | N | N | N | S | S | S |
| 5.75 | S | N | N | N | N | S | S | S | S | S | N | N | N | N | S | S | S |
| 6.00 | S | N | N | N | N | O | S | S | S | S | N | N | N | N | S | S | S |
| 6.25 | S | N | N | N | N | N | S | S | S | S | N | N | N | N | O | S | S |
| 6.50 | S | N | N | N | N | N | S | S | S | S | N | N | N | N | N | S | S |
| 6.75 | S | N | N | N | N | N | S | S | S | S | N | N | N | N | N | S | S |
| 7.00 | S | O | N | N | N | N | S | S | S | S | N | N | N | N | N | S | S |
| 7.25 | S | S | N | N | N | N | S | S | S | S | O | N | N | N | N | S | S |
| 7.50 | S | S | N | N | N | N | S | S | S | S | S | N | N | N | N | S | S |

-continued

| Coil Excitation | | | | | | | | | | | | | | | | | |
|---|---|---|---|---|---|---|---|---|---|---|---|---|---|---|---|---|---|
| 7.75 | S | S | N | N | N | N | S | S | S | S | S | N | N | N | N | S | S |
| 8.00 | S | S | N | N | N | N | S | S | S | S | S | N | N | N | N | S | S |
| 8.25 | S | S | N | N | N | N | O | S | S | S | S | N | N | N | N | S | S |
| 8.50 | S | S | N | N | N | N | N | S | S | S | S | N | N | N | N | O | S |
| 8.75 | S | S | N | N | N | N | N | S | S | S | S | N | N | N | N | N | S |
| 9.00 | S | S | N | N | N | N | N | S | S | S | S | N | N | N | N | N | S |
| 9.25 | S | S | O | N | N | N | N | S | S | S | S | N | N | N | N | N | S |
| 9.50 | S | S | S | N | N | N | N | S | S | S | S | O | N | N | N | N | S |
| 9.75 | S | S | S | N | N | N | N | S | S | S | S | S | N | N | N | N | S |
| 10.00 | S | S | S | N | N | N | N | S | S | S | S | S | N | N | N | N | S |
| 10.25 | S | S | S | N | N | N | N | S | S | S | S | S | N | N | N | N | S |
| 10.50 | S | S | S | N | N | N | N | O | S | S | S | S | N | N | N | N | S |
| 10.75 | S | S | S | N | N | N | N | N | S | S | S | S | N | N | N | N | O |
| 11.00 | S | S | S | N | N | N | N | N | S | S | S | S | N | N | N | N | N |
| 11.25 | S | S | S | N | N | N | N | N | S | S | S | S | N | N | N | N | N |
| 11.50 | S | S | S | O | N | N | N | N | S | S | S | S | N | N | N | N | N |
| 11.75 | S | S | S | S | N | N | N | N | S | S | S | S | O | N | N | N | N |

Page Row 1, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 0.00 | N | N | N | N | S | S | S | S | N | N | N | N | O | S | S | S | S |
| 0.25 | N | N | N | N | S | S | S | S | N | N | N | N | N | S | S | S | S |
| 0.50 | N | N | N | N | S | S | S | S | N | N | N | N | N | S | S | S | S |
| 0.75 | N | N | N | N | S | S | S | S | N | N | N | N | N | S | S | S | S |
| 1.00 | N | N | N | N | S | S | S | S | O | N | N | N | N | S | S | S | S |
| 1.25 | N | N | N | N | S | S | S | S | S | N | N | N | N | S | S | S | S |
| 1.50 | N | N | N | N | S | S | S | S | S | N | N | N | N | S | S | S | S |
| 1.75 | N | N | N | N | S | S | S | S | S | N | N | N | N | S | S | S | S |
| 2.00 | N | N | N | N | O | S | S | S | S | N | N | N | N | S | S | S | S |
| 2.25 | N | N | N | N | N | S | S | S | S | N | N | N | N | O | S | S | S |
| 2.50 | N | N | N | N | N | S | S | S | S | N | N | N | N | N | S | S | S |
| 2.75 | N | N | N | N | N | S | S | S | S | N | N | N | N | N | S | S | S |
| 3.00 | O | N | N | N | N | S | S | S | S | N | N | N | N | N | S | S | S |
| 3.25 | S | N | N | N | N | S | S | S | S | O | N | N | N | N | S | S | S |
| 3.50 | S | N | N | N | N | S | S | S | S | S | N | N | N | N | S | S | S |
| 3.75 | S | N | N | N | N | S | S | S | S | S | N | N | N | N | S | S | S |
| 4.00 | S | N | N | N | N | S | S | S | S | S | N | N | N | N | S | S | S |
| 4.25 | S | N | N | N | N | O | S | S | S | S | N | N | N | N | S | S | S |
| 4.50 | S | N | N | N | N | N | S | S | S | S | N | N | N | N | O | S | S |
| 4.75 | S | N | N | N | N | N | S | S | S | S | N | N | N | N | N | S | S |
| 5.00 | S | N | N | N | N | N | S | S | S | S | N | N | N | N | N | S | S |
| 5.25 | S | O | N | N | N | N | S | S | S | S | N | N | N | N | N | S | S |
| 5.50 | S | S | N | N | N | N | S | S | S | S | O | N | N | N | N | S | S |
| 5.75 | S | S | N | N | N | N | S | S | S | S | S | N | N | N | N | S | S |
| 6.00 | S | S | N | N | N | N | S | S | S | S | S | N | N | N | N | S | S |
| 6.25 | S | S | N | N | N | N | S | S | S | S | S | N | N | N | N | S | S |
| 6.50 | S | S | N | N | N | N | O | S | S | S | S | N | N | N | N | S | S |
| 6.75 | S | S | N | N | N | N | N | S | S | S | S | N | N | N | N | O | S |
| 7.00 | S | S | N | N | N | N | N | S | S | S | S | N | N | N | N | N | S |
| 7.25 | S | S | N | N | N | N | N | S | S | S | S | N | N | N | N | N | S |
| 7.50 | S | S | O | N | N | N | N | S | S | S | S | N | N | N | N | N | S |
| 7.75 | S | S | S | N | N | N | N | S | S | S | S | O | N | N | N | N | S |
| 8.00 | S | S | S | N | N | N | N | S | S | S | S | S | N | N | N | N | S |
| 8.25 | S | S | S | N | N | N | N | S | S | S | S | S | N | N | N | N | S |
| 8.50 | S | S | S | N | N | N | N | S | S | S | S | S | N | N | N | N | S |
| 8.75 | S | S | S | N | N | N | N | O | S | S | S | S | N | N | N | N | S |
| 9.00 | S | S | S | N | N | N | N | N | S | S | S | S | N | N | N | N | O |
| 9.25 | S | S | S | N | N | N | N | N | S | S | S | S | N | N | N | N | N |
| 9.50 | S | S | S | N | N | N | N | N | S | S | S | S | N | N | N | N | N |
| 9.75 | S | S | S | O | N | N | N | N | S | S | S | S | N | N | N | N | N |
| 10.00 | S | S | S | S | N | N | N | N | S | S | S | S | O | N | N | N | N |
| 10.25 | S | S | S | S | N | N | N | N | S | S | S | S | S | N | N | N | N |
| 10.50 | S | S | S | S | N | N | N | N | S | S | S | S | S | N | N | N | N |
| 10.75 | S | S | S | S | N | N | N | N | S | S | S | S | S | N | N | N | N |
| 11.00 | S | S | S | S | N | N | N | N | O | S | S | S | S | N | N | N | N |
| 11.25 | S | S | S | S | N | N | N | N | N | S | S | S | S | N | N | N | N |
| 11.50 | S | S | S | S | N | N | N | N | N | S | S | S | S | N | N | N | N |
| 11.75 | S | S | S | S | N | N | N | N | N | S | S | S | S | N | N | N | N |

Page Row 1, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 0.00 | N | N | N | N | S | S | S | S | S | N | N | N | N | S | S | S | S |
| 0.25 | N | N | N | N | O | S | S | S | S | N | N | N | N | S | S | S | S |
| 0.50 | N | N | N | N | N | S | S | S | S | N | N | N | N | O | S | S | S |
| 0.75 | N | N | N | N | N | S | S | S | S | N | N | N | N | N | S | S | S |

-continued

| | Coil Excitation | | | | | | | | | | | | | | | | |
|---|---|---|---|---|---|---|---|---|---|---|---|---|---|---|---|---|---|
| 1.00 | N | N | N | N | N | S | S | S | S | N | N | N | N | N | S | S | S |
| 1.25 | O | N | N | N | N | S | S | S | S | N | N | N | N | N | S | S | S |
| 1.50 | S | N | N | N | N | S | S | S | S | O | N | N | N | N | S | S | S |
| 1.75 | S | N | N | N | N | S | S | S | S | S | N | N | N | N | S | S | S |
| 2.00 | S | N | N | N | N | S | S | S | S | S | N | N | N | N | S | S | S |
| 2.25 | S | N | N | N | N | S | S | S | S | S | N | N | N | N | S | S | S |
| 2.50 | S | N | N | N | N | O | S | S | S | S | N | N | N | N | S | S | S |
| 2.75 | S | N | N | N | N | N | S | S | S | S | N | N | N | N | O | S | S |
| 3.00 | S | N | N | N | N | N | S | S | S | S | N | N | N | N | N | S | S |
| 3.25 | S | N | N | N | N | N | S | S | S | S | N | N | N | N | N | S | S |
| 3.50 | S | O | N | N | N | N | S | S | S | S | N | N | N | N | N | S | S |
| 3.75 | S | S | N | N | N | N | S | S | S | S | O | N | N | N | N | S | S |
| 4.00 | S | S | N | N | N | N | S | S | S | S | S | N | N | N | N | S | S |
| 4.25 | S | S | N | N | N | N | S | S | S | S | S | N | N | N | N | S | S |
| 4.50 | S | S | N | N | N | N | S | S | S | S | S | N | N | N | N | S | S |
| 4.75 | S | S | N | N | N | N | O | S | S | S | S | N | N | N | N | S | S |
| 5.00 | S | S | N | N | N | N | N | S | S | S | S | N | N | N | N | O | S |
| 5.25 | S | S | N | N | N | N | N | S | S | S | S | N | N | N | N | N | S |
| 5.50 | S | S | N | N | N | N | N | S | S | S | S | N | N | N | N | N | S |
| 5.75 | S | S | O | N | N | N | N | S | S | S | S | N | N | N | N | N | S |
| 6.00 | S | S | S | N | N | N | N | S | S | S | S | O | N | N | N | N | S |
| 6.25 | S | S | S | N | N | N | N | S | S | S | S | S | N | N | N | N | S |
| 6.50 | S | S | S | N | N | N | N | S | S | S | S | S | N | N | N | N | S |
| 6.75 | S | S | S | N | N | N | N | S | S | S | S | S | N | N | N | N | S |
| 7.00 | S | S | S | N | N | N | N | O | S | S | S | S | N | N | N | N | S |
| 7.25 | S | S | S | N | N | N | N | N | S | S | S | S | N | N | N | N | O |
| 7.50 | S | S | S | N | N | N | N | N | S | S | S | S | N | N | N | N | N |
| 7.75 | S | S | S | N | N | N | N | N | S | S | S | S | N | N | N | N | N |
| 8.00 | S | S | S | O | N | N | N | N | S | S | S | S | N | N | N | N | N |
| 8.25 | S | S | S | S | N | N | N | N | S | S | S | S | O | N | N | N | N |
| 8.50 | S | S | S | S | N | N | N | N | S | S | S | S | S | N | N | N | N |
| 8.75 | S | S | S | S | N | N | N | N | S | S | S | S | S | N | N | N | N |
| 9.00 | S | S | S | S | N | N | N | N | S | S | S | S | S | N | N | N | N |
| 9.25 | S | S | S | S | N | N | N | N | O | S | S | S | S | N | N | N | N |
| 9.50 | S | S | S | S | N | N | N | N | N | S | S | S | S | N | N | N | N |
| 9.75 | S | S | S | S | N | N | N | N | N | S | S | S | S | N | N | N | N |
| 10.00 | S | S | S | S | N | N | N | N | N | S | S | S | S | N | N | N | N |
| 10.25 | S | S | S | S | O | N | N | N | N | S | S | S | S | N | N | N | N |
| 10.50 | S | S | S | S | S | N | N | N | N | S | S | S | S | O | N | N | N |
| 10.75 | S | S | S | S | S | N | N | N | N | S | S | S | S | S | N | N | N |
| 11.00 | S | S | S | S | S | N | N | N | N | S | S | S | S | S | N | N | N |
| 11.25 | O | S | S | S | S | N | N | N | N | S | S | S | S | S | N | N | N |
| 11.50 | N | S | S | S | S | N | N | N | N | O | S | S | S | S | N | N | N |
| 11.75 | N | S | S | S | S | N | N | N | N | N | S | S | S | S | N | N | N |

Page Row 1, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 0.00 | S | N | N | N | N | S | S | S | S | S | N | N | N | N | S | S | S |
| 0.25 | S | N | N | N | N | S | S | S | S | S | N | N | N | N | S | S | S |
| 0.50 | S | N | N | N | N | S | S | S | S | S | N | N | N | N | S | S | S |
| 0.75 | S | N | N | N | N | O | S | S | S | S | N | N | N | N | S | S | S |
| 1.00 | S | N | N | N | N | N | S | S | S | S | N | N | N | N | O | S | S |
| 1.25 | S | N | N | N | N | N | S | S | S | S | N | N | N | N | N | S | S |
| 1.50 | S | N | N | N | N | N | S | S | S | S | N | N | N | N | N | S | S |
| 1.75 | S | O | N | N | N | N | S | S | S | S | N | N | N | N | N | S | S |
| 2.00 | S | S | N | N | N | N | S | S | S | S | O | N | N | N | N | S | S |
| 2.25 | S | S | N | N | N | N | S | S | S | S | S | N | N | N | N | S | S |
| 2.50 | S | S | N | N | N | N | S | S | S | S | S | N | N | N | N | S | S |
| 2.75 | S | S | N | N | N | N | S | S | S | S | S | N | N | N | N | S | S |
| 3.00 | S | S | N | N | N | N | O | S | S | S | S | N | N | N | N | S | S |
| 3.25 | S | S | N | N | N | N | N | S | S | S | S | N | N | N | N | O | S |
| 3.50 | S | S | N | N | N | N | N | S | S | S | S | N | N | N | N | N | S |
| 3.75 | S | S | N | N | N | N | N | S | S | S | S | N | N | N | N | N | S |
| 4.00 | S | S | O | N | N | N | N | S | S | S | S | N | N | N | N | N | S |
| 4.25 | S | S | S | N | N | N | N | S | S | S | S | O | N | N | N | N | S |
| 4.50 | S | S | S | N | N | N | N | S | S | S | S | S | N | N | N | N | S |
| 4.75 | S | S | S | N | N | N | N | S | S | S | S | S | N | N | N | N | S |
| 5.00 | S | S | S | N | N | N | N | S | S | S | S | S | N | N | N | N | S |
| 5.25 | S | S | S | N | N | N | N | O | S | S | S | S | N | N | N | N | S |
| 5.50 | S | S | S | N | N | N | N | N | S | S | S | S | N | N | N | N | O |
| 5.75 | S | S | S | N | N | N | N | N | S | S | S | S | N | N | N | N | N |
| 6.00 | S | S | S | N | N | N | N | N | S | S | S | S | N | N | N | N | N |
| 6.25 | S | S | S | O | N | N | N | N | S | S | S | S | N | N | N | N | N |
| 6.50 | S | S | S | S | N | N | N | N | S | S | S | S | O | N | N | N | N |
| 6.75 | S | S | S | S | N | N | N | N | S | S | S | S | S | N | N | N | N |
| 7.00 | S | S | S | S | N | N | N | N | S | S | S | S | S | N | N | N | N |

-continued

| Coil Excitation | | | | | | | | | | | | | | | | | |
|---|---|---|---|---|---|---|---|---|---|---|---|---|---|---|---|---|---|
| 7.25 | S | S | S | S | N | N | N | N | S | S | S | S | S | N | N | N | N |
| 7.50 | S | S | S | S | N | N | N | N | O | S | S | S | S | N | N | N | N |
| 7.75 | S | S | S | S | N | N | N | N | N | S | S | S | S | N | N | N | N |
| 8.00 | S | S | S | S | N | N | N | N | N | S | S | S | S | N | N | N | N |
| 8.25 | S | S | S | S | N | N | N | N | N | S | S | S | S | N | N | N | N |
| 8.50 | S | S | S | S | O | N | N | N | N | S | S | S | S | N | N | N | N |
| 8.75 | S | S | S | S | S | N | N | N | N | S | S | S | S | O | N | N | N |
| 9.00 | S | S | S | S | S | N | N | N | N | S | S | S | S | S | N | N | N |
| 9.25 | S | S | S | S | S | N | N | N | N | S | S | S | S | S | N | N | N |
| 9.50 | O | S | S | S | S | N | N | N | N | S | S | S | S | S | N | N | N |
| 9.75 | N | S | S | S | S | N | N | N | N | O | S | S | S | S | N | N | N |
| 10.00 | N | S | S | S | S | N | N | N | N | N | S | S | S | S | N | N | N |
| 10.25 | N | S | S | S | S | N | N | N | N | N | S | S | S | S | N | N | N |
| 10.50 | N | S | S | S | S | N | N | N | N | N | S | S | S | S | N | N | N |
| 10.75 | N | S | S | S | S | O | N | N | N | N | S | S | S | S | N | N | N |
| 11.00 | N | S | S | S | S | S | N | N | N | N | S | S | S | S | O | N | N |
| 11.25 | N | S | S | S | S | S | N | N | N | N | S | S | S | S | S | N | N |
| 11.50 | N | S | S | S | S | S | N | N | N | N | S | S | S | S | S | N | N |
| 11.75 | N | O | S | S | S | S | N | N | N | N | S | S | S | S | S | N | N |

Page Row 1, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 0.00 | S | O | N | N | N | N | S | S | S | S | N | N | N | N | N | S | S |
| 0.25 | S | S | N | N | N | N | S | S | S | S | O | N | N | N | N | S | S |
| 0.50 | S | S | N | N | N | N | S | S | S | S | S | N | N | N | N | S | S |
| 0.75 | S | S | N | N | N | N | S | S | S | S | S | N | N | N | N | S | S |
| 1.00 | S | S | N | N | N | N | S | S | S | S | S | N | N | N | N | S | S |
| 1.25 | S | S | N | N | N | N | O | S | S | S | S | N | N | N | N | S | S |
| 1.50 | S | S | N | N | N | N | N | S | S | S | S | N | N | N | N | O | S |
| 1.75 | S | S | N | N | N | N | N | S | S | S | S | N | N | N | N | N | S |
| 2.00 | S | S | N | N | N | N | N | S | S | S | S | N | N | N | N | N | S |
| 2.25 | S | S | O | N | N | N | N | S | S | S | S | N | N | N | N | N | S |
| 2.50 | S | S | S | N | N | N | N | S | S | S | S | O | N | N | N | N | S |
| 2.75 | S | S | S | N | N | N | N | S | S | S | S | S | N | N | N | N | S |
| 3.00 | S | S | S | N | N | N | N | S | S | S | S | S | N | N | N | N | S |
| 3.25 | S | S | S | N | N | N | N | S | S | S | S | S | N | N | N | N | S |
| 3.50 | S | S | S | N | N | N | N | O | S | S | S | S | N | N | N | N | S |
| 3.75 | S | S | S | N | N | N | N | N | S | S | S | S | N | N | N | N | O |
| 4.00 | S | S | S | N | N | N | N | N | S | S | S | S | N | N | N | N | N |
| 4.25 | S | S | S | N | N | N | N | N | S | S | S | S | N | N | N | N | N |
| 4.50 | S | S | S | O | N | N | N | N | S | S | S | S | N | N | N | N | N |
| 4.75 | S | S | S | S | N | N | N | N | S | S | S | S | O | N | N | N | N |
| 5.00 | S | S | S | S | N | N | N | N | S | S | S | S | S | N | N | N | N |
| 5.25 | S | S | S | S | N | N | N | N | S | S | S | S | S | N | N | N | N |
| 5.50 | S | S | S | S | N | N | N | N | S | S | S | S | S | N | N | N | N |
| 5.75 | S | S | S | S | N | N | N | N | O | S | S | S | S | N | N | N | N |
| 6.00 | S | S | S | S | N | N | N | N | N | S | S | S | S | N | N | N | N |
| 6.25 | S | S | S | S | N | N | N | N | N | S | S | S | S | N | N | N | N |
| 6.50 | S | S | S | S | N | N | N | N | N | S | S | S | S | N | N | N | N |
| 6.75 | S | S | S | S | O | N | N | N | N | S | S | S | S | N | N | N | N |
| 7.00 | S | S | S | S | S | N | N | N | N | S | S | S | S | O | N | N | N |
| 7.25 | S | S | S | S | S | N | N | N | N | S | S | S | S | S | N | N | N |
| 7.50 | S | S | S | S | S | N | N | N | N | S | S | S | S | S | N | N | N |
| 7.75 | O | S | S | S | S | N | N | N | N | S | S | S | S | S | N | N | N |
| 8.00 | N | S | S | S | S | N | N | N | N | O | S | S | S | S | N | N | N |
| 8.25 | N | S | S | S | S | N | N | N | N | N | S | S | S | S | N | N | N |
| 8.50 | N | S | S | S | S | N | N | N | N | N | S | S | S | S | N | N | N |
| 8.75 | N | S | S | S | S | N | N | N | N | N | S | S | S | S | N | N | N |
| 9.00 | N | S | S | S | S | O | N | N | N | N | S | S | S | S | N | N | N |
| 9.25 | N | S | S | S | S | S | N | N | N | N | S | S | S | S | O | N | N |
| 9.50 | N | S | S | S | S | S | N | N | N | N | S | S | S | S | S | N | N |
| 9.75 | N | S | S | S | S | S | N | N | N | N | S | S | S | S | S | N | N |
| 10.00 | N | O | S | S | S | S | N | N | N | N | S | S | S | S | S | N | N |
| 10.25 | N | N | S | S | S | S | N | N | N | N | O | S | S | S | S | N | N |
| 10.50 | N | N | S | S | S | S | N | N | N | N | N | S | S | S | S | N | N |
| 10.75 | N | N | S | S | S | S | N | N | N | N | N | S | S | S | S | N | N |
| 11.00 | N | N | S | S | S | S | N | N | N | N | N | S | S | S | S | N | N |
| 11.25 | N | N | S | S | S | S | O | N | N | N | N | S | S | S | S | N | N |
| 11.50 | N | N | S | S | S | S | S | N | N | N | N | S | S | S | S | O | N |
| 11.75 | N | N | S | S | S | S | S | N | N | N | N | S | S | S | S | S | N |

Page Row 1, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 0.00 | S | S | N | N | N | N | N | S | S | S | S | N | N | N | N | N | S |
| 0.25 | S | S | N | N | N | N | N | S | S | S | S | N | N | N | N | N | S |

-continued

| Coil Excitation | | | | | | | | | | | | | | | | | |
|---|---|---|---|---|---|---|---|---|---|---|---|---|---|---|---|---|---|
| 0.50 | S | S | O | N | N | N | N | S | S | S | S | N | N | N | N | N | S |
| 0.75 | S | S | S | N | N | N | N | S | S | S | S | O | N | N | N | N | S |
| 1.00 | S | S | S | N | N | N | N | S | S | S | S | S | N | N | N | N | S |
| 1.25 | S | S | S | N | N | N | N | S | S | S | S | S | N | N | N | N | S |
| 1.50 | S | S | S | N | N | N | N | S | S | S | S | S | N | N | N | N | S |
| 1.75 | S | S | S | N | N | N | N | O | S | S | S | S | N | N | N | N | S |
| 2.00 | S | S | S | N | N | N | N | N | S | S | S | S | N | N | N | N | O |
| 2.25 | S | S | S | N | N | N | N | N | S | S | S | S | N | N | N | N | N |
| 2.50 | S | S | S | N | N | N | N | N | S | S | S | S | N | N | N | N | N |
| 2.75 | S | S | S | O | N | N | N | N | S | S | S | S | N | N | N | N | N |
| 3.00 | S | S | S | S | N | N | N | N | S | S | S | S | O | N | N | N | N |
| 3.25 | S | S | S | S | N | N | N | N | S | S | S | S | S | N | N | N | N |
| 3.50 | S | S | S | S | N | N | N | N | S | S | S | S | S | N | N | N | N |
| 3.75 | S | S | S | S | N | N | N | N | S | S | S | S | S | N | N | N | N |
| 4.00 | S | S | S | S | N | N | N | N | O | S | S | S | S | N | N | N | N |
| 4.25 | S | S | S | S | N | N | N | N | N | S | S | S | S | N | N | N | N |
| 4.50 | S | S | S | S | N | N | N | N | N | S | S | S | S | N | N | N | N |
| 4.75 | S | S | S | S | N | N | N | N | N | S | S | S | S | N | N | N | N |
| 5.00 | S | S | S | S | O | N | N | N | N | S | S | S | S | N | N | N | N |
| 5.25 | S | S | S | S | S | N | N | N | N | S | S | S | S | O | N | N | N |
| 5.50 | S | S | S | S | S | N | N | N | N | S | S | S | S | S | N | N | N |
| 5.75 | S | S | S | S | S | N | N | N | N | S | S | S | S | S | N | N | N |
| 6.00 | O | S | S | S | S | N | N | N | N | S | S | S | S | S | N | N | N |
| 6.25 | N | S | S | S | S | N | N | N | N | O | S | S | S | S | N | N | N |
| 6.50 | N | S | S | S | S | N | N | N | N | N | S | S | S | S | N | N | N |
| 6.75 | N | S | S | S | S | N | N | N | N | N | S | S | S | S | N | N | N |
| 7.00 | N | S | S | S | S | N | N | N | N | N | S | S | S | S | N | N | N |
| 7.25 | N | S | S | S | S | O | N | N | N | N | S | S | S | S | N | N | N |
| 7.50 | N | S | S | S | S | S | N | N | N | N | S | S | S | S | O | N | N |
| 7.75 | N | S | S | S | S | S | N | N | N | N | S | S | S | S | S | N | N |
| 8.00 | N | S | S | S | S | S | N | N | N | N | S | S | S | S | S | N | N |
| 8.25 | N | O | S | S | S | S | N | N | N | N | S | S | S | S | S | N | N |
| 8.50 | N | N | S | S | S | S | N | N | N | N | O | S | S | S | S | N | N |
| 8.75 | N | N | S | S | S | S | N | N | N | N | N | S | S | S | S | N | N |
| 9.00 | N | N | S | S | S | S | N | N | N | N | N | S | S | S | S | N | N |
| 9.25 | N | N | S | S | S | S | N | N | N | N | N | S | S | S | S | N | N |
| 9.50 | N | N | S | S | S | S | O | N | N | N | N | S | S | S | S | N | N |
| 9.75 | N | N | S | S | S | S | S | N | N | N | N | S | S | S | S | O | N |
| 10.00 | N | N | S | S | S | S | S | N | N | N | N | S | S | S | S | S | N |
| 10.25 | N | N | S | S | S | S | S | N | N | N | N | S | S | S | S | S | N |
| 10.50 | N | N | O | S | S | S | S | N | N | N | N | S | S | S | S | S | N |
| 10.75 | N | N | N | S | S | S | S | N | N | N | N | O | S | S | S | S | N |
| 11.00 | N | N | N | S | S | S | S | N | N | N | N | N | S | S | S | S | N |
| 11.25 | N | N | N | S | S | S | S | N | N | N | N | N | S | S | S | S | N |
| 11.50 | N | N | N | S | S | S | S | N | N | N | N | N | S | S | S | S | N |
| 11.75 | N | N | N | S | S | S | S | O | N | N | N | N | S | S | S | S | N |

Page Row 1, Page Column 9

| Coil | 154 | 155 | 156 | 157 | 158 | 159 | 160 |
|---|---|---|---|---|---|---|---|
| 0.00 | S | S | S | N | N | N | N |
| 0.25 | S | S | S | N | N | N | N |
| 0.50 | S | S | S | N | N | N | N |
| 0.75 | S | S | S | N | N | N | N |
| 1.00 | S | S | S | O | N | N | N |
| 1.25 | S | S | S | S | N | N | N |
| 1.50 | S | S | S | S | N | N | N |
| 1.75 | S | S | S | S | N | N | N |
| 2.00 | S | S | S | S | N | N | N |
| 2.25 | S | S | S | S | N | N | N |
| 2.50 | S | S | S | S | N | N | N |
| 2.75 | S | S | S | S | N | N | N |
| 3.00 | S | S | S | S | N | N | N |
| 3.25 | S | S | S | S | O | N | N |
| 3.50 | S | S | S | S | S | N | N |
| 3.75 | S | S | S | S | S | N | N |
| 4.00 | S | S | S | S | S | N | N |
| 4.25 | O | S | S | S | S | N | N |
| 4.50 | N | S | S | S | S | N | N |
| 4.75 | N | S | S | S | S | N | N |
| 5.00 | N | S | S | S | S | N | N |
| 5.25 | N | S | S | S | S | N | N |
| 5.50 | N | S | S | S | S | O | N |
| 5.75 | N | S | S | S | S | S | N |
| 6.00 | N | S | S | S | S | S | N |
| 6.25 | N | S | S | S | S | S | N |
| 6.50 | N | O | S | S | S | S | N |

-continued

Coil Excitation

| | | | | | | | |
|---|---|---|---|---|---|---|---|
| 6.75 | N | N | S | S | S | S | N |
| 7.00 | N | N | S | S | S | S | N |
| 7.25 | N | N | S | S | S | S | N |
| 7.50 | N | N | S | S | S | S | N |
| 7.75 | N | N | S | S | S | S | O |
| 8.00 | N | N | S | S | S | S | S |
| 8.25 | N | N | S | S | S | S | S |
| 8.50 | N | N | S | S | S | S | S |
| 8.75 | N | N | O | S | S | S | S |
| 9.00 | N | N | N | S | S | S | S |
| 9.25 | N | N | N | S | S | S | S |
| 9.50 | N | N | N | S | S | S | S |
| 9.75 | N | N | N | S | S | S | S |
| 10.00 | N | N | N | S | S | S | S |
| 10.25 | N | N | N | S | S | S | S |
| 10.50 | N | N | N | S | S | S | S |
| 10.75 | N | N | N | S | S | S | S |
| 11.00 | N | N | N | O | S | S | S |
| 11.25 | N | N | N | N | S | S | S |
| 11.50 | N | N | N | N | S | S | S |
| 11.75 | N | N | N | N | S | S | S |

Page Row 1, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 12.00 | S | N | N | N | N | N | S | S | S | S | N | N | N | N | N | S | S |
| 12.25 | S | O | N | N | N | N | S | S | S | S | N | N | N | N | N | S | S |
| 12.50 | S | S | N | N | N | N | S | S | S | S | O | N | N | N | N | S | S |
| 12.75 | S | S | N | N | N | N | S | S | S | S | S | N | N | N | N | S | S |
| 13.00 | S | S | N | N | N | N | S | S | S | S | S | N | N | N | N | S | S |
| 13.25 | S | S | N | N | N | N | S | S | S | S | S | N | N | N | N | S | S |
| 13.50 | S | S | N | N | N | N | O | S | S | S | S | N | N | N | N | S | S |
| 13.75 | S | S | N | N | N | N | N | S | S | S | S | N | N | N | N | O | S |
| 14.00 | S | S | N | N | N | N | N | S | S | S | S | N | N | N | N | N | S |
| 14.25 | S | S | N | N | N | N | N | S | S | S | S | N | N | N | N | N | S |
| 14.50 | S | S | O | N | N | N | N | S | S | S | S | N | N | N | N | N | S |
| 14.75 | S | S | S | N | N | N | N | S | S | S | S | O | N | N | N | N | S |
| 15.00 | S | S | S | N | N | N | N | S | S | S | S | S | N | N | N | N | S |
| 15.25 | S | S | S | N | N | N | N | S | S | S | S | S | N | N | N | N | S |
| 15.50 | S | S | S | N | N | N | N | S | S | S | S | S | N | N | N | N | S |
| 15.75 | S | S | S | N | N | N | N | O | S | S | S | S | N | N | N | N | S |
| 16.00 | S | S | S | N | N | N | N | N | S | S | S | S | N | N | N | N | O |
| 16.25 | S | S | S | N | N | N | N | N | S | S | S | S | N | N | N | N | N |
| 16.50 | S | S | S | N | N | N | N | N | S | S | S | S | N | N | N | N | N |
| 16.75 | S | S | S | O | N | N | N | N | S | S | S | S | N | N | N | N | N |
| 17.00 | S | S | S | S | N | N | N | N | S | S | S | S | O | N | N | N | N |
| 17.25 | S | S | S | S | N | N | N | N | S | S | S | S | S | N | N | N | N |
| 17.50 | S | S | S | S | N | N | N | N | S | S | S | S | S | N | N | N | N |
| 17.75 | S | S | S | S | N | N | N | N | S | S | S | S | S | N | N | N | N |
| 18.00 | S | S | S | S | N | N | N | N | O | S | S | S | S | N | N | N | N |
| 18.25 | S | S | S | S | N | N | N | N | N | S | S | S | S | N | N | N | N |
| 18.50 | S | S | S | S | N | N | N | N | N | S | S | S | S | N | N | N | N |
| 18.75 | S | S | S | S | N | N | N | N | N | S | S | S | S | N | N | N | N |
| 19.00 | S | S | S | S | O | N | N | N | N | S | S | S | S | N | N | N | N |
| 19.25 | S | S | S | S | S | N | N | N | N | S | S | S | S | O | N | N | N |
| 19.50 | S | S | S | S | S | N | N | N | N | S | S | S | S | S | N | N | N |
| 19.75 | S | S | S | S | S | N | N | N | N | S | S | S | S | S | N | N | N |
| 20.00 | O | S | S | S | S | N | N | N | N | S | S | S | S | S | N | N | N |
| 20.25 | N | S | S | S | S | N | N | N | N | O | S | S | S | S | N | N | N |
| 20.50 | N | S | S | S | S | N | N | N | N | N | S | S | S | S | N | N | N |
| 20.75 | N | S | S | S | S | N | N | N | N | N | S | S | S | S | N | N | N |
| 21.00 | N | S | S | S | S | N | N | N | N | N | S | S | S | S | N | N | N |
| 21.25 | N | S | S | S | S | O | N | N | N | N | S | S | S | S | N | N | N |
| 21.50 | N | S | S | S | S | S | N | N | N | N | S | S | S | S | O | N | N |
| 21.75 | N | S | S | S | S | S | N | N | N | N | S | S | S | S | S | N | N |
| 22.00 | N | S | S | S | S | S | N | N | N | N | S | S | S | S | S | N | N |
| 22.25 | N | O | S | S | S | S | N | N | N | N | S | S | S | S | S | N | N |
| 22.50 | N | N | S | S | S | S | N | N | N | N | O | S | S | S | S | N | N |
| 22.75 | N | N | S | S | S | S | N | N | N | N | N | S | S | S | S | N | N |
| 23.00 | N | N | S | S | S | S | N | N | N | N | N | S | S | S | S | N | N |
| 23.25 | N | N | S | S | S | S | N | N | N | N | N | S | S | S | S | N | N |
| 23.50 | N | N | S | S | S | S | O | N | N | N | N | S | S | S | S | N | N |
| 23.75 | N | N | S | S | S | S | S | N | N | N | N | S | S | S | S | O | N |

Page Row 2, Page Column 1

-continued

| Coil Excitation | | | | | | | | | | | | | | | | | |
|---|---|---|---|---|---|---|---|---|---|---|---|---|---|---|---|---|---|
| Coil | 18 | 19 | 20 | 21 | 22 | 23 | 24 | 25 | 26 | 27 | 28 | 29 | 30 | 31 | 32 | 33 | 34 |
| 12.00 | S | S | N | N | N | N | N | S | S | S | S | N | N | N | N | O | S |
| 12.25 | S | S | N | N | N | N | N | S | S | S | S | N | N | N | N | N | S |
| 12.50 | S | S | N | N | N | N | N | S | S | S | S | N | N | N | N | N | S |
| 12.75 | S | S | O | N | N | N | N | S | S | S | S | N | N | N | N | N | S |
| 13.00 | S | S | S | N | N | N | N | S | S | S | S | O | N | N | N | N | S |
| 13.25 | S | S | S | N | N | N | N | S | S | S | S | S | N | N | N | N | S |
| 13.50 | S | S | S | N | N | N | N | S | S | S | S | S | N | N | N | N | S |
| 13.75 | S | S | S | N | N | N | N | S | S | S | S | S | N | N | N | N | S |
| 14.00 | S | S | S | N | N | N | N | O | S | S | S | S | N | N | N | N | S |
| 14.25 | S | S | S | N | N | N | N | N | S | S | S | S | N | N | N | N | O |
| 14.50 | S | S | S | N | N | N | N | N | S | S | S | S | N | N | N | N | N |
| 14.75 | S | S | S | N | N | N | N | N | S | S | S | S | N | N | N | N | N |
| 15.00 | S | S | S | O | N | N | N | N | S | S | S | S | N | N | N | N | N |
| 15.25 | S | S | S | S | N | N | N | N | S | S | S | S | O | N | N | N | N |
| 15.50 | S | S | S | S | N | N | N | N | S | S | S | S | S | N | N | N | N |
| 15.75 | S | S | S | S | N | N | N | N | S | S | S | S | S | N | N | N | N |
| 16.00 | S | S | S | S | N | N | N | N | S | S | S | S | S | N | N | N | N |
| 16.25 | S | S | S | S | N | N | N | N | O | S | S | S | S | N | N | N | N |
| 16.50 | S | S | S | S | N | N | N | N | N | S | S | S | S | N | N | N | N |
| 16.75 | S | S | S | S | N | N | N | N | N | S | S | S | S | N | N | N | N |
| 17.00 | S | S | S | S | N | N | N | N | N | S | S | S | S | N | N | N | N |
| 17.25 | S | S | S | S | O | N | N | N | N | S | S | S | S | N | N | N | N |
| 17.50 | S | S | S | S | S | N | N | N | N | S | S | S | S | O | N | N | N |
| 17.75 | S | S | S | S | S | N | N | N | N | S | S | S | S | S | N | N | N |
| 18.00 | S | S | S | S | S | N | N | N | N | S | S | S | S | S | N | N | N |
| 18.25 | O | S | S | S | S | N | N | N | N | S | S | S | S | S | N | N | N |
| 18.50 | N | S | S | S | S | N | N | N | N | O | S | S | S | S | N | N | N |
| 18.75 | N | S | S | S | S | N | N | N | N | N | S | S | S | S | N | N | N |
| 19.00 | N | S | S | S | S | N | N | N | N | N | S | S | S | S | N | N | N |
| 19.25 | N | S | S | S | S | N | N | N | N | N | S | S | S | S | N | N | N |
| 19.50 | N | S | S | S | S | O | N | N | N | N | S | S | S | S | N | N | N |
| 19.75 | N | S | S | S | S | S | N | N | N | N | S | S | S | S | O | N | N |
| 20.00 | N | S | S | S | S | S | N | N | N | N | S | S | S | S | S | N | N |
| 20.25 | N | S | S | S | S | S | N | N | N | N | S | S | S | S | S | N | N |
| 20.50 | N | O | S | S | S | S | N | N | N | N | S | S | S | S | S | N | N |
| 20.75 | N | N | S | S | S | S | N | N | N | N | O | S | S | S | S | N | N |
| 21.00 | N | N | S | S | S | S | N | N | N | N | N | S | S | S | S | N | N |
| 21.25 | N | N | S | S | S | S | N | N | N | N | N | S | S | S | S | N | N |
| 21.50 | N | N | S | S | S | S | N | N | N | N | N | S | S | S | S | N | N |
| 21.75 | N | N | S | S | S | S | O | N | N | N | N | S | S | S | S | N | N |
| 22.00 | N | N | S | S | S | S | S | N | N | N | N | S | S | S | S | O | N |
| 22.25 | N | N | S | S | S | S | S | N | N | N | N | S | S | S | S | S | N |
| 22.50 | N | N | S | S | S | S | S | N | N | N | N | S | S | S | S | S | N |
| 22.75 | N | N | O | S | S | S | S | N | N | N | N | S | S | S | S | S | N |
| 23.00 | N | N | N | S | S | S | S | N | N | N | N | O | S | S | S | S | N |
| 23.25 | N | N | N | S | S | S | S | N | N | N | N | N | S | S | S | S | N |
| 23.50 | N | N | N | S | S | S | S | N | N | N | N | N | S | S | S | S | N |
| 23.75 | N | N | N | S | S | S | S | N | N | N | N | N | S | S | S | S | N |

Page Row 2, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 12.00 | S | S | S | N | N | N | N | S | S | S | S | S | N | N | N | N | S |
| 12.25 | S | S | S | N | N | N | N | O | S | S | S | S | N | N | N | N | S |
| 12.50 | S | S | S | N | N | N | N | N | S | S | S | S | N | N | N | N | O |
| 12.75 | S | S | S | N | N | N | N | N | S | S | S | S | N | N | N | N | N |
| 13.00 | S | S | S | N | N | N | N | N | S | S | S | S | N | N | N | N | N |
| 13.25 | S | S | S | O | N | N | N | N | S | S | S | S | N | N | N | N | N |
| 13.50 | S | S | S | S | N | N | N | N | S | S | S | S | O | N | N | N | N |
| 13.75 | S | S | S | S | N | N | N | N | S | S | S | S | S | N | N | N | N |
| 14.00 | S | S | S | S | N | N | N | N | S | S | S | S | S | N | N | N | N |
| 14.25 | S | S | S | S | N | N | N | N | S | S | S | S | S | N | N | N | N |
| 14.50 | S | S | S | S | N | N | N | N | O | S | S | S | S | N | N | N | N |
| 14.75 | S | S | S | S | N | N | N | N | N | S | S | S | S | N | N | N | N |
| 15.00 | S | S | S | S | N | N | N | N | N | S | S | S | S | N | N | N | N |
| 15.25 | S | S | S | S | N | N | N | N | N | S | S | S | S | N | N | N | N |
| 15.50 | S | S | S | S | O | N | N | N | N | S | S | S | S | N | N | N | N |
| 15.75 | S | S | S | S | S | N | N | N | N | S | S | S | S | O | N | N | N |
| 16.00 | S | S | S | S | S | N | N | N | N | S | S | S | S | S | N | N | N |
| 16.25 | S | S | S | S | S | N | N | N | N | S | S | S | S | S | N | N | N |
| 16.50 | O | S | S | S | S | N | N | N | N | S | S | S | S | S | N | N | N |
| 16.75 | N | S | S | S | S | N | N | N | N | O | S | S | S | S | N | N | N |
| 17.00 | N | S | S | S | S | N | N | N | N | N | S | S | S | S | N | N | N |
| 17.25 | N | S | S | S | S | N | N | N | N | N | S | S | S | S | N | N | N |
| 17.50 | N | S | S | S | S | N | N | N | N | N | S | S | S | S | N | N | N |

-continued

| Coil Excitation | | | | | | | | | | | | | | | | | |
|---|---|---|---|---|---|---|---|---|---|---|---|---|---|---|---|---|---|
| 17.75 | N | S | S | S | S | O | N | N | N | N | S | S | S | S | N | N | N |
| 18.00 | N | S | S | S | S | S | N | N | N | N | S | S | S | S | O | N | N |
| 18.25 | N | S | S | S | S | S | N | N | N | N | S | S | S | S | S | N | N |
| 18.50 | N | S | S | S | S | S | N | N | N | N | S | S | S | S | S | N | N |
| 18.75 | N | O | S | S | S | S | N | N | N | N | S | S | S | S | S | N | N |
| 19.00 | N | N | S | S | S | S | N | N | N | N | O | S | S | S | S | N | N |
| 19.25 | N | N | S | S | S | S | N | N | N | N | N | S | S | S | S | N | N |
| 19.50 | N | N | S | S | S | S | N | N | N | N | N | S | S | S | S | N | N |
| 19.75 | N | N | S | S | S | S | N | N | N | N | N | S | S | S | S | N | N |
| 20.00 | N | N | S | S | S | S | O | N | N | N | N | S | S | S | S | N | N |
| 20.25 | N | N | S | S | S | S | S | N | N | N | N | S | S | S | S | O | N |
| 20.50 | N | N | S | S | S | S | S | N | N | N | N | S | S | S | S | S | N |
| 20.75 | N | N | S | S | S | S | S | N | N | N | N | S | S | S | S | S | N |
| 21.00 | N | N | O | S | S | S | S | N | N | N | N | S | S | S | S | S | N |
| 21.25 | N | N | N | S | S | S | S | N | N | N | N | O | S | S | S | S | N |
| 21.50 | N | N | N | S | S | S | S | N | N | N | N | N | S | S | S | S | N |
| 21.75 | N | N | N | S | S | S | S | N | N | N | N | N | S | S | S | S | N |
| 22.00 | N | N | N | S | S | S | S | N | N | N | N | N | S | S | S | S | N |
| 22.25 | N | N | N | S | S | S | S | O | N | N | N | N | S | S | S | S | N |
| 22.50 | N | N | N | S | S | S | S | S | N | N | N | N | S | S | S | S | O |
| 22.75 | N | N | N | S | S | S | S | S | N | N | N | N | S | S | S | S | S |
| 23.00 | N | N | N | S | S | S | S | S | N | N | N | N | S | S | S | S | S |
| 23.25 | N | N | N | O | S | S | S | S | N | N | N | N | S | S | S | S | S |
| 23.50 | N | N | N | N | S | S | S | S | N | N | N | N | O | S | S | S | S |
| 23.75 | N | N | N | N | S | S | S | S | N | N | N | N | N | S | S | S | S |

Page Row 2, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 12.00 | S | S | S | S | N | N | N | N | S | S | S | S | S | N | N | N | N |
| 12.25 | S | S | S | S | N | N | N | N | S | S | S | S | S | N | N | N | N |
| 12.50 | S | S | S | S | N | N | N | N | S | S | S | S | S | N | N | N | N |
| 12.75 | S | S | S | S | N | N | N | N | O | S | S | S | S | N | N | N | N |
| 13.00 | S | S | S | S | N | N | N | N | N | S | S | S | S | N | N | N | N |
| 13.25 | S | S | S | S | N | N | N | N | N | S | S | S | S | N | N | N | N |
| 13.50 | S | S | S | S | N | N | N | N | N | S | S | S | S | N | N | N | N |
| 13.75 | S | S | S | S | O | N | N | N | N | S | S | S | S | N | N | N | N |
| 14.00 | S | S | S | S | S | N | N | N | N | S | S | S | S | O | N | N | N |
| 14.25 | S | S | S | S | S | N | N | N | N | S | S | S | S | S | N | N | N |
| 14.50 | S | S | S | S | S | N | N | N | N | S | S | S | S | S | N | N | N |
| 14.75 | O | S | S | S | S | N | N | N | N | S | S | S | S | S | N | N | N |
| 15.00 | N | S | S | S | S | N | N | N | N | O | S | S | S | S | N | N | N |
| 15.25 | N | S | S | S | S | N | N | N | N | N | S | S | S | S | N | N | N |
| 15.50 | N | S | S | S | S | N | N | N | N | N | S | S | S | S | N | N | N |
| 15.75 | N | S | S | S | S | N | N | N | N | N | S | S | S | S | N | N | N |
| 16.00 | N | S | S | S | S | O | N | N | N | N | S | S | S | S | N | N | N |
| 16.25 | N | S | S | S | S | S | N | N | N | N | S | S | S | S | O | N | N |
| 16.50 | N | S | S | S | S | S | N | N | N | N | S | S | S | S | S | N | N |
| 16.75 | N | S | S | S | S | S | N | N | N | N | S | S | S | S | S | N | N |
| 17.00 | N | O | S | S | S | S | N | N | N | N | S | S | S | S | S | N | N |
| 17.25 | N | N | S | S | S | S | N | N | N | N | O | S | S | S | S | N | N |
| 17.50 | N | N | S | S | S | S | N | N | N | N | N | S | S | S | S | N | N |
| 17.75 | N | N | S | S | S | S | N | N | N | N | N | S | S | S | S | N | N |
| 18.00 | N | N | S | S | S | S | N | N | N | N | N | S | S | S | S | N | N |
| 18.25 | N | N | S | S | S | S | O | N | N | N | N | S | S | S | S | N | N |
| 18.50 | N | N | S | S | S | S | S | N | N | N | N | S | S | S | S | O | N |
| 18.75 | N | N | S | S | S | S | S | N | N | N | N | S | S | S | S | S | N |
| 19.00 | N | N | S | S | S | S | S | N | N | N | N | S | S | S | S | S | N |
| 19.25 | N | N | O | S | S | S | S | N | N | N | N | S | S | S | S | S | N |
| 19.50 | N | N | N | S | S | S | S | N | N | N | N | O | S | S | S | S | N |
| 19.75 | N | N | N | S | S | S | S | N | N | N | N | N | S | S | S | S | N |
| 20.00 | N | N | N | S | S | S | S | N | N | N | N | N | S | S | S | S | N |
| 20.25 | N | N | N | S | S | S | S | N | N | N | N | N | S | S | S | S | N |
| 20.50 | N | N | N | S | S | S | S | O | N | N | N | N | S | S | S | S | N |
| 20.75 | N | N | N | S | S | S | S | S | N | N | N | N | S | S | S | S | O |
| 21.00 | N | N | N | S | S | S | S | S | N | N | N | N | S | S | S | S | S |
| 21.25 | N | N | N | S | S | S | S | S | N | N | N | N | S | S | S | S | S |
| 21.50 | N | N | N | O | S | S | S | S | N | N | N | N | S | S | S | S | S |
| 21.75 | N | N | N | N | S | S | S | S | N | N | N | N | O | S | S | S | S |
| 22.00 | N | N | N | N | S | S | S | S | N | N | N | N | N | S | S | S | S |
| 22.25 | N | N | N | N | S | S | S | S | N | N | N | N | N | S | S | S | S |
| 22.50 | N | N | N | N | S | S | S | S | N | N | N | N | N | S | S | S | S |
| 22.75 | N | N | N | N | S | S | S | S | O | N | N | N | N | S | S | S | S |
| 23.00 | N | N | N | N | S | S | S | S | S | N | N | N | N | S | S | S | S |
| 23.25 | N | N | N | N | S | S | S | S | S | N | N | N | N | S | S | S | S |

-continued

| Coil Excitation | | | | | | | | | | | | | | | | |
|---|---|---|---|---|---|---|---|---|---|---|---|---|---|---|---|---|
| 23.50 | N | N | N | N | S | S | S | S | S | N | N | N | N | S | S | S | S |
| 23.75 | N | N | N | N | O | S | S | S | S | N | N | N | N | S | S | S | S |

Page Row 2, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 12.00 | S | S | S | S | O | N | N | N | N | S | S | S | S | N | N | N | N |
| 12.25 | S | S | S | S | S | N | N | N | N | S | S | S | S | O | N | N | N |
| 12.50 | S | S | S | S | S | N | N | N | N | S | S | S | S | S | N | N | N |
| 12.75 | S | S | S | S | S | N | N | N | N | S | S | S | S | S | N | N | N |
| 13.00 | O | S | S | S | S | N | N | N | N | S | S | S | S | S | N | N | N |
| 13.25 | N | S | S | S | S | N | N | N | N | O | S | S | S | S | N | N | N |
| 13.50 | N | S | S | S | S | N | N | N | N | N | S | S | S | S | N | N | N |
| 13.75 | N | S | S | S | S | N | N | N | N | N | S | S | S | S | N | N | N |
| 14.00 | N | S | S | S | S | N | N | N | N | N | S | S | S | S | N | N | N |
| 14.25 | N | S | S | S | S | O | N | N | N | N | S | S | S | S | N | N | N |
| 14.50 | N | S | S | S | S | S | N | N | N | N | S | S | S | S | O | N | N |
| 14.75 | N | S | S | S | S | S | N | N | N | N | S | S | S | S | S | N | N |
| 15.00 | N | S | S | S | S | S | N | N | N | N | S | S | S | S | S | N | N |
| 15.25 | N | O | S | S | S | S | N | N | N | N | S | S | S | S | S | N | N |
| 15.50 | N | N | S | S | S | S | N | N | N | N | O | S | S | S | S | N | N |
| 15.75 | N | N | S | S | S | S | N | N | N | N | N | S | S | S | S | N | N |
| 16.00 | N | N | S | S | S | S | N | N | N | N | N | S | S | S | S | N | N |
| 16.25 | N | N | S | S | S | S | N | N | N | N | N | S | S | S | S | N | N |
| 16.50 | N | N | S | S | S | S | O | N | N | N | N | S | S | S | S | N | N |
| 16.75 | N | N | S | S | S | S | S | N | N | N | N | S | S | S | S | O | N |
| 17.00 | N | N | S | S | S | S | S | N | N | N | N | S | S | S | S | S | N |
| 17.25 | N | N | S | S | S | S | S | N | N | N | N | S | S | S | S | S | N |
| 17.50 | N | N | O | S | S | S | S | N | N | N | N | S | S | S | S | S | N |
| 17.75 | N | N | N | S | S | S | S | N | N | N | N | O | S | S | S | S | N |
| 18.00 | N | N | N | S | S | S | S | N | N | N | N | N | S | S | S | S | N |
| 18.25 | N | N | N | S | S | S | S | N | N | N | N | N | S | S | S | S | N |
| 18.50 | N | N | N | S | S | S | S | N | N | N | N | N | S | S | S | S | N |
| 18.75 | N | N | N | S | S | S | S | O | N | N | N | N | S | S | S | S | N |
| 19.00 | N | N | N | S | S | S | S | S | N | N | N | N | S | S | S | S | O |
| 19.25 | N | N | N | S | S | S | S | S | N | N | N | N | S | S | S | S | S |
| 19.50 | N | N | N | S | S | S | S | S | N | N | N | N | S | S | S | S | S |
| 19.75 | N | N | N | O | S | S | S | S | N | N | N | N | S | S | S | S | S |
| 20.00 | N | N | N | N | S | S | S | S | N | N | N | N | O | S | S | S | S |
| 20.25 | N | N | N | N | S | S | S | S | N | N | N | N | N | S | S | S | S |
| 20.50 | N | N | N | N | S | S | S | S | N | N | N | N | N | S | S | S | S |
| 20.75 | N | N | N | N | S | S | S | S | N | N | N | N | N | S | S | S | S |
| 21.00 | N | N | N | N | S | S | S | S | O | N | N | N | N | S | S | S | S |
| 21.25 | N | N | N | N | S | S | S | S | S | N | N | N | N | S | S | S | S |
| 21.50 | N | N | N | N | S | S | S | S | S | N | N | N | N | S | S | S | S |
| 21.75 | N | N | N | N | S | S | S | S | S | N | N | N | N | S | S | S | S |
| 22.00 | N | N | N | N | O | S | S | S | S | N | N | N | N | S | S | S | S |
| 22.25 | N | N | N | N | N | S | S | S | S | N | N | N | N | O | S | S | S |
| 22.50 | N | N | N | N | N | S | S | S | S | N | N | N | N | N | S | S | S |
| 22.75 | N | N | N | N | N | S | S | S | S | N | N | N | N | N | S | S | S |
| 23.00 | O | N | N | N | N | S | S | S | S | N | N | N | N | N | S | S | S |
| 23.25 | S | N | N | N | N | S | S | S | S | O | N | N | N | N | S | S | S |
| 23.50 | S | N | N | N | N | S | S | S | S | S | N | N | N | N | S | S | S |
| 23.75 | S | N | N | N | N | S | S | S | S | S | N | N | N | N | S | S | S |

Page Row 2, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 12.00 | N | S | S | S | S | N | N | N | N | N | S | S | S | S | N | N | N |
| 12.25 | N | S | S | S | S | N | N | N | N | N | S | S | S | S | N | N | N |
| 12.50 | N | S | S | S | S | O | N | N | N | N | S | S | S | S | N | N | N |
| 12.75 | N | S | S | S | S | S | N | N | N | N | S | S | S | S | O | N | N |
| 13.00 | N | S | S | S | S | S | N | N | N | N | S | S | S | S | S | N | N |
| 13.25 | N | S | S | S | S | S | N | N | N | N | S | S | S | S | S | N | N |
| 13.50 | N | O | S | S | S | S | N | N | N | N | S | S | S | S | S | N | N |
| 13.75 | N | N | S | S | S | S | N | N | N | N | O | S | S | S | S | N | N |
| 14.00 | N | N | S | S | S | S | N | N | N | N | N | S | S | S | S | N | N |
| 14.25 | N | N | S | S | S | S | N | N | N | N | N | S | S | S | S | N | N |
| 14.50 | N | N | S | S | S | S | N | N | N | N | N | S | S | S | S | N | N |
| 14.75 | N | N | S | S | S | S | O | N | N | N | N | S | S | S | S | N | N |
| 15.00 | N | N | S | S | S | S | S | N | N | N | N | S | S | S | S | O | N |
| 15.25 | N | N | S | S | S | S | S | N | N | N | N | S | S | S | S | S | N |
| 15.50 | N | N | S | S | S | S | S | N | N | N | N | S | S | S | S | S | N |
| 15.75 | N | N | O | S | S | S | S | N | N | N | N | S | S | S | S | S | N |
| 16.00 | N | N | N | S | S | S | S | N | N | N | N | O | S | S | S | S | N |
| 16.25 | N | N | N | S | S | S | S | N | N | N | N | N | S | S | S | S | N |
| 16.50 | N | N | N | S | S | S | S | N | N | N | N | N | S | S | S | S | N |

-continued

| Coil Excitation | | | | | | | | | | | | | | | | | |
|---|---|---|---|---|---|---|---|---|---|---|---|---|---|---|---|---|---|
| 16.75 | N | N | N | S | S | S | S | N | N | N | N | N | S | S | S | S | N |
| 17.00 | N | N | N | S | S | S | S | O | N | N | N | N | S | S | S | S | N |
| 17.25 | N | N | N | S | S | S | S | S | N | N | N | N | S | S | S | S | O |
| 17.50 | N | N | N | S | S | S | S | S | N | N | N | N | S | S | S | S | S |
| 17.75 | N | N | N | S | S | S | S | S | N | N | N | N | S | S | S | S | S |
| 18.00 | N | N | N | O | S | S | S | S | N | N | N | N | S | S | S | S | S |
| 18.25 | N | N | N | N | S | S | S | S | N | N | N | N | O | S | S | S | S |
| 18.50 | N | N | N | N | S | S | S | S | N | N | N | N | N | S | S | S | S |
| 18.75 | N | N | N | N | S | S | S | S | N | N | N | N | N | S | S | S | S |
| 19.00 | N | N | N | N | S | S | S | S | N | N | N | N | N | S | S | S | S |
| 19.25 | N | N | N | N | S | S | S | S | O | N | N | N | N | S | S | S | S |
| 19.50 | N | N | N | N | S | S | S | S | S | N | N | N | N | S | S | S | S |
| 19.75 | N | N | N | N | S | S | S | S | S | N | N | N | N | S | S | S | S |
| 20.00 | N | N | N | N | S | S | S | S | S | N | N | N | N | S | S | S | S |
| 20.25 | N | N | N | N | O | S | S | S | S | N | N | N | N | S | S | S | S |
| 20.50 | N | N | N | N | N | S | S | S | S | N | N | N | N | O | S | S | S |
| 20.75 | N | N | N | N | N | S | S | S | S | N | N | N | N | N | S | S | S |
| 21.00 | N | N | N | N | N | S | S | S | S | N | N | N | N | N | S | S | S |
| 21.25 | O | N | N | N | N | S | S | S | S | N | N | N | N | N | S | S | S |
| 21.50 | S | N | N | N | N | S | S | S | S | O | N | N | N | N | S | S | S |
| 21.75 | S | N | N | N | N | S | S | S | S | S | N | N | N | N | S | S | S |
| 22.00 | S | N | N | N | N | S | S | S | S | S | N | N | N | N | S | S | S |
| 22.25 | S | N | N | N | N | S | S | S | S | S | N | N | N | N | S | S | S |
| 22.50 | S | N | N | N | N | O | S | S | S | S | N | N | N | N | S | S | S |
| 22.75 | S | N | N | N | N | N | S | S | S | S | N | N | N | N | O | S | S |
| 23.00 | S | N | N | N | N | N | S | S | S | S | N | N | N | N | N | S | S |
| 23.25 | S | N | N | N | N | N | S | S | S | S | N | N | N | N | N | S | S |
| 23.50 | S | O | N | N | N | N | S | S | S | S | N | N | N | N | N | S | S |
| 23.75 | S | S | N | N | N | N | S | S | S | S | O | N | N | N | N | S | S |

Page Row 2, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 12.00 | N | N | S | S | S | S | N | N | N | N | O | S | S | S | S | N | N |
| 12.25 | N | N | S | S | S | S | N | N | N | N | N | S | S | S | S | N | N |
| 12.50 | N | N | S | S | S | S | N | N | N | N | N | S | S | S | S | N | N |
| 12.75 | N | N | S | S | S | S | N | N | N | N | N | S | S | S | S | N | N |
| 13.00 | N | N | S | S | S | S | O | N | N | N | N | S | S | S | S | N | N |
| 13.25 | N | N | S | S | S | S | S | N | N | N | N | S | S | S | S | O | N |
| 13.50 | N | N | S | S | S | S | S | N | N | N | N | S | S | S | S | S | N |
| 13.75 | N | N | S | S | S | S | S | N | N | N | N | S | S | S | S | S | N |
| 14.00 | N | N | O | S | S | S | S | N | N | N | N | S | S | S | S | S | N |
| 14.25 | N | N | N | S | S | S | S | N | N | N | N | O | S | S | S | S | N |
| 14.50 | N | N | N | S | S | S | S | N | N | N | N | N | S | S | S | S | N |
| 14.75 | N | N | N | S | S | S | S | N | N | N | N | N | S | S | S | S | N |
| 15.00 | N | N | N | S | S | S | S | N | N | N | N | N | S | S | S | S | N |
| 15.25 | N | N | N | S | S | S | S | O | N | N | N | N | S | S | S | S | N |
| 15.50 | N | N | N | S | S | S | S | S | N | N | N | N | S | S | S | S | O |
| 15.75 | N | N | N | S | S | S | S | S | N | N | N | N | S | S | S | S | S |
| 16.00 | N | N | N | S | S | S | S | S | N | N | N | N | S | S | S | S | S |
| 16.25 | N | N | N | O | S | S | S | S | N | N | N | N | S | S | S | S | S |
| 16.50 | N | N | N | N | S | S | S | S | N | N | N | N | O | S | S | S | S |
| 16.75 | N | N | N | N | S | S | S | S | N | N | N | N | N | S | S | S | S |
| 17.00 | N | N | N | N | S | S | S | S | N | N | N | N | N | S | S | S | S |
| 17.25 | N | N | N | N | S | S | S | S | N | N | N | N | N | S | S | S | S |
| 17.50 | N | N | N | N | S | S | S | S | O | N | N | N | N | S | S | S | S |
| 17.75 | N | N | N | N | S | S | S | S | S | N | N | N | N | S | S | S | S |
| 18.00 | N | N | N | N | S | S | S | S | S | N | N | N | N | S | S | S | S |
| 18.25 | N | N | N | N | S | S | S | S | S | N | N | N | N | S | S | S | S |
| 18.50 | N | N | N | N | O | S | S | S | S | N | N | N | N | S | S | S | S |
| 18.75 | N | N | N | N | N | S | S | S | S | N | N | N | N | O | S | S | S |
| 19.00 | N | N | N | N | N | S | S | S | S | N | N | N | N | N | S | S | S |
| 19.25 | N | N | N | N | N | S | S | S | S | N | N | N | N | N | S | S | S |
| 19.50 | O | N | N | N | N | S | S | S | S | N | N | N | N | N | S | S | S |
| 19.75 | S | N | N | N | N | S | S | S | S | O | N | N | N | N | S | S | S |
| 20.00 | S | N | N | N | N | S | S | S | S | S | N | N | N | N | S | S | S |
| 20.25 | S | N | N | N | N | S | S | S | S | S | N | N | N | N | S | S | S |
| 20.50 | S | N | N | N | N | S | S | S | S | S | N | N | N | N | S | S | S |
| 20.75 | S | N | N | N | N | O | S | S | S | S | N | N | N | N | S | S | S |
| 21.00 | S | N | N | N | N | N | S | S | S | S | N | N | N | N | O | S | S |
| 21.25 | S | N | N | N | N | N | S | S | S | S | N | N | N | N | N | S | S |
| 21.50 | S | N | N | N | N | N | S | S | S | S | N | N | N | N | N | S | S |
| 21.75 | S | O | N | N | N | N | S | S | S | S | N | N | N | N | N | S | S |
| 22.00 | S | S | N | N | N | N | S | S | S | S | O | N | N | N | N | S | S |
| 22.25 | S | S | N | N | N | N | S | S | S | S | S | N | N | N | N | S | S |
| 22.50 | S | S | N | N | N | N | S | S | S | S | S | N | N | N | N | S | S |
| 22.75 | S | S | N | N | N | N | S | S | S | S | S | N | N | N | N | S | S |

-continued

| Coil Excitation | | | | | | | | | | | | | | | | | 
|---|---|---|---|---|---|---|---|---|---|---|---|---|---|---|---|---|
| 23.00 | S | S | N | N | N | N | O | S | S | S | S | N | N | N | N | S | S |
| 23.25 | S | S | N | N | N | N | N | S | S | S | S | N | N | N | N | O | S |
| 23.50 | S | S | N | N | N | N | N | S | S | S | S | N | N | N | N | N | S |
| 23.75 | S | S | N | N | N | N | N | S | S | S | S | N | N | N | N | N | S |

Page Row 2, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 12.00 | N | N | S | S | S | S | S | N | N | N | N | S | S | S | S | S | N |
| 12.25 | N | N | O | S | S | S | S | N | N | N | N | S | S | S | S | S | N |
| 12.50 | N | N | N | S | S | S | S | N | N | N | N | O | S | S | S | S | N |
| 12.75 | N | N | N | S | S | S | S | N | N | N | N | N | S | S | S | S | N |
| 13.00 | N | N | N | S | S | S | S | N | N | N | N | N | S | S | S | S | N |
| 13.25 | N | N | N | S | S | S | S | N | N | N | N | N | S | S | S | S | N |
| 13.50 | N | N | N | S | S | S | S | O | N | N | N | N | S | S | S | S | N |
| 13.75 | N | N | N | S | S | S | S | S | N | N | N | N | S | S | S | S | O |
| 14.00 | N | N | N | S | S | S | S | S | N | N | N | N | S | S | S | S | S |
| 14.25 | N | N | N | S | S | S | S | S | N | N | N | N | S | S | S | S | S |
| 14.50 | N | N | N | O | S | S | S | S | N | N | N | N | S | S | S | S | S |
| 14.75 | N | N | N | N | S | S | S | S | N | N | N | N | O | S | S | S | S |
| 15.00 | N | N | N | N | S | S | S | S | N | N | N | N | N | S | S | S | S |
| 15.25 | N | N | N | N | S | S | S | S | N | N | N | N | N | S | S | S | S |
| 15.50 | N | N | N | N | S | S | S | S | N | N | N | N | N | S | S | S | S |
| 15.75 | N | N | N | N | S | S | S | S | O | N | N | N | N | S | S | S | S |
| 16.00 | N | N | N | N | S | S | S | S | S | N | N | N | N | S | S | S | S |
| 16.25 | N | N | N | N | S | S | S | S | S | N | N | N | N | S | S | S | S |
| 16.50 | N | N | N | N | S | S | S | S | S | N | N | N | N | S | S | S | S |
| 16.75 | N | N | N | N | O | S | S | S | S | N | N | N | N | S | S | S | S |
| 17.00 | N | N | N | N | N | S | S | S | S | N | N | N | N | O | S | S | S |
| 17.25 | N | N | N | N | N | S | S | S | S | N | N | N | N | N | S | S | S |
| 17.50 | N | N | N | N | N | S | S | S | S | N | N | N | N | N | S | S | S |
| 17.75 | O | N | N | N | N | S | S | S | S | N | N | N | N | N | S | S | S |
| 18.00 | S | N | N | N | N | S | S | S | S | O | N | N | N | N | S | S | S |
| 18.25 | S | N | N | N | N | S | S | S | S | S | N | N | N | N | S | S | S |
| 18.50 | S | N | N | N | N | S | S | S | S | S | N | N | N | N | S | S | S |
| 18.75 | S | N | N | N | N | S | S | S | S | S | N | N | N | N | S | S | S |
| 19.00 | S | N | N | N | N | O | S | S | S | S | N | N | N | N | S | S | S |
| 19.25 | S | N | N | N | N | N | S | S | S | S | N | N | N | N | O | S | S |
| 19.50 | S | N | N | N | N | N | S | S | S | S | N | N | N | N | N | S | S |
| 19.75 | S | N | N | N | N | N | S | S | S | S | N | N | N | N | N | S | S |
| 20.00 | S | O | N | N | N | N | S | S | S | S | N | N | N | N | N | S | S |
| 20.25 | S | S | N | N | N | N | S | S | S | S | O | N | N | N | N | S | S |
| 20.50 | S | S | N | N | N | N | S | S | S | S | S | N | N | N | N | S | S |
| 20.75 | S | S | N | N | N | N | S | S | S | S | S | N | N | N | N | S | S |
| 21.00 | S | S | N | N | N | N | S | S | S | S | S | N | N | N | N | S | S |
| 21.25 | S | S | N | N | N | N | O | S | S | S | S | N | N | N | N | S | S |
| 21.50 | S | S | N | N | N | N | N | S | S | S | S | N | N | N | N | O | S |
| 21.75 | S | S | N | N | N | N | N | S | S | S | S | N | N | N | N | N | S |
| 22.00 | S | S | N | N | N | N | N | S | S | S | S | N | N | N | N | N | S |
| 22.25 | S | S | O | N | N | N | N | S | S | S | S | N | N | N | N | N | S |
| 22.50 | S | S | S | N | N | N | N | S | S | S | S | O | N | N | N | N | S |
| 22.75 | S | S | S | N | N | N | N | S | S | S | S | S | N | N | N | N | S |
| 23.00 | S | S | S | N | N | N | N | S | S | S | S | S | N | N | N | N | S |
| 23.25 | S | S | S | N | N | N | N | S | S | S | S | S | N | N | N | N | S |
| 23.50 | S | S | S | N | N | N | N | O | S | S | S | S | N | N | N | N | S |
| 23.75 | S | S | S | N | N | N | N | N | S | S | S | S | N | N | N | N | O |

Page Row 2, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 12.00 | N | N | N | S | S | S | S | S | N | N | N | N | S | S | S | S | O |
| 12.25 | N | N | N | S | S | S | S | S | N | N | N | N | S | S | S | S | S |
| 12.50 | N | N | N | S | S | S | S | S | N | N | N | N | S | S | S | S | S |
| 12.75 | N | N | N | O | S | S | S | S | N | N | N | N | S | S | S | S | S |
| 13.00 | N | N | N | N | S | S | S | S | N | N | N | N | O | S | S | S | S |
| 13.25 | N | N | N | N | S | S | S | S | N | N | N | N | N | S | S | S | S |
| 13.50 | N | N | N | N | S | S | S | S | N | N | N | N | N | S | S | S | S |
| 13.75 | N | N | N | N | S | S | S | S | N | N | N | N | N | S | S | S | S |
| 14.00 | N | N | N | N | S | S | S | S | O | N | N | N | N | S | S | S | S |
| 14.25 | N | N | N | N | S | S | S | S | S | N | N | N | N | S | S | S | S |
| 14.50 | N | N | N | N | S | S | S | S | S | N | N | N | N | S | S | S | S |
| 14.75 | N | N | N | N | S | S | S | S | S | N | N | N | N | S | S | S | S |
| 15.00 | N | N | N | N | O | S | S | S | S | N | N | N | N | S | S | S | S |
| 15.25 | N | N | N | N | N | S | S | S | S | N | N | N | N | O | S | S | S |
| 15.50 | N | N | N | N | N | S | S | S | S | N | N | N | N | N | S | S | S |
| 15.75 | N | N | N | N | N | S | S | S | S | N | N | N | N | N | S | S | S |
| 16.00 | O | N | N | N | N | S | S | S | S | N | N | N | N | N | S | S | S |

-continued

| Coil Excitation | | | | | | | | | | | | | | | | | |
|---|---|---|---|---|---|---|---|---|---|---|---|---|---|---|---|---|---|
| 16.25 | S | N | N | N | N | S | S | S | S | O | N | N | N | N | S | S | S |
| 16.50 | S | N | N | N | N | S | S | S | S | S | N | N | N | N | S | S | S |
| 16.75 | S | N | N | N | N | S | S | S | S | S | N | N | N | N | S | S | S |
| 17.00 | S | N | N | N | N | S | S | S | S | S | N | N | N | N | S | S | S |
| 17.25 | S | N | N | N | N | O | S | S | S | S | N | N | N | N | S | S | S |
| 17.50 | S | N | N | N | N | N | S | S | S | S | N | N | N | N | O | S | S |
| 17.75 | S | N | N | N | N | N | S | S | S | S | N | N | N | N | N | S | S |
| 18.00 | S | N | N | N | N | N | S | S | S | S | N | N | N | N | N | S | S |
| 18.25 | S | O | N | N | N | N | S | S | S | S | N | N | N | N | N | S | S |
| 18.50 | S | S | N | N | N | N | S | S | S | S | O | N | N | N | N | S | S |
| 18.75 | S | S | N | N | N | N | S | S | S | S | S | N | N | N | N | S | S |
| 19.00 | S | S | N | N | N | N | S | S | S | S | S | N | N | N | N | S | S |
| 19.25 | S | S | N | N | N | N | S | S | S | S | S | N | N | N | N | S | S |
| 19.50 | S | S | N | N | N | N | O | S | S | S | S | N | N | N | N | S | S |
| 19.75 | S | S | N | N | N | N | N | S | S | S | S | N | N | N | N | O | S |
| 20.00 | S | S | N | N | N | N | N | S | S | S | S | N | N | N | N | N | S |
| 20.25 | S | S | N | N | N | N | N | S | S | S | S | N | N | N | N | N | S |
| 20.50 | S | S | O | N | N | N | N | S | S | S | S | N | N | N | N | N | S |
| 20.75 | S | S | S | N | N | N | N | S | S | S | S | O | N | N | N | N | S |
| 21.00 | S | S | S | N | N | N | N | S | S | S | S | S | N | N | N | N | S |
| 21.25 | S | S | S | N | N | N | N | S | S | S | S | S | N | N | N | N | S |
| 21.50 | S | S | S | N | N | N | N | S | S | S | S | S | N | N | N | N | S |
| 21.75 | S | S | S | N | N | N | N | O | S | S | S | S | N | N | N | N | S |
| 22.00 | S | S | S | N | N | N | N | N | S | S | S | S | N | N | N | N | O |
| 22.25 | S | S | S | N | N | N | N | N | S | S | S | S | N | N | N | N | N |
| 22.50 | S | S | S | N | N | N | N | N | S | S | S | S | N | N | N | N | N |
| 22.75 | S | S | S | O | N | N | N | N | S | S | S | S | N | N | N | N | N |
| 23.00 | S | S | S | S | N | N | N | N | S | S | S | S | O | N | N | N | N |
| 23.25 | S | S | S | S | N | N | N | N | S | S | S | S | S | N | N | N | N |
| 23.50 | S | S | S | S | N | N | N | N | S | S | S | S | S | N | N | N | N |
| 23.75 | S | S | S | S | N | N | N | N | S | S | S | S | S | N | N | N | N |

Page Row 2, Page Column 9

| Coil | 154 | 155 | 156 | 157 | 158 | 159 | 160 |
|---|---|---|---|---|---|---|---|
| 12.00 | N | N | N | N | S | S | S |
| 12.25 | N | N | N | N | S | S | S |
| 12.50 | N | N | N | N | S | S | S |
| 12.75 | N | N | N | N | S | S | S |
| 13.00 | N | N | N | N | S | S | S |
| 13.25 | N | N | N | N | O | S | S |
| 13.50 | N | N | N | N | N | S | S |
| 13.75 | N | N | N | N | N | S | S |
| 14.00 | N | N | N | N | N | S | S |
| 14.25 | O | N | N | N | N | S | S |
| 14.50 | S | N | N | N | N | S | S |
| 14.75 | S | N | N | N | N | S | S |
| 15.00 | S | N | N | N | N | S | S |
| 15.25 | S | N | N | N | N | S | S |
| 15.50 | S | N | N | N | N | O | S |
| 15.75 | S | N | N | N | N | N | S |
| 16.00 | S | N | N | N | N | N | S |
| 16.25 | S | N | N | N | N | N | S |
| 16.50 | S | O | N | N | N | N | S |
| 16.75 | S | S | N | N | N | N | S |
| 17.00 | S | S | N | N | N | N | S |
| 17.25 | S | S | N | N | N | N | S |
| 17.50 | S | S | N | N | N | N | S |
| 17.75 | S | S | N | N | N | N | O |
| 18.00 | S | S | N | N | N | N | N |
| 18.25 | S | S | N | N | N | N | N |
| 18.50 | S | S | N | N | N | N | N |
| 18.75 | S | S | O | N | N | N | N |
| 19.00 | S | S | S | N | N | N | N |
| 19.25 | S | S | S | N | N | N | N |
| 19.50 | S | S | S | N | N | N | N |
| 19.75 | S | S | S | N | N | N | N |
| 20.00 | S | S | S | N | N | N | N |
| 20.25 | S | S | S | N | N | N | N |
| 20.50 | S | S | S | N | N | N | N |
| 20.75 | S | S | S | N | N | N | N |
| 21.00 | S | S | S | O | N | N | N |
| 21.25 | S | S | S | S | N | N | N |
| 21.50 | S | S | S | S | N | N | N |
| 21.75 | S | S | S | S | N | N | N |
| 22.00 | S | S | S | S | N | N | N |
| 22.25 | S | S | S | S | N | N | N |

-continued

Coil Excitation

| | | | | | | | | | | | | | | | | | |
|---|---|---|---|---|---|---|---|---|---|---|---|---|---|---|---|---|---|
| 22.50 | S | S | S | S | N | N | N | | | | | | | | | | |
| 22.75 | S | S | S | S | N | N | N | | | | | | | | | | |
| 23.00 | S | S | S | S | N | N | N | | | | | | | | | | |
| 23.25 | S | S | S | S | O | N | N | | | | | | | | | | |
| 23.50 | S | S | S | S | S | N | N | | | | | | | | | | |
| 23.75 | S | S | S | S | S | N | N | | | | | | | | | | |

Page Row 2, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 24.00 | N | N | S | S | S | S | S | N | N | N | N | S | S | S | S | S | N |
| 24.25 | N | N | S | S | S | S | S | N | N | N | N | S | S | S | S | S | N |
| 24.50 | N | N | O | S | S | S | S | N | N | N | N | S | S | S | S | S | N |
| 24.75 | N | N | N | S | S | S | S | N | N | N | N | O | S | S | S | S | N |
| 25.00 | N | N | N | S | S | S | S | N | N | N | N | N | S | S | S | S | N |
| 25.25 | N | N | N | S | S | S | S | N | N | N | N | N | S | S | S | S | N |
| 25.50 | N | N | N | S | S | S | S | N | N | N | N | N | S | S | S | S | N |
| 25.75 | N | N | N | S | S | S | S | O | N | N | N | N | S | S | S | S | N |
| 26.00 | N | N | N | S | S | S | S | S | N | N | N | N | S | S | S | S | O |
| 26.25 | N | N | N | S | S | S | S | S | N | N | N | N | S | S | S | S | S |
| 26.50 | N | N | N | S | S | S | S | S | N | N | N | N | S | S | S | S | S |
| 26.75 | N | N | N | O | S | S | S | S | N | N | N | N | S | S | S | S | S |
| 27.00 | N | N | N | N | S | S | S | S | N | N | N | N | O | S | S | S | S |
| 27.25 | N | N | N | N | S | S | S | S | N | N | N | N | N | S | S | S | S |
| 27.50 | N | N | N | N | S | S | S | S | N | N | N | N | N | S | S | S | S |
| 27.75 | N | N | N | N | S | S | S | S | N | N | N | N | N | S | S | S | S |
| 28.00 | N | N | N | N | S | S | S | S | O | N | N | N | N | S | S | S | S |
| 28.25 | N | N | N | N | S | S | S | S | S | N | N | N | N | S | S | S | S |
| 28.50 | N | N | N | N | S | S | S | S | S | N | N | N | N | S | S | S | S |
| 28.75 | N | N | N | N | S | S | S | S | S | N | N | N | N | S | S | S | S |
| 29.00 | N | N | N | N | O | S | S | S | S | N | N | N | N | S | S | S | S |
| 29.25 | N | N | N | N | N | S | S | S | S | N | N | N | N | O | S | S | S |
| 29.50 | N | N | N | N | N | S | S | S | S | N | N | N | N | N | S | S | S |
| 29.75 | N | N | N | N | N | S | S | S | S | N | N | N | N | N | S | S | S |
| 30.00 | O | N | N | N | N | S | S | S | S | N | N | N | N | N | S | S | S |
| 30.25 | S | N | N | N | N | S | S | S | S | O | N | N | N | N | S | S | S |
| 30.50 | S | N | N | N | N | S | S | S | S | S | N | N | N | N | S | S | S |
| 30.75 | S | N | N | N | N | S | S | S | S | S | N | N | N | N | S | S | S |
| 31.00 | S | N | N | N | N | S | S | S | S | S | N | N | N | N | S | S | S |
| 31.25 | S | N | N | N | N | O | S | S | S | S | N | N | N | N | S | S | S |
| 31.50 | S | N | N | N | N | N | S | S | S | S | N | N | N | N | O | S | S |
| 31.75 | S | N | N | N | N | N | S | S | S | S | N | N | N | N | N | S | S |
| 32.00 | S | N | N | N | N | N | S | S | S | S | N | N | N | N | N | S | S |
| 32.25 | S | O | N | N | N | N | S | S | S | S | N | N | N | N | N | S | S |
| 32.50 | S | S | N | N | N | N | S | S | S | S | O | N | N | N | N | S | S |
| 32.75 | S | S | N | N | N | N | S | S | S | S | S | N | N | N | N | S | S |
| 33.00 | S | S | N | N | N | N | S | S | S | S | S | N | N | N | N | S | S |
| 33.25 | S | S | N | N | N | N | S | S | S | S | S | N | N | N | N | S | S |
| 33.50 | S | S | N | N | N | N | O | S | S | S | S | N | N | N | N | S | S |
| 33.75 | S | S | N | N | N | N | N | S | S | S | S | N | N | N | N | O | S |
| 34.00 | S | S | N | N | N | N | N | S | S | S | S | N | N | N | N | N | S |
| 34.25 | S | S | N | N | N | N | N | S | S | S | S | N | N | N | N | N | S |
| 34.50 | S | S | O | N | N | N | N | S | S | S | S | N | N | N | N | N | S |
| 34.75 | S | S | S | N | N | N | N | S | S | S | S | O | N | N | N | N | S |
| 35.00 | S | S | S | N | N | N | N | S | S | S | S | S | N | N | N | N | S |
| 35.25 | S | S | S | N | N | N | N | S | S | S | S | S | N | N | N | N | S |
| 35.50 | S | S | S | N | N | N | N | S | S | S | S | S | N | N | N | N | S |
| 35.75 | S | S | S | N | N | N | N | O | S | S | S | S | N | N | N | N | S |

Page Row 3, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 24.00 | N | N | N | S | S | S | S | O | N | N | N | N | S | S | S | S | N |
| 24.25 | N | N | N | S | S | S | S | S | N | N | N | N | S | S | S | S | O |
| 24.50 | N | N | N | S | S | S | S | S | N | N | N | N | S | S | S | S | S |
| 24.75 | N | N | N | S | S | S | S | S | N | N | N | N | S | S | S | S | S |
| 25.00 | N | N | N | O | S | S | S | S | N | N | N | N | S | S | S | S | S |
| 25.25 | N | N | N | N | S | S | S | S | N | N | N | N | O | S | S | S | S |
| 25.50 | N | N | N | N | S | S | S | S | N | N | N | N | N | S | S | S | S |
| 25.75 | N | N | N | N | S | S | S | S | N | N | N | N | N | S | S | S | S |
| 26.00 | N | N | N | N | S | S | S | S | N | N | N | N | N | S | S | S | S |
| 26.25 | N | N | N | N | S | S | S | S | O | N | N | N | N | S | S | S | S |
| 26.50 | N | N | N | N | S | S | S | S | S | N | N | N | N | S | S | S | S |
| 26.75 | N | N | N | N | S | S | S | S | S | N | N | N | N | S | S | S | S |
| 27.00 | N | N | N | N | S | S | S | S | S | N | N | N | N | S | S | S | S |
| 27.25 | N | N | N | N | O | S | S | S | S | N | N | N | N | S | S | S | S |
| 27.50 | N | N | N | N | N | S | S | S | S | N | N | N | N | O | S | S | S |

-continued

Coil Excitation

| | | | | | | | | | | | | | | | | | |
|---|---|---|---|---|---|---|---|---|---|---|---|---|---|---|---|---|---|
| 27.75 | N | N | N | N | N | S | S | S | S | N | N | N | N | N | S | S | S |
| 28.00 | N | N | N | N | N | S | S | S | S | N | N | N | N | N | S | S | S |
| 28.25 | O | N | N | N | N | S | S | S | S | N | N | N | N | N | S | S | S |
| 28.50 | S | N | N | N | N | S | S | S | S | O | N | N | N | N | S | S | S |
| 28.75 | S | N | N | N | N | S | S | S | S | S | N | N | N | N | S | S | S |
| 29.00 | S | N | N | N | N | S | S | S | S | S | N | N | N | N | S | S | S |
| 29.25 | S | N | N | N | N | S | S | S | S | S | N | N | N | N | S | S | S |
| 29.50 | S | N | N | N | N | O | S | S | S | S | N | N | N | N | S | S | S |
| 29.75 | S | N | N | N | N | N | S | S | S | S | N | N | N | N | O | S | S |
| 30.00 | S | N | N | N | N | N | S | S | S | S | N | N | N | N | N | S | S |
| 30.25 | S | N | N | N | N | N | S | S | S | S | N | N | N | N | N | S | S |
| 30.50 | S | O | N | N | N | N | S | S | S | S | N | N | N | N | N | S | S |
| 30.75 | S | S | N | N | N | N | S | S | S | S | O | N | N | N | N | S | S |
| 31.00 | S | S | N | N | N | N | S | S | S | S | S | N | N | N | N | S | S |
| 31.25 | S | S | N | N | N | N | S | S | S | S | S | N | N | N | N | S | S |
| 31.50 | S | S | N | N | N | N | S | S | S | S | S | N | N | N | N | S | S |
| 31.75 | S | S | N | N | N | N | O | S | S | S | S | N | N | N | N | S | S |
| 32.00 | S | S | N | N | N | N | N | S | S | S | S | N | N | N | N | O | S |
| 32.25 | S | S | N | N | N | N | N | S | S | S | S | N | N | N | N | N | S |
| 32.50 | S | S | N | N | N | N | N | S | S | S | S | N | N | N | N | N | S |
| 32.75 | S | S | O | N | N | N | N | S | S | S | S | N | N | N | N | N | S |
| 33.00 | S | S | S | N | N | N | N | S | S | S | S | O | N | N | N | N | S |
| 33.25 | S | S | S | N | N | N | N | S | S | S | S | S | N | N | N | N | S |
| 33.50 | S | S | S | N | N | N | N | S | S | S | S | S | N | N | N | N | S |
| 33.75 | S | S | S | N | N | N | N | S | S | S | S | S | N | N | N | N | S |
| 34.00 | S | S | S | N | N | N | N | O | S | S | S | S | N | N | N | N | S |
| 34.25 | S | S | S | N | N | N | N | N | S | S | S | S | N | N | N | N | O |
| 34.50 | S | S | S | N | N | N | N | N | S | S | S | S | N | N | N | N | N |
| 34.75 | S | S | S | N | N | N | N | N | S | S | S | S | N | N | N | N | N |
| 35.00 | S | S | S | O | N | N | N | N | S | S | S | S | N | N | N | N | N |
| 35.25 | S | S | S | S | N | N | N | N | S | S | S | S | O | N | N | N | N |
| 35.50 | S | S | S | S | N | N | N | N | S | S | S | S | S | N | N | N | N |
| 35.75 | S | S | S | S | N | N | N | N | S | S | S | S | S | N | N | N | N |

Page Row 3, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 24.00 | N | N | N | N | S | S | S | S | N | N | N | N | N | S | S | S | S |
| 24.25 | N | N | N | N | S | S | S | S | N | N | N | N | N | S | S | S | S |
| 24.50 | N | N | N | N | S | S | S | S | O | N | N | N | N | S | S | S | S |
| 24.75 | N | N | N | N | S | S | S | S | S | N | N | N | N | S | S | S | S |
| 25.00 | N | N | N | N | S | S | S | S | S | N | N | N | N | S | S | S | S |
| 25.25 | N | N | N | N | S | S | S | S | S | N | N | N | N | S | S | S | S |
| 25.50 | N | N | N | N | O | S | S | S | S | N | N | N | N | S | S | S | S |
| 25.75 | N | N | N | N | N | S | S | S | S | N | N | N | N | O | S | S | S |
| 26.00 | N | N | N | N | N | S | S | S | S | N | N | N | N | N | S | S | S |
| 26.25 | N | N | N | N | N | S | S | S | S | N | N | N | N | N | S | S | S |
| 26.50 | O | N | N | N | N | S | S | S | S | N | N | N | N | N | S | S | S |
| 26.75 | S | N | N | N | N | S | S | S | S | O | N | N | N | N | S | S | S |
| 27.00 | S | N | N | N | N | S | S | S | S | S | N | N | N | N | S | S | S |
| 27.25 | S | N | N | N | N | S | S | S | S | S | N | N | N | N | S | S | S |
| 27.50 | S | N | N | N | N | S | S | S | S | S | N | N | N | N | S | S | S |
| 27.75 | S | N | N | N | N | O | S | S | S | S | N | N | N | N | S | S | S |
| 28.00 | S | N | N | N | N | N | S | S | S | S | N | N | N | N | O | S | S |
| 28.25 | S | N | N | N | N | N | S | S | S | S | N | N | N | N | N | S | S |
| 28.50 | S | N | N | N | N | N | S | S | S | S | N | N | N | N | N | S | S |
| 28.75 | S | O | N | N | N | N | S | S | S | S | N | N | N | N | N | S | S |
| 29.00 | S | S | N | N | N | N | S | S | S | S | O | N | N | N | N | S | S |
| 29.25 | S | S | N | N | N | N | S | S | S | S | S | N | N | N | N | S | S |
| 29.50 | S | S | N | N | N | N | S | S | S | S | S | N | N | N | N | S | S |
| 29.75 | S | S | N | N | N | N | S | S | S | S | S | N | N | N | N | S | S |
| 30.00 | S | S | N | N | N | N | O | S | S | S | S | N | N | N | N | S | S |
| 30.25 | S | S | N | N | N | N | N | S | S | S | S | N | N | N | N | O | S |
| 30.50 | S | S | N | N | N | N | N | S | S | S | S | N | N | N | N | N | S |
| 30.75 | S | S | N | N | N | N | N | S | S | S | S | N | N | N | N | N | S |
| 31.00 | S | S | O | N | N | N | N | S | S | S | S | N | N | N | N | N | S |
| 31.25 | S | S | S | N | N | N | N | S | S | S | S | O | N | N | N | N | S |
| 31.50 | S | S | S | N | N | N | N | S | S | S | S | S | N | N | N | N | S |
| 31.75 | S | S | S | N | N | N | N | S | S | S | S | S | N | N | N | N | S |
| 32.00 | S | S | S | N | N | N | N | S | S | S | S | S | N | N | N | N | S |
| 32.25 | S | S | S | N | N | N | N | O | S | S | S | S | N | N | N | N | S |
| 32.50 | S | S | S | N | N | N | N | N | S | S | S | S | N | N | N | N | O |
| 32.75 | S | S | S | N | N | N | N | N | S | S | S | S | N | N | N | N | N |
| 33.00 | S | S | S | N | N | N | N | N | S | S | S | S | N | N | N | N | N |
| 33.25 | S | S | S | O | N | N | N | N | S | S | S | S | N | N | N | N | N |
| 33.50 | S | S | S | S | N | N | N | N | S | S | S | S | O | N | N | N | N |
| 33.75 | S | S | S | S | N | N | N | N | S | S | S | S | S | N | N | N | N |

-continued

Coil Excitation

| | | | | | | | | | | | | | | | | |
|---|---|---|---|---|---|---|---|---|---|---|---|---|---|---|---|---|
| 34.00 | S | S | S | S | N | N | N | N | S | S | S | S | S | N | N | N | N |
| 34.25 | S | S | S | S | N | N | N | N | S | S | S | S | S | N | N | N | N |
| 34.50 | S | S | S | S | N | N | N | N | O | S | S | S | S | N | N | N | N |
| 34.75 | S | S | S | S | N | N | N | N | N | S | S | S | S | N | N | N | N |
| 35.00 | S | S | S | S | N | N | N | N | N | S | S | S | S | N | N | N | N |
| 35.25 | S | S | S | S | N | N | N | N | N | S | S | S | S | N | N | N | N |
| 35.50 | S | S | S | S | O | N | N | N | N | S | S | S | S | N | N | N | N |
| 35.75 | S | S | S | S | S | N | N | N | N | S | S | S | S | O | N | N | N |

Page Row 3, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 24.00 | N | N | N | N | N | S | S | S | S | N | N | N | N | O | S | S | S |
| 24.25 | N | N | N | N | N | S | S | S | S | N | N | N | N | N | S | S | S |
| 24.50 | N | N | N | N | N | S | S | S | S | N | N | N | N | N | S | S | S |
| 24.75 | O | N | N | N | N | S | S | S | S | N | N | N | N | N | S | S | S |
| 25.00 | S | N | N | N | N | S | S | S | S | O | N | N | N | N | S | S | S |
| 25.25 | S | N | N | N | N | S | S | S | S | S | N | N | N | N | S | S | S |
| 25.50 | S | N | N | N | N | S | S | S | S | S | N | N | N | N | S | S | S |
| 25.75 | S | N | N | N | N | S | S | S | S | S | N | N | N | N | S | S | S |
| 26.00 | S | N | N | N | N | O | S | S | S | S | N | N | N | N | S | S | S |
| 26.25 | S | N | N | N | N | N | S | S | S | S | N | N | N | N | O | S | S |
| 26.50 | S | N | N | N | N | N | S | S | S | S | N | N | N | N | N | S | S |
| 26.75 | S | N | N | N | N | N | S | S | S | S | N | N | N | N | N | S | S |
| 27.00 | S | O | N | N | N | N | S | S | S | S | N | N | N | N | N | S | S |
| 27.25 | S | S | N | N | N | N | S | S | S | S | O | N | N | N | N | S | S |
| 27.50 | S | S | N | N | N | N | S | S | S | S | S | N | N | N | N | S | S |
| 27.75 | S | S | N | N | N | N | S | S | S | S | S | N | N | N | N | S | S |
| 28.00 | S | S | N | N | N | N | S | S | S | S | S | N | N | N | N | S | S |
| 28.25 | S | S | N | N | N | N | O | S | S | S | S | N | N | N | N | S | S |
| 28.50 | S | S | N | N | N | N | N | S | S | S | S | N | N | N | N | O | S |
| 28.75 | S | S | N | N | N | N | N | S | S | S | S | N | N | N | N | N | S |
| 29.00 | S | S | N | N | N | N | N | S | S | S | S | N | N | N | N | N | S |
| 29.25 | S | S | O | N | N | N | N | S | S | S | S | N | N | N | N | N | S |
| 29.50 | S | S | S | N | N | N | N | S | S | S | S | O | N | N | N | N | S |
| 29.75 | S | S | S | N | N | N | N | S | S | S | S | S | N | N | N | N | S |
| 30.00 | S | S | S | N | N | N | N | S | S | S | S | S | N | N | N | N | S |
| 30.25 | S | S | S | N | N | N | N | S | S | S | S | S | N | N | N | N | S |
| 30.50 | S | S | S | N | N | N | N | O | S | S | S | S | N | N | N | N | S |
| 30.75 | S | S | S | N | N | N | N | N | S | S | S | S | N | N | N | N | O |
| 31.00 | S | S | S | N | N | N | N | N | S | S | S | S | N | N | N | N | N |
| 31.25 | S | S | S | N | N | N | N | N | S | S | S | S | N | N | N | N | N |
| 31.50 | S | S | S | O | N | N | N | N | S | S | S | S | N | N | N | N | N |
| 31.75 | S | S | S | S | N | N | N | N | S | S | S | S | O | N | N | N | N |
| 32.00 | S | S | S | S | N | N | N | N | S | S | S | S | S | N | N | N | N |
| 32.25 | S | S | S | S | N | N | N | N | S | S | S | S | S | N | N | N | N |
| 32.50 | S | S | S | S | N | N | N | N | S | S | S | S | S | N | N | N | N |
| 32.75 | S | S | S | S | N | N | N | N | O | S | S | S | S | N | N | N | N |
| 33.00 | S | S | S | S | N | N | N | N | N | S | S | S | S | N | N | N | N |
| 33.25 | S | S | S | S | N | N | N | N | N | S | S | S | S | N | N | N | N |
| 33.50 | S | S | S | S | N | N | N | N | N | S | S | S | S | N | N | N | N |
| 33.75 | S | S | S | S | O | N | N | N | N | S | S | S | S | N | N | N | N |
| 34.00 | S | S | S | S | S | N | N | N | N | S | S | S | S | O | N | N | N |
| 34.25 | S | S | S | S | S | N | N | N | N | S | S | S | S | S | N | N | N |
| 34.50 | S | S | S | S | S | N | N | N | N | S | S | S | S | S | N | N | N |
| 34.75 | O | S | S | S | S | N | N | N | N | S | S | S | S | S | N | N | N |
| 35.00 | N | S | S | S | S | N | N | N | N | O | S | S | S | S | N | N | N |
| 35.25 | N | S | S | S | S | N | N | N | N | N | S | S | S | S | N | N | N |
| 35.50 | N | S | S | S | S | N | N | N | N | N | S | S | S | S | N | N | N |
| 35.75 | N | S | S | S | S | N | N | N | N | N | S | S | S | S | N | N | N |

Page Row 3, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 24.00 | S | N | N | N | N | S | S | S | S | S | N | N | N | N | S | S | S |
| 24.25 | S | N | N | N | N | O | S | S | S | S | N | N | N | N | S | S | S |
| 24.50 | S | N | N | N | N | N | S | S | S | S | N | N | N | N | O | S | S |
| 24.75 | S | N | N | N | N | N | S | S | S | S | N | N | N | N | N | S | S |
| 25.00 | S | N | N | N | N | N | S | S | S | S | N | N | N | N | N | S | S |
| 25.25 | S | O | N | N | N | N | S | S | S | S | N | N | N | N | N | S | S |
| 25.50 | S | S | N | N | N | N | S | S | S | S | O | N | N | N | N | S | S |
| 25.75 | S | S | N | N | N | N | S | S | S | S | S | N | N | N | N | S | S |
| 26.00 | S | S | N | N | N | N | S | S | S | S | S | N | N | N | N | S | S |
| 26.25 | S | S | N | N | N | N | S | S | S | S | S | N | N | N | N | S | S |
| 26.50 | S | S | N | N | N | N | O | S | S | S | S | N | N | N | N | S | S |
| 26.75 | S | S | N | N | N | N | N | S | S | S | S | N | N | N | N | O | S |
| 27.00 | S | S | N | N | N | N | N | S | S | S | S | N | N | N | N | N | S |

-continued

| Coil Excitation | | | | | | | | | | | | | | | | | |
|---|---|---|---|---|---|---|---|---|---|---|---|---|---|---|---|---|---|
| 27.25 | S | S | N | N | N | N | N | S | S | S | S | N | N | N | N | N | S |
| 27.50 | S | S | O | N | N | N | N | S | S | S | S | N | N | N | N | N | S |
| 27.75 | S | S | S | N | N | N | N | S | S | S | S | O | N | N | N | N | S |
| 28.00 | S | S | S | N | N | N | N | S | S | S | S | S | N | N | N | N | S |
| 28.25 | S | S | S | N | N | N | N | S | S | S | S | S | N | N | N | N | S |
| 28.50 | S | S | S | N | N | N | N | S | S | S | S | S | N | N | N | N | S |
| 28.75 | S | S | S | N | N | N | N | O | S | S | S | S | N | N | N | N | S |
| 29.00 | S | S | S | N | N | N | N | N | S | S | S | S | N | N | N | N | O |
| 29.25 | S | S | S | N | N | N | N | N | S | S | S | S | N | N | N | N | N |
| 29.50 | S | S | S | N | N | N | N | N | S | S | S | S | N | N | N | N | N |
| 29.75 | S | S | S | O | N | N | N | N | S | S | S | S | N | N | N | N | N |
| 30.00 | S | S | S | S | N | N | N | N | S | S | S | S | O | N | N | N | N |
| 30.25 | S | S | S | S | N | N | N | N | S | S | S | S | S | N | N | N | N |
| 30.50 | S | S | S | S | N | N | N | N | S | S | S | S | S | N | N | N | N |
| 30.75 | S | S | S | S | N | N | N | N | S | S | S | S | S | N | N | N | N |
| 31.00 | S | S | S | S | N | N | N | N | O | S | S | S | S | N | N | N | N |
| 31.25 | S | S | S | S | N | N | N | N | N | S | S | S | S | N | N | N | N |
| 31.50 | S | S | S | S | N | N | N | N | N | S | S | S | S | N | N | N | N |
| 31.75 | S | S | S | S | N | N | N | N | N | S | S | S | S | N | N | N | N |
| 32.00 | S | S | S | S | O | N | N | N | N | S | S | S | S | N | N | N | N |
| 32.25 | S | S | S | S | S | N | N | N | N | S | S | S | S | O | N | N | N |
| 32.50 | S | S | S | S | S | N | N | N | N | S | S | S | S | S | N | N | N |
| 32.75 | S | S | S | S | S | N | N | N | N | S | S | S | S | S | N | N | N |
| 33.00 | O | S | S | S | S | N | N | N | N | S | S | S | S | S | N | N | N |
| 33.25 | N | S | S | S | S | N | N | N | N | O | S | S | S | S | N | N | N |
| 33.50 | N | S | S | S | S | N | N | N | N | N | S | S | S | S | N | N | N |
| 33.75 | N | S | S | S | S | N | N | N | N | N | S | S | S | S | N | N | N |
| 34.00 | N | S | S | S | S | N | N | N | N | N | S | S | S | S | N | N | N |
| 34.25 | N | S | S | S | S | O | N | N | N | N | S | S | S | S | N | N | N |
| 34.50 | N | S | S | S | S | S | N | N | N | N | S | S | S | S | O | N | N |
| 34.75 | N | S | S | S | S | S | N | N | N | N | S | S | S | S | S | N | N |
| 35.00 | N | S | S | S | S | S | N | N | N | N | S | S | S | S | S | N | N |
| 35.25 | N | O | S | S | S | S | N | N | N | N | S | S | S | S | S | N | N |
| 35.50 | N | N | S | S | S | S | N | N | N | N | O | S | S | S | S | N | N |
| 35.75 | N | N | S | S | S | S | N | N | N | N | N | S | S | S | S | N | N |

Page Row 3, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 24.00 | S | S | N | N | N | N | S | S | S | S | S | N | N | N | N | S | S |
| 24.25 | S | S | N | N | N | N | S | S | S | S | S | N | N | N | N | S | S |
| 24.50 | S | S | N | N | N | N | S | S | S | S | S | N | N | N | N | S | S |
| 24.75 | S | S | N | N | N | N | O | S | S | S | S | N | N | N | N | S | S |
| 25.00 | S | S | N | N | N | N | N | S | S | S | S | N | N | N | N | O | S |
| 25.25 | S | S | N | N | N | N | N | S | S | S | S | N | N | N | N | N | S |
| 25.50 | S | S | N | N | N | N | N | S | S | S | S | N | N | N | N | N | S |
| 25.75 | S | S | O | N | N | N | N | S | S | S | S | N | N | N | N | N | S |
| 26.00 | S | S | S | N | N | N | N | S | S | S | S | O | N | N | N | N | S |
| 26.25 | S | S | S | N | N | N | N | S | S | S | S | S | N | N | N | N | S |
| 26.50 | S | S | S | N | N | N | N | S | S | S | S | S | N | N | N | N | S |
| 26.75 | S | S | S | N | N | N | N | S | S | S | S | S | N | N | N | N | S |
| 27.00 | S | S | S | N | N | N | N | O | S | S | S | S | N | N | N | N | S |
| 27.25 | S | S | S | N | N | N | N | N | S | S | S | S | N | N | N | N | O |
| 27.50 | S | S | S | N | N | N | N | N | S | S | S | S | N | N | N | N | N |
| 27.75 | S | S | S | N | N | N | N | N | S | S | S | S | N | N | N | N | N |
| 28.00 | S | S | S | O | N | N | N | N | S | S | S | S | N | N | N | N | N |
| 28.25 | S | S | S | S | N | N | N | N | S | S | S | S | O | N | N | N | N |
| 28.50 | S | S | S | S | N | N | N | N | S | S | S | S | S | N | N | N | N |
| 28.75 | S | S | S | S | N | N | N | N | S | S | S | S | S | N | N | N | N |
| 29.00 | S | S | S | S | N | N | N | N | S | S | S | S | S | N | N | N | N |
| 29.25 | S | S | S | S | N | N | N | N | O | S | S | S | S | N | N | N | N |
| 29.50 | S | S | S | S | N | N | N | N | N | S | S | S | S | N | N | N | N |
| 29.75 | S | S | S | S | N | N | N | N | N | S | S | S | S | N | N | N | N |
| 30.00 | S | S | S | S | N | N | N | N | N | S | S | S | S | N | N | N | N |
| 30.25 | S | S | S | S | O | N | N | N | N | S | S | S | S | N | N | N | N |
| 30.50 | S | S | S | S | S | N | N | N | N | S | S | S | S | O | N | N | N |
| 30.75 | S | S | S | S | S | N | N | N | N | S | S | S | S | S | N | N | N |
| 31.00 | S | S | S | S | S | N | N | N | N | S | S | S | S | S | N | N | N |
| 31.25 | O | S | S | S | S | N | N | N | N | S | S | S | S | S | N | N | N |
| 31.50 | N | S | S | S | S | N | N | N | N | O | S | S | S | S | N | N | N |
| 31.75 | N | S | S | S | S | N | N | N | N | N | S | S | S | S | N | N | N |
| 32.00 | N | S | S | S | S | N | N | N | N | N | S | S | S | S | N | N | N |
| 32.25 | N | S | S | S | S | N | N | N | N | N | S | S | S | S | N | N | N |
| 32.50 | N | S | S | S | S | O | N | N | N | N | S | S | S | S | N | N | N |
| 32.75 | N | S | S | S | S | S | N | N | N | N | S | S | S | S | O | N | N |
| 33.00 | N | S | S | S | S | S | N | N | N | N | S | S | S | S | S | N | N |
| 33.25 | N | S | S | S | S | S | N | N | N | N | S | S | S | S | S | N | N |

-continued

Coil Excitation

| | | | | | | | | | | | | | | | | | |
|---|---|---|---|---|---|---|---|---|---|---|---|---|---|---|---|---|---|
| 33.50 | N | O | S | S | S | S | N | N | N | N | S | S | S | S | S | N | N |
| 33.75 | N | N | S | S | S | S | N | N | N | N | O | S | S | S | S | N | N |
| 34.00 | N | N | S | S | S | S | N | N | N | N | N | S | S | S | S | N | N |
| 34.25 | N | N | S | S | S | S | N | N | N | N | N | S | S | S | S | N | N |
| 34.50 | N | N | S | S | S | S | N | N | N | N | N | S | S | S | S | N | N |
| 34.75 | N | N | S | S | S | S | O | N | N | N | N | S | S | S | S | N | N |
| 35.00 | N | N | S | S | S | S | S | N | N | N | N | S | S | S | S | O | N |
| 35.25 | N | N | S | S | S | S | S | N | N | N | N | S | S | S | S | S | N |
| 35.50 | N | N | S | S | S | S | S | N | N | N | N | S | S | S | S | S | N |
| 35.75 | N | N | O | S | S | S | S | N | N | N | N | S | S | S | S | S | N |

Page Row 3, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 24.00 | S | S | O | N | N | N | N | S | S | S | S | N | N | N | N | N | S |
| 24.25 | S | S | S | N | N | N | N | S | S | S | S | O | N | N | N | N | S |
| 24.50 | S | S | S | N | N | N | N | S | S | S | S | S | N | N | N | N | S |
| 24.75 | S | S | S | N | N | N | N | S | S | S | S | S | N | N | N | N | S |
| 25.00 | S | S | S | N | N | N | N | S | S | S | S | S | N | N | N | N | S |
| 25.25 | S | S | S | N | N | N | N | O | S | S | S | S | N | N | N | N | S |
| 25.50 | S | S | S | N | N | N | N | N | S | S | S | S | N | N | N | N | O |
| 25.75 | S | S | S | N | N | N | N | N | S | S | S | S | N | N | N | N | N |
| 26.00 | S | S | S | N | N | N | N | N | S | S | S | S | N | N | N | N | N |
| 26.25 | S | S | S | O | N | N | N | N | S | S | S | S | N | N | N | N | N |
| 26.50 | S | S | S | S | N | N | N | N | S | S | S | S | O | N | N | N | N |
| 26.75 | S | S | S | S | N | N | N | N | S | S | S | S | S | N | N | N | N |
| 27.00 | S | S | S | S | N | N | N | N | S | S | S | S | S | N | N | N | N |
| 27.25 | S | S | S | S | N | N | N | N | S | S | S | S | S | N | N | N | N |
| 27.50 | S | S | S | S | N | N | N | N | O | S | S | S | S | N | N | N | N |
| 27.75 | S | S | S | S | N | N | N | N | N | S | S | S | S | N | N | N | N |
| 28.00 | S | S | S | S | N | N | N | N | N | S | S | S | S | N | N | N | N |
| 28.25 | S | S | S | S | N | N | N | N | N | S | S | S | S | N | N | N | N |
| 28.50 | S | S | S | S | O | N | N | N | N | S | S | S | S | N | N | N | N |
| 28.75 | S | S | S | S | S | N | N | N | N | S | S | S | S | O | N | N | N |
| 29.00 | S | S | S | S | S | N | N | N | N | S | S | S | S | S | N | N | N |
| 29.25 | S | S | S | S | S | N | N | N | N | S | S | S | S | S | N | N | N |
| 29.50 | O | S | S | S | S | N | N | N | N | S | S | S | S | S | N | N | N |
| 29.75 | N | S | S | S | S | N | N | N | N | O | S | S | S | S | N | N | N |
| 30.00 | N | S | S | S | S | N | N | N | N | N | S | S | S | S | N | N | N |
| 30.25 | N | S | S | S | S | N | N | N | N | N | S | S | S | S | N | N | N |
| 30.50 | N | S | S | S | S | N | N | N | N | N | S | S | S | S | N | N | N |
| 30.75 | N | S | S | S | S | O | N | N | N | N | S | S | S | S | N | N | N |
| 31.00 | N | S | S | S | S | S | N | N | N | N | S | S | S | S | O | N | N |
| 31.25 | N | S | S | S | S | S | N | N | N | N | S | S | S | S | S | N | N |
| 31.50 | N | S | S | S | S | S | N | N | N | N | S | S | S | S | S | N | N |
| 31.75 | N | O | S | S | S | S | N | N | N | N | S | S | S | S | S | N | N |
| 32.00 | N | N | S | S | S | S | N | N | N | N | O | S | S | S | S | N | N |
| 32.25 | N | N | S | S | S | S | N | N | N | N | N | S | S | S | S | N | N |
| 32.50 | N | N | S | S | S | S | N | N | N | N | N | S | S | S | S | N | N |
| 32.75 | N | N | S | S | S | S | N | N | N | N | N | S | S | S | S | N | N |
| 33.00 | N | N | S | S | S | S | O | N | N | N | N | S | S | S | S | N | N |
| 33.25 | N | N | S | S | S | S | S | N | N | N | N | S | S | S | S | O | N |
| 33.50 | N | N | S | S | S | S | S | N | N | N | N | S | S | S | S | S | N |
| 33.75 | N | N | S | S | S | S | S | N | N | N | N | S | S | S | S | S | N |
| 34.00 | N | N | O | S | S | S | S | N | N | N | N | S | S | S | S | S | N |
| 34.25 | N | N | N | S | S | S | S | N | N | N | N | O | S | S | S | S | N |
| 34.50 | N | N | N | S | S | S | S | N | N | N | N | N | S | S | S | S | N |
| 34.75 | N | N | N | S | S | S | S | N | N | N | N | N | S | S | S | S | N |
| 35.00 | N | N | N | S | S | S | S | N | N | N | N | N | S | S | S | S | N |
| 35.25 | N | N | N | S | S | S | S | O | N | N | N | N | S | S | S | S | N |
| 35.50 | N | N | N | S | S | S | S | S | N | N | N | N | S | S | S | S | O |
| 35.75 | N | N | N | S | S | S | S | S | N | N | N | N | S | S | S | S | S |

Page Row 3, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 24.00 | S | S | S | N | N | N | N | N | S | S | S | S | N | N | N | N | N |
| 24.25 | S | S | S | N | N | N | N | N | S | S | S | S | N | N | N | N | N |
| 24.50 | S | S | S | O | N | N | N | N | S | S | S | S | N | N | N | N | N |
| 24.75 | S | S | S | S | N | N | N | N | S | S | S | S | O | N | N | N | N |
| 25.00 | S | S | S | S | N | N | N | N | S | S | S | S | S | N | N | N | N |
| 25.25 | S | S | S | S | N | N | N | N | S | S | S | S | S | N | N | N | N |
| 25.50 | S | S | S | S | N | N | N | N | S | S | S | S | S | N | N | N | N |
| 25.75 | S | S | S | S | N | N | N | N | O | S | S | S | S | N | N | N | N |
| 26.00 | S | S | S | S | N | N | N | N | N | S | S | S | S | N | N | N | N |
| 26.25 | S | S | S | S | N | N | N | N | N | S | S | S | S | N | N | N | N |
| 26.50 | S | S | S | S | N | N | N | N | N | S | S | S | S | N | N | N | N |

-continued

| Coil Excitation | | | | | | | | | | | | | | | | |
|---|---|---|---|---|---|---|---|---|---|---|---|---|---|---|---|---|
| 26.75 | S | S | S | S | O | N | N | N | N | S | S | S | S | N | N | N | N |
| 27.00 | S | S | S | S | S | N | N | N | N | S | S | S | S | O | N | N | N |
| 27.25 | S | S | S | S | S | N | N | N | N | S | S | S | S | S | N | N | N |
| 27.50 | S | S | S | S | S | N | N | N | N | S | S | S | S | S | N | N | N |
| 27.75 | O | S | S | S | S | N | N | N | N | S | S | S | S | S | N | N | N |
| 28.00 | N | S | S | S | S | N | N | N | N | O | S | S | S | S | N | N | N |
| 28.25 | N | S | S | S | S | N | N | N | N | N | S | S | S | S | N | N | N |
| 28.50 | N | S | S | S | S | N | N | N | N | N | S | S | S | S | N | N | N |
| 28.75 | N | S | S | S | S | N | N | N | N | N | S | S | S | S | N | N | N |
| 29.00 | N | S | S | S | S | O | N | N | N | N | S | S | S | S | N | N | N |
| 29.25 | N | S | S | S | S | S | N | N | N | N | S | S | S | S | O | N | N |
| 29.50 | N | S | S | S | S | S | N | N | N | N | S | S | S | S | S | N | N |
| 29.75 | N | S | S | S | S | S | N | N | N | N | S | S | S | S | S | N | N |
| 30.00 | N | O | S | S | S | S | N | N | N | N | S | S | S | S | S | N | N |
| 30.25 | N | N | S | S | S | S | N | N | N | N | O | S | S | S | S | N | N |
| 30.50 | N | N | S | S | S | S | N | N | N | N | N | S | S | S | S | N | N |
| 30.75 | N | N | S | S | S | S | N | N | N | N | N | S | S | S | S | N | N |
| 31.00 | N | N | S | S | S | S | N | N | N | N | N | S | S | S | S | N | N |
| 31.25 | N | N | S | S | S | S | O | N | N | N | N | S | S | S | S | N | N |
| 31.50 | N | N | S | S | S | S | S | N | N | N | N | S | S | S | S | O | N |
| 31.75 | N | N | S | S | S | S | S | N | N | N | N | S | S | S | S | S | N |
| 32.00 | N | N | S | S | S | S | S | N | N | N | N | S | S | S | S | S | N |
| 32.25 | N | N | O | S | S | S | S | N | N | N | N | S | S | S | S | S | N |
| 32.50 | N | N | N | S | S | S | S | N | N | N | N | O | S | S | S | S | N |
| 32.75 | N | N | N | S | S | S | S | N | N | N | N | N | S | S | S | S | N |
| 33.00 | N | N | N | S | S | S | S | N | N | N | N | N | S | S | S | S | N |
| 33.25 | N | N | N | S | S | S | S | N | N | N | N | N | S | S | S | S | N |
| 33.50 | N | N | N | S | S | S | S | O | N | N | N | N | S | S | S | S | N |
| 33.75 | N | N | N | S | S | S | S | S | N | N | N | N | S | S | S | S | O |
| 34.00 | N | N | N | S | S | S | S | S | N | N | N | N | S | S | S | S | S |
| 34.25 | N | N | N | S | S | S | S | S | N | N | N | N | S | S | S | S | S |
| 34.50 | N | N | N | O | S | S | S | S | N | N | N | N | S | S | S | S | S |
| 34.75 | N | N | N | N | S | S | S | S | N | N | N | N | O | S | S | S | S |
| 35.00 | N | N | N | N | S | S | S | S | N | N | N | N | N | S | S | S | S |
| 35.25 | N | N | N | N | S | S | S | S | N | N | N | N | N | S | S | S | S |
| 35.50 | N | N | N | N | S | S | S | S | N | N | N | N | N | S | S | S | S |
| 35.75 | N | N | N | N | S | S | S | S | O | N | N | N | N | S | S | S | S |

Page Row 3, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 24.00 | S | S | S | S | N | N | N | N | O | S | S | S | S | N | N | N | N |
| 24.25 | S | S | S | S | N | N | N | N | N | S | S | S | S | N | N | N | N |
| 24.50 | S | S | S | S | N | N | N | N | N | S | S | S | S | N | N | N | N |
| 24.75 | S | S | S | S | N | N | N | N | N | S | S | S | S | N | N | N | N |
| 25.00 | S | S | S | S | O | N | N | N | N | S | S | S | S | N | N | N | N |
| 25.25 | S | S | S | S | S | N | N | N | N | S | S | S | S | O | N | N | N |
| 25.50 | S | S | S | S | S | N | N | N | N | S | S | S | S | S | N | N | N |
| 25.75 | S | S | S | S | S | N | N | N | N | S | S | S | S | S | N | N | N |
| 26.00 | O | S | S | S | S | N | N | N | N | S | S | S | S | S | N | N | N |
| 26.25 | N | S | S | S | S | N | N | N | N | O | S | S | S | S | N | N | N |
| 26.50 | N | S | S | S | S | N | N | N | N | N | S | S | S | S | N | N | N |
| 26.75 | N | S | S | S | S | N | N | N | N | N | S | S | S | S | N | N | N |
| 27.00 | N | S | S | S | S | N | N | N | N | N | S | S | S | S | N | N | N |
| 27.25 | N | S | S | S | S | O | N | N | N | N | S | S | S | S | N | N | N |
| 27.50 | N | S | S | S | S | S | N | N | N | N | S | S | S | S | O | N | N |
| 27.75 | N | S | S | S | S | S | N | N | N | N | S | S | S | S | S | N | N |
| 28.00 | N | S | S | S | S | S | N | N | N | N | S | S | S | S | S | N | N |
| 28.25 | N | O | S | S | S | S | N | N | N | N | S | S | S | S | S | N | N |
| 28.50 | N | N | S | S | S | S | N | N | N | N | O | S | S | S | S | N | N |
| 28.75 | N | N | S | S | S | S | N | N | N | N | N | S | S | S | S | N | N |
| 29.00 | N | N | S | S | S | S | N | N | N | N | N | S | S | S | S | N | N |
| 29.25 | N | N | S | S | S | S | N | N | N | N | N | S | S | S | S | N | N |
| 29.50 | N | N | S | S | S | S | O | N | N | N | N | S | S | S | S | N | N |
| 29.75 | N | N | S | S | S | S | S | N | N | N | N | S | S | S | S | O | N |
| 30.00 | N | N | S | S | S | S | S | N | N | N | N | S | S | S | S | S | N |
| 30.25 | N | N | S | S | S | S | S | N | N | N | N | S | S | S | S | S | N |
| 30.50 | N | N | O | S | S | S | S | N | N | N | N | S | S | S | S | S | N |
| 30.75 | N | N | N | S | S | S | S | N | N | N | N | O | S | S | S | S | N |
| 31.00 | N | N | N | S | S | S | S | N | N | N | N | N | S | S | S | S | N |
| 31.25 | N | N | N | S | S | S | S | N | N | N | N | N | S | S | S | S | N |
| 31.50 | N | N | N | S | S | S | S | N | N | N | N | N | S | S | S | S | N |
| 31.75 | N | N | N | S | S | S | S | O | N | N | N | N | S | S | S | S | N |
| 32.00 | N | N | N | S | S | S | S | S | N | N | N | N | S | S | S | S | O |
| 32.25 | N | N | N | S | S | S | S | S | N | N | N | N | S | S | S | S | S |
| 32.50 | N | N | N | S | S | S | S | S | N | N | N | N | S | S | S | S | S |
| 32.75 | N | N | N | O | S | S | S | S | N | N | N | N | S | S | S | S | S |

-continued

| Coil Excitation | | | | | | | | | | | | | | | | | |
|---|---|---|---|---|---|---|---|---|---|---|---|---|---|---|---|---|---|
| 33.00 | N | N | N | N | S | S | S | S | N | N | N | N | O | S | S | S | S |
| 33.25 | N | N | N | N | S | S | S | S | N | N | N | N | N | S | S | S | S |
| 33.50 | N | N | N | N | S | S | S | S | N | N | N | N | N | S | S | S | S |
| 33.75 | N | N | N | N | S | S | S | S | N | N | N | N | N | S | S | S | S |
| 34.00 | N | N | N | N | S | S | S | S | O | N | N | N | N | S | S | S | S |
| 34.25 | N | N | N | N | S | S | S | S | S | N | N | N | N | S | S | S | S |
| 34.50 | N | N | N | N | S | S | S | S | S | N | N | N | N | S | S | S | S |
| 34.75 | N | N | N | N | S | S | S | S | S | N | N | N | N | S | S | S | S |
| 35.00 | N | N | N | N | O | S | S | S | S | N | N | N | N | S | S | S | S |
| 35.25 | N | N | N | N | N | S | S | S | S | N | N | N | N | O | S | S | S |
| 35.50 | N | N | N | N | N | S | S | S | S | N | N | N | N | N | S | S | S |
| 35.75 | N | N | N | N | N | S | S | S | S | N | N | N | N | N | S | S | S |

Page Row 3, Page Column 9

| Coil | 154 | 155 | 156 | 157 | 158 | 159 | 160 |
|---|---|---|---|---|---|---|---|
| 24.00 | S | S | S | S | S | N | N |
| 24.25 | O | S | S | S | S | N | N |
| 24.50 | N | S | S | S | S | N | N |
| 24.75 | N | S | S | S | S | N | N |
| 25.00 | N | S | S | S | S | N | N |
| 25.25 | N | S | S | S | S | N | N |
| 25.50 | N | S | S | S | S | O | N |
| 25.75 | N | S | S | S | S | S | N |
| 26.00 | N | S | S | S | S | S | N |
| 26.25 | N | S | S | S | S | S | N |
| 26.50 | N | O | S | S | S | S | N |
| 26.75 | N | N | S | S | S | S | N |
| 27.00 | N | N | S | S | S | S | N |
| 27.25 | N | N | S | S | S | S | N |
| 27.50 | N | N | S | S | S | S | N |
| 27.75 | N | N | S | S | S | S | O |
| 28.00 | N | N | S | S | S | S | S |
| 28.25 | N | N | S | S | S | S | S |
| 28.50 | N | N | S | S | S | S | S |
| 28.75 | N | N | O | S | S | S | S |
| 29.00 | N | N | N | S | S | S | S |
| 29.25 | N | N | N | S | S | S | S |
| 29.50 | N | N | N | S | S | S | S |
| 29.75 | N | N | N | S | S | S | S |
| 30.00 | N | N | N | S | S | S | S |
| 30.25 | N | N | N | S | S | S | S |
| 30.50 | N | N | N | S | S | S | S |
| 30.75 | N | N | N | S | S | S | S |
| 31.00 | N | N | N | O | S | S | S |
| 31.25 | N | N | N | N | S | S | S |
| 31.50 | N | N | N | N | S | S | S |
| 31.75 | N | N | N | N | S | S | S |
| 32.00 | N | N | N | N | S | S | S |
| 32.25 | N | N | N | N | S | S | S |
| 32.50 | N | N | N | N | S | S | S |
| 32.75 | N | N | N | N | S | S | S |
| 33.00 | N | N | N | N | S | S | S |
| 33.25 | N | N | N | N | O | S | S |
| 33.50 | N | N | N | N | N | S | S |
| 33.75 | N | N | N | N | N | S | S |
| 34.00 | N | N | N | N | N | S | S |
| 34.25 | O | N | N | N | N | S | S |
| 34.50 | S | N | N | N | N | S | S |
| 34.75 | S | N | N | N | N | S | S |
| 35.00 | S | N | N | N | N | S | S |
| 35.25 | S | N | N | N | N | S | S |
| 35.50 | S | N | N | N | N | O | S |
| 35.75 | S | N | N | N | N | N | S |

Page Row 3, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 36.00 | S | S | S | N | N | N | N | N | S | S | S | S | N | N | N | N | O |
| 36.25 | S | S | S | N | N | N | N | N | S | S | S | S | N | N | N | N | N |
| 36.50 | S | S | S | N | N | N | N | N | S | S | S | S | N | N | N | N | N |
| 36.75 | S | S | S | O | N | N | N | N | S | S | S | S | N | N | N | N | N |
| 37.00 | S | S | S | S | N | N | N | N | S | S | S | S | O | N | N | N | N |
| 37.25 | S | S | S | S | N | N | N | N | S | S | S | S | S | N | N | N | N |
| 37.50 | S | S | S | S | N | N | N | N | S | S | S | S | S | N | N | N | N |
| 37.75 | S | S | S | S | N | N | N | N | S | S | S | S | S | N | N | N | N |
| 38.00 | S | S | S | S | N | N | N | N | O | S | S | S | S | N | N | N | N |

-continued

| | Coil Excitation | | | | | | | | | | | | | | | | |
|---|---|---|---|---|---|---|---|---|---|---|---|---|---|---|---|---|---|
| 38.25 | S | S | S | S | N | N | N | N | N | S | S | S | S | N | N | N | N |
| 38.50 | S | S | S | S | N | N | N | N | N | S | S | S | S | N | N | N | N |
| 38.75 | S | S | S | S | N | N | N | N | N | S | S | S | S | N | N | N | N |
| 39.00 | S | S | S | S | O | N | N | N | N | S | S | S | S | N | N | N | N |
| 39.25 | S | S | S | S | S | N | N | N | N | S | S | S | S | O | N | N | N |
| 39.50 | S | S | S | S | S | N | N | N | N | S | S | S | S | S | N | N | N |
| 39.75 | S | S | S | S | S | N | N | N | N | S | S | S | S | S | N | N | N |
| 40.00 | O | S | S | S | S | N | N | N | N | S | S | S | S | S | N | N | N |
| 40.25 | N | S | S | S | S | N | N | N | N | O | S | S | S | S | N | N | N |
| 40.50 | N | S | S | S | S | N | N | N | N | N | S | S | S | S | N | N | N |
| 40.75 | N | S | S | S | S | N | N | N | N | N | S | S | S | S | N | N | N |
| 41.00 | N | S | S | S | S | N | N | N | N | N | S | S | S | S | N | N | N |
| 41.25 | N | S | S | S | S | O | N | N | N | N | S | S | S | S | N | N | N |
| 41.50 | N | S | S | S | S | S | N | N | N | N | S | S | S | S | O | N | N |
| 41.75 | N | S | S | S | S | S | N | N | N | N | S | S | S | S | S | N | N |
| 42.00 | N | S | S | S | S | S | N | N | N | N | S | S | S | S | S | N | N |
| 42.25 | N | O | S | S | S | S | N | N | N | N | S | S | S | S | S | N | N |
| 42.50 | N | N | S | S | S | S | N | N | N | N | O | S | S | S | S | N | N |
| 42.75 | N | N | S | S | S | S | N | N | N | N | N | S | S | S | S | N | N |
| 43.00 | N | N | S | S | S | S | N | N | N | N | N | S | S | S | S | N | N |
| 43.25 | N | N | S | S | S | S | N | N | N | N | N | S | S | S | S | N | N |
| 43.50 | N | N | S | S | S | S | O | N | N | N | N | S | S | S | S | N | N |
| 43.75 | N | N | S | S | S | S | S | N | N | N | N | S | S | S | S | O | N |
| 44.00 | N | N | S | S | S | S | S | N | N | N | N | S | S | S | S | S | N |
| 44.25 | N | N | S | S | S | S | S | N | N | N | N | S | S | S | S | S | N |
| 44.50 | N | N | O | S | S | S | S | N | N | N | N | S | S | S | S | S | N |
| 44.75 | N | N | N | S | S | S | S | N | N | N | N | O | S | S | S | S | N |
| 45.00 | N | N | N | S | S | S | S | N | N | N | N | N | S | S | S | S | N |
| 45.25 | N | N | N | S | S | S | S | N | N | N | N | N | S | S | S | S | N |
| 45.50 | N | N | N | S | S | S | S | N | N | N | N | N | S | S | S | S | N |
| 45.75 | N | N | N | S | S | S | S | O | N | N | N | N | S | S | S | S | N |
| 46.00 | N | N | N | S | S | S | S | S | N | N | N | N | S | S | S | S | O |
| 46.25 | N | N | N | S | S | S | S | S | N | N | N | N | S | S | S | S | S |
| 46.50 | N | N | N | S | S | S | S | S | N | N | N | N | S | S | S | S | S |
| 46.75 | N | N | N | O | S | S | S | S | N | N | N | N | S | S | S | S | S |
| 47.00 | N | N | N | N | S | S | S | S | N | N | N | N | O | S | S | S | S |
| 47.25 | N | N | N | N | S | S | S | S | N | N | N | N | N | S | S | S | S |
| 47.50 | N | N | N | N | S | S | S | S | N | N | N | N | N | S | S | S | S |
| 47.75 | N | N | N | N | S | S | S | S | N | N | N | N | N | S | S | S | S |

Page Row 4, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 36.00 | S | S | S | S | N | N | N | N | S | S | S | S | S | N | N | N | N |
| 36.25 | S | S | S | S | N | N | N | N | O | S | S | S | S | N | N | N | N |
| 36.50 | S | S | S | S | N | N | N | N | N | S | S | S | S | N | N | N | N |
| 36.75 | S | S | S | S | N | N | N | N | N | S | S | S | S | N | N | N | N |
| 37.00 | S | S | S | S | N | N | N | N | N | S | S | S | S | N | N | N | N |
| 37.25 | S | S | S | S | O | N | N | N | N | S | S | S | S | N | N | N | N |
| 37.50 | S | S | S | S | S | N | N | N | N | S | S | S | S | O | N | N | N |
| 37.75 | S | S | S | S | S | N | N | N | N | S | S | S | S | S | N | N | N |
| 38.00 | S | S | S | S | S | N | N | N | N | S | S | S | S | S | N | N | N |
| 38.25 | O | S | S | S | S | N | N | N | N | S | S | S | S | S | N | N | N |
| 38.50 | N | S | S | S | S | N | N | N | N | O | S | S | S | S | N | N | N |
| 38.75 | N | S | S | S | S | N | N | N | N | N | S | S | S | S | N | N | N |
| 39.00 | N | S | S | S | S | N | N | N | N | N | S | S | S | S | N | N | N |
| 39.25 | N | S | S | S | S | N | N | N | N | N | S | S | S | S | N | N | N |
| 39.50 | N | S | S | S | S | O | N | N | N | N | S | S | S | S | N | N | N |
| 39.75 | N | S | S | S | S | S | N | N | N | N | S | S | S | S | O | N | N |
| 40.00 | N | S | S | S | S | S | N | N | N | N | S | S | S | S | S | N | N |
| 40.25 | N | S | S | S | S | S | N | N | N | N | S | S | S | S | S | N | N |
| 40.50 | N | O | S | S | S | S | N | N | N | N | S | S | S | S | S | N | N |
| 40.75 | N | N | S | S | S | S | N | N | N | N | O | S | S | S | S | N | N |
| 41.00 | N | N | S | S | S | S | N | N | N | N | N | S | S | S | S | N | N |
| 41.25 | N | N | S | S | S | S | N | N | N | N | N | S | S | S | S | N | N |
| 41.50 | N | N | S | S | S | S | N | N | N | N | N | S | S | S | S | N | N |
| 41.75 | N | N | S | S | S | S | O | N | N | N | N | S | S | S | S | N | N |
| 42.00 | N | N | S | S | S | S | S | N | N | N | N | S | S | S | S | O | N |
| 42.25 | N | N | S | S | S | S | S | N | N | N | N | S | S | S | S | S | N |
| 42.50 | N | N | S | S | S | S | S | N | N | N | N | S | S | S | S | S | N |
| 42.75 | N | N | O | S | S | S | S | N | N | N | N | S | S | S | S | S | N |
| 43.00 | N | N | N | S | S | S | S | N | N | N | N | O | S | S | S | S | N |
| 43.25 | N | N | N | S | S | S | S | N | N | N | N | N | S | S | S | S | N |
| 43.50 | N | N | N | S | S | S | S | N | N | N | N | N | S | S | S | S | N |
| 43.75 | N | N | N | S | S | S | S | N | N | N | N | N | S | S | S | S | N |
| 44.00 | N | N | N | S | S | S | S | O | N | N | N | N | S | S | S | S | N |
| 44.25 | N | N | N | S | S | S | S | S | N | N | N | N | S | S | S | S | O |

-continued

| Coil Excitation | | | | | | | | | | | | | | | | | |
|---|---|---|---|---|---|---|---|---|---|---|---|---|---|---|---|---|---|
| 44.50 | N | N | N | S | S | S | S | S | N | N | N | N | S | S | S | S | S |
| 44.75 | N | N | N | S | S | S | S | S | N | N | N | N | S | S | S | S | S |
| 45.00 | N | N | N | O | S | S | S | S | N | N | N | N | S | S | S | S | S |
| 45.25 | N | N | N | N | S | S | S | S | N | N | N | N | O | S | S | S | S |
| 45.50 | N | N | N | N | S | S | S | S | N | N | N | N | N | S | S | S | S |
| 45.75 | N | N | N | N | S | S | S | S | N | N | N | N | N | S | S | S | S |
| 46.00 | N | N | N | N | S | S | S | S | N | N | N | N | N | S | S | S | S |
| 46.25 | N | N | N | N | S | S | S | S | O | N | N | N | N | S | S | S | S |
| 46.50 | N | N | N | N | S | S | S | S | S | N | N | N | N | S | S | S | S |
| 46.75 | N | N | N | N | S | S | S | S | S | N | N | N | N | S | S | S | S |
| 47.00 | N | N | N | N | S | S | S | S | S | N | N | N | N | S | S | S | S |
| 47.25 | N | N | N | N | O | S | S | S | S | N | N | N | N | S | S | S | S |
| 47.50 | N | N | N | N | N | S | S | S | S | N | N | N | N | O | S | S | S |
| 47.75 | N | N | N | N | N | S | S | S | S | N | N | N | N | N | S | S | S |

Page Row 4, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 36.00 | S | S | S | S | S | N | N | N | N | S | S | S | S | S | N | N | N |
| 36.25 | S | S | S | S | S | N | N | N | N | S | S | S | S | S | N | N | N |
| 36.50 | O | S | S | S | S | N | N | N | N | S | S | S | S | S | N | N | N |
| 36.75 | N | S | S | S | S | N | N | N | N | O | S | S | S | S | N | N | N |
| 37.00 | N | S | S | S | S | N | N | N | N | N | S | S | S | S | N | N | N |
| 37.25 | N | S | S | S | S | N | N | N | N | N | S | S | S | S | N | N | N |
| 37.50 | N | S | S | S | S | N | N | N | N | N | S | S | S | S | N | N | N |
| 37.75 | N | S | S | S | S | O | N | N | N | N | S | S | S | S | N | N | N |
| 38.00 | N | S | S | S | S | S | N | N | N | N | S | S | S | S | O | N | N |
| 38.25 | N | S | S | S | S | S | N | N | N | N | S | S | S | S | S | N | N |
| 38.50 | N | S | S | S | S | S | N | N | N | N | S | S | S | S | S | N | N |
| 38.75 | N | O | S | S | S | S | N | N | N | N | S | S | S | S | S | N | N |
| 39.00 | N | N | S | S | S | S | N | N | N | N | O | S | S | S | S | N | N |
| 39.25 | N | N | S | S | S | S | N | N | N | N | N | S | S | S | S | N | N |
| 39.50 | N | N | S | S | S | S | N | N | N | N | N | S | S | S | S | N | N |
| 39.75 | N | N | S | S | S | S | N | N | N | N | N | S | S | S | S | N | N |
| 40.00 | N | N | S | S | S | S | O | N | N | N | N | S | S | S | S | N | N |
| 40.25 | N | N | S | S | S | S | S | N | N | N | N | S | S | S | S | O | N |
| 40.50 | N | N | S | S | S | S | S | N | N | N | N | S | S | S | S | S | N |
| 40.75 | N | N | S | S | S | S | S | N | N | N | N | S | S | S | S | S | N |
| 41.00 | N | N | O | S | S | S | S | N | N | N | N | S | S | S | S | S | N |
| 41.25 | N | N | N | S | S | S | S | N | N | N | N | O | S | S | S | S | N |
| 41.50 | N | N | N | S | S | S | S | N | N | N | N | N | S | S | S | S | N |
| 41.75 | N | N | N | S | S | S | S | N | N | N | N | N | S | S | S | S | N |
| 42.00 | N | N | N | S | S | S | S | N | N | N | N | N | S | S | S | S | N |
| 42.25 | N | N | N | S | S | S | S | O | N | N | N | N | S | S | S | S | N |
| 42.50 | N | N | N | S | S | S | S | S | N | N | N | N | S | S | S | S | O |
| 42.75 | N | N | N | S | S | S | S | S | N | N | N | N | S | S | S | S | S |
| 43.00 | N | N | N | S | S | S | S | S | N | N | N | N | S | S | S | S | S |
| 43.25 | N | N | N | O | S | S | S | S | N | N | N | N | S | S | S | S | S |
| 43.50 | N | N | N | N | S | S | S | S | N | N | N | N | O | S | S | S | S |
| 43.75 | N | N | N | N | S | S | S | S | N | N | N | N | N | S | S | S | S |
| 44.00 | N | N | N | N | S | S | S | S | N | N | N | N | N | S | S | S | S |
| 44.25 | N | N | N | N | S | S | S | S | N | N | N | N | N | S | S | S | S |
| 44.50 | N | N | N | N | S | S | S | S | O | N | N | N | N | S | S | S | S |
| 44.75 | N | N | N | N | S | S | S | S | S | N | N | N | N | S | S | S | S |
| 45.00 | N | N | N | N | S | S | S | S | S | N | N | N | N | S | S | S | S |
| 45.25 | N | N | N | N | S | S | S | S | S | N | N | N | N | S | S | S | S |
| 45.50 | N | N | N | N | O | S | S | S | S | N | N | N | N | S | S | S | S |
| 45.75 | N | N | N | N | N | S | S | S | S | N | N | N | N | O | S | S | S |
| 46.00 | N | N | N | N | N | S | S | S | S | N | N | N | N | N | S | S | S |
| 46.25 | N | N | N | N | N | S | S | S | S | N | N | N | N | N | S | S | S |
| 46.50 | O | N | N | N | N | S | S | S | S | N | N | N | N | N | S | S | S |
| 46.75 | S | N | N | N | N | S | S | S | S | O | N | N | N | N | S | S | S |
| 47.00 | S | N | N | N | N | S | S | S | S | S | N | N | N | N | S | S | S |
| 47.25 | S | N | N | N | N | S | S | S | S | S | N | N | N | N | S | S | S |
| 47.50 | S | N | N | N | N | S | S | S | S | S | N | N | N | N | S | S | S |
| 47.75 | S | N | N | N | N | O | S | S | S | S | N | N | N | N | S | S | S |

Page Row 4, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 36.00 | N | S | S | S | S | O | N | N | N | N | S | S | S | S | N | N | N |
| 36.25 | N | S | S | S | S | S | N | N | N | N | S | S | S | S | O | N | N |
| 36.50 | N | S | S | S | S | S | N | N | N | N | S | S | S | S | S | N | N |
| 36.75 | N | S | S | S | S | S | N | N | N | N | S | S | S | S | S | N | N |
| 37.00 | N | O | S | S | S | S | N | N | N | N | S | S | S | S | S | N | N |
| 37.25 | N | N | S | S | S | S | N | N | N | N | O | S | S | S | S | N | N |
| 37.50 | N | N | S | S | S | S | N | N | N | N | N | S | S | S | S | N | N |

-continued

| Coil Excitation | | | | | | | | | | | | | | | | | |
|---|---|---|---|---|---|---|---|---|---|---|---|---|---|---|---|---|---|
| 37.75 | N | N | S | S | S | S | N | N | N | N | N | S | S | S | S | N | N |
| 38.00 | N | N | S | S | S | S | N | N | N | N | N | S | S | S | S | N | N |
| 38.25 | N | N | S | S | S | S | O | N | N | N | N | S | S | S | S | N | N |
| 38.50 | N | N | S | S | S | S | S | N | N | N | N | S | S | S | S | O | N |
| 38.75 | N | N | S | S | S | S | S | N | N | N | N | S | S | S | S | S | N |
| 39.00 | N | N | S | S | S | S | S | N | N | N | N | S | S | S | S | S | N |
| 39.25 | N | N | O | S | S | S | S | N | N | N | N | S | S | S | S | S | N |
| 39.50 | N | N | N | S | S | S | S | N | N | N | N | O | S | S | S | S | N |
| 39.75 | N | N | N | S | S | S | S | N | N | N | N | N | S | S | S | S | N |
| 40.00 | N | N | N | S | S | S | S | N | N | N | N | N | S | S | S | S | N |
| 40.25 | N | N | N | S | S | S | S | N | N | N | N | N | S | S | S | S | N |
| 40.50 | N | N | N | S | S | S | S | O | N | N | N | N | S | S | S | S | N |
| 40.75 | N | N | N | S | S | S | S | S | N | N | N | N | S | S | S | S | O |
| 41.00 | N | N | N | S | S | S | S | S | N | N | N | N | S | S | S | S | S |
| 41.25 | N | N | N | S | S | S | S | S | N | N | N | N | S | S | S | S | S |
| 41.50 | N | N | N | O | S | S | S | S | N | N | N | N | S | S | S | S | S |
| 41.75 | N | N | N | N | S | S | S | S | N | N | N | N | O | S | S | S | S |
| 42.00 | N | N | N | N | S | S | S | S | N | N | N | N | N | S | S | S | S |
| 42.25 | N | N | N | N | S | S | S | S | N | N | N | N | N | S | S | S | S |
| 42.50 | N | N | N | N | S | S | S | S | N | N | N | N | N | S | S | S | S |
| 42.75 | N | N | N | N | S | S | S | S | O | N | N | N | N | S | S | S | S |
| 43.00 | N | N | N | N | S | S | S | S | S | N | N | N | N | S | S | S | S |
| 43.25 | N | N | N | N | S | S | S | S | S | N | N | N | N | S | S | S | S |
| 43.50 | N | N | N | N | S | S | S | S | S | N | N | N | N | S | S | S | S |
| 43.75 | N | N | N | N | O | S | S | S | S | N | N | N | N | S | S | S | S |
| 44.00 | N | N | N | N | N | S | S | S | S | N | N | N | N | O | S | S | S |
| 44.25 | N | N | N | N | N | S | S | S | S | N | N | N | N | N | S | S | S |
| 44.50 | N | N | N | N | N | S | S | S | S | N | N | N | N | N | S | S | S |
| 44.75 | O | N | N | N | N | S | S | S | S | N | N | N | N | N | S | S | S |
| 45.00 | S | N | N | N | N | S | S | S | S | O | N | N | N | N | S | S | S |
| 45.25 | S | N | N | N | N | S | S | S | S | S | N | N | N | N | S | S | S |
| 45.50 | S | N | N | N | N | S | S | S | S | S | N | N | N | N | S | S | S |
| 45.75 | S | N | N | N | N | S | S | S | S | S | N | N | N | N | S | S | S |
| 46.00 | S | N | N | N | N | O | S | S | S | S | N | N | N | N | S | S | S |
| 46.25 | S | N | N | N | N | N | S | S | S | S | N | N | N | N | O | S | S |
| 46.50 | S | N | N | N | N | N | S | S | S | S | N | N | N | N | N | S | S |
| 46.75 | S | N | N | N | N | N | S | S | S | S | N | N | N | N | N | S | S |
| 47.00 | S | O | N | N | N | N | S | S | S | S | N | N | N | N | N | S | S |
| 47.25 | S | S | N | N | N | N | S | S | S | S | O | N | N | N | N | S | S |
| 47.50 | S | S | N | N | N | N | S | S | S | S | S | N | N | N | N | S | S |
| 47.75 | S | S | N | N | N | N | S | S | S | S | S | N | N | N | N | S | S |

Page Row 4, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 36.00 | N | N | S | S | S | S | N | N | N | N | N | S | S | S | S | N | N |
| 36.25 | N | N | S | S | S | S | N | N | N | N | N | S | S | S | S | N | N |
| 36.50 | N | N | S | S | S | S | O | N | N | N | N | S | S | S | S | N | N |
| 36.75 | N | N | S | S | S | S | S | N | N | N | N | S | S | S | S | O | N |
| 37.00 | N | N | S | S | S | S | S | N | N | N | N | S | S | S | S | S | N |
| 37.25 | N | N | S | S | S | S | S | N | N | N | N | S | S | S | S | S | N |
| 37.50 | N | N | O | S | S | S | S | N | N | N | N | S | S | S | S | S | N |
| 37.75 | N | N | N | S | S | S | S | N | N | N | N | O | S | S | S | S | N |
| 38.00 | N | N | N | S | S | S | S | N | N | N | N | N | S | S | S | S | N |
| 38.25 | N | N | N | S | S | S | S | N | N | N | N | N | S | S | S | S | N |
| 38.50 | N | N | N | S | S | S | S | N | N | N | N | N | S | S | S | S | N |
| 38.75 | N | N | N | S | S | S | S | O | N | N | N | N | S | S | S | S | N |
| 39.00 | N | N | N | S | S | S | S | S | N | N | N | N | S | S | S | S | O |
| 39.25 | N | N | N | S | S | S | S | S | N | N | N | N | S | S | S | S | S |
| 39.50 | N | N | N | S | S | S | S | S | N | N | N | N | S | S | S | S | S |
| 39.75 | N | N | N | O | S | S | S | S | N | N | N | N | S | S | S | S | S |
| 40.00 | N | N | N | N | S | S | S | S | N | N | N | N | O | S | S | S | S |
| 40.25 | N | N | N | N | S | S | S | S | N | N | N | N | N | S | S | S | S |
| 40.50 | N | N | N | N | S | S | S | S | N | N | N | N | N | S | S | S | S |
| 40.75 | N | N | N | N | S | S | S | S | N | N | N | N | N | S | S | S | S |
| 41.00 | N | N | N | N | S | S | S | S | O | N | N | N | N | S | S | S | S |
| 41.25 | N | N | N | N | S | S | S | S | S | N | N | N | N | S | S | S | S |
| 41.50 | N | N | N | N | S | S | S | S | S | N | N | N | N | S | S | S | S |
| 41.75 | N | N | N | N | S | S | S | S | S | N | N | N | N | S | S | S | S |
| 42.00 | N | N | N | N | O | S | S | S | S | N | N | N | N | S | S | S | S |
| 42.25 | N | N | N | N | N | S | S | S | S | N | N | N | N | O | S | S | S |
| 42.50 | N | N | N | N | N | S | S | S | S | N | N | N | N | N | S | S | S |
| 42.75 | N | N | N | N | N | S | S | S | S | N | N | N | N | N | S | S | S |
| 43.00 | O | N | N | N | N | S | S | S | S | N | N | N | N | N | S | S | S |
| 43.25 | S | N | N | N | N | S | S | S | S | O | N | N | N | N | S | S | S |
| 43.50 | S | N | N | N | N | S | S | S | S | S | N | N | N | N | S | S | S |
| 43.75 | S | N | N | N | N | S | S | S | S | S | N | N | N | N | S | S | S |

-continued

Coil Excitation

| | | | | | | | | | | | | | | | | | |
|---|---|---|---|---|---|---|---|---|---|---|---|---|---|---|---|---|---|
| 44.00 | S | N | N | N | N | S | S | S | S | S | N | N | N | N | S | S | S |
| 44.25 | S | N | N | N | N | O | S | S | S | S | N | N | N | N | S | S | S |
| 44.50 | S | N | N | N | N | N | S | S | S | S | N | N | N | N | O | S | S |
| 44.75 | S | N | N | N | N | N | S | S | S | S | N | N | N | N | N | S | S |
| 45.00 | S | N | N | N | N | N | S | S | S | S | N | N | N | N | N | S | S |
| 45.25 | S | O | N | N | N | N | S | S | S | S | N | N | N | N | N | S | S |
| 45.50 | S | S | N | N | N | N | S | S | S | S | O | N | N | N | N | S | S |
| 45.75 | S | S | N | N | N | N | S | S | S | S | S | N | N | N | N | S | S |
| 46.00 | S | S | N | N | N | N | S | S | S | S | S | N | N | N | N | S | S |
| 46.25 | S | S | N | N | N | N | S | S | S | S | S | N | N | N | N | S | S |
| 46.50 | S | S | N | N | N | N | O | S | S | S | S | N | N | N | N | S | S |
| 46.75 | S | S | N | N | N | N | N | S | S | S | S | N | N | N | N | O | S |
| 47.00 | S | S | N | N | N | N | N | S | S | S | S | N | N | N | N | N | S |
| 47.25 | S | S | N | N | N | N | N | S | S | S | S | N | N | N | N | N | S |
| 47.50 | S | S | O | N | N | N | N | S | S | S | S | N | N | N | N | N | S |
| 47.75 | S | S | S | N | N | N | N | S | S | S | S | O | N | N | N | N | S |

Page Row 4, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 36.00 | N | N | N | S | S | S | S | N | N | N | N | O | S | S | S | S | N |
| 36.25 | N | N | N | S | S | S | S | N | N | N | N | N | S | S | S | S | N |
| 36.50 | N | N | N | S | S | S | S | N | N | N | N | N | S | S | S | S | N |
| 36.75 | N | N | N | S | S | S | S | N | N | N | N | N | S | S | S | S | N |
| 37.00 | N | N | N | S | S | S | S | O | N | N | N | N | S | S | S | S | N |
| 37.25 | N | N | N | S | S | S | S | S | N | N | N | N | S | S | S | S | O |
| 37.50 | N | N | N | S | S | S | S | S | N | N | N | N | S | S | S | S | S |
| 37.75 | N | N | N | S | S | S | S | S | N | N | N | N | S | S | S | S | S |
| 38.00 | N | N | N | O | S | S | S | S | N | N | N | N | S | S | S | S | S |
| 38.25 | N | N | N | N | S | S | S | S | N | N | N | N | O | S | S | S | S |
| 38.50 | N | N | N | N | S | S | S | S | N | N | N | N | N | S | S | S | S |
| 38.75 | N | N | N | N | S | S | S | S | N | N | N | N | N | S | S | S | S |
| 39.00 | N | N | N | N | S | S | S | S | N | N | N | N | N | S | S | S | S |
| 39.25 | N | N | N | N | S | S | S | S | O | N | N | N | N | S | S | S | S |
| 39.50 | N | N | N | N | S | S | S | S | S | N | N | N | N | S | S | S | S |
| 39.75 | N | N | N | N | S | S | S | S | S | N | N | N | N | S | S | S | S |
| 40.00 | N | N | N | N | S | S | S | S | S | N | N | N | N | S | S | S | S |
| 40.25 | N | N | N | N | O | S | S | S | S | N | N | N | N | S | S | S | S |
| 40.50 | N | N | N | N | N | S | S | S | S | N | N | N | N | O | S | S | S |
| 40.75 | N | N | N | N | N | S | S | S | S | N | N | N | N | N | S | S | S |
| 41.00 | N | N | N | N | N | S | S | S | S | N | N | N | N | N | S | S | S |
| 41.25 | O | N | N | N | N | S | S | S | S | N | N | N | N | N | S | S | S |
| 41.50 | S | N | N | N | N | S | S | S | S | O | N | N | N | N | S | S | S |
| 41.75 | S | N | N | N | N | S | S | S | S | S | N | N | N | N | S | S | S |
| 42.00 | S | N | N | N | N | S | S | S | S | S | N | N | N | N | S | S | S |
| 42.25 | S | N | N | N | N | S | S | S | S | S | N | N | N | N | S | S | S |
| 42.50 | S | N | N | N | N | O | S | S | S | S | N | N | N | N | S | S | S |
| 42.75 | S | N | N | N | N | N | S | S | S | S | N | N | N | N | O | S | S |
| 43.00 | S | N | N | N | N | N | S | S | S | S | N | N | N | N | N | S | S |
| 43.25 | S | N | N | N | N | N | S | S | S | S | N | N | N | N | N | S | S |
| 43.50 | S | O | N | N | N | N | S | S | S | S | N | N | N | N | N | S | S |
| 43.75 | S | S | N | N | N | N | S | S | S | S | O | N | N | N | N | S | S |
| 44.00 | S | S | N | N | N | N | S | S | S | S | S | N | N | N | N | S | S |
| 44.25 | S | S | N | N | N | N | S | S | S | S | S | N | N | N | N | S | S |
| 44.50 | S | S | N | N | N | N | S | S | S | S | S | N | N | N | N | S | S |
| 44.75 | S | S | N | N | N | N | O | S | S | S | S | N | N | N | N | S | S |
| 45.00 | S | S | N | N | N | N | N | S | S | S | S | N | N | N | N | O | S |
| 45.25 | S | S | N | N | N | N | N | S | S | S | S | N | N | N | N | N | S |
| 45.50 | S | S | N | N | N | N | N | S | S | S | S | N | N | N | N | N | S |
| 45.75 | S | S | O | N | N | N | N | S | S | S | S | N | N | N | N | N | S |
| 46.00 | S | S | S | N | N | N | N | S | S | S | S | O | N | N | N | N | S |
| 46.25 | S | S | S | N | N | N | N | S | S | S | S | S | N | N | N | N | S |
| 46.50 | S | S | S | N | N | N | N | S | S | S | S | S | N | N | N | N | S |
| 46.75 | S | S | S | N | N | N | N | S | S | S | S | S | N | N | N | N | S |
| 47.00 | S | S | S | N | N | N | N | O | S | S | S | S | N | N | N | N | S |
| 47.25 | S | S | S | N | N | N | N | N | S | S | S | S | N | N | N | N | O |
| 47.50 | S | S | S | N | N | N | N | N | S | S | S | S | N | N | N | N | N |
| 47.75 | S | S | S | N | N | N | N | N | S | S | S | S | N | N | N | N | N |

Page Row 4, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 36.00 | N | N | N | S | S | S | S | S | N | N | N | N | S | S | S | S | S |
| 36.25 | N | N | N | O | S | S | S | S | N | N | N | N | S | S | S | S | S |
| 36.50 | N | N | N | N | S | S | S | S | N | N | N | N | O | S | S | S | S |
| 36.75 | N | N | N | N | S | S | S | S | N | N | N | N | N | S | S | S | S |
| 37.00 | N | N | N | N | S | S | S | S | N | N | N | N | N | S | S | S | S |

-continued

| Coil Excitation | | | | | | | | | | | | | | | | | |
|---|---|---|---|---|---|---|---|---|---|---|---|---|---|---|---|---|---|
| 37.25 | N | N | N | N | S | S | S | S | N | N | N | N | N | S | S | S | S |
| 37.50 | N | N | N | N | S | S | S | S | O | N | N | N | N | S | S | S | S |
| 37.75 | N | N | N | N | S | S | S | S | S | N | N | N | N | S | S | S | S |
| 38.00 | N | N | N | N | S | S | S | S | S | N | N | N | N | S | S | S | S |
| 38.25 | N | N | N | N | S | S | S | S | S | N | N | N | N | S | S | S | S |
| 38.50 | N | N | N | N | O | S | S | S | S | N | N | N | N | S | S | S | S |
| 38.75 | N | N | N | N | N | S | S | S | S | N | N | N | N | O | S | S | S |
| 39.00 | N | N | N | N | N | S | S | S | S | N | N | N | N | N | S | S | S |
| 39.25 | N | N | N | N | N | S | S | S | S | N | N | N | N | N | S | S | S |
| 39.50 | O | N | N | N | N | S | S | S | S | N | N | N | N | N | S | S | S |
| 39.75 | S | N | N | N | N | S | S | S | S | O | N | N | N | N | S | S | S |
| 40.00 | S | N | N | N | N | S | S | S | S | S | N | N | N | N | S | S | S |
| 40.25 | S | N | N | N | N | S | S | S | S | S | N | N | N | N | S | S | S |
| 40.50 | S | N | N | N | N | S | S | S | S | S | N | N | N | N | S | S | S |
| 40.75 | S | N | N | N | N | O | S | S | S | S | N | N | N | N | S | S | S |
| 41.00 | S | N | N | N | N | N | S | S | S | S | N | N | N | N | O | S | S |
| 41.25 | S | N | N | N | N | N | S | S | S | S | N | N | N | N | N | S | S |
| 41.50 | S | N | N | N | N | N | S | S | S | S | N | N | N | N | N | S | S |
| 41.75 | S | O | N | N | N | N | S | S | S | S | N | N | N | N | N | S | S |
| 42.00 | S | S | N | N | N | N | S | S | S | S | O | N | N | N | N | S | S |
| 42.25 | S | S | N | N | N | N | S | S | S | S | S | N | N | N | N | S | S |
| 42.50 | S | S | N | N | N | N | S | S | S | S | S | N | N | N | N | S | S |
| 42.75 | S | S | N | N | N | N | S | S | S | S | S | N | N | N | N | S | S |
| 43.00 | S | S | N | N | N | N | O | S | S | S | S | N | N | N | N | S | S |
| 43.25 | S | S | N | N | N | N | N | S | S | S | S | N | N | N | N | O | S |
| 43.50 | S | S | N | N | N | N | N | S | S | S | S | N | N | N | N | N | S |
| 43.75 | S | S | N | N | N | N | N | S | S | S | S | N | N | N | N | N | S |
| 44.00 | S | S | O | N | N | N | N | S | S | S | S | N | N | N | N | N | S |
| 44.25 | S | S | S | N | N | N | N | S | S | S | S | O | N | N | N | N | S |
| 44.50 | S | S | S | N | N | N | N | S | S | S | S | S | N | N | N | N | S |
| 44.75 | S | S | S | N | N | N | N | S | S | S | S | S | N | N | N | N | S |
| 45.00 | S | S | S | N | N | N | N | S | S | S | S | S | N | N | N | N | S |
| 45.25 | S | S | S | N | N | N | N | O | S | S | S | S | N | N | N | N | S |
| 45.50 | S | S | S | N | N | N | N | N | S | S | S | S | N | N | N | N | O |
| 45.75 | S | S | S | N | N | N | N | N | S | S | S | S | N | N | N | N | N |
| 46.00 | S | S | S | N | N | N | N | N | S | S | S | S | N | N | N | N | N |
| 46.25 | S | S | S | O | N | N | N | N | S | S | S | S | N | N | N | N | N |
| 46.50 | S | S | S | S | N | N | N | N | S | S | S | S | O | N | N | N | N |
| 46.75 | S | S | S | S | N | N | N | N | S | S | S | S | S | N | N | N | N |
| 47.00 | S | S | S | S | N | N | N | N | S | S | S | S | S | N | N | N | N |
| 47.25 | S | S | S | S | N | N | N | N | S | S | S | S | S | N | N | N | N |
| 47.50 | S | S | S | S | N | N | N | N | O | S | S | S | S | N | N | N | N |
| 47.75 | S | S | S | S | N | N | N | N | N | S | S | S | S | N | N | N | N |

Page Row 4, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 36.00 | N | N | N | N | S | S | S | S | S | N | N | N | N | S | S | S | S |
| 36.25 | N | N | N | N | S | S | S | S | S | N | N | N | N | S | S | S | S |
| 36.50 | N | N | N | N | S | S | S | S | S | N | N | N | N | S | S | S | S |
| 36.75 | N | N | N | N | O | S | S | S | S | N | N | N | N | S | S | S | S |
| 37.00 | N | N | N | N | N | S | S | S | S | N | N | N | N | O | S | S | S |
| 37.25 | N | N | N | N | N | S | S | S | S | N | N | N | N | N | S | S | S |
| 37.50 | N | N | N | N | N | S | S | S | S | N | N | N | N | N | S | S | S |
| 37.75 | O | N | N | N | N | S | S | S | S | N | N | N | N | N | S | S | S |
| 38.00 | S | N | N | N | N | S | S | S | S | O | N | N | N | N | S | S | S |
| 38.25 | S | N | N | N | N | S | S | S | S | S | N | N | N | N | S | S | S |
| 38.50 | S | N | N | N | N | S | S | S | S | S | N | N | N | N | S | S | S |
| 38.75 | S | N | N | N | N | S | S | S | S | S | N | N | N | N | S | S | S |
| 39.00 | S | N | N | N | N | O | S | S | S | S | N | N | N | N | S | S | S |
| 39.25 | S | N | N | N | N | N | S | S | S | S | N | N | N | N | O | S | S |
| 39.50 | S | N | N | N | N | N | S | S | S | S | N | N | N | N | N | S | S |
| 39.75 | S | N | N | N | N | N | S | S | S | S | N | N | N | N | N | S | S |
| 40.00 | S | O | N | N | N | N | S | S | S | S | N | N | N | N | N | S | S |
| 40.25 | S | S | N | N | N | N | S | S | S | S | O | N | N | N | N | S | S |
| 40.50 | S | S | N | N | N | N | S | S | S | S | S | N | N | N | N | S | S |
| 40.75 | S | S | N | N | N | N | S | S | S | S | S | N | N | N | N | S | S |
| 41.00 | S | S | N | N | N | N | S | S | S | S | S | N | N | N | N | S | S |
| 41.25 | S | S | N | N | N | N | O | S | S | S | S | N | N | N | N | S | S |
| 41.50 | S | S | N | N | N | N | N | S | S | S | S | N | N | N | N | O | S |
| 41.75 | S | S | N | N | N | N | N | S | S | S | S | N | N | N | N | N | S |
| 42.00 | S | S | N | N | N | N | N | S | S | S | S | N | N | N | N | N | S |
| 42.25 | S | S | O | N | N | N | N | S | S | S | S | N | N | N | N | N | S |
| 42.50 | S | S | S | N | N | N | N | S | S | S | S | O | N | N | N | N | S |
| 42.75 | S | S | S | N | N | N | N | S | S | S | S | S | N | N | N | N | S |
| 43.00 | S | S | S | N | N | N | N | S | S | S | S | S | N | N | N | N | S |
| 43.25 | S | S | S | N | N | N | N | S | S | S | S | S | N | N | N | N | S |

-continued

| Coil Excitation | | | | | | | | | | | | | | | | | |
|---|---|---|---|---|---|---|---|---|---|---|---|---|---|---|---|---|---|
| 43.50 | S | S | S | N | N | N | N | O | S | S | S | S | N | N | N | N | S |
| 43.75 | S | S | S | N | N | N | N | N | S | S | S | S | N | N | N | N | O |
| 44.00 | S | S | S | N | N | N | N | N | S | S | S | S | N | N | N | N | N |
| 44.25 | S | S | S | N | N | N | N | N | S | S | S | S | N | N | N | N | N |
| 44.50 | S | S | S | O | N | N | N | N | S | S | S | S | N | N | N | N | N |
| 44.75 | S | S | S | S | N | N | N | N | S | S | S | S | O | N | N | N | N |
| 45.00 | S | S | S | S | N | N | N | N | S | S | S | S | S | N | N | N | N |
| 45.25 | S | S | S | S | N | N | N | N | S | S | S | S | S | N | N | N | N |
| 45.50 | S | S | S | S | N | N | N | N | S | S | S | S | S | N | N | N | N |
| 45.75 | S | S | S | S | N | N | N | N | O | S | S | S | S | N | N | N | N |
| 46.00 | S | S | S | S | N | N | N | N | N | S | S | S | S | N | N | N | N |
| 46.25 | S | S | S | S | N | N | N | N | N | S | S | S | S | N | N | N | N |
| 46.50 | S | S | S | S | N | N | N | N | N | S | S | S | S | N | N | N | N |
| 46.75 | S | S | S | S | O | N | N | N | N | S | S | S | S | N | N | N | N |
| 47.00 | S | S | S | S | S | N | N | N | N | S | S | S | S | O | N | N | N |
| 47.25 | S | S | S | S | S | N | N | N | N | S | S | S | S | S | N | N | N |
| 47.50 | S | S | S | S | S | N | N | N | N | S | S | S | S | S | N | N | N |
| 47.75 | O | S | S | S | S | N | N | N | N | S | S | S | S | S | N | N | N |

Page Row 4, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 36.00 | O | N | N | N | N | S | S | S | S | N | N | N | N | N | S | S | S |
| 36.25 | S | N | N | N | N | S | S | S | S | O | N | N | N | N | S | S | S |
| 36.50 | S | N | N | N | N | S | S | S | S | S | N | N | N | N | S | S | S |
| 36.75 | S | N | N | N | N | S | S | S | S | S | N | N | N | N | S | S | S |
| 37.00 | S | N | N | N | N | S | S | S | S | S | N | N | N | N | S | S | S |
| 37.25 | S | N | N | N | N | O | S | S | S | S | N | N | N | N | S | S | S |
| 37.50 | S | N | N | N | N | N | S | S | S | S | N | N | N | N | O | S | S |
| 37.75 | S | N | N | N | N | N | S | S | S | S | N | N | N | N | N | S | S |
| 38.00 | S | N | N | N | N | N | S | S | S | S | N | N | N | N | N | S | S |
| 38.25 | S | O | N | N | N | N | S | S | S | S | N | N | N | N | N | S | S |
| 38.50 | S | S | N | N | N | N | S | S | S | S | O | N | N | N | N | S | S |
| 38.75 | S | S | N | N | N | N | S | S | S | S | S | N | N | N | N | S | S |
| 39.00 | S | S | N | N | N | N | S | S | S | S | S | N | N | N | N | S | S |
| 39.25 | S | S | N | N | N | N | S | S | S | S | S | N | N | N | N | S | S |
| 39.50 | S | S | N | N | N | N | O | S | S | S | S | N | N | N | N | S | S |
| 39.75 | S | S | N | N | N | N | N | S | S | S | S | N | N | N | N | O | S |
| 40.00 | S | S | N | N | N | N | N | S | S | S | S | N | N | N | N | N | S |
| 40.25 | S | S | N | N | N | N | N | S | S | S | S | N | N | N | N | N | S |
| 40.50 | S | S | O | N | N | N | N | S | S | S | S | N | N | N | N | N | S |
| 40.75 | S | S | S | N | N | N | N | S | S | S | S | O | N | N | N | N | S |
| 41.00 | S | S | S | N | N | N | N | S | S | S | S | S | N | N | N | N | S |
| 41.25 | S | S | S | N | N | N | N | S | S | S | S | S | N | N | N | N | S |
| 41.50 | S | S | S | N | N | N | N | S | S | S | S | S | N | N | N | N | S |
| 41.75 | S | S | S | N | N | N | N | O | S | S | S | S | N | N | N | N | S |
| 42.00 | S | S | S | N | N | N | N | N | S | S | S | S | N | N | N | N | O |
| 42.25 | S | S | S | N | N | N | N | N | S | S | S | S | N | N | N | N | N |
| 42.50 | S | S | S | N | N | N | N | N | S | S | S | S | N | N | N | N | N |
| 42.75 | S | S | S | O | N | N | N | N | S | S | S | S | N | N | N | N | N |
| 43.00 | S | S | S | S | N | N | N | N | S | S | S | S | O | N | N | N | N |
| 43.25 | S | S | S | S | N | N | N | N | S | S | S | S | S | N | N | N | N |
| 43.50 | S | S | S | S | N | N | N | N | S | S | S | S | S | N | N | N | N |
| 43.75 | S | S | S | S | N | N | N | N | S | S | S | S | S | N | N | N | N |
| 44.00 | S | S | S | S | N | N | N | N | O | S | S | S | S | N | N | N | N |
| 44.25 | S | S | S | S | N | N | N | N | N | S | S | S | S | N | N | N | N |
| 44.50 | S | S | S | S | N | N | N | N | N | S | S | S | S | N | N | N | N |
| 44.75 | S | S | S | S | N | N | N | N | N | S | S | S | S | N | N | N | N |
| 45.00 | S | S | S | S | O | N | N | N | N | S | S | S | S | N | N | N | N |
| 45.25 | S | S | S | S | S | N | N | N | N | S | S | S | S | O | N | N | N |
| 45.50 | S | S | S | S | S | N | N | N | N | S | S | S | S | S | N | N | N |
| 45.75 | S | S | S | S | S | N | N | N | N | S | S | S | S | S | N | N | N |
| 46.00 | O | S | S | S | S | N | N | N | N | S | S | S | S | S | N | N | N |
| 46.25 | N | S | S | S | S | N | N | N | N | O | S | S | S | S | N | N | N |
| 46.50 | N | S | S | S | S | N | N | N | N | N | S | S | S | S | N | N | N |
| 46.75 | N | S | S | S | S | N | N | N | N | N | S | S | S | S | N | N | N |
| 47.00 | N | S | S | S | S | N | N | N | N | N | S | S | S | S | N | N | N |
| 47.25 | N | S | S | S | S | O | N | N | N | N | S | S | S | S | N | N | N |
| 47.50 | N | S | S | S | S | S | N | N | N | N | S | S | S | S | O | N | N |
| 47.75 | N | S | S | S | S | S | N | N | N | N | S | S | S | S | S | N | N |

Page Row 4, Page Column 9

| Coil | 154 | 155 | 156 | 157 | 158 | 159 | 160 |
|---|---|---|---|---|---|---|---|
| 36.00 | S | N | N | N | N | N | S |
| 36.25 | S | N | N | N | N | N | S |
| 36.50 | S | O | N | N | N | N | S |

-continued

| Coil Excitation | | | | | | | |
|---|---|---|---|---|---|---|---|
| 36.75 | S | S | N | N | N | N | S |
| 37.00 | S | S | N | N | N | N | S |
| 37.25 | S | S | N | N | N | N | S |
| 37.50 | S | S | N | N | N | N | S |
| 37.75 | S | S | N | N | N | N | O |
| 38.00 | S | S | N | N | N | N | N |
| 38.25 | S | S | N | N | N | N | N |
| 38.50 | S | S | N | N | N | N | N |
| 38.75 | S | S | O | N | N | N | N |
| 39.00 | S | S | S | N | N | N | N |
| 39.25 | S | S | S | N | N | N | N |
| 39.50 | S | S | S | N | N | N | N |
| 39.75 | S | S | S | N | N | N | N |
| 40.00 | S | S | S | N | N | N | N |
| 40.25 | S | S | S | N | N | N | N |
| 40.50 | S | S | S | N | N | N | N |
| 40.75 | S | S | S | N | N | N | N |
| 41.00 | S | S | S | O | N | N | N |
| 41.25 | S | S | S | S | N | N | N |
| 41.50 | S | S | S | S | N | N | N |
| 41.75 | S | S | S | S | N | N | N |
| 42.00 | S | S | S | S | N | N | N |
| 42.25 | S | S | S | S | N | N | N |
| 42.50 | S | S | S | S | N | N | N |
| 42.75 | S | S | S | S | N | N | N |
| 43.00 | S | S | S | S | N | N | N |
| 43.25 | S | S | S | S | O | N | N |
| 43.50 | S | S | S | S | S | N | N |
| 43.75 | S | S | S | S | S | N | N |
| 44.00 | S | S | S | S | S | N | N |
| 44.25 | O | S | S | S | S | N | N |
| 44.50 | N | S | S | S | S | N | N |
| 44.75 | N | S | S | S | S | N | N |
| 45.00 | N | S | S | S | S | N | N |
| 45.25 | N | S | S | S | S | N | N |
| 45.50 | N | S | S | S | S | O | N |
| 45.75 | N | S | S | S | S | S | N |
| 46.00 | N | S | S | S | S | S | N |
| 46.25 | N | S | S | S | S | S | N |
| 46.50 | N | O | S | S | S | S | N |
| 46.75 | N | N | S | S | S | S | N |
| 47.00 | N | N | S | S | S | S | N |
| 47.25 | N | N | S | S | S | S | N |
| 47.50 | N | N | S | S | S | S | N |
| 47.75 | N | N | S | S | S | S | O |

Page Row 4, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 48.00 | N | N | N | N | S | S | S | S | O | N | N | N | N | S | S | S | S |
| 48.25 | N | N | N | N | S | S | S | S | S | N | N | N | N | S | S | S | S |
| 48.50 | N | N | N | N | S | S | S | S | S | N | N | N | N | S | S | S | S |
| 48.75 | N | N | N | N | S | S | S | S | S | N | N | N | N | S | S | S | S |
| 49.00 | N | N | N | N | O | S | S | S | S | N | N | N | N | S | S | S | S |
| 49.25 | N | N | N | N | N | S | S | S | S | N | N | N | N | O | S | S | S |
| 49.50 | N | N | N | N | N | S | S | S | S | N | N | N | N | N | S | S | S |
| 49.75 | N | N | N | N | N | S | S | S | S | N | N | N | N | N | S | S | S |
| 50.00 | O | N | N | N | N | S | S | S | S | N | N | N | N | N | S | S | S |
| 50.25 | S | N | N | N | N | S | S | S | S | O | N | N | N | N | S | S | S |
| 50.50 | S | N | N | N | N | S | S | S | S | S | N | N | N | N | S | S | S |
| 50.75 | S | N | N | N | N | S | S | S | S | S | N | N | N | N | S | S | S |
| 51.00 | S | N | N | N | N | S | S | S | S | S | N | N | N | N | S | S | S |
| 51.25 | S | N | N | N | N | O | S | S | S | S | N | N | N | N | S | S | S |
| 51.50 | S | N | N | N | N | N | S | S | S | S | N | N | N | N | O | S | S |
| 51.75 | S | N | N | N | N | N | S | S | S | S | N | N | N | N | N | S | S |
| 52.00 | S | N | N | N | N | N | S | S | S | S | N | N | N | N | N | S | S |
| 52.25 | S | O | N | N | N | N | S | S | S | S | N | N | N | N | N | S | S |
| 52.50 | S | S | N | N | N | N | S | S | S | S | O | N | N | N | N | S | S |
| 52.75 | S | S | N | N | N | N | S | S | S | S | S | N | N | N | N | S | S |
| 53.00 | S | S | N | N | N | N | S | S | S | S | S | N | N | N | N | S | S |
| 53.25 | S | S | N | N | N | N | S | S | S | S | S | N | N | N | N | S | S |
| 53.50 | S | S | N | N | N | N | O | S | S | S | S | N | N | N | N | S | S |
| 53.75 | S | S | N | N | N | N | N | S | S | S | S | N | N | N | N | O | S |
| 54.00 | S | S | N | N | N | N | N | S | S | S | S | N | N | N | N | N | S |
| 54.25 | S | S | N | N | N | N | N | S | S | S | S | N | N | N | N | N | S |
| 54.50 | S | S | O | N | N | N | N | S | S | S | S | N | N | N | N | N | S |
| 54.75 | S | S | S | N | N | N | N | S | S | S | S | O | N | N | N | N | S |

-continued

| Coil Excitation | | | | | | | | | | | | | | | | | |
|---|---|---|---|---|---|---|---|---|---|---|---|---|---|---|---|---|---|
| 55.00 | S | S | S | N | N | N | N | S | S | S | S | S | N | N | N | N | S |
| 55.25 | S | S | S | N | N | N | N | S | S | S | S | S | N | N | N | N | S |
| 55.50 | S | S | S | N | N | N | N | S | S | S | S | S | N | N | N | N | S |
| 55.75 | S | S | S | N | N | N | N | O | S | S | S | S | N | N | N | N | S |
| 56.00 | S | S | S | N | N | N | N | N | S | S | S | S | N | N | N | N | O |
| 56.25 | S | S | S | N | N | N | N | N | S | S | S | S | N | N | N | N | N |
| 56.50 | S | S | S | N | N | N | N | N | S | S | S | S | N | N | N | N | N |
| 56.75 | S | S | S | O | N | N | N | N | S | S | S | S | N | N | N | N | N |
| 57.00 | S | S | S | S | N | N | N | N | S | S | S | S | O | N | N | N | N |
| 57.25 | S | S | S | S | N | N | N | N | S | S | S | S | S | N | N | N | N |
| 57.50 | S | S | S | S | N | N | N | N | S | S | S | S | S | N | N | N | N |
| 57.75 | S | S | S | S | N | N | N | N | S | S | S | S | S | N | N | N | N |
| 58.00 | S | S | S | S | N | N | N | N | O | S | S | S | S | N | N | N | N |
| 58.25 | S | S | S | S | N | N | N | N | N | S | S | S | S | N | N | N | N |
| 58.50 | S | S | S | S | N | N | N | N | N | S | S | S | S | N | N | N | N |
| 58.75 | S | S | S | S | N | N | N | N | N | S | S | S | S | N | N | N | N |
| 59.00 | S | S | S | S | O | N | N | N | N | S | S | S | S | N | N | N | N |
| 59.25 | S | S | S | S | S | N | N | N | N | S | S | S | S | O | N | N | N |
| 59.50 | S | S | S | S | S | N | N | N | N | S | S | S | S | S | N | N | N |
| 59.75 | S | S | S | S | S | N | N | N | N | S | S | S | S | S | N | N | N |

Page Row 5, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 48.00 | N | N | N | N | N | S | S | S | S | N | N | N | N | N | S | S | S |
| 48.25 | O | N | N | N | N | S | S | S | S | N | N | N | N | N | S | S | S |
| 48.50 | S | N | N | N | N | S | S | S | S | O | N | N | N | N | S | S | S |
| 48.75 | S | N | N | N | N | S | S | S | S | S | N | N | N | N | S | S | S |
| 49.00 | S | N | N | N | N | S | S | S | S | S | N | N | N | N | S | S | S |
| 49.25 | S | N | N | N | N | S | S | S | S | S | N | N | N | N | S | S | S |
| 49.50 | S | N | N | N | N | O | S | S | S | S | N | N | N | N | S | S | S |
| 49.75 | S | N | N | N | N | N | S | S | S | S | N | N | N | N | O | S | S |
| 50.00 | S | N | N | N | N | N | S | S | S | S | N | N | N | N | N | S | S |
| 50.25 | S | N | N | N | N | N | S | S | S | S | N | N | N | N | N | S | S |
| 50.50 | S | O | N | N | N | N | S | S | S | S | N | N | N | N | N | S | S |
| 50.75 | S | S | N | N | N | N | S | S | S | S | O | N | N | N | N | S | S |
| 51.00 | S | S | N | N | N | N | S | S | S | S | S | N | N | N | N | S | S |
| 51.25 | S | S | N | N | N | N | S | S | S | S | S | N | N | N | N | S | S |
| 51.50 | S | S | N | N | N | N | S | S | S | S | S | N | N | N | N | S | S |
| 51.75 | S | S | N | N | N | N | O | S | S | S | S | N | N | N | N | S | S |
| 52.00 | S | S | N | N | N | N | N | S | S | S | S | N | N | N | N | O | S |
| 52.25 | S | S | N | N | N | N | N | S | S | S | S | N | N | N | N | N | S |
| 52.50 | S | S | N | N | N | N | N | S | S | S | S | N | N | N | N | N | S |
| 52.75 | S | S | O | N | N | N | N | S | S | S | S | N | N | N | N | N | S |
| 53.00 | S | S | S | N | N | N | N | S | S | S | S | O | N | N | N | N | S |
| 53.25 | S | S | S | N | N | N | N | S | S | S | S | S | N | N | N | N | S |
| 53.50 | S | S | S | N | N | N | N | S | S | S | S | S | N | N | N | N | S |
| 53.75 | S | S | S | N | N | N | N | S | S | S | S | S | N | N | N | N | S |
| 54.00 | S | S | S | N | N | N | N | O | S | S | S | S | N | N | N | N | S |
| 54.25 | S | S | S | N | N | N | N | N | S | S | S | S | N | N | N | N | O |
| 54.50 | S | S | S | N | N | N | N | N | S | S | S | S | N | N | N | N | N |
| 54.75 | S | S | S | N | N | N | N | N | S | S | S | S | N | N | N | N | N |
| 55.00 | S | S | S | O | N | N | N | N | S | S | S | S | N | N | N | N | N |
| 55.25 | S | S | S | S | N | N | N | N | S | S | S | S | O | N | N | N | N |
| 55.50 | S | S | S | S | N | N | N | N | S | S | S | S | S | N | N | N | N |
| 55.75 | S | S | S | S | N | N | N | N | S | S | S | S | S | N | N | N | N |
| 56.00 | S | S | S | S | N | N | N | N | S | S | S | S | S | N | N | N | N |
| 56.25 | S | S | S | S | N | N | N | N | O | S | S | S | S | N | N | N | N |
| 56.50 | S | S | S | S | N | N | N | N | N | S | S | S | S | N | N | N | N |
| 56.75 | S | S | S | S | N | N | N | N | N | S | S | S | S | N | N | N | N |
| 57.00 | S | S | S | S | N | N | N | N | N | S | S | S | S | N | N | N | N |
| 57.25 | S | S | S | S | O | N | N | N | N | S | S | S | S | N | N | N | N |
| 57.50 | S | S | S | S | S | N | N | N | N | S | S | S | S | O | N | N | N |
| 57.75 | S | S | S | S | S | N | N | N | N | S | S | S | S | S | N | N | N |
| 58.00 | S | S | S | S | S | N | N | N | N | S | S | S | S | S | N | N | N |
| 58.25 | O | S | S | S | S | N | N | N | N | S | S | S | S | S | N | N | N |
| 58.50 | N | S | S | S | S | N | N | N | N | O | S | S | S | S | N | N | N |
| 58.75 | N | S | S | S | S | N | N | N | N | N | S | S | S | S | N | N | N |
| 59.00 | N | S | S | S | S | N | N | N | N | N | S | S | S | S | N | N | N |
| 59.25 | N | S | S | S | S | N | N | N | N | N | S | S | S | S | N | N | N |
| 59.50 | N | S | S | S | S | O | N | N | N | N | S | S | S | S | N | N | N |
| 59.75 | N | S | S | S | S | S | N | N | N | N | S | S | S | S | O | N | N |

Page Row 5, Page Column 2

-continued

| Coil Excitation | | | | | | | | | | | | | | | | | |
|---|---|---|---|---|---|---|---|---|---|---|---|---|---|---|---|---|---|
| Coil | 35 | 36 | 37 | 38 | 39 | 40 | 41 | 42 | 43 | 44 | 45 | 46 | 47 | 48 | 49 | 50 | 51 |
| 48.00 | S | N | N | N | N | N | S | S | S | S | N | N | N | N | O | S | S |
| 48.25 | S | N | N | N | N | N | S | S | S | S | N | N | N | N | N | S | S |
| 48.50 | S | N | N | N | N | N | S | S | S | S | N | N | N | N | N | S | S |
| 48.75 | S | O | N | N | N | N | S | S | S | S | N | N | N | N | N | S | S |
| 49.00 | S | S | N | N | N | N | S | S | S | S | O | N | N | N | N | S | S |
| 49.25 | S | S | N | N | N | N | S | S | S | S | S | N | N | N | N | S | S |
| 49.50 | S | S | N | N | N | N | S | S | S | S | S | N | N | N | N | S | S |
| 49.75 | S | S | N | N | N | N | S | S | S | S | S | N | N | N | N | S | S |
| 50.00 | S | S | N | N | N | N | O | S | S | S | S | N | N | N | N | S | S |
| 50.25 | S | S | N | N | N | N | N | S | S | S | S | N | N | N | N | O | S |
| 50.50 | S | S | N | N | N | N | N | S | S | S | S | N | N | N | N | N | S |
| 50.75 | S | S | N | N | N | N | N | S | S | S | S | N | N | N | N | N | S |
| 51.00 | S | S | O | N | N | N | N | S | S | S | S | N | N | N | N | N | S |
| 51.25 | S | S | S | N | N | N | N | S | S | S | S | O | N | N | N | N | S |
| 51.50 | S | S | S | N | N | N | N | S | S | S | S | S | N | N | N | N | S |
| 51.75 | S | S | S | N | N | N | N | S | S | S | S | S | N | N | N | N | S |
| 52.00 | S | S | S | N | N | N | N | S | S | S | S | S | N | N | N | N | S |
| 52.25 | S | S | S | N | N | N | N | O | S | S | S | S | N | N | N | N | S |
| 52.50 | S | S | S | N | N | N | N | N | S | S | S | S | N | N | N | N | O |
| 52.75 | S | S | S | N | N | N | N | N | S | S | S | S | N | N | N | N | N |
| 53.00 | S | S | S | N | N | N | N | N | S | S | S | S | N | N | N | N | N |
| 53.25 | S | S | S | O | N | N | N | N | S | S | S | S | N | N | N | N | N |
| 53.50 | S | S | S | S | N | N | N | N | S | S | S | S | O | N | N | N | N |
| 53.75 | S | S | S | S | N | N | N | N | S | S | S | S | S | N | N | N | N |
| 54.00 | S | S | S | S | N | N | N | N | S | S | S | S | S | N | N | N | N |
| 54.25 | S | S | S | S | N | N | N | N | S | S | S | S | S | N | N | N | N |
| 54.50 | S | S | S | S | N | N | N | N | O | S | S | S | S | N | N | N | N |
| 54.75 | S | S | S | S | N | N | N | N | N | S | S | S | S | N | N | N | N |
| 55.00 | S | S | S | S | N | N | N | N | N | S | S | S | S | N | N | N | N |
| 55.25 | S | S | S | S | N | N | N | N | N | S | S | S | S | N | N | N | N |
| 55.50 | S | S | S | S | O | N | N | N | N | S | S | S | S | N | N | N | N |
| 55.75 | S | S | S | S | S | N | N | N | N | S | S | S | S | O | N | N | N |
| 56.00 | S | S | S | S | S | N | N | N | N | S | S | S | S | S | N | N | N |
| 56.25 | S | S | S | S | S | N | N | N | N | S | S | S | S | S | N | N | N |
| 56.50 | O | S | S | S | S | N | N | N | N | S | S | S | S | S | N | N | N |
| 56.75 | N | S | S | S | S | N | N | N | N | O | S | S | S | S | N | N | N |
| 57.00 | N | S | S | S | S | N | N | N | N | N | S | S | S | S | N | N | N |
| 57.25 | N | S | S | S | S | N | N | N | N | N | S | S | S | S | N | N | N |
| 57.50 | N | S | S | S | S | N | N | N | N | N | S | S | S | S | N | N | N |
| 57.75 | N | S | S | S | S | O | N | N | N | N | S | S | S | S | N | N | N |
| 58.00 | N | S | S | S | S | S | N | N | N | N | S | S | S | S | O | N | N |
| 58.25 | N | S | S | S | S | S | N | N | N | N | S | S | S | S | S | N | N |
| 58.50 | N | S | S | S | S | S | N | N | N | N | S | S | S | S | S | N | N |
| 58.75 | N | O | S | S | S | S | N | N | N | N | S | S | S | S | S | N | N |
| 59.00 | N | N | S | S | S | S | N | N | N | N | O | S | S | S | S | N | N |
| 59.25 | N | N | S | S | S | S | N | N | N | N | N | S | S | S | S | N | N |
| 59.50 | N | N | S | S | S | S | N | N | N | N | N | S | S | S | S | N | N |
| 59.75 | N | N | S | S | S | S | N | N | N | N | N | S | S | S | S | N | N |

Page Row 5, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 48.00 | S | S | N | N | N | N | S | S | S | S | S | N | N | N | N | S | S |
| 48.25 | S | S | N | N | N | N | O | S | S | S | S | N | N | N | N | S | S |
| 48.50 | S | S | N | N | N | N | N | S | S | S | S | N | N | N | N | O | S |
| 48.75 | S | S | N | N | N | N | N | S | S | S | S | N | N | N | N | N | S |
| 49.00 | S | S | N | N | N | N | N | S | S | S | S | N | N | N | N | N | S |
| 49.25 | S | S | O | N | N | N | N | S | S | S | S | N | N | N | N | N | S |
| 49.50 | S | S | S | N | N | N | N | S | S | S | S | O | N | N | N | N | S |
| 49.75 | S | S | S | N | N | N | N | S | S | S | S | S | N | N | N | N | S |
| 50.00 | S | S | S | N | N | N | N | S | S | S | S | S | N | N | N | N | S |
| 50.25 | S | S | S | N | N | N | N | S | S | S | S | S | N | N | N | N | S |
| 50.50 | S | S | S | N | N | N | N | O | S | S | S | S | N | N | N | N | S |
| 50.75 | S | S | S | N | N | N | N | N | S | S | S | S | N | N | N | N | O |
| 51.00 | S | S | S | N | N | N | N | N | S | S | S | S | N | N | N | N | N |
| 51.25 | S | S | S | N | N | N | N | N | S | S | S | S | N | N | N | N | N |
| 51.50 | S | S | S | O | N | N | N | N | S | S | S | S | N | N | N | N | N |
| 51.75 | S | S | S | S | N | N | N | N | S | S | S | S | O | N | N | N | N |
| 52.00 | S | S | S | S | N | N | N | N | S | S | S | S | S | N | N | N | N |
| 52.25 | S | S | S | S | N | N | N | N | S | S | S | S | S | N | N | N | N |
| 52.50 | S | S | S | S | N | N | N | N | S | S | S | S | S | N | N | N | N |
| 52.75 | S | S | S | S | N | N | N | N | O | S | S | S | S | N | N | N | N |
| 53.00 | S | S | S | S | N | N | N | N | N | S | S | S | S | N | N | N | N |
| 53.25 | S | S | S | S | N | N | N | N | N | S | S | S | S | N | N | N | N |
| 53.50 | S | S | S | S | N | N | N | N | N | S | S | S | S | N | N | N | N |

-continued

| Coil Excitation | | | | | | | | | | | | | | | | |
|---|---|---|---|---|---|---|---|---|---|---|---|---|---|---|---|---|
| 53.75 | S | S | S | S | O | N | N | N | N | S | S | S | S | N | N | N | N |
| 54.00 | S | S | S | S | S | N | N | N | N | S | S | S | S | O | N | N | N |
| 54.25 | S | S | S | S | S | N | N | N | N | S | S | S | S | S | N | N | N |
| 54.50 | S | S | S | S | S | N | N | N | N | S | S | S | S | S | N | N | N |
| 54.75 | O | S | S | S | S | N | N | N | N | S | S | S | S | S | N | N | N |
| 55.00 | N | S | S | S | S | N | N | N | N | O | S | S | S | S | N | N | N |
| 55.25 | N | S | S | S | S | N | N | N | N | N | S | S | S | S | N | N | N |
| 55.50 | N | S | S | S | S | N | N | N | N | N | S | S | S | S | N | N | N |
| 55.75 | N | S | S | S | S | N | N | N | N | N | S | S | S | S | N | N | N |
| 56.00 | N | S | S | S | S | O | N | N | N | N | S | S | S | S | N | N | N |
| 56.25 | N | S | S | S | S | S | N | N | N | N | S | S | S | S | O | N | N |
| 56.50 | N | S | S | S | S | S | N | N | N | N | S | S | S | S | S | N | N |
| 56.75 | N | S | S | S | S | S | N | N | N | N | S | S | S | S | S | N | N |
| 57.00 | N | O | S | S | S | S | N | N | N | N | S | S | S | S | S | N | N |
| 57.25 | N | N | S | S | S | S | N | N | N | N | O | S | S | S | S | N | N |
| 57.50 | N | N | S | S | S | S | N | N | N | N | N | S | S | S | S | N | N |
| 57.75 | N | N | S | S | S | S | N | N | N | N | N | S | S | S | S | N | N |
| 58.00 | N | N | S | S | S | S | N | N | N | N | N | S | S | S | S | N | N |
| 58.25 | N | N | S | S | S | S | O | N | N | N | N | S | S | S | S | N | N |
| 58.50 | N | N | S | S | S | S | S | N | N | N | N | S | S | S | S | O | N |
| 58.75 | N | N | S | S | S | S | S | N | N | N | N | S | S | S | S | S | N |
| 59.00 | N | N | S | S | S | S | S | N | N | N | N | S | S | S | S | S | N |
| 59.25 | N | N | O | S | S | S | S | N | N | N | N | S | S | S | S | S | N |
| 59.50 | N | N | N | S | S | S | S | N | N | N | N | O | S | S | S | S | N |
| 59.75 | N | N | N | S | S | S | S | N | N | N | N | N | S | S | S | S | N |

Page Row 5, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 48.00 | S | S | S | N | N | N | N | S | S | S | S | S | N | N | N | N | S |
| 48.25 | S | S | S | N | N | N | N | S | S | S | S | S | N | N | N | N | S |
| 48.50 | S | S | S | N | N | N | N | S | S | S | S | S | N | N | N | N | S |
| 48.75 | S | S | S | N | N | N | N | O | S | S | S | S | N | N | N | N | S |
| 49.00 | S | S | S | N | N | N | N | N | S | S | S | S | N | N | N | N | O |
| 49.25 | S | S | S | N | N | N | N | N | S | S | S | S | N | N | N | N | N |
| 49.50 | S | S | S | N | N | N | N | N | S | S | S | S | N | N | N | N | N |
| 49.75 | S | S | S | O | N | N | N | N | S | S | S | S | N | N | N | N | N |
| 50.00 | S | S | S | S | N | N | N | N | S | S | S | S | O | N | N | N | N |
| 50.25 | S | S | S | S | N | N | N | N | S | S | S | S | S | N | N | N | N |
| 50.50 | S | S | S | S | N | N | N | N | S | S | S | S | S | N | N | N | N |
| 50.75 | S | S | S | S | N | N | N | N | S | S | S | S | S | N | N | N | N |
| 51.00 | S | S | S | S | N | N | N | N | O | S | S | S | S | N | N | N | N |
| 51.25 | S | S | S | S | N | N | N | N | N | S | S | S | S | N | N | N | N |
| 51.50 | S | S | S | S | N | N | N | N | N | S | S | S | S | N | N | N | N |
| 51.75 | S | S | S | S | N | N | N | N | N | S | S | S | S | N | N | N | N |
| 52.00 | S | S | S | S | O | N | N | N | N | S | S | S | S | N | N | N | N |
| 52.25 | S | S | S | S | S | N | N | N | N | S | S | S | S | O | N | N | N |
| 52.50 | S | S | S | S | S | N | N | N | N | S | S | S | S | S | N | N | N |
| 52.75 | S | S | S | S | S | N | N | N | N | S | S | S | S | S | N | N | N |
| 53.00 | O | S | S | S | S | N | N | N | N | S | S | S | S | S | N | N | N |
| 53.25 | N | S | S | S | S | N | N | N | N | O | S | S | S | S | N | N | N |
| 53.50 | N | S | S | S | S | N | N | N | N | N | S | S | S | S | N | N | N |
| 53.75 | N | S | S | S | S | N | N | N | N | N | S | S | S | S | N | N | N |
| 54.00 | N | S | S | S | S | N | N | N | N | N | S | S | S | S | N | N | N |
| 54.25 | N | S | S | S | S | O | N | N | N | N | S | S | S | S | N | N | N |
| 54.50 | N | S | S | S | S | S | N | N | N | N | S | S | S | S | O | N | N |
| 54.75 | N | S | S | S | S | S | N | N | N | N | S | S | S | S | S | N | N |
| 55.00 | N | S | S | S | S | S | N | N | N | N | S | S | S | S | S | N | N |
| 55.25 | N | O | S | S | S | S | N | N | N | N | S | S | S | S | S | N | N |
| 55.50 | N | N | S | S | S | S | N | N | N | N | O | S | S | S | S | N | N |
| 55.75 | N | N | S | S | S | S | N | N | N | N | N | S | S | S | S | N | N |
| 56.00 | N | N | S | S | S | S | N | N | N | N | N | S | S | S | S | N | N |
| 56.25 | N | N | S | S | S | S | N | N | N | N | N | S | S | S | S | N | N |
| 56.50 | N | N | S | S | S | S | O | N | N | N | N | S | S | S | S | N | N |
| 56.75 | N | N | S | S | S | S | S | N | N | N | N | S | S | S | S | O | N |
| 57.00 | N | N | S | S | S | S | S | N | N | N | N | S | S | S | S | S | N |
| 57.25 | N | N | S | S | S | S | S | N | N | N | N | S | S | S | S | S | N |
| 57.50 | N | N | O | S | S | S | S | N | N | N | N | S | S | S | S | S | N |
| 57.75 | N | N | N | S | S | S | S | N | N | N | N | O | S | S | S | S | N |
| 58.00 | N | N | N | S | S | S | S | N | N | N | N | N | S | S | S | S | N |
| 58.25 | N | N | N | S | S | S | S | N | N | N | N | N | S | S | S | S | N |
| 58.50 | N | N | N | S | S | S | S | N | N | N | N | N | S | S | S | S | N |
| 58.75 | N | N | N | S | S | S | S | O | N | N | N | N | S | S | S | S | N |
| 59.00 | N | N | N | S | S | S | S | S | N | N | N | N | S | S | S | S | O |
| 59.25 | N | N | N | S | S | S | S | S | N | N | N | N | S | S | S | S | S |

-continued

| Coil Excitation | | | | | | | | | | | | | | | | | |
|---|---|---|---|---|---|---|---|---|---|---|---|---|---|---|---|---|---|
| 59.50 | N | N | N | S | S | S | S | S | N | N | N | N | S | S | S | S | S |
| 59.75 | N | N | N | O | S | S | S | S | N | N | N | N | S | S | S | S | S |

Page Row 5, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 48.00 | S | S | S | O | N | N | N | N | S | S | S | S | N | N | N | N | N |
| 48.25 | S | S | S | S | N | N | N | N | S | S | S | S | O | N | N | N | N |
| 48.50 | S | S | S | S | N | N | N | N | S | S | S | S | S | N | N | N | N |
| 48.75 | S | S | S | S | N | N | N | N | S | S | S | S | S | N | N | N | N |
| 49.00 | S | S | S | S | N | N | N | N | S | S | S | S | S | N | N | N | N |
| 49.25 | S | S | S | S | N | N | N | N | O | S | S | S | S | N | N | N | N |
| 49.50 | S | S | S | S | N | N | N | N | N | S | S | S | S | N | N | N | N |
| 49.75 | S | S | S | S | N | N | N | N | N | S | S | S | S | N | N | N | N |
| 50.00 | S | S | S | S | N | N | N | N | N | S | S | S | S | N | N | N | N |
| 50.25 | S | S | S | S | O | N | N | N | N | S | S | S | S | N | N | N | N |
| 50.50 | S | S | S | S | S | N | N | N | N | S | S | S | S | O | N | N | N |
| 50.75 | S | S | S | S | S | N | N | N | N | S | S | S | S | S | N | N | N |
| 51.00 | S | S | S | S | S | N | N | N | N | S | S | S | S | S | N | N | N |
| 51.25 | O | S | S | S | S | N | N | N | N | S | S | S | S | S | N | N | N |
| 51.50 | N | S | S | S | S | N | N | N | N | O | S | S | S | S | N | N | N |
| 51.75 | N | S | S | S | S | N | N | N | N | N | S | S | S | S | N | N | N |
| 52.00 | N | S | S | S | S | N | N | N | N | N | S | S | S | S | N | N | N |
| 52.25 | N | S | S | S | S | N | N | N | N | N | S | S | S | S | N | N | N |
| 52.50 | N | S | S | S | S | O | N | N | N | N | S | S | S | S | N | N | N |
| 52.75 | N | S | S | S | S | S | N | N | N | N | S | S | S | S | O | N | N |
| 53.00 | N | S | S | S | S | S | N | N | N | N | S | S | S | S | S | N | N |
| 53.25 | N | S | S | S | S | S | N | N | N | N | S | S | S | S | S | N | N |
| 53.50 | N | O | S | S | S | S | N | N | N | N | S | S | S | S | S | N | N |
| 53.75 | N | N | S | S | S | S | N | N | N | N | O | S | S | S | S | N | N |
| 54.00 | N | N | S | S | S | S | N | N | N | N | N | S | S | S | S | N | N |
| 54.25 | N | N | S | S | S | S | N | N | N | N | N | S | S | S | S | N | N |
| 54.50 | N | N | S | S | S | S | N | N | N | N | N | S | S | S | S | N | N |
| 54.75 | N | N | S | S | S | S | O | N | N | N | N | S | S | S | S | N | N |
| 55.00 | N | N | S | S | S | S | S | N | N | N | N | S | S | S | S | O | N |
| 55.25 | N | N | S | S | S | S | S | N | N | N | N | S | S | S | S | S | N |
| 55.50 | N | N | S | S | S | S | S | N | N | N | N | S | S | S | S | S | N |
| 55.75 | N | N | O | S | S | S | S | N | N | N | N | S | S | S | S | S | N |
| 56.00 | N | N | N | S | S | S | S | N | N | N | N | O | S | S | S | S | N |
| 56.25 | N | N | N | S | S | S | S | N | N | N | N | N | S | S | S | S | N |
| 56.50 | N | N | N | S | S | S | S | N | N | N | N | N | S | S | S | S | N |
| 56.75 | N | N | N | S | S | S | S | N | N | N | N | N | S | S | S | S | N |
| 57.00 | N | N | N | S | S | S | S | O | N | N | N | N | S | S | S | S | N |
| 57.25 | N | N | N | S | S | S | S | S | N | N | N | N | S | S | S | S | O |
| 57.50 | N | N | N | S | S | S | S | S | N | N | N | N | S | S | S | S | S |
| 57.75 | N | N | N | S | S | S | S | S | N | N | N | N | S | S | S | S | S |
| 58.00 | N | N | N | O | S | S | S | S | N | N | N | N | S | S | S | S | S |
| 58.25 | N | N | N | N | S | S | S | S | N | N | N | N | O | S | S | S | S |
| 58.50 | N | N | N | N | S | S | S | S | N | N | N | N | N | S | S | S | S |
| 58.75 | N | N | N | N | S | S | S | S | N | N | N | N | N | S | S | S | S |
| 59.00 | N | N | N | N | S | S | S | S | N | N | N | N | N | S | S | S | S |
| 59.25 | N | N | N | N | S | S | S | S | O | N | N | N | N | S | S | S | S |
| 59.50 | N | N | N | N | S | S | S | S | S | N | N | N | N | S | S | S | S |
| 59.75 | N | N | N | N | S | S | S | S | S | N | N | N | N | S | S | S | S |

Page Row 5, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 48.00 | S | S | S | S | N | N | N | N | N | S | S | S | S | N | N | N | N |
| 48.25 | S | S | S | S | N | N | N | N | N | S | S | S | S | N | N | N | N |
| 48.50 | S | S | S | S | O | N | N | N | N | S | S | S | S | N | N | N | N |
| 48.75 | S | S | S | S | S | N | N | N | N | S | S | S | S | O | N | N | N |
| 49.00 | S | S | S | S | S | N | N | N | N | S | S | S | S | S | N | N | N |
| 49.25 | S | S | S | S | S | N | N | N | N | S | S | S | S | S | N | N | N |
| 49.50 | O | S | S | S | S | N | N | N | N | S | S | S | S | S | N | N | N |
| 49.75 | N | S | S | S | S | N | N | N | N | O | S | S | S | S | N | N | N |
| 50.00 | N | S | S | S | S | N | N | N | N | N | S | S | S | S | N | N | N |
| 50.25 | N | S | S | S | S | N | N | N | N | N | S | S | S | S | N | N | N |
| 50.50 | N | S | S | S | S | N | N | N | N | N | S | S | S | S | N | N | N |
| 50.75 | N | S | S | S | S | O | N | N | N | N | S | S | S | S | N | N | N |
| 51.00 | N | S | S | S | S | S | N | N | N | N | S | S | S | S | O | N | N |
| 51.25 | N | S | S | S | S | S | N | N | N | N | S | S | S | S | S | N | N |
| 51.50 | N | S | S | S | S | S | N | N | N | N | S | S | S | S | S | N | N |
| 51.75 | N | O | S | S | S | S | N | N | N | N | S | S | S | S | S | N | N |
| 52.00 | N | N | S | S | S | S | N | N | N | N | O | S | S | S | S | N | N |
| 52.25 | N | N | S | S | S | S | N | N | N | N | N | S | S | S | S | N | N |
| 52.50 | N | N | S | S | S | S | N | N | N | N | N | S | S | S | S | N | N |

-continued

Coil Excitation

| | | | | | | | | | | | | | | | | | |
|---|---|---|---|---|---|---|---|---|---|---|---|---|---|---|---|---|---|
| 52.75 | N | N | S | S | S | S | N | N | N | N | N | S | S | S | S | N | N |
| 53.00 | N | N | S | S | S | S | O | N | N | N | N | S | S | S | S | N | N |
| 53.25 | N | N | S | S | S | S | S | N | N | N | N | S | S | S | S | O | N |
| 53.50 | N | N | S | S | S | S | S | N | N | N | N | S | S | S | S | S | N |
| 53.75 | N | N | S | S | S | S | S | N | N | N | N | S | S | S | S | S | N |
| 54.00 | N | N | O | S | S | S | S | N | N | N | N | S | S | S | S | S | N |
| 54.25 | N | N | N | S | S | S | S | N | N | N | N | O | S | S | S | S | N |
| 54.50 | N | N | N | S | S | S | S | N | N | N | N | N | S | S | S | S | N |
| 54.75 | N | N | N | S | S | S | S | N | N | N | N | N | S | S | S | S | N |
| 55.00 | N | N | N | S | S | S | S | N | N | N | N | N | S | S | S | S | N |
| 55.25 | N | N | N | S | S | S | S | O | N | N | N | N | S | S | S | S | N |
| 55.50 | N | N | N | S | S | S | S | S | N | N | N | N | S | S | S | S | O |
| 55.75 | N | N | N | S | S | S | S | S | N | N | N | N | S | S | S | S | S |
| 56.00 | N | N | N | S | S | S | S | S | N | N | N | N | S | S | S | S | S |
| 56.25 | N | N | N | O | S | S | S | S | N | N | N | N | S | S | S | S | S |
| 56.50 | N | N | N | N | S | S | S | S | N | N | N | N | O | S | S | S | S |
| 56.75 | N | N | N | N | S | S | S | S | N | N | N | N | N | S | S | S | S |
| 57.00 | N | N | N | N | S | S | S | S | N | N | N | N | N | S | S | S | S |
| 57.25 | N | N | N | N | S | S | S | S | N | N | N | N | N | S | S | S | S |
| 57.50 | N | N | N | N | S | S | S | S | O | N | N | N | N | S | S | S | S |
| 57.75 | N | N | N | N | S | S | S | S | S | N | N | N | N | S | S | S | S |
| 58.00 | N | N | N | N | S | S | S | S | S | N | N | N | N | S | S | S | S |
| 58.25 | N | N | N | N | S | S | S | S | S | N | N | N | N | S | S | S | S |
| 58.50 | N | N | N | N | O | S | S | S | S | N | N | N | N | S | S | S | S |
| 58.75 | N | N | N | N | N | S | S | S | S | N | N | N | N | O | S | S | S |
| 59.00 | N | N | N | N | N | S | S | S | S | N | N | N | N | N | S | S | S |
| 59.25 | N | N | N | N | N | S | S | S | S | N | N | N | N | N | S | S | S |
| 59.50 | O | N | N | N | N | S | S | S | S | N | N | N | N | N | S | S | S |
| 59.75 | S | N | N | N | N | S | S | S | S | O | N | N | N | N | S | S | S |

Page Row 5, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 48.00 | N | S | S | S | S | N | N | N | N | O | S | S | S | S | N | N | N |
| 48.25 | N | S | S | S | S | N | N | N | N | N | S | S | S | S | N | N | N |
| 48.50 | N | S | S | S | S | N | N | N | N | N | S | S | S | S | N | N | N |
| 48.75 | N | S | S | S | S | N | N | N | N | N | S | S | S | S | N | N | N |
| 49.00 | N | S | S | S | S | O | N | N | N | N | S | S | S | S | N | N | N |
| 49.25 | N | S | S | S | S | S | N | N | N | N | S | S | S | S | O | N | N |
| 49.50 | N | S | S | S | S | S | N | N | N | N | S | S | S | S | S | N | N |
| 49.75 | N | S | S | S | S | S | N | N | N | N | S | S | S | S | S | N | N |
| 50.00 | N | O | S | S | S | S | N | N | N | N | S | S | S | S | S | N | N |
| 50.25 | N | N | S | S | S | S | N | N | N | N | O | S | S | S | S | N | N |
| 50.50 | N | N | S | S | S | S | N | N | N | N | N | S | S | S | S | N | N |
| 50.75 | N | N | S | S | S | S | N | N | N | N | N | S | S | S | S | N | N |
| 51.00 | N | N | S | S | S | S | N | N | N | N | N | S | S | S | S | N | N |
| 51.25 | N | N | S | S | S | S | O | N | N | N | N | S | S | S | S | N | N |
| 51.50 | N | N | S | S | S | S | S | N | N | N | N | S | S | S | S | O | N |
| 51.75 | N | N | S | S | S | S | S | N | N | N | N | S | S | S | S | S | N |
| 52.00 | N | N | S | S | S | S | S | N | N | N | N | S | S | S | S | S | N |
| 52.25 | N | N | O | S | S | S | S | N | N | N | N | S | S | S | S | S | N |
| 52.50 | N | N | N | S | S | S | S | N | N | N | N | O | S | S | S | S | N |
| 52.75 | N | N | N | S | S | S | S | N | N | N | N | N | S | S | S | S | N |
| 53.00 | N | N | N | S | S | S | S | N | N | N | N | N | S | S | S | S | N |
| 53.25 | N | N | N | S | S | S | S | N | N | N | N | N | S | S | S | S | N |
| 53.50 | N | N | N | S | S | S | S | O | N | N | N | N | S | S | S | S | N |
| 53.75 | N | N | N | S | S | S | S | S | N | N | N | N | S | S | S | S | O |
| 54.00 | N | N | N | S | S | S | S | S | N | N | N | N | S | S | S | S | S |
| 54.25 | N | N | N | S | S | S | S | S | N | N | N | N | S | S | S | S | S |
| 54.50 | N | N | N | O | S | S | S | S | N | N | N | N | S | S | S | S | S |
| 54.75 | N | N | N | N | S | S | S | S | N | N | N | N | O | S | S | S | S |
| 55.00 | N | N | N | N | S | S | S | S | N | N | N | N | N | S | S | S | S |
| 55.25 | N | N | N | N | S | S | S | S | N | N | N | N | N | S | S | S | S |
| 55.50 | N | N | N | N | S | S | S | S | N | N | N | N | N | S | S | S | S |
| 55.75 | N | N | N | N | S | S | S | S | O | N | N | N | N | S | S | S | S |
| 56.00 | N | N | N | N | S | S | S | S | S | N | N | N | N | S | S | S | S |
| 56.25 | N | N | N | N | S | S | S | S | S | N | N | N | N | S | S | S | S |
| 56.50 | N | N | N | N | S | S | S | S | S | N | N | N | N | S | S | S | S |
| 56.75 | N | N | N | N | O | S | S | S | S | N | N | N | N | S | S | S | S |
| 57.00 | N | N | N | N | N | S | S | S | S | N | N | N | N | O | S | S | S |
| 57.25 | N | N | N | N | N | S | S | S | S | N | N | N | N | N | S | S | S |
| 57.50 | N | N | N | N | N | S | S | S | S | N | N | N | N | N | S | S | S |
| 57.75 | O | N | N | N | N | S | S | S | S | N | N | N | N | N | S | S | S |
| 58.00 | S | N | N | N | N | S | S | S | S | O | N | N | N | N | S | S | S |
| 58.25 | S | N | N | N | N | S | S | S | S | S | N | N | N | N | S | S | S |
| 58.50 | S | N | N | N | N | S | S | S | S | S | N | N | N | N | S | S | S |
| 58.75 | S | N | N | N | N | S | S | S | S | S | N | N | N | N | S | S | S |

-continued

Coil Excitation

| | | | | | | | | | | | | | | | | | |
|---|---|---|---|---|---|---|---|---|---|---|---|---|---|---|---|---|---|
| 59.00 | S | N | N | N | N | O | S | S | S | S | N | N | N | N | S | S | S |
| 59.25 | S | N | N | N | N | N | S | S | S | S | N | N | N | N | O | S | S |
| 59.50 | S | N | N | N | N | N | S | S | S | S | N | N | N | N | N | S | S |
| 59.75 | S | N | N | N | N | N | S | S | S | S | N | N | N | N | N | S | S |

Page Row 5, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 48.00 | N | S | S | S | S | S | N | N | N | N | S | S | S | S | S | N | N |
| 48.25 | N | O | S | S | S | S | N | N | N | N | S | S | S | S | S | N | N |
| 48.50 | N | N | S | S | S | S | N | N | N | N | O | S | S | S | S | N | N |
| 48.75 | N | N | S | S | S | S | N | N | N | N | N | S | S | S | S | N | N |
| 49.00 | N | N | S | S | S | S | N | N | N | N | N | S | S | S | S | N | N |
| 49.25 | N | N | S | S | S | S | N | N | N | N | N | S | S | S | S | N | N |
| 49.50 | N | N | S | S | S | S | O | N | N | N | N | S | S | S | S | N | N |
| 49.75 | N | N | S | S | S | S | S | N | N | N | N | S | S | S | S | O | N |
| 50.00 | N | N | S | S | S | S | S | N | N | N | N | S | S | S | S | S | N |
| 50.25 | N | N | S | S | S | S | S | N | N | N | N | S | S | S | S | S | N |
| 50.50 | N | N | O | S | S | S | S | N | N | N | N | S | S | S | S | S | N |
| 50.75 | N | N | N | S | S | S | S | N | N | N | N | O | S | S | S | S | N |
| 51.00 | N | N | N | S | S | S | S | N | N | N | N | N | S | S | S | S | N |
| 51.25 | N | N | N | S | S | S | S | N | N | N | N | N | S | S | S | S | N |
| 51.50 | N | N | N | S | S | S | S | N | N | N | N | N | S | S | S | S | N |
| 51.75 | N | N | N | S | S | S | S | O | N | N | N | N | S | S | S | S | N |
| 52.00 | N | N | N | S | S | S | S | S | N | N | N | N | S | S | S | S | O |
| 52.25 | N | N | N | S | S | S | S | S | N | N | N | N | S | S | S | S | S |
| 52.50 | N | N | N | S | S | S | S | S | N | N | N | N | S | S | S | S | S |
| 52.75 | N | N | N | O | S | S | S | S | N | N | N | N | S | S | S | S | S |
| 53.00 | N | N | N | N | S | S | S | S | N | N | N | N | O | S | S | S | S |
| 53.25 | N | N | N | N | S | S | S | S | N | N | N | N | N | S | S | S | S |
| 53.50 | N | N | N | N | S | S | S | S | N | N | N | N | N | S | S | S | S |
| 53.75 | N | N | N | N | S | S | S | S | N | N | N | N | N | S | S | S | S |
| 54.00 | N | N | N | N | S | S | S | S | O | N | N | N | N | S | S | S | S |
| 54.25 | N | N | N | N | S | S | S | S | S | N | N | N | N | S | S | S | S |
| 54.50 | N | N | N | N | S | S | S | S | S | N | N | N | N | S | S | S | S |
| 54.75 | N | N | N | N | S | S | S | S | S | N | N | N | N | S | S | S | S |
| 55.00 | N | N | N | N | O | S | S | S | S | N | N | N | N | S | S | S | S |
| 55.25 | N | N | N | N | N | S | S | S | S | N | N | N | N | O | S | S | S |
| 55.50 | N | N | N | N | N | S | S | S | S | N | N | N | N | N | S | S | S |
| 55.75 | N | N | N | N | N | S | S | S | S | N | N | N | N | N | S | S | S |
| 56.00 | O | N | N | N | N | S | S | S | S | N | N | N | N | N | S | S | S |
| 56.25 | S | N | N | N | N | S | S | S | S | O | N | N | N | N | S | S | S |
| 56.50 | S | N | N | N | N | S | S | S | S | S | N | N | N | N | S | S | S |
| 56.75 | S | N | N | N | N | S | S | S | S | S | N | N | N | N | S | S | S |
| 57.00 | S | N | N | N | N | S | S | S | S | S | N | N | N | N | S | S | S |
| 57.25 | S | N | N | N | N | O | S | S | S | S | N | N | N | N | S | S | S |
| 57.50 | S | N | N | N | N | N | S | S | S | S | N | N | N | N | O | S | S |
| 57.75 | S | N | N | N | N | N | S | S | S | S | N | N | N | N | N | S | S |
| 58.00 | S | N | N | N | N | N | S | S | S | S | N | N | N | N | N | S | S |
| 58.25 | S | O | N | N | N | N | S | S | S | S | N | N | N | N | N | S | S |
| 58.50 | S | S | N | N | N | N | S | S | S | S | O | N | N | N | N | S | S |
| 58.75 | S | S | N | N | N | N | S | S | S | S | S | N | N | N | N | S | S |
| 59.00 | S | S | N | N | N | N | S | S | S | S | S | N | N | N | N | S | S |
| 59.25 | S | S | N | N | N | N | S | S | S | S | S | N | N | N | N | S | S |
| 59.50 | S | S | N | N | N | N | O | S | S | S | S | N | N | N | N | S | S |
| 59.75 | S | S | N | N | N | N | N | S | S | S | S | N | N | N | N | O | S |

Page Row 5, Page Column 9

| Coil | 154 | 155 | 156 | 157 | 158 | 159 | 160 |
|---|---|---|---|---|---|---|---|
| 48.00 | N | N | S | S | S | S | S |
| 48.25 | N | N | S | S | S | S | S |
| 48.50 | N | N | S | S | S | S | S |
| 48.75 | N | N | O | S | S | S | S |
| 49.00 | N | N | N | S | S | S | S |
| 49.25 | N | N | N | S | S | S | S |
| 49.50 | N | N | N | S | S | S | S |
| 49.75 | N | N | N | S | S | S | S |
| 50.00 | N | N | N | S | S | S | S |
| 50.25 | N | N | N | S | S | S | S |
| 50.50 | N | N | N | S | S | S | S |
| 50.75 | N | N | N | S | S | S | S |
| 51.00 | N | N | N | O | S | S | S |
| 51.25 | N | N | N | N | S | S | S |
| 51.50 | N | N | N | N | S | S | S |
| 51.75 | N | N | N | N | S | S | S |
| 52.00 | N | N | N | N | S | S | S |

-continued

| Coil Excitation | | | | | | | |
|---|---|---|---|---|---|---|---|
| 52.25 | N | N | N | N | S | S | S |
| 52.50 | N | N | N | N | S | S | S |
| 52.75 | N | N | N | N | S | S | S |
| 53.00 | N | N | N | N | S | S | S |
| 53.25 | N | N | N | N | O | S | S |
| 53.50 | N | N | N | N | N | S | S |
| 53.75 | N | N | N | N | N | S | S |
| 54.00 | N | N | N | N | N | S | S |
| 54.25 | O | N | N | N | N | S | S |
| 54.50 | S | N | N | N | N | S | S |
| 54.75 | S | N | N | N | N | S | S |
| 55.00 | S | N | N | N | N | S | S |
| 55.25 | S | N | N | N | N | S | S |
| 55.50 | S | N | N | N | N | O | S |
| 55.75 | S | N | N | N | N | N | S |
| 56.00 | S | N | N | N | N | N | S |
| 56.25 | S | N | N | N | N | N | S |
| 56.50 | S | O | N | N | N | N | S |
| 56.75 | S | S | N | N | N | N | S |
| 57.00 | S | S | N | N | N | N | S |
| 57.25 | S | S | N | N | N | N | S |
| 57.50 | S | S | N | N | N | N | S |
| 57.75 | S | S | N | N | N | N | O |
| 58.00 | S | S | N | N | N | N | N |
| 58.25 | S | S | N | N | N | N | N |
| 58.50 | S | S | N | N | N | N | N |
| 58.75 | S | S | O | N | N | N | N |
| 59.00 | S | S | S | N | N | N | N |
| 59.25 | S | S | S | N | N | N | N |
| 59.50 | S | S | S | N | N | N | N |
| 59.75 | S | S | S | N | N | N | N |

Page Row 5, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 60.00 | O | S | S | S | S | N | N | N | N | S | S | S | S | S | N | N | N |
| 60.25 | N | S | S | S | S | N | N | N | N | O | S | S | S | S | N | N | N |
| 60.50 | N | S | S | S | S | N | N | N | N | N | S | S | S | S | N | N | N |
| 60.75 | N | S | S | S | S | N | N | N | N | N | S | S | S | S | N | N | N |
| 61.00 | N | S | S | S | S | N | N | N | N | N | S | S | S | S | N | N | N |
| 61.25 | N | S | S | S | S | O | N | N | N | N | S | S | S | S | N | N | N |
| 61.50 | N | S | S | S | S | S | N | N | N | N | S | S | S | S | O | N | N |
| 61.75 | N | S | S | S | S | S | N | N | N | N | S | S | S | S | S | N | N |
| 62.00 | N | S | S | S | S | S | N | N | N | N | S | S | S | S | S | N | N |
| 62.25 | N | O | S | S | S | S | N | N | N | N | S | S | S | S | S | N | N |
| 62.50 | N | N | S | S | S | S | N | N | N | N | O | S | S | S | S | N | N |
| 62.75 | N | N | S | S | S | S | N | N | N | N | N | S | S | S | S | N | N |
| 63.00 | N | N | S | S | S | S | N | N | N | N | N | S | S | S | S | N | N |
| 63.25 | N | N | S | S | S | S | N | N | N | N | N | S | S | S | S | N | N |
| 63.50 | N | N | S | S | S | S | O | N | N | N | N | S | S | S | S | N | N |
| 63.75 | N | N | S | S | S | S | S | N | N | N | N | S | S | S | S | O | N |
| 64.00 | N | N | S | S | S | S | S | N | N | N | N | S | S | S | S | S | N |
| 64.25 | N | N | S | S | S | S | S | N | N | N | N | S | S | S | S | S | N |
| 64.50 | N | N | O | S | S | S | S | N | N | N | N | S | S | S | S | S | N |
| 64.75 | N | N | N | S | S | S | S | N | N | N | N | O | S | S | S | S | N |
| 65.00 | N | N | N | S | S | S | S | N | N | N | N | N | S | S | S | S | N |
| 65.25 | N | N | N | S | S | S | S | N | N | N | N | N | S | S | S | S | N |
| 65.50 | N | N | N | S | S | S | S | N | N | N | N | N | S | S | S | S | N |
| 65.75 | N | N | N | S | S | S | S | O | N | N | N | N | S | S | S | S | N |
| 66.00 | N | N | N | S | S | S | S | S | N | N | N | N | S | S | S | S | O |
| 66.25 | N | N | N | S | S | S | S | S | N | N | N | N | S | S | S | S | S |
| 66.50 | N | N | N | S | S | S | S | S | N | N | N | N | S | S | S | S | S |
| 66.75 | N | N | N | O | S | S | S | S | N | N | N | N | S | S | S | S | S |
| 67.00 | N | N | N | N | S | S | S | S | N | N | N | N | O | S | S | S | S |
| 67.25 | N | N | N | N | S | S | S | S | N | N | N | N | N | S | S | S | S |
| 67.50 | N | N | N | N | S | S | S | S | N | N | N | N | N | S | S | S | S |
| 67.75 | N | N | N | N | S | S | S | S | N | N | N | N | N | S | S | S | S |
| 68.00 | N | N | N | N | S | S | S | S | O | N | N | N | N | S | S | S | S |
| 68.25 | N | N | N | N | S | S | S | S | S | N | N | N | N | S | S | S | S |
| 68.50 | N | N | N | N | S | S | S | S | S | N | N | N | N | S | S | S | S |
| 68.75 | N | N | N | N | S | S | S | S | S | N | N | N | N | S | S | S | S |
| 69.00 | N | N | N | N | O | S | S | S | S | N | N | N | N | S | S | S | S |
| 69.25 | N | N | N | N | N | S | S | S | S | N | N | N | N | O | S | S | S |
| 69.50 | N | N | N | N | N | S | S | S | S | N | N | N | N | N | S | S | S |
| 69.75 | N | N | N | N | N | S | S | S | S | N | N | N | N | N | S | S | S |
| 70.00 | O | N | N | N | N | S | S | S | S | N | N | N | N | N | S | S | S |
| 70.25 | S | N | N | N | N | S | S | S | S | O | N | N | N | N | S | S | S |

-continued

Coil Excitation

| | | | | | | | | | | | | | | | | | |
|---|---|---|---|---|---|---|---|---|---|---|---|---|---|---|---|---|---|
| 70.50 | S | N | N | N | N | S | S | S | S | S | N | N | N | N | S | S | S |
| 70.75 | S | N | N | N | N | S | S | S | S | S | N | N | N | N | S | S | S |
| 71.00 | S | N | N | N | N | S | S | S | S | S | N | N | N | N | S | S | S |
| 71.25 | S | N | N | N | N | O | S | S | S | S | N | N | N | N | S | S | S |
| 71.50 | S | N | N | N | N | N | S | S | S | S | N | N | N | N | O | S | S |
| 71.75 | S | N | N | N | N | N | S | S | S | S | N | N | N | N | N | S | S |

Page Row 6, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 60.00 | N | S | S | S | S | S | N | N | N | N | S | S | S | S | S | N | N |
| 60.25 | N | S | S | S | S | S | N | N | N | N | S | S | S | S | S | N | N |
| 60.50 | N | O | S | S | S | S | N | N | N | N | S | S | S | S | S | N | N |
| 60.75 | N | N | S | S | S | S | N | N | N | N | O | S | S | S | S | N | N |
| 61.00 | N | N | S | S | S | S | N | N | N | N | N | S | S | S | S | N | N |
| 61.25 | N | N | S | S | S | S | N | N | N | N | N | S | S | S | S | N | N |
| 61.50 | N | N | S | S | S | S | N | N | N | N | N | S | S | S | S | N | N |
| 61.75 | N | N | S | S | S | S | O | N | N | N | N | S | S | S | S | N | N |
| 62.00 | N | N | S | S | S | S | S | N | N | N | N | S | S | S | S | O | N |
| 62.25 | N | N | S | S | S | S | S | N | N | N | N | S | S | S | S | S | N |
| 62.50 | N | N | S | S | S | S | S | N | N | N | N | S | S | S | S | S | N |
| 62.75 | N | N | O | S | S | S | S | N | N | N | N | S | S | S | S | S | N |
| 63.00 | N | N | N | S | S | S | S | N | N | N | N | O | S | S | S | S | N |
| 63.25 | N | N | N | S | S | S | S | N | N | N | N | N | S | S | S | S | N |
| 63.50 | N | N | N | S | S | S | S | N | N | N | N | N | S | S | S | S | N |
| 63.75 | N | N | N | S | S | S | S | N | N | N | N | N | S | S | S | S | N |
| 64.00 | N | N | N | S | S | S | S | O | N | N | N | N | S | S | S | S | N |
| 64.25 | N | N | N | S | S | S | S | S | N | N | N | N | S | S | S | S | O |
| 64.50 | N | N | N | S | S | S | S | S | N | N | N | N | S | S | S | S | S |
| 64.75 | N | N | N | S | S | S | S | S | N | N | N | N | S | S | S | S | S |
| 65.00 | N | N | N | O | S | S | S | S | N | N | N | N | S | S | S | S | S |
| 65.25 | N | N | N | N | S | S | S | S | N | N | N | N | O | S | S | S | S |
| 65.50 | N | N | N | N | S | S | S | S | N | N | N | N | N | S | S | S | S |
| 65.75 | N | N | N | N | S | S | S | S | N | N | N | N | N | S | S | S | S |
| 66.00 | N | N | N | N | S | S | S | S | N | N | N | N | N | S | S | S | S |
| 66.25 | N | N | N | N | S | S | S | S | O | N | N | N | N | S | S | S | S |
| 66.50 | N | N | N | N | S | S | S | S | S | N | N | N | N | S | S | S | S |
| 66.75 | N | N | N | N | S | S | S | S | S | N | N | N | N | S | S | S | S |
| 67.00 | N | N | N | N | S | S | S | S | S | N | N | N | N | S | S | S | S |
| 67.25 | N | N | N | N | O | S | S | S | S | N | N | N | N | S | S | S | S |
| 67.50 | N | N | N | N | N | S | S | S | S | N | N | N | N | O | S | S | S |
| 67.75 | N | N | N | N | N | S | S | S | S | N | N | N | N | N | S | S | S |
| 68.00 | N | N | N | N | N | S | S | S | S | N | N | N | N | N | S | S | S |
| 68.25 | O | N | N | N | N | S | S | S | S | N | N | N | N | N | S | S | S |
| 68.50 | S | N | N | N | N | S | S | S | S | O | N | N | N | N | S | S | S |
| 68.75 | S | N | N | N | N | S | S | S | S | S | N | N | N | N | S | S | S |
| 69.00 | S | N | N | N | N | S | S | S | S | S | N | N | N | N | S | S | S |
| 69.25 | S | N | N | N | N | S | S | S | S | S | N | N | N | N | S | S | S |
| 69.50 | S | N | N | N | N | O | S | S | S | S | N | N | N | N | S | S | S |
| 69.75 | S | N | N | N | N | N | S | S | S | S | N | N | N | N | O | S | S |
| 70.00 | S | N | N | N | N | N | S | S | S | S | N | N | N | N | N | S | S |
| 70.25 | S | N | N | N | N | N | S | S | S | S | N | N | N | N | N | S | S |
| 70.50 | S | O | N | N | N | N | S | S | S | S | N | N | N | N | N | S | S |
| 70.75 | S | S | N | N | N | N | S | S | S | S | O | N | N | N | N | S | S |
| 71.00 | S | S | N | N | N | N | S | S | S | S | S | N | N | N | N | S | S |
| 71.25 | S | S | N | N | N | N | S | S | S | S | S | N | N | N | N | S | S |
| 71.50 | S | S | N | N | N | N | S | S | S | S | S | N | N | N | N | S | S |
| 71.75 | S | S | N | N | N | N | O | S | S | S | S | N | N | N | N | S | S |

Page Row 6, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 60.00 | N | N | S | S | S | S | O | N | N | N | N | S | S | S | S | N | N |
| 60.25 | N | N | S | S | S | S | S | N | N | N | N | S | S | S | S | O | N |
| 60.50 | N | N | S | S | S | S | S | N | N | N | N | S | S | S | S | S | N |
| 60.75 | N | N | S | S | S | S | S | N | N | N | N | S | S | S | S | S | N |
| 61.00 | N | N | O | S | S | S | S | N | N | N | N | S | S | S | S | S | N |
| 61.25 | N | N | N | S | S | S | S | N | N | N | N | O | S | S | S | S | N |
| 61.50 | N | N | N | S | S | S | S | N | N | N | N | N | S | S | S | S | N |
| 61.75 | N | N | N | S | S | S | S | N | N | N | N | N | S | S | S | S | N |
| 62.00 | N | N | N | S | S | S | S | N | N | N | N | N | S | S | S | S | N |
| 62.25 | N | N | N | S | S | S | S | O | N | N | N | N | S | S | S | S | N |
| 62.50 | N | N | N | S | S | S | S | S | N | N | N | N | S | S | S | S | O |
| 62.75 | N | N | N | S | S | S | S | S | N | N | N | N | S | S | S | S | S |
| 63.00 | N | N | N | S | S | S | S | S | N | N | N | N | S | S | S | S | S |
| 63.25 | N | N | N | O | S | S | S | S | N | N | N | N | S | S | S | S | S |
| 63.50 | N | N | N | N | S | S | S | S | N | N | N | N | O | S | S | S | S |

-continued

Coil Excitation

| | | | | | | | | | | | | | | | | | |
|---|---|---|---|---|---|---|---|---|---|---|---|---|---|---|---|---|---|
| 63.75 | N | N | N | N | S | S | S | S | N | N | N | N | N | S | S | S | S |
| 64.00 | N | N | N | N | S | S | S | S | N | N | N | N | N | S | S | S | S |
| 64.25 | N | N | N | N | S | S | S | S | N | N | N | N | N | S | S | S | S |
| 64.50 | N | N | N | N | S | S | S | S | O | N | N | N | N | S | S | S | S |
| 64.75 | N | N | N | N | S | S | S | S | S | N | N | N | N | S | S | S | S |
| 65.00 | N | N | N | N | S | S | S | S | S | N | N | N | N | S | S | S | S |
| 65.25 | N | N | N | N | S | S | S | S | S | N | N | N | N | S | S | S | S |
| 65.50 | N | N | N | N | O | S | S | S | S | N | N | N | N | S | S | S | S |
| 65.75 | N | N | N | N | N | S | S | S | S | N | N | N | N | O | S | S | S |
| 66.00 | N | N | N | N | N | S | S | S | S | N | N | N | N | N | S | S | S |
| 66.25 | N | N | N | N | N | S | S | S | S | N | N | N | N | N | S | S | S |
| 66.50 | O | N | N | N | N | S | S | S | S | N | N | N | N | N | S | S | S |
| 66.75 | S | N | N | N | N | S | S | S | S | O | N | N | N | N | S | S | S |
| 67.00 | S | N | N | N | N | S | S | S | S | S | N | N | N | N | S | S | S |
| 67.25 | S | N | N | N | N | S | S | S | S | S | N | N | N | N | S | S | S |
| 67.50 | S | N | N | N | N | S | S | S | S | S | N | N | N | N | S | S | S |
| 67.75 | S | N | N | N | N | O | S | S | S | S | N | N | N | N | S | S | S |
| 68.00 | S | N | N | N | N | N | S | S | S | S | N | N | N | N | O | S | S |
| 68.25 | S | N | N | N | N | N | S | S | S | S | N | N | N | N | N | S | S |
| 68.50 | S | N | N | N | N | N | S | S | S | S | N | N | N | N | N | S | S |
| 68.75 | S | O | N | N | N | N | S | S | S | S | N | N | N | N | N | S | S |
| 69.00 | S | S | N | N | N | N | S | S | S | S | O | N | N | N | N | S | S |
| 69.25 | S | S | N | N | N | N | S | S | S | S | S | N | N | N | N | S | S |
| 69.50 | S | S | N | N | N | N | S | S | S | S | S | N | N | N | N | S | S |
| 69.75 | S | S | N | N | N | N | S | S | S | S | S | N | N | N | N | S | S |
| 70.00 | S | S | N | N | N | N | O | S | S | S | S | N | N | N | N | S | S |
| 70.25 | S | S | N | N | N | N | N | S | S | S | S | N | N | N | N | O | S |
| 70.50 | S | S | N | N | N | N | N | S | S | S | S | N | N | N | N | N | S |
| 70.75 | S | S | N | N | N | N | N | S | S | S | S | N | N | N | N | N | S |
| 71.00 | S | S | O | N | N | N | N | S | S | S | S | N | N | N | N | N | S |
| 71.25 | S | S | S | N | N | N | N | S | S | S | S | O | N | N | N | N | S |
| 71.50 | S | S | S | N | N | N | N | S | S | S | S | S | N | N | N | N | S |
| 71.75 | S | S | S | N | N | N | N | S | S | S | S | S | N | N | N | N | S |

Page Row 6, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 60.00 | N | N | N | S | S | S | S | N | N | N | N | N | S | S | S | S | N |
| 60.25 | N | N | N | S | S | S | S | N | N | N | N | N | S | S | S | S | N |
| 60.50 | N | N | N | S | S | S | S | O | N | N | N | N | S | S | S | S | N |
| 60.75 | N | N | N | S | S | S | S | S | N | N | N | N | S | S | S | S | O |
| 61.00 | N | N | N | S | S | S | S | S | N | N | N | N | S | S | S | S | S |
| 61.25 | N | N | N | S | S | S | S | S | N | N | N | N | S | S | S | S | S |
| 61.50 | N | N | N | O | S | S | S | S | N | N | N | N | S | S | S | S | S |
| 61.75 | N | N | N | N | S | S | S | S | N | N | N | N | O | S | S | S | S |
| 62.00 | N | N | N | N | S | S | S | S | N | N | N | N | N | S | S | S | S |
| 62.25 | N | N | N | N | S | S | S | S | N | N | N | N | N | S | S | S | S |
| 62.50 | N | N | N | N | S | S | S | S | N | N | N | N | N | S | S | S | S |
| 62.75 | N | N | N | N | S | S | S | S | O | N | N | N | N | S | S | S | S |
| 63.00 | N | N | N | N | S | S | S | S | S | N | N | N | N | S | S | S | S |
| 63.25 | N | N | N | N | S | S | S | S | S | N | N | N | N | S | S | S | S |
| 63.50 | N | N | N | N | S | S | S | S | S | N | N | N | N | S | S | S | S |
| 63.75 | N | N | N | N | O | S | S | S | S | N | N | N | N | S | S | S | S |
| 64.00 | N | N | N | N | N | S | S | S | S | N | N | N | N | O | S | S | S |
| 64.25 | N | N | N | N | N | S | S | S | S | N | N | N | N | N | S | S | S |
| 64.50 | N | N | N | N | N | S | S | S | S | N | N | N | N | N | S | S | S |
| 64.75 | O | N | N | N | N | S | S | S | S | N | N | N | N | N | S | S | S |
| 65.00 | S | N | N | N | N | S | S | S | S | O | N | N | N | N | S | S | S |
| 65.25 | S | N | N | N | N | S | S | S | S | S | N | N | N | N | S | S | S |
| 65.50 | S | N | N | N | N | S | S | S | S | S | N | N | N | N | S | S | S |
| 65.75 | S | N | N | N | N | S | S | S | S | S | N | N | N | N | S | S | S |
| 66.00 | S | N | N | N | N | O | S | S | S | S | N | N | N | N | S | S | S |
| 66.25 | S | N | N | N | N | N | S | S | S | S | N | N | N | N | O | S | S |
| 66.50 | S | N | N | N | N | N | S | S | S | S | N | N | N | N | N | S | S |
| 66.75 | S | N | N | N | N | N | S | S | S | S | N | N | N | N | N | S | S |
| 67.00 | S | O | N | N | N | N | S | S | S | S | N | N | N | N | N | S | S |
| 67.25 | S | S | N | N | N | N | S | S | S | S | O | N | N | N | N | S | S |
| 67.50 | S | S | N | N | N | N | S | S | S | S | S | N | N | N | N | S | S |
| 67.75 | S | S | N | N | N | N | S | S | S | S | S | N | N | N | N | S | S |
| 68.00 | S | S | N | N | N | N | S | S | S | S | S | N | N | N | N | S | S |
| 68.25 | S | S | N | N | N | N | O | S | S | S | S | N | N | N | N | S | S |
| 68.50 | S | S | N | N | N | N | N | S | S | S | S | N | N | N | N | O | S |
| 68.75 | S | S | N | N | N | N | N | S | S | S | S | N | N | N | N | N | S |
| 69.00 | S | S | N | N | N | N | N | S | S | S | S | N | N | N | N | N | S |
| 69.25 | S | S | O | N | N | N | N | S | S | S | S | N | N | N | N | N | S |
| 69.50 | S | S | S | N | N | N | N | S | S | S | S | O | N | N | N | N | S |
| 69.75 | S | S | S | N | N | N | N | S | S | S | S | S | N | N | N | N | S |

-continued

| Coil Excitation | | | | | | | | | | | | | | | | | |
|---|---|---|---|---|---|---|---|---|---|---|---|---|---|---|---|---|---|
| 70.00 | S | S | S | N | N | N | N | S | S | S | S | S | N | N | N | N | S |
| 70.25 | S | S | S | N | N | N | N | S | S | S | S | S | N | N | N | N | S |
| 70.50 | S | S | S | N | N | N | N | O | S | S | S | S | N | N | N | N | S |
| 70.75 | S | S | S | N | N | N | N | N | S | S | S | S | N | N | N | N | O |
| 71.00 | S | S | S | N | N | N | N | N | S | S | S | S | N | N | N | N | N |
| 71.25 | S | S | S | N | N | N | N | N | S | S | S | S | N | N | N | N | N |
| 71.50 | S | S | S | O | N | N | N | N | S | S | S | S | N | N | N | N | N |
| 71.75 | S | S | S | S | N | N | N | N | S | S | S | S | O | N | N | N | N |

Page Row 6, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 60.00 | N | N | N | N | S | S | S | S | N | N | N | N | O | S | S | S | S |
| 60.25 | N | N | N | N | S | S | S | S | N | N | N | N | N | S | S | S | S |
| 60.50 | N | N | N | N | S | S | S | S | N | N | N | N | N | S | S | S | S |
| 60.75 | N | N | N | N | S | S | S | S | N | N | N | N | N | S | S | S | S |
| 61.00 | N | N | N | N | S | S | S | S | O | N | N | N | N | S | S | S | S |
| 61.25 | N | N | N | N | S | S | S | S | S | N | N | N | N | S | S | S | S |
| 61.50 | N | N | N | N | S | S | S | S | S | N | N | N | N | S | S | S | S |
| 61.75 | N | N | N | N | S | S | S | S | S | N | N | N | N | S | S | S | S |
| 62.00 | N | N | N | N | O | S | S | S | S | N | N | N | N | S | S | S | S |
| 62.25 | N | N | N | N | N | S | S | S | S | N | N | N | N | O | S | S | S |
| 62.50 | N | N | N | N | N | S | S | S | S | N | N | N | N | N | S | S | S |
| 62.75 | N | N | N | N | N | S | S | S | S | N | N | N | N | N | S | S | S |
| 63.00 | O | N | N | N | N | S | S | S | S | N | N | N | N | N | S | S | S |
| 63.25 | S | N | N | N | N | S | S | S | S | O | N | N | N | N | S | S | S |
| 63.50 | S | N | N | N | N | S | S | S | S | S | N | N | N | N | S | S | S |
| 63.75 | S | N | N | N | N | S | S | S | S | S | N | N | N | N | S | S | S |
| 64.00 | S | N | N | N | N | S | S | S | S | S | N | N | N | N | S | S | S |
| 64.25 | S | N | N | N | N | O | S | S | S | S | N | N | N | N | S | S | S |
| 64.50 | S | N | N | N | N | N | S | S | S | S | N | N | N | N | O | S | S |
| 64.75 | S | N | N | N | N | N | S | S | S | S | N | N | N | N | N | S | S |
| 65.00 | S | N | N | N | N | N | S | S | S | S | N | N | N | N | N | S | S |
| 65.25 | S | O | N | N | N | N | S | S | S | S | N | N | N | N | N | S | S |
| 65.50 | S | S | N | N | N | N | S | S | S | S | O | N | N | N | N | S | S |
| 65.75 | S | S | N | N | N | N | S | S | S | S | S | N | N | N | N | S | S |
| 66.00 | S | S | N | N | N | N | S | S | S | S | S | N | N | N | N | S | S |
| 66.25 | S | S | N | N | N | N | S | S | S | S | S | N | N | N | N | S | S |
| 66.50 | S | S | N | N | N | N | O | S | S | S | S | N | N | N | N | S | S |
| 66.75 | S | S | N | N | N | N | N | S | S | S | S | N | N | N | N | O | S |
| 67.00 | S | S | N | N | N | N | N | S | S | S | S | N | N | N | N | N | S |
| 67.25 | S | S | N | N | N | N | N | S | S | S | S | N | N | N | N | N | S |
| 67.50 | S | S | O | N | N | N | N | S | S | S | S | N | N | N | N | N | S |
| 67.75 | S | S | S | N | N | N | N | S | S | S | S | O | N | N | N | N | S |
| 68.00 | S | S | S | N | N | N | N | S | S | S | S | S | N | N | N | N | S |
| 68.25 | S | S | S | N | N | N | N | S | S | S | S | S | N | N | N | N | S |
| 68.50 | S | S | S | N | N | N | N | S | S | S | S | S | N | N | N | N | S |
| 68.75 | S | S | S | N | N | N | N | O | S | S | S | S | N | N | N | N | S |
| 69.00 | S | S | S | N | N | N | N | N | S | S | S | S | N | N | N | N | O |
| 69.25 | S | S | S | N | N | N | N | N | S | S | S | S | N | N | N | N | N |
| 69.50 | S | S | S | N | N | N | N | N | S | S | S | S | N | N | N | N | N |
| 69.75 | S | S | S | O | N | N | N | N | S | S | S | S | N | N | N | N | N |
| 70.00 | S | S | S | S | N | N | N | N | S | S | S | S | O | N | N | N | N |
| 70.25 | S | S | S | S | N | N | N | N | S | S | S | S | S | N | N | N | N |
| 70.50 | S | S | S | S | N | N | N | N | S | S | S | S | S | N | N | N | N |
| 70.75 | S | S | S | S | N | N | N | N | S | S | S | S | S | N | N | N | N |
| 71.00 | S | S | S | S | N | N | N | N | O | S | S | S | S | N | N | N | N |
| 71.25 | S | S | S | S | N | N | N | N | N | S | S | S | S | N | N | N | N |
| 71.50 | S | S | S | S | N | N | N | N | N | S | S | S | S | N | N | N | N |
| 71.75 | S | S | S | S | N | N | N | N | N | S | S | S | S | N | N | N | N |

Page Row 6, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 60.00 | N | N | N | N | S | S | S | S | S | N | N | N | N | S | S | S | S |
| 60.25 | N | N | N | N | O | S | S | S | S | N | N | N | N | S | S | S | S |
| 60.50 | N | N | N | N | N | S | S | S | S | N | N | N | N | O | S | S | S |
| 60.75 | N | N | N | N | N | S | S | S | S | N | N | N | N | N | S | S | S |
| 61.00 | N | N | N | N | N | S | S | S | S | N | N | N | N | N | S | S | S |
| 61.25 | O | N | N | N | N | S | S | S | S | N | N | N | N | N | S | S | S |
| 61.50 | S | N | N | N | N | S | S | S | S | O | N | N | N | N | S | S | S |
| 61.75 | S | N | N | N | N | S | S | S | S | S | N | N | N | N | S | S | S |
| 62.00 | S | N | N | N | N | S | S | S | S | S | N | N | N | N | S | S | S |
| 62.25 | S | N | N | N | N | S | S | S | S | S | N | N | N | N | S | S | S |
| 62.50 | S | N | N | N | N | O | S | S | S | S | N | N | N | N | S | S | S |
| 62.75 | S | N | N | N | N | N | S | S | S | S | N | N | N | N | O | S | S |
| 63.00 | S | N | N | N | N | N | S | S | S | S | N | N | N | N | N | S | S |

-continued

| Coil Excitation | | | | | | | | | | | | | | | | | |
|---|---|---|---|---|---|---|---|---|---|---|---|---|---|---|---|---|---|
| 63.25 | S | N | N | N | N | N | S | S | S | S | N | N | N | N | N | S | S |
| 63.50 | S | O | N | N | N | N | S | S | S | S | N | N | N | N | N | S | S |
| 63.75 | S | S | N | N | N | N | S | S | S | S | O | N | N | N | N | S | S |
| 64.00 | S | S | N | N | N | N | S | S | S | S | S | N | N | N | N | S | S |
| 64.25 | S | S | N | N | N | N | S | S | S | S | S | N | N | N | N | S | S |
| 64.50 | S | S | N | N | N | N | S | S | S | S | S | N | N | N | N | S | S |
| 64.75 | S | S | N | N | N | N | O | S | S | S | S | N | N | N | N | S | S |
| 65.00 | S | S | N | N | N | N | N | S | S | S | S | N | N | N | N | O | S |
| 65.25 | S | S | N | N | N | N | N | S | S | S | S | N | N | N | N | N | S |
| 65.50 | S | S | N | N | N | N | N | S | S | S | S | N | N | N | N | N | S |
| 65.75 | S | S | O | N | N | N | N | S | S | S | S | N | N | N | N | N | S |
| 66.00 | S | S | S | N | N | N | N | S | S | S | S | O | N | N | N | N | S |
| 66.25 | S | S | S | N | N | N | N | S | S | S | S | S | N | N | N | N | S |
| 66.50 | S | S | S | N | N | N | N | S | S | S | S | S | N | N | N | N | S |
| 66.75 | S | S | S | N | N | N | N | S | S | S | S | S | N | N | N | N | S |
| 67.00 | S | S | S | N | N | N | N | O | S | S | S | S | N | N | N | N | S |
| 67.25 | S | S | S | N | N | N | N | N | S | S | S | S | N | N | N | N | O |
| 67.50 | S | S | S | N | N | N | N | N | S | S | S | S | N | N | N | N | N |
| 67.75 | S | S | S | N | N | N | N | N | S | S | S | S | N | N | N | N | N |
| 68.00 | S | S | S | O | N | N | N | N | S | S | S | S | N | N | N | N | N |
| 68.25 | S | S | S | S | N | N | N | N | S | S | S | S | O | N | N | N | N |
| 68.50 | S | S | S | S | N | N | N | N | S | S | S | S | S | N | N | N | N |
| 68.75 | S | S | S | S | N | N | N | N | S | S | S | S | S | N | N | N | N |
| 69.00 | S | S | S | S | N | N | N | N | S | S | S | S | S | N | N | N | N |
| 69.25 | S | S | S | S | N | N | N | N | O | S | S | S | S | N | N | N | N |
| 69.50 | S | S | S | S | N | N | N | N | N | S | S | S | S | N | N | N | N |
| 69.75 | S | S | S | S | N | N | N | N | N | S | S | S | S | N | N | N | N |
| 70.00 | S | S | S | S | N | N | N | N | N | S | S | S | S | N | N | N | N |
| 70.25 | S | S | S | S | O | N | N | N | N | S | S | S | S | N | N | N | N |
| 70.50 | S | S | S | S | S | N | N | N | N | S | S | S | S | O | N | N | N |
| 70.75 | S | S | S | S | S | N | N | N | N | S | S | S | S | S | N | N | N |
| 71.00 | S | S | S | S | S | N | N | N | N | S | S | S | S | S | N | N | N |
| 71.25 | O | S | S | S | S | N | N | N | N | S | S | S | S | S | N | N | N |
| 71.50 | N | S | S | S | S | N | N | N | N | O | S | S | S | S | N | N | N |
| 71.75 | N | S | S | S | S | N | N | N | N | N | S | S | S | S | N | N | N |

Page Row 6, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 60.00 | S | N | N | N | N | S | S | S | S | S | N | N | N | N | S | S | S |
| 60.25 | S | N | N | N | N | S | S | S | S | S | N | N | N | N | S | S | S |
| 60.50 | S | N | N | N | N | S | S | S | S | S | N | N | N | N | S | S | S |
| 60.75 | S | N | N | N | N | O | S | S | S | S | N | N | N | N | S | S | S |
| 61.00 | S | N | N | N | N | N | S | S | S | S | N | N | N | N | O | S | S |
| 61.25 | S | N | N | N | N | N | S | S | S | S | N | N | N | N | N | S | S |
| 61.50 | S | N | N | N | N | N | S | S | S | S | N | N | N | N | N | S | S |
| 61.75 | S | O | N | N | N | N | S | S | S | S | N | N | N | N | N | S | S |
| 62.00 | S | S | N | N | N | N | S | S | S | S | O | N | N | N | N | S | S |
| 62.25 | S | S | N | N | N | N | S | S | S | S | S | N | N | N | N | S | S |
| 62.50 | S | S | N | N | N | N | S | S | S | S | S | N | N | N | N | S | S |
| 62.75 | S | S | N | N | N | N | S | S | S | S | S | N | N | N | N | S | S |
| 63.00 | S | S | N | N | N | N | O | S | S | S | S | N | N | N | N | S | S |
| 63.25 | S | S | N | N | N | N | N | S | S | S | S | N | N | N | N | O | S |
| 63.50 | S | S | N | N | N | N | N | S | S | S | S | N | N | N | N | N | S |
| 63.75 | S | S | N | N | N | N | N | S | S | S | S | N | N | N | N | N | S |
| 64.00 | S | S | O | N | N | N | N | S | S | S | S | N | N | N | N | N | S |
| 64.25 | S | S | S | N | N | N | N | S | S | S | S | O | N | N | N | N | S |
| 64.50 | S | S | S | N | N | N | N | S | S | S | S | S | N | N | N | N | S |
| 64.75 | S | S | S | N | N | N | N | S | S | S | S | S | N | N | N | N | S |
| 65.00 | S | S | S | N | N | N | N | S | S | S | S | S | N | N | N | N | S |
| 65.25 | S | S | S | N | N | N | N | O | S | S | S | S | N | N | N | N | S |
| 65.50 | S | S | S | N | N | N | N | N | S | S | S | S | N | N | N | N | O |
| 65.75 | S | S | S | N | N | N | N | N | S | S | S | S | N | N | N | N | N |
| 66.00 | S | S | S | N | N | N | N | N | S | S | S | S | N | N | N | N | N |
| 66.25 | S | S | S | O | N | N | N | N | S | S | S | S | N | N | N | N | N |
| 66.50 | S | S | S | S | N | N | N | N | S | S | S | S | O | N | N | N | N |
| 66.75 | S | S | S | S | N | N | N | N | S | S | S | S | S | N | N | N | N |
| 67.00 | S | S | S | S | N | N | N | N | S | S | S | S | S | N | N | N | N |
| 67.25 | S | S | S | S | N | N | N | N | S | S | S | S | S | N | N | N | N |
| 67.50 | S | S | S | S | N | N | N | N | O | S | S | S | S | N | N | N | N |
| 67.75 | S | S | S | S | N | N | N | N | N | S | S | S | S | N | N | N | N |
| 68.00 | S | S | S | S | N | N | N | N | N | S | S | S | S | N | N | N | N |
| 68.25 | S | S | S | S | N | N | N | N | N | S | S | S | S | N | N | N | N |
| 68.50 | S | S | S | S | O | N | N | N | N | S | S | S | S | N | N | N | N |
| 68.75 | S | S | S | S | S | N | N | N | N | S | S | S | S | O | N | N | N |
| 69.00 | S | S | S | S | S | N | N | N | N | S | S | S | S | S | N | N | N |
| 69.25 | S | S | S | S | S | N | N | N | N | S | S | S | S | S | N | N | N |

-continued

| Coil Excitation | | | | | | | | | | | | | | | | | |
|---|---|---|---|---|---|---|---|---|---|---|---|---|---|---|---|---|---|
| 69.50 | O | S | S | S | S | N | N | N | N | S | S | S | S | S | N | N | N |
| 69.75 | N | S | S | S | S | N | N | N | N | O | S | S | S | S | N | N | N |
| 70.00 | N | S | S | S | S | N | N | N | N | N | S | S | S | S | N | N | N |
| 70.25 | N | S | S | S | S | N | N | N | N | N | S | S | S | S | N | N | N |
| 70.50 | N | S | S | S | S | N | N | N | N | N | S | S | S | S | N | N | N |
| 70.75 | N | S | S | S | S | O | N | N | N | N | S | S | S | S | N | N | N |
| 71.00 | N | S | S | S | S | S | N | N | N | N | S | S | S | S | O | N | N |
| 71.25 | N | S | S | S | S | S | N | N | N | N | S | S | S | S | S | N | N |
| 71.50 | N | S | S | S | S | S | N | N | N | N | S | S | S | S | S | N | N |
| 71.75 | N | O | S | S | S | S | N | N | N | N | S | S | S | S | S | N | N |

Page Row 6, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 60.00 | S | O | N | N | N | N | S | S | S | S | N | N | N | N | N | S | S |
| 60.25 | S | S | N | N | N | N | S | S | S | S | O | N | N | N | N | S | S |
| 60.50 | S | S | N | N | N | N | S | S | S | S | S | N | N | N | N | S | S |
| 60.75 | S | S | N | N | N | N | S | S | S | S | S | N | N | N | N | S | S |
| 61.00 | S | S | N | N | N | N | S | S | S | S | S | N | N | N | N | S | S |
| 61.25 | S | S | N | N | N | N | O | S | S | S | S | N | N | N | N | S | S |
| 61.50 | S | S | N | N | N | N | N | S | S | S | S | N | N | N | N | O | S |
| 61.75 | S | S | N | N | N | N | N | S | S | S | S | N | N | N | N | N | S |
| 62.00 | S | S | N | N | N | N | N | S | S | S | S | N | N | N | N | N | S |
| 62.25 | S | S | O | N | N | N | N | S | S | S | S | N | N | N | N | N | S |
| 62.50 | S | S | S | N | N | N | N | S | S | S | S | O | N | N | N | N | S |
| 62.75 | S | S | S | N | N | N | N | S | S | S | S | S | N | N | N | N | S |
| 63.00 | S | S | S | N | N | N | N | S | S | S | S | S | N | N | N | N | S |
| 63.25 | S | S | S | N | N | N | N | S | S | S | S | S | N | N | N | N | S |
| 63.50 | S | S | S | N | N | N | N | O | S | S | S | S | N | N | N | N | S |
| 63.75 | S | S | S | N | N | N | N | N | S | S | S | S | N | N | N | N | O |
| 64.00 | S | S | S | N | N | N | N | N | S | S | S | S | N | N | N | N | N |
| 64.25 | S | S | S | N | N | N | N | N | S | S | S | S | N | N | N | N | N |
| 64.50 | S | S | S | O | N | N | N | N | S | S | S | S | N | N | N | N | N |
| 64.75 | S | S | S | S | N | N | N | N | S | S | S | S | O | N | N | N | N |
| 65.00 | S | S | S | S | N | N | N | N | S | S | S | S | S | N | N | N | N |
| 65.25 | S | S | S | S | N | N | N | N | S | S | S | S | S | N | N | N | N |
| 65.50 | S | S | S | S | N | N | N | N | S | S | S | S | S | N | N | N | N |
| 65.75 | S | S | S | S | N | N | N | N | O | S | S | S | S | N | N | N | N |
| 66.00 | S | S | S | S | N | N | N | N | N | S | S | S | S | N | N | N | N |
| 66.25 | S | S | S | S | N | N | N | N | N | S | S | S | S | N | N | N | N |
| 66.50 | S | S | S | S | N | N | N | N | N | S | S | S | S | N | N | N | N |
| 66.75 | S | S | S | S | O | N | N | N | N | S | S | S | S | N | N | N | N |
| 67.00 | S | S | S | S | S | N | N | N | N | S | S | S | S | O | N | N | N |
| 67.25 | S | S | S | S | S | N | N | N | N | S | S | S | S | S | N | N | N |
| 67.50 | S | S | S | S | S | N | N | N | N | S | S | S | S | S | N | N | N |
| 67.75 | O | S | S | S | S | N | N | N | N | S | S | S | S | S | N | N | N |
| 68.00 | N | S | S | S | S | N | N | N | N | O | S | S | S | S | N | N | N |
| 68.25 | N | S | S | S | S | N | N | N | N | N | S | S | S | S | N | N | N |
| 68.50 | N | S | S | S | S | N | N | N | N | N | S | S | S | S | N | N | N |
| 68.75 | N | S | S | S | S | N | N | N | N | N | S | S | S | S | N | N | N |
| 69.00 | N | S | S | S | S | O | N | N | N | N | S | S | S | S | N | N | N |
| 69.25 | N | S | S | S | S | S | N | N | N | N | S | S | S | S | O | N | N |
| 69.50 | N | S | S | S | S | S | N | N | N | N | S | S | S | S | S | N | N |
| 69.75 | N | S | S | S | S | S | N | N | N | N | S | S | S | S | S | N | N |
| 70.00 | N | O | S | S | S | S | N | N | N | N | S | S | S | S | S | N | N |
| 70.25 | N | N | S | S | S | S | N | N | N | N | O | S | S | S | S | N | N |
| 70.50 | N | N | S | S | S | S | N | N | N | N | N | S | S | S | S | N | N |
| 70.75 | N | N | S | S | S | S | N | N | N | N | N | S | S | S | S | N | N |
| 71.00 | N | N | S | S | S | S | N | N | N | N | N | S | S | S | S | N | N |
| 71.25 | N | N | S | S | S | S | O | N | N | N | N | S | S | S | S | N | N |
| 71.50 | N | N | S | S | S | S | S | N | N | N | N | S | S | S | S | O | N |
| 71.75 | N | N | S | S | S | S | S | N | N | N | N | S | S | S | S | S | N |

Page Row 6, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 60.00 | S | S | N | N | N | N | N | S | S | S | S | N | N | N | N | N | S |
| 60.25 | S | S | N | N | N | N | N | S | S | S | S | N | N | N | N | N | S |
| 60.50 | S | S | O | N | N | N | N | S | S | S | S | N | N | N | N | N | S |
| 60.75 | S | S | S | N | N | N | N | S | S | S | S | O | N | N | N | N | S |
| 61.00 | S | S | S | N | N | N | N | S | S | S | S | S | N | N | N | N | S |
| 61.25 | S | S | S | N | N | N | N | S | S | S | S | S | N | N | N | N | S |
| 61.50 | S | S | S | N | N | N | N | S | S | S | S | S | N | N | N | N | S |
| 61.75 | S | S | S | N | N | N | N | O | S | S | S | S | N | N | N | N | S |
| 62.00 | S | S | S | N | N | N | N | N | S | S | S | S | N | N | N | N | O |
| 62.25 | S | S | S | N | N | N | N | N | S | S | S | S | N | N | N | N | N |
| 62.50 | S | S | S | N | N | N | N | N | S | S | S | S | N | N | N | N | N |

-continued

| Coil Excitation | | | | | | | | | | | | | | | | | |
|---|---|---|---|---|---|---|---|---|---|---|---|---|---|---|---|---|---|
| 62.75 | S | S | S | O | N | N | N | N | S | S | S | S | N | N | N | N | N |
| 63.00 | S | S | S | S | N | N | N | N | S | S | S | S | O | N | N | N | N |
| 63.25 | S | S | S | S | N | N | N | N | S | S | S | S | S | N | N | N | N |
| 63.50 | S | S | S | S | N | N | N | N | S | S | S | S | S | N | N | N | N |
| 63.75 | S | S | S | S | N | N | N | N | S | S | S | S | S | N | N | N | N |
| 64.00 | S | S | S | S | N | N | N | N | O | S | S | S | S | N | N | N | N |
| 64.25 | S | S | S | S | N | N | N | N | N | S | S | S | S | N | N | N | N |
| 64.50 | S | S | S | S | N | N | N | N | N | S | S | S | S | N | N | N | N |
| 64.75 | S | S | S | S | N | N | N | N | N | S | S | S | S | N | N | N | N |
| 65.00 | S | S | S | S | O | N | N | N | N | S | S | S | S | N | N | N | N |
| 65.25 | S | S | S | S | S | N | N | N | N | S | S | S | S | O | N | N | N |
| 65.50 | S | S | S | S | S | N | N | N | N | S | S | S | S | S | N | N | N |
| 65.75 | S | S | S | S | S | N | N | N | N | S | S | S | S | S | N | N | N |
| 66.00 | O | S | S | S | S | N | N | N | N | S | S | S | S | S | N | N | N |
| 66.25 | N | S | S | S | S | N | N | N | N | O | S | S | S | S | N | N | N |
| 66.50 | N | S | S | S | S | N | N | N | N | N | S | S | S | S | N | N | N |
| 66.75 | N | S | S | S | S | N | N | N | N | N | S | S | S | S | N | N | N |
| 67.00 | N | S | S | S | S | N | N | N | N | N | S | S | S | S | N | N | N |
| 67.25 | N | S | S | S | S | O | N | N | N | N | S | S | S | S | N | N | N |
| 67.50 | N | S | S | S | S | S | N | N | N | N | S | S | S | S | O | N | N |
| 67.75 | N | S | S | S | S | S | N | N | N | N | S | S | S | S | S | N | N |
| 68.00 | N | S | S | S | S | S | N | N | N | N | S | S | S | S | S | N | N |
| 68.25 | N | O | S | S | S | S | N | N | N | N | S | S | S | S | S | N | N |
| 68.50 | N | N | S | S | S | S | N | N | N | N | O | S | S | S | S | N | N |
| 68.75 | N | N | S | S | S | S | N | N | N | N | N | S | S | S | S | N | N |
| 69.00 | N | N | S | S | S | S | N | N | N | N | N | S | S | S | S | N | N |
| 69.25 | N | N | S | S | S | S | N | N | N | N | N | S | S | S | S | N | N |
| 69.50 | N | N | S | S | S | S | O | N | N | N | N | S | S | S | S | N | N |
| 69.75 | N | N | S | S | S | S | S | N | N | N | N | S | S | S | S | O | N |
| 70.00 | N | N | S | S | S | S | S | N | N | N | N | S | S | S | S | S | N |
| 70.25 | N | N | S | S | S | S | S | N | N | N | N | S | S | S | S | S | N |
| 70.50 | N | N | O | S | S | S | S | N | N | N | N | S | S | S | S | S | N |
| 70.75 | N | N | N | S | S | S | S | N | N | N | N | O | S | S | S | S | N |
| 71.00 | N | N | N | S | S | S | S | N | N | N | N | N | S | S | S | S | N |
| 71.25 | N | N | N | S | S | S | S | N | N | N | N | N | S | S | S | S | N |
| 71.50 | N | N | N | S | S | S | S | N | N | N | N | N | S | S | S | S | N |
| 71.75 | N | N | N | S | S | S | S | O | N | N | N | N | S | S | S | S | N |

Page Row 6, Page Column 9

| Coil | 154 | 155 | 156 | 157 | 158 | 159 | 160 |
|---|---|---|---|---|---|---|---|
| 60.00 | S | S | S | N | N | N | N |
| 60.25 | S | S | S | N | N | N | N |
| 60.50 | S | S | S | N | N | N | N |
| 60.75 | S | S | S | N | N | N | N |
| 61.00 | S | S | S | O | N | N | N |
| 61.25 | S | S | S | S | N | N | N |
| 61.50 | S | S | S | S | N | N | N |
| 61.75 | S | S | S | S | N | N | N |
| 62.00 | S | S | S | S | N | N | N |
| 62.25 | S | S | S | S | N | N | N |
| 62.50 | S | S | S | S | N | N | N |
| 62.75 | S | S | S | S | N | N | N |
| 63.00 | S | S | S | S | N | N | N |
| 63.25 | S | S | S | S | O | N | N |
| 63.50 | S | S | S | S | S | N | N |
| 63.75 | S | S | S | S | S | N | N |
| 64.00 | S | S | S | S | S | N | N |
| 64.25 | O | S | S | S | S | N | N |
| 64.50 | N | S | S | S | S | N | N |
| 64.75 | N | S | S | S | S | N | N |
| 65.00 | N | S | S | S | S | N | N |
| 65.25 | N | S | S | S | S | N | N |
| 65.50 | N | S | S | S | S | O | N |
| 65.75 | N | S | S | S | S | S | N |
| 66.00 | N | S | S | S | S | S | N |
| 66.25 | N | S | S | S | S | S | N |
| 66.50 | N | O | S | S | S | S | N |
| 66.75 | N | N | S | S | S | S | N |
| 67.00 | N | N | S | S | S | S | N |
| 67.25 | N | N | S | S | S | S | N |
| 67.50 | N | N | S | S | S | S | N |
| 67.75 | N | N | S | S | S | S | O |
| 68.00 | N | N | S | S | S | S | S |
| 68.25 | N | N | S | S | S | S | S |
| 68.50 | N | N | S | S | S | S | S |
| 68.75 | N | N | O | S | S | S | S |

-continued

| Coil Excitation | | | | | | | |
|---|---|---|---|---|---|---|---|
| 69.00 | N | N | N | S | S | S | S |
| 69.25 | N | N | N | S | S | S | S |
| 69.50 | N | N | N | S | S | S | S |
| 69.75 | N | N | N | S | S | S | S |
| 70.00 | N | N | N | S | S | S | S |
| 70.25 | N | N | N | S | S | S | S |
| 70.50 | N | N | N | S | S | S | S |
| 70.75 | N | N | N | S | S | S | S |
| 71.00 | N | N | N | O | S | S | S |
| 71.25 | N | N | N | N | S | S | S |
| 71.50 | N | N | N | N | S | S | S |
| 71.75 | N | N | N | N | S | S | S |

Page Row 6, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 72.00 | S | N | N | N | N | N | S | S | S | S | N | N | N | N | N | S | S |
| 72.25 | S | O | N | N | N | N | S | S | S | S | N | N | N | N | N | S | S |
| 72.50 | S | S | N | N | N | N | S | S | S | S | O | N | N | N | N | S | S |
| 72.75 | S | S | N | N | N | N | S | S | S | S | S | N | N | N | N | S | S |
| 73.00 | S | S | N | N | N | N | S | S | S | S | S | N | N | N | N | S | S |
| 73.25 | S | S | N | N | N | N | S | S | S | S | S | N | N | N | N | S | S |
| 73.50 | S | S | N | N | N | N | O | S | S | S | S | N | N | N | N | S | S |
| 73.75 | S | S | N | N | N | N | N | S | S | S | S | N | N | N | N | O | S |
| 74.00 | S | S | N | N | N | N | N | S | S | S | S | N | N | N | N | N | S |
| 74.25 | S | S | N | N | N | N | N | S | S | S | S | N | N | N | N | N | S |
| 74.50 | S | S | O | N | N | N | N | S | S | S | S | N | N | N | N | N | S |
| 74.75 | S | S | S | N | N | N | N | S | S | S | S | O | N | N | N | N | S |
| 75.00 | S | S | S | N | N | N | N | S | S | S | S | S | N | N | N | N | S |
| 75.25 | S | S | S | N | N | N | N | S | S | S | S | S | N | N | N | N | S |
| 75.50 | S | S | S | N | N | N | N | S | S | S | S | S | N | N | N | N | S |
| 75.75 | S | S | S | N | N | N | N | O | S | S | S | S | N | N | N | N | S |
| 76.00 | S | S | S | N | N | N | N | N | S | S | S | S | N | N | N | N | O |
| 76.25 | S | S | S | N | N | N | N | N | S | S | S | S | N | N | N | N | N |
| 76.50 | S | S | S | N | N | N | N | N | S | S | S | S | N | N | N | N | N |
| 76.75 | S | S | S | O | N | N | N | N | S | S | S | S | N | N | N | N | N |
| 77.00 | S | S | S | S | N | N | N | N | S | S | S | S | O | N | N | N | N |
| 77.25 | S | S | S | S | N | N | N | N | S | S | S | S | S | N | N | N | N |
| 77.50 | S | S | S | S | N | N | N | N | S | S | S | S | S | N | N | N | N |
| 77.75 | S | S | S | S | N | N | N | N | S | S | S | S | S | N | N | N | N |
| 78.00 | S | S | S | S | N | N | N | N | O | S | S | S | S | N | N | N | N |
| 78.25 | S | S | S | S | N | N | N | N | N | S | S | S | S | N | N | N | N |
| 78.50 | S | S | S | S | N | N | N | N | N | S | S | S | S | N | N | N | N |
| 78.75 | S | S | S | S | N | N | N | N | N | S | S | S | S | N | N | N | N |
| 79.00 | S | S | S | S | O | N | N | N | N | S | S | S | S | N | N | N | N |
| 79.25 | S | S | S | S | S | N | N | N | N | S | S | S | S | O | N | N | N |
| 79.50 | S | S | S | S | S | N | N | N | N | S | S | S | S | S | N | N | N |
| 79.75 | S | S | S | S | S | N | N | N | N | S | S | S | S | S | N | N | N |
| 80.00 | O | S | S | S | S | N | N | N | N | S | S | S | S | S | N | N | N |
| 80.25 | N | S | S | S | S | N | N | N | N | O | S | S | S | S | N | N | N |
| 80.50 | N | S | S | S | S | N | N | N | N | N | S | S | S | S | N | N | N |
| 80.75 | N | S | S | S | S | N | N | N | N | N | S | S | S | S | N | N | N |
| 81.00 | N | S | S | S | S | N | N | N | N | N | S | S | S | S | N | N | N |
| 81.25 | N | S | S | S | S | O | N | N | N | N | S | S | S | S | N | N | N |
| 81.50 | N | S | S | S | S | S | N | N | N | N | S | S | S | S | O | N | N |
| 81.75 | N | S | S | S | S | S | N | N | N | N | S | S | S | S | S | N | N |
| 82.00 | N | S | S | S | S | S | N | N | N | N | S | S | S | S | S | N | N |
| 82.25 | N | O | S | S | S | S | N | N | N | N | S | S | S | S | S | N | N |
| 82.50 | N | N | S | S | S | S | N | N | N | N | O | S | S | S | S | N | N |
| 82.75 | N | N | S | S | S | S | N | N | N | N | N | S | S | S | S | N | N |
| 83.00 | N | N | S | S | S | S | N | N | N | N | N | S | S | S | S | N | N |
| 83.25 | N | N | S | S | S | S | N | N | N | N | N | S | S | S | S | N | N |
| 83.50 | N | N | S | S | S | S | O | N | N | N | N | S | S | S | S | N | N |
| 83.75 | N | N | S | S | S | S | S | N | N | N | N | S | S | S | S | O | N |

Page Row 7, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 72.00 | S | S | N | N | N | N | N | S | S | S | S | N | N | N | N | O | S |
| 72.25 | S | S | N | N | N | N | N | S | S | S | S | N | N | N | N | N | S |
| 72.50 | S | S | N | N | N | N | N | S | S | S | S | N | N | N | N | N | S |
| 72.75 | S | S | O | N | N | N | N | S | S | S | S | N | N | N | N | N | S |
| 73.00 | S | S | S | N | N | N | N | S | S | S | S | O | N | N | N | N | S |
| 73.25 | S | S | S | N | N | N | N | S | S | S | S | S | N | N | N | N | S |
| 73.50 | S | S | S | N | N | N | N | S | S | S | S | S | N | N | N | N | S |
| 73.75 | S | S | S | N | N | N | N | S | S | S | S | S | N | N | N | N | S |
| 74.00 | S | S | S | N | N | N | N | O | S | S | S | S | N | N | N | N | S |

-continued

Coil Excitation

| | | | | | | | | | | | | | | | | | |
|---|---|---|---|---|---|---|---|---|---|---|---|---|---|---|---|---|---|
| 74.25 | S | S | S | N | N | N | N | N | S | S | S | S | N | N | N | N | O |
| 74.50 | S | S | S | N | N | N | N | N | S | S | S | S | N | N | N | N | N |
| 74.75 | S | S | S | N | N | N | N | N | S | S | S | S | N | N | N | N | N |
| 75.00 | S | S | S | O | N | N | N | N | S | S | S | S | N | N | N | N | N |
| 75.25 | S | S | S | S | N | N | N | N | S | S | S | S | O | N | N | N | N |
| 75.50 | S | S | S | S | N | N | N | N | S | S | S | S | S | N | N | N | N |
| 75.75 | S | S | S | S | N | N | N | N | S | S | S | S | S | N | N | N | N |
| 76.00 | S | S | S | S | N | N | N | N | S | S | S | S | S | N | N | N | N |
| 76.25 | S | S | S | S | N | N | N | N | O | S | S | S | S | N | N | N | N |
| 76.50 | S | S | S | S | N | N | N | N | N | S | S | S | S | N | N | N | N |
| 76.75 | S | S | S | S | N | N | N | N | N | S | S | S | S | N | N | N | N |
| 77.00 | S | S | S | S | N | N | N | N | N | S | S | S | S | N | N | N | N |
| 77.25 | S | S | S | S | O | N | N | N | N | S | S | S | S | N | N | N | N |
| 77.50 | S | S | S | S | S | N | N | N | N | S | S | S | S | O | N | N | N |
| 77.75 | S | S | S | S | S | N | N | N | N | S | S | S | S | S | N | N | N |
| 78.00 | S | S | S | S | S | N | N | N | N | S | S | S | S | S | N | N | N |
| 78.25 | O | S | S | S | S | N | N | N | N | S | S | S | S | S | N | N | N |
| 78.50 | N | S | S | S | S | N | N | N | N | O | S | S | S | S | N | N | N |
| 78.75 | N | S | S | S | S | N | N | N | N | N | S | S | S | S | N | N | N |
| 79.00 | N | S | S | S | S | N | N | N | N | N | S | S | S | S | N | N | N |
| 79.25 | N | S | S | S | S | N | N | N | N | N | S | S | S | S | N | N | N |
| 79.50 | N | S | S | S | S | O | N | N | N | N | S | S | S | S | N | N | N |
| 79.75 | N | S | S | S | S | S | N | N | N | N | S | S | S | S | O | N | N |
| 80.00 | N | S | S | S | S | S | N | N | N | N | S | S | S | S | S | N | N |
| 80.25 | N | S | S | S | S | S | N | N | N | N | S | S | S | S | S | N | N |
| 80.50 | N | O | S | S | S | S | N | N | N | N | S | S | S | S | S | N | N |
| 80.75 | N | N | S | S | S | S | N | N | N | N | O | S | S | S | S | N | N |
| 81.00 | N | N | S | S | S | S | N | N | N | N | N | S | S | S | S | N | N |
| 81.25 | N | N | S | S | S | S | N | N | N | N | N | S | S | S | S | N | N |
| 81.50 | N | N | S | S | S | S | N | N | N | N | N | S | S | S | S | N | N |
| 81.75 | N | N | S | S | S | S | O | N | N | N | N | S | S | S | S | N | N |
| 82.00 | N | N | S | S | S | S | S | N | N | N | N | S | S | S | S | O | N |
| 82.25 | N | N | S | S | S | S | S | N | N | N | N | S | S | S | S | S | N |
| 82.50 | N | N | S | S | S | S | S | N | N | N | N | S | S | S | S | S | N |
| 82.75 | N | N | O | S | S | S | S | N | N | N | N | S | S | S | S | S | N |
| 83.00 | N | N | N | S | S | S | S | N | N | N | N | O | S | S | S | S | N |
| 83.25 | N | N | N | S | S | S | S | N | N | N | N | N | S | S | S | S | N |
| 83.50 | N | N | N | S | S | S | S | N | N | N | N | N | S | S | S | S | N |
| 83.75 | N | N | N | S | S | S | S | N | N | N | N | N | S | S | S | S | N |

Page Row 7, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 72.00 | S | S | S | N | N | N | N | S | S | S | S | S | N | N | N | N | S |
| 72.25 | S | S | S | N | N | N | N | O | S | S | S | S | N | N | N | N | S |
| 72.50 | S | S | S | N | N | N | N | N | S | S | S | S | N | N | N | N | O |
| 72.75 | S | S | S | N | N | N | N | N | S | S | S | S | N | N | N | N | N |
| 73.00 | S | S | S | N | N | N | N | N | S | S | S | S | N | N | N | N | N |
| 73.25 | S | S | S | O | N | N | N | N | S | S | S | S | N | N | N | N | N |
| 73.50 | S | S | S | S | N | N | N | N | S | S | S | S | O | N | N | N | N |
| 73.75 | S | S | S | S | N | N | N | N | S | S | S | S | S | N | N | N | N |
| 74.00 | S | S | S | S | N | N | N | N | S | S | S | S | S | N | N | N | N |
| 74.25 | S | S | S | S | N | N | N | N | S | S | S | S | S | N | N | N | N |
| 74.50 | S | S | S | S | N | N | N | N | O | S | S | S | S | N | N | N | N |
| 74.75 | S | S | S | S | N | N | N | N | N | S | S | S | S | N | N | N | N |
| 75.00 | S | S | S | S | N | N | N | N | N | S | S | S | S | N | N | N | N |
| 75.25 | S | S | S | S | N | N | N | N | N | S | S | S | S | N | N | N | N |
| 75.50 | S | S | S | S | O | N | N | N | N | S | S | S | S | N | N | N | N |
| 75.75 | S | S | S | S | S | N | N | N | N | S | S | S | S | O | N | N | N |
| 76.00 | S | S | S | S | S | N | N | N | N | S | S | S | S | S | N | N | N |
| 76.25 | S | S | S | S | S | N | N | N | N | S | S | S | S | S | N | N | N |
| 76.50 | O | S | S | S | S | N | N | N | N | S | S | S | S | S | N | N | N |
| 76.75 | N | S | S | S | S | N | N | N | N | O | S | S | S | S | N | N | N |
| 77.00 | N | S | S | S | S | N | N | N | N | N | S | S | S | S | N | N | N |
| 77.25 | N | S | S | S | S | N | N | N | N | N | S | S | S | S | N | N | N |
| 77.50 | N | S | S | S | S | N | N | N | N | N | S | S | S | S | N | N | N |
| 77.75 | N | S | S | S | S | O | N | N | N | N | S | S | S | S | N | N | N |
| 78.00 | N | S | S | S | S | S | N | N | N | N | S | S | S | S | O | N | N |
| 78.25 | N | S | S | S | S | S | N | N | N | N | S | S | S | S | S | N | N |
| 78.50 | N | S | S | S | S | S | N | N | N | N | S | S | S | S | S | N | N |
| 78.75 | N | O | S | S | S | S | N | N | N | N | S | S | S | S | S | N | N |
| 79.00 | N | N | S | S | S | S | N | N | N | N | O | S | S | S | S | N | N |
| 79.25 | N | N | S | S | S | S | N | N | N | N | N | S | S | S | S | N | N |
| 79.50 | N | N | S | S | S | S | N | N | N | N | N | S | S | S | S | N | N |
| 79.75 | N | N | S | S | S | S | N | N | N | N | N | S | S | S | S | N | N |
| 80.00 | N | N | S | S | S | S | O | N | N | N | N | S | S | S | S | N | N |
| 80.25 | N | N | S | S | S | S | S | N | N | N | N | S | S | S | S | O | N |

-continued

| Coil Excitation | | | | | | | | | | | | | | | | | |
|---|---|---|---|---|---|---|---|---|---|---|---|---|---|---|---|---|---|
| 80.50 | N | N | S | S | S | S | S | N | N | N | N | S | S | S | S | S | N |
| 80.75 | N | N | S | S | S | S | S | N | N | N | N | S | S | S | S | S | N |
| 81.00 | N | N | O | S | S | S | S | N | N | N | N | S | S | S | S | S | N |
| 81.25 | N | N | N | S | S | S | S | N | N | N | N | O | S | S | S | S | N |
| 81.50 | N | N | N | S | S | S | S | N | N | N | N | N | S | S | S | S | N |
| 81.75 | N | N | N | S | S | S | S | N | N | N | N | N | S | S | S | S | N |
| 82.00 | N | N | N | S | S | S | S | N | N | N | N | N | S | S | S | S | N |
| 82.25 | N | N | N | S | S | S | S | O | N | N | N | N | S | S | S | S | N |
| 82.50 | N | N | N | S | S | S | S | S | N | N | N | N | S | S | S | S | O |
| 82.75 | N | N | N | S | S | S | S | S | N | N | N | N | S | S | S | S | S |
| 83.00 | N | N | N | S | S | S | S | S | N | N | N | N | S | S | S | S | S |
| 83.25 | N | N | N | O | S | S | S | S | N | N | N | N | S | S | S | S | S |
| 83.50 | N | N | N | N | S | S | S | S | N | N | N | N | O | S | S | S | S |
| 83.75 | N | N | N | N | S | S | S | S | N | N | N | N | N | S | S | S | S |

Page Row 7, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 72.00 | S | S | S | S | N | N | N | N | S | S | S | S | S | N | N | N | N |
| 72.25 | S | S | S | S | N | N | N | N | S | S | S | S | S | N | N | N | N |
| 72.50 | S | S | S | S | N | N | N | N | S | S | S | S | S | N | N | N | N |
| 72.75 | S | S | S | S | N | N | N | N | O | S | S | S | S | N | N | N | N |
| 73.00 | S | S | S | S | N | N | N | N | N | S | S | S | S | N | N | N | N |
| 73.25 | S | S | S | S | N | N | N | N | N | S | S | S | S | N | N | N | N |
| 73.50 | S | S | S | S | N | N | N | N | N | S | S | S | S | N | N | N | N |
| 73.75 | S | S | S | S | O | N | N | N | N | S | S | S | S | N | N | N | N |
| 74.00 | S | S | S | S | S | N | N | N | N | S | S | S | S | O | N | N | N |
| 74.25 | S | S | S | S | S | N | N | N | N | S | S | S | S | S | N | N | N |
| 74.50 | S | S | S | S | S | N | N | N | N | S | S | S | S | S | N | N | N |
| 74.75 | O | S | S | S | S | N | N | N | N | S | S | S | S | S | N | N | N |
| 75.00 | N | S | S | S | S | N | N | N | N | O | S | S | S | S | N | N | N |
| 75.25 | N | S | S | S | S | N | N | N | N | N | S | S | S | S | N | N | N |
| 75.50 | N | S | S | S | S | N | N | N | N | N | S | S | S | S | N | N | N |
| 75.75 | N | S | S | S | S | N | N | N | N | N | S | S | S | S | N | N | N |
| 76.00 | N | S | S | S | S | O | N | N | N | N | S | S | S | S | N | N | N |
| 76.25 | N | S | S | S | S | S | N | N | N | N | S | S | S | S | O | N | N |
| 76.50 | N | S | S | S | S | S | N | N | N | N | S | S | S | S | S | N | N |
| 76.75 | N | S | S | S | S | S | N | N | N | N | S | S | S | S | S | N | N |
| 77.00 | N | O | S | S | S | S | N | N | N | N | S | S | S | S | S | N | N |
| 77.25 | N | N | S | S | S | S | N | N | N | N | O | S | S | S | S | N | N |
| 77.50 | N | N | S | S | S | S | N | N | N | N | N | S | S | S | S | N | N |
| 77.75 | N | N | S | S | S | S | N | N | N | N | N | S | S | S | S | N | N |
| 78.00 | N | N | S | S | S | S | N | N | N | N | N | S | S | S | S | N | N |
| 78.25 | N | N | S | S | S | S | O | N | N | N | N | S | S | S | S | N | N |
| 78.50 | N | N | S | S | S | S | S | N | N | N | N | S | S | S | S | O | N |
| 78.75 | N | N | S | S | S | S | S | N | N | N | N | S | S | S | S | S | N |
| 79.00 | N | N | S | S | S | S | S | N | N | N | N | S | S | S | S | S | N |
| 79.25 | N | N | O | S | S | S | S | N | N | N | N | S | S | S | S | S | N |
| 79.50 | N | N | N | S | S | S | S | N | N | N | N | O | S | S | S | S | N |
| 79.75 | N | N | N | S | S | S | S | N | N | N | N | N | S | S | S | S | N |
| 80.00 | N | N | N | S | S | S | S | N | N | N | N | N | S | S | S | S | N |
| 80.25 | N | N | N | S | S | S | S | N | N | N | N | N | S | S | S | S | N |
| 80.50 | N | N | N | S | S | S | S | O | N | N | N | N | S | S | S | S | N |
| 80.75 | N | N | N | S | S | S | S | S | N | N | N | N | S | S | S | S | O |
| 81.00 | N | N | N | S | S | S | S | S | N | N | N | N | S | S | S | S | S |
| 81.25 | N | N | N | S | S | S | S | S | N | N | N | N | S | S | S | S | S |
| 81.50 | N | N | N | O | S | S | S | S | N | N | N | N | S | S | S | S | S |
| 81.75 | N | N | N | N | S | S | S | S | N | N | N | N | O | S | S | S | S |
| 82.00 | N | N | N | N | S | S | S | S | N | N | N | N | N | S | S | S | S |
| 82.25 | N | N | N | N | S | S | S | S | N | N | N | N | N | S | S | S | S |
| 82.50 | N | N | N | N | S | S | S | S | N | N | N | N | N | S | S | S | S |
| 82.75 | N | N | N | N | S | S | S | S | O | N | N | N | N | S | S | S | S |
| 83.00 | N | N | N | N | S | S | S | S | S | N | N | N | N | S | S | S | S |
| 83.25 | N | N | N | N | S | S | S | S | S | N | N | N | N | S | S | S | S |
| 83.50 | N | N | N | N | S | S | S | S | S | N | N | N | N | S | S | S | S |
| 83.75 | N | N | N | N | O | S | S | S | S | N | N | N | N | S | S | S | S |

Page Row 7, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 72.00 | S | S | S | S | O | N | N | N | N | S | S | S | S | N | N | N | N |
| 72.25 | S | S | S | S | S | N | N | N | N | S | S | S | S | O | N | N | N |
| 72.50 | S | S | S | S | S | N | N | N | N | S | S | S | S | S | N | N | N |
| 72.75 | S | S | S | S | S | N | N | N | N | S | S | S | S | S | N | N | N |
| 73.00 | O | S | S | S | S | N | N | N | N | S | S | S | S | S | N | N | N |
| 73.25 | N | S | S | S | S | N | N | N | N | O | S | S | S | S | N | N | N |
| 73.50 | N | S | S | S | S | N | N | N | N | N | S | S | S | S | N | N | N |

-continued

| Coil Excitation | | | | | | | | | | | | | | | | | 
|---|---|---|---|---|---|---|---|---|---|---|---|---|---|---|---|---|
| 73.75 | N | S | S | S | S | N | N | N | N | N | S | S | S | S | N | N | N |
| 74.00 | N | S | S | S | S | N | N | N | N | N | S | S | S | S | N | N | N |
| 74.25 | N | S | S | S | S | O | N | N | N | N | S | S | S | S | N | N | N |
| 74.50 | N | S | S | S | S | S | N | N | N | N | S | S | S | S | O | N | N |
| 74.75 | N | S | S | S | S | S | N | N | N | N | S | S | S | S | S | N | N |
| 75.00 | N | S | S | S | S | S | N | N | N | N | S | S | S | S | S | N | N |
| 75.25 | N | O | S | S | S | S | N | N | N | N | S | S | S | S | S | N | N |
| 75.50 | N | N | S | S | S | S | N | N | N | N | O | S | S | S | S | N | N |
| 75.75 | N | N | S | S | S | S | N | N | N | N | N | S | S | S | S | N | N |
| 76.00 | N | N | S | S | S | S | N | N | N | N | N | S | S | S | S | N | N |
| 76.25 | N | N | S | S | S | S | N | N | N | N | N | S | S | S | S | N | N |
| 76.50 | N | N | S | S | S | S | O | N | N | N | N | S | S | S | S | N | N |
| 76.75 | N | N | S | S | S | S | S | N | N | N | N | S | S | S | S | O | N |
| 77.00 | N | N | S | S | S | S | S | N | N | N | N | S | S | S | S | S | N |
| 77.25 | N | N | S | S | S | S | S | N | N | N | N | S | S | S | S | S | N |
| 77.50 | N | N | O | S | S | S | S | N | N | N | N | S | S | S | S | S | N |
| 77.75 | N | N | N | S | S | S | S | N | N | N | N | O | S | S | S | S | N |
| 78.00 | N | N | N | S | S | S | S | N | N | N | N | N | S | S | S | S | N |
| 78.25 | N | N | N | S | S | S | S | N | N | N | N | N | S | S | S | S | N |
| 78.50 | N | N | N | S | S | S | S | N | N | N | N | N | S | S | S | S | N |
| 78.75 | N | N | N | S | S | S | S | O | N | N | N | N | S | S | S | S | N |
| 79.00 | N | N | N | S | S | S | S | S | N | N | N | N | S | S | S | S | O |
| 79.25 | N | N | N | S | S | S | S | S | N | N | N | N | S | S | S | S | S |
| 79.50 | N | N | N | S | S | S | S | S | N | N | N | N | S | S | S | S | S |
| 79.75 | N | N | N | O | S | S | S | S | N | N | N | N | S | S | S | S | S |
| 80.00 | N | N | N | N | S | S | S | S | N | N | N | N | O | S | S | S | S |
| 80.25 | N | N | N | N | S | S | S | S | N | N | N | N | N | S | S | S | S |
| 80.50 | N | N | N | N | S | S | S | S | N | N | N | N | N | S | S | S | S |
| 80.75 | N | N | N | N | S | S | S | S | N | N | N | N | N | S | S | S | S |
| 81.00 | N | N | N | N | S | S | S | S | O | N | N | N | N | S | S | S | S |
| 81.25 | N | N | N | N | S | S | S | S | S | N | N | N | N | S | S | S | S |
| 81.50 | N | N | N | N | S | S | S | S | S | N | N | N | N | S | S | S | S |
| 81.75 | N | N | N | N | S | S | S | S | S | N | N | N | N | S | S | S | S |
| 82.00 | N | N | N | N | O | S | S | S | S | N | N | N | N | S | S | S | S |
| 82.25 | N | N | N | N | N | S | S | S | S | N | N | N | N | O | S | S | S |
| 82.50 | N | N | N | N | N | S | S | S | S | N | N | N | N | N | S | S | S |
| 82.75 | N | N | N | N | N | S | S | S | S | N | N | N | N | N | S | S | S |
| 83.00 | O | N | N | N | N | S | S | S | S | N | N | N | N | N | S | S | S |
| 83.25 | S | N | N | N | N | S | S | S | S | O | N | N | N | N | S | S | S |
| 83.50 | S | N | N | N | N | S | S | S | S | S | N | N | N | N | S | S | S |
| 83.75 | S | N | N | N | N | S | S | S | S | S | N | N | N | N | S | S | S |

Page Row 7, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 72.00 | N | S | S | S | S | N | N | N | N | N | S | S | S | S | N | N | N |
| 72.25 | N | S | S | S | S | N | N | N | N | N | S | S | S | S | N | N | N |
| 72.50 | N | S | S | S | S | O | N | N | N | N | S | S | S | S | N | N | N |
| 72.75 | N | S | S | S | S | S | N | N | N | N | S | S | S | S | O | N | N |
| 73.00 | N | S | S | S | S | S | N | N | N | N | S | S | S | S | S | N | N |
| 73.25 | N | S | S | S | S | S | N | N | N | N | S | S | S | S | S | N | N |
| 73.50 | N | O | S | S | S | S | N | N | N | N | S | S | S | S | S | N | N |
| 73.75 | N | N | S | S | S | S | N | N | N | N | O | S | S | S | S | N | N |
| 74.00 | N | N | S | S | S | S | N | N | N | N | N | S | S | S | S | N | N |
| 74.25 | N | N | S | S | S | S | N | N | N | N | N | S | S | S | S | N | N |
| 74.50 | N | N | S | S | S | S | N | N | N | N | N | S | S | S | S | N | N |
| 74.75 | N | N | S | S | S | S | O | N | N | N | N | S | S | S | S | N | N |
| 75.00 | N | N | S | S | S | S | S | N | N | N | N | S | S | S | S | O | N |
| 75.25 | N | N | S | S | S | S | S | N | N | N | N | S | S | S | S | S | N |
| 75.50 | N | N | S | S | S | S | S | N | N | N | N | S | S | S | S | S | N |
| 75.75 | N | N | O | S | S | S | S | N | N | N | N | S | S | S | S | S | N |
| 76.00 | N | N | N | S | S | S | S | N | N | N | N | O | S | S | S | S | N |
| 76.25 | N | N | N | S | S | S | S | N | N | N | N | N | S | S | S | S | N |
| 76.50 | N | N | N | S | S | S | S | N | N | N | N | N | S | S | S | S | N |
| 76.75 | N | N | N | S | S | S | S | N | N | N | N | N | S | S | S | S | N |
| 77.00 | N | N | N | S | S | S | S | O | N | N | N | N | S | S | S | S | N |
| 77.25 | N | N | N | S | S | S | S | S | N | N | N | N | S | S | S | S | O |
| 77.50 | N | N | N | S | S | S | S | S | N | N | N | N | S | S | S | S | S |
| 77.75 | N | N | N | S | S | S | S | S | N | N | N | N | S | S | S | S | S |
| 78.00 | N | N | N | O | S | S | S | S | N | N | N | N | S | S | S | S | S |
| 78.25 | N | N | N | N | S | S | S | S | N | N | N | N | O | S | S | S | S |
| 78.50 | N | N | N | N | S | S | S | S | N | N | N | N | N | S | S | S | S |
| 78.75 | N | N | N | N | S | S | S | S | N | N | N | N | N | S | S | S | S |
| 79.00 | N | N | N | N | S | S | S | S | N | N | N | N | N | S | S | S | S |
| 79.25 | N | N | N | N | S | S | S | S | O | N | N | N | N | S | S | S | S |
| 79.50 | N | N | N | N | S | S | S | S | S | N | N | N | N | S | S | S | S |
| 79.75 | N | N | N | N | S | S | S | S | S | N | N | N | N | S | S | S | S |

-continued

Coil Excitation

| | | | | | | | | | | | | | | | | | |
|---|---|---|---|---|---|---|---|---|---|---|---|---|---|---|---|---|---|
| 80.00 | N | N | N | N | S | S | S | S | S | N | N | N | N | S | S | S | S |
| 80.25 | N | N | N | N | O | S | S | S | S | N | N | N | N | S | S | S | S |
| 80.50 | N | N | N | N | N | S | S | S | S | N | N | N | N | O | S | S | S |
| 80.75 | N | N | N | N | N | S | S | S | S | N | N | N | N | N | S | S | S |
| 81.00 | N | N | N | N | N | S | S | S | S | N | N | N | N | N | S | S | S |
| 81.25 | O | N | N | N | N | S | S | S | S | N | N | N | N | N | S | S | S |
| 81.50 | S | N | N | N | N | S | S | S | S | O | N | N | N | N | S | S | S |
| 81.75 | S | N | N | N | N | S | S | S | S | S | N | N | N | N | S | S | S |
| 82.00 | S | N | N | N | N | S | S | S | S | S | N | N | N | N | S | S | S |
| 82.25 | S | N | N | N | N | S | S | S | S | S | N | N | N | N | S | S | S |
| 82.50 | S | N | N | N | N | O | S | S | S | S | N | N | N | N | S | S | S |
| 82.75 | S | N | N | N | N | N | S | S | S | S | N | N | N | N | O | S | S |
| 83.00 | S | N | N | N | N | N | S | S | S | S | N | N | N | N | N | S | S |
| 83.25 | S | N | N | N | N | N | S | S | S | S | N | N | N | N | N | S | S |
| 83.50 | S | O | N | N | N | N | S | S | S | S | N | N | N | N | N | S | S |
| 83.75 | S | S | N | N | N | N | S | S | S | S | O | N | N | N | N | S | S |

Page Row 7, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 72.00 | N | N | S | S | S | S | N | N | N | N | O | S | S | S | S | N | N |
| 72.25 | N | N | S | S | S | S | N | N | N | N | N | S | S | S | S | N | N |
| 72.50 | N | N | S | S | S | S | N | N | N | N | N | S | S | S | S | N | N |
| 72.75 | N | N | S | S | S | S | N | N | N | N | N | S | S | S | S | N | N |
| 73.00 | N | N | S | S | S | S | O | N | N | N | N | S | S | S | S | N | N |
| 73.25 | N | N | S | S | S | S | S | N | N | N | N | S | S | S | S | O | N |
| 73.50 | N | N | S | S | S | S | S | N | N | N | N | S | S | S | S | S | N |
| 73.75 | N | N | S | S | S | S | S | N | N | N | N | S | S | S | S | S | N |
| 74.00 | N | N | O | S | S | S | S | N | N | N | N | S | S | S | S | S | N |
| 74.25 | N | N | N | S | S | S | S | N | N | N | N | O | S | S | S | S | N |
| 74.50 | N | N | N | S | S | S | S | N | N | N | N | N | S | S | S | S | N |
| 74.75 | N | N | N | S | S | S | S | N | N | N | N | N | S | S | S | S | N |
| 75.00 | N | N | N | S | S | S | S | N | N | N | N | N | S | S | S | S | N |
| 75.25 | N | N | N | S | S | S | S | O | N | N | N | N | S | S | S | S | N |
| 75.50 | N | N | N | S | S | S | S | S | N | N | N | N | S | S | S | S | O |
| 75.75 | N | N | N | S | S | S | S | S | N | N | N | N | S | S | S | S | S |
| 76.00 | N | N | N | S | S | S | S | S | N | N | N | N | S | S | S | S | S |
| 76.25 | N | N | N | O | S | S | S | S | N | N | N | N | S | S | S | S | S |
| 76.50 | N | N | N | N | S | S | S | S | N | N | N | N | O | S | S | S | S |
| 76.75 | N | N | N | N | S | S | S | S | N | N | N | N | N | S | S | S | S |
| 77.00 | N | N | N | N | S | S | S | S | N | N | N | N | N | S | S | S | S |
| 77.25 | N | N | N | N | S | S | S | S | N | N | N | N | N | S | S | S | S |
| 77.50 | N | N | N | N | S | S | S | S | O | N | N | N | N | S | S | S | S |
| 77.75 | N | N | N | N | S | S | S | S | S | N | N | N | N | S | S | S | S |
| 78.00 | N | N | N | N | S | S | S | S | S | N | N | N | N | S | S | S | S |
| 78.25 | N | N | N | N | S | S | S | S | S | N | N | N | N | S | S | S | S |
| 78.50 | N | N | N | N | O | S | S | S | S | N | N | N | N | S | S | S | S |
| 78.75 | N | N | N | N | N | S | S | S | S | N | N | N | N | O | S | S | S |
| 79.00 | N | N | N | N | N | S | S | S | S | N | N | N | N | N | S | S | S |
| 79.25 | N | N | N | N | N | S | S | S | S | N | N | N | N | N | S | S | S |
| 79.50 | O | N | N | N | N | S | S | S | S | N | N | N | N | N | S | S | S |
| 79.75 | S | N | N | N | N | S | S | S | S | O | N | N | N | N | S | S | S |
| 80.00 | S | N | N | N | N | S | S | S | S | S | N | N | N | N | S | S | S |
| 80.25 | S | N | N | N | N | S | S | S | S | S | N | N | N | N | S | S | S |
| 80.50 | S | N | N | N | N | S | S | S | S | S | N | N | N | N | S | S | S |
| 80.75 | S | N | N | N | N | O | S | S | S | S | N | N | N | N | S | S | S |
| 81.00 | S | N | N | N | N | N | S | S | S | S | N | N | N | N | O | S | S |
| 81.25 | S | N | N | N | N | N | S | S | S | S | N | N | N | N | N | S | S |
| 81.50 | S | N | N | N | N | N | S | S | S | S | N | N | N | N | N | S | S |
| 81.75 | S | O | N | N | N | N | S | S | S | S | N | N | N | N | N | S | S |
| 82.00 | S | S | N | N | N | N | S | S | S | S | O | N | N | N | N | S | S |
| 82.25 | S | S | N | N | N | N | S | S | S | S | S | N | N | N | N | S | S |
| 82.50 | S | S | N | N | N | N | S | S | S | S | S | N | N | N | N | S | S |
| 82.75 | S | S | N | N | N | N | S | S | S | S | S | N | N | N | N | S | S |
| 83.00 | S | S | N | N | N | N | O | S | S | S | S | N | N | N | N | S | S |
| 83.25 | S | S | N | N | N | N | N | S | S | S | S | N | N | N | N | O | S |
| 83.50 | S | S | N | N | N | N | N | S | S | S | S | N | N | N | N | N | S |
| 83.75 | S | S | N | N | N | N | N | S | S | S | S | N | N | N | N | N | S |

Page Row 7, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 72.00 | N | N | S | S | S | S | S | N | N | N | N | S | S | S | S | S | N |
| 72.25 | N | N | O | S | S | S | S | N | N | N | N | S | S | S | S | S | N |
| 72.50 | N | N | N | S | S | S | S | N | N | N | N | O | S | S | S | S | N |
| 72.75 | N | N | N | S | S | S | S | N | N | N | N | N | S | S | S | S | N |
| 73.00 | N | N | N | S | S | S | S | N | N | N | N | N | S | S | S | S | N |

-continued

| Coil Excitation | | | | | | | | | | | | | | | | | |
|---|---|---|---|---|---|---|---|---|---|---|---|---|---|---|---|---|---|
| 73.25 | N | N | N | S | S | S | S | N | N | N | N | N | S | S | S | S | N |
| 73.50 | N | N | N | S | S | S | S | O | N | N | N | N | S | S | S | S | N |
| 73.75 | N | N | N | S | S | S | S | S | N | N | N | N | S | S | S | S | O |
| 74.00 | N | N | N | S | S | S | S | S | N | N | N | N | S | S | S | S | S |
| 74.25 | N | N | N | S | S | S | S | S | N | N | N | N | S | S | S | S | S |
| 74.50 | N | N | N | O | S | S | S | S | N | N | N | N | S | S | S | S | S |
| 74.75 | N | N | N | N | S | S | S | S | N | N | N | N | O | S | S | S | S |
| 75.00 | N | N | N | N | S | S | S | S | N | N | N | N | N | S | S | S | S |
| 75.25 | N | N | N | N | S | S | S | S | N | N | N | N | N | S | S | S | S |
| 75.50 | N | N | N | N | S | S | S | S | N | N | N | N | N | S | S | S | S |
| 75.75 | N | N | N | N | S | S | S | S | O | N | N | N | N | S | S | S | S |
| 76.00 | N | N | N | N | S | S | S | S | S | N | N | N | N | S | S | S | S |
| 76.25 | N | N | N | N | S | S | S | S | S | N | N | N | N | S | S | S | S |
| 76.50 | N | N | N | N | S | S | S | S | S | N | N | N | N | S | S | S | S |
| 76.75 | N | N | N | N | O | S | S | S | S | N | N | N | N | S | S | S | S |
| 77.00 | N | N | N | N | N | S | S | S | S | N | N | N | N | O | S | S | S |
| 77.25 | N | N | N | N | N | S | S | S | S | N | N | N | N | N | S | S | S |
| 77.50 | N | N | N | N | N | S | S | S | S | N | N | N | N | N | S | S | S |
| 77.75 | O | N | N | N | N | S | S | S | S | N | N | N | N | N | S | S | S |
| 78.00 | S | N | N | N | N | S | S | S | S | O | N | N | N | N | S | S | S |
| 78.25 | S | N | N | N | N | S | S | S | S | S | N | N | N | N | S | S | S |
| 78.50 | S | N | N | N | N | S | S | S | S | S | N | N | N | N | S | S | S |
| 78.75 | S | N | N | N | N | S | S | S | S | S | N | N | N | N | S | S | S |
| 79.00 | S | N | N | N | N | O | S | S | S | S | N | N | N | N | S | S | S |
| 79.25 | S | N | N | N | N | N | S | S | S | S | N | N | N | N | O | S | S |
| 79.50 | S | N | N | N | N | N | S | S | S | S | N | N | N | N | N | S | S |
| 79.75 | S | N | N | N | N | N | S | S | S | S | N | N | N | N | N | S | S |
| 80.00 | S | O | N | N | N | N | S | S | S | S | N | N | N | N | N | S | S |
| 80.25 | S | S | N | N | N | N | S | S | S | S | O | N | N | N | N | S | S |
| 80.50 | S | S | N | N | N | N | S | S | S | S | S | N | N | N | N | S | S |
| 80.75 | S | S | N | N | N | N | S | S | S | S | S | N | N | N | N | S | S |
| 81.00 | S | S | N | N | N | N | S | S | S | S | S | N | N | N | N | S | S |
| 81.25 | S | S | N | N | N | N | O | S | S | S | S | N | N | N | N | S | S |
| 81.50 | S | S | N | N | N | N | N | S | S | S | S | N | N | N | N | O | S |
| 81.75 | S | S | N | N | N | N | N | S | S | S | S | N | N | N | N | N | S |
| 82.00 | S | S | N | N | N | N | N | S | S | S | S | N | N | N | N | N | S |
| 82.25 | S | S | O | N | N | N | N | S | S | S | S | N | N | N | N | N | S |
| 82.50 | S | S | S | N | N | N | N | S | S | S | S | O | N | N | N | N | S |
| 82.75 | S | S | S | N | N | N | N | S | S | S | S | S | N | N | N | N | S |
| 83.00 | S | S | S | N | N | N | N | S | S | S | S | S | N | N | N | N | S |
| 83.25 | S | S | S | N | N | N | N | S | S | S | S | S | N | N | N | N | S |
| 83.50 | S | S | S | N | N | N | N | O | S | S | S | S | N | N | N | N | S |
| 83.75 | S | S | S | N | N | N | N | N | S | S | S | S | N | N | N | N | O |

Page Row 7, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 72.00 | N | N | N | S | S | S | S | S | N | N | N | N | S | S | S | S | O |
| 72.25 | N | N | N | S | S | S | S | S | N | N | N | N | S | S | S | S | S |
| 72.50 | N | N | N | S | S | S | S | S | N | N | N | N | S | S | S | S | S |
| 72.75 | N | N | N | O | S | S | S | S | N | N | N | N | S | S | S | S | S |
| 73.00 | N | N | N | N | S | S | S | S | N | N | N | N | O | S | S | S | S |
| 73.25 | N | N | N | N | S | S | S | S | N | N | N | N | N | S | S | S | S |
| 73.50 | N | N | N | N | S | S | S | S | N | N | N | N | N | S | S | S | S |
| 73.75 | N | N | N | N | S | S | S | S | N | N | N | N | N | S | S | S | S |
| 74.00 | N | N | N | N | S | S | S | S | O | N | N | N | N | S | S | S | S |
| 74.25 | N | N | N | N | S | S | S | S | S | N | N | N | N | S | S | S | S |
| 74.50 | N | N | N | N | S | S | S | S | S | N | N | N | N | S | S | S | S |
| 74.75 | N | N | N | N | S | S | S | S | S | N | N | N | N | S | S | S | S |
| 75.00 | N | N | N | N | O | S | S | S | S | N | N | N | N | S | S | S | S |
| 75.25 | N | N | N | N | N | S | S | S | S | N | N | N | N | O | S | S | S |
| 75.50 | N | N | N | N | N | S | S | S | S | N | N | N | N | N | S | S | S |
| 75.75 | N | N | N | N | N | S | S | S | S | N | N | N | N | N | S | S | S |
| 76.00 | O | N | N | N | N | S | S | S | S | N | N | N | N | N | S | S | S |
| 76.25 | S | N | N | N | N | S | S | S | S | O | N | N | N | N | S | S | S |
| 76.50 | S | N | N | N | N | S | S | S | S | S | N | N | N | N | S | S | S |
| 76.75 | S | N | N | N | N | S | S | S | S | S | N | N | N | N | S | S | S |
| 77.00 | S | N | N | N | N | S | S | S | S | S | N | N | N | N | S | S | S |
| 77.25 | S | N | N | N | N | O | S | S | S | S | N | N | N | N | S | S | S |
| 77.50 | S | N | N | N | N | N | S | S | S | S | N | N | N | N | O | S | S |
| 77.75 | S | N | N | N | N | N | S | S | S | S | N | N | N | N | N | S | S |
| 78.00 | S | N | N | N | N | N | S | S | S | S | N | N | N | N | N | S | S |
| 78.25 | S | O | N | N | N | N | S | S | S | S | N | N | N | N | N | S | S |
| 78.50 | S | S | N | N | N | N | S | S | S | S | O | N | N | N | N | S | S |
| 78.75 | S | S | N | N | N | N | S | S | S | S | S | N | N | N | N | S | S |
| 79.00 | S | S | N | N | N | N | S | S | S | S | S | N | N | N | N | S | S |
| 79.25 | S | S | N | N | N | N | S | S | S | S | S | N | N | N | N | S | S |

-continued

| Coil Excitation | | | | | | | | | | | | | | | | | |
|---|---|---|---|---|---|---|---|---|---|---|---|---|---|---|---|---|---|
| 79.50 | S | S | N | N | N | N | O | S | S | S | S | N | N | N | N | S | S |
| 79.75 | S | S | N | N | N | N | N | S | S | S | S | N | N | N | N | O | S |
| 80.00 | S | S | N | N | N | N | N | S | S | S | S | N | N | N | N | N | S |
| 80.25 | S | S | N | N | N | N | N | S | S | S | S | N | N | N | N | N | S |
| 80.50 | S | S | O | N | N | N | N | S | S | S | S | N | N | N | N | N | S |
| 80.75 | S | S | S | N | N | N | N | S | S | S | S | O | N | N | N | N | S |
| 81.00 | S | S | S | N | N | N | N | S | S | S | S | S | N | N | N | N | S |
| 81.25 | S | S | S | N | N | N | N | S | S | S | S | S | N | N | N | N | S |
| 81.50 | S | S | S | N | N | N | N | S | S | S | S | S | N | N | N | N | S |
| 81.75 | S | S | S | N | N | N | N | O | S | S | S | S | N | N | N | N | S |
| 82.00 | S | S | S | N | N | N | N | N | S | S | S | S | N | N | N | N | O |
| 82.25 | S | S | S | N | N | N | N | N | S | S | S | S | N | N | N | N | N |
| 82.50 | S | S | S | N | N | N | N | N | S | S | S | S | N | N | N | N | N |
| 82.75 | S | S | S | O | N | N | N | N | S | S | S | S | N | N | N | N | N |
| 83.00 | S | S | S | S | N | N | N | N | S | S | S | S | O | N | N | N | N |
| 83.25 | S | S | S | S | N | N | N | N | S | S | S | S | S | N | N | N | N |
| 83.50 | S | S | S | S | N | N | N | N | S | S | S | S | S | N | N | N | N |
| 83.75 | S | S | S | S | N | N | N | N | S | S | S | S | S | N | N | N | N |

Page Row 7, Page Column 9

| Coil | 154 | 155 | 156 | 157 | 158 | 159 | 160 |
|---|---|---|---|---|---|---|---|
| 72.00 | N | N | N | N | S | S | S |
| 72.25 | N | N | N | N | S | S | S |
| 72.50 | N | N | N | N | S | S | S |
| 72.75 | N | N | N | N | S | S | S |
| 73.00 | N | N | N | N | S | S | S |
| 73.25 | N | N | N | N | O | S | S |
| 73.50 | N | N | N | N | N | S | S |
| 73.75 | N | N | N | N | N | S | S |
| 74.00 | N | N | N | N | N | S | S |
| 74.25 | O | N | N | N | N | S | S |
| 74.50 | S | N | N | N | N | S | S |
| 74.75 | S | N | N | N | N | S | S |
| 75.00 | S | N | N | N | N | S | S |
| 75.25 | S | N | N | N | N | S | S |
| 75.50 | S | N | N | N | N | O | S |
| 75.75 | S | N | N | N | N | N | S |
| 76.00 | S | N | N | N | N | N | S |
| 76.25 | S | N | N | N | N | N | S |
| 76.50 | S | O | N | N | N | N | S |
| 76.75 | S | S | N | N | N | N | S |
| 77.00 | S | S | N | N | N | N | S |
| 77.25 | S | S | N | N | N | N | S |
| 77.50 | S | S | N | N | N | N | S |
| 77.75 | S | S | N | N | N | N | O |
| 78.00 | S | S | N | N | N | N | N |
| 78.25 | S | S | N | N | N | N | N |
| 78.50 | S | S | N | N | N | N | N |
| 78.75 | S | S | O | N | N | N | N |
| 79.00 | S | S | S | N | N | N | N |
| 79.25 | S | S | S | N | N | N | N |
| 79.50 | S | S | S | N | N | N | N |
| 79.75 | S | S | S | N | N | N | N |
| 80.00 | S | S | S | N | N | N | N |
| 80.25 | S | S | S | N | N | N | N |
| 80.50 | S | S | S | N | N | N | N |
| 80.75 | S | S | S | N | N | N | N |
| 81.00 | S | S | S | O | N | N | N |
| 81.25 | S | S | S | S | N | N | N |
| 81.50 | S | S | S | S | N | N | N |
| 81.75 | S | S | S | S | N | N | N |
| 82.00 | S | S | S | S | N | N | N |
| 82.25 | S | S | S | S | N | N | N |
| 82.50 | S | S | S | S | N | N | N |
| 82.75 | S | S | S | S | N | N | N |
| 83.00 | S | S | S | S | N | N | N |
| 83.25 | S | S | S | S | O | N | N |
| 83.50 | S | S | S | S | S | N | N |
| 83.75 | S | S | S | S | S | N | N |

Page Row 7, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 84.00 | N | N | S | S | S | S | S | N | N | N | N | S | S | S | S | S | N |
| 84.25 | N | N | S | S | S | S | S | N | N | N | N | S | S | S | S | S | N |
| 84.50 | N | N | O | S | S | S | S | N | N | N | N | S | S | S | S | S | N |

-continued

| Coil Excitation | | | | | | | | | | | | | | | | | |
|---|---|---|---|---|---|---|---|---|---|---|---|---|---|---|---|---|---|
| 84.75 | N | N | N | S | S | S | S | N | N | N | N | O | S | S | S | S | N |
| 85.00 | N | N | N | S | S | S | S | N | N | N | N | N | S | S | S | S | N |
| 85.25 | N | N | N | S | S | S | S | N | N | N | N | N | S | S | S | S | N |
| 85.50 | N | N | N | S | S | S | S | N | N | N | N | N | S | S | S | S | N |
| 85.75 | N | N | N | S | S | S | S | O | N | N | N | N | S | S | S | S | N |
| 86.00 | N | N | N | S | S | S | S | S | N | N | N | N | S | S | S | S | O |
| 86.25 | N | N | N | S | S | S | S | S | N | N | N | N | S | S | S | S | S |
| 86.50 | N | N | N | S | S | S | S | S | N | N | N | N | S | S | S | S | S |
| 86.75 | N | N | N | O | S | S | S | S | N | N | N | N | S | S | S | S | S |
| 87.00 | N | N | N | N | S | S | S | S | N | N | N | N | O | S | S | S | S |
| 87.25 | N | N | N | N | S | S | S | S | N | N | N | N | N | S | S | S | S |
| 87.50 | N | N | N | N | S | S | S | S | N | N | N | N | N | S | S | S | S |
| 87.75 | N | N | N | N | S | S | S | S | N | N | N | N | N | S | S | S | S |
| 88.00 | N | N | N | N | S | S | S | S | O | N | N | N | N | S | S | S | S |
| 88.25 | N | N | N | N | S | S | S | S | S | N | N | N | N | S | S | S | S |
| 88.50 | N | N | N | N | S | S | S | S | S | N | N | N | N | S | S | S | S |
| 88.75 | N | N | N | N | S | S | S | S | S | N | N | N | N | S | S | S | S |
| 89.00 | N | N | N | N | O | S | S | S | S | N | N | N | N | S | S | S | S |
| 89.25 | N | N | N | N | N | S | S | S | S | N | N | N | N | O | S | S | S |
| 89.50 | N | N | N | N | N | S | S | S | S | N | N | N | N | N | S | S | S |
| 89.75 | N | N | N | N | N | S | S | S | S | N | N | N | N | N | S | S | S |
| 90.00 | O | N | N | N | N | S | S | S | S | N | N | N | N | N | S | S | S |
| 90.25 | S | N | N | N | N | S | S | S | S | O | N | N | N | N | S | S | S |
| 90.50 | S | N | N | N | N | S | S | S | S | S | N | N | N | N | S | S | S |
| 90.75 | S | N | N | N | N | S | S | S | S | S | N | N | N | N | S | S | S |
| 91.00 | S | N | N | N | N | S | S | S | S | S | N | N | N | N | S | S | S |
| 91.25 | S | N | N | N | N | O | S | S | S | S | N | N | N | N | S | S | S |
| 91.50 | S | N | N | N | N | N | S | S | S | S | N | N | N | N | O | S | S |
| 91.75 | S | N | N | N | N | N | S | S | S | S | N | N | N | N | N | S | S |
| 92.00 | S | N | N | N | N | N | S | S | S | S | N | N | N | N | N | S | S |
| 92.25 | S | O | N | N | N | N | S | S | S | S | N | N | N | N | N | S | S |
| 92.50 | S | S | N | N | N | N | S | S | S | S | O | N | N | N | N | S | S |
| 92.75 | S | S | N | N | N | N | S | S | S | S | S | N | N | N | N | S | S |
| 93.00 | S | S | N | N | N | N | S | S | S | S | S | N | N | N | N | S | S |
| 93.25 | S | S | N | N | N | N | S | S | S | S | S | N | N | N | N | S | S |
| 93.50 | S | S | N | N | N | N | O | S | S | S | S | N | N | N | N | S | S |
| 93.75 | S | S | N | N | N | N | N | S | S | S | S | N | N | N | N | O | S |
| 94.00 | S | S | N | N | N | N | N | S | S | S | S | N | N | N | N | N | S |
| 94.25 | S | S | N | N | N | N | N | S | S | S | S | N | N | N | N | N | S |
| 94.50 | S | S | O | N | N | N | N | S | S | S | S | N | N | N | N | N | S |
| 94.75 | S | S | S | N | N | N | N | S | S | S | S | O | N | N | N | N | S |
| 95.00 | S | S | S | N | N | N | N | S | S | S | S | S | N | N | N | N | S |
| 95.25 | S | S | S | N | N | N | N | S | S | S | S | S | N | N | N | N | S |
| 95.50 | S | S | S | N | N | N | N | S | S | S | S | S | N | N | N | N | S |
| 95.75 | S | S | S | N | N | N | N | O | S | S | S | S | N | N | N | N | S |

Page Row 8, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 84.00 | N | N | N | S | S | S | S | O | N | N | N | N | S | S | S | S | N |
| 84.25 | N | N | N | S | S | S | S | S | N | N | N | N | S | S | S | S | O |
| 84.50 | N | N | N | S | S | S | S | S | N | N | N | N | S | S | S | S | S |
| 84.75 | N | N | N | S | S | S | S | S | N | N | N | N | S | S | S | S | S |
| 85.00 | N | N | N | O | S | S | S | S | N | N | N | N | S | S | S | S | S |
| 85.25 | N | N | N | N | S | S | S | S | N | N | N | N | O | S | S | S | S |
| 85.50 | N | N | N | N | S | S | S | S | N | N | N | N | N | S | S | S | S |
| 85.75 | N | N | N | N | S | S | S | S | N | N | N | N | N | S | S | S | S |
| 86.00 | N | N | N | N | S | S | S | S | N | N | N | N | N | S | S | S | S |
| 86.25 | N | N | N | N | S | S | S | S | O | N | N | N | N | S | S | S | S |
| 86.50 | N | N | N | N | S | S | S | S | S | N | N | N | N | S | S | S | S |
| 86.75 | N | N | N | N | S | S | S | S | S | N | N | N | N | S | S | S | S |
| 87.00 | N | N | N | N | S | S | S | S | S | N | N | N | N | S | S | S | S |
| 87.25 | N | N | N | N | O | S | S | S | S | N | N | N | N | S | S | S | S |
| 87.50 | N | N | N | N | N | S | S | S | S | N | N | N | N | O | S | S | S |
| 87.75 | N | N | N | N | N | S | S | S | S | N | N | N | N | N | S | S | S |
| 88.00 | N | N | N | N | N | S | S | S | S | N | N | N | N | N | S | S | S |
| 88.25 | O | N | N | N | N | S | S | S | S | N | N | N | N | N | S | S | S |
| 88.50 | S | N | N | N | N | S | S | S | S | O | N | N | N | N | S | S | S |
| 88.75 | S | N | N | N | N | S | S | S | S | S | N | N | N | N | S | S | S |
| 89.00 | S | N | N | N | N | S | S | S | S | S | N | N | N | N | S | S | S |
| 89.25 | S | N | N | N | N | S | S | S | S | S | N | N | N | N | S | S | S |
| 89.50 | S | N | N | N | N | O | S | S | S | S | N | N | N | N | S | S | S |
| 89.75 | S | N | N | N | N | N | S | S | S | S | N | N | N | N | O | S | S |
| 90.00 | S | N | N | N | N | N | S | S | S | S | N | N | N | N | N | S | S |
| 90.25 | S | N | N | N | N | N | S | S | S | S | N | N | N | N | N | S | S |
| 90.50 | S | O | N | N | N | N | S | S | S | S | N | N | N | N | N | S | S |
| 90.75 | S | S | N | N | N | N | S | S | S | S | O | N | N | N | N | S | S |

-continued

| Coil Excitation | | | | | | | | | | | | | | | | | |
|---|---|---|---|---|---|---|---|---|---|---|---|---|---|---|---|---|---|
| 91.00 | S | S | N | N | N | N | S | S | S | S | S | N | N | N | N | S | S |
| 91.25 | S | S | N | N | N | N | S | S | S | S | S | N | N | N | N | S | S |
| 91.50 | S | S | N | N | N | N | S | S | S | S | S | N | N | N | N | S | S |
| 91.75 | S | S | N | N | N | N | O | S | S | S | S | N | N | N | N | S | S |
| 92.00 | S | S | N | N | N | N | N | S | S | S | S | N | N | N | N | O | S |
| 92.25 | S | S | N | N | N | N | N | S | S | S | S | N | N | N | N | N | S |
| 92.50 | S | S | N | N | N | N | N | S | S | S | S | N | N | N | N | N | S |
| 92.75 | S | S | O | N | N | N | N | S | S | S | S | N | N | N | N | N | S |
| 93.00 | S | S | S | N | N | N | N | S | S | S | S | O | N | N | N | N | S |
| 93.25 | S | S | S | N | N | N | N | S | S | S | S | S | N | N | N | N | S |
| 93.50 | S | S | S | N | N | N | N | S | S | S | S | S | N | N | N | N | S |
| 93.75 | S | S | S | N | N | N | N | S | S | S | S | S | N | N | N | N | S |
| 94.00 | S | S | S | N | N | N | N | O | S | S | S | S | N | N | N | N | S |
| 94.25 | S | S | S | N | N | N | N | N | S | S | S | S | N | N | N | N | O |
| 94.50 | S | S | S | N | N | N | N | N | S | S | S | S | N | N | N | N | N |
| 94.75 | S | S | S | N | N | N | N | N | S | S | S | S | N | N | N | N | N |
| 95.00 | S | S | S | O | N | N | N | N | S | S | S | S | N | N | N | N | N |
| 95.25 | S | S | S | S | N | N | N | N | S | S | S | S | O | N | N | N | N |
| 95.50 | S | S | S | S | N | N | N | N | S | S | S | S | S | N | N | N | N |
| 95.75 | S | S | S | S | N | N | N | N | S | S | S | S | S | N | N | N | N |

Page Row 8, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 84.00 | N | N | N | N | S | S | S | S | N | N | N | N | N | S | S | S | S |
| 84.25 | N | N | N | N | S | S | S | S | N | N | N | N | N | S | S | S | S |
| 84.50 | N | N | N | N | S | S | S | S | O | N | N | N | N | S | S | S | S |
| 84.75 | N | N | N | N | S | S | S | S | S | N | N | N | N | S | S | S | S |
| 85.00 | N | N | N | N | S | S | S | S | S | N | N | N | N | S | S | S | S |
| 85.25 | N | N | N | N | S | S | S | S | S | N | N | N | N | S | S | S | S |
| 85.50 | N | N | N | N | O | S | S | S | S | N | N | N | N | S | S | S | S |
| 85.75 | N | N | N | N | N | S | S | S | S | N | N | N | N | O | S | S | S |
| 86.00 | N | N | N | N | N | S | S | S | S | N | N | N | N | N | S | S | S |
| 86.25 | N | N | N | N | N | S | S | S | S | N | N | N | N | N | S | S | S |
| 86.50 | O | N | N | N | N | S | S | S | S | N | N | N | N | N | S | S | S |
| 86.75 | S | N | N | N | N | S | S | S | S | O | N | N | N | N | S | S | S |
| 87.00 | S | N | N | N | N | S | S | S | S | S | N | N | N | N | S | S | S |
| 87.25 | S | N | N | N | N | S | S | S | S | S | N | N | N | N | S | S | S |
| 87.50 | S | N | N | N | N | S | S | S | S | S | N | N | N | N | S | S | S |
| 87.75 | S | N | N | N | N | O | S | S | S | S | N | N | N | N | S | S | S |
| 88.00 | S | N | N | N | N | N | S | S | S | S | N | N | N | N | O | S | S |
| 88.25 | S | N | N | N | N | N | S | S | S | S | N | N | N | N | N | S | S |
| 88.50 | S | N | N | N | N | N | S | S | S | S | N | N | N | N | N | S | S |
| 88.75 | S | O | N | N | N | N | S | S | S | S | N | N | N | N | N | S | S |
| 89.00 | S | S | N | N | N | N | S | S | S | S | O | N | N | N | N | S | S |
| 89.25 | S | S | N | N | N | N | S | S | S | S | S | N | N | N | N | S | S |
| 89.50 | S | S | N | N | N | N | S | S | S | S | S | N | N | N | N | S | S |
| 89.75 | S | S | N | N | N | N | S | S | S | S | S | N | N | N | N | S | S |
| 90.00 | S | S | N | N | N | N | O | S | S | S | S | N | N | N | N | S | S |
| 90.25 | S | S | N | N | N | N | N | S | S | S | S | N | N | N | N | O | S |
| 90.50 | S | S | N | N | N | N | N | S | S | S | S | N | N | N | N | N | S |
| 90.75 | S | S | N | N | N | N | N | S | S | S | S | N | N | N | N | N | S |
| 91.00 | S | S | O | N | N | N | N | S | S | S | S | N | N | N | N | N | S |
| 91.25 | S | S | S | N | N | N | N | S | S | S | S | O | N | N | N | N | S |
| 91.50 | S | S | S | N | N | N | N | S | S | S | S | S | N | N | N | N | S |
| 91.75 | S | S | S | N | N | N | N | S | S | S | S | S | N | N | N | N | S |
| 92.00 | S | S | S | N | N | N | N | S | S | S | S | S | N | N | N | N | S |
| 92.25 | S | S | S | N | N | N | N | O | S | S | S | S | N | N | N | N | S |
| 92.50 | S | S | S | N | N | N | N | N | S | S | S | S | N | N | N | N | O |
| 92.75 | S | S | S | N | N | N | N | N | S | S | S | S | N | N | N | N | N |
| 93.00 | S | S | S | N | N | N | N | N | S | S | S | S | N | N | N | N | N |
| 93.25 | S | S | S | O | N | N | N | N | S | S | S | S | N | N | N | N | N |
| 93.50 | S | S | S | S | N | N | N | N | S | S | S | S | O | N | N | N | N |
| 93.75 | S | S | S | S | N | N | N | N | S | S | S | S | S | N | N | N | N |
| 94.00 | S | S | S | S | N | N | N | N | S | S | S | S | S | N | N | N | N |
| 94.25 | S | S | S | S | N | N | N | N | S | S | S | S | S | N | N | N | N |
| 94.50 | S | S | S | S | N | N | N | N | O | S | S | S | S | N | N | N | N |
| 94.75 | S | S | S | S | N | N | N | N | N | S | S | S | S | N | N | N | N |
| 95.00 | S | S | S | S | N | N | N | N | N | S | S | S | S | N | N | N | N |
| 95.25 | S | S | S | S | N | N | N | N | N | S | S | S | S | N | N | N | N |
| 95.50 | S | S | S | S | O | N | N | N | N | S | S | S | S | N | N | N | N |
| 95.75 | S | S | S | S | S | N | N | N | N | S | S | S | S | O | N | N | N |

Page Row 8, Page Column 3

-continued

Coil Excitation

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 84.00 | N | N | N | N | N | S | S | S | S | N | N | N | N | O | S | S | S |
| 84.25 | N | N | N | N | N | S | S | S | S | N | N | N | N | N | S | S | S |
| 84.50 | N | N | N | N | N | S | S | S | S | N | N | N | N | N | S | S | S |
| 84.75 | O | N | N | N | N | S | S | S | S | N | N | N | N | N | S | S | S |
| 85.00 | S | N | N | N | N | S | S | S | S | O | N | N | N | N | S | S | S |
| 85.25 | S | N | N | N | N | S | S | S | S | S | N | N | N | N | S | S | S |
| 85.50 | S | N | N | N | N | S | S | S | S | S | N | N | N | N | S | S | S |
| 85.75 | S | N | N | N | N | S | S | S | S | S | N | N | N | N | S | S | S |
| 86.00 | S | N | N | N | N | O | S | S | S | S | N | N | N | N | S | S | S |
| 86.25 | S | N | N | N | N | N | S | S | S | S | N | N | N | N | O | S | S |
| 86.50 | S | N | N | N | N | N | S | S | S | S | N | N | N | N | N | S | S |
| 86.75 | S | N | N | N | N | N | S | S | S | S | N | N | N | N | N | S | S |
| 87.00 | S | O | N | N | N | N | S | S | S | S | N | N | N | N | N | S | S |
| 87.25 | S | S | N | N | N | N | S | S | S | S | O | N | N | N | N | S | S |
| 87.50 | S | S | N | N | N | N | S | S | S | S | S | N | N | N | N | S | S |
| 87.75 | S | S | N | N | N | N | S | S | S | S | S | N | N | N | N | S | S |
| 88.00 | S | S | N | N | N | N | S | S | S | S | S | N | N | N | N | S | S |
| 88.25 | S | S | N | N | N | N | O | S | S | S | S | N | N | N | N | S | S |
| 88.50 | S | S | N | N | N | N | N | S | S | S | S | N | N | N | N | O | S |
| 88.75 | S | S | N | N | N | N | N | S | S | S | S | N | N | N | N | N | S |
| 89.00 | S | S | N | N | N | N | N | S | S | S | S | N | N | N | N | N | S |
| 89.25 | S | S | O | N | N | N | N | S | S | S | S | N | N | N | N | N | S |
| 89.50 | S | S | S | N | N | N | N | S | S | S | S | O | N | N | N | N | S |
| 89.75 | S | S | S | N | N | N | N | S | S | S | S | S | N | N | N | N | S |
| 90.00 | S | S | S | N | N | N | N | S | S | S | S | S | N | N | N | N | S |
| 90.25 | S | S | S | N | N | N | N | S | S | S | S | S | N | N | N | N | S |
| 90.50 | S | S | S | N | N | N | N | O | S | S | S | S | N | N | N | N | S |
| 90.75 | S | S | S | N | N | N | N | N | S | S | S | S | N | N | N | N | O |
| 91.00 | S | S | S | N | N | N | N | N | S | S | S | S | N | N | N | N | N |
| 91.25 | S | S | S | N | N | N | N | N | S | S | S | S | N | N | N | N | N |
| 91.50 | S | S | S | O | N | N | N | N | S | S | S | S | N | N | N | N | N |
| 91.75 | S | S | S | S | N | N | N | N | S | S | S | S | O | N | N | N | N |
| 92.00 | S | S | S | S | N | N | N | N | S | S | S | S | S | N | N | N | N |
| 92.25 | S | S | S | S | N | N | N | N | S | S | S | S | S | N | N | N | N |
| 92.50 | S | S | S | S | N | N | N | N | S | S | S | S | S | N | N | N | N |
| 92.75 | S | S | S | S | N | N | N | N | O | S | S | S | S | N | N | N | N |
| 93.00 | S | S | S | S | N | N | N | N | N | S | S | S | S | N | N | N | N |
| 93.25 | S | S | S | S | N | N | N | N | N | S | S | S | S | N | N | N | N |
| 93.50 | S | S | S | S | N | N | N | N | N | S | S | S | S | N | N | N | N |
| 93.75 | S | S | S | S | O | N | N | N | N | S | S | S | S | N | N | N | N |
| 94.00 | S | S | S | S | S | N | N | N | N | S | S | S | S | O | N | N | N |
| 94.25 | S | S | S | S | S | N | N | N | N | S | S | S | S | S | N | N | N |
| 94.50 | S | S | S | S | S | N | N | N | N | S | S | S | S | S | N | N | N |
| 94.75 | O | S | S | S | S | N | N | N | N | S | S | S | S | S | N | N | N |
| 95.00 | N | S | S | S | S | N | N | N | N | O | S | S | S | S | N | N | N |
| 95.25 | N | S | S | S | S | N | N | N | N | N | S | S | S | S | N | N | N |
| 95.50 | N | S | S | S | S | N | N | N | N | N | S | S | S | S | N | N | N |
| 95.75 | N | S | S | S | S | N | N | N | N | N | S | S | S | S | N | N | N |

Page Row 8, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 84.00 | S | N | N | N | N | S | S | S | S | S | N | N | N | N | S | S | S |
| 84.25 | S | N | N | N | N | O | S | S | S | S | N | N | N | N | S | S | S |
| 84.50 | S | N | N | N | N | N | S | S | S | S | N | N | N | N | O | S | S |
| 84.75 | S | N | N | N | N | N | S | S | S | S | N | N | N | N | N | S | S |
| 85.00 | S | N | N | N | N | N | S | S | S | S | N | N | N | N | N | S | S |
| 85.25 | S | O | N | N | N | N | S | S | S | S | N | N | N | N | N | S | S |
| 85.50 | S | S | N | N | N | N | S | S | S | S | O | N | N | N | N | S | S |
| 85.75 | S | S | N | N | N | N | S | S | S | S | S | N | N | N | N | S | S |
| 86.00 | S | S | N | N | N | N | S | S | S | S | S | N | N | N | N | S | S |
| 86.25 | S | S | N | N | N | N | S | S | S | S | S | N | N | N | N | S | S |
| 86.50 | S | S | N | N | N | N | O | S | S | S | S | N | N | N | N | S | S |
| 86.75 | S | S | N | N | N | N | N | S | S | S | S | N | N | N | N | O | S |
| 87.00 | S | S | N | N | N | N | N | S | S | S | S | N | N | N | N | N | S |
| 87.25 | S | S | N | N | N | N | N | S | S | S | S | N | N | N | N | N | S |
| 87.50 | S | S | O | N | N | N | N | S | S | S | S | N | N | N | N | N | S |
| 87.75 | S | S | S | N | N | N | N | S | S | S | S | O | N | N | N | N | S |
| 88.00 | S | S | S | N | N | N | N | S | S | S | S | S | N | N | N | N | S |
| 88.25 | S | S | S | N | N | N | N | S | S | S | S | S | N | N | N | N | S |
| 88.50 | S | S | S | N | N | N | N | S | S | S | S | S | N | N | N | N | S |
| 88.75 | S | S | S | N | N | N | N | O | S | S | S | S | N | N | N | N | S |
| 89.00 | S | S | S | N | N | N | N | N | S | S | S | S | N | N | N | N | O |
| 89.25 | S | S | S | N | N | N | N | N | S | S | S | S | N | N | N | N | N |
| 89.50 | S | S | S | N | N | N | N | N | S | S | S | S | N | N | N | N | N |

-continued

| Coil Excitation | | | | | | | | | | | | | | | | | |
|---|---|---|---|---|---|---|---|---|---|---|---|---|---|---|---|---|---|
| 89.75 | S | S | S | O | N | N | N | N | S | S | S | S | N | N | N | N | N |
| 90.00 | S | S | S | S | N | N | N | N | S | S | S | S | O | N | N | N | N |
| 90.25 | S | S | S | S | N | N | N | N | S | S | S | S | S | N | N | N | N |
| 90.50 | S | S | S | S | N | N | N | N | S | S | S | S | S | N | N | N | N |
| 90.75 | S | S | S | S | N | N | N | N | S | S | S | S | S | N | N | N | N |
| 91.00 | S | S | S | S | N | N | N | N | O | S | S | S | S | N | N | N | N |
| 91.25 | S | S | S | S | N | N | N | N | N | S | S | S | S | N | N | N | N |
| 91.50 | S | S | S | S | N | N | N | N | N | S | S | S | S | N | N | N | N |
| 91.75 | S | S | S | S | N | N | N | N | N | S | S | S | S | N | N | N | N |
| 92.00 | S | S | S | S | O | N | N | N | N | S | S | S | S | N | N | N | N |
| 92.25 | S | S | S | S | S | N | N | N | N | S | S | S | S | O | N | N | N |
| 92.50 | S | S | S | S | S | N | N | N | N | S | S | S | S | S | N | N | N |
| 92.75 | S | S | S | S | S | N | N | N | N | S | S | S | S | S | N | N | N |
| 93.00 | O | S | S | S | S | N | N | N | N | S | S | S | S | S | N | N | N |
| 93.25 | N | S | S | S | S | N | N | N | N | O | S | S | S | S | N | N | N |
| 93.50 | N | S | S | S | S | N | N | N | N | N | S | S | S | S | N | N | N |
| 93.75 | N | S | S | S | S | N | N | N | N | N | S | S | S | S | N | N | N |
| 94.00 | N | S | S | S | S | N | N | N | N | N | S | S | S | S | N | N | N |
| 94.25 | N | S | S | S | S | O | N | N | N | N | S | S | S | S | N | N | N |
| 94.50 | N | S | S | S | S | S | N | N | N | N | S | S | S | S | O | N | N |
| 94.75 | N | S | S | S | S | S | N | N | N | N | S | S | S | S | S | N | N |
| 95.00 | N | S | S | S | S | S | N | N | N | N | S | S | S | S | S | N | N |
| 95.25 | N | O | S | S | S | S | N | N | N | N | S | S | S | S | S | N | N |
| 95.50 | N | N | S | S | S | S | N | N | N | N | O | S | S | S | S | N | N |
| 95.75 | N | N | S | S | S | S | N | N | N | N | N | S | S | S | S | N | N |

Page Row 8, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 84.00 | S | S | N | N | N | N | S | S | S | S | S | N | N | N | N | S | S |
| 84.25 | S | S | N | N | N | N | S | S | S | S | S | N | N | N | N | S | S |
| 84.50 | S | S | N | N | N | N | S | S | S | S | S | N | N | N | N | S | S |
| 84.75 | S | S | N | N | N | N | O | S | S | S | S | N | N | N | N | S | S |
| 85.00 | S | S | N | N | N | N | N | S | S | S | S | N | N | N | N | O | S |
| 85.25 | S | S | N | N | N | N | N | S | S | S | S | N | N | N | N | N | S |
| 85.50 | S | S | N | N | N | N | N | S | S | S | S | N | N | N | N | N | S |
| 85.75 | S | S | O | N | N | N | N | S | S | S | S | N | N | N | N | N | S |
| 86.00 | S | S | S | N | N | N | N | S | S | S | S | O | N | N | N | N | S |
| 86.25 | S | S | S | N | N | N | N | S | S | S | S | S | N | N | N | N | S |
| 86.50 | S | S | S | N | N | N | N | S | S | S | S | S | N | N | N | N | S |
| 86.75 | S | S | S | N | N | N | N | S | S | S | S | S | N | N | N | N | S |
| 87.00 | S | S | S | N | N | N | N | O | S | S | S | S | N | N | N | N | S |
| 87.25 | S | S | S | N | N | N | N | N | S | S | S | S | N | N | N | N | O |
| 87.50 | S | S | S | N | N | N | N | N | S | S | S | S | N | N | N | N | N |
| 87.75 | S | S | S | N | N | N | N | N | S | S | S | S | N | N | N | N | N |
| 88.00 | S | S | S | O | N | N | N | N | S | S | S | S | N | N | N | N | N |
| 88.25 | S | S | S | S | N | N | N | N | S | S | S | S | O | N | N | N | N |
| 88.50 | S | S | S | S | N | N | N | N | S | S | S | S | S | N | N | N | N |
| 88.75 | S | S | S | S | N | N | N | N | S | S | S | S | S | N | N | N | N |
| 89.00 | S | S | S | S | N | N | N | N | S | S | S | S | S | N | N | N | N |
| 89.25 | S | S | S | S | N | N | N | N | O | S | S | S | S | N | N | N | N |
| 89.50 | S | S | S | S | N | N | N | N | N | S | S | S | S | N | N | N | N |
| 89.75 | S | S | S | S | N | N | N | N | N | S | S | S | S | N | N | N | N |
| 90.00 | S | S | S | S | N | N | N | N | N | S | S | S | S | N | N | N | N |
| 90.25 | S | S | S | S | O | N | N | N | N | S | S | S | S | N | N | N | N |
| 90.50 | S | S | S | S | S | N | N | N | N | S | S | S | S | O | N | N | N |
| 90.75 | S | S | S | S | S | N | N | N | N | S | S | S | S | S | N | N | N |
| 91.00 | S | S | S | S | S | N | N | N | N | S | S | S | S | S | N | N | N |
| 91.25 | O | S | S | S | S | N | N | N | N | S | S | S | S | S | N | N | N |
| 91.50 | N | S | S | S | S | N | N | N | N | O | S | S | S | S | N | N | N |
| 91.75 | N | S | S | S | S | N | N | N | N | N | S | S | S | S | N | N | N |
| 92.00 | N | S | S | S | S | N | N | N | N | N | S | S | S | S | N | N | N |
| 92.25 | N | S | S | S | S | N | N | N | N | N | S | S | S | S | N | N | N |
| 92.50 | N | S | S | S | S | O | N | N | N | N | S | S | S | S | N | N | N |
| 92.75 | N | S | S | S | S | S | N | N | N | N | S | S | S | S | O | N | N |
| 93.00 | N | S | S | S | S | S | N | N | N | N | S | S | S | S | S | N | N |
| 93.25 | N | S | S | S | S | S | N | N | N | N | S | S | S | S | S | N | N |
| 93.50 | N | O | S | S | S | S | N | N | N | N | S | S | S | S | S | N | N |
| 93.75 | N | N | S | S | S | S | N | N | N | N | O | S | S | S | S | N | N |
| 94.00 | N | N | S | S | S | S | N | N | N | N | N | S | S | S | S | N | N |
| 94.25 | N | N | S | S | S | S | N | N | N | N | N | S | S | S | S | N | N |
| 94.50 | N | N | S | S | S | S | N | N | N | N | N | S | S | S | S | N | N |
| 94.75 | N | N | S | S | S | S | O | N | N | N | N | S | S | S | S | N | N |
| 95.00 | N | N | S | S | S | S | S | N | N | N | N | S | S | S | S | O | N |
| 95.25 | N | N | S | S | S | S | S | N | N | N | N | S | S | S | S | S | N |

-continued

Coil Excitation

| | | | | | | | | | | | | | | | | | |
|---|---|---|---|---|---|---|---|---|---|---|---|---|---|---|---|---|---|
| 95.50 | N | N | S | S | S | S | S | N | N | N | N | S | S | S | S | S | N |
| 95.75 | N | N | O | S | S | S | S | N | N | N | N | S | S | S | S | S | N |

Page Row 8, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 84.00 | S | S | O | N | N | N | N | S | S | S | S | N | N | N | N | N | S |
| 84.25 | S | S | S | N | N | N | N | S | S | S | S | O | N | N | N | N | S |
| 84.50 | S | S | S | N | N | N | N | S | S | S | S | S | N | N | N | N | S |
| 84.75 | S | S | S | N | N | N | N | S | S | S | S | S | N | N | N | N | S |
| 85.00 | S | S | S | N | N | N | N | S | S | S | S | S | N | N | N | N | S |
| 85.25 | S | S | S | N | N | N | N | O | S | S | S | S | N | N | N | N | S |
| 85.50 | S | S | S | N | N | N | N | N | S | S | S | S | N | N | N | N | O |
| 85.75 | S | S | S | N | N | N | N | N | S | S | S | S | N | N | N | N | N |
| 86.00 | S | S | S | N | N | N | N | N | S | S | S | S | N | N | N | N | N |
| 86.25 | S | S | S | O | N | N | N | N | S | S | S | S | N | N | N | N | N |
| 86.50 | S | S | S | S | N | N | N | N | S | S | S | S | O | N | N | N | N |
| 86.75 | S | S | S | S | N | N | N | N | S | S | S | S | S | N | N | N | N |
| 87.00 | S | S | S | S | N | N | N | N | S | S | S | S | S | N | N | N | N |
| 87.25 | S | S | S | S | N | N | N | N | S | S | S | S | S | N | N | N | N |
| 87.50 | S | S | S | S | N | N | N | N | O | S | S | S | S | N | N | N | N |
| 87.75 | S | S | S | S | N | N | N | N | N | S | S | S | S | N | N | N | N |
| 88.00 | S | S | S | S | N | N | N | N | N | S | S | S | S | N | N | N | N |
| 88.25 | S | S | S | S | N | N | N | N | N | S | S | S | S | N | N | N | N |
| 88.50 | S | S | S | S | O | N | N | N | N | S | S | S | S | N | N | N | N |
| 88.75 | S | S | S | S | S | N | N | N | N | S | S | S | S | O | N | N | N |
| 89.00 | S | S | S | S | S | N | N | N | N | S | S | S | S | S | N | N | N |
| 89.25 | S | S | S | S | S | N | N | N | N | S | S | S | S | S | N | N | N |
| 89.50 | O | S | S | S | S | N | N | N | N | S | S | S | S | S | N | N | N |
| 89.75 | N | S | S | S | S | N | N | N | N | O | S | S | S | S | N | N | N |
| 90.00 | N | S | S | S | S | N | N | N | N | N | S | S | S | S | N | N | N |
| 90.25 | N | S | S | S | S | N | N | N | N | N | S | S | S | S | N | N | N |
| 90.50 | N | S | S | S | S | N | N | N | N | N | S | S | S | S | N | N | N |
| 90.75 | N | S | S | S | S | O | N | N | N | N | S | S | S | S | N | N | N |
| 91.00 | N | S | S | S | S | S | N | N | N | N | S | S | S | S | O | N | N |
| 91.25 | N | S | S | S | S | S | N | N | N | N | S | S | S | S | S | N | N |
| 91.50 | N | S | S | S | S | S | N | N | N | N | S | S | S | S | S | N | N |
| 91.75 | N | O | S | S | S | S | N | N | N | N | S | S | S | S | S | N | N |
| 92.00 | N | N | S | S | S | S | N | N | N | N | O | S | S | S | S | N | N |
| 92.25 | N | N | S | S | S | S | N | N | N | N | N | S | S | S | S | N | N |
| 92.50 | N | N | S | S | S | S | N | N | N | N | N | S | S | S | S | N | N |
| 92.75 | N | N | S | S | S | S | N | N | N | N | N | S | S | S | S | N | N |
| 93.00 | N | N | S | S | S | S | O | N | N | N | N | S | S | S | S | N | N |
| 93.25 | N | N | S | S | S | S | S | N | N | N | N | S | S | S | S | O | N |
| 93.50 | N | N | S | S | S | S | S | N | N | N | N | S | S | S | S | S | N |
| 93.75 | N | N | S | S | S | S | S | N | N | N | N | S | S | S | S | S | N |
| 94.00 | N | N | O | S | S | S | S | N | N | N | N | S | S | S | S | S | N |
| 94.25 | N | N | N | S | S | S | S | N | N | N | N | O | S | S | S | S | N |
| 94.50 | N | N | N | S | S | S | S | N | N | N | N | N | S | S | S | S | N |
| 94.75 | N | N | N | S | S | S | S | N | N | N | N | N | S | S | S | S | N |
| 95.00 | N | N | N | S | S | S | S | N | N | N | N | N | S | S | S | S | N |
| 95.25 | N | N | N | S | S | S | S | O | N | N | N | N | S | S | S | S | N |
| 95.50 | N | N | N | S | S | S | S | S | N | N | N | N | S | S | S | S | O |
| 95.75 | N | N | N | S | S | S | S | S | N | N | N | N | S | S | S | S | S |

Page Row 8, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 84.00 | S | S | S | N | N | N | N | N | S | S | S | S | N | N | N | N | N |
| 84.25 | S | S | S | N | N | N | N | N | S | S | S | S | N | N | N | N | N |
| 84.50 | S | S | S | O | N | N | N | N | S | S | S | S | N | N | N | N | N |
| 84.75 | S | S | S | S | N | N | N | N | S | S | S | S | O | N | N | N | N |
| 85.00 | S | S | S | S | N | N | N | N | S | S | S | S | S | N | N | N | N |
| 85.25 | S | S | S | S | N | N | N | N | S | S | S | S | S | N | N | N | N |
| 85.50 | S | S | S | S | N | N | N | N | S | S | S | S | S | N | N | N | N |
| 85.75 | S | S | S | S | N | N | N | N | O | S | S | S | S | N | N | N | N |
| 86.00 | S | S | S | S | N | N | N | N | N | S | S | S | S | N | N | N | N |
| 86.25 | S | S | S | S | N | N | N | N | N | S | S | S | S | N | N | N | N |
| 86.50 | S | S | S | S | N | N | N | N | N | S | S | S | S | N | N | N | N |
| 86.75 | S | S | S | S | O | N | N | N | N | S | S | S | S | N | N | N | N |
| 87.00 | S | S | S | S | S | N | N | N | N | S | S | S | S | O | N | N | N |
| 87.25 | S | S | S | S | S | N | N | N | N | S | S | S | S | S | N | N | N |
| 87.50 | S | S | S | S | S | N | N | N | N | S | S | S | S | S | N | N | N |
| 87.75 | O | S | S | S | S | N | N | N | N | S | S | S | S | S | N | N | N |
| 88.00 | N | S | S | S | S | N | N | N | N | O | S | S | S | S | N | N | N |
| 88.25 | N | S | S | S | S | N | N | N | N | N | S | S | S | S | N | N | N |
| 88.50 | N | S | S | S | S | N | N | N | N | N | S | S | S | S | N | N | N |

-continued

| Coil Excitation | | | | | | | | | | | | | | | | | |
|---|---|---|---|---|---|---|---|---|---|---|---|---|---|---|---|---|---|
| 88.75 | N | S | S | S | S | N | N | N | N | N | S | S | S | S | N | N | N |
| 89.00 | N | S | S | S | S | O | N | N | N | N | S | S | S | S | N | N | N |
| 89.25 | N | S | S | S | S | S | N | N | N | N | S | S | S | S | O | N | N |
| 89.50 | N | S | S | S | S | S | N | N | N | N | S | S | S | S | S | N | N |
| 89.75 | N | S | S | S | S | S | N | N | N | N | S | S | S | S | S | N | N |
| 90.00 | N | O | S | S | S | S | N | N | N | N | S | S | S | S | S | N | N |
| 90.25 | N | N | S | S | S | S | N | N | N | N | O | S | S | S | S | N | N |
| 90.50 | N | N | S | S | S | S | N | N | N | N | N | S | S | S | S | N | N |
| 90.75 | N | N | S | S | S | S | N | N | N | N | N | S | S | S | S | N | N |
| 91.00 | N | N | S | S | S | S | N | N | N | N | N | S | S | S | S | N | N |
| 91.25 | N | N | S | S | S | S | O | N | N | N | N | S | S | S | S | N | N |
| 91.50 | N | N | S | S | S | S | S | N | N | N | N | S | S | S | S | O | N |
| 91.75 | N | N | S | S | S | S | S | N | N | N | N | S | S | S | S | S | N |
| 92.00 | N | N | S | S | S | S | S | N | N | N | N | S | S | S | S | S | N |
| 92.25 | N | N | O | S | S | S | S | N | N | N | N | S | S | S | S | S | N |
| 92.50 | N | N | N | S | S | S | S | N | N | N | N | O | S | S | S | S | N |
| 92.75 | N | N | N | S | S | S | S | N | N | N | N | N | S | S | S | S | N |
| 93.00 | N | N | N | S | S | S | S | N | N | N | N | N | S | S | S | S | N |
| 93.25 | N | N | N | S | S | S | S | N | N | N | N | N | S | S | S | S | N |
| 93.50 | N | N | N | S | S | S | S | O | N | N | N | N | S | S | S | S | N |
| 93.75 | N | N | N | S | S | S | S | S | N | N | N | N | S | S | S | S | O |
| 94.00 | N | N | N | S | S | S | S | S | N | N | N | N | S | S | S | S | S |
| 94.25 | N | N | N | S | S | S | S | S | N | N | N | N | S | S | S | S | S |
| 94.50 | N | N | N | O | S | S | S | S | N | N | N | N | S | S | S | S | S |
| 94.75 | N | N | N | N | S | S | S | S | N | N | N | N | O | S | S | S | S |
| 95.00 | N | N | N | N | S | S | S | S | N | N | N | N | N | S | S | S | S |
| 95.25 | N | N | N | N | S | S | S | S | N | N | N | N | N | S | S | S | S |
| 95.50 | N | N | N | N | S | S | S | S | N | N | N | N | N | S | S | S | S |
| 95.75 | N | N | N | N | S | S | S | S | O | N | N | N | N | S | S | S | S |

Page Row 8, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 84.00 | S | S | S | S | N | N | N | N | O | S | S | S | S | N | N | N | N |
| 84.25 | S | S | S | S | N | N | N | N | N | S | S | S | S | N | N | N | N |
| 84.50 | S | S | S | S | N | N | N | N | N | S | S | S | S | N | N | N | N |
| 84.75 | S | S | S | S | N | N | N | N | N | S | S | S | S | N | N | N | N |
| 85.00 | S | S | S | S | O | N | N | N | N | S | S | S | S | N | N | N | N |
| 85.25 | S | S | S | S | S | N | N | N | N | S | S | S | S | O | N | N | N |
| 85.50 | S | S | S | S | S | N | N | N | N | S | S | S | S | S | N | N | N |
| 85.75 | S | S | S | S | S | N | N | N | N | S | S | S | S | S | N | N | N |
| 86.00 | O | S | S | S | S | N | N | N | N | S | S | S | S | S | N | N | N |
| 86.25 | N | S | S | S | S | N | N | N | N | O | S | S | S | S | N | N | N |
| 86.50 | N | S | S | S | S | N | N | N | N | N | S | S | S | S | N | N | N |
| 86.75 | N | S | S | S | S | N | N | N | N | N | S | S | S | S | N | N | N |
| 87.00 | N | S | S | S | S | N | N | N | N | N | S | S | S | S | N | N | N |
| 87.25 | N | S | S | S | S | O | N | N | N | N | S | S | S | S | N | N | N |
| 87.50 | N | S | S | S | S | S | N | N | N | N | S | S | S | S | O | N | N |
| 87.75 | N | S | S | S | S | S | N | N | N | N | S | S | S | S | S | N | N |
| 88.00 | N | S | S | S | S | S | N | N | N | N | S | S | S | S | S | N | N |
| 88.25 | N | O | S | S | S | S | N | N | N | N | S | S | S | S | S | N | N |
| 88.50 | N | N | S | S | S | S | N | N | N | N | O | S | S | S | S | N | N |
| 88.75 | N | N | S | S | S | S | N | N | N | N | N | S | S | S | S | N | N |
| 89.00 | N | N | S | S | S | S | N | N | N | N | N | S | S | S | S | N | N |
| 89.25 | N | N | S | S | S | S | N | N | N | N | N | S | S | S | S | N | N |
| 89.50 | N | N | S | S | S | S | O | N | N | N | N | S | S | S | S | N | N |
| 89.75 | N | N | S | S | S | S | S | N | N | N | N | S | S | S | S | O | N |
| 90.00 | N | N | S | S | S | S | S | N | N | N | N | S | S | S | S | S | N |
| 90.25 | N | N | S | S | S | S | S | N | N | N | N | S | S | S | S | S | N |
| 90.50 | N | N | O | S | S | S | S | N | N | N | N | S | S | S | S | S | N |
| 90.75 | N | N | N | S | S | S | S | N | N | N | N | O | S | S | S | S | N |
| 91.00 | N | N | N | S | S | S | S | N | N | N | N | N | S | S | S | S | N |
| 91.25 | N | N | N | S | S | S | S | N | N | N | N | N | S | S | S | S | N |
| 91.50 | N | N | N | S | S | S | S | N | N | N | N | N | S | S | S | S | N |
| 91.75 | N | N | N | S | S | S | S | O | N | N | N | N | S | S | S | S | N |
| 92.00 | N | N | N | S | S | S | S | S | N | N | N | N | S | S | S | S | O |
| 92.25 | N | N | N | S | S | S | S | S | N | N | N | N | S | S | S | S | S |
| 92.50 | N | N | N | S | S | S | S | S | N | N | N | N | S | S | S | S | S |
| 92.75 | N | N | N | O | S | S | S | S | N | N | N | N | S | S | S | S | S |
| 93.00 | N | N | N | N | S | S | S | S | N | N | N | N | O | S | S | S | S |
| 93.25 | N | N | N | N | S | S | S | S | N | N | N | N | N | S | S | S | S |
| 93.50 | N | N | N | N | S | S | S | S | N | N | N | N | N | S | S | S | S |
| 93.75 | N | N | N | N | S | S | S | S | N | N | N | N | N | S | S | S | S |
| 94.00 | N | N | N | N | S | S | S | S | O | N | N | N | N | S | S | S | S |
| 94.25 | N | N | N | N | S | S | S | S | S | N | N | N | N | S | S | S | S |
| 94.50 | N | N | N | N | S | S | S | S | S | N | N | N | N | S | S | S | S |
| 94.75 | N | N | N | N | S | S | S | S | S | N | N | N | N | S | S | S | S |

-continued

Coil Excitation

| | | | | | | | | | | | | | | | | | |
|---|---|---|---|---|---|---|---|---|---|---|---|---|---|---|---|---|---|
| 95.00 | N | N | N | N | O | S | S | S | S | N | N | N | N | S | S | S | S |
| 95.25 | N | N | N | N | N | S | S | S | S | N | N | N | N | O | S | S | S |
| 95.50 | N | N | N | N | N | S | S | S | S | N | N | N | N | N | S | S | S |
| 95.75 | N | N | N | N | N | S | S | S | S | N | N | N | N | N | S | S | S |

Page Row 8, Page Column 9

| Coil | 154 | 155 | 156 | 157 | 158 | 159 | 160 |
|---|---|---|---|---|---|---|---|
| 84.00 | S | S | S | S | S | N | N |
| 84.25 | O | S | S | S | S | N | N |
| 84.50 | N | S | S | S | S | N | N |
| 84.75 | N | S | S | S | S | N | N |
| 85.00 | N | S | S | S | S | N | N |
| 85.25 | N | S | S | S | S | N | N |
| 85.50 | N | S | S | S | S | O | N |
| 85.75 | N | S | S | S | S | S | N |
| 86.00 | N | S | S | S | S | S | N |
| 86.25 | N | S | S | S | S | S | N |
| 86.50 | N | O | S | S | S | S | N |
| 86.75 | N | N | S | S | S | S | N |
| 87.00 | N | N | S | S | S | S | N |
| 87.25 | N | N | S | S | S | S | N |
| 87.50 | N | N | S | S | S | S | N |
| 87.75 | N | N | S | S | S | S | O |
| 88.00 | N | N | S | S | S | S | S |
| 88.25 | N | N | S | S | S | S | S |
| 88.50 | N | N | S | S | S | S | S |
| 88.75 | N | N | O | S | S | S | S |
| 89.00 | N | N | N | S | S | S | S |
| 89.25 | N | N | N | S | S | S | S |
| 89.50 | N | N | N | S | S | S | S |
| 89.75 | N | N | N | S | S | S | S |
| 90.00 | N | N | N | S | S | S | S |
| 90.25 | N | N | N | S | S | S | S |
| 90.50 | N | N | N | S | S | S | S |
| 90.75 | N | N | N | S | S | S | S |
| 91.00 | N | N | N | O | S | S | S |
| 91.25 | N | N | N | N | S | S | S |
| 91.50 | N | N | N | N | S | S | S |
| 91.75 | N | N | N | N | S | S | S |
| 92.00 | N | N | N | N | S | S | S |
| 92.25 | N | N | N | N | S | S | S |
| 92.50 | N | N | N | N | S | S | S |
| 92.75 | N | N | N | N | S | S | S |
| 93.00 | N | N | N | N | S | S | S |
| 93.25 | N | N | N | N | O | S | S |
| 93.50 | N | N | N | N | N | S | S |
| 93.75 | N | N | N | N | N | S | S |
| 94.00 | N | N | N | N | N | S | S |
| 94.25 | O | N | N | N | N | S | S |
| 94.50 | S | N | N | N | N | S | S |
| 94.75 | S | N | N | N | N | S | S |
| 95.00 | S | N | N | N | N | S | S |
| 95.25 | S | N | N | N | N | S | S |
| 95.50 | S | N | N | N | N | O | S |
| 95.75 | S | N | N | N | N | N | S |

Page Row 8, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 96.00 | S | S | S | N | N | N | N | N | S | S | S | S | N | N | N | N | O |
| 96.25 | S | S | S | N | N | N | N | N | S | S | S | S | N | N | N | N | N |
| 96.50 | S | S | S | N | N | N | N | N | S | S | S | S | N | N | N | N | N |
| 96.75 | S | S | S | O | N | N | N | N | S | S | S | S | N | N | N | N | N |
| 97.00 | S | S | S | S | N | N | N | N | S | S | S | S | O | N | N | N | N |
| 97.25 | S | S | S | S | N | N | N | N | S | S | S | S | S | N | N | N | N |
| 97.50 | S | S | S | S | N | N | N | N | S | S | S | S | S | N | N | N | N |
| 97.75 | S | S | S | S | N | N | N | N | S | S | S | S | S | N | N | N | N |
| 98.00 | S | S | S | S | N | N | N | N | O | S | S | S | S | N | N | N | N |
| 98.25 | S | S | S | S | N | N | N | N | N | S | S | S | S | N | N | N | N |
| 98.50 | S | S | S | S | N | N | N | N | N | S | S | S | S | N | N | N | N |
| 98.75 | S | S | S | S | N | N | N | N | N | S | S | S | S | N | N | N | N |
| 99.00 | S | S | S | S | O | N | N | N | N | S | S | S | S | N | N | N | N |
| 99.25 | S | S | S | S | S | N | N | N | N | S | S | S | S | O | N | N | N |
| 99.50 | S | S | S | S | S | N | N | N | N | S | S | S | S | S | N | N | N |
| 99.75 | S | S | S | S | S | N | N | N | N | S | S | S | S | S | N | N | N |
| 100.00 | O | S | S | S | S | N | N | N | N | S | S | S | S | S | N | N | N |

-continued

| Coil Excitation | | | | | | | | | | | | | | | | | |
|---|---|---|---|---|---|---|---|---|---|---|---|---|---|---|---|---|---|
| 100.25 | N | S | S | S | S | N | N | N | N | O | S | S | S | S | N | N | N |
| 100.50 | N | S | S | S | S | N | N | N | N | N | S | S | S | S | N | N | N |
| 100.75 | N | S | S | S | S | N | N | N | N | N | S | S | S | S | N | N | N |
| 101.00 | N | S | S | S | S | N | N | N | N | N | S | S | S | S | N | N | N |
| 101.25 | N | S | S | S | S | O | N | N | N | N | S | S | S | S | N | N | N |
| 101.50 | N | S | S | S | S | S | N | N | N | N | S | S | S | S | O | N | N |
| 101.75 | N | S | S | S | S | S | N | N | N | N | S | S | S | S | S | N | N |
| 102.00 | N | S | S | S | S | S | N | N | N | N | S | S | S | S | S | N | N |
| 102.25 | N | O | S | S | S | S | N | N | N | N | S | S | S | S | S | N | N |
| 102.50 | N | N | S | S | S | S | N | N | N | N | O | S | S | S | S | N | N |
| 102.75 | N | N | S | S | S | S | N | N | N | N | N | S | S | S | S | N | N |
| 103.00 | N | N | S | S | S | S | N | N | N | N | N | S | S | S | S | N | N |
| 103.25 | N | N | S | S | S | S | N | N | N | N | N | S | S | S | S | N | N |
| 103.50 | N | N | S | S | S | S | O | N | N | N | N | S | S | S | S | N | N |
| 103.75 | N | N | S | S | S | S | S | N | N | N | N | S | S | S | S | O | N |
| 104.00 | N | N | S | S | S | S | S | N | N | N | N | S | S | S | S | S | N |
| 104.25 | N | N | S | S | S | S | S | N | N | N | N | S | S | S | S | S | N |
| 104.50 | N | N | O | S | S | S | S | N | N | N | N | S | S | S | S | S | N |
| 104.75 | N | N | N | S | S | S | S | N | N | N | N | O | S | S | S | S | N |
| 105.00 | N | N | N | S | S | S | S | N | N | N | N | N | S | S | S | S | N |
| 105.25 | N | N | N | S | S | S | S | N | N | N | N | N | S | S | S | S | N |
| 105.50 | N | N | N | S | S | S | S | N | N | N | N | N | S | S | S | S | N |
| 105.75 | N | N | N | S | S | S | S | O | N | N | N | N | S | S | S | S | N |
| 106.00 | N | N | N | S | S | S | S | S | N | N | N | N | S | S | S | S | O |
| 106.25 | N | N | N | S | S | S | S | S | N | N | N | N | S | S | S | S | S |
| 106.50 | N | N | N | S | S | S | S | S | N | N | N | N | S | S | S | S | S |
| 106.75 | N | N | N | O | S | S | S | S | N | N | N | N | S | S | S | S | S |
| 107.00 | N | N | N | N | S | S | S | S | N | N | N | N | O | S | S | S | S |
| 107.25 | N | N | N | N | S | S | S | S | N | N | N | N | N | S | S | S | S |
| 107.50 | N | N | N | N | S | S | S | S | N | N | N | N | N | S | S | S | S |
| 107.75 | N | N | N | N | S | S | S | S | N | N | N | N | N | S | S | S | S |

Page Row 9, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 96.00 | S | S | S | S | N | N | N | N | S | S | S | S | S | N | N | N | N |
| 96.25 | S | S | S | S | N | N | N | N | O | S | S | S | S | N | N | N | N |
| 96.50 | S | S | S | S | N | N | N | N | N | S | S | S | S | N | N | N | N |
| 96.75 | S | S | S | S | N | N | N | N | N | S | S | S | S | N | N | N | N |
| 97.00 | S | S | S | S | N | N | N | N | N | S | S | S | S | N | N | N | N |
| 97.25 | S | S | S | S | O | N | N | N | N | S | S | S | S | N | N | N | N |
| 97.50 | S | S | S | S | S | N | N | N | N | S | S | S | S | O | N | N | N |
| 97.75 | S | S | S | S | S | N | N | N | N | S | S | S | S | S | N | N | N |
| 98.00 | S | S | S | S | S | N | N | N | N | S | S | S | S | S | N | N | N |
| 98.25 | O | S | S | S | S | N | N | N | N | S | S | S | S | S | N | N | N |
| 98.50 | N | S | S | S | S | N | N | N | N | O | S | S | S | S | N | N | N |
| 98.75 | N | S | S | S | S | N | N | N | N | N | S | S | S | S | N | N | N |
| 99.00 | N | S | S | S | S | N | N | N | N | N | S | S | S | S | N | N | N |
| 99.25 | N | S | S | S | S | N | N | N | N | N | S | S | S | S | N | N | N |
| 99.50 | N | S | S | S | S | O | N | N | N | N | S | S | S | S | N | N | N |
| 99.75 | N | S | S | S | S | S | N | N | N | N | S | S | S | S | O | N | N |
| 100.00 | N | S | S | S | S | S | N | N | N | N | S | S | S | S | S | N | N |
| 100.25 | N | S | S | S | S | S | N | N | N | N | S | S | S | S | S | N | N |
| 100.50 | N | O | S | S | S | S | N | N | N | N | S | S | S | S | S | N | N |
| 100.75 | N | N | S | S | S | S | N | N | N | N | O | S | S | S | S | N | N |
| 101.00 | N | N | S | S | S | S | N | N | N | N | N | S | S | S | S | N | N |
| 101.25 | N | N | S | S | S | S | N | N | N | N | N | S | S | S | S | N | N |
| 101.50 | N | N | S | S | S | S | N | N | N | N | N | S | S | S | S | N | N |
| 101.75 | N | N | S | S | S | S | O | N | N | N | N | S | S | S | S | N | N |
| 102.00 | N | N | S | S | S | S | S | N | N | N | N | S | S | S | S | O | N |
| 102.25 | N | N | S | S | S | S | S | N | N | N | N | S | S | S | S | S | N |
| 102.50 | N | N | S | S | S | S | S | N | N | N | N | S | S | S | S | S | N |
| 102.75 | N | N | O | S | S | S | S | N | N | N | N | S | S | S | S | S | N |
| 103.00 | N | N | N | S | S | S | S | N | N | N | N | O | S | S | S | S | N |
| 103.25 | N | N | N | S | S | S | S | N | N | N | N | N | S | S | S | S | N |
| 103.50 | N | N | N | S | S | S | S | N | N | N | N | N | S | S | S | S | N |
| 103.75 | N | N | N | S | S | S | S | N | N | N | N | N | S | S | S | S | N |
| 104.00 | N | N | N | S | S | S | S | O | N | N | N | N | S | S | S | S | N |
| 104.25 | N | N | N | S | S | S | S | S | N | N | N | N | S | S | S | S | O |
| 104.50 | N | N | N | S | S | S | S | S | N | N | N | N | S | S | S | S | S |
| 104.75 | N | N | N | S | S | S | S | S | N | N | N | N | S | S | S | S | S |
| 105.00 | N | N | N | O | S | S | S | S | N | N | N | N | S | S | S | S | S |
| 105.25 | N | N | N | N | S | S | S | S | N | N | N | N | O | S | S | S | S |
| 105.50 | N | N | N | N | S | S | S | S | N | N | N | N | N | S | S | S | S |
| 105.75 | N | N | N | N | S | S | S | S | N | N | N | N | N | S | S | S | S |
| 106.00 | N | N | N | N | S | S | S | S | N | N | N | N | N | S | S | S | S |
| 106.25 | N | N | N | N | S | S | S | S | O | N | N | N | N | S | S | S | S |

-continued

| Coil Excitation | | | | | | | | | | | | | | | | | |
|---|---|---|---|---|---|---|---|---|---|---|---|---|---|---|---|---|---|
| 106.50 | N | N | N | N | S | S | S | S | S | N | N | N | N | S | S | S | S |
| 106.75 | N | N | N | N | S | S | S | S | S | N | N | N | N | S | S | S | S |
| 107.00 | N | N | N | N | S | S | S | S | S | N | N | N | N | S | S | S | S |
| 107.25 | N | N | N | N | O | S | S | S | S | N | N | N | N | S | S | S | S |
| 107.50 | N | N | N | N | N | S | S | S | S | N | N | N | N | O | S | S | S |
| 107.75 | N | N | N | N | N | S | S | S | S | N | N | N | N | N | S | S | S |

Page Row 9, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 96.00 | S | S | S | S | S | N | N | N | N | S | S | S | S | S | N | N | N |
| 96.25 | S | S | S | S | S | N | N | N | N | S | S | S | S | S | N | N | N |
| 96.50 | O | S | S | S | S | N | N | N | N | S | S | S | S | S | N | N | N |
| 96.75 | N | S | S | S | S | N | N | N | N | O | S | S | S | S | N | N | N |
| 97.00 | N | S | S | S | S | N | N | N | N | N | S | S | S | S | N | N | N |
| 97.25 | N | S | S | S | S | N | N | N | N | N | S | S | S | S | N | N | N |
| 97.50 | N | S | S | S | S | N | N | N | N | N | S | S | S | S | N | N | N |
| 97.75 | N | S | S | S | S | O | N | N | N | N | S | S | S | S | N | N | N |
| 98.00 | N | S | S | S | S | S | N | N | N | N | S | S | S | S | O | N | N |
| 98.25 | N | S | S | S | S | S | N | N | N | N | S | S | S | S | S | N | N |
| 98.50 | N | S | S | S | S | S | N | N | N | N | S | S | S | S | S | N | N |
| 98.75 | N | O | S | S | S | S | N | N | N | N | S | S | S | S | S | N | N |
| 99.00 | N | N | S | S | S | S | N | N | N | N | O | S | S | S | S | N | N |
| 99.25 | N | N | S | S | S | S | N | N | N | N | N | S | S | S | S | N | N |
| 99.50 | N | N | S | S | S | S | N | N | N | N | N | S | S | S | S | N | N |
| 99.75 | N | N | S | S | S | S | N | N | N | N | N | S | S | S | S | N | N |
| 100.00 | N | N | S | S | S | S | O | N | N | N | N | S | S | S | S | N | N |
| 100.25 | N | N | S | S | S | S | S | N | N | N | N | S | S | S | S | O | N |
| 100.50 | N | N | S | S | S | S | S | N | N | N | N | S | S | S | S | S | N |
| 100.75 | N | N | S | S | S | S | S | N | N | N | N | S | S | S | S | S | N |
| 101.00 | N | N | O | S | S | S | S | N | N | N | N | S | S | S | S | S | N |
| 101.25 | N | N | N | S | S | S | S | N | N | N | N | O | S | S | S | S | N |
| 101.50 | N | N | N | S | S | S | S | N | N | N | N | N | S | S | S | S | N |
| 101.75 | N | N | N | S | S | S | S | N | N | N | N | N | S | S | S | S | N |
| 102.00 | N | N | N | S | S | S | S | N | N | N | N | N | S | S | S | S | N |
| 102.25 | N | N | N | S | S | S | S | O | N | N | N | N | S | S | S | S | N |
| 102.50 | N | N | N | S | S | S | S | S | N | N | N | N | S | S | S | S | O |
| 102.75 | N | N | N | S | S | S | S | S | N | N | N | N | S | S | S | S | S |
| 103.00 | N | N | N | S | S | S | S | S | N | N | N | N | S | S | S | S | S |
| 103.25 | N | N | N | O | S | S | S | S | N | N | N | N | S | S | S | S | S |
| 103.50 | N | N | N | N | S | S | S | S | N | N | N | N | O | S | S | S | S |
| 103.75 | N | N | N | N | S | S | S | S | N | N | N | N | N | S | S | S | S |
| 104.00 | N | N | N | N | S | S | S | S | N | N | N | N | N | S | S | S | S |
| 104.25 | N | N | N | N | S | S | S | S | N | N | N | N | N | S | S | S | S |
| 104.50 | N | N | N | N | S | S | S | S | O | N | N | N | N | S | S | S | S |
| 104.75 | N | N | N | N | S | S | S | S | S | N | N | N | N | S | S | S | S |
| 105.00 | N | N | N | N | S | S | S | S | S | N | N | N | N | S | S | S | S |
| 105.25 | N | N | N | N | S | S | S | S | S | N | N | N | N | S | S | S | S |
| 105.50 | N | N | N | N | O | S | S | S | S | N | N | N | N | S | S | S | S |
| 105.75 | N | N | N | N | N | S | S | S | S | N | N | N | N | O | S | S | S |
| 106.00 | N | N | N | N | N | S | S | S | S | N | N | N | N | N | S | S | S |
| 106.25 | N | N | N | N | N | S | S | S | S | N | N | N | N | N | S | S | S |
| 106.50 | O | N | N | N | N | S | S | S | S | N | N | N | N | N | S | S | S |
| 106.75 | S | N | N | N | N | S | S | S | S | O | N | N | N | N | S | S | S |
| 107.00 | S | N | N | N | N | S | S | S | S | S | N | N | N | N | S | S | S |
| 107.25 | S | N | N | N | N | S | S | S | S | S | N | N | N | N | S | S | S |
| 107.50 | S | N | N | N | N | S | S | S | S | S | N | N | N | N | S | S | S |
| 107.75 | S | N | N | N | N | O | S | S | S | S | N | N | N | N | S | S | S |

Page Row 9, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 96.00 | N | S | S | S | S | O | N | N | N | N | S | S | S | S | N | N | N |
| 96.25 | N | S | S | S | S | S | N | N | N | N | S | S | S | S | O | N | N |
| 96.50 | N | S | S | S | S | S | N | N | N | N | S | S | S | S | S | N | N |
| 96.75 | N | S | S | S | S | S | N | N | N | N | S | S | S | S | S | N | N |
| 97.00 | N | O | S | S | S | S | N | N | N | N | S | S | S | S | S | N | N |
| 97.25 | N | N | S | S | S | S | N | N | N | N | O | S | S | S | S | N | N |
| 97.50 | N | N | S | S | S | S | N | N | N | N | N | S | S | S | S | N | N |
| 97.75 | N | N | S | S | S | S | N | N | N | N | N | S | S | S | S | N | N |
| 98.00 | N | N | S | S | S | S | N | N | N | N | N | S | S | S | S | N | N |
| 98.25 | N | N | S | S | S | S | O | N | N | N | N | S | S | S | S | N | N |
| 98.50 | N | N | S | S | S | S | S | N | N | N | N | S | S | S | S | O | N |
| 98.75 | N | N | S | S | S | S | S | N | N | N | N | S | S | S | S | S | N |
| 99.00 | N | N | S | S | S | S | S | N | N | N | N | S | S | S | S | S | N |
| 99.25 | N | N | O | S | S | S | S | N | N | N | N | S | S | S | S | S | N |
| 99.50 | N | N | N | S | S | S | S | N | N | N | N | O | S | S | S | S | N |

-continued

| Coil Excitation | | | | | | | | | | | | | | | | |
|---|---|---|---|---|---|---|---|---|---|---|---|---|---|---|---|---|
| 99.75 | N | N | N | S | S | S | S | N | N | N | N | N | S | S | S | S | N |
| 100.00 | N | N | N | S | S | S | S | N | N | N | N | N | S | S | S | S | N |
| 100.25 | N | N | N | S | S | S | S | N | N | N | N | N | S | S | S | S | N |
| 100.50 | N | N | N | S | S | S | S | O | N | N | N | N | S | S | S | S | N |
| 100.75 | N | N | N | S | S | S | S | S | N | N | N | N | S | S | S | S | O |
| 101.00 | N | N | N | S | S | S | S | S | N | N | N | N | S | S | S | S | S |
| 101.25 | N | N | N | S | S | S | S | S | N | N | N | N | S | S | S | S | S |
| 101.50 | N | N | N | O | S | S | S | S | N | N | N | N | S | S | S | S | S |
| 101.75 | N | N | N | N | S | S | S | S | N | N | N | N | O | S | S | S | S |
| 102.00 | N | N | N | N | S | S | S | S | N | N | N | N | N | S | S | S | S |
| 102.25 | N | N | N | N | S | S | S | S | N | N | N | N | N | S | S | S | S |
| 102.50 | N | N | N | N | S | S | S | S | N | N | N | N | N | S | S | S | S |
| 102.75 | N | N | N | N | S | S | S | S | O | N | N | N | N | S | S | S | S |
| 103.00 | N | N | N | N | S | S | S | S | S | N | N | N | N | S | S | S | S |
| 103.25 | N | N | N | N | S | S | S | S | S | N | N | N | N | S | S | S | S |
| 103.50 | N | N | N | N | S | S | S | S | S | N | N | N | N | S | S | S | S |
| 103.75 | N | N | N | N | O | S | S | S | S | N | N | N | N | S | S | S | S |
| 104.00 | N | N | N | N | N | S | S | S | S | N | N | N | N | O | S | S | S |
| 104.25 | N | N | N | N | N | S | S | S | S | N | N | N | N | N | S | S | S |
| 104.50 | N | N | N | N | N | S | S | S | S | N | N | N | N | N | S | S | S |
| 104.75 | O | N | N | N | N | S | S | S | S | N | N | N | N | N | S | S | S |
| 105.00 | S | N | N | N | N | S | S | S | S | O | N | N | N | N | S | S | S |
| 105.25 | S | N | N | N | N | S | S | S | S | S | N | N | N | N | S | S | S |
| 105.50 | S | N | N | N | N | S | S | S | S | S | N | N | N | N | S | S | S |
| 105.75 | S | N | N | N | N | S | S | S | S | S | N | N | N | N | S | S | S |
| 106.00 | S | N | N | N | N | O | S | S | S | S | N | N | N | N | S | S | S |
| 106.25 | S | N | N | N | N | N | S | S | S | S | N | N | N | N | O | S | S |
| 106.50 | S | N | N | N | N | N | S | S | S | S | N | N | N | N | N | S | S |
| 106.75 | S | N | N | N | N | N | S | S | S | S | N | N | N | N | N | S | S |
| 107.00 | S | O | N | N | N | N | S | S | S | S | N | N | N | N | N | S | S |
| 107.25 | S | S | N | N | N | N | S | S | S | S | O | N | N | N | N | S | S |
| 107.50 | S | S | N | N | N | N | S | S | S | S | S | N | N | N | N | S | S |
| 107.75 | S | S | N | N | N | N | S | S | S | S | S | N | N | N | N | S | S |

Page Row 9, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 96.00 | N | N | S | S | S | S | N | N | N | N | N | S | S | S | S | N | N |
| 96.25 | N | N | S | S | S | S | N | N | N | N | N | S | S | S | S | N | N |
| 96.50 | N | N | S | S | S | S | O | N | N | N | N | S | S | S | S | N | N |
| 96.75 | N | N | S | S | S | S | S | N | N | N | N | S | S | S | S | O | N |
| 97.00 | N | N | S | S | S | S | S | N | N | N | N | S | S | S | S | S | N |
| 97.25 | N | N | S | S | S | S | S | N | N | N | N | S | S | S | S | S | N |
| 97.50 | N | N | O | S | S | S | S | N | N | N | N | S | S | S | S | S | N |
| 97.75 | N | N | N | S | S | S | S | N | N | N | N | O | S | S | S | S | N |
| 98.00 | N | N | N | S | S | S | S | N | N | N | N | N | S | S | S | S | N |
| 98.25 | N | N | N | S | S | S | S | N | N | N | N | N | S | S | S | S | N |
| 98.50 | N | N | N | S | S | S | S | N | N | N | N | N | S | S | S | S | N |
| 98.75 | N | N | N | S | S | S | S | O | N | N | N | N | S | S | S | S | N |
| 99.00 | N | N | N | S | S | S | S | S | N | N | N | N | S | S | S | S | O |
| 99.25 | N | N | N | S | S | S | S | S | N | N | N | N | S | S | S | S | S |
| 99.50 | N | N | N | S | S | S | S | S | N | N | N | N | S | S | S | S | S |
| 99.75 | N | N | N | O | S | S | S | S | N | N | N | N | S | S | S | S | S |
| 100.00 | N | N | N | N | S | S | S | S | N | N | N | N | O | S | S | S | S |
| 100.25 | N | N | N | N | S | S | S | S | N | N | N | N | N | S | S | S | S |
| 100.50 | N | N | N | N | S | S | S | S | N | N | N | N | N | S | S | S | S |
| 100.75 | N | N | N | N | S | S | S | S | N | N | N | N | N | S | S | S | S |
| 101.00 | N | N | N | N | S | S | S | S | O | N | N | N | N | S | S | S | S |
| 101.25 | N | N | N | N | S | S | S | S | S | N | N | N | N | S | S | S | S |
| 101.50 | N | N | N | N | S | S | S | S | S | N | N | N | N | S | S | S | S |
| 101.75 | N | N | N | N | S | S | S | S | S | N | N | N | N | S | S | S | S |
| 102.00 | N | N | N | N | O | S | S | S | S | N | N | N | N | S | S | S | S |
| 102.25 | N | N | N | N | N | S | S | S | S | N | N | N | N | O | S | S | S |
| 102.50 | N | N | N | N | N | S | S | S | S | N | N | N | N | N | S | S | S |
| 102.75 | N | N | N | N | N | S | S | S | S | N | N | N | N | N | S | S | S |
| 103.00 | O | N | N | N | N | S | S | S | S | N | N | N | N | N | S | S | S |
| 103.25 | S | N | N | N | N | S | S | S | S | O | N | N | N | N | S | S | S |
| 103.50 | S | N | N | N | N | S | S | S | S | S | N | N | N | N | S | S | S |
| 103.75 | S | N | N | N | N | S | S | S | S | S | N | N | N | N | S | S | S |
| 104.00 | S | N | N | N | N | S | S | S | S | S | N | N | N | N | S | S | S |
| 104.25 | S | N | N | N | N | O | S | S | S | S | N | N | N | N | S | S | S |
| 104.50 | S | N | N | N | N | N | S | S | S | S | N | N | N | N | O | S | S |
| 104.75 | S | N | N | N | N | N | S | S | S | S | N | N | N | N | N | S | S |
| 105.00 | S | N | N | N | N | N | S | S | S | S | N | N | N | N | N | S | S |
| 105.25 | S | O | N | N | N | N | S | S | S | S | N | N | N | N | N | S | S |
| 105.50 | S | S | N | N | N | N | S | S | S | S | O | N | N | N | N | S | S |
| 105.75 | S | S | N | N | N | N | S | S | S | S | S | N | N | N | N | S | S |

-continued

Coil Excitation

| | | | | | | | | | | | | | | | | | |
|---|---|---|---|---|---|---|---|---|---|---|---|---|---|---|---|---|---|
| 106.00 | S | S | N | N | N | N | S | S | S | S | S | N | N | N | N | S | S |
| 106.25 | S | S | N | N | N | N | S | S | S | S | S | N | N | N | N | S | S |
| 106.50 | S | S | N | N | N | N | O | S | S | S | S | N | N | N | N | S | S |
| 106.75 | S | S | N | N | N | N | N | S | S | S | S | N | N | N | N | O | S |
| 107.00 | S | S | N | N | N | N | N | S | S | S | S | N | N | N | N | N | S |
| 107.25 | S | S | N | N | N | N | N | S | S | S | S | N | N | N | N | N | S |
| 107.50 | S | S | O | N | N | N | N | S | S | S | S | N | N | N | N | N | S |
| 107.75 | S | S | S | N | N | N | N | S | S | S | S | O | N | N | N | N | S |

Page Row 9, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 96.00 | N | N | N | S | S | S | S | N | N | N | N | O | S | S | S | S | N |
| 96.25 | N | N | N | S | S | S | S | N | N | N | N | N | S | S | S | S | N |
| 96.50 | N | N | N | S | S | S | S | N | N | N | N | N | S | S | S | S | N |
| 96.75 | N | N | N | S | S | S | S | N | N | N | N | N | S | S | S | S | N |
| 97.00 | N | N | N | S | S | S | S | O | N | N | N | N | S | S | S | S | N |
| 97.25 | N | N | N | S | S | S | S | S | N | N | N | N | S | S | S | S | O |
| 97.50 | N | N | N | S | S | S | S | S | N | N | N | N | S | S | S | S | S |
| 97.75 | N | N | N | S | S | S | S | S | N | N | N | N | S | S | S | S | S |
| 98.00 | N | N | N | O | S | S | S | S | N | N | N | N | S | S | S | S | S |
| 98.25 | N | N | N | N | S | S | S | S | N | N | N | N | O | S | S | S | S |
| 98.50 | N | N | N | N | S | S | S | S | N | N | N | N | N | S | S | S | S |
| 98.75 | N | N | N | N | S | S | S | S | N | N | N | N | N | S | S | S | S |
| 99.00 | N | N | N | N | S | S | S | S | N | N | N | N | N | S | S | S | S |
| 99.25 | N | N | N | N | S | S | S | S | O | N | N | N | N | S | S | S | S |
| 99.50 | N | N | N | N | S | S | S | S | S | N | N | N | N | S | S | S | S |
| 99.75 | N | N | N | N | S | S | S | S | S | N | N | N | N | S | S | S | S |
| 100.00 | N | N | N | N | S | S | S | S | S | N | N | N | N | S | S | S | S |
| 100.25 | N | N | N | N | O | S | S | S | S | N | N | N | N | S | S | S | S |
| 100.50 | N | N | N | N | N | S | S | S | S | N | N | N | N | O | S | S | S |
| 100.75 | N | N | N | N | N | S | S | S | S | N | N | N | N | N | S | S | S |
| 101.00 | N | N | N | N | N | S | S | S | S | N | N | N | N | N | S | S | S |
| 101.25 | O | N | N | N | N | S | S | S | S | N | N | N | N | N | S | S | S |
| 101.50 | S | N | N | N | N | S | S | S | S | O | N | N | N | N | S | S | S |
| 101.75 | S | N | N | N | N | S | S | S | S | S | N | N | N | N | S | S | S |
| 102.00 | S | N | N | N | N | S | S | S | S | S | N | N | N | N | S | S | S |
| 102.25 | S | N | N | N | N | S | S | S | S | S | N | N | N | N | S | S | S |
| 102.50 | S | N | N | N | N | O | S | S | S | S | N | N | N | N | S | S | S |
| 102.75 | S | N | N | N | N | N | S | S | S | S | N | N | N | N | O | S | S |
| 103.00 | S | N | N | N | N | N | S | S | S | S | N | N | N | N | N | S | S |
| 103.25 | S | N | N | N | N | N | S | S | S | S | N | N | N | N | N | S | S |
| 103.50 | S | O | N | N | N | N | S | S | S | S | N | N | N | N | N | S | S |
| 103.75 | S | S | N | N | N | N | S | S | S | S | O | N | N | N | N | S | S |
| 104.00 | S | S | N | N | N | N | S | S | S | S | S | N | N | N | N | S | S |
| 104.25 | S | S | N | N | N | N | S | S | S | S | S | N | N | N | N | S | S |
| 104.50 | S | S | N | N | N | N | S | S | S | S | S | N | N | N | N | S | S |
| 104.75 | S | S | N | N | N | N | O | S | S | S | S | N | N | N | N | S | S |
| 105.00 | S | S | N | N | N | N | N | S | S | S | S | N | N | N | N | O | S |
| 105.25 | S | S | N | N | N | N | N | S | S | S | S | N | N | N | N | N | S |
| 105.50 | S | S | N | N | N | N | N | S | S | S | S | N | N | N | N | N | S |
| 105.75 | S | S | O | N | N | N | N | S | S | S | S | N | N | N | N | N | S |
| 106.00 | S | S | S | N | N | N | N | S | S | S | S | O | N | N | N | N | S |
| 106.25 | S | S | S | N | N | N | N | S | S | S | S | S | N | N | N | N | S |
| 106.50 | S | S | S | N | N | N | N | S | S | S | S | S | N | N | N | N | S |
| 106.75 | S | S | S | N | N | N | N | S | S | S | S | S | N | N | N | N | S |
| 107.00 | S | S | S | N | N | N | N | O | S | S | S | S | N | N | N | N | S |
| 107.25 | S | S | S | N | N | N | N | N | S | S | S | S | N | N | N | N | O |
| 107.50 | S | S | S | N | N | N | N | N | S | S | S | S | N | N | N | N | N |
| 107.75 | S | S | S | N | N | N | N | N | S | S | S | S | N | N | N | N | N |

Page Row 9, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 96.00 | N | N | N | S | S | S | S | S | N | N | N | N | S | S | S | S | S |
| 96.25 | N | N | N | O | S | S | S | S | N | N | N | N | S | S | S | S | S |
| 96.50 | N | N | N | N | S | S | S | S | N | N | N | N | O | S | S | S | S |
| 96.75 | N | N | N | N | S | S | S | S | N | N | N | N | N | S | S | S | S |
| 97.00 | N | N | N | N | S | S | S | S | N | N | N | N | N | S | S | S | S |
| 97.25 | N | N | N | N | S | S | S | S | N | N | N | N | N | S | S | S | S |
| 97.50 | N | N | N | N | S | S | S | S | O | N | N | N | N | S | S | S | S |
| 97.75 | N | N | N | N | S | S | S | S | S | N | N | N | N | S | S | S | S |
| 98.00 | N | N | N | N | S | S | S | S | S | N | N | N | N | S | S | S | S |
| 98.25 | N | N | N | N | S | S | S | S | S | N | N | N | N | S | S | S | S |
| 98.50 | N | N | N | N | O | S | S | S | S | N | N | N | N | S | S | S | S |
| 98.75 | N | N | N | N | N | S | S | S | S | N | N | N | N | O | S | S | S |
| 99.00 | N | N | N | N | N | S | S | S | S | N | N | N | N | N | S | S | S |

-continued

| Coil Excitation | | | | | | | | | | | | | | | | | |
|---|---|---|---|---|---|---|---|---|---|---|---|---|---|---|---|---|---|
| 99.25 | N | N | N | N | N | S | S | S | S | N | N | N | N | N | S | S | S |
| 99.50 | O | N | N | N | N | S | S | S | S | N | N | N | N | N | S | S | S |
| 99.75 | S | N | N | N | N | S | S | S | S | O | N | N | N | N | S | S | S |
| 100.00 | S | N | N | N | N | S | S | S | S | S | N | N | N | N | S | S | S |
| 100.25 | S | N | N | N | N | S | S | S | S | S | N | N | N | N | S | S | S |
| 100.50 | S | N | N | N | N | S | S | S | S | S | N | N | N | N | S | S | S |
| 100.75 | S | N | N | N | N | O | S | S | S | S | N | N | N | N | S | S | S |
| 101.00 | S | N | N | N | N | N | S | S | S | S | N | N | N | N | O | S | S |
| 101.25 | S | N | N | N | N | N | S | S | S | S | N | N | N | N | N | S | S |
| 101.50 | S | N | N | N | N | N | S | S | S | S | N | N | N | N | N | S | S |
| 101.75 | S | O | N | N | N | N | S | S | S | S | N | N | N | N | N | S | S |
| 102.00 | S | S | N | N | N | N | S | S | S | S | O | N | N | N | N | S | S |
| 102.25 | S | S | N | N | N | N | S | S | S | S | S | N | N | N | N | S | S |
| 102.50 | S | S | N | N | N | N | S | S | S | S | S | N | N | N | N | S | S |
| 102.75 | S | S | N | N | N | N | S | S | S | S | S | N | N | N | N | S | S |
| 103.00 | S | S | N | N | N | N | O | S | S | S | S | N | N | N | N | S | S |
| 103.25 | S | S | N | N | N | N | N | S | S | S | S | N | N | N | N | O | S |
| 103.50 | S | S | N | N | N | N | N | S | S | S | S | N | N | N | N | N | S |
| 103.75 | S | S | N | N | N | N | N | S | S | S | S | N | N | N | N | N | S |
| 104.00 | S | S | O | N | N | N | N | S | S | S | S | N | N | N | N | N | S |
| 104.25 | S | S | S | N | N | N | N | S | S | S | S | O | N | N | N | N | S |
| 104.50 | S | S | S | N | N | N | N | S | S | S | S | S | N | N | N | N | S |
| 104.75 | S | S | S | N | N | N | N | S | S | S | S | S | N | N | N | N | S |
| 105.00 | S | S | S | N | N | N | N | S | S | S | S | S | N | N | N | N | S |
| 105.25 | S | S | S | N | N | N | N | O | S | S | S | S | N | N | N | N | S |
| 105.50 | S | S | S | N | N | N | N | N | S | S | S | S | N | N | N | N | O |
| 105.75 | S | S | S | N | N | N | N | N | S | S | S | S | N | N | N | N | N |
| 106.00 | S | S | S | N | N | N | N | N | S | S | S | S | N | N | N | N | N |
| 106.25 | S | S | S | O | N | N | N | N | S | S | S | S | N | N | N | N | N |
| 106.50 | S | S | S | S | N | N | N | N | S | S | S | S | O | N | N | N | N |
| 106.75 | S | S | S | S | N | N | N | N | S | S | S | S | S | N | N | N | N |
| 107.00 | S | S | S | S | N | N | N | N | S | S | S | S | S | N | N | N | N |
| 107.25 | S | S | S | S | N | N | N | N | S | S | S | S | S | N | N | N | N |
| 107.50 | S | S | S | S | N | N | N | N | O | S | S | S | S | N | N | N | N |
| 107.75 | S | S | S | S | N | N | N | N | N | S | S | S | S | N | N | N | N |

Page Row 9, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 96.00 | N | N | N | N | S | S | S | S | S | N | N | N | N | S | S | S | S |
| 96.25 | N | N | N | N | S | S | S | S | S | N | N | N | N | S | S | S | S |
| 96.50 | N | N | N | N | S | S | S | S | S | N | N | N | N | S | S | S | S |
| 96.75 | N | N | N | N | O | S | S | S | S | N | N | N | N | S | S | S | S |
| 97.00 | N | N | N | N | N | S | S | S | S | N | N | N | N | O | S | S | S |
| 97.25 | N | N | N | N | N | S | S | S | S | N | N | N | N | N | S | S | S |
| 97.50 | N | N | N | N | N | S | S | S | S | N | N | N | N | N | S | S | S |
| 97.75 | O | N | N | N | N | S | S | S | S | N | N | N | N | N | S | S | S |
| 98.00 | S | N | N | N | N | S | S | S | S | O | N | N | N | N | S | S | S |
| 98.25 | S | N | N | N | N | S | S | S | S | S | N | N | N | N | S | S | S |
| 98.50 | S | N | N | N | N | S | S | S | S | S | N | N | N | N | S | S | S |
| 98.75 | S | N | N | N | N | S | S | S | S | S | N | N | N | N | S | S | S |
| 99.00 | S | N | N | N | N | O | S | S | S | S | N | N | N | N | S | S | S |
| 99.25 | S | N | N | N | N | N | S | S | S | S | N | N | N | N | O | S | S |
| 99.50 | S | N | N | N | N | N | S | S | S | S | N | N | N | N | N | S | S |
| 99.75 | S | N | N | N | N | N | S | S | S | S | N | N | N | N | N | S | S |
| 100.00 | S | O | N | N | N | N | S | S | S | S | N | N | N | N | N | S | S |
| 100.25 | S | S | N | N | N | N | S | S | S | S | O | N | N | N | N | S | S |
| 100.50 | S | S | N | N | N | N | S | S | S | S | S | N | N | N | N | S | S |
| 100.75 | S | S | N | N | N | N | S | S | S | S | S | N | N | N | N | S | S |
| 101.00 | S | S | N | N | N | N | S | S | S | S | S | N | N | N | N | S | S |
| 101.25 | S | S | N | N | N | N | O | S | S | S | S | N | N | N | N | S | S |
| 101.50 | S | S | N | N | N | N | N | S | S | S | S | N | N | N | N | O | S |
| 101.75 | S | S | N | N | N | N | N | S | S | S | S | N | N | N | N | N | S |
| 102.00 | S | S | N | N | N | N | N | S | S | S | S | N | N | N | N | N | S |
| 102.25 | S | S | O | N | N | N | N | S | S | S | S | N | N | N | N | N | S |
| 102.50 | S | S | S | N | N | N | N | S | S | S | S | O | N | N | N | N | S |
| 102.75 | S | S | S | N | N | N | N | S | S | S | S | S | N | N | N | N | S |
| 103.00 | S | S | S | N | N | N | N | S | S | S | S | S | N | N | N | N | S |
| 103.25 | S | S | S | N | N | N | N | S | S | S | S | S | N | N | N | N | S |
| 103.50 | S | S | S | N | N | N | N | O | S | S | S | S | N | N | N | N | S |
| 103.75 | S | S | S | N | N | N | N | N | S | S | S | S | N | N | N | N | O |
| 104.00 | S | S | S | N | N | N | N | N | S | S | S | S | N | N | N | N | N |
| 104.25 | S | S | S | N | N | N | N | N | S | S | S | S | N | N | N | N | N |
| 104.50 | S | S | S | O | N | N | N | N | S | S | S | S | N | N | N | N | N |
| 104.75 | S | S | S | S | N | N | N | N | S | S | S | S | O | N | N | N | N |
| 105.00 | S | S | S | S | N | N | N | N | S | S | S | S | S | N | N | N | N |
| 105.25 | S | S | S | S | N | N | N | N | S | S | S | S | S | N | N | N | N |

-continued

Coil Excitation

| | | | | | | | | | | | | | | | | | |
|---|---|---|---|---|---|---|---|---|---|---|---|---|---|---|---|---|---|
| 105.50 | S | S | S | S | N | N | N | N | S | S | S | S | S | N | N | N | N |
| 105.75 | S | S | S | S | N | N | N | N | O | S | S | S | S | N | N | N | N |
| 106.00 | S | S | S | S | N | N | N | N | N | S | S | S | S | N | N | N | N |
| 106.25 | S | S | S | S | N | N | N | N | N | S | S | S | S | N | N | N | N |
| 106.50 | S | S | S | S | N | N | N | N | N | S | S | S | S | N | N | N | N |
| 106.75 | S | S | S | S | O | N | N | N | N | S | S | S | S | N | N | N | N |
| 107.00 | S | S | S | S | S | N | N | N | N | S | S | S | S | O | N | N | N |
| 107.25 | S | S | S | S | S | N | N | N | N | S | S | S | S | S | N | N | N |
| 107.50 | S | S | S | S | S | N | N | N | N | S | S | S | S | S | N | N | N |
| 107.75 | O | S | S | S | S | N | N | N | N | S | S | S | S | S | N | N | N |

Page Row 9, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 96.00 | O | N | N | N | N | S | S | S | S | N | N | N | N | N | S | S | S |
| 96.25 | S | N | N | N | N | S | S | S | S | O | N | N | N | N | S | S | S |
| 96.50 | S | N | N | N | N | S | S | S | S | S | N | N | N | N | S | S | S |
| 96.75 | S | N | N | N | N | S | S | S | S | S | N | N | N | N | S | S | S |
| 97.00 | S | N | N | N | N | S | S | S | S | S | N | N | N | N | S | S | S |
| 97.25 | S | N | N | N | N | O | S | S | S | S | N | N | N | N | S | S | S |
| 97.50 | S | N | N | N | N | N | S | S | S | S | N | N | N | N | O | S | S |
| 97.75 | S | N | N | N | N | N | S | S | S | S | N | N | N | N | N | S | S |
| 98.00 | S | N | N | N | N | N | S | S | S | S | N | N | N | N | N | S | S |
| 98.25 | S | O | N | N | N | N | S | S | S | S | N | N | N | N | N | S | S |
| 98.50 | S | S | N | N | N | N | S | S | S | S | O | N | N | N | N | S | S |
| 98.75 | S | S | N | N | N | N | S | S | S | S | S | N | N | N | N | S | S |
| 99.00 | S | S | N | N | N | N | S | S | S | S | S | N | N | N | N | S | S |
| 99.25 | S | S | N | N | N | N | S | S | S | S | S | N | N | N | N | S | S |
| 99.50 | S | S | N | N | N | N | O | S | S | S | S | N | N | N | N | S | S |
| 99.75 | S | S | N | N | N | N | N | S | S | S | S | N | N | N | N | O | S |
| 100.00 | S | S | N | N | N | N | N | S | S | S | S | N | N | N | N | N | S |
| 100.25 | S | S | N | N | N | N | N | S | S | S | S | N | N | N | N | N | S |
| 100.50 | S | S | O | N | N | N | N | S | S | S | S | N | N | N | N | N | S |
| 100.75 | S | S | S | N | N | N | N | S | S | S | S | O | N | N | N | N | S |
| 101.00 | S | S | S | N | N | N | N | S | S | S | S | S | N | N | N | N | S |
| 101.25 | S | S | S | N | N | N | N | S | S | S | S | S | N | N | N | N | S |
| 101.50 | S | S | S | N | N | N | N | S | S | S | S | S | N | N | N | N | S |
| 101.75 | S | S | S | N | N | N | N | O | S | S | S | S | N | N | N | N | S |
| 102.00 | S | S | S | N | N | N | N | N | S | S | S | S | N | N | N | N | O |
| 102.25 | S | S | S | N | N | N | N | N | S | S | S | S | N | N | N | N | N |
| 102.50 | S | S | S | N | N | N | N | N | S | S | S | S | N | N | N | N | N |
| 102.75 | S | S | S | O | N | N | N | N | S | S | S | S | N | N | N | N | N |
| 103.00 | S | S | S | S | N | N | N | N | S | S | S | S | O | N | N | N | N |
| 103.25 | S | S | S | S | N | N | N | N | S | S | S | S | S | N | N | N | N |
| 103.50 | S | S | S | S | N | N | N | N | S | S | S | S | S | N | N | N | N |
| 103.75 | S | S | S | S | N | N | N | N | S | S | S | S | S | N | N | N | N |
| 104.00 | S | S | S | S | N | N | N | N | O | S | S | S | S | N | N | N | N |
| 104.25 | S | S | S | S | N | N | N | N | N | S | S | S | S | N | N | N | N |
| 104.50 | S | S | S | S | N | N | N | N | N | S | S | S | S | N | N | N | N |
| 104.75 | S | S | S | S | N | N | N | N | N | S | S | S | S | N | N | N | N |
| 105.00 | S | S | S | S | O | N | N | N | N | S | S | S | S | N | N | N | N |
| 105.25 | S | S | S | S | S | N | N | N | N | S | S | S | S | O | N | N | N |
| 105.50 | S | S | S | S | S | N | N | N | N | S | S | S | S | S | N | N | N |
| 105.75 | S | S | S | S | S | N | N | N | N | S | S | S | S | S | N | N | N |
| 106.00 | O | S | S | S | S | N | N | N | N | S | S | S | S | S | N | N | N |
| 106.25 | N | S | S | S | S | N | N | N | N | O | S | S | S | S | N | N | N |
| 106.50 | N | S | S | S | S | N | N | N | N | N | S | S | S | S | N | N | N |
| 106.75 | N | S | S | S | S | N | N | N | N | N | S | S | S | S | N | N | N |
| 107.00 | N | S | S | S | S | N | N | N | N | N | S | S | S | S | N | N | N |
| 107.25 | N | S | S | S | S | O | N | N | N | N | S | S | S | S | N | N | N |
| 107.50 | N | S | S | S | S | S | N | N | N | N | S | S | S | S | O | N | N |
| 107.75 | N | S | S | S | S | S | N | N | N | N | S | S | S | S | S | N | N |

Page Row 9, Page Column 9

| Coil | 154 | 155 | 156 | 157 | 158 | 159 | 160 |
|---|---|---|---|---|---|---|---|
| 96.00 | S | N | N | N | N | N | S |
| 96.25 | S | N | N | N | N | N | S |
| 96.50 | S | O | N | N | N | N | S |
| 96.75 | S | S | N | N | N | N | S |
| 97.00 | S | S | N | N | N | N | S |
| 97.25 | S | S | N | N | N | N | S |
| 97.50 | S | S | N | N | N | N | S |
| 97.75 | S | S | N | N | N | N | O |
| 98.00 | S | S | N | N | N | N | N |
| 98.25 | S | S | N | N | N | N | N |
| 98.50 | S | S | N | N | N | N | N |

-continued

| Coil Excitation | | | | | | | |
|---|---|---|---|---|---|---|---|
| 98.75 | S | S | O | N | N | N | N |
| 99.00 | S | S | S | N | N | N | N |
| 99.25 | S | S | S | N | N | N | N |
| 99.50 | S | S | S | N | N | N | N |
| 99.75 | S | S | S | N | N | N | N |
| 100.00 | S | S | S | N | N | N | N |
| 100.25 | S | S | S | N | N | N | N |
| 100.50 | S | S | S | N | N | N | N |
| 100.75 | S | S | S | N | N | N | N |
| 101.00 | S | S | S | O | N | N | N |
| 101.25 | S | S | S | S | N | N | N |
| 101.50 | S | S | S | S | N | N | N |
| 101.75 | S | S | S | S | N | N | N |
| 102.00 | S | S | S | S | N | N | N |
| 102.25 | S | S | S | S | N | N | N |
| 102.50 | S | S | S | S | N | N | N |
| 102.75 | S | S | S | S | N | N | N |
| 103.00 | S | S | S | S | N | N | N |
| 103.25 | S | S | S | S | O | N | N |
| 103.50 | S | S | S | S | S | N | N |
| 103.75 | S | S | S | S | S | N | N |
| 104.00 | S | S | S | S | S | N | N |
| 104.25 | O | S | S | S | S | N | N |
| 104.50 | N | S | S | S | S | N | N |
| 104.75 | N | S | S | S | S | N | N |
| 105.00 | N | S | S | S | S | N | N |
| 105.25 | N | S | S | S | S | N | N |
| 105.50 | N | S | S | S | S | O | N |
| 105.75 | N | S | S | S | S | S | N |
| 106.00 | N | S | S | S | S | S | N |
| 106.25 | N | S | S | S | S | S | N |
| 106.50 | N | O | S | S | S | S | N |
| 106.75 | N | N | S | S | S | S | N |
| 107.00 | N | N | S | S | S | S | N |
| 107.25 | N | N | S | S | S | S | N |
| 107.50 | N | N | S | S | S | S | N |
| 107.75 | N | N | S | S | S | S | O |

Page Row 9, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 108.00 | N | N | N | N | S | S | S | S | O | N | N | N | N | S | S | S | S |
| 108.25 | N | N | N | N | S | S | S | S | S | N | N | N | N | S | S | S | S |
| 108.50 | N | N | N | N | S | S | S | S | S | N | N | N | N | S | S | S | S |
| 108.75 | N | N | N | N | S | S | S | S | S | N | N | N | N | S | S | S | S |
| 109.00 | N | N | N | N | O | S | S | S | S | N | N | N | N | S | S | S | S |
| 109.25 | N | N | N | N | N | S | S | S | S | N | N | N | N | O | S | S | S |
| 109.50 | N | N | N | N | N | S | S | S | S | N | N | N | N | N | S | S | S |
| 109.75 | N | N | N | N | N | S | S | S | S | N | N | N | N | N | S | S | S |
| 110.00 | O | N | N | N | N | S | S | S | S | N | N | N | N | N | S | S | S |
| 110.25 | S | N | N | N | N | S | S | S | S | O | N | N | N | N | S | S | S |
| 110.50 | S | N | N | N | N | S | S | S | S | S | N | N | N | N | S | S | S |
| 110.75 | S | N | N | N | N | S | S | S | S | S | N | N | N | N | S | S | S |
| 111.00 | S | N | N | N | N | S | S | S | S | S | N | N | N | N | S | S | S |
| 111.25 | S | N | N | N | N | O | S | S | S | S | N | N | N | N | S | S | S |
| 111.50 | S | N | N | N | N | N | S | S | S | S | N | N | N | N | O | S | S |
| 111.75 | S | N | N | N | N | N | S | S | S | S | N | N | N | N | N | S | S |
| 112.00 | S | N | N | N | N | N | S | S | S | S | N | N | N | N | N | S | S |
| 112.25 | S | O | N | N | N | N | S | S | S | S | N | N | N | N | N | S | S |
| 112.50 | S | S | N | N | N | N | S | S | S | S | O | N | N | N | N | S | S |
| 112.75 | S | S | N | N | N | N | S | S | S | S | S | N | N | N | N | S | S |
| 113.00 | S | S | N | N | N | N | S | S | S | S | S | N | N | N | N | S | S |
| 113.25 | S | S | N | N | N | N | S | S | S | S | S | N | N | N | N | S | S |
| 113.50 | S | S | N | N | N | N | O | S | S | S | S | N | N | N | N | S | S |
| 113.75 | S | S | N | N | N | N | N | S | S | S | S | N | N | N | N | O | S |
| 114.00 | S | S | N | N | N | N | N | S | S | S | S | N | N | N | N | N | S |
| 114.25 | S | S | N | N | N | N | N | S | S | S | S | N | N | N | N | N | S |
| 114.50 | S | S | O | N | N | N | N | S | S | S | S | N | N | N | N | N | S |
| 114.75 | S | S | S | N | N | N | N | S | S | S | S | O | N | N | N | N | S |
| 115.00 | S | S | S | N | N | N | N | S | S | S | S | S | N | N | N | N | S |
| 115.25 | S | S | S | N | N | N | N | S | S | S | S | S | N | N | N | N | S |
| 115.50 | S | S | S | N | N | N | N | S | S | S | S | S | N | N | N | N | S |
| 115.75 | S | S | S | N | N | N | N | O | S | S | S | S | N | N | N | N | S |
| 116.00 | S | S | S | N | N | N | N | N | S | S | S | S | N | N | N | N | O |
| 116.25 | S | S | S | N | N | N | N | N | S | S | S | S | N | N | N | N | N |
| 116.50 | S | S | S | N | N | N | N | N | S | S | S | S | N | N | N | N | N |
| 116.75 | S | S | S | O | N | N | N | N | S | S | S | S | N | N | N | N | N |

-continued

| Coil Excitation | | | | | | | | | | | | | | | | | |
|---|---|---|---|---|---|---|---|---|---|---|---|---|---|---|---|---|---|
| 117.00 | S | S | S | S | N | N | N | N | S | S | S | S | O | N | N | N | N |
| 117.25 | S | S | S | S | N | N | N | N | S | S | S | S | S | N | N | N | N |
| 117.50 | S | S | S | S | N | N | N | N | S | S | S | S | S | N | N | N | N |
| 117.75 | S | S | S | S | N | N | N | N | S | S | S | S | S | N | N | N | N |
| 118.00 | S | S | S | S | N | N | N | N | O | S | S | S | S | N | N | N | N |
| 118.25 | S | S | S | S | N | N | N | N | N | S | S | S | S | N | N | N | N |
| 118.50 | S | S | S | S | N | N | N | N | N | S | S | S | S | N | N | N | N |
| 118.75 | S | S | S | S | N | N | N | N | N | S | S | S | S | N | N | N | N |
| 119.00 | S | S | S | S | O | N | N | N | N | S | S | S | S | N | N | N | N |
| 119.25 | S | S | S | S | S | N | N | N | N | S | S | S | S | O | N | N | N |
| 119.50 | S | S | S | S | S | N | N | N | N | S | S | S | S | S | N | N | N |
| 119.75 | S | S | S | S | S | N | N | N | N | S | S | S | S | S | N | N | N |

Page Row 10, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 108.00 | N | N | N | N | N | S | S | S | S | N | N | N | N | N | S | S | S |
| 108.25 | O | N | N | N | N | S | S | S | S | N | N | N | N | N | S | S | S |
| 108.50 | S | N | N | N | N | S | S | S | S | O | N | N | N | N | S | S | S |
| 108.75 | S | N | N | N | N | S | S | S | S | S | N | N | N | N | S | S | S |
| 109.00 | S | N | N | N | N | S | S | S | S | S | N | N | N | N | S | S | S |
| 109.25 | S | N | N | N | N | S | S | S | S | S | N | N | N | N | S | S | S |
| 109.50 | S | N | N | N | N | O | S | S | S | S | N | N | N | N | S | S | S |
| 109.75 | S | N | N | N | N | N | S | S | S | S | N | N | N | N | O | S | S |
| 110.00 | S | N | N | N | N | N | S | S | S | S | N | N | N | N | N | S | S |
| 110.25 | S | N | N | N | N | N | S | S | S | S | N | N | N | N | N | S | S |
| 110.50 | S | O | N | N | N | N | S | S | S | S | N | N | N | N | N | S | S |
| 110.75 | S | S | N | N | N | N | S | S | S | S | O | N | N | N | N | S | S |
| 111.00 | S | S | N | N | N | N | S | S | S | S | S | N | N | N | N | S | S |
| 111.25 | S | S | N | N | N | N | S | S | S | S | S | N | N | N | N | S | S |
| 111.50 | S | S | N | N | N | N | S | S | S | S | S | N | N | N | N | S | S |
| 111.75 | S | S | N | N | N | N | O | S | S | S | S | N | N | N | N | S | S |
| 112.00 | S | S | N | N | N | N | N | S | S | S | S | N | N | N | N | O | S |
| 112.25 | S | S | N | N | N | N | N | S | S | S | S | N | N | N | N | N | S |
| 112.50 | S | S | N | N | N | N | N | S | S | S | S | N | N | N | N | N | S |
| 112.75 | S | S | O | N | N | N | N | S | S | S | S | N | N | N | N | N | S |
| 113.00 | S | S | S | N | N | N | N | S | S | S | S | O | N | N | N | N | S |
| 113.25 | S | S | S | N | N | N | N | S | S | S | S | S | N | N | N | N | S |
| 113.50 | S | S | S | N | N | N | N | S | S | S | S | S | N | N | N | N | S |
| 113.75 | S | S | S | N | N | N | N | S | S | S | S | S | N | N | N | N | S |
| 114.00 | S | S | S | N | N | N | N | O | S | S | S | S | N | N | N | N | S |
| 114.25 | S | S | S | N | N | N | N | N | S | S | S | S | N | N | N | N | O |
| 114.50 | S | S | S | N | N | N | N | N | S | S | S | S | N | N | N | N | N |
| 114.75 | S | S | S | N | N | N | N | N | S | S | S | S | N | N | N | N | N |
| 115.00 | S | S | S | O | N | N | N | N | S | S | S | S | N | N | N | N | N |
| 115.25 | S | S | S | S | N | N | N | N | S | S | S | S | O | N | N | N | N |
| 115.50 | S | S | S | S | N | N | N | N | S | S | S | S | S | N | N | N | N |
| 115.75 | S | S | S | S | N | N | N | N | S | S | S | S | S | N | N | N | N |
| 116.00 | S | S | S | S | N | N | N | N | S | S | S | S | S | N | N | N | N |
| 116.25 | S | S | S | S | N | N | N | N | O | S | S | S | S | N | N | N | N |
| 116.50 | S | S | S | S | N | N | N | N | N | S | S | S | S | N | N | N | N |
| 116.75 | S | S | S | S | N | N | N | N | N | S | S | S | S | N | N | N | N |
| 117.00 | S | S | S | S | N | N | N | N | N | S | S | S | S | N | N | N | N |
| 117.25 | S | S | S | S | O | N | N | N | N | S | S | S | S | N | N | N | N |
| 117.50 | S | S | S | S | S | N | N | N | N | S | S | S | S | O | N | N | N |
| 117.75 | S | S | S | S | S | N | N | N | N | S | S | S | S | S | N | N | N |
| 118.00 | S | S | S | S | S | N | N | N | N | S | S | S | S | S | N | N | N |
| 118.25 | O | S | S | S | S | N | N | N | N | S | S | S | S | S | N | N | N |
| 118.50 | N | S | S | S | S | N | N | N | N | O | S | S | S | S | N | N | N |
| 118.75 | N | S | S | S | S | N | N | N | N | N | S | S | S | S | N | N | N |
| 119.00 | N | S | S | S | S | N | N | N | N | N | S | S | S | S | N | N | N |
| 119.25 | N | S | S | S | S | N | N | N | N | N | S | S | S | S | N | N | N |
| 119.50 | N | S | S | S | S | O | N | N | N | N | S | S | S | S | N | N | N |
| 119.75 | N | S | S | S | S | S | N | N | N | N | S | S | S | S | O | N | N |

Page Row 10, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 108.00 | S | N | N | N | N | N | S | S | S | S | N | N | N | N | O | S | S |
| 108.25 | S | N | N | N | N | N | S | S | S | S | N | N | N | N | N | S | S |
| 108.50 | S | N | N | N | N | N | S | S | S | S | N | N | N | N | N | S | S |
| 108.75 | S | O | N | N | N | N | S | S | S | S | N | N | N | N | N | S | S |
| 109.00 | S | S | N | N | N | N | S | S | S | S | O | N | N | N | N | S | S |
| 109.25 | S | S | N | N | N | N | S | S | S | S | S | N | N | N | N | S | S |
| 109.50 | S | S | N | N | N | N | S | S | S | S | S | N | N | N | N | S | S |
| 109.75 | S | S | N | N | N | N | S | S | S | S | S | N | N | N | N | S | S |
| 110.00 | S | S | N | N | N | N | O | S | S | S | S | N | N | N | N | S | S |

-continued

| Coil Excitation | | | | | | | | | | | | | | | | | |
|---|---|---|---|---|---|---|---|---|---|---|---|---|---|---|---|---|---|
| 110.25 | S | S | N | N | N | N | N | S | S | S | S | N | N | N | N | O | S |
| 110.50 | S | S | N | N | N | N | N | S | S | S | S | N | N | N | N | N | S |
| 110.75 | S | S | N | N | N | N | N | S | S | S | S | N | N | N | N | N | S |
| 111.00 | S | S | O | N | N | N | N | S | S | S | S | N | N | N | N | N | S |
| 111.25 | S | S | S | N | N | N | N | S | S | S | S | O | N | N | N | N | S |
| 111.50 | S | S | S | N | N | N | N | S | S | S | S | S | N | N | N | N | S |
| 111.75 | S | S | S | N | N | N | N | S | S | S | S | S | N | N | N | N | S |
| 112.00 | S | S | S | N | N | N | N | S | S | S | S | S | N | N | N | N | S |
| 112.25 | S | S | S | N | N | N | N | O | S | S | S | S | N | N | N | N | S |
| 112.50 | S | S | S | N | N | N | N | N | S | S | S | S | N | N | N | N | O |
| 112.75 | S | S | S | N | N | N | N | N | S | S | S | S | N | N | N | N | N |
| 113.00 | S | S | S | N | N | N | N | N | S | S | S | S | N | N | N | N | N |
| 113.25 | S | S | S | O | N | N | N | N | S | S | S | S | N | N | N | N | N |
| 113.50 | S | S | S | S | N | N | N | N | S | S | S | S | O | N | N | N | N |
| 113.75 | S | S | S | S | N | N | N | N | S | S | S | S | S | N | N | N | N |
| 114.00 | S | S | S | S | N | N | N | N | S | S | S | S | S | N | N | N | N |
| 114.25 | S | S | S | S | N | N | N | N | S | S | S | S | S | N | N | N | N |
| 114.50 | S | S | S | S | N | N | N | N | O | S | S | S | S | N | N | N | N |
| 114.75 | S | S | S | S | N | N | N | N | N | S | S | S | S | N | N | N | N |
| 115.00 | S | S | S | S | N | N | N | N | N | S | S | S | S | N | N | N | N |
| 115.25 | S | S | S | S | N | N | N | N | N | S | S | S | S | N | N | N | N |
| 115.50 | S | S | S | S | O | N | N | N | N | S | S | S | S | N | N | N | N |
| 115.75 | S | S | S | S | S | N | N | N | N | S | S | S | S | O | N | N | N |
| 116.00 | S | S | S | S | S | N | N | N | N | S | S | S | S | S | N | N | N |
| 116.25 | S | S | S | S | S | N | N | N | N | S | S | S | S | S | N | N | N |
| 116.50 | O | S | S | S | S | N | N | N | N | S | S | S | S | S | N | N | N |
| 116.75 | N | S | S | S | S | N | N | N | N | O | S | S | S | S | N | N | N |
| 117.00 | N | S | S | S | S | N | N | N | N | N | S | S | S | S | N | N | N |
| 117.25 | N | S | S | S | S | N | N | N | N | N | S | S | S | S | N | N | N |
| 117.50 | N | S | S | S | S | N | N | N | N | N | S | S | S | S | N | N | N |
| 117.75 | N | S | S | S | S | O | N | N | N | N | S | S | S | S | N | N | N |
| 118.00 | N | S | S | S | S | S | N | N | N | N | S | S | S | S | O | N | N |
| 118.25 | N | S | S | S | S | S | N | N | N | N | S | S | S | S | S | N | N |
| 118.50 | N | S | S | S | S | S | N | N | N | N | S | S | S | S | S | N | N |
| 118.75 | N | O | S | S | S | S | N | N | N | N | S | S | S | S | S | N | N |
| 119.00 | N | N | S | S | S | S | N | N | N | N | O | S | S | S | S | N | N |
| 119.25 | N | N | S | S | S | S | N | N | N | N | N | S | S | S | S | N | N |
| 119.50 | N | N | S | S | S | S | N | N | N | N | N | S | S | S | S | N | N |
| 119.75 | N | N | S | S | S | S | N | N | N | N | N | S | S | S | S | N | N |

Page Row 10, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 108.00 | S | S | N | N | N | N | S | S | S | S | S | N | N | N | N | S | S |
| 108.25 | S | S | N | N | N | N | O | S | S | S | S | N | N | N | N | S | S |
| 108.50 | S | S | N | N | N | N | N | S | S | S | S | N | N | N | N | O | S |
| 108.75 | S | S | N | N | N | N | N | S | S | S | S | N | N | N | N | N | S |
| 109.00 | S | S | N | N | N | N | N | S | S | S | S | N | N | N | N | N | S |
| 109.25 | S | S | O | N | N | N | N | S | S | S | S | N | N | N | N | N | S |
| 109.50 | S | S | S | N | N | N | N | S | S | S | S | O | N | N | N | N | S |
| 109.75 | S | S | S | N | N | N | N | S | S | S | S | S | N | N | N | N | S |
| 110.00 | S | S | S | N | N | N | N | S | S | S | S | S | N | N | N | N | S |
| 110.25 | S | S | S | N | N | N | N | S | S | S | S | S | N | N | N | N | S |
| 110.50 | S | S | S | N | N | N | N | O | S | S | S | S | N | N | N | N | S |
| 110.75 | S | S | S | N | N | N | N | N | S | S | S | S | N | N | N | N | O |
| 111.00 | S | S | S | N | N | N | N | N | S | S | S | S | N | N | N | N | N |
| 111.25 | S | S | S | N | N | N | N | N | S | S | S | S | N | N | N | N | N |
| 111.50 | S | S | S | O | N | N | N | N | S | S | S | S | N | N | N | N | N |
| 111.75 | S | S | S | S | N | N | N | N | S | S | S | S | O | N | N | N | N |
| 112.00 | S | S | S | S | N | N | N | N | S | S | S | S | S | N | N | N | N |
| 112.25 | S | S | S | S | N | N | N | N | S | S | S | S | S | N | N | N | N |
| 112.50 | S | S | S | S | N | N | N | N | S | S | S | S | S | N | N | N | N |
| 112.75 | S | S | S | S | N | N | N | N | O | S | S | S | S | N | N | N | N |
| 113.00 | S | S | S | S | N | N | N | N | N | S | S | S | S | N | N | N | N |
| 113.25 | S | S | S | S | N | N | N | N | N | S | S | S | S | N | N | N | N |
| 113.50 | S | S | S | S | N | N | N | N | N | S | S | S | S | N | N | N | N |
| 113.75 | S | S | S | S | O | N | N | N | N | S | S | S | S | N | N | N | N |
| 114.00 | S | S | S | S | S | N | N | N | N | S | S | S | S | O | N | N | N |
| 114.25 | S | S | S | S | S | N | N | N | N | S | S | S | S | S | N | N | N |
| 114.50 | S | S | S | S | S | N | N | N | N | S | S | S | S | S | N | N | N |
| 114.75 | O | S | S | S | S | N | N | N | N | S | S | S | S | S | N | N | N |
| 115.00 | N | S | S | S | S | N | N | N | N | O | S | S | S | S | N | N | N |
| 115.25 | N | S | S | S | S | N | N | N | N | N | S | S | S | S | N | N | N |
| 115.50 | N | S | S | S | S | N | N | N | N | N | S | S | S | S | N | N | N |
| 115.75 | N | S | S | S | S | N | N | N | N | N | S | S | S | S | N | N | N |
| 116.00 | N | S | S | S | S | O | N | N | N | N | S | S | S | S | N | N | N |
| 116.25 | N | S | S | S | S | S | N | N | N | N | S | S | S | S | O | N | N |

-continued

Coil Excitation

| | | | | | | | | | | | | | | | | | |
|---|---|---|---|---|---|---|---|---|---|---|---|---|---|---|---|---|---|
| 116.50 | N | S | S | S | S | S | N | N | N | N | S | S | S | S | S | N | N |
| 116.75 | N | S | S | S | S | S | N | N | N | N | S | S | S | S | S | N | N |
| 117.00 | N | O | S | S | S | S | N | N | N | N | S | S | S | S | S | N | N |
| 117.25 | N | N | S | S | S | S | N | N | N | N | O | S | S | S | S | N | N |
| 117.50 | N | N | S | S | S | S | N | N | N | N | N | S | S | S | S | N | N |
| 117.75 | N | N | S | S | S | S | N | N | N | N | N | S | S | S | S | N | N |
| 118.00 | N | N | S | S | S | S | N | N | N | N | N | S | S | S | S | N | N |
| 118.25 | N | N | S | S | S | S | O | N | N | N | N | S | S | S | S | N | N |
| 118.50 | N | N | S | S | S | S | S | N | N | N | N | S | S | S | S | O | N |
| 118.75 | N | N | S | S | S | S | S | N | N | N | N | S | S | S | S | S | N |
| 119.00 | N | N | S | S | S | S | S | N | N | N | N | S | S | S | S | S | N |
| 119.25 | N | N | O | S | S | S | S | N | N | N | N | S | S | S | S | S | N |
| 119.50 | N | N | N | S | S | S | S | N | N | N | N | O | S | S | S | S | N |
| 119.75 | N | N | N | S | S | S | S | N | N | N | N | N | S | S | S | S | N |

Page Row 10, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 108.00 | S | S | S | N | N | N | N | S | S | S | S | S | N | N | N | N | S |
| 108.25 | S | S | S | N | N | N | N | S | S | S | S | S | N | N | N | N | S |
| 108.50 | S | S | S | N | N | N | N | S | S | S | S | S | N | N | N | N | S |
| 108.75 | S | S | S | N | N | N | N | O | S | S | S | S | N | N | N | N | S |
| 109.00 | S | S | S | N | N | N | N | N | S | S | S | S | N | N | N | N | O |
| 109.25 | S | S | S | N | N | N | N | N | S | S | S | S | N | N | N | N | N |
| 109.50 | S | S | S | N | N | N | N | N | S | S | S | S | N | N | N | N | N |
| 109.75 | S | S | S | O | N | N | N | N | S | S | S | S | N | N | N | N | N |
| 110.00 | S | S | S | S | N | N | N | N | S | S | S | S | O | N | N | N | N |
| 110.25 | S | S | S | S | N | N | N | N | S | S | S | S | S | N | N | N | N |
| 110.50 | S | S | S | S | N | N | N | N | S | S | S | S | S | N | N | N | N |
| 110.75 | S | S | S | S | N | N | N | N | S | S | S | S | S | N | N | N | N |
| 111.00 | S | S | S | S | N | N | N | N | O | S | S | S | S | N | N | N | N |
| 111.25 | S | S | S | S | N | N | N | N | N | S | S | S | S | N | N | N | N |
| 111.50 | S | S | S | S | N | N | N | N | N | S | S | S | S | N | N | N | N |
| 111.75 | S | S | S | S | N | N | N | N | N | S | S | S | S | N | N | N | N |
| 112.00 | S | S | S | S | O | N | N | N | N | S | S | S | S | N | N | N | N |
| 112.25 | S | S | S | S | S | N | N | N | N | S | S | S | S | O | N | N | N |
| 112.50 | S | S | S | S | S | N | N | N | N | S | S | S | S | S | N | N | N |
| 112.75 | S | S | S | S | S | N | N | N | N | S | S | S | S | S | N | N | N |
| 113.00 | O | S | S | S | S | N | N | N | N | S | S | S | S | S | N | N | N |
| 113.25 | N | S | S | S | S | N | N | N | N | O | S | S | S | S | N | N | N |
| 113.50 | N | S | S | S | S | N | N | N | N | N | S | S | S | S | N | N | N |
| 113.75 | N | S | S | S | S | N | N | N | N | N | S | S | S | S | N | N | N |
| 114.00 | N | S | S | S | S | N | N | N | N | N | S | S | S | S | N | N | N |
| 114.25 | N | S | S | S | S | O | N | N | N | N | S | S | S | S | N | N | N |
| 114.50 | N | S | S | S | S | S | N | N | N | N | S | S | S | S | O | N | N |
| 114.75 | N | S | S | S | S | S | N | N | N | N | S | S | S | S | S | N | N |
| 115.00 | N | S | S | S | S | S | N | N | N | N | S | S | S | S | S | N | N |
| 115.25 | N | O | S | S | S | S | N | N | N | N | S | S | S | S | S | N | N |
| 115.50 | N | N | S | S | S | S | N | N | N | N | O | S | S | S | S | N | N |
| 115.75 | N | N | S | S | S | S | N | N | N | N | N | S | S | S | S | N | N |
| 116.00 | N | N | S | S | S | S | N | N | N | N | N | S | S | S | S | N | N |
| 116.25 | N | N | S | S | S | S | N | N | N | N | N | S | S | S | S | N | N |
| 116.50 | N | N | S | S | S | S | O | N | N | N | N | S | S | S | S | N | N |
| 116.75 | N | N | S | S | S | S | S | N | N | N | N | S | S | S | S | O | N |
| 117.00 | N | N | S | S | S | S | S | N | N | N | N | S | S | S | S | S | N |
| 117.25 | N | N | S | S | S | S | S | N | N | N | N | S | S | S | S | S | N |
| 117.50 | N | N | O | S | S | S | S | N | N | N | N | S | S | S | S | S | N |
| 117.75 | N | N | N | S | S | S | S | N | N | N | N | O | S | S | S | S | N |
| 118.00 | N | N | N | S | S | S | S | N | N | N | N | N | S | S | S | S | N |
| 118.25 | N | N | N | S | S | S | S | N | N | N | N | N | S | S | S | S | N |
| 118.50 | N | N | N | S | S | S | S | N | N | N | N | N | S | S | S | S | N |
| 118.75 | N | N | N | S | S | S | S | O | N | N | N | N | S | S | S | S | N |
| 119.00 | N | N | N | S | S | S | S | S | N | N | N | N | S | S | S | S | O |
| 119.25 | N | N | N | S | S | S | S | S | N | N | N | N | S | S | S | S | S |
| 119.50 | N | N | N | S | S | S | S | S | N | N | N | N | S | S | S | S | S |
| 119.75 | N | N | N | O | S | S | S | S | N | N | N | N | S | S | S | S | S |

Page Row 10, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 108.00 | S | S | S | O | N | N | N | N | S | S | S | S | N | N | N | N | N |
| 108.25 | S | S | S | S | N | N | N | N | S | S | S | S | O | N | N | N | N |
| 108.50 | S | S | S | S | N | N | N | N | S | S | S | S | S | N | N | N | N |
| 108.75 | S | S | S | S | N | N | N | N | S | S | S | S | S | N | N | N | N |
| 109.00 | S | S | S | S | N | N | N | N | S | S | S | S | S | N | N | N | N |
| 109.25 | S | S | S | S | N | N | N | N | O | S | S | S | S | N | N | N | N |
| 109.50 | S | S | S | S | N | N | N | N | N | S | S | S | S | N | N | N | N |

-continued

| Coil Excitation | | | | | | | | | | | | | | | | | |
|---|---|---|---|---|---|---|---|---|---|---|---|---|---|---|---|---|---|
| 109.75 | S | S | S | S | N | N | N | N | N | S | S | S | S | N | N | N | N |
| 110.00 | S | S | S | S | N | N | N | N | N | S | S | S | S | N | N | N | N |
| 110.25 | S | S | S | S | O | N | N | N | N | S | S | S | S | N | N | N | N |
| 110.50 | S | S | S | S | S | N | N | N | N | S | S | S | S | O | N | N | N |
| 110.75 | S | S | S | S | S | N | N | N | N | S | S | S | S | S | N | N | N |
| 111.00 | S | S | S | S | S | N | N | N | N | S | S | S | S | S | N | N | N |
| 111.25 | O | S | S | S | S | N | N | N | N | S | S | S | S | S | N | N | N |
| 111.50 | N | S | S | S | S | N | N | N | N | O | S | S | S | S | N | N | N |
| 111.75 | N | S | S | S | S | N | N | N | N | N | S | S | S | S | N | N | N |
| 112.00 | N | S | S | S | S | N | N | N | N | N | S | S | S | S | N | N | N |
| 112.25 | N | S | S | S | S | N | N | N | N | N | S | S | S | S | N | N | N |
| 112.50 | N | S | S | S | S | O | N | N | N | N | S | S | S | S | N | N | N |
| 112.75 | N | S | S | S | S | S | N | N | N | N | S | S | S | S | O | N | N |
| 113.00 | N | S | S | S | S | S | N | N | N | N | S | S | S | S | S | N | N |
| 113.25 | N | S | S | S | S | S | N | N | N | N | S | S | S | S | S | N | N |
| 113.50 | N | O | S | S | S | S | N | N | N | N | S | S | S | S | S | N | N |
| 113.75 | N | N | S | S | S | S | N | N | N | N | O | S | S | S | S | N | N |
| 114.00 | N | N | S | S | S | S | N | N | N | N | N | S | S | S | S | N | N |
| 114.25 | N | N | S | S | S | S | N | N | N | N | N | S | S | S | S | N | N |
| 114.50 | N | N | S | S | S | S | N | N | N | N | N | S | S | S | S | N | N |
| 114.75 | N | N | S | S | S | S | O | N | N | N | N | S | S | S | S | N | N |
| 115.00 | N | N | S | S | S | S | S | N | N | N | N | S | S | S | S | O | N |
| 115.25 | N | N | S | S | S | S | S | N | N | N | N | S | S | S | S | S | N |
| 115.50 | N | N | S | S | S | S | S | N | N | N | N | S | S | S | S | S | N |
| 115.75 | N | N | O | S | S | S | S | N | N | N | N | S | S | S | S | S | N |
| 116.00 | N | N | N | S | S | S | S | N | N | N | N | O | S | S | S | S | N |
| 116.25 | N | N | N | S | S | S | S | N | N | N | N | N | S | S | S | S | N |
| 116.50 | N | N | N | S | S | S | S | N | N | N | N | N | S | S | S | S | N |
| 116.75 | N | N | N | S | S | S | S | N | N | N | N | N | S | S | S | S | N |
| 117.00 | N | N | N | S | S | S | S | O | N | N | N | N | S | S | S | S | N |
| 117.25 | N | N | N | S | S | S | S | S | N | N | N | N | S | S | S | S | O |
| 117.50 | N | N | N | S | S | S | S | S | N | N | N | N | S | S | S | S | S |
| 117.75 | N | N | N | S | S | S | S | S | N | N | N | N | S | S | S | S | S |
| 118.00 | N | N | N | O | S | S | S | S | N | N | N | N | S | S | S | S | S |
| 118.25 | N | N | N | N | S | S | S | S | N | N | N | N | O | S | S | S | S |
| 118.50 | N | N | N | N | S | S | S | S | N | N | N | N | N | S | S | S | S |
| 118.75 | N | N | N | N | S | S | S | S | N | N | N | N | N | S | S | S | S |
| 119.00 | N | N | N | N | S | S | S | S | N | N | N | N | N | S | S | S | S |
| 119.25 | N | N | N | N | S | S | S | S | O | N | N | N | N | S | S | S | S |
| 119.50 | N | N | N | N | S | S | S | S | S | N | N | N | N | S | S | S | S |
| 119.75 | N | N | N | N | S | S | S | S | S | N | N | N | N | S | S | S | S |

Page Row 10, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 108.00 | S | S | S | S | N | N | N | N | N | S | S | S | S | N | N | N | N |
| 108.25 | S | S | S | S | N | N | N | N | N | S | S | S | S | N | N | N | N |
| 108.50 | S | S | S | S | O | N | N | N | N | S | S | S | S | N | N | N | N |
| 108.75 | S | S | S | S | S | N | N | N | N | S | S | S | S | O | N | N | N |
| 109.00 | S | S | S | S | S | N | N | N | N | S | S | S | S | S | N | N | N |
| 109.25 | S | S | S | S | S | N | N | N | N | S | S | S | S | S | N | N | N |
| 109.50 | O | S | S | S | S | N | N | N | N | S | S | S | S | S | N | N | N |
| 109.75 | N | S | S | S | S | N | N | N | N | O | S | S | S | S | N | N | N |
| 110.00 | N | S | S | S | S | N | N | N | N | N | S | S | S | S | N | N | N |
| 110.25 | N | S | S | S | S | N | N | N | N | N | S | S | S | S | N | N | N |
| 110.50 | N | S | S | S | S | N | N | N | N | N | S | S | S | S | N | N | N |
| 110.75 | N | S | S | S | S | O | N | N | N | N | S | S | S | S | N | N | N |
| 111.00 | N | S | S | S | S | S | N | N | N | N | S | S | S | S | O | N | N |
| 111.25 | N | S | S | S | S | S | N | N | N | N | S | S | S | S | S | N | N |
| 111.50 | N | S | S | S | S | S | N | N | N | N | S | S | S | S | S | N | N |
| 111.75 | N | O | S | S | S | S | N | N | N | N | S | S | S | S | S | N | N |
| 112.00 | N | N | S | S | S | S | N | N | N | N | O | S | S | S | S | N | N |
| 112.25 | N | N | S | S | S | S | N | N | N | N | N | S | S | S | S | N | N |
| 112.50 | N | N | S | S | S | S | N | N | N | N | N | S | S | S | S | N | N |
| 112.75 | N | N | S | S | S | S | N | N | N | N | N | S | S | S | S | N | N |
| 113.00 | N | N | S | S | S | S | O | N | N | N | N | S | S | S | S | N | N |
| 113.25 | N | N | S | S | S | S | S | N | N | N | N | S | S | S | S | O | N |
| 113.50 | N | N | S | S | S | S | S | N | N | N | N | S | S | S | S | S | N |
| 113.75 | N | N | S | S | S | S | S | N | N | N | N | S | S | S | S | S | N |
| 114.00 | N | N | O | S | S | S | S | N | N | N | N | S | S | S | S | S | N |
| 114.25 | N | N | N | S | S | S | S | N | N | N | N | O | S | S | S | S | N |
| 114.50 | N | N | N | S | S | S | S | N | N | N | N | N | S | S | S | S | N |
| 114.75 | N | N | N | S | S | S | S | N | N | N | N | N | S | S | S | S | N |
| 115.00 | N | N | N | S | S | S | S | N | N | N | N | N | S | S | S | S | N |
| 115.25 | N | N | N | S | S | S | S | O | N | N | N | N | S | S | S | S | N |
| 115.50 | N | N | N | S | S | S | S | S | N | N | N | N | S | S | S | S | O |
| 115.75 | N | N | N | S | S | S | S | S | N | N | N | N | S | S | S | S | S |

-continued

Coil Excitation

| | | | | | | | | | | | | | | | | | |
|---|---|---|---|---|---|---|---|---|---|---|---|---|---|---|---|---|---|
| 116.00 | N | N | N | S | S | S | S | S | N | N | N | N | S | S | S | S | S |
| 116.25 | N | N | N | O | S | S | S | S | N | N | N | N | S | S | S | S | S |
| 116.50 | N | N | N | N | S | S | S | S | N | N | N | N | O | S | S | S | S |
| 116.75 | N | N | N | N | S | S | S | S | N | N | N | N | N | S | S | S | S |
| 117.00 | N | N | N | N | S | S | S | S | N | N | N | N | N | S | S | S | S |
| 117.25 | N | N | N | N | S | S | S | S | N | N | N | N | N | S | S | S | S |
| 117.50 | N | N | N | N | S | S | S | S | O | N | N | N | N | S | S | S | S |
| 117.75 | N | N | N | N | S | S | S | S | S | N | N | N | N | S | S | S | S |
| 118.00 | N | N | N | N | S | S | S | S | S | N | N | N | N | S | S | S | S |
| 118.25 | N | N | N | N | S | S | S | S | S | N | N | N | N | S | S | S | S |
| 118.50 | N | N | N | N | O | S | S | S | S | N | N | N | N | S | S | S | S |
| 118.75 | N | N | N | N | N | S | S | S | S | N | N | N | N | O | S | S | S |
| 119.00 | N | N | N | N | N | S | S | S | S | N | N | N | N | N | S | S | S |
| 119.25 | N | N | N | N | N | S | S | S | S | N | N | N | N | N | S | S | S |
| 119.50 | O | N | N | N | N | S | S | S | S | N | N | N | N | N | S | S | S |
| 119.75 | S | N | N | N | N | S | S | S | S | O | N | N | N | N | S | S | S |

Page Row 10, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 108.00 | N | S | S | S | S | N | N | N | N | O | S | S | S | S | N | N | N |
| 108.25 | N | S | S | S | S | N | N | N | N | N | S | S | S | S | N | N | N |
| 108.50 | N | S | S | S | S | N | N | N | N | N | S | S | S | S | N | N | N |
| 108.75 | N | S | S | S | S | N | N | N | N | N | S | S | S | S | N | N | N |
| 109.00 | N | S | S | S | S | O | N | N | N | N | S | S | S | S | N | N | N |
| 109.25 | N | S | S | S | S | S | N | N | N | N | S | S | S | S | O | N | N |
| 109.50 | N | S | S | S | S | S | N | N | N | N | S | S | S | S | S | N | N |
| 109.75 | N | S | S | S | S | S | N | N | N | N | S | S | S | S | S | N | N |
| 110.00 | N | O | S | S | S | S | N | N | N | N | S | S | S | S | S | N | N |
| 110.25 | N | N | S | S | S | S | N | N | N | N | O | S | S | S | S | N | N |
| 110.50 | N | N | S | S | S | S | N | N | N | N | N | S | S | S | S | N | N |
| 110.75 | N | N | S | S | S | S | N | N | N | N | N | S | S | S | S | N | N |
| 111.00 | N | N | S | S | S | S | N | N | N | N | N | S | S | S | S | N | N |
| 111.25 | N | N | S | S | S | S | O | N | N | N | N | S | S | S | S | N | N |
| 111.50 | N | N | S | S | S | S | S | N | N | N | N | S | S | S | S | O | N |
| 111.75 | N | N | S | S | S | S | S | N | N | N | N | S | S | S | S | S | N |
| 112.00 | N | N | S | S | S | S | S | N | N | N | N | S | S | S | S | S | N |
| 112.25 | N | N | O | S | S | S | S | N | N | N | N | S | S | S | S | S | N |
| 112.50 | N | N | N | S | S | S | S | N | N | N | N | O | S | S | S | S | N |
| 112.75 | N | N | N | S | S | S | S | N | N | N | N | N | S | S | S | S | N |
| 113.00 | N | N | N | S | S | S | S | N | N | N | N | N | S | S | S | S | N |
| 113.25 | N | N | N | S | S | S | S | N | N | N | N | N | S | S | S | S | N |
| 113.50 | N | N | N | S | S | S | S | O | N | N | N | N | S | S | S | S | N |
| 113.75 | N | N | N | S | S | S | S | S | N | N | N | N | S | S | S | S | O |
| 114.00 | N | N | N | S | S | S | S | S | N | N | N | N | S | S | S | S | S |
| 114.25 | N | N | N | S | S | S | S | S | N | N | N | N | S | S | S | S | S |
| 114.50 | N | N | N | O | S | S | S | S | N | N | N | N | S | S | S | S | S |
| 114.75 | N | N | N | N | S | S | S | S | N | N | N | N | O | S | S | S | S |
| 115.00 | N | N | N | N | S | S | S | S | N | N | N | N | N | S | S | S | S |
| 115.25 | N | N | N | N | S | S | S | S | N | N | N | N | N | S | S | S | S |
| 115.50 | N | N | N | N | S | S | S | S | N | N | N | N | N | S | S | S | S |
| 115.75 | N | N | N | N | S | S | S | S | O | N | N | N | N | S | S | S | S |
| 116.00 | N | N | N | N | S | S | S | S | S | N | N | N | N | S | S | S | S |
| 116.25 | N | N | N | N | S | S | S | S | S | N | N | N | N | S | S | S | S |
| 116.50 | N | N | N | N | S | S | S | S | S | N | N | N | N | S | S | S | S |
| 116.75 | N | N | N | N | O | S | S | S | S | N | N | N | N | S | S | S | S |
| 117.00 | N | N | N | N | N | S | S | S | S | N | N | N | N | O | S | S | S |
| 117.25 | N | N | N | N | N | S | S | S | S | N | N | N | N | N | S | S | S |
| 117.50 | N | N | N | N | N | S | S | S | S | N | N | N | N | N | S | S | S |
| 117.75 | O | N | N | N | N | S | S | S | S | N | N | N | N | N | S | S | S |
| 118.00 | S | N | N | N | N | S | S | S | S | O | N | N | N | N | S | S | S |
| 118.25 | S | N | N | N | N | S | S | S | S | S | N | N | N | N | S | S | S |
| 118.50 | S | N | N | N | N | S | S | S | S | S | N | N | N | N | S | S | S |
| 118.75 | S | N | N | N | N | S | S | S | S | S | N | N | N | N | S | S | S |
| 119.00 | S | N | N | N | N | O | S | S | S | S | N | N | N | N | S | S | S |
| 119.25 | S | N | N | N | N | N | S | S | S | S | N | N | N | N | O | S | S |
| 119.50 | S | N | N | N | N | N | S | S | S | S | N | N | N | N | N | S | S |
| 119.75 | S | N | N | N | N | N | S | S | S | S | N | N | N | N | N | S | S |

Page Row 10, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 108.00 | N | S | S | S | S | S | N | N | N | N | S | S | S | S | S | N | N |
| 108.25 | N | O | S | S | S | S | N | N | N | N | S | S | S | S | S | N | N |
| 108.50 | N | N | S | S | S | S | N | N | N | N | O | S | S | S | S | N | N |
| 108.75 | N | N | S | S | S | S | N | N | N | N | N | S | S | S | S | N | N |
| 109.00 | N | N | S | S | S | S | N | N | N | N | N | S | S | S | S | N | N |

-continued

| Coil Excitation | | | | | | | | | | | | | | | | | |
|---|---|---|---|---|---|---|---|---|---|---|---|---|---|---|---|---|---|
| 109.25 | N | N | S | S | S | S | N | N | N | N | N | S | S | S | S | N | N |
| 109.50 | N | N | S | S | S | S | O | N | N | N | N | S | S | S | S | N | N |
| 109.75 | N | N | S | S | S | S | S | N | N | N | N | S | S | S | S | O | N |
| 110.00 | N | N | S | S | S | S | S | N | N | N | N | S | S | S | S | S | N |
| 110.25 | N | N | S | S | S | S | S | N | N | N | N | S | S | S | S | S | N |
| 110.50 | N | N | O | S | S | S | S | N | N | N | N | S | S | S | S | S | N |
| 110.75 | N | N | N | S | S | S | S | N | N | N | N | O | S | S | S | S | N |
| 111.00 | N | N | N | S | S | S | S | N | N | N | N | N | S | S | S | S | N |
| 111.25 | N | N | N | S | S | S | S | N | N | N | N | N | S | S | S | S | N |
| 111.50 | N | N | N | S | S | S | S | N | N | N | N | N | S | S | S | S | N |
| 111.75 | N | N | N | S | S | S | S | O | N | N | N | N | S | S | S | S | N |
| 112.00 | N | N | N | S | S | S | S | S | N | N | N | N | S | S | S | S | O |
| 112.25 | N | N | N | S | S | S | S | S | N | N | N | N | S | S | S | S | S |
| 112.50 | N | N | N | S | S | S | S | S | N | N | N | N | S | S | S | S | S |
| 112.75 | N | N | N | O | S | S | S | S | N | N | N | N | S | S | S | S | S |
| 113.00 | N | N | N | N | S | S | S | S | N | N | N | N | O | S | S | S | S |
| 113.25 | N | N | N | N | S | S | S | S | N | N | N | N | N | S | S | S | S |
| 113.50 | N | N | N | N | S | S | S | S | N | N | N | N | N | S | S | S | S |
| 113.75 | N | N | N | N | S | S | S | S | N | N | N | N | N | S | S | S | S |
| 114.00 | N | N | N | N | S | S | S | S | O | N | N | N | N | S | S | S | S |
| 114.25 | N | N | N | N | S | S | S | S | S | N | N | N | N | S | S | S | S |
| 114.50 | N | N | N | N | S | S | S | S | S | N | N | N | N | S | S | S | S |
| 114.75 | N | N | N | N | S | S | S | S | S | N | N | N | N | S | S | S | S |
| 115.00 | N | N | N | N | O | S | S | S | S | N | N | N | N | S | S | S | S |
| 115.25 | N | N | N | N | N | S | S | S | S | N | N | N | N | O | S | S | S |
| 115.50 | N | N | N | N | N | S | S | S | S | N | N | N | N | N | S | S | S |
| 115.75 | N | N | N | N | N | S | S | S | S | N | N | N | N | N | S | S | S |
| 116.00 | O | N | N | N | N | S | S | S | S | N | N | N | N | N | S | S | S |
| 116.25 | S | N | N | N | N | S | S | S | S | O | N | N | N | N | S | S | S |
| 116.50 | S | N | N | N | N | S | S | S | S | S | N | N | N | N | S | S | S |
| 116.75 | S | N | N | N | N | S | S | S | S | S | N | N | N | N | S | S | S |
| 117.00 | S | N | N | N | N | S | S | S | S | S | N | N | N | N | S | S | S |
| 117.25 | S | N | N | N | N | O | S | S | S | S | N | N | N | N | S | S | S |
| 117.50 | S | N | N | N | N | N | S | S | S | S | N | N | N | N | O | S | S |
| 117.75 | S | N | N | N | N | N | S | S | S | S | N | N | N | N | N | S | S |
| 118.00 | S | N | N | N | N | N | S | S | S | S | N | N | N | N | N | S | S |
| 118.25 | S | O | N | N | N | N | S | S | S | S | N | N | N | N | N | S | S |
| 118.50 | S | S | N | N | N | N | S | S | S | S | O | N | N | N | N | S | S |
| 118.75 | S | S | N | N | N | N | S | S | S | S | S | N | N | N | N | S | S |
| 119.00 | S | S | N | N | N | N | S | S | S | S | S | N | N | N | N | S | S |
| 119.25 | S | S | N | N | N | N | S | S | S | S | S | N | N | N | N | S | S |
| 119.50 | S | S | N | N | N | N | O | S | S | S | S | N | N | N | N | S | S |
| 119.75 | S | S | N | N | N | N | N | S | S | S | S | N | N | N | N | O | S |

Page Row 10, Page Column 9

| Coil | 154 | 155 | 156 | 157 | 158 | 159 | 160 |
|---|---|---|---|---|---|---|---|
| 108.00 | N | N | S | S | S | S | S |
| 108.25 | N | N | S | S | S | S | S |
| 108.50 | N | N | S | S | S | S | S |
| 108.75 | N | N | O | S | S | S | S |
| 109.00 | N | N | N | S | S | S | S |
| 109.25 | N | N | N | S | S | S | S |
| 109.50 | N | N | N | S | S | S | S |
| 109.75 | N | N | N | S | S | S | S |
| 110.00 | N | N | N | S | S | S | S |
| 110.25 | N | N | N | S | S | S | S |
| 110.50 | N | N | N | S | S | S | S |
| 110.75 | N | N | N | S | S | S | S |
| 111.00 | N | N | N | O | S | S | S |
| 111.25 | N | N | N | N | S | S | S |
| 111.50 | N | N | N | N | S | S | S |
| 111.75 | N | N | N | N | S | S | S |
| 112.00 | N | N | N | N | S | S | S |
| 112.25 | N | N | N | N | S | S | S |
| 112.50 | N | N | N | N | S | S | S |
| 112.75 | N | N | N | N | S | S | S |
| 113.00 | N | N | N | N | S | S | S |
| 113.25 | N | N | N | N | O | S | S |
| 113.50 | N | N | N | N | N | S | S |
| 113.75 | N | N | N | N | N | S | S |
| 114.00 | N | N | N | N | N | S | S |
| 114.25 | O | N | N | N | N | S | S |
| 114.50 | S | N | N | N | N | S | S |
| 114.75 | S | N | N | N | N | S | S |
| 115.00 | S | N | N | N | N | S | S |
| 115.25 | S | N | N | N | N | S | S |

-continued

| Coil Excitation | | | | | | | |
|---|---|---|---|---|---|---|---|
| 115.50 | S | N | N | N | N | O | S |
| 115.75 | S | N | N | N | N | N | S |
| 116.00 | S | N | N | N | N | N | S |
| 116.25 | S | N | N | N | N | N | S |
| 116.50 | S | O | N | N | N | N | S |
| 116.75 | S | S | N | N | N | N | S |
| 117.00 | S | S | N | N | N | N | S |
| 117.25 | S | S | N | N | N | N | S |
| 117.50 | S | S | N | N | N | N | S |
| 117.75 | S | S | N | N | N | N | O |
| 118.00 | S | S | N | N | N | N | N |
| 118.25 | S | S | N | N | N | N | N |
| 118.50 | S | S | N | N | N | N | N |
| 118.75 | S | S | O | N | N | N | N |
| 119.00 | S | S | S | N | N | N | N |
| 119.25 | S | S | S | N | N | N | N |
| 119.50 | S | S | S | N | N | N | N |
| 119.75 | S | S | S | N | N | N | N |

Page Row 10, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 120.00 | O | S | S | S | S | N | N | N | N | S | S | S | S | S | N | N | N |
| 120.25 | N | S | S | S | S | N | N | N | N | O | S | S | S | S | N | N | N |
| 120.50 | N | S | S | S | S | N | N | N | N | N | S | S | S | S | N | N | N |
| 120.75 | N | S | S | S | S | N | N | N | N | N | S | S | S | S | N | N | N |
| 121.00 | N | S | S | S | S | N | N | N | N | N | S | S | S | S | N | N | N |
| 121.25 | N | S | S | S | S | O | N | N | N | N | S | S | S | S | N | N | N |
| 121.50 | N | S | S | S | S | S | N | N | N | N | S | S | S | S | O | N | N |
| 121.75 | N | S | S | S | S | S | N | N | N | N | S | S | S | S | S | N | N |
| 122.00 | N | S | S | S | S | S | N | N | N | N | S | S | S | S | S | N | N |
| 122.25 | N | O | S | S | S | S | N | N | N | N | S | S | S | S | S | N | N |
| 122.50 | N | N | S | S | S | S | N | N | N | N | O | S | S | S | S | N | N |
| 122.75 | N | N | S | S | S | S | N | N | N | N | N | S | S | S | S | N | N |
| 123.00 | N | N | S | S | S | S | N | N | N | N | N | S | S | S | S | N | N |
| 123.25 | N | N | S | S | S | S | N | N | N | N | N | S | S | S | S | N | N |
| 123.50 | N | N | S | S | S | S | O | N | N | N | N | S | S | S | S | N | N |
| 123.75 | N | N | S | S | S | S | S | N | N | N | N | S | S | S | S | O | N |
| 124.00 | N | N | S | S | S | S | S | N | N | N | N | S | S | S | S | S | N |
| 124.25 | N | N | S | S | S | S | S | N | N | N | N | S | S | S | S | S | N |
| 124.50 | N | N | O | S | S | S | S | N | N | N | N | S | S | S | S | S | N |
| 124.75 | N | N | N | S | S | S | S | N | N | N | N | O | S | S | S | S | N |
| 125.00 | N | N | N | S | S | S | S | N | N | N | N | N | S | S | S | S | N |
| 125.25 | N | N | N | S | S | S | S | N | N | N | N | N | S | S | S | S | N |
| 125.50 | N | N | N | S | S | S | S | N | N | N | N | N | S | S | S | S | N |
| 125.75 | N | N | N | S | S | S | S | O | N | N | N | N | S | S | S | S | N |
| 126.00 | N | N | N | S | S | S | S | S | N | N | N | N | S | S | S | S | O |
| 126.25 | N | N | N | S | S | S | S | S | N | N | N | N | S | S | S | S | S |
| 126.50 | N | N | N | S | S | S | S | S | N | N | N | N | S | S | S | S | S |
| 126.75 | N | N | N | O | S | S | S | S | N | N | N | N | S | S | S | S | S |
| 127.00 | N | N | N | N | S | S | S | S | N | N | N | N | O | S | S | S | S |
| 127.25 | N | N | N | N | S | S | S | S | N | N | N | N | N | S | S | S | S |
| 127.50 | N | N | N | N | S | S | S | S | N | N | N | N | N | S | S | S | S |
| 127.75 | N | N | N | N | S | S | S | S | N | N | N | N | N | S | S | S | S |
| 128.00 | N | N | N | N | S | S | S | S | O | N | N | N | N | S | S | S | S |
| 128.25 | N | N | N | N | S | S | S | S | S | N | N | N | N | S | S | S | S |
| 128.50 | N | N | N | N | S | S | S | S | S | N | N | N | N | S | S | S | S |
| 128.75 | N | N | N | N | S | S | S | S | S | N | N | N | N | S | S | S | S |
| 129.00 | N | N | N | N | O | S | S | S | S | N | N | N | N | S | S | S | S |
| 129.25 | N | N | N | N | N | S | S | S | S | N | N | N | N | O | S | S | S |
| 129.50 | N | N | N | N | N | S | S | S | S | N | N | N | N | N | S | S | S |
| 129.75 | N | N | N | N | N | S | S | S | S | N | N | N | N | N | S | S | S |
| 130.00 | O | N | N | N | N | S | S | S | S | N | N | N | N | N | S | S | S |
| 130.25 | S | N | N | N | N | S | S | S | S | O | N | N | N | N | S | S | S |
| 130.50 | S | N | N | N | N | S | S | S | S | S | N | N | N | N | S | S | S |
| 130.75 | S | N | N | N | N | S | S | S | S | S | N | N | N | N | S | S | S |
| 131.00 | S | N | N | N | N | S | S | S | S | S | N | N | N | N | S | S | S |
| 131.25 | S | N | N | N | N | O | S | S | S | S | N | N | N | N | S | S | S |
| 131.50 | S | N | N | N | N | N | S | S | S | S | N | N | N | N | O | S | S |
| 131.75 | S | N | N | N | N | N | S | S | S | S | N | N | N | N | N | S | S |

Page Row 11, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 120.00 | N | S | S | S | S | S | N | N | N | N | S | S | S | S | S | N | N |
| 120.25 | N | S | S | S | S | S | N | N | N | N | S | S | S | S | S | N | N |
| 120.50 | N | O | S | S | S | S | N | N | N | N | S | S | S | S | S | N | N |

-continued

Coil Excitation

| | | | | | | | | | | | | | | | | | |
|---|---|---|---|---|---|---|---|---|---|---|---|---|---|---|---|---|---|
| 120.75 | N | N | S | S | S | S | N | N | N | N | O | S | S | S | S | N | N |
| 121.00 | N | N | S | S | S | S | N | N | N | N | N | S | S | S | S | N | N |
| 121.25 | N | N | S | S | S | S | N | N | N | N | N | S | S | S | S | N | N |
| 121.50 | N | N | S | S | S | S | N | N | N | N | N | S | S | S | S | N | N |
| 121.75 | N | N | S | S | S | S | O | N | N | N | N | S | S | S | S | N | N |
| 122.00 | N | N | S | S | S | S | S | N | N | N | N | S | S | S | S | O | N |
| 122.25 | N | N | S | S | S | S | S | N | N | N | N | S | S | S | S | S | N |
| 122.50 | N | N | S | S | S | S | S | N | N | N | N | S | S | S | S | S | N |
| 122.75 | N | N | O | S | S | S | S | N | N | N | N | S | S | S | S | S | N |
| 123.00 | N | N | N | S | S | S | S | N | N | N | N | O | S | S | S | S | N |
| 123.25 | N | N | N | S | S | S | S | N | N | N | N | N | S | S | S | S | N |
| 123.50 | N | N | N | S | S | S | S | N | N | N | N | N | S | S | S | S | N |
| 123.75 | N | N | N | S | S | S | S | N | N | N | N | N | S | S | S | S | N |
| 124.00 | N | N | N | S | S | S | S | O | N | N | N | N | S | S | S | S | N |
| 124.25 | N | N | N | S | S | S | S | S | N | N | N | N | S | S | S | S | O |
| 124.50 | N | N | N | S | S | S | S | S | N | N | N | N | S | S | S | S | S |
| 124.75 | N | N | N | S | S | S | S | S | N | N | N | N | S | S | S | S | S |
| 125.00 | N | N | N | O | S | S | S | S | N | N | N | N | S | S | S | S | S |
| 125.25 | N | N | N | N | S | S | S | S | N | N | N | N | O | S | S | S | S |
| 125.50 | N | N | N | N | S | S | S | S | N | N | N | N | N | S | S | S | S |
| 125.75 | N | N | N | N | S | S | S | S | N | N | N | N | N | S | S | S | S |
| 126.00 | N | N | N | N | S | S | S | S | N | N | N | N | N | S | S | S | S |
| 126.25 | N | N | N | N | S | S | S | S | O | N | N | N | N | S | S | S | S |
| 126.50 | N | N | N | N | S | S | S | S | S | N | N | N | N | S | S | S | S |
| 126.75 | N | N | N | N | S | S | S | S | S | N | N | N | N | S | S | S | S |
| 127.00 | N | N | N | N | S | S | S | S | S | N | N | N | N | S | S | S | S |
| 127.25 | N | N | N | N | O | S | S | S | S | N | N | N | N | S | S | S | S |
| 127.50 | N | N | N | N | N | S | S | S | S | N | N | N | N | O | S | S | S |
| 127.75 | N | N | N | N | N | S | S | S | S | N | N | N | N | N | S | S | S |
| 128.00 | N | N | N | N | N | S | S | S | S | N | N | N | N | N | S | S | S |
| 128.25 | O | N | N | N | N | S | S | S | S | N | N | N | N | N | S | S | S |
| 128.50 | S | N | N | N | N | S | S | S | S | O | N | N | N | N | S | S | S |
| 128.75 | S | N | N | N | N | S | S | S | S | S | N | N | N | N | S | S | S |
| 129.00 | S | N | N | N | N | S | S | S | S | S | N | N | N | N | S | S | S |
| 129.25 | S | N | N | N | N | S | S | S | S | S | N | N | N | N | S | S | S |
| 129.50 | S | N | N | N | N | O | S | S | S | S | N | N | N | N | S | S | S |
| 129.75 | S | N | N | N | N | N | S | S | S | S | N | N | N | N | O | S | S |
| 130.00 | S | N | N | N | N | N | S | S | S | S | N | N | N | N | N | S | S |
| 130.25 | S | N | N | N | N | N | S | S | S | S | N | N | N | N | N | S | S |
| 130.50 | S | O | N | N | N | N | S | S | S | S | N | N | N | N | N | S | S |
| 130.75 | S | S | N | N | N | N | S | S | S | S | O | N | N | N | N | S | S |
| 131.00 | S | S | N | N | N | N | S | S | S | S | S | N | N | N | N | S | S |
| 131.25 | S | S | N | N | N | N | S | S | S | S | S | N | N | N | N | S | S |
| 131.50 | S | S | N | N | N | N | S | S | S | S | S | N | N | N | N | S | S |
| 131.75 | S | S | N | N | N | N | O | S | S | S | S | N | N | N | N | S | S |

Page Row 11, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 120.00 | N | N | S | S | S | S | O | N | N | N | N | S | S | S | S | N | N |
| 120.25 | N | N | S | S | S | S | S | N | N | N | N | S | S | S | S | O | N |
| 120.50 | N | N | S | S | S | S | S | N | N | N | N | S | S | S | S | S | N |
| 120.75 | N | N | S | S | S | S | S | N | N | N | N | S | S | S | S | S | N |
| 121.00 | N | N | O | S | S | S | S | N | N | N | N | S | S | S | S | S | N |
| 121.25 | N | N | N | S | S | S | S | N | N | N | N | O | S | S | S | S | N |
| 121.50 | N | N | N | S | S | S | S | N | N | N | N | N | S | S | S | S | N |
| 121.75 | N | N | N | S | S | S | S | N | N | N | N | N | S | S | S | S | N |
| 122.00 | N | N | N | S | S | S | S | N | N | N | N | N | S | S | S | S | N |
| 122.25 | N | N | N | S | S | S | S | O | N | N | N | N | S | S | S | S | N |
| 122.50 | N | N | N | S | S | S | S | S | N | N | N | N | S | S | S | S | O |
| 122.75 | N | N | N | S | S | S | S | S | N | N | N | N | S | S | S | S | S |
| 123.00 | N | N | N | S | S | S | S | S | N | N | N | N | S | S | S | S | S |
| 123.25 | N | N | N | O | S | S | S | S | N | N | N | N | S | S | S | S | S |
| 123.50 | N | N | N | N | S | S | S | S | N | N | N | N | O | S | S | S | S |
| 123.75 | N | N | N | N | S | S | S | S | N | N | N | N | N | S | S | S | S |
| 124.00 | N | N | N | N | S | S | S | S | N | N | N | N | N | S | S | S | S |
| 124.25 | N | N | N | N | S | S | S | S | N | N | N | N | N | S | S | S | S |
| 124.50 | N | N | N | N | S | S | S | S | O | N | N | N | N | S | S | S | S |
| 124.75 | N | N | N | N | S | S | S | S | S | N | N | N | N | S | S | S | S |
| 125.00 | N | N | N | N | S | S | S | S | S | N | N | N | N | S | S | S | S |
| 125.25 | N | N | N | N | S | S | S | S | S | N | N | N | N | S | S | S | S |
| 125.50 | N | N | N | N | O | S | S | S | S | N | N | N | N | S | S | S | S |
| 125.75 | N | N | N | N | N | S | S | S | S | N | N | N | N | O | S | S | S |
| 126.00 | N | N | N | N | N | S | S | S | S | N | N | N | N | N | S | S | S |
| 126.25 | N | N | N | N | N | S | S | S | S | N | N | N | N | N | S | S | S |
| 126.50 | O | N | N | N | N | S | S | S | S | N | N | N | N | N | S | S | S |
| 126.75 | S | N | N | N | N | S | S | S | S | O | N | N | N | N | S | S | S |

-continued

| Coil Excitation | | | | | | | | | | | | | | | | |
|---|---|---|---|---|---|---|---|---|---|---|---|---|---|---|---|---|
| 127.00 | S | N | N | N | N | S | S | S | S | S | N | N | N | N | S | S | S |
| 127.25 | S | N | N | N | N | S | S | S | S | S | N | N | N | N | S | S | S |
| 127.50 | S | N | N | N | N | S | S | S | S | S | N | N | N | N | S | S | S |
| 127.75 | S | N | N | N | N | O | S | S | S | S | N | N | N | N | S | S | S |
| 128.00 | S | N | N | N | N | N | S | S | S | S | N | N | N | N | O | S | S |
| 128.25 | S | N | N | N | N | N | S | S | S | S | N | N | N | N | N | S | S |
| 128.50 | S | N | N | N | N | N | S | S | S | S | N | N | N | N | N | S | S |
| 128.75 | S | O | N | N | N | N | S | S | S | S | N | N | N | N | N | S | S |
| 129.00 | S | S | N | N | N | N | S | S | S | S | O | N | N | N | N | S | S |
| 129.25 | S | S | N | N | N | N | S | S | S | S | S | N | N | N | N | S | S |
| 129.50 | S | S | N | N | N | N | S | S | S | S | S | N | N | N | N | S | S |
| 129.75 | S | S | N | N | N | N | S | S | S | S | S | N | N | N | N | S | S |
| 130.00 | S | S | N | N | N | N | O | S | S | S | S | N | N | N | N | S | S |
| 130.25 | S | S | N | N | N | N | N | S | S | S | S | N | N | N | N | O | S |
| 130.50 | S | S | N | N | N | N | N | S | S | S | S | N | N | N | N | N | S |
| 130.75 | S | S | N | N | N | N | N | S | S | S | S | N | N | N | N | N | S |
| 131.00 | S | S | O | N | N | N | N | S | S | S | S | N | N | N | N | N | S |
| 131.25 | S | S | S | N | N | N | N | S | S | S | S | O | N | N | N | N | S |
| 131.50 | S | S | S | N | N | N | N | S | S | S | S | S | N | N | N | N | S |
| 131.75 | S | S | S | N | N | N | N | S | S | S | S | S | N | N | N | N | S |

Page Row 11, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 120.00 | N | N | N | S | S | S | S | N | N | N | N | N | S | S | S | S | N |
| 120.25 | N | N | N | S | S | S | S | N | N | N | N | N | S | S | S | S | N |
| 120.50 | N | N | N | S | S | S | S | O | N | N | N | N | S | S | S | S | N |
| 120.75 | N | N | N | S | S | S | S | S | N | N | N | N | S | S | S | S | O |
| 121.00 | N | N | N | S | S | S | S | S | N | N | N | N | S | S | S | S | S |
| 121.25 | N | N | N | S | S | S | S | S | N | N | N | N | S | S | S | S | S |
| 121.50 | N | N | N | O | S | S | S | S | N | N | N | N | S | S | S | S | S |
| 121.75 | N | N | N | N | S | S | S | S | N | N | N | N | O | S | S | S | S |
| 122.00 | N | N | N | N | S | S | S | S | N | N | N | N | N | S | S | S | S |
| 122.25 | N | N | N | N | S | S | S | S | N | N | N | N | N | S | S | S | S |
| 122.50 | N | N | N | N | S | S | S | S | N | N | N | N | N | S | S | S | S |
| 122.75 | N | N | N | N | S | S | S | S | O | N | N | N | N | S | S | S | S |
| 123.00 | N | N | N | N | S | S | S | S | S | N | N | N | N | S | S | S | S |
| 123.25 | N | N | N | N | S | S | S | S | S | N | N | N | N | S | S | S | S |
| 123.50 | N | N | N | N | S | S | S | S | S | N | N | N | N | S | S | S | S |
| 123.75 | N | N | N | N | O | S | S | S | S | N | N | N | N | S | S | S | S |
| 124.00 | N | N | N | N | N | S | S | S | S | N | N | N | N | O | S | S | S |
| 124.25 | N | N | N | N | N | S | S | S | S | N | N | N | N | N | S | S | S |
| 124.50 | N | N | N | N | N | S | S | S | S | N | N | N | N | N | S | S | S |
| 124.75 | O | N | N | N | N | S | S | S | S | N | N | N | N | N | S | S | S |
| 125.00 | S | N | N | N | N | S | S | S | S | O | N | N | N | N | S | S | S |
| 125.25 | S | N | N | N | N | S | S | S | S | S | N | N | N | N | S | S | S |
| 125.50 | S | N | N | N | N | S | S | S | S | S | N | N | N | N | S | S | S |
| 125.75 | S | N | N | N | N | S | S | S | S | S | N | N | N | N | S | S | S |
| 126.00 | S | N | N | N | N | O | S | S | S | S | N | N | N | N | S | S | S |
| 126.25 | S | N | N | N | N | N | S | S | S | S | N | N | N | N | O | S | S |
| 126.50 | S | N | N | N | N | N | S | S | S | S | N | N | N | N | N | S | S |
| 126.75 | S | N | N | N | N | N | S | S | S | S | N | N | N | N | N | S | S |
| 127.00 | S | O | N | N | N | N | S | S | S | S | N | N | N | N | N | S | S |
| 127.25 | S | S | N | N | N | N | S | S | S | S | O | N | N | N | N | S | S |
| 127.50 | S | S | N | N | N | N | S | S | S | S | S | N | N | N | N | S | S |
| 127.75 | S | S | N | N | N | N | S | S | S | S | S | N | N | N | N | S | S |
| 128.00 | S | S | N | N | N | N | S | S | S | S | S | N | N | N | N | S | S |
| 128.25 | S | S | N | N | N | N | O | S | S | S | S | N | N | N | N | S | S |
| 128.50 | S | S | N | N | N | N | N | S | S | S | S | N | N | N | N | O | S |
| 128.75 | S | S | N | N | N | N | N | S | S | S | S | N | N | N | N | N | S |
| 129.00 | S | S | N | N | N | N | N | S | S | S | S | N | N | N | N | N | S |
| 129.25 | S | S | O | N | N | N | N | S | S | S | S | N | N | N | N | N | S |
| 129.50 | S | S | S | N | N | N | N | S | S | S | S | O | N | N | N | N | S |
| 129.75 | S | S | S | N | N | N | N | S | S | S | S | S | N | N | N | N | S |
| 130.00 | S | S | S | N | N | N | N | S | S | S | S | S | N | N | N | N | S |
| 130.25 | S | S | S | N | N | N | N | S | S | S | S | S | N | N | N | N | S |
| 130.50 | S | S | S | N | N | N | N | O | S | S | S | S | N | N | N | N | S |
| 130.75 | S | S | S | N | N | N | N | N | S | S | S | S | N | N | N | N | O |
| 131.00 | S | S | S | N | N | N | N | N | S | S | S | S | N | N | N | N | N |
| 131.25 | S | S | S | N | N | N | N | N | S | S | S | S | N | N | N | N | N |
| 131.50 | S | S | S | O | N | N | N | N | S | S | S | S | N | N | N | N | N |
| 131.75 | S | S | S | S | N | N | N | N | S | S | S | S | O | N | N | N | N |

Page Row 11, Page Column 4

-continued

Coil Excitation

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 120.00 | N | N | N | N | S | S | S | S | N | N | N | N | O | S | S | S | S |
| 120.25 | N | N | N | N | S | S | S | S | N | N | N | N | N | S | S | S | S |
| 120.50 | N | N | N | N | S | S | S | S | N | N | N | N | N | S | S | S | S |
| 120.75 | N | N | N | N | S | S | S | S | N | N | N | N | N | S | S | S | S |
| 121.00 | N | N | N | N | S | S | S | S | O | N | N | N | N | S | S | S | S |
| 121.25 | N | N | N | N | S | S | S | S | S | N | N | N | N | S | S | S | S |
| 121.50 | N | N | N | N | S | S | S | S | S | N | N | N | N | S | S | S | S |
| 121.75 | N | N | N | N | S | S | S | S | S | N | N | N | N | S | S | S | S |
| 122.00 | N | N | N | N | O | S | S | S | S | N | N | N | N | S | S | S | S |
| 122.25 | N | N | N | N | N | S | S | S | S | N | N | N | N | O | S | S | S |
| 122.50 | N | N | N | N | N | S | S | S | S | N | N | N | N | N | S | S | S |
| 122.75 | N | N | N | N | N | S | S | S | S | N | N | N | N | N | S | S | S |
| 123.00 | O | N | N | N | N | S | S | S | S | N | N | N | N | N | S | S | S |
| 123.25 | S | N | N | N | N | S | S | S | S | O | N | N | N | N | S | S | S |
| 123.50 | S | N | N | N | N | S | S | S | S | S | N | N | N | N | S | S | S |
| 123.75 | S | N | N | N | N | S | S | S | S | S | N | N | N | N | S | S | S |
| 124.00 | S | N | N | N | N | S | S | S | S | S | N | N | N | N | S | S | S |
| 124.25 | S | N | N | N | N | O | S | S | S | S | N | N | N | N | S | S | S |
| 124.50 | S | N | N | N | N | N | S | S | S | S | N | N | N | N | O | S | S |
| 124.75 | S | N | N | N | N | N | S | S | S | S | N | N | N | N | N | S | S |
| 125.00 | S | N | N | N | N | N | S | S | S | S | N | N | N | N | N | S | S |
| 125.25 | S | O | N | N | N | N | S | S | S | S | N | N | N | N | N | S | S |
| 125.50 | S | S | N | N | N | N | S | S | S | S | O | N | N | N | N | S | S |
| 125.75 | S | S | N | N | N | N | S | S | S | S | S | N | N | N | N | S | S |
| 126.00 | S | S | N | N | N | N | S | S | S | S | S | N | N | N | N | S | S |
| 126.25 | S | S | N | N | N | N | S | S | S | S | S | N | N | N | N | S | S |
| 126.50 | S | S | N | N | N | N | O | S | S | S | S | N | N | N | N | S | S |
| 126.75 | S | S | N | N | N | N | N | S | S | S | S | N | N | N | N | O | S |
| 127.00 | S | S | N | N | N | N | N | S | S | S | S | N | N | N | N | N | S |
| 127.25 | S | S | N | N | N | N | N | S | S | S | S | N | N | N | N | N | S |
| 127.50 | S | S | O | N | N | N | N | S | S | S | S | N | N | N | N | N | S |
| 127.75 | S | S | S | N | N | N | N | S | S | S | S | O | N | N | N | N | S |
| 128.00 | S | S | S | N | N | N | N | S | S | S | S | S | N | N | N | N | S |
| 128.25 | S | S | S | N | N | N | N | S | S | S | S | S | N | N | N | N | S |
| 128.50 | S | S | S | N | N | N | N | S | S | S | S | S | N | N | N | N | S |
| 128.75 | S | S | S | N | N | N | N | O | S | S | S | S | N | N | N | N | S |
| 129.00 | S | S | S | N | N | N | N | N | S | S | S | S | N | N | N | N | O |
| 129.25 | S | S | S | N | N | N | N | N | S | S | S | S | N | N | N | N | N |
| 129.50 | S | S | S | N | N | N | N | N | S | S | S | S | N | N | N | N | N |
| 129.75 | S | S | S | O | N | N | N | N | S | S | S | S | N | N | N | N | N |
| 130.00 | S | S | S | S | N | N | N | N | S | S | S | S | O | N | N | N | N |
| 130.25 | S | S | S | S | N | N | N | N | S | S | S | S | S | N | N | N | N |
| 130.50 | S | S | S | S | N | N | N | N | S | S | S | S | S | N | N | N | N |
| 130.75 | S | S | S | S | N | N | N | N | S | S | S | S | S | N | N | N | N |
| 131.00 | S | S | S | S | N | N | N | N | O | S | S | S | S | N | N | N | N |
| 131.25 | S | S | S | S | N | N | N | N | N | S | S | S | S | N | N | N | N |
| 131.50 | S | S | S | S | N | N | N | N | N | S | S | S | S | N | N | N | N |
| 131.75 | S | S | S | S | N | N | N | N | N | S | S | S | S | N | N | N | N |

Page Row 11, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 120.00 | N | N | N | N | S | S | S | S | S | N | N | N | N | S | S | S | S |
| 120.25 | N | N | N | N | O | S | S | S | S | N | N | N | N | S | S | S | S |
| 120.50 | N | N | N | N | N | S | S | S | S | N | N | N | N | O | S | S | S |
| 120.75 | N | N | N | N | N | S | S | S | S | N | N | N | N | N | S | S | S |
| 121.00 | N | N | N | N | N | S | S | S | S | N | N | N | N | N | S | S | S |
| 121.25 | O | N | N | N | N | S | S | S | S | N | N | N | N | N | S | S | S |
| 121.50 | S | N | N | N | N | S | S | S | S | O | N | N | N | N | S | S | S |
| 121.75 | S | N | N | N | N | S | S | S | S | S | N | N | N | N | S | S | S |
| 122.00 | S | N | N | N | N | S | S | S | S | S | N | N | N | N | S | S | S |
| 122.25 | S | N | N | N | N | S | S | S | S | S | N | N | N | N | S | S | S |
| 122.50 | S | N | N | N | N | O | S | S | S | S | N | N | N | N | S | S | S |
| 122.75 | S | N | N | N | N | N | S | S | S | S | N | N | N | N | O | S | S |
| 123.00 | S | N | N | N | N | N | S | S | S | S | N | N | N | N | N | S | S |
| 123.25 | S | N | N | N | N | N | S | S | S | S | N | N | N | N | N | S | S |
| 123.50 | S | O | N | N | N | N | S | S | S | S | N | N | N | N | N | S | S |
| 123.75 | S | S | N | N | N | N | S | S | S | S | O | N | N | N | N | S | S |
| 124.00 | S | S | N | N | N | N | S | S | S | S | S | N | N | N | N | S | S |
| 124.25 | S | S | N | N | N | N | S | S | S | S | S | N | N | N | N | S | S |
| 124.50 | S | S | N | N | N | N | S | S | S | S | S | N | N | N | N | S | S |
| 124.75 | S | S | N | N | N | N | O | S | S | S | S | N | N | N | N | S | S |
| 125.00 | S | S | N | N | N | N | N | S | S | S | S | N | N | N | N | O | S |
| 125.25 | S | S | N | N | N | N | N | S | S | S | S | N | N | N | N | N | S |
| 125.50 | S | S | N | N | N | N | N | S | S | S | S | N | N | N | N | N | S |

-continued

Coil Excitation

| | | | | | | | | | | | | | | | | | |
|---|---|---|---|---|---|---|---|---|---|---|---|---|---|---|---|---|---|
| 125.75 | S | S | O | N | N | N | N | S | S | S | S | N | N | N | N | N | S |
| 126.00 | S | S | S | N | N | N | N | S | S | S | S | O | N | N | N | N | S |
| 126.25 | S | S | S | N | N | N | N | S | S | S | S | S | N | N | N | N | S |
| 126.50 | S | S | S | N | N | N | N | S | S | S | S | S | N | N | N | N | S |
| 126.75 | S | S | S | N | N | N | N | S | S | S | S | S | N | N | N | N | S |
| 127.00 | S | S | S | N | N | N | N | O | S | S | S | S | N | N | N | N | S |
| 127.25 | S | S | S | N | N | N | N | N | S | S | S | S | N | N | N | N | O |
| 127.50 | S | S | S | N | N | N | N | N | S | S | S | S | N | N | N | N | N |
| 127.75 | S | S | S | N | N | N | N | N | S | S | S | S | N | N | N | N | N |
| 128.00 | S | S | S | O | N | N | N | N | S | S | S | S | N | N | N | N | N |
| 128.25 | S | S | S | S | N | N | N | N | S | S | S | S | O | N | N | N | N |
| 128.50 | S | S | S | S | N | N | N | N | S | S | S | S | S | N | N | N | N |
| 128.75 | S | S | S | S | N | N | N | N | S | S | S | S | S | N | N | N | N |
| 129.00 | S | S | S | S | N | N | N | N | S | S | S | S | S | N | N | N | N |
| 129.25 | S | S | S | S | N | N | N | N | O | S | S | S | S | N | N | N | N |
| 129.50 | S | S | S | S | N | N | N | N | N | S | S | S | S | N | N | N | N |
| 129.75 | S | S | S | S | N | N | N | N | N | S | S | S | S | N | N | N | N |
| 130.00 | S | S | S | S | N | N | N | N | N | S | S | S | S | N | N | N | N |
| 130.25 | S | S | S | S | O | N | N | N | N | S | S | S | S | N | N | N | N |
| 130.50 | S | S | S | S | S | N | N | N | N | S | S | S | S | O | N | N | N |
| 130.75 | S | S | S | S | S | N | N | N | N | S | S | S | S | S | N | N | N |
| 131.00 | S | S | S | S | S | N | N | N | N | S | S | S | S | S | N | N | N |
| 131.25 | O | S | S | S | S | N | N | N | N | S | S | S | S | S | N | N | N |
| 131.50 | N | S | S | S | S | N | N | N | N | O | S | S | S | S | N | N | N |
| 131.75 | N | S | S | S | S | N | N | N | N | N | S | S | S | S | N | N | N |

Page Row 11, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 120.00 | S | N | N | N | N | S | S | S | S | S | N | N | N | N | S | S | S |
| 120.25 | S | N | N | N | N | S | S | S | S | S | N | N | N | N | S | S | S |
| 120.50 | S | N | N | N | N | S | S | S | S | S | N | N | N | N | S | S | S |
| 120.75 | S | N | N | N | N | O | S | S | S | S | N | N | N | N | S | S | S |
| 121.00 | S | N | N | N | N | N | S | S | S | S | N | N | N | N | O | S | S |
| 121.25 | S | N | N | N | N | N | S | S | S | S | N | N | N | N | N | S | S |
| 121.50 | S | N | N | N | N | N | S | S | S | S | N | N | N | N | N | S | S |
| 121.75 | S | O | N | N | N | N | S | S | S | S | N | N | N | N | N | S | S |
| 122.00 | S | S | N | N | N | N | S | S | S | S | O | N | N | N | N | S | S |
| 122.25 | S | S | N | N | N | N | S | S | S | S | S | N | N | N | N | S | S |
| 122.50 | S | S | N | N | N | N | S | S | S | S | S | N | N | N | N | S | S |
| 122.75 | S | S | N | N | N | N | S | S | S | S | S | N | N | N | N | S | S |
| 123.00 | S | S | N | N | N | N | O | S | S | S | S | N | N | N | N | S | S |
| 123.25 | S | S | N | N | N | N | N | S | S | S | S | N | N | N | N | O | S |
| 123.50 | S | S | N | N | N | N | N | S | S | S | S | N | N | N | N | N | S |
| 123.75 | S | S | N | N | N | N | N | S | S | S | S | N | N | N | N | N | S |
| 124.00 | S | S | O | N | N | N | N | S | S | S | S | N | N | N | N | N | S |
| 124.25 | S | S | S | N | N | N | N | S | S | S | S | O | N | N | N | N | S |
| 124.50 | S | S | S | N | N | N | N | S | S | S | S | S | N | N | N | N | S |
| 124.75 | S | S | S | N | N | N | N | S | S | S | S | S | N | N | N | N | S |
| 125.00 | S | S | S | N | N | N | N | S | S | S | S | S | N | N | N | N | S |
| 125.25 | S | S | S | N | N | N | N | O | S | S | S | S | N | N | N | N | S |
| 125.50 | S | S | S | N | N | N | N | N | S | S | S | S | N | N | N | N | O |
| 125.75 | S | S | S | N | N | N | N | N | S | S | S | S | N | N | N | N | N |
| 126.00 | S | S | S | N | N | N | N | N | S | S | S | S | N | N | N | N | N |
| 126.25 | S | S | S | O | N | N | N | N | S | S | S | S | N | N | N | N | N |
| 126.50 | S | S | S | S | N | N | N | N | S | S | S | S | O | N | N | N | N |
| 126.75 | S | S | S | S | N | N | N | N | S | S | S | S | S | N | N | N | N |
| 127.00 | S | S | S | S | N | N | N | N | S | S | S | S | S | N | N | N | N |
| 127.25 | S | S | S | S | N | N | N | N | S | S | S | S | S | N | N | N | N |
| 127.50 | S | S | S | S | N | N | N | N | O | S | S | S | S | N | N | N | N |
| 127.75 | S | S | S | S | N | N | N | N | N | S | S | S | S | N | N | N | N |
| 128.00 | S | S | S | S | N | N | N | N | N | S | S | S | S | N | N | N | N |
| 128.25 | S | S | S | S | N | N | N | N | N | S | S | S | S | N | N | N | N |
| 128.50 | S | S | S | S | O | N | N | N | N | S | S | S | S | N | N | N | N |
| 128.75 | S | S | S | S | S | N | N | N | N | S | S | S | S | O | N | N | N |
| 129.00 | S | S | S | S | S | N | N | N | N | S | S | S | S | S | N | N | N |
| 129.25 | S | S | S | S | S | N | N | N | N | S | S | S | S | S | N | N | N |
| 129.50 | O | S | S | S | S | N | N | N | N | S | S | S | S | S | N | N | N |
| 129.75 | N | S | S | S | S | N | N | N | N | O | S | S | S | S | N | N | N |
| 130.00 | N | S | S | S | S | N | N | N | N | N | S | S | S | S | N | N | N |
| 130.25 | N | S | S | S | S | N | N | N | N | N | S | S | S | S | N | N | N |
| 130.50 | N | S | S | S | S | N | N | N | N | N | S | S | S | S | N | N | N |
| 130.75 | N | S | S | S | S | O | N | N | N | N | S | S | S | S | N | N | N |
| 131.00 | N | S | S | S | S | S | N | N | N | N | S | S | S | S | O | N | N |
| 131.25 | N | S | S | S | S | S | N | N | N | N | S | S | S | S | S | N | N |
| 131.50 | N | S | S | S | S | S | N | N | N | N | S | S | S | S | S | N | N |
| 131.75 | N | O | S | S | S | S | N | N | N | N | S | S | S | S | S | N | N |

-continued

| Coil Excitation | | | | | | | | | | | | | | | | | |
|---|---|---|---|---|---|---|---|---|---|---|---|---|---|---|---|---|---|
| Page Row 11, Page Column 7 | | | | | | | | | | | | | | | | | |
| Coil | 120 | 121 | 122 | 123 | 124 | 125 | 126 | 127 | 128 | 129 | 130 | 131 | 132 | 133 | 134 | 135 | 136 |
| 120.00 | S | O | N | N | N | N | S | S | S | S | N | N | N | N | N | S | S |
| 120.25 | S | S | N | N | N | N | S | S | S | S | O | N | N | N | N | S | S |
| 120.50 | S | S | N | N | N | N | S | S | S | S | S | N | N | N | N | S | S |
| 120.75 | S | S | N | N | N | N | S | S | S | S | S | N | N | N | N | S | S |
| 121.00 | S | S | N | N | N | N | S | S | S | S | S | N | N | N | N | S | S |
| 121.25 | S | S | N | N | N | N | O | S | S | S | S | N | N | N | N | S | S |
| 121.50 | S | S | N | N | N | N | N | S | S | S | S | N | N | N | N | O | S |
| 121.75 | S | S | N | N | N | N | N | S | S | S | S | N | N | N | N | N | S |
| 122.00 | S | S | N | N | N | N | N | S | S | S | S | N | N | N | N | N | S |
| 122.25 | S | S | O | N | N | N | N | S | S | S | S | N | N | N | N | N | S |
| 122.50 | S | S | S | N | N | N | N | S | S | S | S | O | N | N | N | N | S |
| 122.75 | S | S | S | N | N | N | N | S | S | S | S | S | N | N | N | N | S |
| 123.00 | S | S | S | N | N | N | N | S | S | S | S | S | N | N | N | N | S |
| 123.25 | S | S | S | N | N | N | N | S | S | S | S | S | N | N | N | N | S |
| 123.50 | S | S | S | N | N | N | N | O | S | S | S | S | N | N | N | N | S |
| 123.75 | S | S | S | N | N | N | N | N | S | S | S | S | N | N | N | N | O |
| 124.00 | S | S | S | N | N | N | N | N | S | S | S | S | N | N | N | N | N |
| 124.25 | S | S | S | N | N | N | N | N | S | S | S | S | N | N | N | N | N |
| 124.50 | S | S | S | O | N | N | N | N | S | S | S | S | N | N | N | N | N |
| 124.75 | S | S | S | S | N | N | N | N | S | S | S | S | O | N | N | N | N |
| 125.00 | S | S | S | S | N | N | N | N | S | S | S | S | S | N | N | N | N |
| 125.25 | S | S | S | S | N | N | N | N | S | S | S | S | S | N | N | N | N |
| 125.50 | S | S | S | S | N | N | N | N | S | S | S | S | S | N | N | N | N |
| 125.75 | S | S | S | S | N | N | N | N | O | S | S | S | S | N | N | N | N |
| 126.00 | S | S | S | S | N | N | N | N | N | S | S | S | S | N | N | N | N |
| 126.25 | S | S | S | S | N | N | N | N | N | S | S | S | S | N | N | N | N |
| 126.50 | S | S | S | S | N | N | N | N | N | S | S | S | S | N | N | N | N |
| 126.75 | S | S | S | S | O | N | N | N | N | S | S | S | S | N | N | N | N |
| 127.00 | S | S | S | S | S | N | N | N | N | S | S | S | S | O | N | N | N |
| 127.25 | S | S | S | S | S | N | N | N | N | S | S | S | S | S | N | N | N |
| 127.50 | S | S | S | S | S | N | N | N | N | S | S | S | S | S | N | N | N |
| 127.75 | O | S | S | S | S | N | N | N | N | S | S | S | S | S | N | N | N |
| 128.00 | N | S | S | S | S | N | N | N | N | O | S | S | S | S | N | N | N |
| 128.25 | N | S | S | S | S | N | N | N | N | N | S | S | S | S | N | N | N |
| 128.50 | N | S | S | S | S | N | N | N | N | N | S | S | S | S | N | N | N |
| 128.75 | N | S | S | S | S | N | N | N | N | N | S | S | S | S | N | N | N |
| 129.00 | N | S | S | S | S | O | N | N | N | N | S | S | S | S | N | N | N |
| 129.25 | N | S | S | S | S | S | N | N | N | N | S | S | S | S | O | N | N |
| 129.50 | N | S | S | S | S | S | N | N | N | N | S | S | S | S | S | N | N |
| 129.75 | N | S | S | S | S | S | N | N | N | N | S | S | S | S | S | N | N |
| 130.00 | N | O | S | S | S | S | N | N | N | N | S | S | S | S | S | N | N |
| 130.25 | N | N | S | S | S | S | N | N | N | N | O | S | S | S | S | N | N |
| 130.50 | N | N | S | S | S | S | N | N | N | N | N | S | S | S | S | N | N |
| 130.75 | N | N | S | S | S | S | N | N | N | N | N | S | S | S | S | N | N |
| 131.00 | N | N | S | S | S | S | N | N | N | N | N | S | S | S | S | N | N |
| 131.25 | N | N | S | S | S | S | O | N | N | N | N | S | S | S | S | N | N |
| 131.50 | N | N | S | S | S | S | S | N | N | N | N | S | S | S | S | O | N |
| 131.75 | N | N | S | S | S | S | S | N | N | N | N | S | S | S | S | S | N |
| Page Row 11, Page Column 8 | | | | | | | | | | | | | | | | | |
| Coil | 137 | 138 | 139 | 140 | 141 | 142 | 143 | 144 | 145 | 146 | 147 | 148 | 149 | 150 | 151 | 152 | 153 |
| 120.00 | S | S | N | N | N | N | N | S | S | S | S | N | N | N | N | N | S |
| 120.25 | S | S | N | N | N | N | N | S | S | S | S | N | N | N | N | N | S |
| 120.50 | S | S | O | N | N | N | N | S | S | S | S | N | N | N | N | N | S |
| 120.75 | S | S | S | N | N | N | N | S | S | S | S | O | N | N | N | N | S |
| 121.00 | S | S | S | N | N | N | N | S | S | S | S | S | N | N | N | N | S |
| 121.25 | S | S | S | N | N | N | N | S | S | S | S | S | N | N | N | N | S |
| 121.50 | S | S | S | N | N | N | N | S | S | S | S | S | N | N | N | N | S |
| 121.75 | S | S | S | N | N | N | N | O | S | S | S | S | N | N | N | N | S |
| 122.00 | S | S | S | N | N | N | N | N | S | S | S | S | N | N | N | N | O |
| 122.25 | S | S | S | N | N | N | N | N | S | S | S | S | N | N | N | N | N |
| 122.50 | S | S | S | N | N | N | N | N | S | S | S | S | N | N | N | N | N |
| 122.75 | S | S | S | O | N | N | N | N | S | S | S | S | N | N | N | N | N |
| 123.00 | S | S | S | S | N | N | N | N | S | S | S | S | O | N | N | N | N |
| 123.25 | S | S | S | S | N | N | N | N | S | S | S | S | S | N | N | N | N |
| 123.50 | S | S | S | S | N | N | N | N | S | S | S | S | S | N | N | N | N |
| 123.75 | S | S | S | S | N | N | N | N | S | S | S | S | S | N | N | N | N |
| 124.00 | S | S | S | S | N | N | N | N | O | S | S | S | S | N | N | N | N |
| 124.25 | S | S | S | S | N | N | N | N | N | S | S | S | S | N | N | N | N |
| 124.50 | S | S | S | S | N | N | N | N | N | S | S | S | S | N | N | N | N |
| 124.75 | S | S | S | S | N | N | N | N | N | S | S | S | S | N | N | N | N |
| 125.00 | S | S | S | S | O | N | N | N | N | S | S | S | S | N | N | N | N |

-continued

| Coil Excitation | | | | | | | | | | | | | | | | | |
|---|---|---|---|---|---|---|---|---|---|---|---|---|---|---|---|---|---|
| 125.25 | S | S | S | S | S | N | N | N | N | S | S | S | S | O | N | N | N |
| 125.50 | S | S | S | S | S | N | N | N | N | S | S | S | S | S | N | N | N |
| 125.75 | S | S | S | S | S | N | N | N | N | S | S | S | S | S | N | N | N |
| 126.00 | O | S | S | S | S | N | N | N | N | S | S | S | S | S | N | N | N |
| 126.25 | N | S | S | S | S | N | N | N | N | O | S | S | S | S | N | N | N |
| 126.50 | N | S | S | S | S | N | N | N | N | N | S | S | S | S | N | N | N |
| 126.75 | N | S | S | S | S | N | N | N | N | N | S | S | S | S | N | N | N |
| 127.00 | N | S | S | S | S | N | N | N | N | N | S | S | S | S | N | N | N |
| 127.25 | N | S | S | S | S | O | N | N | N | N | S | S | S | S | N | N | N |
| 127.50 | N | S | S | S | S | S | N | N | N | N | S | S | S | S | O | N | N |
| 127.75 | N | S | S | S | S | S | N | N | N | N | S | S | S | S | S | N | N |
| 128.00 | N | S | S | S | S | S | N | N | N | N | S | S | S | S | S | N | N |
| 128.25 | N | O | S | S | S | S | N | N | N | N | S | S | S | S | S | N | N |
| 128.50 | N | N | S | S | S | S | N | N | N | N | O | S | S | S | S | N | N |
| 128.75 | N | N | S | S | S | S | N | N | N | N | N | S | S | S | S | N | N |
| 129.00 | N | N | S | S | S | S | N | N | N | N | N | S | S | S | S | N | N |
| 129.25 | N | N | S | S | S | S | N | N | N | N | N | S | S | S | S | N | N |
| 129.50 | N | N | S | S | S | S | O | N | N | N | N | S | S | S | S | N | N |
| 129.75 | N | N | S | S | S | S | S | N | N | N | N | S | S | S | S | O | N |
| 130.00 | N | N | S | S | S | S | S | N | N | N | N | S | S | S | S | S | N |
| 130.25 | N | N | S | S | S | S | S | N | N | N | N | S | S | S | S | S | N |
| 130.50 | N | N | O | S | S | S | S | N | N | N | N | S | S | S | S | S | N |
| 130.75 | N | N | N | S | S | S | S | N | N | N | N | O | S | S | S | S | N |
| 131.00 | N | N | N | S | S | S | S | N | N | N | N | N | S | S | S | S | N |
| 131.25 | N | N | N | S | S | S | S | N | N | N | N | N | S | S | S | S | N |
| 131.50 | N | N | N | S | S | S | S | N | N | N | N | N | S | S | S | S | N |
| 131.75 | N | N | N | S | S | S | S | O | N | N | N | N | S | S | S | S | N |

Page Row 11, Page Column 9

| Coil | 154 | 155 | 156 | 157 | 158 | 159 | 160 |
|---|---|---|---|---|---|---|---|
| 120.00 | S | S | S | N | N | N | N |
| 120.25 | S | S | S | N | N | N | N |
| 120.50 | S | S | S | N | N | N | N |
| 120.75 | S | S | S | N | N | N | N |
| 121.00 | S | S | S | O | N | N | N |
| 121.25 | S | S | S | S | N | N | N |
| 121.50 | S | S | S | S | N | N | N |
| 121.75 | S | S | S | S | N | N | N |
| 122.00 | S | S | S | S | N | N | N |
| 122.25 | S | S | S | S | N | N | N |
| 122.50 | S | S | S | S | N | N | N |
| 122.75 | S | S | S | S | N | N | N |
| 123.00 | S | S | S | S | N | N | N |
| 123.25 | S | S | S | S | O | N | N |
| 123.50 | S | S | S | S | S | N | N |
| 123.75 | S | S | S | S | S | N | N |
| 124.00 | S | S | S | S | S | N | N |
| 124.25 | O | S | S | S | S | N | N |
| 124.50 | N | S | S | S | S | N | N |
| 124.75 | N | S | S | S | S | N | N |
| 125.00 | N | S | S | S | S | N | N |
| 125.25 | N | S | S | S | S | N | N |
| 125.50 | N | S | S | S | S | O | N |
| 125.75 | N | S | S | S | S | S | N |
| 126.00 | N | S | S | S | S | S | N |
| 126.25 | N | S | S | S | S | S | N |
| 126.50 | N | O | S | S | S | S | N |
| 126.75 | N | N | S | S | S | S | N |
| 127.00 | N | N | S | S | S | S | N |
| 127.25 | N | N | S | S | S | S | N |
| 127.50 | N | N | S | S | S | S | N |
| 127.75 | N | N | S | S | S | S | O |
| 128.00 | N | N | S | S | S | S | S |
| 128.25 | N | N | S | S | S | S | S |
| 128.50 | N | N | S | S | S | S | S |
| 128.75 | N | N | O | S | S | S | S |
| 129.00 | N | N | N | S | S | S | S |
| 129.25 | N | N | N | S | S | S | S |
| 129.50 | N | N | N | S | S | S | S |
| 129.75 | N | N | N | S | S | S | S |
| 130.00 | N | N | N | S | S | S | S |
| 130.25 | N | N | N | S | S | S | S |
| 130.50 | N | N | N | S | S | S | S |
| 130.75 | N | N | N | S | S | S | S |
| 131.00 | N | N | N | O | S | S | S |
| 131.25 | N | N | N | N | S | S | S |

-continued

| Coil Excitation | | | | | | | | | | | | | | | | | |
|---|---|---|---|---|---|---|---|---|---|---|---|---|---|---|---|---|---|
| 131.50 | N | N | N | N | S | S | S | | | | | | | | | | |
| 131.75 | N | N | N | N | S | S | S | | | | | | | | | | |

Page Row 11, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 132.00 | S | N | N | N | N | N | S | S | S | S | N | N | N | N | N | S | S |
| 132.25 | S | O | N | N | N | N | S | S | S | S | N | N | N | N | N | S | S |
| 132.50 | S | S | N | N | N | N | S | S | S | S | O | N | N | N | N | S | S |
| 132.75 | S | S | N | N | N | N | S | S | S | S | S | N | N | N | N | S | S |
| 133.00 | S | S | N | N | N | N | S | S | S | S | S | N | N | N | N | S | S |
| 133.25 | S | S | N | N | N | N | S | S | S | S | S | N | N | N | N | S | S |
| 133.50 | S | S | N | N | N | N | O | S | S | S | S | N | N | N | N | S | S |
| 133.75 | S | S | N | N | N | N | N | S | S | S | S | N | N | N | N | O | S |
| 134.00 | S | S | N | N | N | N | N | S | S | S | S | N | N | N | N | N | S |
| 134.25 | S | S | N | N | N | N | N | S | S | S | S | N | N | N | N | N | S |
| 134.50 | S | S | O | N | N | N | N | S | S | S | S | N | N | N | N | N | S |
| 134.75 | S | S | S | N | N | N | N | S | S | S | S | O | N | N | N | N | S |
| 135.00 | S | S | S | N | N | N | N | S | S | S | S | S | N | N | N | N | S |
| 135.25 | S | S | S | N | N | N | N | S | S | S | S | S | N | N | N | N | S |
| 135.50 | S | S | S | N | N | N | N | S | S | S | S | S | N | N | N | N | S |
| 135.75 | S | S | S | N | N | N | N | O | S | S | S | S | N | N | N | N | S |
| 136.00 | S | S | S | N | N | N | N | N | S | S | S | S | N | N | N | N | O |
| 136.25 | S | S | S | N | N | N | N | N | S | S | S | S | N | N | N | N | N |
| 136.50 | S | S | S | N | N | N | N | N | S | S | S | S | N | N | N | N | N |
| 136.75 | S | S | S | O | N | N | N | N | S | S | S | S | N | N | N | N | N |
| 137.00 | S | S | S | S | N | N | N | N | S | S | S | S | O | N | N | N | N |
| 137.25 | S | S | S | S | N | N | N | N | S | S | S | S | S | N | N | N | N |
| 137.50 | S | S | S | S | N | N | N | N | S | S | S | S | S | N | N | N | N |
| 137.75 | S | S | S | S | N | N | N | N | S | S | S | S | S | N | N | N | N |
| 138.00 | S | S | S | S | N | N | N | N | O | S | S | S | S | N | N | N | N |
| 138.25 | S | S | S | S | N | N | N | N | N | S | S | S | S | N | N | N | N |
| 138.50 | S | S | S | S | N | N | N | N | N | S | S | S | S | N | N | N | N |
| 138.75 | S | S | S | S | N | N | N | N | N | S | S | S | S | N | N | N | N |
| 139.00 | S | S | S | S | O | N | N | N | N | S | S | S | S | N | N | N | N |
| 139.25 | S | S | S | S | S | N | N | N | N | S | S | S | S | O | N | N | N |
| 139.50 | S | S | S | S | S | N | N | N | N | S | S | S | S | S | N | N | N |
| 139.75 | S | S | S | S | S | N | N | N | N | S | S | S | S | S | N | N | N |
| 140.00 | O | S | S | S | S | N | N | N | N | S | S | S | S | S | N | N | N |
| 140.25 | N | S | S | S | S | N | N | N | N | O | S | S | S | S | N | N | N |
| 140.50 | N | S | S | S | S | N | N | N | N | N | S | S | S | S | N | N | N |
| 140.75 | N | S | S | S | S | N | N | N | N | N | S | S | S | S | N | N | N |
| 141.00 | N | S | S | S | S | N | N | N | N | N | S | S | S | S | N | N | N |
| 141.25 | N | S | S | S | S | O | N | N | N | N | S | S | S | S | N | N | N |
| 141.50 | N | S | S | S | S | S | N | N | N | N | S | S | S | S | O | N | N |
| 141.75 | N | S | S | S | S | S | N | N | N | N | S | S | S | S | S | N | N |
| 142.00 | N | S | S | S | S | S | N | N | N | N | S | S | S | S | S | N | N |
| 142.25 | N | O | S | S | S | S | N | N | N | N | S | S | S | S | S | N | N |
| 142.50 | N | N | S | S | S | S | N | N | N | N | O | S | S | S | S | N | N |
| 142.75 | N | N | S | S | S | S | N | N | N | N | N | S | S | S | S | N | N |
| 143.00 | N | N | S | S | S | S | N | N | N | N | N | S | S | S | S | N | N |
| 143.25 | N | N | S | S | S | S | N | N | N | N | N | S | S | S | S | N | N |
| 143.50 | N | N | S | S | S | S | O | N | N | N | N | S | S | S | S | N | N |
| 143.75 | N | N | S | S | S | S | S | N | N | N | N | S | S | S | S | O | N |

Page Row 12, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 132.00 | S | S | N | N | N | N | N | S | S | S | S | N | N | N | N | O | S |
| 132.25 | S | S | N | N | N | N | N | S | S | S | S | N | N | N | N | N | S |
| 132.50 | S | S | N | N | N | N | N | S | S | S | S | N | N | N | N | N | S |
| 132.75 | S | S | O | N | N | N | N | S | S | S | S | N | N | N | N | N | S |
| 133.00 | S | S | S | N | N | N | N | S | S | S | S | O | N | N | N | N | S |
| 133.25 | S | S | S | N | N | N | N | S | S | S | S | S | N | N | N | N | S |
| 133.50 | S | S | S | N | N | N | N | S | S | S | S | S | N | N | N | N | S |
| 133.75 | S | S | S | N | N | N | N | S | S | S | S | S | N | N | N | N | S |
| 134.00 | S | S | S | N | N | N | N | O | S | S | S | S | N | N | N | N | S |
| 134.25 | S | S | S | N | N | N | N | N | S | S | S | S | N | N | N | N | O |
| 134.50 | S | S | S | N | N | N | N | N | S | S | S | S | N | N | N | N | N |
| 134.75 | S | S | S | N | N | N | N | N | S | S | S | S | N | N | N | N | N |
| 135.00 | S | S | S | O | N | N | N | N | S | S | S | S | N | N | N | N | N |
| 135.25 | S | S | S | S | N | N | N | N | S | S | S | S | O | N | N | N | N |
| 135.50 | S | S | S | S | N | N | N | N | S | S | S | S | S | N | N | N | N |
| 135.75 | S | S | S | S | N | N | N | N | S | S | S | S | S | N | N | N | N |
| 136.00 | S | S | S | S | N | N | N | N | S | S | S | S | S | N | N | N | N |
| 136.25 | S | S | S | S | N | N | N | N | O | S | S | S | S | N | N | N | N |
| 136.50 | S | S | S | S | N | N | N | N | N | S | S | S | S | N | N | N | N |

-continued

| Coil Excitation | | | | | | | | | | | | | | | | | |
|---|---|---|---|---|---|---|---|---|---|---|---|---|---|---|---|---|---|
| 136.75 | S | S | S | S | N | N | N | N | N | S | S | S | S | N | N | N | N |
| 137.00 | S | S | S | S | N | N | N | N | N | S | S | S | S | N | N | N | N |
| 137.25 | S | S | S | S | O | N | N | N | N | S | S | S | S | N | N | N | N |
| 137.50 | S | S | S | S | S | N | N | N | N | S | S | S | S | O | N | N | N |
| 137.75 | S | S | S | S | S | N | N | N | N | S | S | S | S | S | N | N | N |
| 138.00 | S | S | S | S | S | N | N | N | N | S | S | S | S | S | N | N | N |
| 138.25 | O | S | S | S | S | N | N | N | N | S | S | S | S | S | N | N | N |
| 138.50 | N | S | S | S | S | N | N | N | N | O | S | S | S | S | N | N | N |
| 138.75 | N | S | S | S | S | N | N | N | N | N | S | S | S | S | N | N | N |
| 139.00 | N | S | S | S | S | N | N | N | N | N | S | S | S | S | N | N | N |
| 139.25 | N | S | S | S | S | N | N | N | N | N | S | S | S | S | N | N | N |
| 139.50 | N | S | S | S | S | O | N | N | N | N | S | S | S | S | N | N | N |
| 139.75 | N | S | S | S | S | S | N | N | N | N | S | S | S | S | O | N | N |
| 140.00 | N | S | S | S | S | S | N | N | N | N | S | S | S | S | S | N | N |
| 140.25 | N | S | S | S | S | S | N | N | N | N | S | S | S | S | S | N | N |
| 140.50 | N | O | S | S | S | S | N | N | N | N | S | S | S | S | S | N | N |
| 140.75 | N | N | S | S | S | S | N | N | N | N | O | S | S | S | S | N | N |
| 141.00 | N | N | S | S | S | S | N | N | N | N | N | S | S | S | S | N | N |
| 141.25 | N | N | S | S | S | S | N | N | N | N | N | S | S | S | S | N | N |
| 141.50 | N | N | S | S | S | S | N | N | N | N | N | S | S | S | S | N | N |
| 141.75 | N | N | S | S | S | S | O | N | N | N | N | S | S | S | S | N | N |
| 142.00 | N | N | S | S | S | S | S | N | N | N | N | S | S | S | S | O | N |
| 142.25 | N | N | S | S | S | S | S | N | N | N | N | S | S | S | S | S | N |
| 142.50 | N | N | S | S | S | S | S | N | N | N | N | S | S | S | S | S | N |
| 142.75 | N | N | O | S | S | S | S | N | N | N | N | S | S | S | S | S | N |
| 143.00 | N | N | N | S | S | S | S | N | N | N | N | O | S | S | S | S | N |
| 143.25 | N | N | N | S | S | S | S | N | N | N | N | N | S | S | S | S | N |
| 143.50 | N | N | N | S | S | S | S | N | N | N | N | N | S | S | S | S | N |
| 143.75 | N | N | N | S | S | S | S | N | N | N | N | N | S | S | S | S | N |

Page Row 12, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 132.00 | S | S | S | N | N | N | N | S | S | S | S | S | N | N | N | N | S |
| 132.25 | S | S | S | N | N | N | N | O | S | S | S | S | N | N | N | N | S |
| 132.50 | S | S | S | N | N | N | N | N | S | S | S | S | N | N | N | N | O |
| 132.75 | S | S | S | N | N | N | N | N | S | S | S | S | N | N | N | N | N |
| 133.00 | S | S | S | N | N | N | N | N | S | S | S | S | N | N | N | N | N |
| 133.25 | S | S | S | O | N | N | N | N | S | S | S | S | N | N | N | N | N |
| 133.50 | S | S | S | S | N | N | N | N | S | S | S | S | O | N | N | N | N |
| 133.75 | S | S | S | S | N | N | N | N | S | S | S | S | S | N | N | N | N |
| 134.00 | S | S | S | S | N | N | N | N | S | S | S | S | S | N | N | N | N |
| 134.25 | S | S | S | S | N | N | N | N | S | S | S | S | S | N | N | N | N |
| 134.50 | S | S | S | S | N | N | N | N | O | S | S | S | S | N | N | N | N |
| 134.75 | S | S | S | S | N | N | N | N | N | S | S | S | S | N | N | N | N |
| 135.00 | S | S | S | S | N | N | N | N | N | S | S | S | S | N | N | N | N |
| 135.25 | S | S | S | S | N | N | N | N | N | S | S | S | S | N | N | N | N |
| 135.50 | S | S | S | S | O | N | N | N | N | S | S | S | S | N | N | N | N |
| 135.75 | S | S | S | S | S | N | N | N | N | S | S | S | S | O | N | N | N |
| 136.00 | S | S | S | S | S | N | N | N | N | S | S | S | S | S | N | N | N |
| 136.25 | S | S | S | S | S | N | N | N | N | S | S | S | S | S | N | N | N |
| 136.50 | O | S | S | S | S | N | N | N | N | S | S | S | S | S | N | N | N |
| 136.75 | N | S | S | S | S | N | N | N | N | O | S | S | S | S | N | N | N |
| 137.00 | N | S | S | S | S | N | N | N | N | N | S | S | S | S | N | N | N |
| 137.25 | N | S | S | S | S | N | N | N | N | N | S | S | S | S | N | N | N |
| 137.50 | N | S | S | S | S | N | N | N | N | N | S | S | S | S | N | N | N |
| 137.75 | N | S | S | S | S | O | N | N | N | N | S | S | S | S | N | N | N |
| 138.00 | N | S | S | S | S | S | N | N | N | N | S | S | S | S | O | N | N |
| 138.25 | N | S | S | S | S | S | N | N | N | N | S | S | S | S | S | N | N |
| 138.50 | N | S | S | S | S | S | N | N | N | N | S | S | S | S | S | N | N |
| 138.75 | N | O | S | S | S | S | N | N | N | N | S | S | S | S | S | N | N |
| 139.00 | N | N | S | S | S | S | N | N | N | N | O | S | S | S | S | N | N |
| 139.25 | N | N | S | S | S | S | N | N | N | N | N | S | S | S | S | N | N |
| 139.50 | N | N | S | S | S | S | N | N | N | N | N | S | S | S | S | N | N |
| 139.75 | N | N | S | S | S | S | N | N | N | N | N | S | S | S | S | N | N |
| 140.00 | N | N | S | S | S | S | O | N | N | N | N | S | S | S | S | N | N |
| 140.25 | N | N | S | S | S | S | S | N | N | N | N | S | S | S | S | O | N |
| 140.50 | N | N | S | S | S | S | S | N | N | N | N | S | S | S | S | S | N |
| 140.75 | N | N | S | S | S | S | S | N | N | N | N | S | S | S | S | S | N |
| 141.00 | N | N | O | S | S | S | S | N | N | N | N | S | S | S | S | S | N |
| 141.25 | N | N | N | S | S | S | S | N | N | N | N | O | S | S | S | S | N |
| 141.50 | N | N | N | S | S | S | S | N | N | N | N | N | S | S | S | S | N |
| 141.75 | N | N | N | S | S | S | S | N | N | N | N | N | S | S | S | S | N |
| 142.00 | N | N | N | S | S | S | S | N | N | N | N | N | S | S | S | S | N |
| 142.25 | N | N | N | S | S | S | S | O | N | N | N | N | S | S | S | S | N |
| 142.50 | N | N | N | S | S | S | S | S | N | N | N | N | S | S | S | S | O |
| 142.75 | N | N | N | S | S | S | S | S | N | N | N | N | S | S | S | S | S |

-continued

| Coil Excitation | | | | | | | | | | | | | | | | | |
|---|---|---|---|---|---|---|---|---|---|---|---|---|---|---|---|---|---|
| 143.00 | N | N | N | S | S | S | S | S | N | N | N | N | S | S | S | S | S |
| 143.25 | N | N | N | O | S | S | S | S | N | N | N | N | S | S | S | S | S |
| 143.50 | N | N | N | N | S | S | S | S | N | N | N | N | O | S | S | S | S |
| 143.75 | N | N | N | N | S | S | S | S | N | N | N | N | N | S | S | S | S |

Page Row 12, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 132.00 | S | S | S | S | N | N | N | N | S | S | S | S | S | N | N | N | N |
| 132.25 | S | S | S | S | N | N | N | N | S | S | S | S | S | N | N | N | N |
| 132.50 | S | S | S | S | N | N | N | N | S | S | S | S | S | N | N | N | N |
| 132.75 | S | S | S | S | N | N | N | N | O | S | S | S | S | N | N | N | N |
| 133.00 | S | S | S | S | N | N | N | N | N | S | S | S | S | N | N | N | N |
| 133.25 | S | S | S | S | N | N | N | N | N | S | S | S | S | N | N | N | N |
| 133.50 | S | S | S | S | N | N | N | N | N | S | S | S | S | N | N | N | N |
| 133.75 | S | S | S | S | O | N | N | N | N | S | S | S | S | N | N | N | N |
| 134.00 | S | S | S | S | S | N | N | N | N | S | S | S | S | O | N | N | N |
| 134.25 | S | S | S | S | S | N | N | N | N | S | S | S | S | S | N | N | N |
| 134.50 | S | S | S | S | S | N | N | N | N | S | S | S | S | S | N | N | N |
| 134.75 | O | S | S | S | S | N | N | N | N | S | S | S | S | S | N | N | N |
| 135.00 | N | S | S | S | S | N | N | N | N | O | S | S | S | S | N | N | N |
| 135.25 | N | S | S | S | S | N | N | N | N | N | S | S | S | S | N | N | N |
| 135.50 | N | S | S | S | S | N | N | N | N | N | S | S | S | S | N | N | N |
| 135.75 | N | S | S | S | S | N | N | N | N | N | S | S | S | S | N | N | N |
| 136.00 | N | S | S | S | S | O | N | N | N | N | S | S | S | S | N | N | N |
| 136.25 | N | S | S | S | S | S | N | N | N | N | S | S | S | S | O | N | N |
| 136.50 | N | S | S | S | S | S | N | N | N | N | S | S | S | S | S | N | N |
| 136.75 | N | S | S | S | S | S | N | N | N | N | S | S | S | S | S | N | N |
| 137.00 | N | O | S | S | S | S | N | N | N | N | S | S | S | S | S | N | N |
| 137.25 | N | N | S | S | S | S | N | N | N | N | O | S | S | S | S | N | N |
| 137.50 | N | N | S | S | S | S | N | N | N | N | N | S | S | S | S | N | N |
| 137.75 | N | N | S | S | S | S | N | N | N | N | N | S | S | S | S | N | N |
| 138.00 | N | N | S | S | S | S | N | N | N | N | N | S | S | S | S | N | N |
| 138.25 | N | N | S | S | S | S | O | N | N | N | N | S | S | S | S | N | N |
| 138.50 | N | N | S | S | S | S | S | N | N | N | N | S | S | S | S | O | N |
| 138.75 | N | N | S | S | S | S | S | N | N | N | N | S | S | S | S | S | N |
| 139.00 | N | N | S | S | S | S | S | N | N | N | N | S | S | S | S | S | N |
| 139.25 | N | N | O | S | S | S | S | N | N | N | N | S | S | S | S | S | N |
| 139.50 | N | N | N | S | S | S | S | N | N | N | N | O | S | S | S | S | N |
| 139.75 | N | N | N | S | S | S | S | N | N | N | N | N | S | S | S | S | N |
| 140.00 | N | N | N | S | S | S | S | N | N | N | N | N | S | S | S | S | N |
| 140.25 | N | N | N | S | S | S | S | N | N | N | N | N | S | S | S | S | N |
| 140.50 | N | N | N | S | S | S | S | O | N | N | N | N | S | S | S | S | N |
| 140.75 | N | N | N | S | S | S | S | S | N | N | N | N | S | S | S | S | O |
| 141.00 | N | N | N | S | S | S | S | S | N | N | N | N | S | S | S | S | S |
| 141.25 | N | N | N | S | S | S | S | S | N | N | N | N | S | S | S | S | S |
| 141.50 | N | N | N | O | S | S | S | S | N | N | N | N | S | S | S | S | S |
| 141.75 | N | N | N | N | S | S | S | S | N | N | N | N | O | S | S | S | S |
| 142.00 | N | N | N | N | S | S | S | S | N | N | N | N | N | S | S | S | S |
| 142.25 | N | N | N | N | S | S | S | S | N | N | N | N | N | S | S | S | S |
| 142.50 | N | N | N | N | S | S | S | S | N | N | N | N | N | S | S | S | S |
| 142.75 | N | N | N | N | S | S | S | S | O | N | N | N | N | S | S | S | S |
| 143.00 | N | N | N | N | S | S | S | S | S | N | N | N | N | S | S | S | S |
| 143.25 | N | N | N | N | S | S | S | S | S | N | N | N | N | S | S | S | S |
| 143.50 | N | N | N | N | S | S | S | S | S | N | N | N | N | S | S | S | S |
| 143.75 | N | N | N | N | O | S | S | S | S | N | N | N | N | S | S | S | S |

Page Row 12, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 132.00 | S | S | S | S | O | N | N | N | N | S | S | S | S | N | N | N | N |
| 132.25 | S | S | S | S | S | N | N | N | N | S | S | S | S | O | N | N | N |
| 132.50 | S | S | S | S | S | N | N | N | N | S | S | S | S | S | N | N | N |
| 132.75 | S | S | S | S | S | N | N | N | N | S | S | S | S | S | N | N | N |
| 133.00 | O | S | S | S | S | N | N | N | N | S | S | S | S | S | N | N | N |
| 133.25 | N | S | S | S | S | N | N | N | N | O | S | S | S | S | N | N | N |
| 133.50 | N | S | S | S | S | N | N | N | N | N | S | S | S | S | N | N | N |
| 133.75 | N | S | S | S | S | N | N | N | N | N | S | S | S | S | N | N | N |
| 134.00 | N | S | S | S | S | N | N | N | N | N | S | S | S | S | N | N | N |
| 134.25 | N | S | S | S | S | O | N | N | N | N | S | S | S | S | N | N | N |
| 134.50 | N | S | S | S | S | S | N | N | N | N | S | S | S | S | O | N | N |
| 134.75 | N | S | S | S | S | S | N | N | N | N | S | S | S | S | S | N | N |
| 135.00 | N | S | S | S | S | S | N | N | N | N | S | S | S | S | S | N | N |
| 135.25 | N | O | S | S | S | S | N | N | N | N | S | S | S | S | S | N | N |
| 135.50 | N | N | S | S | S | S | N | N | N | N | O | S | S | S | S | N | N |
| 135.75 | N | N | S | S | S | S | N | N | N | N | N | S | S | S | S | N | N |
| 136.00 | N | N | S | S | S | S | N | N | N | N | N | S | S | S | S | N | N |

-continued

| Coil Excitation | | | | | | | | | | | | | | | | | |
|---|---|---|---|---|---|---|---|---|---|---|---|---|---|---|---|---|---|
| 136.25 | N | N | S | S | S | S | N | N | N | N | N | S | S | S | S | N | N |
| 136.50 | N | N | S | S | S | S | O | N | N | N | N | S | S | S | S | N | N |
| 136.75 | N | N | S | S | S | S | S | N | N | N | N | S | S | S | S | O | N |
| 137.00 | N | N | S | S | S | S | S | N | N | N | N | S | S | S | S | S | N |
| 137.25 | N | N | S | S | S | S | S | N | N | N | N | S | S | S | S | S | N |
| 137.50 | N | N | O | S | S | S | S | N | N | N | N | S | S | S | S | S | N |
| 137.75 | N | N | N | S | S | S | S | N | N | N | N | O | S | S | S | S | N |
| 138.00 | N | N | N | S | S | S | S | N | N | N | N | N | S | S | S | S | N |
| 138.25 | N | N | N | S | S | S | S | N | N | N | N | N | S | S | S | S | N |
| 138.50 | N | N | N | S | S | S | S | N | N | N | N | N | S | S | S | S | N |
| 138.75 | N | N | N | S | S | S | S | O | N | N | N | N | S | S | S | S | N |
| 139.00 | N | N | N | S | S | S | S | S | N | N | N | N | S | S | S | S | O |
| 139.25 | N | N | N | S | S | S | S | S | N | N | N | N | S | S | S | S | S |
| 139.50 | N | N | N | S | S | S | S | S | N | N | N | N | S | S | S | S | S |
| 139.75 | N | N | N | O | S | S | S | S | N | N | N | N | S | S | S | S | S |
| 140.00 | N | N | N | N | S | S | S | S | N | N | N | N | O | S | S | S | S |
| 140.25 | N | N | N | N | S | S | S | S | N | N | N | N | N | S | S | S | S |
| 140.50 | N | N | N | N | S | S | S | S | N | N | N | N | N | S | S | S | S |
| 140.75 | N | N | N | N | S | S | S | S | N | N | N | N | N | S | S | S | S |
| 141.00 | N | N | N | N | S | S | S | S | O | N | N | N | N | S | S | S | S |
| 141.25 | N | N | N | N | S | S | S | S | S | N | N | N | N | S | S | S | S |
| 141.50 | N | N | N | N | S | S | S | S | S | N | N | N | N | S | S | S | S |
| 141.75 | N | N | N | N | S | S | S | S | S | N | N | N | N | S | S | S | S |
| 142.00 | N | N | N | N | O | S | S | S | S | N | N | N | N | S | S | S | S |
| 142.25 | N | N | N | N | N | S | S | S | S | N | N | N | N | O | S | S | S |
| 142.50 | N | N | N | N | N | S | S | S | S | N | N | N | N | N | S | S | S |
| 142.75 | N | N | N | N | N | S | S | S | S | N | N | N | N | N | S | S | S |
| 143.00 | O | N | N | N | N | S | S | S | S | N | N | N | N | N | S | S | S |
| 143.25 | S | N | N | N | N | S | S | S | S | O | N | N | N | N | S | S | S |
| 143.50 | S | N | N | N | N | S | S | S | S | S | N | N | N | N | S | S | S |
| 143.75 | S | N | N | N | N | S | S | S | S | S | N | N | N | N | S | S | S |

Page Row 12, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 132.00 | N | S | S | S | S | N | N | N | N | N | S | S | S | S | N | N | N |
| 132.25 | N | S | S | S | S | N | N | N | N | N | S | S | S | S | N | N | N |
| 132.50 | N | S | S | S | S | O | N | N | N | N | S | S | S | S | N | N | N |
| 132.75 | N | S | S | S | S | S | N | N | N | N | S | S | S | S | O | N | N |
| 133.00 | N | S | S | S | S | S | N | N | N | N | S | S | S | S | S | N | N |
| 133.25 | N | S | S | S | S | S | N | N | N | N | S | S | S | S | S | N | N |
| 133.50 | N | O | S | S | S | S | N | N | N | N | S | S | S | S | S | N | N |
| 133.75 | N | N | S | S | S | S | N | N | N | N | O | S | S | S | S | N | N |
| 134.00 | N | N | S | S | S | S | N | N | N | N | N | S | S | S | S | N | N |
| 134.25 | N | N | S | S | S | S | N | N | N | N | N | S | S | S | S | N | N |
| 134.50 | N | N | S | S | S | S | N | N | N | N | N | S | S | S | S | N | N |
| 134.75 | N | N | S | S | S | S | O | N | N | N | N | S | S | S | S | N | N |
| 135.00 | N | N | S | S | S | S | S | N | N | N | N | S | S | S | S | O | N |
| 135.25 | N | N | S | S | S | S | S | N | N | N | N | S | S | S | S | S | N |
| 135.50 | N | N | S | S | S | S | S | N | N | N | N | S | S | S | S | S | N |
| 135.75 | N | N | O | S | S | S | S | N | N | N | N | S | S | S | S | S | N |
| 136.00 | N | N | N | S | S | S | S | N | N | N | N | O | S | S | S | S | N |
| 136.25 | N | N | N | S | S | S | S | N | N | N | N | N | S | S | S | S | N |
| 136.50 | N | N | N | S | S | S | S | N | N | N | N | N | S | S | S | S | N |
| 136.75 | N | N | N | S | S | S | S | N | N | N | N | N | S | S | S | S | N |
| 137.00 | N | N | N | S | S | S | S | O | N | N | N | N | S | S | S | S | N |
| 137.25 | N | N | N | S | S | S | S | S | N | N | N | N | S | S | S | S | O |
| 137.50 | N | N | N | S | S | S | S | S | N | N | N | N | S | S | S | S | S |
| 137.75 | N | N | N | S | S | S | S | S | N | N | N | N | S | S | S | S | S |
| 138.00 | N | N | N | O | S | S | S | S | N | N | N | N | S | S | S | S | S |
| 138.25 | N | N | N | N | S | S | S | S | N | N | N | N | O | S | S | S | S |
| 138.50 | N | N | N | N | S | S | S | S | N | N | N | N | N | S | S | S | S |
| 138.75 | N | N | N | N | S | S | S | S | N | N | N | N | N | S | S | S | S |
| 139.00 | N | N | N | N | S | S | S | S | N | N | N | N | N | S | S | S | S |
| 139.25 | N | N | N | N | S | S | S | S | O | N | N | N | N | S | S | S | S |
| 139.50 | N | N | N | N | S | S | S | S | S | N | N | N | N | S | S | S | S |
| 139.75 | N | N | N | N | S | S | S | S | S | N | N | N | N | S | S | S | S |
| 140.00 | N | N | N | N | S | S | S | S | S | N | N | N | N | S | S | S | S |
| 140.25 | N | N | N | N | O | S | S | S | S | N | N | N | N | S | S | S | S |
| 140.50 | N | N | N | N | N | S | S | S | S | N | N | N | N | O | S | S | S |
| 140.75 | N | N | N | N | N | S | S | S | S | N | N | N | N | N | S | S | S |
| 141.00 | N | N | N | N | N | S | S | S | S | N | N | N | N | N | S | S | S |
| 141.25 | O | N | N | N | N | S | S | S | S | N | N | N | N | N | S | S | S |
| 141.50 | S | N | N | N | N | S | S | S | S | O | N | N | N | N | S | S | S |
| 141.75 | S | N | N | N | N | S | S | S | S | S | N | N | N | N | S | S | S |
| 142.00 | S | N | N | N | N | S | S | S | S | S | N | N | N | N | S | S | S |
| 142.25 | S | N | N | N | N | S | S | S | S | S | N | N | N | N | S | S | S |

-continued

| Coil Excitation | | | | | | | | | | | | | | | | | |
|---|---|---|---|---|---|---|---|---|---|---|---|---|---|---|---|---|---|
| 142.50 | S | N | N | N | N | O | S | S | S | S | N | N | N | N | S | S | S |
| 142.75 | S | N | N | N | N | N | S | S | S | S | N | N | N | N | O | S | S |
| 143.00 | S | N | N | N | N | N | S | S | S | S | N | N | N | N | N | S | S |
| 143.25 | S | N | N | N | N | N | S | S | S | S | N | N | N | N | N | S | S |
| 143.50 | S | O | N | N | N | N | S | S | S | S | N | N | N | N | N | S | S |
| 143.75 | S | S | N | N | N | N | S | S | S | S | O | N | N | N | N | S | S |

Page Row 12, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 132.00 | N | N | S | S | S | S | N | N | N | N | O | S | S | S | S | N | N |
| 132.25 | N | N | S | S | S | S | N | N | N | N | N | S | S | S | S | N | N |
| 132.50 | N | N | S | S | S | S | N | N | N | N | N | S | S | S | S | N | N |
| 132.75 | N | N | S | S | S | S | N | N | N | N | N | S | S | S | S | N | N |
| 133.00 | N | N | S | S | S | S | O | N | N | N | N | S | S | S | S | N | N |
| 133.25 | N | N | S | S | S | S | S | N | N | N | N | S | S | S | S | O | N |
| 133.50 | N | N | S | S | S | S | S | N | N | N | N | S | S | S | S | S | N |
| 133.75 | N | N | S | S | S | S | S | N | N | N | N | S | S | S | S | S | N |
| 134.00 | N | N | O | S | S | S | S | N | N | N | N | S | S | S | S | S | N |
| 134.25 | N | N | N | S | S | S | S | N | N | N | N | O | S | S | S | S | N |
| 134.50 | N | N | N | S | S | S | S | N | N | N | N | N | S | S | S | S | N |
| 134.75 | N | N | N | S | S | S | S | N | N | N | N | N | S | S | S | S | N |
| 135.00 | N | N | N | S | S | S | S | N | N | N | N | N | S | S | S | S | N |
| 135.25 | N | N | N | S | S | S | S | O | N | N | N | N | S | S | S | S | N |
| 135.50 | N | N | N | S | S | S | S | S | N | N | N | N | S | S | S | S | O |
| 135.75 | N | N | N | S | S | S | S | S | N | N | N | N | S | S | S | S | S |
| 136.00 | N | N | N | S | S | S | S | S | N | N | N | N | S | S | S | S | S |
| 136.25 | N | N | N | O | S | S | S | S | N | N | N | N | S | S | S | S | S |
| 136.50 | N | N | N | N | S | S | S | S | N | N | N | N | O | S | S | S | S |
| 136.75 | N | N | N | N | S | S | S | S | N | N | N | N | N | S | S | S | S |
| 137.00 | N | N | N | N | S | S | S | S | N | N | N | N | N | S | S | S | S |
| 137.25 | N | N | N | N | S | S | S | S | N | N | N | N | N | S | S | S | S |
| 137.50 | N | N | N | N | S | S | S | S | O | N | N | N | N | S | S | S | S |
| 137.75 | N | N | N | N | S | S | S | S | S | N | N | N | N | S | S | S | S |
| 138.00 | N | N | N | N | S | S | S | S | S | N | N | N | N | S | S | S | S |
| 138.25 | N | N | N | N | S | S | S | S | S | N | N | N | N | S | S | S | S |
| 138.50 | N | N | N | N | O | S | S | S | S | N | N | N | N | S | S | S | S |
| 138.75 | N | N | N | N | N | S | S | S | S | N | N | N | N | O | S | S | S |
| 139.00 | N | N | N | N | N | S | S | S | S | N | N | N | N | N | S | S | S |
| 139.25 | N | N | N | N | N | S | S | S | S | N | N | N | N | N | S | S | S |
| 139.50 | O | N | N | N | N | S | S | S | S | N | N | N | N | N | S | S | S |
| 139.75 | S | N | N | N | N | S | S | S | S | O | N | N | N | N | S | S | S |
| 140.00 | S | N | N | N | N | S | S | S | S | S | N | N | N | N | S | S | S |
| 140.25 | S | N | N | N | N | S | S | S | S | S | N | N | N | N | S | S | S |
| 140.50 | S | N | N | N | N | S | S | S | S | S | N | N | N | N | S | S | S |
| 140.75 | S | N | N | N | N | O | S | S | S | S | N | N | N | N | S | S | S |
| 141.00 | S | N | N | N | N | N | S | S | S | S | N | N | N | N | O | S | S |
| 141.25 | S | N | N | N | N | N | S | S | S | S | N | N | N | N | N | S | S |
| 141.50 | S | N | N | N | N | N | S | S | S | S | N | N | N | N | N | S | S |
| 141.75 | S | O | N | N | N | N | S | S | S | S | N | N | N | N | N | S | S |
| 142.00 | S | S | N | N | N | N | S | S | S | S | O | N | N | N | N | S | S |
| 142.25 | S | S | N | N | N | N | S | S | S | S | S | N | N | N | N | S | S |
| 142.50 | S | S | N | N | N | N | S | S | S | S | S | N | N | N | N | S | S |
| 142.75 | S | S | N | N | N | N | S | S | S | S | S | N | N | N | N | S | S |
| 143.00 | S | S | N | N | N | N | O | S | S | S | S | N | N | N | N | S | S |
| 143.25 | S | S | N | N | N | N | N | S | S | S | S | N | N | N | N | O | S |
| 143.50 | S | S | N | N | N | N | N | S | S | S | S | N | N | N | N | N | S |
| 143.75 | S | S | N | N | N | N | N | S | S | S | S | N | N | N | N | N | S |

Page Row 12, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 132.00 | N | N | S | S | S | S | S | N | N | N | N | S | S | S | S | S | N |
| 132.25 | N | N | O | S | S | S | S | N | N | N | N | S | S | S | S | S | N |
| 132.50 | N | N | N | S | S | S | S | N | N | N | N | O | S | S | S | S | N |
| 132.75 | N | N | N | S | S | S | S | N | N | N | N | N | S | S | S | S | N |
| 133.00 | N | N | N | S | S | S | S | N | N | N | N | N | S | S | S | S | N |
| 133.25 | N | N | N | S | S | S | S | N | N | N | N | N | S | S | S | S | N |
| 133.50 | N | N | N | S | S | S | S | O | N | N | N | N | S | S | S | S | N |
| 133.75 | N | N | N | S | S | S | S | S | N | N | N | N | S | S | S | S | O |
| 134.00 | N | N | N | S | S | S | S | S | N | N | N | N | S | S | S | S | S |
| 134.25 | N | N | N | S | S | S | S | S | N | N | N | N | S | S | S | S | S |
| 134.50 | N | N | N | O | S | S | S | S | N | N | N | N | S | S | S | S | S |
| 134.75 | N | N | N | N | S | S | S | S | N | N | N | N | O | S | S | S | S |
| 135.00 | N | N | N | N | S | S | S | S | N | N | N | N | N | S | S | S | S |
| 135.25 | N | N | N | N | S | S | S | S | N | N | N | N | N | S | S | S | S |
| 135.50 | N | N | N | N | S | S | S | S | N | N | N | N | N | S | S | S | S |

-continued

Coil Excitation

| | | | | | | | | | | | | | | | | | |
|---|---|---|---|---|---|---|---|---|---|---|---|---|---|---|---|---|---|
| 135.75 | N | N | N | N | S | S | S | S | O | N | N | N | N | S | S | S | S |
| 136.00 | N | N | N | N | S | S | S | S | S | N | N | N | N | S | S | S | S |
| 136.25 | N | N | N | N | S | S | S | S | S | N | N | N | N | S | S | S | S |
| 136.50 | N | N | N | N | S | S | S | S | S | N | N | N | N | S | S | S | S |
| 136.75 | N | N | N | N | O | S | S | S | S | N | N | N | N | S | S | S | S |
| 137.00 | N | N | N | N | N | S | S | S | S | N | N | N | N | O | S | S | S |
| 137.25 | N | N | N | N | N | S | S | S | S | N | N | N | N | N | S | S | S |
| 137.50 | N | N | N | N | N | S | S | S | S | N | N | N | N | N | S | S | S |
| 137.75 | O | N | N | N | N | S | S | S | S | N | N | N | N | N | S | S | S |
| 138.00 | S | N | N | N | N | S | S | S | S | O | N | N | N | N | S | S | S |
| 138.25 | S | N | N | N | N | S | S | S | S | S | N | N | N | N | S | S | S |
| 138.50 | S | N | N | N | N | S | S | S | S | S | N | N | N | N | S | S | S |
| 138.75 | S | N | N | N | N | S | S | S | S | S | N | N | N | N | S | S | S |
| 139.00 | S | N | N | N | N | O | S | S | S | S | N | N | N | N | S | S | S |
| 139.25 | S | N | N | N | N | N | S | S | S | S | N | N | N | N | O | S | S |
| 139.50 | S | N | N | N | N | N | S | S | S | S | N | N | N | N | N | S | S |
| 139.75 | S | N | N | N | N | N | S | S | S | S | N | N | N | N | N | S | S |
| 140.00 | S | O | N | N | N | N | S | S | S | S | N | N | N | N | N | S | S |
| 140.25 | S | S | N | N | N | N | S | S | S | S | O | N | N | N | N | S | S |
| 140.50 | S | S | N | N | N | N | S | S | S | S | S | N | N | N | N | S | S |
| 140.75 | S | S | N | N | N | N | S | S | S | S | S | N | N | N | N | S | S |
| 141.00 | S | S | N | N | N | N | S | S | S | S | S | N | N | N | N | S | S |
| 141.25 | S | S | N | N | N | N | O | S | S | S | S | N | N | N | N | S | S |
| 141.50 | S | S | N | N | N | N | N | S | S | S | S | N | N | N | N | O | S |
| 141.75 | S | S | N | N | N | N | N | S | S | S | S | N | N | N | N | N | S |
| 142.00 | S | S | N | N | N | N | N | S | S | S | S | N | N | N | N | N | S |
| 142.25 | S | S | O | N | N | N | N | S | S | S | S | N | N | N | N | N | S |
| 142.50 | S | S | S | N | N | N | N | S | S | S | S | O | N | N | N | N | S |
| 142.75 | S | S | S | N | N | N | N | S | S | S | S | S | N | N | N | N | S |
| 143.00 | S | S | S | N | N | N | N | S | S | S | S | S | N | N | N | N | S |
| 143.25 | S | S | S | N | N | N | N | S | S | S | S | S | N | N | N | N | S |
| 143.50 | S | S | S | N | N | N | N | O | S | S | S | S | N | N | N | N | S |
| 143.75 | S | S | S | N | N | N | N | N | S | S | S | S | N | N | N | N | O |

Page Row 12, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 132.00 | N | N | N | S | S | S | S | S | N | N | N | N | S | S | S | S | O |
| 132.25 | N | N | N | S | S | S | S | S | N | N | N | N | S | S | S | S | S |
| 132.50 | N | N | N | S | S | S | S | S | N | N | N | N | S | S | S | S | S |
| 132.75 | N | N | N | O | S | S | S | S | N | N | N | N | S | S | S | S | S |
| 133.00 | N | N | N | N | S | S | S | S | N | N | N | N | O | S | S | S | S |
| 133.25 | N | N | N | N | S | S | S | S | N | N | N | N | N | S | S | S | S |
| 133.50 | N | N | N | N | S | S | S | S | N | N | N | N | N | S | S | S | S |
| 133.75 | N | N | N | N | S | S | S | S | N | N | N | N | N | S | S | S | S |
| 134.00 | N | N | N | N | S | S | S | S | O | N | N | N | N | S | S | S | S |
| 134.25 | N | N | N | N | S | S | S | S | S | N | N | N | N | S | S | S | S |
| 134.50 | N | N | N | N | S | S | S | S | S | N | N | N | N | S | S | S | S |
| 134.75 | N | N | N | N | S | S | S | S | S | N | N | N | N | S | S | S | S |
| 135.00 | N | N | N | N | O | S | S | S | S | N | N | N | N | S | S | S | S |
| 135.25 | N | N | N | N | N | S | S | S | S | N | N | N | N | O | S | S | S |
| 135.50 | N | N | N | N | N | S | S | S | S | N | N | N | N | N | S | S | S |
| 135.75 | N | N | N | N | N | S | S | S | S | N | N | N | N | N | S | S | S |
| 136.00 | O | N | N | N | N | S | S | S | S | N | N | N | N | N | S | S | S |
| 136.25 | S | N | N | N | N | S | S | S | S | O | N | N | N | N | S | S | S |
| 136.50 | S | N | N | N | N | S | S | S | S | S | N | N | N | N | S | S | S |
| 136.75 | S | N | N | N | N | S | S | S | S | S | N | N | N | N | S | S | S |
| 137.00 | S | N | N | N | N | S | S | S | S | S | N | N | N | N | S | S | S |
| 137.25 | S | N | N | N | N | O | S | S | S | S | N | N | N | N | S | S | S |
| 137.50 | S | N | N | N | N | N | S | S | S | S | N | N | N | N | O | S | S |
| 137.75 | S | N | N | N | N | N | S | S | S | S | N | N | N | N | N | S | S |
| 138.00 | S | N | N | N | N | N | S | S | S | S | N | N | N | N | N | S | S |
| 138.25 | S | O | N | N | N | N | S | S | S | S | N | N | N | N | N | S | S |
| 138.50 | S | S | N | N | N | N | S | S | S | S | O | N | N | N | N | S | S |
| 138.75 | S | S | N | N | N | N | S | S | S | S | S | N | N | N | N | S | S |
| 139.00 | S | S | N | N | N | N | S | S | S | S | S | N | N | N | N | S | S |
| 139.25 | S | S | N | N | N | N | S | S | S | S | S | N | N | N | N | S | S |
| 139.50 | S | S | N | N | N | N | O | S | S | S | S | N | N | N | N | S | S |
| 139.75 | S | S | N | N | N | N | N | S | S | S | S | N | N | N | N | O | S |
| 140.00 | S | S | N | N | N | N | N | S | S | S | S | N | N | N | N | N | S |
| 140.25 | S | S | N | N | N | N | N | S | S | S | S | N | N | N | N | N | S |
| 140.50 | S | S | O | N | N | N | N | S | S | S | S | N | N | N | N | N | S |
| 140.75 | S | S | S | N | N | N | N | S | S | S | S | O | N | N | N | N | S |
| 141.00 | S | S | S | N | N | N | N | S | S | S | S | S | N | N | N | N | S |
| 141.25 | S | S | S | N | N | N | N | S | S | S | S | S | N | N | N | N | S |
| 141.50 | S | S | S | N | N | N | N | S | S | S | S | S | N | N | N | N | S |
| 141.75 | S | S | S | N | N | N | N | O | S | S | S | S | N | N | N | N | S |

-continued

| Coil Excitation | | | | | | | | | | | | | | | | | |
|---|---|---|---|---|---|---|---|---|---|---|---|---|---|---|---|---|---|
| 142.00 | S | S | S | N | N | N | N | N | S | S | S | S | N | N | N | N | O |
| 142.25 | S | S | S | N | N | N | N | N | S | S | S | S | N | N | N | N | N |
| 142.50 | S | S | S | N | N | N | N | N | S | S | S | S | N | N | N | N | N |
| 142.75 | S | S | S | O | N | N | N | N | S | S | S | S | N | N | N | N | N |
| 143.00 | S | S | S | S | N | N | N | N | S | S | S | S | O | N | N | N | N |
| 143.25 | S | S | S | S | N | N | N | N | S | S | S | S | S | N | N | N | N |
| 143.50 | S | S | S | S | N | N | N | N | S | S | S | S | S | N | N | N | N |
| 143.75 | S | S | S | S | N | N | N | N | S | S | S | S | S | N | N | N | N |

Page Row 12, Page Column 9

| Coil | 154 | 155 | 156 | 157 | 158 | 159 | 160 |
|---|---|---|---|---|---|---|---|
| 132.00 | N | N | N | N | S | S | S |
| 132.25 | N | N | N | N | S | S | S |
| 132.50 | N | N | N | N | S | S | S |
| 132.75 | N | N | N | N | S | S | S |
| 133.00 | N | N | N | N | S | S | S |
| 133.25 | N | N | N | N | O | S | S |
| 133.50 | N | N | N | N | N | S | S |
| 133.75 | N | N | N | N | N | S | S |
| 134.00 | N | N | N | N | N | S | S |
| 134.25 | O | N | N | N | N | S | S |
| 134.50 | S | N | N | N | N | S | S |
| 134.75 | S | N | N | N | N | S | S |
| 135.00 | S | N | N | N | N | S | S |
| 135.25 | S | N | N | N | N | S | S |
| 135.50 | S | N | N | N | N | O | S |
| 135.75 | S | N | N | N | N | N | S |
| 136.00 | S | N | N | N | N | N | S |
| 136.25 | S | N | N | N | N | N | S |
| 136.50 | S | O | N | N | N | N | S |
| 136.75 | S | S | N | N | N | N | S |
| 137.00 | S | S | N | N | N | N | S |
| 137.25 | S | S | N | N | N | N | S |
| 137.50 | S | S | N | N | N | N | S |
| 137.75 | S | S | N | N | N | N | O |
| 138.00 | S | S | N | N | N | N | N |
| 138.25 | S | S | N | N | N | N | N |
| 138.50 | S | S | N | N | N | N | N |
| 138.75 | S | S | O | N | N | N | N |
| 139.00 | S | S | S | N | N | N | N |
| 139.25 | S | S | S | N | N | N | N |
| 139.50 | S | S | S | N | N | N | N |
| 139.75 | S | S | S | N | N | N | N |
| 140.00 | S | S | S | N | N | N | N |
| 140.25 | S | S | S | N | N | N | N |
| 140.50 | S | S | S | N | N | N | N |
| 140.75 | S | S | S | N | N | N | N |
| 141.00 | S | S | S | O | N | N | N |
| 141.25 | S | S | S | S | N | N | N |
| 141.50 | S | S | S | S | N | N | N |
| 141.75 | S | S | S | S | N | N | N |
| 142.00 | S | S | S | S | N | N | N |
| 142.25 | S | S | S | S | N | N | N |
| 142.50 | S | S | S | S | N | N | N |
| 142.75 | S | S | S | S | N | N | N |
| 143.00 | S | S | S | S | N | N | N |
| 143.25 | S | S | S | S | O | N | N |
| 143.50 | S | S | S | S | S | N | N |
| 143.75 | S | S | S | S | S | N | N |

Page Row 12, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 144.00 | N | N | S | S | S | S | S | N | N | N | N | S | S | S | S | S | N |
| 144.25 | N | N | S | S | S | S | S | N | N | N | N | S | S | S | S | S | N |
| 144.50 | N | N | O | S | S | S | S | N | N | N | N | S | S | S | S | S | N |
| 144.75 | N | N | N | S | S | S | S | N | N | N | N | O | S | S | S | S | N |
| 145.00 | N | N | N | S | S | S | S | N | N | N | N | N | S | S | S | S | N |
| 145.25 | N | N | N | S | S | S | S | N | N | N | N | N | S | S | S | S | N |
| 145.50 | N | N | N | S | S | S | S | N | N | N | N | N | S | S | S | S | N |
| 145.75 | N | N | N | S | S | S | S | O | N | N | N | N | S | S | S | S | N |
| 146.00 | N | N | N | S | S | S | S | S | N | N | N | N | S | S | S | S | O |
| 146.25 | N | N | N | S | S | S | S | S | N | N | N | N | S | S | S | S | S |
| 146.50 | N | N | N | S | S | S | S | S | N | N | N | N | S | S | S | S | S |
| 146.75 | N | N | N | O | S | S | S | S | N | N | N | N | S | S | S | S | S |
| 147.00 | N | N | N | N | S | S | S | S | N | N | N | N | O | S | S | S | S |

-continued

| Coil Excitation | | | | | | | | | | | | | | | | |
|---|---|---|---|---|---|---|---|---|---|---|---|---|---|---|---|---|---|
| 147.25 | N | N | N | N | S | S | S | S | N | N | N | N | N | S | S | S | S |
| 147.50 | N | N | N | N | S | S | S | S | N | N | N | N | N | S | S | S | S |
| 147.75 | N | N | N | N | S | S | S | S | N | N | N | N | N | S | S | S | S |
| 148.00 | N | N | N | N | S | S | S | S | O | N | N | N | N | S | S | S | S |
| 148.25 | N | N | N | N | S | S | S | S | S | N | N | N | N | S | S | S | S |
| 148.50 | N | N | N | N | S | S | S | S | S | N | N | N | N | S | S | S | S |
| 148.75 | N | N | N | N | S | S | S | S | S | N | N | N | N | S | S | S | S |
| 149.00 | N | N | N | N | O | S | S | S | S | N | N | N | N | S | S | S | S |
| 149.25 | N | N | N | N | N | S | S | S | S | N | N | N | N | O | S | S | S |
| 149.50 | N | N | N | N | N | S | S | S | S | N | N | N | N | N | S | S | S |
| 149.75 | N | N | N | N | N | S | S | S | S | N | N | N | N | N | S | S | S |
| 150.00 | O | N | N | N | N | S | S | S | S | N | N | N | N | N | S | S | S |
| 150.25 | S | N | N | N | N | S | S | S | S | O | N | N | N | N | S | S | S |
| 150.50 | S | N | N | N | N | S | S | S | S | S | N | N | N | N | S | S | S |
| 150.75 | S | N | N | N | N | S | S | S | S | S | N | N | N | N | S | S | S |
| 151.00 | S | N | N | N | N | S | S | S | S | S | N | N | N | N | S | S | S |
| 151.25 | S | N | N | N | N | O | S | S | S | S | N | N | N | N | S | S | S |
| 151.50 | S | N | N | N | N | N | S | S | S | S | N | N | N | N | O | S | S |
| 151.75 | S | N | N | N | N | N | S | S | S | S | N | N | N | N | N | S | S |
| 152.00 | S | N | N | N | N | N | S | S | S | S | N | N | N | N | N | S | S |
| 152.25 | S | O | N | N | N | N | S | S | S | S | N | N | N | N | N | S | S |
| 152.50 | S | S | N | N | N | N | S | S | S | S | O | N | N | N | N | S | S |
| 152.75 | S | S | N | N | N | N | S | S | S | S | S | N | N | N | N | S | S |
| 153.00 | S | S | N | N | N | N | S | S | S | S | S | N | N | N | N | S | S |
| 153.25 | S | S | N | N | N | N | S | S | S | S | S | N | N | N | N | S | S |
| 153.50 | S | S | N | N | N | N | O | S | S | S | S | N | N | N | N | S | S |
| 153.75 | S | S | N | N | N | N | N | S | S | S | S | N | N | N | N | O | S |
| 154.00 | S | S | N | N | N | N | N | S | S | S | S | N | N | N | N | N | S |
| 154.25 | S | S | N | N | N | N | N | S | S | S | S | N | N | N | N | N | S |
| 154.50 | S | S | O | N | N | N | N | S | S | S | S | N | N | N | N | N | S |
| 154.75 | S | S | S | N | N | N | N | S | S | S | S | O | N | N | N | N | S |
| 155.00 | S | S | S | N | N | N | N | S | S | S | S | S | N | N | N | N | S |
| 155.25 | S | S | S | N | N | N | N | S | S | S | S | S | N | N | N | N | S |
| 155.50 | S | S | S | N | N | N | N | S | S | S | S | S | N | N | N | N | S |
| 155.75 | S | S | S | N | N | N | N | O | S | S | S | S | N | N | N | N | S |

Page Row 13, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 144.00 | N | N | N | S | S | S | S | O | N | N | N | N | S | S | S | S | N |
| 144.25 | N | N | N | S | S | S | S | S | N | N | N | N | S | S | S | S | O |
| 144.50 | N | N | N | S | S | S | S | S | N | N | N | N | S | S | S | S | S |
| 144.75 | N | N | N | S | S | S | S | S | N | N | N | N | S | S | S | S | S |
| 145.00 | N | N | N | O | S | S | S | S | N | N | N | N | S | S | S | S | S |
| 145.25 | N | N | N | N | S | S | S | S | N | N | N | N | O | S | S | S | S |
| 145.50 | N | N | N | N | S | S | S | S | N | N | N | N | N | S | S | S | S |
| 145.75 | N | N | N | N | S | S | S | S | N | N | N | N | N | S | S | S | S |
| 146.00 | N | N | N | N | S | S | S | S | N | N | N | N | N | S | S | S | S |
| 146.25 | N | N | N | N | S | S | S | S | O | N | N | N | N | S | S | S | S |
| 146.50 | N | N | N | N | S | S | S | S | S | N | N | N | N | S | S | S | S |
| 146.75 | N | N | N | N | S | S | S | S | S | N | N | N | N | S | S | S | S |
| 147.00 | N | N | N | N | S | S | S | S | S | N | N | N | N | S | S | S | S |
| 147.25 | N | N | N | N | O | S | S | S | S | N | N | N | N | S | S | S | S |
| 147.50 | N | N | N | N | N | S | S | S | S | N | N | N | N | O | S | S | S |
| 147.75 | N | N | N | N | N | S | S | S | S | N | N | N | N | N | S | S | S |
| 148.00 | N | N | N | N | N | S | S | S | S | N | N | N | N | N | S | S | S |
| 148.25 | O | N | N | N | N | S | S | S | S | N | N | N | N | N | S | S | S |
| 148.50 | S | N | N | N | N | S | S | S | S | O | N | N | N | N | S | S | S |
| 148.75 | S | N | N | N | N | S | S | S | S | S | N | N | N | N | S | S | S |
| 149.00 | S | N | N | N | N | S | S | S | S | S | N | N | N | N | S | S | S |
| 149.25 | S | N | N | N | N | S | S | S | S | S | N | N | N | N | S | S | S |
| 149.50 | S | N | N | N | N | O | S | S | S | S | N | N | N | N | S | S | S |
| 149.75 | S | N | N | N | N | N | S | S | S | S | N | N | N | N | O | S | S |
| 150.00 | S | N | N | N | N | N | S | S | S | S | N | N | N | N | N | S | S |
| 150.25 | S | N | N | N | N | N | S | S | S | S | N | N | N | N | N | S | S |
| 150.50 | S | O | N | N | N | N | S | S | S | S | N | N | N | N | N | S | S |
| 150.75 | S | S | N | N | N | N | S | S | S | S | O | N | N | N | N | S | S |
| 151.00 | S | S | N | N | N | N | S | S | S | S | S | N | N | N | N | S | S |
| 151.25 | S | S | N | N | N | N | S | S | S | S | S | N | N | N | N | S | S |
| 151.50 | S | S | N | N | N | N | S | S | S | S | S | N | N | N | N | S | S |
| 151.75 | S | S | N | N | N | N | O | S | S | S | S | N | N | N | N | S | S |
| 152.00 | S | S | N | N | N | N | N | S | S | S | S | N | N | N | N | O | S |
| 152.25 | S | S | N | N | N | N | N | S | S | S | S | N | N | N | N | N | S |
| 152.50 | S | S | N | N | N | N | N | S | S | S | S | N | N | N | N | N | S |
| 152.75 | S | S | O | N | N | N | N | S | S | S | S | N | N | N | N | N | S |
| 153.00 | S | S | S | N | N | N | N | S | S | S | S | O | N | N | N | N | S |
| 153.25 | S | S | S | N | N | N | N | S | S | S | S | S | N | N | N | N | S |

-continued

| Coil Excitation | | | | | | | | | | | | | | | | | |
|---|---|---|---|---|---|---|---|---|---|---|---|---|---|---|---|---|---|
| 153.50 | S | S | S | N | N | N | N | S | S | S | S | S | N | N | N | N | S |
| 153.75 | S | S | S | N | N | N | N | S | S | S | S | S | N | N | N | N | S |
| 154.00 | S | S | S | N | N | N | N | O | S | S | S | S | N | N | N | N | S |
| 154.25 | S | S | S | N | N | N | N | N | S | S | S | S | N | N | N | N | O |
| 154.50 | S | S | S | N | N | N | N | N | S | S | S | S | N | N | N | N | N |
| 154.75 | S | S | S | N | N | N | N | N | S | S | S | S | N | N | N | N | N |
| 155.00 | S | S | S | O | N | N | N | N | S | S | S | S | N | N | N | N | N |
| 155.25 | S | S | S | S | N | N | N | N | S | S | S | S | O | N | N | N | N |
| 155.50 | S | S | S | S | N | N | N | N | S | S | S | S | S | N | N | N | N |
| 155.75 | S | S | S | S | N | N | N | N | S | S | S | S | S | N | N | N | N |

Page Row 13, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 144.00 | N | N | N | N | S | S | S | S | N | N | N | N | N | S | S | S | S |
| 144.25 | N | N | N | N | S | S | S | S | N | N | N | N | N | S | S | S | S |
| 144.50 | N | N | N | N | S | S | S | S | O | N | N | N | N | S | S | S | S |
| 144.75 | N | N | N | N | S | S | S | S | S | N | N | N | N | S | S | S | S |
| 145.00 | N | N | N | N | S | S | S | S | S | N | N | N | N | S | S | S | S |
| 145.25 | N | N | N | N | S | S | S | S | S | N | N | N | N | S | S | S | S |
| 145.50 | N | N | N | N | O | S | S | S | S | N | N | N | N | S | S | S | S |
| 145.75 | N | N | N | N | N | S | S | S | S | N | N | N | N | O | S | S | S |
| 146.00 | N | N | N | N | N | S | S | S | S | N | N | N | N | N | S | S | S |
| 146.25 | N | N | N | N | N | S | S | S | S | N | N | N | N | N | S | S | S |
| 146.50 | O | N | N | N | N | S | S | S | S | N | N | N | N | N | S | S | S |
| 146.75 | S | N | N | N | N | S | S | S | S | O | N | N | N | N | S | S | S |
| 147.00 | S | N | N | N | N | S | S | S | S | S | N | N | N | N | S | S | S |
| 147.25 | S | N | N | N | N | S | S | S | S | S | N | N | N | N | S | S | S |
| 147.50 | S | N | N | N | N | S | S | S | S | S | N | N | N | N | S | S | S |
| 147.75 | S | N | N | N | N | O | S | S | S | S | N | N | N | N | S | S | S |
| 148.00 | S | N | N | N | N | N | S | S | S | S | N | N | N | N | O | S | S |
| 148.25 | S | N | N | N | N | N | S | S | S | S | N | N | N | N | N | S | S |
| 148.50 | S | N | N | N | N | N | S | S | S | S | N | N | N | N | N | S | S |
| 148.75 | S | O | N | N | N | N | S | S | S | S | N | N | N | N | N | S | S |
| 149.00 | S | S | N | N | N | N | S | S | S | S | O | N | N | N | N | S | S |
| 149.25 | S | S | N | N | N | N | S | S | S | S | S | N | N | N | N | S | S |
| 149.50 | S | S | N | N | N | N | S | S | S | S | S | N | N | N | N | S | S |
| 149.75 | S | S | N | N | N | N | S | S | S | S | S | N | N | N | N | S | S |
| 150.00 | S | S | N | N | N | N | O | S | S | S | S | N | N | N | N | S | S |
| 150.25 | S | S | N | N | N | N | N | S | S | S | S | N | N | N | N | O | S |
| 150.50 | S | S | N | N | N | N | N | S | S | S | S | N | N | N | N | N | S |
| 150.75 | S | S | N | N | N | N | N | S | S | S | S | N | N | N | N | N | S |
| 151.00 | S | S | O | N | N | N | N | S | S | S | S | N | N | N | N | N | S |
| 151.25 | S | S | S | N | N | N | N | S | S | S | S | O | N | N | N | N | S |
| 151.50 | S | S | S | N | N | N | N | S | S | S | S | S | N | N | N | N | S |
| 151.75 | S | S | S | N | N | N | N | S | S | S | S | S | N | N | N | N | S |
| 152.00 | S | S | S | N | N | N | N | S | S | S | S | S | N | N | N | N | S |
| 152.25 | S | S | S | N | N | N | N | O | S | S | S | S | N | N | N | N | S |
| 152.50 | S | S | S | N | N | N | N | N | S | S | S | S | N | N | N | N | O |
| 152.75 | S | S | S | N | N | N | N | N | S | S | S | S | N | N | N | N | N |
| 153.00 | S | S | S | N | N | N | N | N | S | S | S | S | N | N | N | N | N |
| 153.25 | S | S | S | O | N | N | N | N | S | S | S | S | N | N | N | N | N |
| 153.50 | S | S | S | S | N | N | N | N | S | S | S | S | O | N | N | N | N |
| 153.75 | S | S | S | S | N | N | N | N | S | S | S | S | S | N | N | N | N |
| 154.00 | S | S | S | S | N | N | N | N | S | S | S | S | S | N | N | N | N |
| 154.25 | S | S | S | S | N | N | N | N | S | S | S | S | S | N | N | N | N |
| 154.50 | S | S | S | S | N | N | N | N | O | S | S | S | S | N | N | N | N |
| 154.75 | S | S | S | S | N | N | N | N | N | S | S | S | S | N | N | N | N |
| 155.00 | S | S | S | S | N | N | N | N | N | S | S | S | S | N | N | N | N |
| 155.25 | S | S | S | S | N | N | N | N | N | S | S | S | S | N | N | N | N |
| 155.50 | S | S | S | S | O | N | N | N | N | S | S | S | S | N | N | N | N |
| 155.75 | S | S | S | S | S | N | N | N | N | S | S | S | S | O | N | N | N |

Page Row 13, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 144.00 | N | N | N | N | N | S | S | S | S | N | N | N | N | O | S | S | S |
| 144.25 | N | N | N | N | N | S | S | S | S | N | N | N | N | N | S | S | S |
| 144.50 | N | N | N | N | N | S | S | S | S | N | N | N | N | N | S | S | S |
| 144.75 | O | N | N | N | N | S | S | S | S | N | N | N | N | N | S | S | S |
| 145.00 | S | N | N | N | N | S | S | S | S | O | N | N | N | N | S | S | S |
| 145.25 | S | N | N | N | N | S | S | S | S | S | N | N | N | N | S | S | S |
| 145.50 | S | N | N | N | N | S | S | S | S | S | N | N | N | N | S | S | S |
| 145.75 | S | N | N | N | N | S | S | S | S | S | N | N | N | N | S | S | S |
| 146.00 | S | N | N | N | N | O | S | S | S | S | N | N | N | N | S | S | S |
| 146.25 | S | N | N | N | N | N | S | S | S | S | N | N | N | N | O | S | S |
| 146.50 | S | N | N | N | N | N | S | S | S | S | N | N | N | N | N | S | S |

-continued

| Coil Excitation | | | | | | | | | | | | | | | | | |
|---|---|---|---|---|---|---|---|---|---|---|---|---|---|---|---|---|---|
| 146.75 | S | N | N | N | N | N | S | S | S | S | N | N | N | N | N | S | S |
| 147.00 | S | O | N | N | N | N | S | S | S | S | N | N | N | N | N | S | S |
| 147.25 | S | S | N | N | N | N | S | S | S | S | O | N | N | N | N | S | S |
| 147.50 | S | S | N | N | N | N | S | S | S | S | S | N | N | N | N | S | S |
| 147.75 | S | S | N | N | N | N | S | S | S | S | S | N | N | N | N | S | S |
| 148.00 | S | S | N | N | N | N | S | S | S | S | S | N | N | N | N | S | S |
| 148.25 | S | S | N | N | N | N | O | S | S | S | S | N | N | N | N | S | S |
| 148.50 | S | S | N | N | N | N | N | S | S | S | S | N | N | N | N | O | S |
| 148.75 | S | S | N | N | N | N | N | S | S | S | S | N | N | N | N | N | S |
| 149.00 | S | S | N | N | N | N | N | S | S | S | S | N | N | N | N | N | S |
| 149.25 | S | S | O | N | N | N | N | S | S | S | S | N | N | N | N | N | S |
| 149.50 | S | S | S | N | N | N | N | S | S | S | S | O | N | N | N | N | S |
| 149.75 | S | S | S | N | N | N | N | S | S | S | S | S | N | N | N | N | S |
| 150.00 | S | S | S | N | N | N | N | S | S | S | S | S | N | N | N | N | S |
| 150.25 | S | S | S | N | N | N | N | S | S | S | S | S | N | N | N | N | S |
| 150.50 | S | S | S | N | N | N | N | O | S | S | S | S | N | N | N | N | S |
| 150.75 | S | S | S | N | N | N | N | N | S | S | S | S | N | N | N | N | O |
| 151.00 | S | S | S | N | N | N | N | N | S | S | S | S | N | N | N | N | N |
| 151.25 | S | S | S | N | N | N | N | N | S | S | S | S | N | N | N | N | N |
| 151.50 | S | S | S | O | N | N | N | N | S | S | S | S | N | N | N | N | N |
| 151.75 | S | S | S | S | N | N | N | N | S | S | S | S | O | N | N | N | N |
| 152.00 | S | S | S | S | N | N | N | N | S | S | S | S | S | N | N | N | N |
| 152.25 | S | S | S | S | N | N | N | N | S | S | S | S | S | N | N | N | N |
| 152.50 | S | S | S | S | N | N | N | N | S | S | S | S | S | N | N | N | N |
| 152.75 | S | S | S | S | N | N | N | N | O | S | S | S | S | N | N | N | N |
| 153.00 | S | S | S | S | N | N | N | N | N | S | S | S | S | N | N | N | N |
| 153.25 | S | S | S | S | N | N | N | N | N | S | S | S | S | N | N | N | N |
| 153.50 | S | S | S | S | N | N | N | N | N | S | S | S | S | N | N | N | N |
| 153.75 | S | S | S | S | O | N | N | N | N | S | S | S | S | N | N | N | N |
| 154.00 | S | S | S | S | S | N | N | N | N | S | S | S | S | O | N | N | N |
| 154.25 | S | S | S | S | S | N | N | N | N | S | S | S | S | S | N | N | N |
| 154.50 | S | S | S | S | S | N | N | N | N | S | S | S | S | S | N | N | N |
| 154.75 | O | S | S | S | S | N | N | N | N | S | S | S | S | S | N | N | N |
| 155.00 | N | S | S | S | S | N | N | N | N | O | S | S | S | S | N | N | N |
| 155.25 | N | S | S | S | S | N | N | N | N | N | S | S | S | S | N | N | N |
| 155.50 | N | S | S | S | S | N | N | N | N | N | S | S | S | S | N | N | N |
| 155.75 | N | S | S | S | S | N | N | N | N | N | S | S | S | S | N | N | N |

Page Row 13, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 144.00 | S | N | N | N | N | S | S | S | S | S | N | N | N | N | S | S | S |
| 144.25 | S | N | N | N | N | O | S | S | S | S | N | N | N | N | S | S | S |
| 144.50 | S | N | N | N | N | N | S | S | S | S | N | N | N | N | O | S | S |
| 144.75 | S | N | N | N | N | N | S | S | S | S | N | N | N | N | N | S | S |
| 145.00 | S | N | N | N | N | N | S | S | S | S | N | N | N | N | N | S | S |
| 145.25 | S | O | N | N | N | N | S | S | S | S | N | N | N | N | N | S | S |
| 145.50 | S | S | N | N | N | N | S | S | S | S | O | N | N | N | N | S | S |
| 145.75 | S | S | N | N | N | N | S | S | S | S | S | N | N | N | N | S | S |
| 146.00 | S | S | N | N | N | N | S | S | S | S | S | N | N | N | N | S | S |
| 146.25 | S | S | N | N | N | N | S | S | S | S | S | N | N | N | N | S | S |
| 146.50 | S | S | N | N | N | N | O | S | S | S | S | N | N | N | N | S | S |
| 146.75 | S | S | N | N | N | N | N | S | S | S | S | N | N | N | N | O | S |
| 147.00 | S | S | N | N | N | N | N | S | S | S | S | N | N | N | N | N | S |
| 147.25 | S | S | N | N | N | N | N | S | S | S | S | N | N | N | N | N | S |
| 147.50 | S | S | O | N | N | N | N | S | S | S | S | N | N | N | N | N | S |
| 147.75 | S | S | S | N | N | N | N | S | S | S | S | O | N | N | N | N | S |
| 148.00 | S | S | S | N | N | N | N | S | S | S | S | S | N | N | N | N | S |
| 148.25 | S | S | S | N | N | N | N | S | S | S | S | S | N | N | N | N | S |
| 148.50 | S | S | S | N | N | N | N | S | S | S | S | S | N | N | N | N | S |
| 148.75 | S | S | S | N | N | N | N | O | S | S | S | S | N | N | N | N | S |
| 149.00 | S | S | S | N | N | N | N | N | S | S | S | S | N | N | N | N | O |
| 149.25 | S | S | S | N | N | N | N | N | S | S | S | S | N | N | N | N | N |
| 149.50 | S | S | S | N | N | N | N | N | S | S | S | S | N | N | N | N | N |
| 149.75 | S | S | S | O | N | N | N | N | S | S | S | S | N | N | N | N | N |
| 150.00 | S | S | S | S | N | N | N | N | S | S | S | S | O | N | N | N | N |
| 150.25 | S | S | S | S | N | N | N | N | S | S | S | S | S | N | N | N | N |
| 150.50 | S | S | S | S | N | N | N | N | S | S | S | S | S | N | N | N | N |
| 150.75 | S | S | S | S | N | N | N | N | S | S | S | S | S | N | N | N | N |
| 151.00 | S | S | S | S | N | N | N | N | O | S | S | S | S | N | N | N | N |
| 151.25 | S | S | S | S | N | N | N | N | N | S | S | S | S | N | N | N | N |
| 151.50 | S | S | S | S | N | N | N | N | N | S | S | S | S | N | N | N | N |
| 151.75 | S | S | S | S | N | N | N | N | N | S | S | S | S | N | N | N | N |
| 152.00 | S | S | S | S | O | N | N | N | N | S | S | S | S | N | N | N | N |
| 152.25 | S | S | S | S | S | N | N | N | N | S | S | S | S | O | N | N | N |
| 152.50 | S | S | S | S | S | N | N | N | N | S | S | S | S | S | N | N | N |
| 152.75 | S | S | S | S | S | N | N | N | N | S | S | S | S | S | N | N | N |

-continued

| | Coil Excitation | | | | | | | | | | | | | | | | |
|---|---|---|---|---|---|---|---|---|---|---|---|---|---|---|---|---|---|
| 153.00 | O | S | S | S | S | N | N | N | N | S | S | S | S | S | N | N | N |
| 153.25 | N | S | S | S | S | N | N | N | N | O | S | S | S | S | N | N | N |
| 153.50 | N | S | S | S | S | N | N | N | N | N | S | S | S | S | N | N | N |
| 153.75 | N | S | S | S | S | N | N | N | N | N | S | S | S | S | N | N | N |
| 154.00 | N | S | S | S | S | N | N | N | N | N | S | S | S | S | N | N | N |
| 154.25 | N | S | S | S | S | O | N | N | N | N | S | S | S | S | N | N | N |
| 154.50 | N | S | S | S | S | S | N | N | N | N | S | S | S | S | O | N | N |
| 154.75 | N | S | S | S | S | S | N | N | N | N | S | S | S | S | S | N | N |
| 155.00 | N | S | S | S | S | S | N | N | N | N | S | S | S | S | S | N | N |
| 155.25 | N | O | S | S | S | S | N | N | N | N | S | S | S | S | S | N | N |
| 155.50 | N | N | S | S | S | S | N | N | N | N | O | S | S | S | S | N | N |
| 155.75 | N | N | S | S | S | S | N | N | N | N | N | S | S | S | S | N | N |

Page Row 13, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 144.00 | S | S | N | N | N | N | S | S | S | S | S | N | N | N | N | S | S |
| 144.25 | S | S | N | N | N | N | S | S | S | S | S | N | N | N | N | S | S |
| 144.50 | S | S | N | N | N | N | S | S | S | S | S | N | N | N | N | S | S |
| 144.75 | S | S | N | N | N | N | O | S | S | S | S | N | N | N | N | S | S |
| 145.00 | S | S | N | N | N | N | N | S | S | S | S | N | N | N | N | O | S |
| 145.25 | S | S | N | N | N | N | N | S | S | S | S | N | N | N | N | N | S |
| 145.50 | S | S | N | N | N | N | N | S | S | S | S | N | N | N | N | N | S |
| 145.75 | S | S | O | N | N | N | N | S | S | S | S | N | N | N | N | N | S |
| 146.00 | S | S | S | N | N | N | N | S | S | S | S | O | N | N | N | N | S |
| 146.25 | S | S | S | N | N | N | N | S | S | S | S | S | N | N | N | N | S |
| 146.50 | S | S | S | N | N | N | N | S | S | S | S | S | N | N | N | N | S |
| 146.75 | S | S | S | N | N | N | N | S | S | S | S | S | N | N | N | N | S |
| 147.00 | S | S | S | N | N | N | N | O | S | S | S | S | N | N | N | N | S |
| 147.25 | S | S | S | N | N | N | N | N | S | S | S | S | N | N | N | N | O |
| 147.50 | S | S | S | N | N | N | N | N | S | S | S | S | N | N | N | N | N |
| 147.75 | S | S | S | N | N | N | N | N | S | S | S | S | N | N | N | N | N |
| 148.00 | S | S | S | O | N | N | N | N | S | S | S | S | N | N | N | N | N |
| 148.25 | S | S | S | S | N | N | N | N | S | S | S | S | O | N | N | N | N |
| 148.50 | S | S | S | S | N | N | N | N | S | S | S | S | S | N | N | N | N |
| 148.75 | S | S | S | S | N | N | N | N | S | S | S | S | S | N | N | N | N |
| 149.00 | S | S | S | S | N | N | N | N | S | S | S | S | S | N | N | N | N |
| 149.25 | S | S | S | S | N | N | N | N | O | S | S | S | S | N | N | N | N |
| 149.50 | S | S | S | S | N | N | N | N | N | S | S | S | S | N | N | N | N |
| 149.75 | S | S | S | S | N | N | N | N | N | S | S | S | S | N | N | N | N |
| 150.00 | S | S | S | S | N | N | N | N | N | S | S | S | S | N | N | N | N |
| 150.25 | S | S | S | S | O | N | N | N | N | S | S | S | S | N | N | N | N |
| 150.50 | S | S | S | S | S | N | N | N | N | S | S | S | S | O | N | N | N |
| 150.75 | S | S | S | S | S | N | N | N | N | S | S | S | S | S | N | N | N |
| 151.00 | S | S | S | S | S | N | N | N | N | S | S | S | S | S | N | N | N |
| 151.25 | O | S | S | S | S | N | N | N | N | S | S | S | S | S | N | N | N |
| 151.50 | N | S | S | S | S | N | N | N | N | O | S | S | S | S | N | N | N |
| 151.75 | N | S | S | S | S | N | N | N | N | N | S | S | S | S | N | N | N |
| 152.00 | N | S | S | S | S | N | N | N | N | N | S | S | S | S | N | N | N |
| 152.25 | N | S | S | S | S | N | N | N | N | N | S | S | S | S | N | N | N |
| 152.50 | N | S | S | S | S | O | N | N | N | N | S | S | S | S | N | N | N |
| 152.75 | N | S | S | S | S | S | N | N | N | N | S | S | S | S | O | N | N |
| 153.00 | N | S | S | S | S | S | N | N | N | N | S | S | S | S | S | N | N |
| 153.25 | N | S | S | S | S | S | N | N | N | N | S | S | S | S | S | N | N |
| 153.50 | N | O | S | S | S | S | N | N | N | N | S | S | S | S | S | N | N |
| 153.75 | N | N | S | S | S | S | N | N | N | N | O | S | S | S | S | N | N |
| 154.00 | N | N | S | S | S | S | N | N | N | N | N | S | S | S | S | N | N |
| 154.25 | N | N | S | S | S | S | N | N | N | N | N | S | S | S | S | N | N |
| 154.50 | N | N | S | S | S | S | N | N | N | N | N | S | S | S | S | N | N |
| 154.75 | N | N | S | S | S | S | O | N | N | N | N | S | S | S | S | N | N |
| 155.00 | N | N | S | S | S | S | S | N | N | N | N | S | S | S | S | O | N |
| 155.25 | N | N | S | S | S | S | S | N | N | N | N | S | S | S | S | S | N |
| 155.50 | N | N | S | S | S | S | S | N | N | N | N | S | S | S | S | S | N |
| 155.75 | N | N | O | S | S | S | S | N | N | N | N | S | S | S | S | S | N |

Page Row 13, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 144.00 | S | S | O | N | N | N | N | S | S | S | S | N | N | N | N | N | S |
| 144.25 | S | S | S | N | N | N | N | S | S | S | S | O | N | N | N | N | S |
| 144.50 | S | S | S | N | N | N | N | S | S | S | S | S | N | N | N | N | S |
| 144.75 | S | S | S | N | N | N | N | S | S | S | S | S | N | N | N | N | S |
| 145.00 | S | S | S | N | N | N | N | S | S | S | S | S | N | N | N | N | S |
| 145.25 | S | S | S | N | N | N | N | O | S | S | S | S | N | N | N | N | S |
| 145.50 | S | S | S | N | N | N | N | N | S | S | S | S | N | N | N | N | O |
| 145.75 | S | S | S | N | N | N | N | N | S | S | S | S | N | N | N | N | N |
| 146.00 | S | S | S | N | N | N | N | N | S | S | S | S | N | N | N | N | N |

-continued

| Coil Excitation | | | | | | | | | | | | | | | | | |
|---|---|---|---|---|---|---|---|---|---|---|---|---|---|---|---|---|---|
| 146.25 | S | S | S | O | N | N | N | N | S | S | S | S | N | N | N | N | N |
| 146.50 | S | S | S | S | N | N | N | N | S | S | S | S | O | N | N | N | N |
| 146.75 | S | S | S | S | N | N | N | N | S | S | S | S | S | N | N | N | N |
| 147.00 | S | S | S | S | N | N | N | N | S | S | S | S | S | N | N | N | N |
| 147.25 | S | S | S | S | N | N | N | N | S | S | S | S | S | N | N | N | N |
| 147.50 | S | S | S | S | N | N | N | N | O | S | S | S | S | N | N | N | N |
| 147.75 | S | S | S | S | N | N | N | N | N | S | S | S | S | N | N | N | N |
| 148.00 | S | S | S | S | N | N | N | N | N | S | S | S | S | N | N | N | N |
| 148.25 | S | S | S | S | N | N | N | N | N | S | S | S | S | N | N | N | N |
| 148.50 | S | S | S | S | O | N | N | N | N | S | S | S | S | N | N | N | N |
| 148.75 | S | S | S | S | S | N | N | N | N | S | S | S | S | O | N | N | N |
| 149.00 | S | S | S | S | S | N | N | N | N | S | S | S | S | S | N | N | N |
| 149.25 | S | S | S | S | S | N | N | N | N | S | S | S | S | S | N | N | N |
| 149.50 | O | S | S | S | S | N | N | N | N | S | S | S | S | S | N | N | N |
| 149.75 | N | S | S | S | S | N | N | N | N | O | S | S | S | S | N | N | N |
| 150.00 | N | S | S | S | S | N | N | N | N | N | S | S | S | S | N | N | N |
| 150.25 | N | S | S | S | S | N | N | N | N | N | S | S | S | S | N | N | N |
| 150.50 | N | S | S | S | S | N | N | N | N | N | S | S | S | S | N | N | N |
| 150.75 | N | S | S | S | S | O | N | N | N | N | S | S | S | S | N | N | N |
| 151.00 | N | S | S | S | S | S | N | N | N | N | S | S | S | S | O | N | N |
| 151.25 | N | S | S | S | S | S | N | N | N | N | S | S | S | S | S | N | N |
| 151.50 | N | S | S | S | S | S | N | N | N | N | S | S | S | S | S | N | N |
| 151.75 | N | O | S | S | S | S | N | N | N | N | S | S | S | S | S | N | N |
| 152.00 | N | N | S | S | S | S | N | N | N | N | O | S | S | S | S | N | N |
| 152.25 | N | N | S | S | S | S | N | N | N | N | N | S | S | S | S | N | N |
| 152.50 | N | N | S | S | S | S | N | N | N | N | N | S | S | S | S | N | N |
| 152.75 | N | N | S | S | S | S | N | N | N | N | N | S | S | S | S | N | N |
| 153.00 | N | N | S | S | S | S | O | N | N | N | N | S | S | S | S | N | N |
| 153.25 | N | N | S | S | S | S | S | N | N | N | N | S | S | S | S | O | N |
| 153.50 | N | N | S | S | S | S | S | N | N | N | N | S | S | S | S | S | N |
| 153.75 | N | N | S | S | S | S | S | N | N | N | N | S | S | S | S | S | N |
| 154.00 | N | N | O | S | S | S | S | N | N | N | N | S | S | S | S | S | N |
| 154.25 | N | N | N | S | S | S | S | N | N | N | N | O | S | S | S | S | N |
| 154.50 | N | N | N | S | S | S | S | N | N | N | N | N | S | S | S | S | N |
| 154.75 | N | N | N | S | S | S | S | N | N | N | N | N | S | S | S | S | N |
| 155.00 | N | N | N | S | S | S | S | N | N | N | N | N | S | S | S | S | N |
| 155.25 | N | N | N | S | S | S | S | O | N | N | N | N | S | S | S | S | N |
| 155.50 | N | N | N | S | S | S | S | S | N | N | N | N | S | S | S | S | O |
| 155.75 | N | N | N | S | S | S | S | S | N | N | N | N | S | S | S | S | S |

Page Row 13, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 144.00 | S | S | S | N | N | N | N | N | S | S | S | S | N | N | N | N | N |
| 144.25 | S | S | S | N | N | N | N | N | S | S | S | S | N | N | N | N | N |
| 144.50 | S | S | S | O | N | N | N | N | S | S | S | S | N | N | N | N | N |
| 144.75 | S | S | S | S | N | N | N | N | S | S | S | S | O | N | N | N | N |
| 145.00 | S | S | S | S | N | N | N | N | S | S | S | S | S | N | N | N | N |
| 145.25 | S | S | S | S | N | N | N | N | S | S | S | S | S | N | N | N | N |
| 145.50 | S | S | S | S | N | N | N | N | S | S | S | S | S | N | N | N | N |
| 145.75 | S | S | S | S | N | N | N | N | O | S | S | S | S | N | N | N | N |
| 146.00 | S | S | S | S | N | N | N | N | N | S | S | S | S | N | N | N | N |
| 146.25 | S | S | S | S | N | N | N | N | N | S | S | S | S | N | N | N | N |
| 146.50 | S | S | S | S | N | N | N | N | N | S | S | S | S | N | N | N | N |
| 146.75 | S | S | S | S | O | N | N | N | N | S | S | S | S | N | N | N | N |
| 147.00 | S | S | S | S | S | N | N | N | N | S | S | S | S | O | N | N | N |
| 147.25 | S | S | S | S | S | N | N | N | N | S | S | S | S | S | N | N | N |
| 147.50 | S | S | S | S | S | N | N | N | N | S | S | S | S | S | N | N | N |
| 147.75 | O | S | S | S | S | N | N | N | N | S | S | S | S | S | N | N | N |
| 148.00 | N | S | S | S | S | N | N | N | N | O | S | S | S | S | N | N | N |
| 148.25 | N | S | S | S | S | N | N | N | N | N | S | S | S | S | N | N | N |
| 148.50 | N | S | S | S | S | N | N | N | N | N | S | S | S | S | N | N | N |
| 148.75 | N | S | S | S | S | N | N | N | N | N | S | S | S | S | N | N | N |
| 149.00 | N | S | S | S | S | O | N | N | N | N | S | S | S | S | N | N | N |
| 149.25 | N | S | S | S | S | S | N | N | N | N | S | S | S | S | O | N | N |
| 149.50 | N | S | S | S | S | S | N | N | N | N | S | S | S | S | S | N | N |
| 149.75 | N | S | S | S | S | S | N | N | N | N | S | S | S | S | S | N | N |
| 150.00 | N | O | S | S | S | S | N | N | N | N | S | S | S | S | S | N | N |
| 150.25 | N | N | S | S | S | S | N | N | N | N | O | S | S | S | S | N | N |
| 150.50 | N | N | S | S | S | S | N | N | N | N | N | S | S | S | S | N | N |
| 150.75 | N | N | S | S | S | S | N | N | N | N | N | S | S | S | S | N | N |
| 151.00 | N | N | S | S | S | S | N | N | N | N | N | S | S | S | S | N | N |
| 151.25 | N | N | S | S | S | S | O | N | N | N | N | S | S | S | S | N | N |
| 151.50 | N | N | S | S | S | S | S | N | N | N | N | S | S | S | S | O | N |
| 151.75 | N | N | S | S | S | S | S | N | N | N | N | S | S | S | S | S | N |
| 152.00 | N | N | S | S | S | S | S | N | N | N | N | S | S | S | S | S | N |
| 152.25 | N | N | O | S | S | S | S | N | N | N | N | S | S | S | S | S | N |

-continued

Coil Excitation

| | | | | | | | | | | | | | | | | | |
|---|---|---|---|---|---|---|---|---|---|---|---|---|---|---|---|---|---|
| 152.50 | N | N | N | S | S | S | S | N | N | N | N | O | S | S | S | S | N |
| 152.75 | N | N | N | S | S | S | S | N | N | N | N | N | S | S | S | S | N |
| 153.00 | N | N | N | S | S | S | S | N | N | N | N | N | S | S | S | S | N |
| 153.25 | N | N | N | S | S | S | S | N | N | N | N | N | S | S | S | S | N |
| 153.50 | N | N | N | S | S | S | S | O | N | N | N | N | S | S | S | S | N |
| 153.75 | N | N | N | S | S | S | S | S | N | N | N | N | S | S | S | S | O |
| 154.00 | N | N | N | S | S | S | S | S | N | N | N | N | S | S | S | S | S |
| 154.25 | N | N | N | S | S | S | S | S | N | N | N | N | S | S | S | S | S |
| 154.50 | N | N | N | O | S | S | S | S | N | N | N | N | S | S | S | S | S |
| 154.75 | N | N | N | N | S | S | S | S | N | N | N | N | O | S | S | S | S |
| 155.00 | N | N | N | N | S | S | S | S | N | N | N | N | N | S | S | S | S |
| 155.25 | N | N | N | N | S | S | S | S | N | N | N | N | N | S | S | S | S |
| 155.50 | N | N | N | N | S | S | S | S | N | N | N | N | N | S | S | S | S |
| 155.75 | N | N | N | N | S | S | S | S | O | N | N | N | N | S | S | S | S |

Page Row 13, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 144.00 | S | S | S | S | N | N | N | N | O | S | S | S | S | N | N | N | N |
| 144.25 | S | S | S | S | N | N | N | N | N | S | S | S | S | N | N | N | N |
| 144.50 | S | S | S | S | N | N | N | N | N | S | S | S | S | N | N | N | N |
| 144.75 | S | S | S | S | N | N | N | N | N | S | S | S | S | N | N | N | N |
| 145.00 | S | S | S | S | O | N | N | N | N | S | S | S | S | N | N | N | N |
| 145.25 | S | S | S | S | S | N | N | N | N | S | S | S | S | O | N | N | N |
| 145.50 | S | S | S | S | S | N | N | N | N | S | S | S | S | S | N | N | N |
| 145.75 | S | S | S | S | S | N | N | N | N | S | S | S | S | S | N | N | N |
| 146.00 | O | S | S | S | S | N | N | N | N | S | S | S | S | S | N | N | N |
| 146.25 | N | S | S | S | S | N | N | N | N | O | S | S | S | S | N | N | N |
| 146.50 | N | S | S | S | S | N | N | N | N | N | S | S | S | S | N | N | N |
| 146.75 | N | S | S | S | S | N | N | N | N | N | S | S | S | S | N | N | N |
| 147.00 | N | S | S | S | S | N | N | N | N | N | S | S | S | S | N | N | N |
| 147.25 | N | S | S | S | S | O | N | N | N | N | S | S | S | S | N | N | N |
| 147.50 | N | S | S | S | S | S | N | N | N | N | S | S | S | S | O | N | N |
| 147.75 | N | S | S | S | S | S | N | N | N | N | S | S | S | S | S | N | N |
| 148.00 | N | S | S | S | S | S | N | N | N | N | S | S | S | S | S | N | N |
| 148.25 | N | O | S | S | S | S | N | N | N | N | S | S | S | S | S | N | N |
| 148.50 | N | N | S | S | S | S | N | N | N | N | O | S | S | S | S | N | N |
| 148.75 | N | N | S | S | S | S | N | N | N | N | N | S | S | S | S | N | N |
| 149.00 | N | N | S | S | S | S | N | N | N | N | N | S | S | S | S | N | N |
| 149.25 | N | N | S | S | S | S | N | N | N | N | N | S | S | S | S | N | N |
| 149.50 | N | N | S | S | S | S | O | N | N | N | N | S | S | S | S | N | N |
| 149.75 | N | N | S | S | S | S | S | N | N | N | N | S | S | S | S | O | N |
| 150.00 | N | N | S | S | S | S | S | N | N | N | N | S | S | S | S | S | N |
| 150.25 | N | N | S | S | S | S | S | N | N | N | N | S | S | S | S | S | N |
| 150.50 | N | N | O | S | S | S | S | N | N | N | N | S | S | S | S | S | N |
| 150.75 | N | N | N | S | S | S | S | N | N | N | N | O | S | S | S | S | N |
| 151.00 | N | N | N | S | S | S | S | N | N | N | N | N | S | S | S | S | N |
| 151.25 | N | N | N | S | S | S | S | N | N | N | N | N | S | S | S | S | N |
| 151.50 | N | N | N | S | S | S | S | N | N | N | N | N | S | S | S | S | N |
| 151.75 | N | N | N | S | S | S | S | O | N | N | N | N | S | S | S | S | N |
| 152.00 | N | N | N | S | S | S | S | S | N | N | N | N | S | S | S | S | O |
| 152.25 | N | N | N | S | S | S | S | S | N | N | N | N | S | S | S | S | S |
| 152.50 | N | N | N | S | S | S | S | S | N | N | N | N | S | S | S | S | S |
| 152.75 | N | N | N | O | S | S | S | S | N | N | N | N | S | S | S | S | S |
| 153.00 | N | N | N | N | S | S | S | S | N | N | N | N | O | S | S | S | S |
| 153.25 | N | N | N | N | S | S | S | S | N | N | N | N | N | S | S | S | S |
| 153.50 | N | N | N | N | S | S | S | S | N | N | N | N | N | S | S | S | S |
| 153.75 | N | N | N | N | S | S | S | S | N | N | N | N | N | S | S | S | S |
| 154.00 | N | N | N | N | S | S | S | S | O | N | N | N | N | S | S | S | S |
| 154.25 | N | N | N | N | S | S | S | S | S | N | N | N | N | S | S | S | S |
| 154.50 | N | N | N | N | S | S | S | S | S | N | N | N | N | S | S | S | S |
| 154.75 | N | N | N | N | S | S | S | S | S | N | N | N | N | S | S | S | S |
| 155.00 | N | N | N | N | O | S | S | S | S | N | N | N | N | S | S | S | S |
| 155.25 | N | N | N | N | N | S | S | S | S | N | N | N | N | O | S | S | S |
| 155.50 | N | N | N | N | N | S | S | S | S | N | N | N | N | N | S | S | S |
| 155.75 | N | N | N | N | N | S | S | S | S | N | N | N | N | N | S | S | S |

Page Row 13, Page Column 9

| Coil | 154 | 155 | 156 | 157 | 158 | 159 | 160 |
|---|---|---|---|---|---|---|---|
| 144.00 | S | S | S | S | S | N | N |
| 144.25 | O | S | S | S | S | N | N |
| 144.50 | N | S | S | S | S | N | N |
| 144.75 | N | S | S | S | S | N | N |
| 145.00 | N | S | S | S | S | N | N |
| 145.25 | N | S | S | S | S | N | N |
| 145.50 | N | S | S | S | S | O | N |

-continued

| Coil Excitation | | | | | | | |
|---|---|---|---|---|---|---|---|
| 145.75 | N | S | S | S | S | S | N |
| 146.00 | N | S | S | S | S | S | N |
| 146.25 | N | S | S | S | S | S | N |
| 146.50 | N | O | S | S | S | S | N |
| 146.75 | N | N | S | S | S | S | N |
| 147.00 | N | N | S | S | S | S | N |
| 147.25 | N | N | S | S | S | S | N |
| 147.50 | N | N | S | S | S | S | N |
| 147.75 | N | N | S | S | S | S | O |
| 148.00 | N | N | S | S | S | S | S |
| 148.25 | N | N | S | S | S | S | S |
| 148.50 | N | N | S | S | S | S | S |
| 148.75 | N | N | O | S | S | S | S |
| 149.00 | N | N | N | S | S | S | S |
| 149.25 | N | N | N | S | S | S | S |
| 149.50 | N | N | N | S | S | S | S |
| 149.75 | N | N | N | S | S | S | S |
| 150.00 | N | N | N | S | S | S | S |
| 150.25 | N | N | N | S | S | S | S |
| 150.50 | N | N | N | S | S | S | S |
| 150.75 | N | N | N | S | S | S | S |
| 151.00 | N | N | N | O | S | S | S |
| 151.25 | N | N | N | N | S | S | S |
| 151.50 | N | N | N | N | S | S | S |
| 151.75 | N | N | N | N | S | S | S |
| 152.00 | N | N | N | N | S | S | S |
| 152.25 | N | N | N | N | S | S | S |
| 152.50 | N | N | N | N | S | S | S |
| 152.75 | N | N | N | N | S | S | S |
| 153.00 | N | N | N | N | S | S | S |
| 153.25 | N | N | N | N | O | S | S |
| 153.50 | N | N | N | N | N | S | S |
| 153.75 | N | N | N | N | N | S | S |
| 154.00 | N | N | N | N | N | S | S |
| 154.25 | O | N | N | N | N | S | S |
| 154.50 | S | N | N | N | N | S | S |
| 154.75 | S | N | N | N | N | S | S |
| 155.00 | S | N | N | N | N | S | S |
| 155.25 | S | N | N | N | N | S | S |
| 155.50 | S | N | N | N | N | O | S |
| 155.75 | S | N | N | N | N | N | S |

Page Row 13, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 156.00 | S | S | S | N | N | N | N | N | S | S | S | S | N | N | N | N | O |
| 156.25 | S | S | S | N | N | N | N | N | S | S | S | S | N | N | N | N | N |
| 156.50 | S | S | S | N | N | N | N | N | S | S | S | S | N | N | N | N | N |
| 156.75 | S | S | S | O | N | N | N | N | S | S | S | S | N | N | N | N | N |
| 157.00 | S | S | S | S | N | N | N | N | S | S | S | S | O | N | N | N | N |
| 157.25 | S | S | S | S | N | N | N | N | S | S | S | S | S | N | N | N | N |
| 157.50 | S | S | S | S | N | N | N | N | S | S | S | S | S | N | N | N | N |
| 157.75 | S | S | S | S | N | N | N | N | S | S | S | S | S | N | N | N | N |
| 158.00 | S | S | S | S | N | N | N | N | O | S | S | S | S | N | N | N | N |
| 158.25 | S | S | S | S | N | N | N | N | N | S | S | S | S | N | N | N | N |
| 158.50 | S | S | S | S | N | N | N | N | N | S | S | S | S | N | N | N | N |
| 158.75 | S | S | S | S | N | N | N | N | N | S | S | S | S | N | N | N | N |
| 159.00 | S | S | S | S | O | N | N | N | N | S | S | S | S | N | N | N | N |
| 159.25 | S | S | S | S | S | N | N | N | N | S | S | S | S | O | N | N | N |
| 159.50 | S | S | S | S | S | N | N | N | N | S | S | S | S | S | N | N | N |
| 159.75 | S | S | S | S | S | N | N | N | N | S | S | S | S | S | N | N | N |
| 160.00 | O | S | S | S | S | N | N | N | N | S | S | S | S | S | N | N | N |
| 160.25 | N | S | S | S | S | N | N | N | N | O | S | S | S | S | N | N | N |
| 160.50 | N | S | S | S | S | N | N | N | N | N | S | S | S | S | N | N | N |
| 160.75 | N | S | S | S | S | N | N | N | N | N | S | S | S | S | N | N | N |
| 161.00 | N | S | S | S | S | N | N | N | N | N | S | S | S | S | N | N | N |
| 161.25 | N | S | S | S | S | O | N | N | N | N | S | S | S | S | N | N | N |
| 161.50 | N | S | S | S | S | S | N | N | N | N | S | S | S | S | O | N | N |
| 161.75 | N | S | S | S | S | S | N | N | N | N | S | S | S | S | S | N | N |
| 162.00 | N | S | S | S | S | S | N | N | N | N | S | S | S | S | S | N | N |
| 162.25 | N | O | S | S | S | S | N | N | N | N | S | S | S | S | S | N | N |
| 162.50 | N | N | S | S | S | S | N | N | N | N | O | S | S | S | S | N | N |
| 162.75 | N | N | S | S | S | S | N | N | N | N | N | S | S | S | S | N | N |
| 163.00 | N | N | S | S | S | S | N | N | N | N | N | S | S | S | S | N | N |
| 163.25 | N | N | S | S | S | S | N | N | N | N | N | S | S | S | S | N | N |
| 163.50 | N | N | S | S | S | S | O | N | N | N | N | S | S | S | S | N | N |
| 163.75 | N | N | S | S | S | S | S | N | N | N | N | S | S | S | S | O | N |

-continued

Coil Excitation

| | | | | | | | | | | | | | | | | | |
|---|---|---|---|---|---|---|---|---|---|---|---|---|---|---|---|---|---|
| 164.00 | N | N | S | S | S | S | S | N | N | N | N | S | S | S | S | S | N |
| 164.25 | N | N | S | S | S | S | S | N | N | N | N | S | S | S | S | S | N |
| 164.50 | N | N | O | S | S | S | S | N | N | N | N | S | S | S | S | S | N |
| 164.75 | N | N | N | S | S | S | S | N | N | N | N | O | S | S | S | S | N |
| 165.00 | N | N | N | S | S | S | S | N | N | N | N | N | S | S | S | S | N |
| 165.25 | N | N | N | S | S | S | S | N | N | N | N | N | S | S | S | S | N |
| 165.50 | N | N | N | S | S | S | S | N | N | N | N | N | S | S | S | S | N |
| 165.75 | N | N | N | S | S | S | S | O | N | N | N | N | S | S | S | S | N |
| 166.00 | N | N | N | S | S | S | S | S | N | N | N | N | S | S | S | S | O |
| 166.25 | N | N | N | S | S | S | S | S | N | N | N | N | S | S | S | S | S |
| 166.50 | N | N | N | S | S | S | S | S | N | N | N | N | S | S | S | S | S |
| 166.75 | N | N | N | O | S | S | S | S | N | N | N | N | S | S | S | S | S |
| 167.00 | N | N | N | N | S | S | S | S | N | N | N | N | O | S | S | S | S |
| 167.25 | N | N | N | N | S | S | S | S | N | N | N | N | N | S | S | S | S |
| 167.50 | N | N | N | N | S | S | S | S | N | N | N | N | N | S | S | S | S |
| 167.75 | N | N | N | N | S | S | S | S | N | N | N | N | N | S | S | S | S |

Page Row 14, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 156.00 | S | S | S | S | N | N | N | N | S | S | S | S | S | N | N | N | N |
| 156.25 | S | S | S | S | N | N | N | N | O | S | S | S | S | N | N | N | N |
| 156.50 | S | S | S | S | N | N | N | N | N | S | S | S | S | N | N | N | N |
| 156.75 | S | S | S | S | N | N | N | N | N | S | S | S | S | N | N | N | N |
| 157.00 | S | S | S | S | N | N | N | N | N | S | S | S | S | N | N | N | N |
| 157.25 | S | S | S | S | O | N | N | N | N | S | S | S | S | N | N | N | N |
| 157.50 | S | S | S | S | S | N | N | N | N | S | S | S | S | O | N | N | N |
| 157.75 | S | S | S | S | S | N | N | N | N | S | S | S | S | S | N | N | N |
| 158.00 | S | S | S | S | S | N | N | N | N | S | S | S | S | S | N | N | N |
| 158.25 | O | S | S | S | S | N | N | N | N | S | S | S | S | S | N | N | N |
| 158.50 | N | S | S | S | S | N | N | N | N | O | S | S | S | S | N | N | N |
| 158.75 | N | S | S | S | S | N | N | N | N | N | S | S | S | S | N | N | N |
| 159.00 | N | S | S | S | S | N | N | N | N | N | S | S | S | S | N | N | N |
| 159.25 | N | S | S | S | S | N | N | N | N | N | S | S | S | S | N | N | N |
| 159.50 | N | S | S | S | S | O | N | N | N | N | S | S | S | S | N | N | N |
| 159.75 | N | S | S | S | S | S | N | N | N | N | S | S | S | S | O | N | N |
| 160.00 | N | S | S | S | S | S | N | N | N | N | S | S | S | S | S | N | N |
| 160.25 | N | S | S | S | S | S | N | N | N | N | S | S | S | S | S | N | N |
| 160.50 | N | O | S | S | S | S | N | N | N | N | S | S | S | S | S | N | N |
| 160.75 | N | N | S | S | S | S | N | N | N | N | O | S | S | S | S | N | N |
| 161.00 | N | N | S | S | S | S | N | N | N | N | N | S | S | S | S | N | N |
| 161.25 | N | N | S | S | S | S | N | N | N | N | N | S | S | S | S | N | N |
| 161.50 | N | N | S | S | S | S | N | N | N | N | N | S | S | S | S | N | N |
| 161.75 | N | N | S | S | S | S | O | N | N | N | N | S | S | S | S | N | N |
| 162.00 | N | N | S | S | S | S | S | N | N | N | N | S | S | S | S | O | N |
| 162.25 | N | N | S | S | S | S | S | N | N | N | N | S | S | S | S | S | N |
| 162.50 | N | N | S | S | S | S | S | N | N | N | N | S | S | S | S | S | N |
| 162.75 | N | N | O | S | S | S | S | N | N | N | N | S | S | S | S | S | N |
| 163.00 | N | N | N | S | S | S | S | N | N | N | N | O | S | S | S | S | N |
| 163.25 | N | N | N | S | S | S | S | N | N | N | N | N | S | S | S | S | N |
| 163.50 | N | N | N | S | S | S | S | N | N | N | N | N | S | S | S | S | N |
| 163.75 | N | N | N | S | S | S | S | N | N | N | N | N | S | S | S | S | N |
| 164.00 | N | N | N | S | S | S | S | O | N | N | N | N | S | S | S | S | N |
| 164.25 | N | N | N | S | S | S | S | S | N | N | N | N | S | S | S | S | O |
| 164.50 | N | N | N | S | S | S | S | S | N | N | N | N | S | S | S | S | S |
| 164.75 | N | N | N | S | S | S | S | S | N | N | N | N | S | S | S | S | S |
| 165.00 | N | N | N | O | S | S | S | S | N | N | N | N | S | S | S | S | S |
| 165.25 | N | N | N | N | S | S | S | S | N | N | N | N | O | S | S | S | S |
| 165.50 | N | N | N | N | S | S | S | S | N | N | N | N | N | S | S | S | S |
| 165.75 | N | N | N | N | S | S | S | S | N | N | N | N | N | S | S | S | S |
| 166.00 | N | N | N | N | S | S | S | S | N | N | N | N | N | S | S | S | S |
| 166.25 | N | N | N | N | S | S | S | S | O | N | N | N | N | S | S | S | S |
| 166.50 | N | N | N | N | S | S | S | S | S | N | N | N | N | S | S | S | S |
| 166.75 | N | N | N | N | S | S | S | S | S | N | N | N | N | S | S | S | S |
| 167.00 | N | N | N | N | S | S | S | S | S | N | N | N | N | S | S | S | S |
| 167.25 | N | N | N | N | O | S | S | S | S | N | N | N | N | S | S | S | S |
| 167.50 | N | N | N | N | N | S | S | S | S | N | N | N | N | O | S | S | S |
| 167.75 | N | N | N | N | N | S | S | S | S | N | N | N | N | N | S | S | S |

Page Row 14, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 156.00 | S | S | S | S | S | N | N | N | N | S | S | S | S | S | N | N | N |
| 156.25 | S | S | S | S | S | N | N | N | N | S | S | S | S | S | N | N | N |
| 156.50 | O | S | S | S | S | N | N | N | N | S | S | S | S | S | N | N | N |
| 156.75 | N | S | S | S | S | N | N | N | N | O | S | S | S | S | N | N | N |
| 157.00 | N | S | S | S | S | N | N | N | N | N | S | S | S | S | N | N | N |

-continued

| | | | | | | | | | | | | | | | | | |
|---|---|---|---|---|---|---|---|---|---|---|---|---|---|---|---|---|---|
| Coil Excitation | | | | | | | | | | | | | | | | | |
| 157.25 | N | S | S | S | S | N | N | N | N | N | S | S | S | S | N | N | N |
| 157.50 | N | S | S | S | S | N | N | N | N | N | S | S | S | S | N | N | N |
| 157.75 | N | S | S | S | S | O | N | N | N | N | S | S | S | S | N | N | N |
| 158.00 | N | S | S | S | S | S | N | N | N | N | S | S | S | S | O | N | N |
| 158.25 | N | S | S | S | S | S | N | N | N | N | S | S | S | S | S | N | N |
| 158.50 | N | S | S | S | S | S | N | N | N | N | S | S | S | S | S | N | N |
| 158.75 | N | O | S | S | S | S | N | N | N | N | S | S | S | S | S | N | N |
| 159.00 | N | N | S | S | S | S | N | N | N | N | O | S | S | S | S | N | N |
| 159.25 | N | N | S | S | S | S | N | N | N | N | N | S | S | S | S | N | N |
| 159.50 | N | N | S | S | S | S | N | N | N | N | N | S | S | S | S | N | N |
| 159.75 | N | N | S | S | S | S | N | N | N | N | N | S | S | S | S | N | N |
| 160.00 | N | N | S | S | S | S | O | N | N | N | N | S | S | S | S | N | N |
| 160.25 | N | N | S | S | S | S | S | N | N | N | N | S | S | S | S | O | N |
| 160.50 | N | N | S | S | S | S | S | N | N | N | N | S | S | S | S | S | N |
| 160.75 | N | N | S | S | S | S | S | N | N | N | N | S | S | S | S | S | N |
| 161.00 | N | N | O | S | S | S | S | N | N | N | N | S | S | S | S | S | N |
| 161.25 | N | N | N | S | S | S | S | N | N | N | N | O | S | S | S | S | N |
| 161.50 | N | N | N | S | S | S | S | N | N | N | N | N | S | S | S | S | N |
| 161.75 | N | N | N | S | S | S | S | N | N | N | N | N | S | S | S | S | N |
| 162.00 | N | N | N | S | S | S | S | N | N | N | N | N | S | S | S | S | N |
| 162.25 | N | N | N | S | S | S | S | O | N | N | N | N | S | S | S | S | N |
| 162.50 | N | N | N | S | S | S | S | S | N | N | N | N | S | S | S | S | O |
| 162.75 | N | N | N | S | S | S | S | S | N | N | N | N | S | S | S | S | S |
| 163.00 | N | N | N | S | S | S | S | S | N | N | N | N | S | S | S | S | S |
| 163.25 | N | N | N | O | S | S | S | S | N | N | N | N | S | S | S | S | S |
| 163.50 | N | N | N | N | S | S | S | S | N | N | N | N | O | S | S | S | S |
| 163.75 | N | N | N | N | S | S | S | S | N | N | N | N | N | S | S | S | S |
| 164.00 | N | N | N | N | S | S | S | S | N | N | N | N | N | S | S | S | S |
| 164.25 | N | N | N | N | S | S | S | S | N | N | N | N | N | S | S | S | S |
| 164.50 | N | N | N | N | S | S | S | S | O | N | N | N | N | S | S | S | S |
| 164.75 | N | N | N | N | S | S | S | S | S | N | N | N | N | S | S | S | S |
| 165.00 | N | N | N | N | S | S | S | S | S | N | N | N | N | S | S | S | S |
| 165.25 | N | N | N | N | S | S | S | S | S | N | N | N | N | S | S | S | S |
| 165.50 | N | N | N | N | O | S | S | S | S | N | N | N | N | S | S | S | S |
| 165.75 | N | N | N | N | N | S | S | S | S | N | N | N | N | O | S | S | S |
| 166.00 | N | N | N | N | N | S | S | S | S | N | N | N | N | N | S | S | S |
| 166.25 | N | N | N | N | N | S | S | S | S | N | N | N | N | N | S | S | S |
| 166.50 | O | N | N | N | N | S | S | S | S | N | N | N | N | N | S | S | S |
| 166.75 | S | N | N | N | N | S | S | S | S | O | N | N | N | N | S | S | S |
| 167.00 | S | N | N | N | N | S | S | S | S | S | N | N | N | N | S | S | S |
| 167.25 | S | N | N | N | N | S | S | S | S | S | N | N | N | N | S | S | S |
| 167.50 | S | N | N | N | N | S | S | S | S | S | N | N | N | N | S | S | S |
| 167.75 | S | N | N | N | N | O | S | S | S | S | N | N | N | N | S | S | S |

Page Row 14, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 156.00 | N | S | S | S | S | O | N | N | N | N | S | S | S | S | N | N | N |
| 156.25 | N | S | S | S | S | S | N | N | N | N | S | S | S | S | O | N | N |
| 156.50 | N | S | S | S | S | S | N | N | N | N | S | S | S | S | S | N | N |
| 156.75 | N | S | S | S | S | S | N | N | N | N | S | S | S | S | S | N | N |
| 157.00 | N | O | S | S | S | S | N | N | N | N | S | S | S | S | S | N | N |
| 157.25 | N | N | S | S | S | S | N | N | N | N | O | S | S | S | S | N | N |
| 157.50 | N | N | S | S | S | S | N | N | N | N | N | S | S | S | S | N | N |
| 157.75 | N | N | S | S | S | S | N | N | N | N | N | S | S | S | S | N | N |
| 158.00 | N | N | S | S | S | S | N | N | N | N | N | S | S | S | S | N | N |
| 158.25 | N | N | S | S | S | S | O | N | N | N | N | S | S | S | S | N | N |
| 158.50 | N | N | S | S | S | S | S | N | N | N | N | S | S | S | S | O | N |
| 158.75 | N | N | S | S | S | S | S | N | N | N | N | S | S | S | S | S | N |
| 159.00 | N | N | S | S | S | S | S | N | N | N | N | S | S | S | S | S | N |
| 159.25 | N | N | O | S | S | S | S | N | N | N | N | S | S | S | S | S | N |
| 159.50 | N | N | N | S | S | S | S | N | N | N | N | O | S | S | S | S | N |
| 159.75 | N | N | N | S | S | S | S | N | N | N | N | N | S | S | S | S | N |
| 160.00 | N | N | N | S | S | S | S | N | N | N | N | N | S | S | S | S | N |
| 160.25 | N | N | N | S | S | S | S | N | N | N | N | N | S | S | S | S | N |
| 160.50 | N | N | N | S | S | S | S | O | N | N | N | N | S | S | S | S | N |
| 160.75 | N | N | N | S | S | S | S | S | N | N | N | N | S | S | S | S | O |
| 161.00 | N | N | N | S | S | S | S | S | N | N | N | N | S | S | S | S | S |
| 161.25 | N | N | N | S | S | S | S | S | N | N | N | N | S | S | S | S | S |
| 161.50 | N | N | N | O | S | S | S | S | N | N | N | N | S | S | S | S | S |
| 161.75 | N | N | N | N | S | S | S | S | N | N | N | N | O | S | S | S | S |
| 162.00 | N | N | N | N | S | S | S | S | N | N | N | N | N | S | S | S | S |
| 162.25 | N | N | N | N | S | S | S | S | N | N | N | N | N | S | S | S | S |
| 162.50 | N | N | N | N | S | S | S | S | N | N | N | N | N | S | S | S | S |
| 162.75 | N | N | N | N | S | S | S | S | O | N | N | N | N | S | S | S | S |
| 163.00 | N | N | N | N | S | S | S | S | S | N | N | N | N | S | S | S | S |
| 163.25 | N | N | N | N | S | S | S | S | S | N | N | N | N | S | S | S | S |

-continued

Coil Excitation

| | | | | | | | | | | | | | | | | | |
|---|---|---|---|---|---|---|---|---|---|---|---|---|---|---|---|---|---|
| 163.50 | N | N | N | N | S | S | S | S | S | N | N | N | N | S | S | S | S |
| 163.75 | N | N | N | N | O | S | S | S | S | N | N | N | N | S | S | S | S |
| 164.00 | N | N | N | N | N | S | S | S | S | N | N | N | N | O | S | S | S |
| 164.25 | N | N | N | N | N | S | S | S | S | N | N | N | N | N | S | S | S |
| 164.50 | N | N | N | N | N | S | S | S | S | N | N | N | N | N | S | S | S |
| 164.75 | O | N | N | N | N | S | S | S | S | N | N | N | N | N | S | S | S |
| 165.00 | S | N | N | N | N | S | S | S | S | O | N | N | N | N | S | S | S |
| 165.25 | S | N | N | N | N | S | S | S | S | S | N | N | N | N | S | S | S |
| 165.50 | S | N | N | N | N | S | S | S | S | S | N | N | N | N | S | S | S |
| 165.75 | S | N | N | N | N | S | S | S | S | S | N | N | N | N | S | S | S |
| 166.00 | S | N | N | N | N | O | S | S | S | S | N | N | N | N | S | S | S |
| 166.25 | S | N | N | N | N | N | S | S | S | S | N | N | N | N | O | S | S |
| 166.50 | S | N | N | N | N | N | S | S | S | S | N | N | N | N | N | S | S |
| 166.75 | S | N | N | N | N | N | S | S | S | S | N | N | N | N | N | S | S |
| 167.00 | S | O | N | N | N | N | S | S | S | S | N | N | N | N | N | S | S |
| 167.25 | S | S | N | N | N | N | S | S | S | S | O | N | N | N | N | S | S |
| 167.50 | S | S | N | N | N | N | S | S | S | S | S | N | N | N | N | S | S |
| 167.75 | S | S | N | N | N | N | S | S | S | S | S | N | N | N | N | S | S |

Page Row 14, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 156.00 | N | N | S | S | S | S | N | N | N | N | N | S | S | S | S | N | N |
| 156.25 | N | N | S | S | S | S | N | N | N | N | N | S | S | S | S | N | N |
| 156.50 | N | N | S | S | S | S | O | N | N | N | N | S | S | S | S | N | N |
| 156.75 | N | N | S | S | S | S | S | N | N | N | N | S | S | S | S | O | N |
| 157.00 | N | N | S | S | S | S | S | N | N | N | N | S | S | S | S | S | N |
| 157.25 | N | N | S | S | S | S | S | N | N | N | N | S | S | S | S | S | N |
| 157.50 | N | N | O | S | S | S | S | N | N | N | N | S | S | S | S | S | N |
| 157.75 | N | N | N | S | S | S | S | N | N | N | N | O | S | S | S | S | N |
| 158.00 | N | N | N | S | S | S | S | N | N | N | N | N | S | S | S | S | N |
| 158.25 | N | N | N | S | S | S | S | N | N | N | N | N | S | S | S | S | N |
| 158.50 | N | N | N | S | S | S | S | N | N | N | N | N | S | S | S | S | N |
| 158.75 | N | N | N | S | S | S | S | O | N | N | N | N | S | S | S | S | N |
| 159.00 | N | N | N | S | S | S | S | S | N | N | N | N | S | S | S | S | O |
| 159.25 | N | N | N | S | S | S | S | S | N | N | N | N | S | S | S | S | S |
| 159.50 | N | N | N | S | S | S | S | S | N | N | N | N | S | S | S | S | S |
| 159.75 | N | N | N | O | S | S | S | S | N | N | N | N | S | S | S | S | S |
| 160.00 | N | N | N | N | S | S | S | S | N | N | N | N | O | S | S | S | S |
| 160.25 | N | N | N | N | S | S | S | S | N | N | N | N | N | S | S | S | S |
| 160.50 | N | N | N | N | S | S | S | S | N | N | N | N | N | S | S | S | S |
| 160.75 | N | N | N | N | S | S | S | S | N | N | N | N | N | S | S | S | S |
| 161.00 | N | N | N | N | S | S | S | S | O | N | N | N | N | S | S | S | S |
| 161.25 | N | N | N | N | S | S | S | S | S | N | N | N | N | S | S | S | S |
| 161.50 | N | N | N | N | S | S | S | S | S | N | N | N | N | S | S | S | S |
| 161.75 | N | N | N | N | S | S | S | S | S | N | N | N | N | S | S | S | S |
| 162.00 | N | N | N | N | O | S | S | S | S | N | N | N | N | S | S | S | S |
| 162.25 | N | N | N | N | N | S | S | S | S | N | N | N | N | O | S | S | S |
| 162.50 | N | N | N | N | N | S | S | S | S | N | N | N | N | N | S | S | S |
| 162.75 | N | N | N | N | N | S | S | S | S | N | N | N | N | N | S | S | S |
| 163.00 | O | N | N | N | N | S | S | S | S | N | N | N | N | N | S | S | S |
| 163.25 | S | N | N | N | N | S | S | S | S | O | N | N | N | N | S | S | S |
| 163.50 | S | N | N | N | N | S | S | S | S | S | N | N | N | N | S | S | S |
| 163.75 | S | N | N | N | N | S | S | S | S | S | N | N | N | N | S | S | S |
| 164.00 | S | N | N | N | N | S | S | S | S | S | N | N | N | N | S | S | S |
| 164.25 | S | N | N | N | N | O | S | S | S | S | N | N | N | N | S | S | S |
| 164.50 | S | N | N | N | N | N | S | S | S | S | N | N | N | N | O | S | S |
| 164.75 | S | N | N | N | N | N | S | S | S | S | N | N | N | N | N | S | S |
| 165.00 | S | N | N | N | N | N | S | S | S | S | N | N | N | N | N | S | S |
| 165.25 | S | O | N | N | N | N | S | S | S | S | N | N | N | N | N | S | S |
| 165.50 | S | S | N | N | N | N | S | S | S | S | O | N | N | N | N | S | S |
| 165.75 | S | S | N | N | N | N | S | S | S | S | S | N | N | N | N | S | S |
| 166.00 | S | S | N | N | N | N | S | S | S | S | S | N | N | N | N | S | S |
| 166.25 | S | S | N | N | N | N | S | S | S | S | S | N | N | N | N | S | S |
| 166.50 | S | S | N | N | N | N | O | S | S | S | S | N | N | N | N | S | S |
| 166.75 | S | S | N | N | N | N | N | S | S | S | S | N | N | N | N | O | S |
| 167.00 | S | S | N | N | N | N | N | S | S | S | S | N | N | N | N | N | S |
| 167.25 | S | S | N | N | N | N | N | S | S | S | S | N | N | N | N | N | S |
| 167.50 | S | S | O | N | N | N | N | S | S | S | S | N | N | N | N | N | S |
| 167.75 | S | S | S | N | N | N | N | S | S | S | S | O | N | N | N | N | S |

Page Row 14, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 156.00 | N | N | N | S | S | S | S | N | N | N | N | O | S | S | S | S | N |
| 156.25 | N | N | N | S | S | S | S | N | N | N | N | N | S | S | S | S | N |
| 156.50 | N | N | N | S | S | S | S | N | N | N | N | N | S | S | S | S | N |

-continued

| Coil Excitation | | | | | | | | | | | | | | | | | |
|---|---|---|---|---|---|---|---|---|---|---|---|---|---|---|---|---|---|
| 156.75 | N | N | N | S | S | S | S | N | N | N | N | N | S | S | S | S | N |
| 157.00 | N | N | N | S | S | S | S | O | N | N | N | N | S | S | S | S | N |
| 157.25 | N | N | N | S | S | S | S | S | N | N | N | N | S | S | S | S | O |
| 157.50 | N | N | N | S | S | S | S | S | N | N | N | N | S | S | S | S | S |
| 157.75 | N | N | N | S | S | S | S | S | N | N | N | N | S | S | S | S | S |
| 158.00 | N | N | N | O | S | S | S | S | N | N | N | N | S | S | S | S | S |
| 158.25 | N | N | N | N | S | S | S | S | N | N | N | N | O | S | S | S | S |
| 158.50 | N | N | N | N | S | S | S | S | N | N | N | N | N | S | S | S | S |
| 158.75 | N | N | N | N | S | S | S | S | N | N | N | N | N | S | S | S | S |
| 159.00 | N | N | N | N | S | S | S | S | N | N | N | N | N | S | S | S | S |
| 159.25 | N | N | N | N | S | S | S | S | O | N | N | N | N | S | S | S | S |
| 159.50 | N | N | N | N | S | S | S | S | S | N | N | N | N | S | S | S | S |
| 159.75 | N | N | N | N | S | S | S | S | S | N | N | N | N | S | S | S | S |
| 160.00 | N | N | N | N | S | S | S | S | S | N | N | N | N | S | S | S | S |
| 160.25 | N | N | N | N | O | S | S | S | S | N | N | N | N | S | S | S | S |
| 160.50 | N | N | N | N | N | S | S | S | S | N | N | N | N | O | S | S | S |
| 160.75 | N | N | N | N | N | S | S | S | S | N | N | N | N | N | S | S | S |
| 161.00 | N | N | N | N | N | S | S | S | S | N | N | N | N | N | S | S | S |
| 161.25 | O | N | N | N | N | S | S | S | S | N | N | N | N | N | S | S | S |
| 161.50 | S | N | N | N | N | S | S | S | S | O | N | N | N | N | S | S | S |
| 161.75 | S | N | N | N | N | S | S | S | S | S | N | N | N | N | S | S | S |
| 162.00 | S | N | N | N | N | S | S | S | S | S | N | N | N | N | S | S | S |
| 162.25 | S | N | N | N | N | S | S | S | S | S | N | N | N | N | S | S | S |
| 162.50 | S | N | N | N | N | O | S | S | S | S | N | N | N | N | S | S | S |
| 162.75 | S | N | N | N | N | N | S | S | S | S | N | N | N | N | O | S | S |
| 163.00 | S | N | N | N | N | N | S | S | S | S | N | N | N | N | N | S | S |
| 163.25 | S | N | N | N | N | N | S | S | S | S | N | N | N | N | N | S | S |
| 163.50 | S | O | N | N | N | N | S | S | S | S | N | N | N | N | N | S | S |
| 163.75 | S | S | N | N | N | N | S | S | S | S | O | N | N | N | N | S | S |
| 164.00 | S | S | N | N | N | N | S | S | S | S | S | N | N | N | N | S | S |
| 164.25 | S | S | N | N | N | N | S | S | S | S | S | N | N | N | N | S | S |
| 164.50 | S | S | N | N | N | N | S | S | S | S | S | N | N | N | N | S | S |
| 164.75 | S | S | N | N | N | N | O | S | S | S | S | N | N | N | N | S | S |
| 165.00 | S | S | N | N | N | N | N | S | S | S | S | N | N | N | N | O | S |
| 165.25 | S | S | N | N | N | N | N | S | S | S | S | N | N | N | N | N | S |
| 165.50 | S | S | N | N | N | N | N | S | S | S | S | N | N | N | N | N | S |
| 165.75 | S | S | O | N | N | N | N | S | S | S | S | N | N | N | N | N | S |
| 166.00 | S | S | S | N | N | N | N | S | S | S | S | O | N | N | N | N | S |
| 166.25 | S | S | S | N | N | N | N | S | S | S | S | S | N | N | N | N | S |
| 166.50 | S | S | S | N | N | N | N | S | S | S | S | S | N | N | N | N | S |
| 166.75 | S | S | S | N | N | N | N | S | S | S | S | S | N | N | N | N | S |
| 167.00 | S | S | S | N | N | N | N | O | S | S | S | S | N | N | N | N | S |
| 167.25 | S | S | S | N | N | N | N | N | S | S | S | S | N | N | N | N | O |
| 167.50 | S | S | S | N | N | N | N | N | S | S | S | S | N | N | N | N | N |
| 167.75 | S | S | S | N | N | N | N | N | S | S | S | S | N | N | N | N | N |

Page Row 14, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 156.00 | N | N | N | S | S | S | S | S | N | N | N | N | S | S | S | S | S |
| 156.25 | N | N | N | O | S | S | S | S | N | N | N | N | S | S | S | S | S |
| 156.50 | N | N | N | N | S | S | S | S | N | N | N | N | O | S | S | S | S |
| 156.75 | N | N | N | N | S | S | S | S | N | N | N | N | N | S | S | S | S |
| 157.00 | N | N | N | N | S | S | S | S | N | N | N | N | N | S | S | S | S |
| 157.25 | N | N | N | N | S | S | S | S | N | N | N | N | N | S | S | S | S |
| 157.50 | N | N | N | N | S | S | S | S | O | N | N | N | N | S | S | S | S |
| 157.75 | N | N | N | N | S | S | S | S | S | N | N | N | N | S | S | S | S |
| 158.00 | N | N | N | N | S | S | S | S | S | N | N | N | N | S | S | S | S |
| 158.25 | N | N | N | N | S | S | S | S | S | N | N | N | N | S | S | S | S |
| 158.50 | N | N | N | N | O | S | S | S | S | N | N | N | N | S | S | S | S |
| 158.75 | N | N | N | N | N | S | S | S | S | N | N | N | N | O | S | S | S |
| 159.00 | N | N | N | N | N | S | S | S | S | N | N | N | N | N | S | S | S |
| 159.25 | N | N | N | N | N | S | S | S | S | N | N | N | N | N | S | S | S |
| 159.50 | O | N | N | N | N | S | S | S | S | N | N | N | N | N | S | S | S |
| 159.75 | S | N | N | N | N | S | S | S | S | O | N | N | N | N | S | S | S |
| 160.00 | S | N | N | N | N | S | S | S | S | S | N | N | N | N | S | S | S |
| 160.25 | S | N | N | N | N | S | S | S | S | S | N | N | N | N | S | S | S |
| 160.50 | S | N | N | N | N | S | S | S | S | S | N | N | N | N | S | S | S |
| 160.75 | S | N | N | N | N | O | S | S | S | S | N | N | N | N | S | S | S |
| 161.00 | S | N | N | N | N | N | S | S | S | S | N | N | N | N | O | S | S |
| 161.25 | S | N | N | N | N | N | S | S | S | S | N | N | N | N | N | S | S |
| 161.50 | S | N | N | N | N | N | S | S | S | S | N | N | N | N | N | S | S |
| 161.75 | S | O | N | N | N | N | S | S | S | S | N | N | N | N | N | S | S |
| 162.00 | S | S | N | N | N | N | S | S | S | S | O | N | N | N | N | S | S |
| 162.25 | S | S | N | N | N | N | S | S | S | S | S | N | N | N | N | S | S |
| 162.50 | S | S | N | N | N | N | S | S | S | S | S | N | N | N | N | S | S |
| 162.75 | S | S | N | N | N | N | S | S | S | S | S | N | N | N | N | S | S |

-continued

| Coil Excitation | | | | | | | | | | | | | | | | | |
|---|---|---|---|---|---|---|---|---|---|---|---|---|---|---|---|---|---|
| 163.00 | S | S | N | N | N | N | O | S | S | S | S | N | N | N | N | S | S |
| 163.25 | S | S | N | N | N | N | N | S | S | S | S | N | N | N | N | O | S |
| 163.50 | S | S | N | N | N | N | N | S | S | S | S | N | N | N | N | N | S |
| 163.75 | S | S | N | N | N | N | N | S | S | S | S | N | N | N | N | N | S |
| 164.00 | S | S | O | N | N | N | N | S | S | S | S | N | N | N | N | N | S |
| 164.25 | S | S | S | N | N | N | N | S | S | S | S | O | N | N | N | N | S |
| 164.50 | S | S | S | N | N | N | N | S | S | S | S | S | N | N | N | N | S |
| 164.75 | S | S | S | N | N | N | N | S | S | S | S | S | N | N | N | N | S |
| 165.00 | S | S | S | N | N | N | N | S | S | S | S | S | N | N | N | N | S |
| 165.25 | S | S | S | N | N | N | N | O | S | S | S | S | N | N | N | N | S |
| 165.50 | S | S | S | N | N | N | N | N | S | S | S | S | N | N | N | N | O |
| 165.75 | S | S | S | N | N | N | N | N | S | S | S | S | N | N | N | N | N |
| 166.00 | S | S | S | N | N | N | N | N | S | S | S | S | N | N | N | N | N |
| 166.25 | S | S | S | O | N | N | N | N | S | S | S | S | N | N | N | N | N |
| 166.50 | S | S | S | S | N | N | N | N | S | S | S | S | O | N | N | N | N |
| 166.75 | S | S | S | S | N | N | N | N | S | S | S | S | S | N | N | N | N |
| 167.00 | S | S | S | S | N | N | N | N | S | S | S | S | S | N | N | N | N |
| 167.25 | S | S | S | S | N | N | N | N | S | S | S | S | S | N | N | N | N |
| 167.50 | S | S | S | S | N | N | N | N | O | S | S | S | S | N | N | N | N |
| 167.75 | S | S | S | S | N | N | N | N | N | S | S | S | S | N | N | N | N |

Page Row 14, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 156.00 | N | N | N | N | S | S | S | S | S | N | N | N | N | S | S | S | S |
| 156.25 | N | N | N | N | S | S | S | S | S | N | N | N | N | S | S | S | S |
| 156.50 | N | N | N | N | S | S | S | S | S | N | N | N | N | S | S | S | S |
| 156.75 | N | N | N | N | O | S | S | S | S | N | N | N | N | S | S | S | S |
| 157.00 | N | N | N | N | N | S | S | S | S | N | N | N | N | O | S | S | S |
| 157.25 | N | N | N | N | N | S | S | S | S | N | N | N | N | N | S | S | S |
| 157.50 | N | N | N | N | N | S | S | S | S | N | N | N | N | N | S | S | S |
| 157.75 | O | N | N | N | N | S | S | S | S | N | N | N | N | N | S | S | S |
| 158.00 | S | N | N | N | N | S | S | S | S | O | N | N | N | N | S | S | S |
| 158.25 | S | N | N | N | N | S | S | S | S | S | N | N | N | N | S | S | S |
| 158.50 | S | N | N | N | N | S | S | S | S | S | N | N | N | N | S | S | S |
| 158.75 | S | N | N | N | N | S | S | S | S | S | N | N | N | N | S | S | S |
| 159.00 | S | N | N | N | N | O | S | S | S | S | N | N | N | N | S | S | S |
| 159.25 | S | N | N | N | N | N | S | S | S | S | N | N | N | N | O | S | S |
| 159.50 | S | N | N | N | N | N | S | S | S | S | N | N | N | N | N | S | S |
| 159.75 | S | N | N | N | N | N | S | S | S | S | N | N | N | N | N | S | S |
| 160.00 | S | O | N | N | N | N | S | S | S | S | N | N | N | N | N | S | S |
| 160.25 | S | S | N | N | N | N | S | S | S | S | O | N | N | N | N | S | S |
| 160.50 | S | S | N | N | N | N | S | S | S | S | S | N | N | N | N | S | S |
| 160.75 | S | S | N | N | N | N | S | S | S | S | S | N | N | N | N | S | S |
| 161.00 | S | S | N | N | N | N | S | S | S | S | S | N | N | N | N | S | S |
| 161.25 | S | S | N | N | N | N | O | S | S | S | S | N | N | N | N | S | S |
| 161.50 | S | S | N | N | N | N | N | S | S | S | S | N | N | N | N | O | S |
| 161.75 | S | S | N | N | N | N | N | S | S | S | S | N | N | N | N | N | S |
| 162.00 | S | S | N | N | N | N | N | S | S | S | S | N | N | N | N | N | S |
| 162.25 | S | S | O | N | N | N | N | S | S | S | S | N | N | N | N | N | S |
| 162.50 | S | S | S | N | N | N | N | S | S | S | S | O | N | N | N | N | S |
| 162.75 | S | S | S | N | N | N | N | S | S | S | S | S | N | N | N | N | S |
| 163.00 | S | S | S | N | N | N | N | S | S | S | S | S | N | N | N | N | S |
| 163.25 | S | S | S | N | N | N | N | S | S | S | S | S | N | N | N | N | S |
| 163.50 | S | S | S | N | N | N | N | O | S | S | S | S | N | N | N | N | S |
| 163.75 | S | S | S | N | N | N | N | N | S | S | S | S | N | N | N | N | O |
| 164.00 | S | S | S | N | N | N | N | N | S | S | S | S | N | N | N | N | N |
| 164.25 | S | S | S | N | N | N | N | N | S | S | S | S | N | N | N | N | N |
| 164.50 | S | S | S | O | N | N | N | N | S | S | S | S | N | N | N | N | N |
| 164.75 | S | S | S | S | N | N | N | N | S | S | S | S | O | N | N | N | N |
| 165.00 | S | S | S | S | N | N | N | N | S | S | S | S | S | N | N | N | N |
| 165.25 | S | S | S | S | N | N | N | N | S | S | S | S | S | N | N | N | N |
| 165.50 | S | S | S | S | N | N | N | N | S | S | S | S | S | N | N | N | N |
| 165.75 | S | S | S | S | N | N | N | N | O | S | S | S | S | N | N | N | N |
| 166.00 | S | S | S | S | N | N | N | N | N | S | S | S | S | N | N | N | N |
| 166.25 | S | S | S | S | N | N | N | N | N | S | S | S | S | N | N | N | N |
| 166.50 | S | S | S | S | N | N | N | N | N | S | S | S | S | N | N | N | N |
| 166.75 | S | S | S | S | O | N | N | N | N | S | S | S | S | N | N | N | N |
| 167.00 | S | S | S | S | S | N | N | N | N | S | S | S | S | O | N | N | N |
| 167.25 | S | S | S | S | S | N | N | N | N | S | S | S | S | S | N | N | N |
| 167.50 | S | S | S | S | S | N | N | N | N | S | S | S | S | S | N | N | N |
| 167.75 | O | S | S | S | S | N | N | N | N | S | S | S | S | S | N | N | N |

Page Row 14, Page Column 8

-continued

| Coil Excitation | | | | | | | | | | | | | | | | | |
|---|---|---|---|---|---|---|---|---|---|---|---|---|---|---|---|---|---|
| Coil | 137 | 138 | 139 | 140 | 141 | 142 | 143 | 144 | 145 | 146 | 147 | 148 | 149 | 150 | 151 | 152 | 153 |
| 156.00 | O | N | N | N | N | S | S | S | S | N | N | N | N | N | S | S | S |
| 156.25 | S | N | N | N | N | S | S | S | S | O | N | N | N | N | S | S | S |
| 156.50 | S | N | N | N | N | S | S | S | S | S | N | N | N | N | S | S | S |
| 156.75 | S | N | N | N | N | S | S | S | S | S | N | N | N | N | S | S | S |
| 157.00 | S | N | N | N | N | S | S | S | S | S | N | N | N | N | S | S | S |
| 157.25 | S | N | N | N | N | O | S | S | S | S | N | N | N | N | S | S | S |
| 157.50 | S | N | N | N | N | N | S | S | S | S | N | N | N | N | O | S | S |
| 157.75 | S | N | N | N | N | N | S | S | S | S | N | N | N | N | N | S | S |
| 158.00 | S | N | N | N | N | N | S | S | S | S | N | N | N | N | N | S | S |
| 158.25 | S | O | N | N | N | N | S | S | S | S | N | N | N | N | N | S | S |
| 158.50 | S | S | N | N | N | N | S | S | S | S | O | N | N | N | N | S | S |
| 158.75 | S | S | N | N | N | N | S | S | S | S | S | N | N | N | N | S | S |
| 159.00 | S | S | N | N | N | N | S | S | S | S | S | N | N | N | N | S | S |
| 159.25 | S | S | N | N | N | N | S | S | S | S | S | N | N | N | N | S | S |
| 159.50 | S | S | N | N | N | N | O | S | S | S | S | N | N | N | N | S | S |
| 159.75 | S | S | N | N | N | N | N | S | S | S | S | N | N | N | N | O | S |
| 160.00 | S | S | N | N | N | N | N | S | S | S | S | N | N | N | N | N | S |
| 160.25 | S | S | N | N | N | N | N | S | S | S | S | N | N | N | N | N | S |
| 160.50 | S | S | O | N | N | N | N | S | S | S | S | N | N | N | N | N | S |
| 160.75 | S | S | S | N | N | N | N | S | S | S | S | O | N | N | N | N | S |
| 161.00 | S | S | S | N | N | N | N | S | S | S | S | S | N | N | N | N | S |
| 161.25 | S | S | S | N | N | N | N | S | S | S | S | S | N | N | N | N | S |
| 161.50 | S | S | S | N | N | N | N | S | S | S | S | S | N | N | N | N | S |
| 161.75 | S | S | S | N | N | N | N | O | S | S | S | S | N | N | N | N | S |
| 162.00 | S | S | S | N | N | N | N | N | S | S | S | S | N | N | N | N | O |
| 162.25 | S | S | S | N | N | N | N | N | S | S | S | S | N | N | N | N | N |
| 162.50 | S | S | S | N | N | N | N | N | S | S | S | S | N | N | N | N | N |
| 162.75 | S | S | S | O | N | N | N | N | S | S | S | S | N | N | N | N | N |
| 163.00 | S | S | S | S | N | N | N | N | S | S | S | S | O | N | N | N | N |
| 163.25 | S | S | S | S | N | N | N | N | S | S | S | S | S | N | N | N | N |
| 163.50 | S | S | S | S | N | N | N | N | S | S | S | S | S | N | N | N | N |
| 163.75 | S | S | S | S | N | N | N | N | S | S | S | S | S | N | N | N | N |
| 164.00 | S | S | S | S | N | N | N | N | O | S | S | S | S | N | N | N | N |
| 164.25 | S | S | S | S | N | N | N | N | N | S | S | S | S | N | N | N | N |
| 164.50 | S | S | S | S | N | N | N | N | N | S | S | S | S | N | N | N | N |
| 164.75 | S | S | S | S | N | N | N | N | N | S | S | S | S | N | N | N | N |
| 165.00 | S | S | S | S | O | N | N | N | N | S | S | S | S | N | N | N | N |
| 165.25 | S | S | S | S | S | N | N | N | N | S | S | S | S | O | N | N | N |
| 165.50 | S | S | S | S | S | N | N | N | N | S | S | S | S | S | N | N | N |
| 165.75 | S | S | S | S | S | N | N | N | N | S | S | S | S | S | N | N | N |
| 166.00 | O | S | S | S | S | N | N | N | N | S | S | S | S | S | N | N | N |
| 166.25 | N | S | S | S | S | N | N | N | N | O | S | S | S | S | N | N | N |
| 166.50 | N | S | S | S | S | N | N | N | N | N | S | S | S | S | N | N | N |
| 166.75 | N | S | S | S | S | N | N | N | N | N | S | S | S | S | N | N | N |
| 167.00 | N | S | S | S | S | N | N | N | N | N | S | S | S | S | N | N | N |
| 167.25 | N | S | S | S | S | O | N | N | N | N | S | S | S | S | N | N | N |
| 167.50 | N | S | S | S | S | S | N | N | N | N | S | S | S | S | O | N | N |
| 167.75 | N | S | S | S | S | S | N | N | N | N | S | S | S | S | S | N | N |

Page Row 14, Page Column 9

| Coil | 154 | 155 | 156 | 157 | 158 | 159 | 160 |
|---|---|---|---|---|---|---|---|
| 156.00 | S | N | N | N | N | N | S |
| 156.25 | S | N | N | N | N | N | S |
| 156.50 | S | O | N | N | N | N | S |
| 156.75 | S | S | N | N | N | N | S |
| 157.00 | S | S | N | N | N | N | S |
| 157.25 | S | S | N | N | N | N | S |
| 157.50 | S | S | N | N | N | N | S |
| 157.75 | S | S | N | N | N | N | O |
| 158.00 | S | S | N | N | N | N | N |
| 158.25 | S | S | N | N | N | N | N |
| 158.50 | S | S | N | N | N | N | N |
| 158.75 | S | S | O | N | N | N | N |
| 159.00 | S | S | S | N | N | N | N |
| 159.25 | S | S | S | N | N | N | N |
| 159.50 | S | S | S | N | N | N | N |
| 159.75 | S | S | S | N | N | N | N |
| 160.00 | S | S | S | N | N | N | N |
| 160.25 | S | S | S | N | N | N | N |
| 160.50 | S | S | S | N | N | N | N |
| 160.75 | S | S | S | N | N | N | N |
| 161.00 | S | S | S | O | N | N | N |
| 161.25 | S | S | S | S | N | N | N |
| 161.50 | S | S | S | S | N | N | N |

-continued

Coil Excitation

| | | | | | | | |
|---|---|---|---|---|---|---|---|
| 161.75 | S | S | S | S | N | N | N |
| 162.00 | S | S | S | S | N | N | N |
| 162.25 | S | S | S | S | N | N | N |
| 162.50 | S | S | S | S | N | N | N |
| 162.75 | S | S | S | S | N | N | N |
| 163.00 | S | S | S | S | N | N | N |
| 163.25 | S | S | S | S | O | N | N |
| 163.50 | S | S | S | S | S | N | N |
| 163.75 | S | S | S | S | S | N | N |
| 164.00 | S | S | S | S | S | N | N |
| 164.25 | O | S | S | S | S | N | N |
| 164.50 | N | S | S | S | S | N | N |
| 164.75 | N | S | S | S | S | N | N |
| 165.00 | N | S | S | S | S | N | N |
| 165.25 | N | S | S | S | S | N | N |
| 165.50 | N | S | S | S | S | O | N |
| 165.75 | N | S | S | S | S | S | N |
| 166.00 | N | S | S | S | S | S | N |
| 166.25 | N | S | S | S | S | S | N |
| 166.50 | N | O | S | S | S | S | N |
| 166.75 | N | N | S | S | S | S | N |
| 167.00 | N | N | S | S | S | S | N |
| 167.25 | N | N | S | S | S | S | N |
| 167.50 | N | N | S | S | S | S | N |
| 167.75 | N | N | S | S | S | S | O |

Page Row 14, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 168.00 | N | N | N | N | S | S | S | S | O | N | N | N | N | S | S | S | S |
| 168.25 | N | N | N | N | S | S | S | S | S | N | N | N | N | S | S | S | S |
| 168.50 | N | N | N | N | S | S | S | S | S | N | N | N | N | S | S | S | S |
| 168.75 | N | N | N | N | S | S | S | S | S | N | N | N | N | S | S | S | S |
| 169.00 | N | N | N | N | O | S | S | S | S | N | N | N | N | S | S | S | S |
| 169.25 | N | N | N | N | N | S | S | S | S | N | N | N | N | O | S | S | S |
| 169.50 | N | N | N | N | N | S | S | S | S | N | N | N | N | N | S | S | S |
| 169.75 | N | N | N | N | N | S | S | S | S | N | N | N | N | N | S | S | S |
| 170.00 | O | N | N | N | N | S | S | S | S | N | N | N | N | N | S | S | S |
| 170.25 | S | N | N | N | N | S | S | S | S | O | N | N | N | N | S | S | S |
| 170.50 | S | N | N | N | N | S | S | S | S | S | N | N | N | N | S | S | S |
| 170.75 | S | N | N | N | N | S | S | S | S | S | N | N | N | N | S | S | S |
| 171.00 | S | N | N | N | N | S | S | S | S | S | N | N | N | N | S | S | S |
| 171.25 | S | N | N | N | N | O | S | S | S | S | N | N | N | N | S | S | S |
| 171.50 | S | N | N | N | N | N | S | S | S | S | N | N | N | N | O | S | S |
| 171.75 | S | N | N | N | N | N | S | S | S | S | N | N | N | N | N | S | S |
| 172.00 | S | N | N | N | N | N | S | S | S | S | N | N | N | N | N | S | S |
| 172.25 | S | O | N | N | N | N | S | S | S | S | N | N | N | N | N | S | S |
| 172.50 | S | S | N | N | N | N | S | S | S | S | O | N | N | N | N | S | S |
| 172.75 | S | S | N | N | N | N | S | S | S | S | S | N | N | N | N | S | S |
| 173.00 | S | S | N | N | N | N | S | S | S | S | S | N | N | N | N | S | S |
| 173.25 | S | S | N | N | N | N | S | S | S | S | S | N | N | N | N | S | S |
| 173.50 | S | S | N | N | N | N | O | S | S | S | S | N | N | N | N | S | S |
| 173.75 | S | S | N | N | N | N | N | S | S | S | S | N | N | N | N | O | S |
| 174.00 | S | S | N | N | N | N | N | S | S | S | S | N | N | N | N | N | S |
| 174.25 | S | S | N | N | N | N | N | S | S | S | S | N | N | N | N | N | S |
| 174.50 | S | S | O | N | N | N | N | S | S | S | S | N | N | N | N | N | S |
| 174.75 | S | S | S | N | N | N | N | S | S | S | S | O | N | N | N | N | S |
| 175.00 | S | S | S | N | N | N | N | S | S | S | S | S | N | N | N | N | S |
| 175.25 | S | S | S | N | N | N | N | S | S | S | S | S | N | N | N | N | S |
| 175.50 | S | S | S | N | N | N | N | S | S | S | S | S | N | N | N | N | S |
| 175.75 | S | S | S | N | N | N | N | O | S | S | S | S | N | N | N | N | S |
| 176.00 | S | S | S | N | N | N | N | N | S | S | S | S | N | N | N | N | O |
| 176.25 | S | S | S | N | N | N | N | N | S | S | S | S | N | N | N | N | N |
| 176.50 | S | S | S | N | N | N | N | N | S | S | S | S | N | N | N | N | N |
| 176.75 | S | S | S | O | N | N | N | N | S | S | S | S | N | N | N | N | N |
| 177.00 | S | S | S | S | N | N | N | N | S | S | S | S | O | N | N | N | N |
| 177.25 | S | S | S | S | N | N | N | N | S | S | S | S | S | N | N | N | N |
| 177.50 | S | S | S | S | N | N | N | N | S | S | S | S | S | N | N | N | N |
| 177.75 | S | S | S | S | N | N | N | N | S | S | S | S | S | N | N | N | N |
| 178.00 | S | S | S | S | N | N | N | N | O | S | S | S | S | N | N | N | N |
| 178.25 | S | S | S | S | N | N | N | N | N | S | S | S | S | N | N | N | N |
| 178.50 | S | S | S | S | N | N | N | N | N | S | S | S | S | N | N | N | N |
| 178.75 | S | S | S | S | N | N | N | N | N | S | S | S | S | N | N | N | N |
| 179.00 | S | S | S | S | O | N | N | N | N | S | S | S | S | N | N | N | N |
| 179.25 | S | S | S | S | S | N | N | N | N | S | S | S | S | O | N | N | N |
| 179.50 | S | S | S | S | S | N | N | N | N | S | S | S | S | S | N | N | N |
| 179.75 | S | S | S | S | S | N | N | N | N | S | S | S | S | S | N | N | N |

Page Row 15, Page Column 1

-continued

| Coil Excitation | | | | | | | | | | | | | | | | | |
|---|---|---|---|---|---|---|---|---|---|---|---|---|---|---|---|---|---|
| Coil | 18 | 19 | 20 | 21 | 22 | 23 | 24 | 25 | 26 | 27 | 28 | 29 | 30 | 31 | 32 | 33 | 34 |
| 168.00 | N | N | N | N | N | S | S | S | S | N | N | N | N | N | S | S | S |
| 168.25 | O | N | N | N | N | S | S | S | S | N | N | N | N | N | S | S | S |
| 168.50 | S | N | N | N | N | S | S | S | S | O | N | N | N | N | S | S | S |
| 168.75 | S | N | N | N | N | S | S | S | S | S | N | N | N | N | S | S | S |
| 169.00 | S | N | N | N | N | S | S | S | S | S | N | N | N | N | S | S | S |
| 169.25 | S | N | N | N | N | S | S | S | S | S | N | N | N | N | S | S | S |
| 169.50 | S | N | N | N | N | O | S | S | S | S | N | N | N | N | S | S | S |
| 169.75 | S | N | N | N | N | N | S | S | S | S | N | N | N | N | O | S | S |
| 170.00 | S | N | N | N | N | N | S | S | S | S | N | N | N | N | N | S | S |
| 170.25 | S | N | N | N | N | N | S | S | S | S | N | N | N | N | N | S | S |
| 170.50 | S | O | N | N | N | N | S | S | S | S | N | N | N | N | N | S | S |
| 170.75 | S | S | N | N | N | N | S | S | S | S | O | N | N | N | N | S | S |
| 171.00 | S | S | N | N | N | N | S | S | S | S | S | N | N | N | N | S | S |
| 171.25 | S | S | N | N | N | N | S | S | S | S | S | N | N | N | N | S | S |
| 171.50 | S | S | N | N | N | N | S | S | S | S | S | N | N | N | N | S | S |
| 171.75 | S | S | N | N | N | N | O | S | S | S | S | N | N | N | N | S | S |
| 172.00 | S | S | N | N | N | N | N | S | S | S | S | N | N | N | N | O | S |
| 172.25 | S | S | N | N | N | N | N | S | S | S | S | N | N | N | N | N | S |
| 172.50 | S | S | N | N | N | N | N | S | S | S | S | N | N | N | N | N | S |
| 172.75 | S | S | O | N | N | N | N | S | S | S | S | N | N | N | N | N | S |
| 173.00 | S | S | S | N | N | N | N | S | S | S | S | O | N | N | N | N | S |
| 173.25 | S | S | S | N | N | N | N | S | S | S | S | S | N | N | N | N | S |
| 173.50 | S | S | S | N | N | N | N | S | S | S | S | S | N | N | N | N | S |
| 173.75 | S | S | S | N | N | N | N | S | S | S | S | S | N | N | N | N | S |
| 174.00 | S | S | S | N | N | N | N | O | S | S | S | S | N | N | N | N | S |
| 174.25 | S | S | S | N | N | N | N | N | S | S | S | S | N | N | N | N | O |
| 174.50 | S | S | S | N | N | N | N | N | S | S | S | S | N | N | N | N | N |
| 174.75 | S | S | S | N | N | N | N | N | S | S | S | S | N | N | N | N | N |
| 175.00 | S | S | S | O | N | N | N | N | S | S | S | S | N | N | N | N | N |
| 175.25 | S | S | S | S | N | N | N | N | S | S | S | S | O | N | N | N | N |
| 175.50 | S | S | S | S | N | N | N | N | S | S | S | S | S | N | N | N | N |
| 175.75 | S | S | S | S | N | N | N | N | S | S | S | S | S | N | N | N | N |
| 176.00 | S | S | S | S | N | N | N | N | S | S | S | S | S | N | N | N | N |
| 176.25 | S | S | S | S | N | N | N | N | O | S | S | S | S | N | N | N | N |
| 176.50 | S | S | S | S | N | N | N | N | N | S | S | S | S | N | N | N | N |
| 176.75 | S | S | S | S | N | N | N | N | N | S | S | S | S | N | N | N | N |
| 177.00 | S | S | S | S | N | N | N | N | N | S | S | S | S | N | N | N | N |
| 177.25 | S | S | S | S | O | N | N | N | N | S | S | S | S | N | N | N | N |
| 177.50 | S | S | S | S | S | N | N | N | N | S | S | S | S | O | N | N | N |
| 177.75 | S | S | S | S | S | N | N | N | N | S | S | S | S | S | N | N | N |
| 178.00 | S | S | S | S | S | N | N | N | N | S | S | S | S | S | N | N | N |
| 178.25 | O | S | S | S | S | N | N | N | N | S | S | S | S | S | N | N | N |
| 178.50 | N | S | S | S | S | N | N | N | N | O | S | S | S | S | N | N | N |
| 178.75 | N | S | S | S | S | N | N | N | N | N | S | S | S | S | N | N | N |
| 179.00 | N | S | S | S | S | N | N | N | N | N | S | S | S | S | N | N | N |
| 179.25 | N | S | S | S | S | N | N | N | N | N | S | S | S | S | N | N | N |
| 179.50 | N | S | S | S | S | O | N | N | N | N | S | S | S | S | N | N | N |
| 179.75 | N | S | S | S | S | S | N | N | N | N | S | S | S | S | O | N | N |

Page Row 15, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 168.00 | S | N | N | N | N | N | S | S | S | S | N | N | N | N | O | S | S |
| 168.25 | S | N | N | N | N | N | S | S | S | S | N | N | N | N | N | S | S |
| 168.50 | S | N | N | N | N | N | S | S | S | S | N | N | N | N | N | S | S |
| 168.75 | S | O | N | N | N | N | S | S | S | S | N | N | N | N | N | S | S |
| 169.00 | S | S | N | N | N | N | S | S | S | S | O | N | N | N | N | S | S |
| 169.25 | S | S | N | N | N | N | S | S | S | S | S | N | N | N | N | S | S |
| 169.50 | S | S | N | N | N | N | S | S | S | S | S | N | N | N | N | S | S |
| 169.75 | S | S | N | N | N | N | S | S | S | S | S | N | N | N | N | S | S |
| 170.00 | S | S | N | N | N | N | O | S | S | S | S | N | N | N | N | S | S |
| 170.25 | S | S | N | N | N | N | N | S | S | S | S | N | N | N | N | O | S |
| 170.50 | S | S | N | N | N | N | N | S | S | S | S | N | N | N | N | N | S |
| 170.75 | S | S | N | N | N | N | N | S | S | S | S | N | N | N | N | N | S |
| 171.00 | S | S | O | N | N | N | N | S | S | S | S | N | N | N | N | N | S |
| 171.25 | S | S | S | N | N | N | N | S | S | S | S | O | N | N | N | N | S |
| 171.50 | S | S | S | N | N | N | N | S | S | S | S | S | N | N | N | N | S |
| 171.75 | S | S | S | N | N | N | N | S | S | S | S | S | N | N | N | N | S |
| 172.00 | S | S | S | N | N | N | N | S | S | S | S | S | N | N | N | N | S |
| 172.25 | S | S | S | N | N | N | N | O | S | S | S | S | N | N | N | N | S |
| 172.50 | S | S | S | N | N | N | N | N | S | S | S | S | N | N | N | N | O |
| 172.75 | S | S | S | N | N | N | N | N | S | S | S | S | N | N | N | N | N |
| 173.00 | S | S | S | N | N | N | N | N | S | S | S | S | N | N | N | N | N |

-continued

| Coil Excitation | | | | | | | | | | | | | | | | | |
|---|---|---|---|---|---|---|---|---|---|---|---|---|---|---|---|---|---|
| 173.25 | S | S | S | O | N | N | N | N | S | S | S | S | N | N | N | N | N |
| 173.50 | S | S | S | S | N | N | N | N | S | S | S | S | O | N | N | N | N |
| 173.75 | S | S | S | S | N | N | N | N | S | S | S | S | S | N | N | N | N |
| 174.00 | S | S | S | S | N | N | N | N | S | S | S | S | S | N | N | N | N |
| 174.25 | S | S | S | S | N | N | N | N | S | S | S | S | S | N | N | N | N |
| 174.50 | S | S | S | S | N | N | N | N | O | S | S | S | S | N | N | N | N |
| 174.75 | S | S | S | S | N | N | N | N | N | S | S | S | S | N | N | N | N |
| 175.00 | S | S | S | S | N | N | N | N | N | S | S | S | S | N | N | N | N |
| 175.25 | S | S | S | S | N | N | N | N | N | S | S | S | S | N | N | N | N |
| 175.50 | S | S | S | S | O | N | N | N | N | S | S | S | S | N | N | N | N |
| 175.75 | S | S | S | S | S | N | N | N | N | S | S | S | S | O | N | N | N |
| 176.00 | S | S | S | S | S | N | N | N | N | S | S | S | S | S | N | N | N |
| 176.25 | S | S | S | S | S | N | N | N | N | S | S | S | S | S | N | N | N |
| 176.50 | O | S | S | S | S | N | N | N | N | S | S | S | S | S | N | N | N |
| 176.75 | N | S | S | S | S | N | N | N | N | O | S | S | S | S | N | N | N |
| 177.00 | N | S | S | S | S | N | N | N | N | N | S | S | S | S | N | N | N |
| 177.25 | N | S | S | S | S | N | N | N | N | N | S | S | S | S | N | N | N |
| 177.50 | N | S | S | S | S | N | N | N | N | N | S | S | S | S | N | N | N |
| 177.75 | N | S | S | S | S | O | N | N | N | N | S | S | S | S | N | N | N |
| 178.00 | N | S | S | S | S | S | N | N | N | N | S | S | S | S | O | N | N |
| 178.25 | N | S | S | S | S | S | N | N | N | N | S | S | S | S | S | N | N |
| 178.50 | N | S | S | S | S | S | N | N | N | N | S | S | S | S | S | N | N |
| 178.75 | N | O | S | S | S | S | N | N | N | N | S | S | S | S | S | N | N |
| 179.00 | N | N | S | S | S | S | N | N | N | N | O | S | S | S | S | N | N |
| 179.25 | N | N | S | S | S | S | N | N | N | N | N | S | S | S | S | N | N |
| 179.50 | N | N | S | S | S | S | N | N | N | N | N | S | S | S | S | N | N |
| 179.75 | N | N | S | S | S | S | N | N | N | N | N | S | S | S | S | N | N |

Page Row 15, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 168.00 | S | S | N | N | N | N | S | S | S | S | S | N | N | N | N | S | S |
| 168.25 | S | S | N | N | N | N | O | S | S | S | S | N | N | N | N | S | S |
| 168.50 | S | S | N | N | N | N | N | S | S | S | S | N | N | N | N | O | S |
| 168.75 | S | S | N | N | N | N | N | S | S | S | S | N | N | N | N | N | S |
| 169.00 | S | S | N | N | N | N | N | S | S | S | S | N | N | N | N | N | S |
| 169.25 | S | S | O | N | N | N | N | S | S | S | S | N | N | N | N | N | S |
| 169.50 | S | S | S | N | N | N | N | S | S | S | S | O | N | N | N | N | S |
| 169.75 | S | S | S | N | N | N | N | S | S | S | S | S | N | N | N | N | S |
| 170.00 | S | S | S | N | N | N | N | S | S | S | S | S | N | N | N | N | S |
| 170.25 | S | S | S | N | N | N | N | S | S | S | S | S | N | N | N | N | S |
| 170.50 | S | S | S | N | N | N | N | O | S | S | S | S | N | N | N | N | S |
| 170.75 | S | S | S | N | N | N | N | N | S | S | S | S | N | N | N | N | O |
| 171.00 | S | S | S | N | N | N | N | N | S | S | S | S | N | N | N | N | N |
| 171.25 | S | S | S | N | N | N | N | N | S | S | S | S | N | N | N | N | N |
| 171.50 | S | S | S | O | N | N | N | N | S | S | S | S | N | N | N | N | N |
| 171.75 | S | S | S | S | N | N | N | N | S | S | S | S | O | N | N | N | N |
| 172.00 | S | S | S | S | N | N | N | N | S | S | S | S | S | N | N | N | N |
| 172.25 | S | S | S | S | N | N | N | N | S | S | S | S | S | N | N | N | N |
| 172.50 | S | S | S | S | N | N | N | N | S | S | S | S | S | N | N | N | N |
| 172.75 | S | S | S | S | N | N | N | N | O | S | S | S | S | N | N | N | N |
| 173.00 | S | S | S | S | N | N | N | N | N | S | S | S | S | N | N | N | N |
| 173.25 | S | S | S | S | N | N | N | N | N | S | S | S | S | N | N | N | N |
| 173.50 | S | S | S | S | N | N | N | N | N | S | S | S | S | N | N | N | N |
| 173.75 | S | S | S | S | O | N | N | N | N | S | S | S | S | N | N | N | N |
| 174.00 | S | S | S | S | S | N | N | N | N | S | S | S | S | O | N | N | N |
| 174.25 | S | S | S | S | S | N | N | N | N | S | S | S | S | S | N | N | N |
| 174.50 | S | S | S | S | S | N | N | N | N | S | S | S | S | S | N | N | N |
| 174.75 | O | S | S | S | S | N | N | N | N | S | S | S | S | S | N | N | N |
| 175.00 | N | S | S | S | S | N | N | N | N | O | S | S | S | S | N | N | N |
| 175.25 | N | S | S | S | S | N | N | N | N | N | S | S | S | S | N | N | N |
| 175.50 | N | S | S | S | S | N | N | N | N | N | S | S | S | S | N | N | N |
| 175.75 | N | S | S | S | S | N | N | N | N | N | S | S | S | S | N | N | N |
| 176.00 | N | S | S | S | S | O | N | N | N | N | S | S | S | S | N | N | N |
| 176.25 | N | S | S | S | S | S | N | N | N | N | S | S | S | S | O | N | N |
| 176.50 | N | S | S | S | S | S | N | N | N | N | S | S | S | S | S | N | N |
| 176.75 | N | S | S | S | S | S | N | N | N | N | S | S | S | S | S | N | N |
| 177.00 | N | O | S | S | S | S | N | N | N | N | S | S | S | S | S | N | N |
| 177.25 | N | N | S | S | S | S | N | N | N | N | O | S | S | S | S | N | N |
| 177.50 | N | N | S | S | S | S | N | N | N | N | N | S | S | S | S | N | N |
| 177.75 | N | N | S | S | S | S | N | N | N | N | N | S | S | S | S | N | N |
| 178.00 | N | N | S | S | S | S | N | N | N | N | N | S | S | S | S | N | N |
| 178.25 | N | N | S | S | S | S | O | N | N | N | N | S | S | S | S | N | N |
| 178.50 | N | N | S | S | S | S | S | N | N | N | N | S | S | S | S | O | N |
| 178.75 | N | N | S | S | S | S | S | N | N | N | N | S | S | S | S | S | N |
| 179.00 | N | N | S | S | S | S | S | N | N | N | N | S | S | S | S | S | N |
| 179.25 | N | N | O | S | S | S | S | N | N | N | N | S | S | S | S | S | N |

-continued

Coil Excitation

| | | | | | | | | | | | | | | | | | |
|---|---|---|---|---|---|---|---|---|---|---|---|---|---|---|---|---|---|
| 179.50 | N | N | N | S | S | S | S | N | N | N | N | O | S | S | S | S | N |
| 179.75 | N | N | N | S | S | S | S | N | N | N | N | N | S | S | S | S | N |

Page Row 15, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 168.00 | S | S | S | N | N | N | N | S | S | S | S | S | N | N | N | N | S |
| 168.25 | S | S | S | N | N | N | N | S | S | S | S | S | N | N | N | N | S |
| 168.50 | S | S | S | N | N | N | N | S | S | S | S | S | N | N | N | N | S |
| 168.75 | S | S | S | N | N | N | N | O | S | S | S | S | N | N | N | N | S |
| 169.00 | S | S | S | N | N | N | N | N | S | S | S | S | N | N | N | N | O |
| 169.25 | S | S | S | N | N | N | N | N | S | S | S | S | N | N | N | N | N |
| 169.50 | S | S | S | N | N | N | N | N | S | S | S | S | N | N | N | N | N |
| 169.75 | S | S | S | O | N | N | N | N | S | S | S | S | N | N | N | N | N |
| 170.00 | S | S | S | S | N | N | N | N | S | S | S | S | O | N | N | N | N |
| 170.25 | S | S | S | S | N | N | N | N | S | S | S | S | S | N | N | N | N |
| 170.50 | S | S | S | S | N | N | N | N | S | S | S | S | S | N | N | N | N |
| 170.75 | S | S | S | S | N | N | N | N | S | S | S | S | S | N | N | N | N |
| 171.00 | S | S | S | S | N | N | N | N | O | S | S | S | S | N | N | N | N |
| 171.25 | S | S | S | S | N | N | N | N | N | S | S | S | S | N | N | N | N |
| 171.50 | S | S | S | S | N | N | N | N | N | S | S | S | S | N | N | N | N |
| 171.75 | S | S | S | S | N | N | N | N | N | S | S | S | S | N | N | N | N |
| 172.00 | S | S | S | S | O | N | N | N | N | S | S | S | S | N | N | N | N |
| 172.25 | S | S | S | S | S | N | N | N | N | S | S | S | S | O | N | N | N |
| 172.50 | S | S | S | S | S | N | N | N | N | S | S | S | S | S | N | N | N |
| 172.75 | S | S | S | S | S | N | N | N | N | S | S | S | S | S | N | N | N |
| 173.00 | O | S | S | S | S | N | N | N | N | S | S | S | S | S | N | N | N |
| 173.25 | N | S | S | S | S | N | N | N | N | O | S | S | S | S | N | N | N |
| 173.50 | N | S | S | S | S | N | N | N | N | N | S | S | S | S | N | N | N |
| 173.75 | N | S | S | S | S | N | N | N | N | N | S | S | S | S | N | N | N |
| 174.00 | N | S | S | S | S | N | N | N | N | N | S | S | S | S | N | N | N |
| 174.25 | N | S | S | S | S | O | N | N | N | N | S | S | S | S | N | N | N |
| 174.50 | N | S | S | S | S | S | N | N | N | N | S | S | S | S | O | N | N |
| 174.75 | N | S | S | S | S | S | N | N | N | N | S | S | S | S | S | N | N |
| 175.00 | N | S | S | S | S | S | N | N | N | N | S | S | S | S | S | N | N |
| 175.25 | N | O | S | S | S | S | N | N | N | N | S | S | S | S | S | N | N |
| 175.50 | N | N | S | S | S | S | N | N | N | N | O | S | S | S | S | N | N |
| 175.75 | N | N | S | S | S | S | N | N | N | N | N | S | S | S | S | N | N |
| 176.00 | N | N | S | S | S | S | N | N | N | N | N | S | S | S | S | N | N |
| 176.25 | N | N | S | S | S | S | N | N | N | N | N | S | S | S | S | N | N |
| 176.50 | N | N | S | S | S | S | O | N | N | N | N | S | S | S | S | N | N |
| 176.75 | N | N | S | S | S | S | S | N | N | N | N | S | S | S | S | O | N |
| 177.00 | N | N | S | S | S | S | S | N | N | N | N | S | S | S | S | S | N |
| 177.25 | N | N | S | S | S | S | S | N | N | N | N | S | S | S | S | S | N |
| 177.50 | N | N | O | S | S | S | S | N | N | N | N | S | S | S | S | S | N |
| 177.75 | N | N | N | S | S | S | S | N | N | N | N | O | S | S | S | S | N |
| 178.00 | N | N | N | S | S | S | S | N | N | N | N | N | S | S | S | S | N |
| 178.25 | N | N | N | S | S | S | S | N | N | N | N | N | S | S | S | S | N |
| 178.50 | N | N | N | S | S | S | S | N | N | N | N | N | S | S | S | S | N |
| 178.75 | N | N | N | S | S | S | S | O | N | N | N | N | S | S | S | S | N |
| 179.00 | N | N | N | S | S | S | S | S | N | N | N | N | S | S | S | S | O |
| 179.25 | N | N | N | S | S | S | S | S | N | N | N | N | S | S | S | S | S |
| 179.50 | N | N | N | S | S | S | S | S | N | N | N | N | S | S | S | S | S |
| 179.75 | N | N | N | O | S | S | S | S | N | N | N | N | S | S | S | S | S |

Page Row 15, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 168.00 | S | S | S | O | N | N | N | N | S | S | S | S | N | N | N | N | N |
| 168.25 | S | S | S | S | N | N | N | N | S | S | S | S | O | N | N | N | N |
| 168.50 | S | S | S | S | N | N | N | N | S | S | S | S | S | N | N | N | N |
| 168.75 | S | S | S | S | N | N | N | N | S | S | S | S | S | N | N | N | N |
| 169.00 | S | S | S | S | N | N | N | N | S | S | S | S | S | N | N | N | N |
| 169.25 | S | S | S | S | N | N | N | N | O | S | S | S | S | N | N | N | N |
| 169.50 | S | S | S | S | N | N | N | N | N | S | S | S | S | N | N | N | N |
| 169.75 | S | S | S | S | N | N | N | N | N | S | S | S | S | N | N | N | N |
| 170.00 | S | S | S | S | N | N | N | N | N | S | S | S | S | N | N | N | N |
| 170.25 | S | S | S | S | O | N | N | N | N | S | S | S | S | N | N | N | N |
| 170.50 | S | S | S | S | S | N | N | N | N | S | S | S | S | O | N | N | N |
| 170.75 | S | S | S | S | S | N | N | N | N | S | S | S | S | S | N | N | N |
| 171.00 | S | S | S | S | S | N | N | N | N | S | S | S | S | S | N | N | N |
| 171.25 | O | S | S | S | S | N | N | N | N | S | S | S | S | S | N | N | N |
| 171.50 | N | S | S | S | S | N | N | N | N | O | S | S | S | S | N | N | N |
| 171.75 | N | S | S | S | S | N | N | N | N | N | S | S | S | S | N | N | N |
| 172.00 | N | S | S | S | S | N | N | N | N | N | S | S | S | S | N | N | N |
| 172.25 | N | S | S | S | S | N | N | N | N | N | S | S | S | S | N | N | N |
| 172.50 | N | S | S | S | S | O | N | N | N | N | S | S | S | S | N | N | N |

-continued

| Coil Excitation | | | | | | | | | | | | | | | | | |
|---|---|---|---|---|---|---|---|---|---|---|---|---|---|---|---|---|---|
| 172.75 | N | S | S | S | S | S | N | N | N | N | S | S | S | S | O | N | N |
| 173.00 | N | S | S | S | S | S | N | N | N | N | S | S | S | S | S | N | N |
| 173.25 | N | S | S | S | S | S | N | N | N | N | S | S | S | S | S | N | N |
| 173.50 | N | O | S | S | S | S | N | N | N | N | S | S | S | S | S | N | N |
| 173.75 | N | N | S | S | S | S | N | N | N | N | O | S | S | S | S | N | N |
| 174.00 | N | N | S | S | S | S | N | N | N | N | N | S | S | S | S | N | N |
| 174.25 | N | N | S | S | S | S | N | N | N | N | N | S | S | S | S | N | N |
| 174.50 | N | N | S | S | S | S | N | N | N | N | N | S | S | S | S | N | N |
| 174.75 | N | N | S | S | S | S | O | N | N | N | N | S | S | S | S | N | N |
| 175.00 | N | N | S | S | S | S | S | N | N | N | N | S | S | S | S | O | N |
| 175.25 | N | N | S | S | S | S | S | N | N | N | N | S | S | S | S | S | N |
| 175.50 | N | N | S | S | S | S | S | N | N | N | N | S | S | S | S | S | N |
| 175.75 | N | N | O | S | S | S | S | N | N | N | N | S | S | S | S | S | N |
| 176.00 | N | N | N | S | S | S | S | N | N | N | N | O | S | S | S | S | N |
| 176.25 | N | N | N | S | S | S | S | N | N | N | N | N | S | S | S | S | N |
| 176.50 | N | N | N | S | S | S | S | N | N | N | N | N | S | S | S | S | N |
| 176.75 | N | N | N | S | S | S | S | N | N | N | N | N | S | S | S | S | N |
| 177.00 | N | N | N | S | S | S | S | O | N | N | N | N | S | S | S | S | N |
| 177.25 | N | N | N | S | S | S | S | S | N | N | N | N | S | S | S | S | O |
| 177.50 | N | N | N | S | S | S | S | S | N | N | N | N | S | S | S | S | S |
| 177.75 | N | N | N | S | S | S | S | S | N | N | N | N | S | S | S | S | S |
| 178.00 | N | N | N | O | S | S | S | S | N | N | N | N | S | S | S | S | S |
| 178.25 | N | N | N | N | S | S | S | S | N | N | N | N | O | S | S | S | S |
| 178.50 | N | N | N | N | S | S | S | S | N | N | N | N | N | S | S | S | S |
| 178.75 | N | N | N | N | S | S | S | S | N | N | N | N | N | S | S | S | S |
| 179.00 | N | N | N | N | S | S | S | S | N | N | N | N | N | S | S | S | S |
| 179.25 | N | N | N | N | S | S | S | S | O | N | N | N | N | S | S | S | S |
| 179.50 | N | N | N | N | S | S | S | S | S | N | N | N | N | S | S | S | S |
| 179.75 | N | N | N | N | S | S | S | S | S | N | N | N | N | S | S | S | S |

Page Row 15, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 168.00 | S | S | S | S | N | N | N | N | N | S | S | S | S | N | N | N | N |
| 168.25 | S | S | S | S | N | N | N | N | N | S | S | S | S | N | N | N | N |
| 168.50 | S | S | S | S | O | N | N | N | N | S | S | S | S | N | N | N | N |
| 168.75 | S | S | S | S | S | N | N | N | N | S | S | S | S | O | N | N | N |
| 169.00 | S | S | S | S | S | N | N | N | N | S | S | S | S | S | N | N | N |
| 169.25 | S | S | S | S | S | N | N | N | N | S | S | S | S | S | N | N | N |
| 169.50 | O | S | S | S | S | N | N | N | N | S | S | S | S | S | N | N | N |
| 169.75 | N | S | S | S | S | N | N | N | N | O | S | S | S | S | N | N | N |
| 170.00 | N | S | S | S | S | N | N | N | N | N | S | S | S | S | N | N | N |
| 170.25 | N | S | S | S | S | N | N | N | N | N | S | S | S | S | N | N | N |
| 170.50 | N | S | S | S | S | N | N | N | N | N | S | S | S | S | N | N | N |
| 170.75 | N | S | S | S | S | O | N | N | N | N | S | S | S | S | N | N | N |
| 171.00 | N | S | S | S | S | S | N | N | N | N | S | S | S | S | O | N | N |
| 171.25 | N | S | S | S | S | S | N | N | N | N | S | S | S | S | S | N | N |
| 171.50 | N | S | S | S | S | S | N | N | N | N | S | S | S | S | S | N | N |
| 171.75 | N | O | S | S | S | S | N | N | N | N | S | S | S | S | S | N | N |
| 172.00 | N | N | S | S | S | S | N | N | N | N | O | S | S | S | S | N | N |
| 172.25 | N | N | S | S | S | S | N | N | N | N | N | S | S | S | S | N | N |
| 172.50 | N | N | S | S | S | S | N | N | N | N | N | S | S | S | S | N | N |
| 172.75 | N | N | S | S | S | S | N | N | N | N | N | S | S | S | S | N | N |
| 173.00 | N | N | S | S | S | S | O | N | N | N | N | S | S | S | S | N | N |
| 173.25 | N | N | S | S | S | S | S | N | N | N | N | S | S | S | S | O | N |
| 173.50 | N | N | S | S | S | S | S | N | N | N | N | S | S | S | S | S | N |
| 173.75 | N | N | S | S | S | S | S | N | N | N | N | S | S | S | S | S | N |
| 174.00 | N | N | O | S | S | S | S | N | N | N | N | S | S | S | S | S | N |
| 174.25 | N | N | N | S | S | S | S | N | N | N | N | O | S | S | S | S | N |
| 174.50 | N | N | N | S | S | S | S | N | N | N | N | N | S | S | S | S | N |
| 174.75 | N | N | N | S | S | S | S | N | N | N | N | N | S | S | S | S | N |
| 175.00 | N | N | N | S | S | S | S | N | N | N | N | N | S | S | S | S | N |
| 175.25 | N | N | N | S | S | S | S | O | N | N | N | N | S | S | S | S | N |
| 175.50 | N | N | N | S | S | S | S | S | N | N | N | N | S | S | S | S | O |
| 175.75 | N | N | N | S | S | S | S | S | N | N | N | N | S | S | S | S | S |
| 176.00 | N | N | N | S | S | S | S | S | N | N | N | N | S | S | S | S | S |
| 176.25 | N | N | N | O | S | S | S | S | N | N | N | N | S | S | S | S | S |
| 176.50 | N | N | N | N | S | S | S | S | N | N | N | N | O | S | S | S | S |
| 176.75 | N | N | N | N | S | S | S | S | N | N | N | N | N | S | S | S | S |
| 177.00 | N | N | N | N | S | S | S | S | N | N | N | N | N | S | S | S | S |
| 177.25 | N | N | N | N | S | S | S | S | N | N | N | N | N | S | S | S | S |
| 177.50 | N | N | N | N | S | S | S | S | O | N | N | N | N | S | S | S | S |
| 177.75 | N | N | N | N | S | S | S | S | S | N | N | N | N | S | S | S | S |
| 178.00 | N | N | N | N | S | S | S | S | S | N | N | N | N | S | S | S | S |
| 178.25 | N | N | N | N | S | S | S | S | S | N | N | N | N | S | S | S | S |
| 178.50 | N | N | N | N | O | S | S | S | S | N | N | N | N | S | S | S | S |
| 178.75 | N | N | N | N | N | S | S | S | S | N | N | N | N | O | S | S | S |

-continued

| Coil Excitation | | | | | | | | | | | | | | | | | |
|---|---|---|---|---|---|---|---|---|---|---|---|---|---|---|---|---|---|
| 179.00 | N | N | N | N | N | S | S | S | S | N | N | N | N | N | S | S | S |
| 179.25 | N | N | N | N | N | S | S | S | S | N | N | N | N | N | S | S | S |
| 179.50 | O | N | N | N | N | S | S | S | S | N | N | N | N | N | S | S | S |
| 179.75 | S | N | N | N | N | S | S | S | S | O | N | N | N | N | S | S | S |

Page Row 15, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 168.00 | N | S | S | S | S | N | N | N | N | O | S | S | S | S | N | N | N |
| 168.25 | N | S | S | S | S | N | N | N | N | N | S | S | S | S | N | N | N |
| 168.50 | N | S | S | S | S | N | N | N | N | N | S | S | S | S | N | N | N |
| 168.75 | N | S | S | S | S | N | N | N | N | N | S | S | S | S | N | N | N |
| 169.00 | N | S | S | S | S | O | N | N | N | N | S | S | S | S | N | N | N |
| 169.25 | N | S | S | S | S | S | N | N | N | N | S | S | S | S | O | N | N |
| 169.50 | N | S | S | S | S | S | N | N | N | N | S | S | S | S | S | N | N |
| 169.75 | N | S | S | S | S | S | N | N | N | N | S | S | S | S | S | N | N |
| 170.00 | N | O | S | S | S | S | N | N | N | N | S | S | S | S | S | N | N |
| 170.25 | N | N | S | S | S | S | N | N | N | N | O | S | S | S | S | N | N |
| 170.50 | N | N | S | S | S | S | N | N | N | N | N | S | S | S | S | N | N |
| 170.75 | N | N | S | S | S | S | N | N | N | N | N | S | S | S | S | N | N |
| 171.00 | N | N | S | S | S | S | N | N | N | N | N | S | S | S | S | N | N |
| 171.25 | N | N | S | S | S | S | O | N | N | N | N | S | S | S | S | N | N |
| 171.50 | N | N | S | S | S | S | S | N | N | N | N | S | S | S | S | O | N |
| 171.75 | N | N | S | S | S | S | S | N | N | N | N | S | S | S | S | S | N |
| 172.00 | N | N | S | S | S | S | S | N | N | N | N | S | S | S | S | S | N |
| 172.25 | N | N | O | S | S | S | S | N | N | N | N | S | S | S | S | S | N |
| 172.50 | N | N | N | S | S | S | S | N | N | N | N | O | S | S | S | S | N |
| 172.75 | N | N | N | S | S | S | S | N | N | N | N | N | S | S | S | S | N |
| 173.00 | N | N | N | S | S | S | S | N | N | N | N | N | S | S | S | S | N |
| 173.25 | N | N | N | S | S | S | S | N | N | N | N | N | S | S | S | S | N |
| 173.50 | N | N | N | S | S | S | S | O | N | N | N | N | S | S | S | S | N |
| 173.75 | N | N | N | S | S | S | S | S | N | N | N | N | S | S | S | S | O |
| 174.00 | N | N | N | S | S | S | S | S | N | N | N | N | S | S | S | S | S |
| 174.25 | N | N | N | S | S | S | S | S | N | N | N | N | S | S | S | S | S |
| 174.50 | N | N | N | O | S | S | S | S | N | N | N | N | S | S | S | S | S |
| 174.75 | N | N | N | N | S | S | S | S | N | N | N | N | O | S | S | S | S |
| 175.00 | N | N | N | N | S | S | S | S | N | N | N | N | N | S | S | S | S |
| 175.25 | N | N | N | N | S | S | S | S | N | N | N | N | N | S | S | S | S |
| 175.50 | N | N | N | N | S | S | S | S | N | N | N | N | N | S | S | S | S |
| 175.75 | N | N | N | N | S | S | S | S | O | N | N | N | N | S | S | S | S |
| 176.00 | N | N | N | N | S | S | S | S | S | N | N | N | N | S | S | S | S |
| 176.25 | N | N | N | N | S | S | S | S | S | N | N | N | N | S | S | S | S |
| 176.50 | N | N | N | N | S | S | S | S | S | N | N | N | N | S | S | S | S |
| 176.75 | N | N | N | N | O | S | S | S | S | N | N | N | N | S | S | S | S |
| 177.00 | N | N | N | N | N | S | S | S | S | N | N | N | N | O | S | S | S |
| 177.25 | N | N | N | N | N | S | S | S | S | N | N | N | N | N | S | S | S |
| 177.50 | N | N | N | N | N | S | S | S | S | N | N | N | N | N | S | S | S |
| 177.75 | O | N | N | N | N | S | S | S | S | N | N | N | N | N | S | S | S |
| 178.00 | S | N | N | N | N | S | S | S | S | O | N | N | N | N | S | S | S |
| 178.25 | S | N | N | N | N | S | S | S | S | S | N | N | N | N | S | S | S |
| 178.50 | S | N | N | N | N | S | S | S | S | S | N | N | N | N | S | S | S |
| 178.75 | S | N | N | N | N | S | S | S | S | S | N | N | N | N | S | S | S |
| 179.00 | S | N | N | N | N | O | S | S | S | S | N | N | N | N | S | S | S |
| 179.25 | S | N | N | N | N | N | S | S | S | S | N | N | N | N | O | S | S |
| 179.50 | S | N | N | N | N | N | S | S | S | S | N | N | N | N | N | S | S |
| 179.75 | S | N | N | N | N | N | S | S | S | S | N | N | N | N | N | S | S |

Page Row 15, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 168.00 | N | S | S | S | S | S | N | N | N | N | S | S | S | S | S | N | N |
| 168.25 | N | O | S | S | S | S | N | N | N | N | S | S | S | S | S | N | N |
| 168.50 | N | N | S | S | S | S | N | N | N | N | O | S | S | S | S | N | N |
| 168.75 | N | N | S | S | S | S | N | N | N | N | N | S | S | S | S | N | N |
| 169.00 | N | N | S | S | S | S | N | N | N | N | N | S | S | S | S | N | N |
| 169.25 | N | N | S | S | S | S | N | N | N | N | N | S | S | S | S | N | N |
| 169.50 | N | N | S | S | S | S | O | N | N | N | N | S | S | S | S | N | N |
| 169.75 | N | N | S | S | S | S | S | N | N | N | N | S | S | S | S | O | N |
| 170.00 | N | N | S | S | S | S | S | N | N | N | N | S | S | S | S | S | N |
| 170.25 | N | N | S | S | S | S | S | N | N | N | N | S | S | S | S | S | N |
| 170.50 | N | N | O | S | S | S | S | N | N | N | N | S | S | S | S | S | N |
| 170.75 | N | N | N | S | S | S | S | N | N | N | N | O | S | S | S | S | N |
| 171.00 | N | N | N | S | S | S | S | N | N | N | N | N | S | S | S | S | N |
| 171.25 | N | N | N | S | S | S | S | N | N | N | N | N | S | S | S | S | N |
| 171.50 | N | N | N | S | S | S | S | N | N | N | N | N | S | S | S | S | N |
| 171.75 | N | N | N | S | S | S | S | O | N | N | N | N | S | S | S | S | N |
| 172.00 | N | N | N | S | S | S | S | S | N | N | N | N | S | S | S | S | O |

-continued

| Coil Excitation | | | | | | | | | | | | | | | | | |
|---|---|---|---|---|---|---|---|---|---|---|---|---|---|---|---|---|---|
| 172.25 | N | N | N | S | S | S | S | S | N | N | N | N | S | S | S | S | S |
| 172.50 | N | N | N | S | S | S | S | S | N | N | N | N | S | S | S | S | S |
| 172.75 | N | N | N | O | S | S | S | S | N | N | N | N | S | S | S | S | S |
| 173.00 | N | N | N | N | S | S | S | S | N | N | N | N | O | S | S | S | S |
| 173.25 | N | N | N | N | S | S | S | S | N | N | N | N | N | S | S | S | S |
| 173.50 | N | N | N | N | S | S | S | S | N | N | N | N | N | S | S | S | S |
| 173.75 | N | N | N | N | S | S | S | S | N | N | N | N | N | S | S | S | S |
| 174.00 | N | N | N | N | S | S | S | S | O | N | N | N | N | S | S | S | S |
| 174.25 | N | N | N | N | S | S | S | S | S | N | N | N | N | S | S | S | S |
| 174.50 | N | N | N | N | S | S | S | S | S | N | N | N | N | S | S | S | S |
| 174.75 | N | N | N | N | S | S | S | S | S | N | N | N | N | S | S | S | S |
| 175.00 | N | N | N | N | O | S | S | S | S | N | N | N | N | S | S | S | S |
| 175.25 | N | N | N | N | N | S | S | S | S | N | N | N | N | O | S | S | S |
| 175.50 | N | N | N | N | N | S | S | S | S | N | N | N | N | N | S | S | S |
| 175.75 | N | N | N | N | N | S | S | S | S | N | N | N | N | N | S | S | S |
| 176.00 | O | N | N | N | N | S | S | S | S | N | N | N | N | N | S | S | S |
| 176.25 | S | N | N | N | N | S | S | S | S | O | N | N | N | N | S | S | S |
| 176.50 | S | N | N | N | N | S | S | S | S | S | N | N | N | N | S | S | S |
| 176.75 | S | N | N | N | N | S | S | S | S | S | N | N | N | N | S | S | S |
| 177.00 | S | N | N | N | N | S | S | S | S | S | N | N | N | N | S | S | S |
| 177.25 | S | N | N | N | N | O | S | S | S | S | N | N | N | N | S | S | S |
| 177.50 | S | N | N | N | N | N | S | S | S | S | N | N | N | N | O | S | S |
| 177.75 | S | N | N | N | N | N | S | S | S | S | N | N | N | N | N | S | S |
| 178.00 | S | N | N | N | N | N | S | S | S | S | N | N | N | N | N | S | S |
| 178.25 | S | O | N | N | N | N | S | S | S | S | N | N | N | N | N | S | S |
| 178.50 | S | S | N | N | N | N | S | S | S | S | O | N | N | N | N | S | S |
| 178.75 | S | S | N | N | N | N | S | S | S | S | S | N | N | N | N | S | S |
| 179.00 | S | S | N | N | N | N | S | S | S | S | S | N | N | N | N | S | S |
| 179.25 | S | S | N | N | N | N | S | S | S | S | S | N | N | N | N | S | S |
| 179.50 | S | S | N | N | N | N | O | S | S | S | S | N | N | N | N | S | S |
| 179.75 | S | S | N | N | N | N | N | S | S | S | S | N | N | N | N | O | S |

Page Row 15, Page Column 9

| Coil | 154 | 155 | 156 | 157 | 158 | 159 | 160 |
|---|---|---|---|---|---|---|---|
| 168.00 | N | N | S | S | S | S | S |
| 168.25 | N | N | S | S | S | S | S |
| 168.50 | N | N | S | S | S | S | S |
| 168.75 | N | N | O | S | S | S | S |
| 169.00 | N | N | N | S | S | S | S |
| 169.25 | N | N | N | S | S | S | S |
| 169.50 | N | N | N | S | S | S | S |
| 169.75 | N | N | N | S | S | S | S |
| 170.00 | N | N | N | S | S | S | S |
| 170.25 | N | N | N | S | S | S | S |
| 170.50 | N | N | N | S | S | S | S |
| 170.75 | N | N | N | S | S | S | S |
| 171.00 | N | N | N | O | S | S | S |
| 171.25 | N | N | N | N | S | S | S |
| 171.50 | N | N | N | N | S | S | S |
| 171.75 | N | N | N | N | S | S | S |
| 172.00 | N | N | N | N | S | S | S |
| 172.25 | N | N | N | N | S | S | S |
| 172.50 | N | N | N | N | S | S | S |
| 172.75 | N | N | N | N | S | S | S |
| 173.00 | N | N | N | N | S | S | S |
| 173.25 | N | N | N | N | O | S | S |
| 173.50 | N | N | N | N | N | S | S |
| 173.75 | N | N | N | N | N | S | S |
| 174.00 | N | N | N | N | N | S | S |
| 174.25 | O | N | N | N | N | S | S |
| 174.50 | S | N | N | N | N | S | S |
| 174.75 | S | N | N | N | N | S | S |
| 175.00 | S | N | N | N | N | S | S |
| 175.25 | S | N | N | N | N | S | S |
| 175.50 | S | N | N | N | N | O | S |
| 175.75 | S | N | N | N | N | N | S |
| 176.00 | S | N | N | N | N | N | S |
| 176.25 | S | N | N | N | N | N | S |
| 176.50 | S | O | N | N | N | N | S |
| 176.75 | S | S | N | N | N | N | S |
| 177.00 | S | S | N | N | N | N | S |
| 177.25 | S | S | N | N | N | N | S |
| 177.50 | S | S | N | N | N | N | S |
| 177.75 | S | S | N | N | N | N | O |
| 178.00 | S | S | N | N | N | N | N |
| 178.25 | S | S | N | N | N | N | N |

-continued

Coil Excitation

| | | | | | | | |
|---|---|---|---|---|---|---|---|
| 178.50 | S | S | N | N | N | N | N |
| 178.75 | S | S | O | N | N | N | N |
| 179.00 | S | S | S | N | N | N | N |
| 179.25 | S | S | S | N | N | N | N |
| 179.50 | S | S | S | N | N | N | N |
| 179.75 | S | S | S | N | N | N | N |

Page Row 15, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 180.00 | O | S | S | S | S | N | N | N | N | S | S | S | S | S | N | N | N |
| 180.25 | N | S | S | S | S | N | N | N | N | O | S | S | S | S | N | N | N |
| 180.50 | N | S | S | S | S | N | N | N | N | N | S | S | S | S | N | N | N |
| 180.75 | N | S | S | S | S | N | N | N | N | N | S | S | S | S | N | N | N |
| 181.00 | N | S | S | S | S | N | N | N | N | N | S | S | S | S | N | N | N |
| 181.25 | N | S | S | S | S | O | N | N | N | N | S | S | S | S | N | N | N |
| 181.50 | N | S | S | S | S | S | N | N | N | N | S | S | S | S | O | N | N |
| 181.75 | N | S | S | S | S | S | N | N | N | N | S | S | S | S | S | N | N |
| 182.00 | N | S | S | S | S | S | N | N | N | N | S | S | S | S | S | N | N |
| 182.25 | N | O | S | S | S | S | N | N | N | N | S | S | S | S | S | N | N |
| 182.50 | N | N | S | S | S | S | N | N | N | N | O | S | S | S | S | N | N |
| 182.75 | N | N | S | S | S | S | N | N | N | N | N | S | S | S | S | N | N |
| 183.00 | N | N | S | S | S | S | N | N | N | N | N | S | S | S | S | N | N |
| 183.25 | N | N | S | S | S | S | N | N | N | N | N | S | S | S | S | N | N |
| 183.50 | N | N | S | S | S | S | O | N | N | N | N | S | S | S | S | N | N |
| 183.75 | N | N | S | S | S | S | S | N | N | N | N | S | S | S | S | O | N |
| 184.00 | N | N | S | S | S | S | S | N | N | N | N | S | S | S | S | S | N |
| 184.25 | N | N | S | S | S | S | S | N | N | N | N | S | S | S | S | S | N |
| 184.50 | N | N | O | S | S | S | S | N | N | N | N | S | S | S | S | S | N |
| 184.75 | N | N | N | S | S | S | S | N | N | N | N | O | S | S | S | S | N |
| 185.00 | N | N | N | S | S | S | S | N | N | N | N | N | S | S | S | S | N |
| 185.25 | N | N | N | S | S | S | S | N | N | N | N | N | S | S | S | S | N |
| 185.50 | N | N | N | S | S | S | S | N | N | N | N | N | S | S | S | S | N |
| 185.75 | N | N | N | S | S | S | S | O | N | N | N | N | S | S | S | S | N |
| 186.00 | N | N | N | S | S | S | S | S | N | N | N | N | S | S | S | S | O |
| 186.25 | N | N | N | S | S | S | S | S | N | N | N | N | S | S | S | S | S |
| 186.50 | N | N | N | S | S | S | S | S | N | N | N | N | S | S | S | S | S |
| 186.75 | N | N | N | O | S | S | S | S | N | N | N | N | S | S | S | S | S |
| 187.00 | N | N | N | N | S | S | S | S | N | N | N | N | O | S | S | S | S |
| 187.25 | N | N | N | N | S | S | S | S | N | N | N | N | N | S | S | S | S |
| 187.50 | N | N | N | N | S | S | S | S | N | N | N | N | N | S | S | S | S |
| 187.75 | N | N | N | N | S | S | S | S | N | N | N | N | N | S | S | S | S |
| 188.00 | N | N | N | N | S | S | S | S | O | N | N | N | N | S | S | S | S |
| 188.25 | N | N | N | N | S | S | S | S | S | N | N | N | N | S | S | S | S |
| 188.50 | N | N | N | N | S | S | S | S | S | N | N | N | N | S | S | S | S |
| 188.75 | N | N | N | N | S | S | S | S | S | N | N | N | N | S | S | S | S |
| 189.00 | N | N | N | N | O | S | S | S | S | N | N | N | N | S | S | S | S |
| 189.25 | N | N | N | N | N | S | S | S | S | N | N | N | N | O | S | S | S |
| 189.50 | N | N | N | N | N | S | S | S | S | N | N | N | N | N | S | S | S |
| 189.75 | N | N | N | N | N | S | S | S | S | N | N | N | N | N | S | S | S |
| 190.00 | O | N | N | N | N | S | S | S | S | N | N | N | N | N | S | S | S |
| 190.25 | S | N | N | N | N | S | S | S | S | O | N | N | N | N | S | S | S |
| 190.50 | S | N | N | N | N | S | S | S | S | S | N | N | N | N | S | S | S |
| 190.75 | S | N | N | N | N | S | S | S | S | S | N | N | N | N | S | S | S |
| 191.00 | S | N | N | N | N | S | S | S | S | S | N | N | N | N | S | S | S |
| 191.25 | S | N | N | N | N | O | S | S | S | S | N | N | N | N | S | S | S |
| 191.50 | S | N | N | N | N | N | S | S | S | S | N | N | N | N | O | S | S |
| 191.75 | S | N | N | N | N | N | S | S | S | S | N | N | N | N | N | S | S |

Page Row 16, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 180.00 | N | S | S | S | S | S | N | N | N | N | S | S | S | S | S | N | N |
| 180.25 | N | S | S | S | S | S | N | N | N | N | S | S | S | S | S | N | N |
| 180.50 | N | O | S | S | S | S | N | N | N | N | S | S | S | S | S | N | N |
| 180.75 | N | N | S | S | S | S | N | N | N | N | O | S | S | S | S | N | N |
| 181.00 | N | N | S | S | S | S | N | N | N | N | N | S | S | S | S | N | N |
| 181.25 | N | N | S | S | S | S | N | N | N | N | N | S | S | S | S | N | N |
| 181.50 | N | N | S | S | S | S | N | N | N | N | N | S | S | S | S | N | N |
| 181.75 | N | N | S | S | S | S | O | N | N | N | N | S | S | S | S | N | N |
| 182.00 | N | N | S | S | S | S | S | N | N | N | N | S | S | S | S | O | N |
| 182.25 | N | N | S | S | S | S | S | N | N | N | N | S | S | S | S | S | N |
| 182.50 | N | N | S | S | S | S | S | N | N | N | N | S | S | S | S | S | N |
| 182.75 | N | N | O | S | S | S | S | N | N | N | N | S | S | S | S | S | N |
| 183.00 | N | N | N | S | S | S | S | N | N | N | N | O | S | S | S | S | N |
| 183.25 | N | N | N | S | S | S | S | N | N | N | N | N | S | S | S | S | N |
| 183.50 | N | N | N | S | S | S | S | N | N | N | N | N | S | S | S | S | N |

-continued

| Coil Excitation | | | | | | | | | | | | | | | | | |
|---|---|---|---|---|---|---|---|---|---|---|---|---|---|---|---|---|---|
| 183.75 | N | N | N | S | S | S | S | N | N | N | N | N | S | S | S | S | N |
| 184.00 | N | N | N | S | S | S | S | O | N | N | N | N | S | S | S | S | N |
| 184.25 | N | N | N | S | S | S | S | S | N | N | N | N | S | S | S | S | O |
| 184.50 | N | N | N | S | S | S | S | S | N | N | N | N | S | S | S | S | S |
| 184.75 | N | N | N | S | S | S | S | S | N | N | N | N | S | S | S | S | S |
| 185.00 | N | N | N | O | S | S | S | S | N | N | N | N | S | S | S | S | S |
| 185.25 | N | N | N | N | S | S | S | S | N | N | N | N | O | S | S | S | S |
| 185.50 | N | N | N | N | S | S | S | S | N | N | N | N | N | S | S | S | S |
| 185.75 | N | N | N | N | S | S | S | S | N | N | N | N | N | S | S | S | S |
| 186.00 | N | N | N | N | S | S | S | S | N | N | N | N | N | S | S | S | S |
| 186.25 | N | N | N | N | S | S | S | S | O | N | N | N | N | S | S | S | S |
| 186.50 | N | N | N | N | S | S | S | S | S | N | N | N | N | S | S | S | S |
| 186.75 | N | N | N | N | S | S | S | S | S | N | N | N | N | S | S | S | S |
| 187.00 | N | N | N | N | S | S | S | S | S | N | N | N | N | S | S | S | S |
| 187.25 | N | N | N | N | O | S | S | S | S | N | N | N | N | S | S | S | S |
| 187.50 | N | N | N | N | N | S | S | S | S | N | N | N | N | O | S | S | S |
| 187.75 | N | N | N | N | N | S | S | S | S | N | N | N | N | N | S | S | S |
| 188.00 | N | N | N | N | N | S | S | S | S | N | N | N | N | N | S | S | S |
| 188.25 | O | N | N | N | N | S | S | S | S | N | N | N | N | N | S | S | S |
| 188.50 | S | N | N | N | N | S | S | S | S | O | N | N | N | N | S | S | S |
| 188.75 | S | N | N | N | N | S | S | S | S | S | N | N | N | N | S | S | S |
| 189.00 | S | N | N | N | N | S | S | S | S | S | N | N | N | N | S | S | S |
| 189.25 | S | N | N | N | N | S | S | S | S | S | N | N | N | N | S | S | S |
| 189.50 | S | N | N | N | N | O | S | S | S | S | N | N | N | N | S | S | S |
| 189.75 | S | N | N | N | N | N | S | S | S | S | N | N | N | N | O | S | S |
| 190.00 | S | N | N | N | N | N | S | S | S | S | N | N | N | N | N | S | S |
| 190.25 | S | N | N | N | N | N | S | S | S | S | N | N | N | N | N | S | S |
| 190.50 | S | O | N | N | N | N | S | S | S | S | N | N | N | N | N | S | S |
| 190.75 | S | S | N | N | N | N | S | S | S | S | O | N | N | N | N | S | S |
| 191.00 | S | S | N | N | N | N | S | S | S | S | S | N | N | N | N | S | S |
| 191.25 | S | S | N | N | N | N | S | S | S | S | S | N | N | N | N | S | S |
| 191.50 | S | S | N | N | N | N | S | S | S | S | S | N | N | N | N | S | S |
| 191.75 | S | S | N | N | N | N | O | S | S | S | S | N | N | N | N | S | S |

Page Row 16, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 180.00 | N | N | S | S | S | S | O | N | N | N | N | S | S | S | S | N | N |
| 180.25 | N | N | S | S | S | S | S | N | N | N | N | S | S | S | S | O | N |
| 180.50 | N | N | S | S | S | S | S | N | N | N | N | S | S | S | S | S | N |
| 180.75 | N | N | S | S | S | S | S | N | N | N | N | S | S | S | S | S | N |
| 181.00 | N | N | O | S | S | S | S | N | N | N | N | S | S | S | S | S | N |
| 181.25 | N | N | N | S | S | S | S | N | N | N | N | O | S | S | S | S | N |
| 181.50 | N | N | N | S | S | S | S | N | N | N | N | N | S | S | S | S | N |
| 181.75 | N | N | N | S | S | S | S | N | N | N | N | N | S | S | S | S | N |
| 182.00 | N | N | N | S | S | S | S | N | N | N | N | N | S | S | S | S | N |
| 182.25 | N | N | N | S | S | S | S | O | N | N | N | N | S | S | S | S | N |
| 182.50 | N | N | N | S | S | S | S | S | N | N | N | N | S | S | S | S | O |
| 182.75 | N | N | N | S | S | S | S | S | N | N | N | N | S | S | S | S | S |
| 183.00 | N | N | N | S | S | S | S | S | N | N | N | N | S | S | S | S | S |
| 183.25 | N | N | N | O | S | S | S | S | N | N | N | N | S | S | S | S | S |
| 183.50 | N | N | N | N | S | S | S | S | N | N | N | N | O | S | S | S | S |
| 183.75 | N | N | N | N | S | S | S | S | N | N | N | N | N | S | S | S | S |
| 184.00 | N | N | N | N | S | S | S | S | N | N | N | N | N | S | S | S | S |
| 184.25 | N | N | N | N | S | S | S | S | N | N | N | N | N | S | S | S | S |
| 184.50 | N | N | N | N | S | S | S | S | O | N | N | N | N | S | S | S | S |
| 184.75 | N | N | N | N | S | S | S | S | S | N | N | N | N | S | S | S | S |
| 185.00 | N | N | N | N | S | S | S | S | S | N | N | N | N | S | S | S | S |
| 185.25 | N | N | N | N | S | S | S | S | S | N | N | N | N | S | S | S | S |
| 185.50 | N | N | N | N | O | S | S | S | S | N | N | N | N | S | S | S | S |
| 185.75 | N | N | N | N | N | S | S | S | S | N | N | N | N | O | S | S | S |
| 186.00 | N | N | N | N | N | S | S | S | S | N | N | N | N | N | S | S | S |
| 186.25 | N | N | N | N | N | S | S | S | S | N | N | N | N | N | S | S | S |
| 186.50 | O | N | N | N | N | S | S | S | S | N | N | N | N | N | S | S | S |
| 186.75 | S | N | N | N | N | S | S | S | S | O | N | N | N | N | S | S | S |
| 187.00 | S | N | N | N | N | S | S | S | S | S | N | N | N | N | S | S | S |
| 187.25 | S | N | N | N | N | S | S | S | S | S | N | N | N | N | S | S | S |
| 187.50 | S | N | N | N | N | S | S | S | S | S | N | N | N | N | S | S | S |
| 187.75 | S | N | N | N | N | O | S | S | S | S | N | N | N | N | S | S | S |
| 188.00 | S | N | N | N | N | N | S | S | S | S | N | N | N | N | O | S | S |
| 188.25 | S | N | N | N | N | N | S | S | S | S | N | N | N | N | N | S | S |
| 188.50 | S | N | N | N | N | N | S | S | S | S | N | N | N | N | N | S | S |
| 188.75 | S | O | N | N | N | N | S | S | S | S | N | N | N | N | N | S | S |
| 189.00 | S | S | N | N | N | N | S | S | S | S | O | N | N | N | N | S | S |
| 189.25 | S | S | N | N | N | N | S | S | S | S | S | N | N | N | N | S | S |
| 189.50 | S | S | N | N | N | N | S | S | S | S | S | N | N | N | N | S | S |
| 189.75 | S | S | N | N | N | N | S | S | S | S | S | N | N | N | N | S | S |

-continued

| Coil Excitation | | | | | | | | | | | | | | | | | |
|---|---|---|---|---|---|---|---|---|---|---|---|---|---|---|---|---|---|
| 190.00 | S | S | N | N | N | N | O | S | S | S | S | N | N | N | N | S | S |
| 190.25 | S | S | N | N | N | N | N | S | S | S | S | N | N | N | N | O | S |
| 190.50 | S | S | N | N | N | N | N | S | S | S | S | N | N | N | N | N | S |
| 190.75 | S | S | N | N | N | N | N | S | S | S | S | N | N | N | N | N | S |
| 191.00 | S | S | O | N | N | N | N | S | S | S | S | N | N | N | N | N | S |
| 191.25 | S | S | S | N | N | N | N | S | S | S | S | O | N | N | N | N | S |
| 191.50 | S | S | S | N | N | N | N | S | S | S | S | S | N | N | N | N | S |
| 191.75 | S | S | S | N | N | N | N | S | S | S | S | S | N | N | N | N | S |

Page Row 16, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 180.00 | N | N | N | S | S | S | S | N | N | N | N | N | S | S | S | S | N |
| 180.25 | N | N | N | S | S | S | S | N | N | N | N | N | S | S | S | S | N |
| 180.50 | N | N | N | S | S | S | S | O | N | N | N | N | S | S | S | S | N |
| 180.75 | N | N | N | S | S | S | S | S | N | N | N | N | S | S | S | S | O |
| 181.00 | N | N | N | S | S | S | S | S | N | N | N | N | S | S | S | S | S |
| 181.25 | N | N | N | S | S | S | S | S | N | N | N | N | S | S | S | S | S |
| 181.50 | N | N | N | O | S | S | S | S | N | N | N | N | S | S | S | S | S |
| 181.75 | N | N | N | N | S | S | S | S | N | N | N | N | O | S | S | S | S |
| 182.00 | N | N | N | N | S | S | S | S | N | N | N | N | N | S | S | S | S |
| 182.25 | N | N | N | N | S | S | S | S | N | N | N | N | N | S | S | S | S |
| 182.50 | N | N | N | N | S | S | S | S | N | N | N | N | N | S | S | S | S |
| 182.75 | N | N | N | N | S | S | S | S | O | N | N | N | N | S | S | S | S |
| 183.00 | N | N | N | N | S | S | S | S | S | N | N | N | N | S | S | S | S |
| 183.25 | N | N | N | N | S | S | S | S | S | N | N | N | N | S | S | S | S |
| 183.50 | N | N | N | N | S | S | S | S | S | N | N | N | N | S | S | S | S |
| 183.75 | N | N | N | N | O | S | S | S | S | N | N | N | N | S | S | S | S |
| 184.00 | N | N | N | N | N | S | S | S | S | N | N | N | N | O | S | S | S |
| 184.25 | N | N | N | N | N | S | S | S | S | N | N | N | N | N | S | S | S |
| 184.50 | N | N | N | N | N | S | S | S | S | N | N | N | N | N | S | S | S |
| 184.75 | O | N | N | N | N | S | S | S | S | N | N | N | N | N | S | S | S |
| 185.00 | S | N | N | N | N | S | S | S | S | O | N | N | N | N | S | S | S |
| 185.25 | S | N | N | N | N | S | S | S | S | S | N | N | N | N | S | S | S |
| 185.50 | S | N | N | N | N | S | S | S | S | S | N | N | N | N | S | S | S |
| 185.75 | S | N | N | N | N | S | S | S | S | S | N | N | N | N | S | S | S |
| 186.00 | S | N | N | N | N | O | S | S | S | S | N | N | N | N | S | S | S |
| 186.25 | S | N | N | N | N | N | S | S | S | S | N | N | N | N | O | S | S |
| 186.50 | S | N | N | N | N | N | S | S | S | S | N | N | N | N | N | S | S |
| 186.75 | S | N | N | N | N | N | S | S | S | S | N | N | N | N | N | S | S |
| 187.00 | S | O | N | N | N | N | S | S | S | S | N | N | N | N | N | S | S |
| 187.25 | S | S | N | N | N | N | S | S | S | S | O | N | N | N | N | S | S |
| 187.50 | S | S | N | N | N | N | S | S | S | S | S | N | N | N | N | S | S |
| 187.75 | S | S | N | N | N | N | S | S | S | S | S | N | N | N | N | S | S |
| 188.00 | S | S | N | N | N | N | S | S | S | S | S | N | N | N | N | S | S |
| 188.25 | S | S | N | N | N | N | O | S | S | S | S | N | N | N | N | S | S |
| 188.50 | S | S | N | N | N | N | N | S | S | S | S | N | N | N | N | O | S |
| 188.75 | S | S | N | N | N | N | N | S | S | S | S | N | N | N | N | N | S |
| 189.00 | S | S | N | N | N | N | N | S | S | S | S | N | N | N | N | N | S |
| 189.25 | S | S | O | N | N | N | N | S | S | S | S | N | N | N | N | N | S |
| 189.50 | S | S | S | N | N | N | N | S | S | S | S | O | N | N | N | N | S |
| 189.75 | S | S | S | N | N | N | N | S | S | S | S | S | N | N | N | N | S |
| 190.00 | S | S | S | N | N | N | N | S | S | S | S | S | N | N | N | N | S |
| 190.25 | S | S | S | N | N | N | N | S | S | S | S | S | N | N | N | N | S |
| 190.50 | S | S | S | N | N | N | N | O | S | S | S | S | N | N | N | N | S |
| 190.75 | S | S | S | N | N | N | N | N | S | S | S | S | N | N | N | N | O |
| 191.00 | S | S | S | N | N | N | N | N | S | S | S | S | N | N | N | N | N |
| 191.25 | S | S | S | N | N | N | N | N | S | S | S | S | N | N | N | N | N |
| 191.50 | S | S | S | O | N | N | N | N | S | S | S | S | N | N | N | N | N |
| 191.75 | S | S | S | S | N | N | N | N | S | S | S | S | O | N | N | N | N |

Page Row 16, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 180.00 | N | N | N | N | S | S | S | S | N | N | N | N | O | S | S | S | S |
| 180.25 | N | N | N | N | S | S | S | S | N | N | N | N | N | S | S | S | S |
| 180.50 | N | N | N | N | S | S | S | S | N | N | N | N | N | S | S | S | S |
| 180.75 | N | N | N | N | S | S | S | S | N | N | N | N | N | S | S | S | S |
| 181.00 | N | N | N | N | S | S | S | S | O | N | N | N | N | S | S | S | S |
| 181.25 | N | N | N | N | S | S | S | S | S | N | N | N | N | S | S | S | S |
| 181.50 | N | N | N | N | S | S | S | S | S | N | N | N | N | S | S | S | S |
| 181.75 | N | N | N | N | S | S | S | S | S | N | N | N | N | S | S | S | S |
| 182.00 | N | N | N | N | O | S | S | S | S | N | N | N | N | S | S | S | S |
| 182.25 | N | N | N | N | N | S | S | S | S | N | N | N | N | O | S | S | S |
| 182.50 | N | N | N | N | N | S | S | S | S | N | N | N | N | N | S | S | S |
| 182.75 | N | N | N | N | N | S | S | S | S | N | N | N | N | N | S | S | S |
| 183.00 | O | N | N | N | N | S | S | S | S | N | N | N | N | N | S | S | S |

-continued

| Coil Excitation | | | | | | | | | | | | | | | | | |
|---|---|---|---|---|---|---|---|---|---|---|---|---|---|---|---|---|---|
| 183.25 | S | N | N | N | N | S | S | S | S | O | N | N | N | N | S | S | S |
| 183.50 | S | N | N | N | N | S | S | S | S | S | N | N | N | N | S | S | S |
| 183.75 | S | N | N | N | N | S | S | S | S | S | N | N | N | N | S | S | S |
| 184.00 | S | N | N | N | N | S | S | S | S | S | N | N | N | N | S | S | S |
| 184.25 | S | N | N | N | N | O | S | S | S | S | N | N | N | N | S | S | S |
| 184.50 | S | N | N | N | N | N | S | S | S | S | N | N | N | N | O | S | S |
| 184.75 | S | N | N | N | N | N | S | S | S | S | N | N | N | N | N | S | S |
| 185.00 | S | N | N | N | N | N | S | S | S | S | N | N | N | N | N | S | S |
| 185.25 | S | O | N | N | N | N | S | S | S | S | N | N | N | N | N | S | S |
| 185.50 | S | S | N | N | N | N | S | S | S | S | O | N | N | N | N | S | S |
| 185.75 | S | S | N | N | N | N | S | S | S | S | S | N | N | N | N | S | S |
| 186.00 | S | S | N | N | N | N | S | S | S | S | S | N | N | N | N | S | S |
| 186.25 | S | S | N | N | N | N | S | S | S | S | S | N | N | N | N | S | S |
| 186.50 | S | S | N | N | N | N | O | S | S | S | S | N | N | N | N | S | S |
| 186.75 | S | S | N | N | N | N | N | S | S | S | S | N | N | N | N | O | S |
| 187.00 | S | S | N | N | N | N | N | S | S | S | S | N | N | N | N | N | S |
| 187.25 | S | S | N | N | N | N | N | S | S | S | S | N | N | N | N | N | S |
| 187.50 | S | S | O | N | N | N | N | S | S | S | S | N | N | N | N | N | S |
| 187.75 | S | S | S | N | N | N | N | S | S | S | S | O | N | N | N | N | S |
| 188.00 | S | S | S | N | N | N | N | S | S | S | S | S | N | N | N | N | S |
| 188.25 | S | S | S | N | N | N | N | S | S | S | S | S | N | N | N | N | S |
| 188.50 | S | S | S | N | N | N | N | S | S | S | S | S | N | N | N | N | S |
| 188.75 | S | S | S | N | N | N | N | O | S | S | S | S | N | N | N | N | S |
| 189.00 | S | S | S | N | N | N | N | N | S | S | S | S | N | N | N | N | O |
| 189.25 | S | S | S | N | N | N | N | N | S | S | S | S | N | N | N | N | N |
| 189.50 | S | S | S | N | N | N | N | N | S | S | S | S | N | N | N | N | N |
| 189.75 | S | S | S | O | N | N | N | N | S | S | S | S | N | N | N | N | N |
| 190.00 | S | S | S | S | N | N | N | N | S | S | S | S | O | N | N | N | N |
| 190.25 | S | S | S | S | N | N | N | N | S | S | S | S | S | N | N | N | N |
| 190.50 | S | S | S | S | N | N | N | N | S | S | S | S | S | N | N | N | N |
| 190.75 | S | S | S | S | N | N | N | N | S | S | S | S | S | N | N | N | N |
| 191.00 | S | S | S | S | N | N | N | N | O | S | S | S | S | N | N | N | N |
| 191.25 | S | S | S | S | N | N | N | N | N | S | S | S | S | N | N | N | N |
| 191.50 | S | S | S | S | N | N | N | N | N | S | S | S | S | N | N | N | N |
| 191.75 | S | S | S | S | N | N | N | N | N | S | S | S | S | N | N | N | N |

Page Row 16, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 180.00 | N | N | N | N | S | S | S | S | S | N | N | N | N | S | S | S | S |
| 180.25 | N | N | N | N | O | S | S | S | S | N | N | N | N | S | S | S | S |
| 180.50 | N | N | N | N | N | S | S | S | S | N | N | N | N | O | S | S | S |
| 180.75 | N | N | N | N | N | S | S | S | S | N | N | N | N | N | S | S | S |
| 181.00 | N | N | N | N | N | S | S | S | S | N | N | N | N | N | S | S | S |
| 181.25 | O | N | N | N | N | S | S | S | S | N | N | N | N | N | S | S | S |
| 181.50 | S | N | N | N | N | S | S | S | S | O | N | N | N | N | S | S | S |
| 181.75 | S | N | N | N | N | S | S | S | S | S | N | N | N | N | S | S | S |
| 182.00 | S | N | N | N | N | S | S | S | S | S | N | N | N | N | S | S | S |
| 182.25 | S | N | N | N | N | S | S | S | S | S | N | N | N | N | S | S | S |
| 182.50 | S | N | N | N | N | O | S | S | S | S | N | N | N | N | S | S | S |
| 182.75 | S | N | N | N | N | N | S | S | S | S | N | N | N | N | O | S | S |
| 183.00 | S | N | N | N | N | N | S | S | S | S | N | N | N | N | N | S | S |
| 183.25 | S | N | N | N | N | N | S | S | S | S | N | N | N | N | N | S | S |
| 183.50 | S | O | N | N | N | N | S | S | S | S | N | N | N | N | N | S | S |
| 183.75 | S | S | N | N | N | N | S | S | S | S | O | N | N | N | N | S | S |
| 184.00 | S | S | N | N | N | N | S | S | S | S | S | N | N | N | N | S | S |
| 184.25 | S | S | N | N | N | N | S | S | S | S | S | N | N | N | N | S | S |
| 184.50 | S | S | N | N | N | N | S | S | S | S | S | N | N | N | N | S | S |
| 184.75 | S | S | N | N | N | N | O | S | S | S | S | N | N | N | N | S | S |
| 185.00 | S | S | N | N | N | N | N | S | S | S | S | N | N | N | N | O | S |
| 185.25 | S | S | N | N | N | N | N | S | S | S | S | N | N | N | N | N | S |
| 185.50 | S | S | N | N | N | N | N | S | S | S | S | N | N | N | N | N | S |
| 185.75 | S | S | O | N | N | N | N | S | S | S | S | N | N | N | N | N | S |
| 186.00 | S | S | S | N | N | N | N | S | S | S | S | O | N | N | N | N | S |
| 186.25 | S | S | S | N | N | N | N | S | S | S | S | S | N | N | N | N | S |
| 186.50 | S | S | S | N | N | N | N | S | S | S | S | S | N | N | N | N | S |
| 186.75 | S | S | S | N | N | N | N | S | S | S | S | S | N | N | N | N | S |
| 187.00 | S | S | S | N | N | N | N | O | S | S | S | S | N | N | N | N | S |
| 187.25 | S | S | S | N | N | N | N | N | S | S | S | S | N | N | N | N | O |
| 187.50 | S | S | S | N | N | N | N | N | S | S | S | S | N | N | N | N | N |
| 187.75 | S | S | S | N | N | N | N | N | S | S | S | S | N | N | N | N | N |
| 188.00 | S | S | S | O | N | N | N | N | S | S | S | S | N | N | N | N | N |
| 188.25 | S | S | S | S | N | N | N | N | S | S | S | S | O | N | N | N | N |
| 188.50 | S | S | S | S | N | N | N | N | S | S | S | S | S | N | N | N | N |
| 188.75 | S | S | S | S | N | N | N | N | S | S | S | S | S | N | N | N | N |
| 189.00 | S | S | S | S | N | N | N | N | S | S | S | S | S | N | N | N | N |
| 189.25 | S | S | S | S | N | N | N | N | O | S | S | S | S | N | N | N | N |

-continued

| Coil Excitation | | | | | | | | | | | | | | | | | |
|---|---|---|---|---|---|---|---|---|---|---|---|---|---|---|---|---|---|
| 189.50 | S | S | S | S | N | N | N | N | N | S | S | S | S | N | N | N | N |
| 189.75 | S | S | S | S | N | N | N | N | N | S | S | S | S | N | N | N | N |
| 190.00 | S | S | S | S | N | N | N | N | N | S | S | S | S | N | N | N | N |
| 190.25 | S | S | S | S | O | N | N | N | N | S | S | S | S | N | N | N | N |
| 190.50 | S | S | S | S | S | N | N | N | N | S | S | S | S | O | N | N | N |
| 190.75 | S | S | S | S | S | N | N | N | N | S | S | S | S | S | N | N | N |
| 191.00 | S | S | S | S | S | N | N | N | N | S | S | S | S | S | N | N | N |
| 191.25 | O | S | S | S | S | N | N | N | N | S | S | S | S | S | N | N | N |
| 191.50 | N | S | S | S | S | N | N | N | N | O | S | S | S | S | N | N | N |
| 191.75 | N | S | S | S | S | N | N | N | N | N | S | S | S | S | N | N | N |

Page Row 16, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 180.00 | S | N | N | N | N | S | S | S | S | S | N | N | N | N | S | S | S |
| 180.25 | S | N | N | N | N | S | S | S | S | S | N | N | N | N | S | S | S |
| 180.50 | S | N | N | N | N | S | S | S | S | S | N | N | N | N | S | S | S |
| 180.75 | S | N | N | N | N | O | S | S | S | S | N | N | N | N | S | S | S |
| 181.00 | S | N | N | N | N | N | S | S | S | S | N | N | N | N | O | S | S |
| 181.25 | S | N | N | N | N | N | S | S | S | S | N | N | N | N | N | S | S |
| 181.50 | S | N | N | N | N | N | S | S | S | S | N | N | N | N | N | S | S |
| 181.75 | S | O | N | N | N | N | S | S | S | S | N | N | N | N | N | S | S |
| 182.00 | S | S | N | N | N | N | S | S | S | S | O | N | N | N | N | S | S |
| 182.25 | S | S | N | N | N | N | S | S | S | S | S | N | N | N | N | S | S |
| 182.50 | S | S | N | N | N | N | S | S | S | S | S | N | N | N | N | S | S |
| 182.75 | S | S | N | N | N | N | S | S | S | S | S | N | N | N | N | S | S |
| 183.00 | S | S | N | N | N | N | O | S | S | S | S | N | N | N | N | S | S |
| 183.25 | S | S | N | N | N | N | N | S | S | S | S | N | N | N | N | O | S |
| 183.50 | S | S | N | N | N | N | N | S | S | S | S | N | N | N | N | N | S |
| 183.75 | S | S | N | N | N | N | N | S | S | S | S | N | N | N | N | N | S |
| 184.00 | S | S | O | N | N | N | N | S | S | S | S | N | N | N | N | N | S |
| 184.25 | S | S | S | N | N | N | N | S | S | S | S | O | N | N | N | N | S |
| 184.50 | S | S | S | N | N | N | N | S | S | S | S | S | N | N | N | N | S |
| 184.75 | S | S | S | N | N | N | N | S | S | S | S | S | N | N | N | N | S |
| 185.00 | S | S | S | N | N | N | N | S | S | S | S | S | N | N | N | N | S |
| 185.25 | S | S | S | N | N | N | N | O | S | S | S | S | N | N | N | N | S |
| 185.50 | S | S | S | N | N | N | N | N | S | S | S | S | N | N | N | N | O |
| 185.75 | S | S | S | N | N | N | N | N | S | S | S | S | N | N | N | N | N |
| 186.00 | S | S | S | N | N | N | N | N | S | S | S | S | N | N | N | N | N |
| 186.25 | S | S | S | O | N | N | N | N | S | S | S | S | N | N | N | N | N |
| 186.50 | S | S | S | S | N | N | N | N | S | S | S | S | O | N | N | N | N |
| 186.75 | S | S | S | S | N | N | N | N | S | S | S | S | S | N | N | N | N |
| 187.00 | S | S | S | S | N | N | N | N | S | S | S | S | S | N | N | N | N |
| 187.25 | S | S | S | S | N | N | N | N | S | S | S | S | S | N | N | N | N |
| 187.50 | S | S | S | S | N | N | N | N | O | S | S | S | S | N | N | N | N |
| 187.75 | S | S | S | S | N | N | N | N | N | S | S | S | S | N | N | N | N |
| 188.00 | S | S | S | S | N | N | N | N | N | S | S | S | S | N | N | N | N |
| 188.25 | S | S | S | S | N | N | N | N | N | S | S | S | S | N | N | N | N |
| 188.50 | S | S | S | S | O | N | N | N | N | S | S | S | S | N | N | N | N |
| 188.75 | S | S | S | S | S | N | N | N | N | S | S | S | S | O | N | N | N |
| 189.00 | S | S | S | S | S | N | N | N | N | S | S | S | S | S | N | N | N |
| 189.25 | S | S | S | S | S | N | N | N | N | S | S | S | S | S | N | N | N |
| 189.50 | O | S | S | S | S | N | N | N | N | S | S | S | S | S | N | N | N |
| 189.75 | N | S | S | S | S | N | N | N | N | O | S | S | S | S | N | N | N |
| 190.00 | N | S | S | S | S | N | N | N | N | N | S | S | S | S | N | N | N |
| 190.25 | N | S | S | S | S | N | N | N | N | N | S | S | S | S | N | N | N |
| 190.50 | N | S | S | S | S | N | N | N | N | N | S | S | S | S | N | N | N |
| 190.75 | N | S | S | S | S | O | N | N | N | N | S | S | S | S | N | N | N |
| 191.00 | N | S | S | S | S | S | N | N | N | N | S | S | S | S | O | N | N |
| 191.25 | N | S | S | S | S | S | N | N | N | N | S | S | S | S | S | N | N |
| 191.50 | N | S | S | S | S | S | N | N | N | N | S | S | S | S | S | N | N |
| 191.75 | N | O | S | S | S | S | N | N | N | N | S | S | S | S | S | N | N |

Page Row 16, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 180.00 | S | O | N | N | N | N | S | S | S | S | N | N | N | N | N | S | S |
| 180.25 | S | S | N | N | N | N | S | S | S | S | O | N | N | N | N | S | S |
| 180.50 | S | S | N | N | N | N | S | S | S | S | S | N | N | N | N | S | S |
| 180.75 | S | S | N | N | N | N | S | S | S | S | S | N | N | N | N | S | S |
| 181.00 | S | S | N | N | N | N | S | S | S | S | S | N | N | N | N | S | S |
| 181.25 | S | S | N | N | N | N | O | S | S | S | S | N | N | N | N | S | S |
| 181.50 | S | S | N | N | N | N | N | S | S | S | S | N | N | N | N | O | S |
| 181.75 | S | S | N | N | N | N | N | S | S | S | S | N | N | N | N | N | S |
| 182.00 | S | S | N | N | N | N | N | S | S | S | S | N | N | N | N | N | S |
| 182.25 | S | S | O | N | N | N | N | S | S | S | S | N | N | N | N | N | S |
| 182.50 | S | S | S | N | N | N | N | S | S | S | S | O | N | N | N | N | S |

-continued

Coil Excitation

| | | | | | | | | | | | | | | | | | |
|---|---|---|---|---|---|---|---|---|---|---|---|---|---|---|---|---|---|
| 182.75 | S | S | S | N | N | N | N | S | S | S | S | S | N | N | N | N | S |
| 183.00 | S | S | S | N | N | N | N | S | S | S | S | S | N | N | N | N | S |
| 183.25 | S | S | S | N | N | N | N | S | S | S | S | S | N | N | N | N | S |
| 183.50 | S | S | S | N | N | N | N | O | S | S | S | S | N | N | N | N | S |
| 183.75 | S | S | S | N | N | N | N | N | S | S | S | S | N | N | N | N | O |
| 184.00 | S | S | S | N | N | N | N | N | S | S | S | S | N | N | N | N | N |
| 184.25 | S | S | S | N | N | N | N | N | S | S | S | S | N | N | N | N | N |
| 184.50 | S | S | S | O | N | N | N | N | S | S | S | S | N | N | N | N | N |
| 184.75 | S | S | S | S | N | N | N | N | S | S | S | S | O | N | N | N | N |
| 185.00 | S | S | S | S | N | N | N | N | S | S | S | S | S | N | N | N | N |
| 185.25 | S | S | S | S | N | N | N | N | S | S | S | S | S | N | N | N | N |
| 185.50 | S | S | S | S | N | N | N | N | S | S | S | S | S | N | N | N | N |
| 185.75 | S | S | S | S | N | N | N | N | O | S | S | S | S | N | N | N | N |
| 186.00 | S | S | S | S | N | N | N | N | N | S | S | S | S | N | N | N | N |
| 186.25 | S | S | S | S | N | N | N | N | N | S | S | S | S | N | N | N | N |
| 186.50 | S | S | S | S | N | N | N | N | N | S | S | S | S | N | N | N | N |
| 186.75 | S | S | S | S | O | N | N | N | N | S | S | S | S | N | N | N | N |
| 187.00 | S | S | S | S | S | N | N | N | N | S | S | S | S | O | N | N | N |
| 187.25 | S | S | S | S | S | N | N | N | N | S | S | S | S | S | N | N | N |
| 187.50 | S | S | S | S | S | N | N | N | N | S | S | S | S | S | N | N | N |
| 187.75 | O | S | S | S | S | N | N | N | N | S | S | S | S | S | N | N | N |
| 188.00 | N | S | S | S | S | N | N | N | N | O | S | S | S | S | N | N | N |
| 188.25 | N | S | S | S | S | N | N | N | N | N | S | S | S | S | N | N | N |
| 188.50 | N | S | S | S | S | N | N | N | N | N | S | S | S | S | N | N | N |
| 188.75 | N | S | S | S | S | N | N | N | N | N | S | S | S | S | N | N | N |
| 189.00 | N | S | S | S | S | O | N | N | N | N | S | S | S | S | N | N | N |
| 189.25 | N | S | S | S | S | S | N | N | N | N | S | S | S | S | O | N | N |
| 189.50 | N | S | S | S | S | S | N | N | N | N | S | S | S | S | S | N | N |
| 189.75 | N | S | S | S | S | S | N | N | N | N | S | S | S | S | S | N | N |
| 190.00 | N | O | S | S | S | S | N | N | N | N | S | S | S | S | S | N | N |
| 190.25 | N | N | S | S | S | S | N | N | N | N | O | S | S | S | S | N | N |
| 190.50 | N | N | S | S | S | S | N | N | N | N | N | S | S | S | S | N | N |
| 190.75 | N | N | S | S | S | S | N | N | N | N | N | S | S | S | S | N | N |
| 191.00 | N | N | S | S | S | S | N | N | N | N | N | S | S | S | S | N | N |
| 191.25 | N | N | S | S | S | S | O | N | N | N | N | S | S | S | S | N | N |
| 191.50 | N | N | S | S | S | S | S | N | N | N | N | S | S | S | S | O | N |
| 191.75 | N | N | S | S | S | S | S | N | N | N | N | S | S | S | S | S | N |

Page Row 16, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 180.00 | S | S | N | N | N | N | N | S | S | S | S | N | N | N | N | N | S |
| 180.25 | S | S | N | N | N | N | N | S | S | S | S | N | N | N | N | N | S |
| 180.50 | S | S | O | N | N | N | N | S | S | S | S | N | N | N | N | N | S |
| 180.75 | S | S | S | N | N | N | N | S | S | S | S | O | N | N | N | N | S |
| 181.00 | S | S | S | N | N | N | N | S | S | S | S | S | N | N | N | N | S |
| 181.25 | S | S | S | N | N | N | N | S | S | S | S | S | N | N | N | N | S |
| 181.50 | S | S | S | N | N | N | N | S | S | S | S | S | N | N | N | N | S |
| 181.75 | S | S | S | N | N | N | N | O | S | S | S | S | N | N | N | N | S |
| 182.00 | S | S | S | N | N | N | N | N | S | S | S | S | N | N | N | N | O |
| 182.25 | S | S | S | N | N | N | N | N | S | S | S | S | N | N | N | N | N |
| 182.50 | S | S | S | N | N | N | N | N | S | S | S | S | N | N | N | N | N |
| 182.75 | S | S | S | O | N | N | N | N | S | S | S | S | N | N | N | N | N |
| 183.00 | S | S | S | S | N | N | N | N | S | S | S | S | O | N | N | N | N |
| 183.25 | S | S | S | S | N | N | N | N | S | S | S | S | S | N | N | N | N |
| 183.50 | S | S | S | S | N | N | N | N | S | S | S | S | S | N | N | N | N |
| 183.75 | S | S | S | S | N | N | N | N | S | S | S | S | S | N | N | N | N |
| 184.00 | S | S | S | S | N | N | N | N | O | S | S | S | S | N | N | N | N |
| 184.25 | S | S | S | S | N | N | N | N | N | S | S | S | S | N | N | N | N |
| 184.50 | S | S | S | S | N | N | N | N | N | S | S | S | S | N | N | N | N |
| 184.75 | S | S | S | S | N | N | N | N | N | S | S | S | S | N | N | N | N |
| 185.00 | S | S | S | S | O | N | N | N | N | S | S | S | S | N | N | N | N |
| 185.25 | S | S | S | S | S | N | N | N | N | S | S | S | S | O | N | N | N |
| 185.50 | S | S | S | S | S | N | N | N | N | S | S | S | S | S | N | N | N |
| 185.75 | S | S | S | S | S | N | N | N | N | S | S | S | S | S | N | N | N |
| 186.00 | O | S | S | S | S | N | N | N | N | S | S | S | S | S | N | N | N |
| 186.25 | N | S | S | S | S | N | N | N | N | O | S | S | S | S | N | N | N |
| 186.50 | N | S | S | S | S | N | N | N | N | N | S | S | S | S | N | N | N |
| 186.75 | N | S | S | S | S | N | N | N | N | N | S | S | S | S | N | N | N |
| 187.00 | N | S | S | S | S | N | N | N | N | N | S | S | S | S | N | N | N |
| 187.25 | N | S | S | S | S | O | N | N | N | N | S | S | S | S | N | N | N |
| 187.50 | N | S | S | S | S | S | N | N | N | N | S | S | S | S | O | N | N |
| 187.75 | N | S | S | S | S | S | N | N | N | N | S | S | S | S | S | N | N |
| 188.00 | N | S | S | S | S | S | N | N | N | N | S | S | S | S | S | N | N |
| 188.25 | N | O | S | S | S | S | N | N | N | N | S | S | S | S | S | N | N |
| 188.50 | N | N | S | S | S | S | N | N | N | N | O | S | S | S | S | N | N |
| 188.75 | N | N | S | S | S | S | N | N | N | N | N | S | S | S | S | N | N |

-continued

Coil Excitation

| | | | | | | | | | | | | | | | | | |
|---|---|---|---|---|---|---|---|---|---|---|---|---|---|---|---|---|---|
| 189.00 | N | N | S | S | S | S | N | N | N | N | N | S | S | S | S | N | N |
| 189.25 | N | N | S | S | S | S | N | N | N | N | N | S | S | S | S | N | N |
| 189.50 | N | N | S | S | S | S | O | N | N | N | N | S | S | S | S | N | N |
| 189.75 | N | N | S | S | S | S | S | N | N | N | N | S | S | S | S | O | N |
| 190.00 | N | N | S | S | S | S | S | N | N | N | N | S | S | S | S | S | N |
| 190.25 | N | N | S | S | S | S | S | N | N | N | N | S | S | S | S | S | N |
| 190.50 | N | N | O | S | S | S | S | N | N | N | N | S | S | S | S | S | N |
| 190.75 | N | N | N | S | S | S | S | N | N | N | N | O | S | S | S | S | N |
| 191.00 | N | N | N | S | S | S | S | N | N | N | N | N | S | S | S | S | N |
| 191.25 | N | N | N | S | S | S | S | N | N | N | N | N | S | S | S | S | N |
| 191.50 | N | N | N | S | S | S | S | N | N | N | N | N | S | S | S | S | N |
| 191.75 | N | N | N | S | S | S | S | O | N | N | N | N | S | S | S | S | N |

Page Row 16, Page Column 9

| Coil | 154 | 155 | 156 | 157 | 158 | 159 | 160 |
|---|---|---|---|---|---|---|---|
| 180.00 | S | S | S | N | N | N | N |
| 180.25 | S | S | S | N | N | N | N |
| 180.50 | S | S | S | N | N | N | N |
| 180.75 | S | S | S | N | N | N | N |
| 181.00 | S | S | S | O | N | N | N |
| 181.25 | S | S | S | S | N | N | N |
| 181.50 | S | S | S | S | N | N | N |
| 181.75 | S | S | S | S | N | N | N |
| 182.00 | S | S | S | S | N | N | N |
| 182.25 | S | S | S | S | N | N | N |
| 182.50 | S | S | S | S | N | N | N |
| 182.75 | S | S | S | S | N | N | N |
| 183.00 | S | S | S | S | N | N | N |
| 183.25 | S | S | S | S | O | N | N |
| 183.50 | S | S | S | S | S | N | N |
| 183.75 | S | S | S | S | S | N | N |
| 184.00 | S | S | S | S | S | N | N |
| 184.25 | O | S | S | S | S | N | N |
| 184.50 | N | S | S | S | S | N | N |
| 184.75 | N | S | S | S | S | N | N |
| 185.00 | N | S | S | S | S | N | N |
| 185.25 | N | S | S | S | S | N | N |
| 185.50 | N | S | S | S | S | O | N |
| 185.75 | N | S | S | S | S | S | N |
| 186.00 | N | S | S | S | S | S | N |
| 186.25 | N | S | S | S | S | S | N |
| 186.50 | N | O | S | S | S | S | N |
| 186.75 | N | N | S | S | S | S | N |
| 187.00 | N | N | S | S | S | S | N |
| 187.25 | N | N | S | S | S | S | N |
| 187.50 | N | N | S | S | S | S | N |
| 187.75 | N | N | S | S | S | S | O |
| 188.00 | N | N | S | S | S | S | S |
| 188.25 | N | N | S | S | S | S | S |
| 188.50 | N | N | S | S | S | S | S |
| 188.75 | N | N | O | S | S | S | S |
| 189.00 | N | N | N | S | S | S | S |
| 189.25 | N | N | N | S | S | S | S |
| 189.50 | N | N | N | S | S | S | S |
| 189.75 | N | N | N | S | S | S | S |
| 190.00 | N | N | N | S | S | S | S |
| 190.25 | N | N | N | S | S | S | S |
| 190.50 | N | N | N | S | S | S | S |
| 190.75 | N | N | N | S | S | S | S |
| 191.00 | N | N | N | O | S | S | S |
| 191.25 | N | N | N | N | S | S | S |
| 191.50 | N | N | N | N | S | S | S |
| 191.75 | N | N | N | N | S | S | S |

Page Row 16, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 192.00 | S | N | N | N | N | N | S | S | S | S | N | N | N | N | N | S | S |
| 192.25 | S | O | N | N | N | N | S | S | S | S | N | N | N | N | N | S | S |
| 192.50 | S | S | N | N | N | N | S | S | S | S | O | N | N | N | N | S | S |
| 192.75 | S | S | N | N | N | N | S | S | S | S | S | N | N | N | N | S | S |
| 193.00 | S | S | N | N | N | N | S | S | S | S | S | N | N | N | N | S | S |
| 193.25 | S | S | N | N | N | N | S | S | S | S | S | N | N | N | N | S | S |
| 193.50 | S | S | N | N | N | N | O | S | S | S | S | N | N | N | N | S | S |
| 193.75 | S | S | N | N | N | N | N | S | S | S | S | N | N | N | N | O | S |
| 194.00 | S | S | N | N | N | N | N | S | S | S | S | N | N | N | N | N | S |

-continued

| Coil Excitation | | | | | | | | | | | | | | | | | |
|---|---|---|---|---|---|---|---|---|---|---|---|---|---|---|---|---|---|
| 194.25 | S | S | N | N | N | N | N | S | S | S | S | N | N | N | N | N | S |
| 194.50 | S | S | O | N | N | N | N | S | S | S | S | N | N | N | N | N | S |
| 194.75 | S | S | S | N | N | N | N | S | S | S | S | O | N | N | N | N | S |
| 195.00 | S | S | S | N | N | N | N | S | S | S | S | S | N | N | N | N | S |
| 195.25 | S | S | S | N | N | N | N | S | S | S | S | S | N | N | N | N | S |
| 195.50 | S | S | S | N | N | N | N | S | S | S | S | S | N | N | N | N | S |
| 195.75 | S | S | S | N | N | N | N | O | S | S | S | S | N | N | N | N | S |
| 196.00 | S | S | S | N | N | N | N | N | S | S | S | S | N | N | N | N | O |
| 196.25 | S | S | S | N | N | N | N | N | S | S | S | S | N | N | N | N | N |
| 196.50 | S | S | S | N | N | N | N | N | S | S | S | S | N | N | N | N | N |
| 196.75 | S | S | S | O | N | N | N | N | S | S | S | S | N | N | N | N | N |
| 197.00 | S | S | S | S | N | N | N | N | S | S | S | S | O | N | N | N | N |
| 197.25 | S | S | S | S | N | N | N | N | S | S | S | S | S | N | N | N | N |
| 197.50 | S | S | S | S | N | N | N | N | S | S | S | S | S | N | N | N | N |
| 197.75 | S | S | S | S | N | N | N | N | S | S | S | S | S | N | N | N | N |
| 198.00 | S | S | S | S | N | N | N | N | O | S | S | S | S | N | N | N | N |
| 198.25 | S | S | S | S | N | N | N | N | N | S | S | S | S | N | N | N | N |
| 198.50 | S | S | S | S | N | N | N | N | N | S | S | S | S | N | N | N | N |
| 198.75 | S | S | S | S | N | N | N | N | N | S | S | S | S | N | N | N | N |
| 199.00 | S | S | S | S | O | N | N | N | N | S | S | S | S | N | N | N | N |
| 199.25 | S | S | S | S | S | N | N | N | N | S | S | S | S | O | N | N | N |
| 199.50 | S | S | S | S | S | N | N | N | N | S | S | S | S | S | N | N | N |
| 199.75 | S | S | S | S | S | N | N | N | N | S | S | S | S | S | N | N | N |
| 200.00 | O | S | S | S | S | N | N | N | N | S | S | S | S | S | N | N | N |
| 200.25 | N | S | S | S | S | N | N | N | N | O | S | S | S | S | N | N | N |
| 200.50 | N | S | S | S | S | N | N | N | N | N | S | S | S | S | N | N | N |
| 200.75 | N | S | S | S | S | N | N | N | N | N | S | S | S | S | N | N | N |
| 201.00 | N | S | S | S | S | N | N | N | N | N | S | S | S | S | N | N | N |
| 201.25 | N | S | S | S | S | O | N | N | N | N | S | S | S | S | N | N | N |
| 201.50 | N | S | S | S | S | S | N | N | N | N | S | S | S | S | O | N | N |
| 201.75 | N | S | S | S | S | S | N | N | N | N | S | S | S | S | S | N | N |
| 202.00 | N | S | S | S | S | S | N | N | N | N | S | S | S | S | S | N | N |
| 202.25 | N | O | S | S | S | S | N | N | N | N | S | S | S | S | S | N | N |
| 202.50 | N | N | S | S | S | S | N | N | N | N | O | S | S | S | S | N | N |
| 202.75 | N | N | S | S | S | S | N | N | N | N | N | S | S | S | S | N | N |
| 203.00 | N | N | S | S | S | S | N | N | N | N | N | S | S | S | S | N | N |
| 203.25 | N | N | S | S | S | S | N | N | N | N | N | S | S | S | S | N | N |
| 203.50 | N | N | S | S | S | S | O | N | N | N | N | S | S | S | S | N | N |
| 203.75 | N | N | S | S | S | S | S | N | N | N | N | S | S | S | S | O | N |

Page Row 17, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 192.00 | S | S | N | N | N | N | N | S | S | S | S | N | N | N | N | O | S |
| 192.25 | S | S | N | N | N | N | N | S | S | S | S | N | N | N | N | N | S |
| 192.50 | S | S | N | N | N | N | N | S | S | S | S | N | N | N | N | N | S |
| 192.75 | S | S | O | N | N | N | N | S | S | S | S | N | N | N | N | N | S |
| 193.00 | S | S | S | N | N | N | N | S | S | S | S | O | N | N | N | N | S |
| 193.25 | S | S | S | N | N | N | N | S | S | S | S | S | N | N | N | N | S |
| 193.50 | S | S | S | N | N | N | N | S | S | S | S | S | N | N | N | N | S |
| 193.75 | S | S | S | N | N | N | N | S | S | S | S | S | N | N | N | N | S |
| 194.00 | S | S | S | N | N | N | N | O | S | S | S | S | N | N | N | N | S |
| 194.25 | S | S | S | N | N | N | N | N | S | S | S | S | N | N | N | N | O |
| 194.50 | S | S | S | N | N | N | N | N | S | S | S | S | N | N | N | N | N |
| 194.75 | S | S | S | N | N | N | N | N | S | S | S | S | N | N | N | N | N |
| 195.00 | S | S | S | O | N | N | N | N | S | S | S | S | N | N | N | N | N |
| 195.25 | S | S | S | S | N | N | N | N | S | S | S | S | O | N | N | N | N |
| 195.50 | S | S | S | S | N | N | N | N | S | S | S | S | S | N | N | N | N |
| 195.75 | S | S | S | S | N | N | N | N | S | S | S | S | S | N | N | N | N |
| 196.00 | S | S | S | S | N | N | N | N | S | S | S | S | S | N | N | N | N |
| 196.25 | S | S | S | S | N | N | N | N | O | S | S | S | S | N | N | N | N |
| 196.50 | S | S | S | S | N | N | N | N | N | S | S | S | S | N | N | N | N |
| 196.75 | S | S | S | S | N | N | N | N | N | S | S | S | S | N | N | N | N |
| 197.00 | S | S | S | S | N | N | N | N | N | S | S | S | S | N | N | N | N |
| 197.25 | S | S | S | S | O | N | N | N | N | S | S | S | S | N | N | N | N |
| 197.50 | S | S | S | S | S | N | N | N | N | S | S | S | S | O | N | N | N |
| 197.75 | S | S | S | S | S | N | N | N | N | S | S | S | S | S | N | N | N |
| 198.00 | S | S | S | S | S | N | N | N | N | S | S | S | S | S | N | N | N |
| 198.25 | O | S | S | S | S | N | N | N | N | S | S | S | S | S | N | N | N |
| 198.50 | N | S | S | S | S | N | N | N | N | O | S | S | S | S | N | N | N |
| 198.75 | N | S | S | S | S | N | N | N | N | N | S | S | S | S | N | N | N |
| 199.00 | N | S | S | S | S | N | N | N | N | N | S | S | S | S | N | N | N |
| 199.25 | N | S | S | S | S | N | N | N | N | N | S | S | S | S | N | N | N |
| 199.50 | N | S | S | S | S | O | N | N | N | N | S | S | S | S | N | N | N |
| 199.75 | N | S | S | S | S | S | N | N | N | N | S | S | S | S | O | N | N |
| 200.00 | N | S | S | S | S | S | N | N | N | N | S | S | S | S | S | N | N |
| 200.25 | N | S | S | S | S | S | N | N | N | N | S | S | S | S | S | N | N |

-continued

| Coil Excitation | | | | | | | | | | | | | | | | | |
|---|---|---|---|---|---|---|---|---|---|---|---|---|---|---|---|---|---|
| 200.50 | N | O | S | S | S | S | N | N | N | N | S | S | S | S | S | N | N |
| 200.75 | N | N | S | S | S | S | N | N | N | N | O | S | S | S | S | N | N |
| 201.00 | N | N | S | S | S | S | N | N | N | N | N | S | S | S | S | N | N |
| 201.25 | N | N | S | S | S | S | N | N | N | N | N | S | S | S | S | N | N |
| 201.50 | N | N | S | S | S | S | N | N | N | N | N | S | S | S | S | N | N |
| 201.75 | N | N | S | S | S | S | O | N | N | N | N | S | S | S | S | N | N |
| 202.00 | N | N | S | S | S | S | S | N | N | N | N | S | S | S | S | O | N |
| 202.25 | N | N | S | S | S | S | S | N | N | N | N | S | S | S | S | S | N |
| 202.50 | N | N | S | S | S | S | S | N | N | N | N | S | S | S | S | S | N |
| 202.75 | N | N | O | S | S | S | S | N | N | N | N | S | S | S | S | S | N |
| 203.00 | N | N | N | S | S | S | S | N | N | N | N | O | S | S | S | S | N |
| 203.25 | N | N | N | S | S | S | S | N | N | N | N | N | S | S | S | S | N |
| 203.50 | N | N | N | S | S | S | S | N | N | N | N | N | S | S | S | S | N |
| 203.75 | N | N | N | S | S | S | S | N | N | N | N | N | S | S | S | S | N |

Page Row 17, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 192.00 | S | S | S | N | N | N | N | S | S | S | S | S | N | N | N | N | S |
| 192.25 | S | S | S | N | N | N | N | O | S | S | S | S | N | N | N | N | S |
| 192.50 | S | S | S | N | N | N | N | N | S | S | S | S | N | N | N | N | O |
| 192.75 | S | S | S | N | N | N | N | N | S | S | S | S | N | N | N | N | N |
| 193.00 | S | S | S | N | N | N | N | N | S | S | S | S | N | N | N | N | N |
| 193.25 | S | S | S | O | N | N | N | N | S | S | S | S | N | N | N | N | N |
| 193.50 | S | S | S | S | N | N | N | N | S | S | S | S | O | N | N | N | N |
| 193.75 | S | S | S | S | N | N | N | N | S | S | S | S | S | N | N | N | N |
| 194.00 | S | S | S | S | N | N | N | N | S | S | S | S | S | N | N | N | N |
| 194.25 | S | S | S | S | N | N | N | N | S | S | S | S | S | N | N | N | N |
| 194.50 | S | S | S | S | N | N | N | N | O | S | S | S | S | N | N | N | N |
| 194.75 | S | S | S | S | N | N | N | N | N | S | S | S | S | N | N | N | N |
| 195.00 | S | S | S | S | N | N | N | N | N | S | S | S | S | N | N | N | N |
| 195.25 | S | S | S | S | N | N | N | N | N | S | S | S | S | N | N | N | N |
| 195.50 | S | S | S | S | O | N | N | N | N | S | S | S | S | N | N | N | N |
| 195.75 | S | S | S | S | S | N | N | N | N | S | S | S | S | O | N | N | N |
| 196.00 | S | S | S | S | S | N | N | N | N | S | S | S | S | S | N | N | N |
| 196.25 | S | S | S | S | S | N | N | N | N | S | S | S | S | S | N | N | N |
| 196.50 | O | S | S | S | S | N | N | N | N | S | S | S | S | S | N | N | N |
| 196.75 | N | S | S | S | S | N | N | N | N | O | S | S | S | S | N | N | N |
| 197.00 | N | S | S | S | S | N | N | N | N | N | S | S | S | S | N | N | N |
| 197.25 | N | S | S | S | S | N | N | N | N | N | S | S | S | S | N | N | N |
| 197.50 | N | S | S | S | S | N | N | N | N | N | S | S | S | S | N | N | N |
| 197.75 | N | S | S | S | S | O | N | N | N | N | S | S | S | S | N | N | N |
| 198.00 | N | S | S | S | S | S | N | N | N | N | S | S | S | S | O | N | N |
| 198.25 | N | S | S | S | S | S | N | N | N | N | S | S | S | S | S | N | N |
| 198.50 | N | S | S | S | S | S | N | N | N | N | S | S | S | S | S | N | N |
| 198.75 | N | O | S | S | S | S | N | N | N | N | S | S | S | S | S | N | N |
| 199.00 | N | N | S | S | S | S | N | N | N | N | O | S | S | S | S | N | N |
| 199.25 | N | N | S | S | S | S | N | N | N | N | N | S | S | S | S | N | N |
| 199.50 | N | N | S | S | S | S | N | N | N | N | N | S | S | S | S | N | N |
| 199.75 | N | N | S | S | S | S | N | N | N | N | N | S | S | S | S | N | N |
| 200.00 | N | N | S | S | S | S | O | N | N | N | N | S | S | S | S | N | N |
| 200.25 | N | N | S | S | S | S | S | N | N | N | N | S | S | S | S | O | N |
| 200.50 | N | N | S | S | S | S | S | N | N | N | N | S | S | S | S | S | N |
| 200.75 | N | N | S | S | S | S | S | N | N | N | N | S | S | S | S | S | N |
| 201.00 | N | N | O | S | S | S | S | N | N | N | N | S | S | S | S | S | N |
| 201.25 | N | N | N | S | S | S | S | N | N | N | N | O | S | S | S | S | N |
| 201.50 | N | N | N | S | S | S | S | N | N | N | N | N | S | S | S | S | N |
| 201.75 | N | N | N | S | S | S | S | N | N | N | N | N | S | S | S | S | N |
| 202.00 | N | N | N | S | S | S | S | N | N | N | N | N | S | S | S | S | N |
| 202.25 | N | N | N | S | S | S | S | O | N | N | N | N | S | S | S | S | N |
| 202.50 | N | N | N | S | S | S | S | S | N | N | N | N | S | S | S | S | O |
| 202.75 | N | N | N | S | S | S | S | S | N | N | N | N | S | S | S | S | S |
| 203.00 | N | N | N | S | S | S | S | S | N | N | N | N | S | S | S | S | S |
| 203.25 | N | N | N | O | S | S | S | S | N | N | N | N | S | S | S | S | S |
| 203.50 | N | N | N | N | S | S | S | S | N | N | N | N | O | S | S | S | S |
| 203.75 | N | N | N | N | S | S | S | S | N | N | N | N | N | S | S | S | S |

Page Row 17, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 192.00 | S | S | S | S | N | N | N | N | S | S | S | S | S | N | N | N | N |
| 192.25 | S | S | S | S | N | N | N | N | S | S | S | S | S | N | N | N | N |
| 192.50 | S | S | S | S | N | N | N | N | S | S | S | S | S | N | N | N | N |
| 192.75 | S | S | S | S | N | N | N | N | O | S | S | S | S | N | N | N | N |
| 193.00 | S | S | S | S | N | N | N | N | N | S | S | S | S | N | N | N | N |
| 193.25 | S | S | S | S | N | N | N | N | N | S | S | S | S | N | N | N | N |
| 193.50 | S | S | S | S | N | N | N | N | N | S | S | S | S | N | N | N | N |

-continued

| Coil Excitation | | | | | | | | | | | | | | | | | |
|---|---|---|---|---|---|---|---|---|---|---|---|---|---|---|---|---|---|
| 193.75 | S | S | S | S | O | N | N | N | N | S | S | S | S | N | N | N | N |
| 194.00 | S | S | S | S | S | N | N | N | N | S | S | S | S | O | N | N | N |
| 194.25 | S | S | S | S | S | N | N | N | N | S | S | S | S | S | N | N | N |
| 194.50 | S | S | S | S | S | N | N | N | N | S | S | S | S | S | N | N | N |
| 194.75 | O | S | S | S | S | N | N | N | N | S | S | S | S | S | N | N | N |
| 195.00 | N | S | S | S | S | N | N | N | N | O | S | S | S | S | N | N | N |
| 195.25 | N | S | S | S | S | N | N | N | N | N | S | S | S | S | N | N | N |
| 195.50 | N | S | S | S | S | N | N | N | N | N | S | S | S | S | N | N | N |
| 195.75 | N | S | S | S | S | N | N | N | N | N | S | S | S | S | N | N | N |
| 196.00 | N | S | S | S | S | O | N | N | N | N | S | S | S | S | N | N | N |
| 196.25 | N | S | S | S | S | S | N | N | N | N | S | S | S | S | O | N | N |
| 196.50 | N | S | S | S | S | S | N | N | N | N | S | S | S | S | S | N | N |
| 196.75 | N | S | S | S | S | S | N | N | N | N | S | S | S | S | S | N | N |
| 197.00 | N | O | S | S | S | S | N | N | N | N | S | S | S | S | S | N | N |
| 197.25 | N | N | S | S | S | S | N | N | N | N | O | S | S | S | S | N | N |
| 197.50 | N | N | S | S | S | S | N | N | N | N | N | S | S | S | S | N | N |
| 197.75 | N | N | S | S | S | S | N | N | N | N | N | S | S | S | S | N | N |
| 198.00 | N | N | S | S | S | S | N | N | N | N | N | S | S | S | S | N | N |
| 198.25 | N | N | S | S | S | S | O | N | N | N | N | S | S | S | S | N | N |
| 198.50 | N | N | S | S | S | S | S | N | N | N | N | S | S | S | S | O | N |
| 198.75 | N | N | S | S | S | S | S | N | N | N | N | S | S | S | S | S | N |
| 199.00 | N | N | S | S | S | S | S | N | N | N | N | S | S | S | S | S | N |
| 199.25 | N | N | O | S | S | S | S | N | N | N | N | S | S | S | S | S | N |
| 199.50 | N | N | N | S | S | S | S | N | N | N | N | O | S | S | S | S | N |
| 199.75 | N | N | N | S | S | S | S | N | N | N | N | N | S | S | S | S | N |
| 200.00 | N | N | N | S | S | S | S | N | N | N | N | N | S | S | S | S | N |
| 200.25 | N | N | N | S | S | S | S | N | N | N | N | N | S | S | S | S | N |
| 200.50 | N | N | N | S | S | S | S | O | N | N | N | N | S | S | S | S | N |
| 200.75 | N | N | N | S | S | S | S | S | N | N | N | N | S | S | S | S | O |
| 201.00 | N | N | N | S | S | S | S | S | N | N | N | N | S | S | S | S | S |
| 201.25 | N | N | N | S | S | S | S | S | N | N | N | N | S | S | S | S | S |
| 201.50 | N | N | N | O | S | S | S | S | N | N | N | N | S | S | S | S | S |
| 201.75 | N | N | N | N | S | S | S | S | N | N | N | N | O | S | S | S | S |
| 202.00 | N | N | N | N | S | S | S | S | N | N | N | N | N | S | S | S | S |
| 202.25 | N | N | N | N | S | S | S | S | N | N | N | N | N | S | S | S | S |
| 202.50 | N | N | N | N | S | S | S | S | N | N | N | N | N | S | S | S | S |
| 202.75 | N | N | N | N | S | S | S | S | O | N | N | N | N | S | S | S | S |
| 203.00 | N | N | N | N | S | S | S | S | S | N | N | N | N | S | S | S | S |
| 203.25 | N | N | N | N | S | S | S | S | S | N | N | N | N | S | S | S | S |
| 203.50 | N | N | N | N | S | S | S | S | S | N | N | N | N | S | S | S | S |
| 203.75 | N | N | N | N | O | S | S | S | S | N | N | N | N | S | S | S | S |

Page Row 17, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 192.00 | S | S | S | S | O | N | N | N | N | S | S | S | S | N | N | N | N |
| 192.25 | S | S | S | S | S | N | N | N | N | S | S | S | S | O | N | N | N |
| 192.50 | S | S | S | S | S | N | N | N | N | S | S | S | S | S | N | N | N |
| 192.75 | S | S | S | S | S | N | N | N | N | S | S | S | S | S | N | N | N |
| 193.00 | O | S | S | S | S | N | N | N | N | S | S | S | S | S | N | N | N |
| 193.25 | N | S | S | S | S | N | N | N | N | O | S | S | S | S | N | N | N |
| 193.50 | N | S | S | S | S | N | N | N | N | N | S | S | S | S | N | N | N |
| 193.75 | N | S | S | S | S | N | N | N | N | N | S | S | S | S | N | N | N |
| 194.00 | N | S | S | S | S | N | N | N | N | N | S | S | S | S | N | N | N |
| 194.25 | N | S | S | S | S | O | N | N | N | N | S | S | S | S | N | N | N |
| 194.50 | N | S | S | S | S | S | N | N | N | N | S | S | S | S | O | N | N |
| 194.75 | N | S | S | S | S | S | N | N | N | N | S | S | S | S | S | N | N |
| 195.00 | N | S | S | S | S | S | N | N | N | N | S | S | S | S | S | N | N |
| 195.25 | N | O | S | S | S | S | N | N | N | N | S | S | S | S | S | N | N |
| 195.50 | N | N | S | S | S | S | N | N | N | N | O | S | S | S | S | N | N |
| 195.75 | N | N | S | S | S | S | N | N | N | N | N | S | S | S | S | N | N |
| 196.00 | N | N | S | S | S | S | N | N | N | N | N | S | S | S | S | N | N |
| 196.25 | N | N | S | S | S | S | N | N | N | N | N | S | S | S | S | N | N |
| 196.50 | N | N | S | S | S | S | O | N | N | N | N | S | S | S | S | N | N |
| 196.75 | N | N | S | S | S | S | S | N | N | N | N | S | S | S | S | O | N |
| 197.00 | N | N | S | S | S | S | S | N | N | N | N | S | S | S | S | S | N |
| 197.25 | N | N | S | S | S | S | S | N | N | N | N | S | S | S | S | S | N |
| 197.50 | N | N | O | S | S | S | S | N | N | N | N | S | S | S | S | S | N |
| 197.75 | N | N | N | S | S | S | S | N | N | N | N | O | S | S | S | S | N |
| 198.00 | N | N | N | S | S | S | S | N | N | N | N | N | S | S | S | S | N |
| 198.25 | N | N | N | S | S | S | S | N | N | N | N | N | S | S | S | S | N |
| 198.50 | N | N | N | S | S | S | S | N | N | N | N | N | S | S | S | S | N |
| 198.75 | N | N | N | S | S | S | S | O | N | N | N | N | S | S | S | S | N |
| 199.00 | N | N | N | S | S | S | S | S | N | N | N | N | S | S | S | S | O |
| 199.25 | N | N | N | S | S | S | S | S | N | N | N | N | S | S | S | S | S |
| 199.50 | N | N | N | S | S | S | S | S | N | N | N | N | S | S | S | S | S |
| 199.75 | N | N | N | O | S | S | S | S | N | N | N | N | S | S | S | S | S |

-continued

| Coil Excitation | | | | | | | | | | | | | | | | |
|---|---|---|---|---|---|---|---|---|---|---|---|---|---|---|---|---|
| 200.00 | N | N | N | N | S | S | S | S | N | N | N | N | O | S | S | S | S |
| 200.25 | N | N | N | N | S | S | S | S | N | N | N | N | N | S | S | S | S |
| 200.50 | N | N | N | N | S | S | S | S | N | N | N | N | N | S | S | S | S |
| 200.75 | N | N | N | N | S | S | S | S | N | N | N | N | N | S | S | S | S |
| 201.00 | N | N | N | N | S | S | S | S | O | N | N | N | N | S | S | S | S |
| 201.25 | N | N | N | N | S | S | S | S | S | N | N | N | N | S | S | S | S |
| 201.50 | N | N | N | N | S | S | S | S | S | N | N | N | N | S | S | S | S |
| 201.75 | N | N | N | N | S | S | S | S | S | N | N | N | N | S | S | S | S |
| 202.00 | N | N | N | N | O | S | S | S | S | N | N | N | N | S | S | S | S |
| 202.25 | N | N | N | N | N | S | S | S | S | N | N | N | N | O | S | S | S |
| 202.50 | N | N | N | N | N | S | S | S | S | N | N | N | N | N | S | S | S |
| 202.75 | N | N | N | N | N | S | S | S | S | N | N | N | N | N | S | S | S |
| 203.00 | O | N | N | N | N | S | S | S | S | N | N | N | N | N | S | S | S |
| 203.25 | S | N | N | N | N | S | S | S | S | O | N | N | N | N | S | S | S |
| 203.50 | S | N | N | N | N | S | S | S | S | S | N | N | N | N | S | S | S |
| 203.75 | S | N | N | N | N | S | S | S | S | S | N | N | N | N | S | S | S |

Page Row 17, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 192.00 | N | S | S | S | S | N | N | N | N | N | S | S | S | S | N | N | N |
| 192.25 | N | S | S | S | S | N | N | N | N | N | S | S | S | S | N | N | N |
| 192.50 | N | S | S | S | S | O | N | N | N | N | S | S | S | S | N | N | N |
| 192.75 | N | S | S | S | S | S | N | N | N | N | S | S | S | S | O | N | N |
| 193.00 | N | S | S | S | S | S | N | N | N | N | S | S | S | S | S | N | N |
| 193.25 | N | S | S | S | S | S | N | N | N | N | S | S | S | S | S | N | N |
| 193.50 | N | O | S | S | S | S | N | N | N | N | S | S | S | S | S | N | N |
| 193.75 | N | N | S | S | S | S | N | N | N | N | O | S | S | S | S | N | N |
| 194.00 | N | N | S | S | S | S | N | N | N | N | N | S | S | S | S | N | N |
| 194.25 | N | N | S | S | S | S | N | N | N | N | N | S | S | S | S | N | N |
| 194.50 | N | N | S | S | S | S | N | N | N | N | N | S | S | S | S | N | N |
| 194.75 | N | N | S | S | S | S | O | N | N | N | N | S | S | S | S | N | N |
| 195.00 | N | N | S | S | S | S | S | N | N | N | N | S | S | S | S | O | N |
| 195.25 | N | N | S | S | S | S | S | N | N | N | N | S | S | S | S | S | N |
| 195.50 | N | N | S | S | S | S | S | N | N | N | N | S | S | S | S | S | N |
| 195.75 | N | N | O | S | S | S | S | N | N | N | N | S | S | S | S | S | N |
| 196.00 | N | N | N | S | S | S | S | N | N | N | N | O | S | S | S | S | N |
| 196.25 | N | N | N | S | S | S | S | N | N | N | N | N | S | S | S | S | N |
| 196.50 | N | N | N | S | S | S | S | N | N | N | N | N | S | S | S | S | N |
| 196.75 | N | N | N | S | S | S | S | N | N | N | N | N | S | S | S | S | N |
| 197.00 | N | N | N | S | S | S | S | O | N | N | N | N | S | S | S | S | N |
| 197.25 | N | N | N | S | S | S | S | S | N | N | N | N | S | S | S | S | O |
| 197.50 | N | N | N | S | S | S | S | S | N | N | N | N | S | S | S | S | S |
| 197.75 | N | N | N | S | S | S | S | S | N | N | N | N | S | S | S | S | S |
| 198.00 | N | N | N | O | S | S | S | S | N | N | N | N | S | S | S | S | S |
| 198.25 | N | N | N | N | S | S | S | S | N | N | N | N | O | S | S | S | S |
| 198.50 | N | N | N | N | S | S | S | S | N | N | N | N | N | S | S | S | S |
| 198.75 | N | N | N | N | S | S | S | S | N | N | N | N | N | S | S | S | S |
| 199.00 | N | N | N | N | S | S | S | S | N | N | N | N | N | S | S | S | S |
| 199.25 | N | N | N | N | S | S | S | S | O | N | N | N | N | S | S | S | S |
| 199.50 | N | N | N | N | S | S | S | S | S | N | N | N | N | S | S | S | S |
| 199.75 | N | N | N | N | S | S | S | S | S | N | N | N | N | S | S | S | S |
| 200.00 | N | N | N | N | S | S | S | S | S | N | N | N | N | S | S | S | S |
| 200.25 | N | N | N | N | O | S | S | S | S | N | N | N | N | S | S | S | S |
| 200.50 | N | N | N | N | N | S | S | S | S | N | N | N | N | O | S | S | S |
| 200.75 | N | N | N | N | N | S | S | S | S | N | N | N | N | N | S | S | S |
| 201.00 | N | N | N | N | N | S | S | S | S | N | N | N | N | N | S | S | S |
| 201.25 | O | N | N | N | N | S | S | S | S | N | N | N | N | N | S | S | S |
| 201.50 | S | N | N | N | N | S | S | S | S | O | N | N | N | N | S | S | S |
| 201.75 | S | N | N | N | N | S | S | S | S | S | N | N | N | N | S | S | S |
| 202.00 | S | N | N | N | N | S | S | S | S | S | N | N | N | N | S | S | S |
| 202.25 | S | N | N | N | N | S | S | S | S | S | N | N | N | N | S | S | S |
| 202.50 | S | N | N | N | N | O | S | S | S | S | N | N | N | N | S | S | S |
| 202.75 | S | N | N | N | N | N | S | S | S | S | N | N | N | N | O | S | S |
| 203.00 | S | N | N | N | N | N | S | S | S | S | N | N | N | N | N | S | S |
| 203.25 | S | N | N | N | N | N | S | S | S | S | N | N | N | N | N | S | S |
| 203.50 | S | O | N | N | N | N | S | S | S | S | N | N | N | N | N | S | S |
| 203.75 | S | S | N | N | N | N | S | S | S | S | O | N | N | N | N | S | S |

Page Row 17, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 192.00 | N | N | S | S | S | S | N | N | N | N | O | S | S | S | S | N | N |
| 192.25 | N | N | S | S | S | S | N | N | N | N | N | S | S | S | S | N | N |
| 192.50 | N | N | S | S | S | S | N | N | N | N | N | S | S | S | S | N | N |
| 192.75 | N | N | S | S | S | S | N | N | N | N | N | S | S | S | S | N | N |
| 193.00 | N | N | S | S | S | S | O | N | N | N | N | S | S | S | S | N | N |

-continued

| Coil Excitation | | | | | | | | | | | | | | | | | |
|---|---|---|---|---|---|---|---|---|---|---|---|---|---|---|---|---|---|
| 193.25 | N | N | S | S | S | S | S | N | N | N | N | S | S | S | S | O | N |
| 193.50 | N | N | S | S | S | S | S | N | N | N | N | S | S | S | S | S | N |
| 193.75 | N | N | S | S | S | S | S | N | N | N | N | S | S | S | S | S | N |
| 194.00 | N | N | O | S | S | S | S | N | N | N | N | S | S | S | S | S | N |
| 194.25 | N | N | N | S | S | S | S | N | N | N | N | O | S | S | S | S | N |
| 194.50 | N | N | N | S | S | S | S | N | N | N | N | N | S | S | S | S | N |
| 194.75 | N | N | N | S | S | S | S | N | N | N | N | N | S | S | S | S | N |
| 195.00 | N | N | N | S | S | S | S | N | N | N | N | N | S | S | S | S | N |
| 195.25 | N | N | N | S | S | S | S | O | N | N | N | N | S | S | S | S | N |
| 195.50 | N | N | N | S | S | S | S | S | N | N | N | N | S | S | S | S | O |
| 195.75 | N | N | N | S | S | S | S | S | N | N | N | N | S | S | S | S | S |
| 196.00 | N | N | N | S | S | S | S | S | N | N | N | N | S | S | S | S | S |
| 196.25 | N | N | N | O | S | S | S | S | N | N | N | N | S | S | S | S | S |
| 196.50 | N | N | N | N | S | S | S | S | N | N | N | N | O | S | S | S | S |
| 196.75 | N | N | N | N | S | S | S | S | N | N | N | N | N | S | S | S | S |
| 197.00 | N | N | N | N | S | S | S | S | N | N | N | N | N | S | S | S | S |
| 197.25 | N | N | N | N | S | S | S | S | N | N | N | N | N | S | S | S | S |
| 197.50 | N | N | N | N | S | S | S | S | O | N | N | N | N | S | S | S | S |
| 197.75 | N | N | N | N | S | S | S | S | S | N | N | N | N | S | S | S | S |
| 198.00 | N | N | N | N | S | S | S | S | S | N | N | N | N | S | S | S | S |
| 198.25 | N | N | N | N | S | S | S | S | S | N | N | N | N | S | S | S | S |
| 198.50 | N | N | N | N | O | S | S | S | S | N | N | N | N | S | S | S | S |
| 198.75 | N | N | N | N | N | S | S | S | S | N | N | N | N | O | S | S | S |
| 199.00 | N | N | N | N | N | S | S | S | S | N | N | N | N | N | S | S | S |
| 199.25 | N | N | N | N | N | S | S | S | S | N | N | N | N | N | S | S | S |
| 199.50 | O | N | N | N | N | S | S | S | S | N | N | N | N | N | S | S | S |
| 199.75 | S | N | N | N | N | S | S | S | S | O | N | N | N | N | S | S | S |
| 200.00 | S | N | N | N | N | S | S | S | S | S | N | N | N | N | S | S | S |
| 200.25 | S | N | N | N | N | S | S | S | S | S | N | N | N | N | S | S | S |
| 200.50 | S | N | N | N | N | S | S | S | S | S | N | N | N | N | S | S | S |
| 200.75 | S | N | N | N | N | O | S | S | S | S | N | N | N | N | S | S | S |
| 201.00 | S | N | N | N | N | N | S | S | S | S | N | N | N | N | O | S | S |
| 201.25 | S | N | N | N | N | N | S | S | S | S | N | N | N | N | N | S | S |
| 201.50 | S | N | N | N | N | N | S | S | S | S | N | N | N | N | N | S | S |
| 201.75 | S | O | N | N | N | N | S | S | S | S | N | N | N | N | N | S | S |
| 202.00 | S | S | N | N | N | N | S | S | S | S | O | N | N | N | N | S | S |
| 202.25 | S | S | N | N | N | N | S | S | S | S | S | N | N | N | N | S | S |
| 202.50 | S | S | N | N | N | N | S | S | S | S | S | N | N | N | N | S | S |
| 202.75 | S | S | N | N | N | N | S | S | S | S | S | N | N | N | N | S | S |
| 203.00 | S | S | N | N | N | N | O | S | S | S | S | N | N | N | N | S | S |
| 203.25 | S | S | N | N | N | N | N | S | S | S | S | N | N | N | N | O | S |
| 203.50 | S | S | N | N | N | N | N | S | S | S | S | N | N | N | N | N | S |
| 203.75 | S | S | N | N | N | N | N | S | S | S | S | N | N | N | N | N | S |

Page Row 17, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 192.00 | N | N | S | S | S | S | S | N | N | N | N | S | S | S | S | S | N |
| 192.25 | N | N | O | S | S | S | S | N | N | N | N | S | S | S | S | S | N |
| 192.50 | N | N | N | S | S | S | S | N | N | N | N | O | S | S | S | S | N |
| 192.75 | N | N | N | S | S | S | S | N | N | N | N | N | S | S | S | S | N |
| 193.00 | N | N | N | S | S | S | S | N | N | N | N | N | S | S | S | S | N |
| 193.25 | N | N | N | S | S | S | S | N | N | N | N | N | S | S | S | S | N |
| 193.50 | N | N | N | S | S | S | S | O | N | N | N | N | S | S | S | S | N |
| 193.75 | N | N | N | S | S | S | S | S | N | N | N | N | S | S | S | S | O |
| 194.00 | N | N | N | S | S | S | S | S | N | N | N | N | S | S | S | S | S |
| 194.25 | N | N | N | S | S | S | S | S | N | N | N | N | S | S | S | S | S |
| 194.50 | N | N | N | O | S | S | S | S | N | N | N | N | S | S | S | S | S |
| 194.75 | N | N | N | N | S | S | S | S | N | N | N | N | O | S | S | S | S |
| 195.00 | N | N | N | N | S | S | S | S | N | N | N | N | N | S | S | S | S |
| 195.25 | N | N | N | N | S | S | S | S | N | N | N | N | N | S | S | S | S |
| 195.50 | N | N | N | N | S | S | S | S | N | N | N | N | N | S | S | S | S |
| 195.75 | N | N | N | N | S | S | S | S | O | N | N | N | N | S | S | S | S |
| 196.00 | N | N | N | N | S | S | S | S | S | N | N | N | N | S | S | S | S |
| 196.25 | N | N | N | N | S | S | S | S | S | N | N | N | N | S | S | S | S |
| 196.50 | N | N | N | N | S | S | S | S | S | N | N | N | N | S | S | S | S |
| 196.75 | N | N | N | N | O | S | S | S | S | N | N | N | N | S | S | S | S |
| 197.00 | N | N | N | N | N | S | S | S | S | N | N | N | N | O | S | S | S |
| 197.25 | N | N | N | N | N | S | S | S | S | N | N | N | N | N | S | S | S |
| 197.50 | N | N | N | N | N | S | S | S | S | N | N | N | N | N | S | S | S |
| 197.75 | O | N | N | N | N | S | S | S | S | N | N | N | N | N | S | S | S |
| 198.00 | S | N | N | N | N | S | S | S | S | O | N | N | N | N | S | S | S |
| 198.25 | S | N | N | N | N | S | S | S | S | S | N | N | N | N | S | S | S |
| 198.50 | S | N | N | N | N | S | S | S | S | S | N | N | N | N | S | S | S |
| 198.75 | S | N | N | N | N | S | S | S | S | S | N | N | N | N | S | S | S |
| 199.00 | S | N | N | N | N | O | S | S | S | S | N | N | N | N | S | S | S |
| 199.25 | S | N | N | N | N | N | S | S | S | S | N | N | N | N | O | S | S |

-continued

| Coil Excitation | | | | | | | | | | | | | | | | | |
|---|---|---|---|---|---|---|---|---|---|---|---|---|---|---|---|---|---|
| 199.50 | S | N | N | N | N | N | S | S | S | S | N | N | N | N | N | S | S |
| 199.75 | S | N | N | N | N | N | S | S | S | S | N | N | N | N | N | S | S |
| 200.00 | S | O | N | N | N | N | S | S | S | S | N | N | N | N | N | S | S |
| 200.25 | S | S | N | N | N | N | S | S | S | S | O | N | N | N | N | S | S |
| 200.50 | S | S | N | N | N | N | S | S | S | S | S | N | N | N | N | S | S |
| 200.75 | S | S | N | N | N | N | S | S | S | S | S | N | N | N | N | S | S |
| 201.00 | S | S | N | N | N | N | S | S | S | S | S | N | N | N | N | S | S |
| 201.25 | S | S | N | N | N | N | O | S | S | S | S | N | N | N | N | S | S |
| 201.50 | S | S | N | N | N | N | N | S | S | S | S | N | N | N | N | O | S |
| 201.75 | S | S | N | N | N | N | N | S | S | S | S | N | N | N | N | N | S |
| 202.00 | S | S | N | N | N | N | N | S | S | S | S | N | N | N | N | N | S |
| 202.25 | S | S | O | N | N | N | N | S | S | S | S | N | N | N | N | N | S |
| 202.50 | S | S | S | N | N | N | N | S | S | S | S | O | N | N | N | N | S |
| 202.75 | S | S | S | N | N | N | N | S | S | S | S | S | N | N | N | N | S |
| 203.00 | S | S | S | N | N | N | N | S | S | S | S | S | N | N | N | N | S |
| 203.25 | S | S | S | N | N | N | N | S | S | S | S | S | N | N | N | N | S |
| 203.50 | S | S | S | N | N | N | N | O | S | S | S | S | N | N | N | N | S |
| 203.75 | S | S | S | N | N | N | N | N | S | S | S | S | N | N | N | N | O |

Page Row 17, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 192.00 | N | N | N | S | S | S | S | S | N | N | N | N | S | S | S | S | O |
| 192.25 | N | N | N | S | S | S | S | S | N | N | N | N | S | S | S | S | S |
| 192.50 | N | N | N | S | S | S | S | S | N | N | N | N | S | S | S | S | S |
| 192.75 | N | N | N | O | S | S | S | S | N | N | N | N | S | S | S | S | S |
| 193.00 | N | N | N | N | S | S | S | S | N | N | N | N | O | S | S | S | S |
| 193.25 | N | N | N | N | S | S | S | S | N | N | N | N | N | S | S | S | S |
| 193.50 | N | N | N | N | S | S | S | S | N | N | N | N | N | S | S | S | S |
| 193.75 | N | N | N | N | S | S | S | S | N | N | N | N | N | S | S | S | S |
| 194.00 | N | N | N | N | S | S | S | S | O | N | N | N | N | S | S | S | S |
| 194.25 | N | N | N | N | S | S | S | S | S | N | N | N | N | S | S | S | S |
| 194.50 | N | N | N | N | S | S | S | S | S | N | N | N | N | S | S | S | S |
| 194.75 | N | N | N | N | S | S | S | S | S | N | N | N | N | S | S | S | S |
| 195.00 | N | N | N | N | O | S | S | S | S | N | N | N | N | S | S | S | S |
| 195.25 | N | N | N | N | N | S | S | S | S | N | N | N | N | O | S | S | S |
| 195.50 | N | N | N | N | N | S | S | S | S | N | N | N | N | N | S | S | S |
| 195.75 | N | N | N | N | N | S | S | S | S | N | N | N | N | N | S | S | S |
| 196.00 | O | N | N | N | N | S | S | S | S | N | N | N | N | N | S | S | S |
| 196.25 | S | N | N | N | N | S | S | S | S | O | N | N | N | N | S | S | S |
| 196.50 | S | N | N | N | N | S | S | S | S | S | N | N | N | N | S | S | S |
| 196.75 | S | N | N | N | N | S | S | S | S | S | N | N | N | N | S | S | S |
| 197.00 | S | N | N | N | N | S | S | S | S | S | N | N | N | N | S | S | S |
| 197.25 | S | N | N | N | N | O | S | S | S | S | N | N | N | N | S | S | S |
| 197.50 | S | N | N | N | N | N | S | S | S | S | N | N | N | N | O | S | S |
| 197.75 | S | N | N | N | N | N | S | S | S | S | N | N | N | N | N | S | S |
| 198.00 | S | N | N | N | N | N | S | S | S | S | N | N | N | N | N | S | S |
| 198.25 | S | O | N | N | N | N | S | S | S | S | N | N | N | N | N | S | S |
| 198.50 | S | S | N | N | N | N | S | S | S | S | O | N | N | N | N | S | S |
| 198.75 | S | S | N | N | N | N | S | S | S | S | S | N | N | N | N | S | S |
| 199.00 | S | S | N | N | N | N | S | S | S | S | S | N | N | N | N | S | S |
| 199.25 | S | S | N | N | N | N | S | S | S | S | S | N | N | N | N | S | S |
| 199.50 | S | S | N | N | N | N | O | S | S | S | S | N | N | N | N | S | S |
| 199.75 | S | S | N | N | N | N | N | S | S | S | S | N | N | N | N | O | S |
| 200.00 | S | S | N | N | N | N | N | S | S | S | S | N | N | N | N | N | S |
| 200.25 | S | S | N | N | N | N | N | S | S | S | S | N | N | N | N | N | S |
| 200.50 | S | S | O | N | N | N | N | S | S | S | S | N | N | N | N | N | S |
| 200.75 | S | S | S | N | N | N | N | S | S | S | S | O | N | N | N | N | S |
| 201.00 | S | S | S | N | N | N | N | S | S | S | S | S | N | N | N | N | S |
| 201.25 | S | S | S | N | N | N | N | S | S | S | S | S | N | N | N | N | S |
| 201.50 | S | S | S | N | N | N | N | S | S | S | S | S | N | N | N | N | S |
| 201.75 | S | S | S | N | N | N | N | O | S | S | S | S | N | N | N | N | S |
| 202.00 | S | S | S | N | N | N | N | N | S | S | S | S | N | N | N | N | O |
| 202.25 | S | S | S | N | N | N | N | N | S | S | S | S | N | N | N | N | N |
| 202.50 | S | S | S | N | N | N | N | N | S | S | S | S | N | N | N | N | N |
| 202.75 | S | S | S | O | N | N | N | N | S | S | S | S | N | N | N | N | N |
| 203.00 | S | S | S | S | N | N | N | N | S | S | S | S | O | N | N | N | N |
| 203.25 | S | S | S | S | N | N | N | N | S | S | S | S | S | N | N | N | N |
| 203.50 | S | S | S | S | N | N | N | N | S | S | S | S | S | N | N | N | N |
| 203.75 | S | S | S | S | N | N | N | N | S | S | S | S | S | N | N | N | N |

Page Row 17, Page Column 9

| Coil | 154 | 155 | 156 | 157 | 158 | 159 | 160 |
|---|---|---|---|---|---|---|---|
| 192.00 | N | N | N | N | S | S | S |
| 192.25 | N | N | N | N | S | S | S |
| 192.50 | N | N | N | N | S | S | S |

-continued

| Coil Excitation | | | | | | | |
|---|---|---|---|---|---|---|---|
| 192.75 | N | N | N | N | S | S | S |
| 193.00 | N | N | N | N | S | S | S |
| 193.25 | N | N | N | N | O | S | S |
| 193.50 | N | N | N | N | N | S | S |
| 193.75 | N | N | N | N | N | S | S |
| 194.00 | N | N | N | N | N | S | S |
| 194.25 | O | N | N | N | N | S | S |
| 194.50 | S | N | N | N | N | S | S |
| 194.75 | S | N | N | N | N | S | S |
| 195.00 | S | N | N | N | N | S | S |
| 195.25 | S | N | N | N | N | S | S |
| 195.50 | S | N | N | N | N | O | S |
| 195.75 | S | N | N | N | N | N | S |
| 196.00 | S | N | N | N | N | N | S |
| 196.25 | S | N | N | N | N | N | S |
| 196.50 | S | O | N | N | N | N | S |
| 196.75 | S | S | N | N | N | N | S |
| 197.00 | S | S | N | N | N | N | S |
| 197.25 | S | S | N | N | N | N | S |
| 197.50 | S | S | N | N | N | N | S |
| 197.75 | S | S | N | N | N | N | O |
| 198.00 | S | S | N | N | N | N | N |
| 198.25 | S | S | N | N | N | N | N |
| 198.50 | S | S | N | N | N | N | N |
| 198.75 | S | S | O | N | N | N | N |
| 199.00 | S | S | S | N | N | N | N |
| 199.25 | S | S | S | N | N | N | N |
| 199.50 | S | S | S | N | N | N | N |
| 199.75 | S | S | S | N | N | N | N |
| 200.00 | S | S | S | N | N | N | N |
| 200.25 | S | S | S | N | N | N | N |
| 200.50 | S | S | S | N | N | N | N |
| 200.75 | S | S | S | N | N | N | N |
| 201.00 | S | S | S | O | N | N | N |
| 201.25 | S | S | S | S | N | N | N |
| 201.50 | S | S | S | S | N | N | N |
| 201.75 | S | S | S | S | N | N | N |
| 202.00 | S | S | S | S | N | N | N |
| 202.25 | S | S | S | S | N | N | N |
| 202.50 | S | S | S | S | N | N | N |
| 202.75 | S | S | S | S | N | N | N |
| 203.00 | S | S | S | S | N | N | N |
| 203.25 | S | S | S | S | O | N | N |
| 203.50 | S | S | S | S | S | N | N |
| 203.75 | S | S | S | S | S | N | N |

Page Row 17, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 204.00 | N | N | S | S | S | S | S | N | N | N | N | S | S | S | S | S | N |
| 204.25 | N | N | S | S | S | S | S | N | N | N | N | S | S | S | S | S | N |
| 204.50 | N | N | O | S | S | S | S | N | N | N | N | S | S | S | S | S | N |
| 204.75 | N | N | N | S | S | S | S | N | N | N | N | O | S | S | S | S | N |
| 205.00 | N | N | N | S | S | S | S | N | N | N | N | N | S | S | S | S | N |
| 205.25 | N | N | N | S | S | S | S | N | N | N | N | N | S | S | S | S | N |
| 205.50 | N | N | N | S | S | S | S | N | N | N | N | N | S | S | S | S | N |
| 205.75 | N | N | N | S | S | S | S | O | N | N | N | N | S | S | S | S | N |
| 206.00 | N | N | N | S | S | S | S | S | N | N | N | N | S | S | S | S | O |
| 206.25 | N | N | N | S | S | S | S | S | N | N | N | N | S | S | S | S | S |
| 206.50 | N | N | N | S | S | S | S | S | N | N | N | N | S | S | S | S | S |
| 206.75 | N | N | N | O | S | S | S | S | N | N | N | N | S | S | S | S | S |
| 207.00 | N | N | N | N | S | S | S | S | N | N | N | N | O | S | S | S | S |
| 207.25 | N | N | N | N | S | S | S | S | N | N | N | N | N | S | S | S | S |
| 207.50 | N | N | N | N | S | S | S | S | N | N | N | N | N | S | S | S | S |
| 207.75 | N | N | N | N | S | S | S | S | N | N | N | N | N | S | S | S | S |
| 208.00 | N | N | N | N | S | S | S | S | O | N | N | N | N | S | S | S | S |
| 208.25 | N | N | N | N | S | S | S | S | S | N | N | N | N | S | S | S | S |
| 208.50 | N | N | N | N | S | S | S | S | S | N | N | N | N | S | S | S | S |
| 208.75 | N | N | N | N | S | S | S | S | S | N | N | N | N | S | S | S | S |
| 209.00 | N | N | N | N | O | S | S | S | S | N | N | N | N | S | S | S | S |
| 209.25 | N | N | N | N | N | S | S | S | S | N | N | N | N | O | S | S | S |
| 209.50 | N | N | N | N | N | S | S | S | S | N | N | N | N | N | S | S | S |
| 209.75 | N | N | N | N | N | S | S | S | S | N | N | N | N | N | S | S | S |
| 210.00 | O | N | N | N | N | S | S | S | S | N | N | N | N | N | S | S | S |
| 210.25 | S | N | N | N | N | S | S | S | S | O | N | N | N | N | S | S | S |
| 210.50 | S | N | N | N | N | S | S | S | S | S | N | N | N | N | S | S | S |
| 210.75 | S | N | N | N | N | S | S | S | S | S | N | N | N | N | S | S | S |

-continued

| Coil Excitation | | | | | | | | | | | | | | | | |
|---|---|---|---|---|---|---|---|---|---|---|---|---|---|---|---|---|
| 211.00 | S | N | N | N | N | S | S | S | S | S | N | N | N | N | S | S | S |
| 211.25 | S | N | N | N | N | O | S | S | S | S | N | N | N | N | S | S | S |
| 211.50 | S | N | N | N | N | N | S | S | S | S | N | N | N | N | O | S | S |
| 211.75 | S | N | N | N | N | N | S | S | S | S | N | N | N | N | N | S | S |
| 212.00 | S | N | N | N | N | N | S | S | S | S | N | N | N | N | N | S | S |
| 212.25 | S | O | N | N | N | N | S | S | S | S | N | N | N | N | N | S | S |
| 212.50 | S | S | N | N | N | N | S | S | S | S | O | N | N | N | N | S | S |
| 212.75 | S | S | N | N | N | N | S | S | S | S | S | N | N | N | N | S | S |
| 213.00 | S | S | N | N | N | N | S | S | S | S | S | N | N | N | N | S | S |
| 213.25 | S | S | N | N | N | N | S | S | S | S | S | N | N | N | N | S | S |
| 213.50 | S | S | N | N | N | N | O | S | S | S | S | N | N | N | N | S | S |
| 213.75 | S | S | N | N | N | N | N | S | S | S | S | N | N | N | N | O | S |
| 214.00 | S | S | N | N | N | N | N | S | S | S | S | N | N | N | N | N | S |
| 214.25 | S | S | N | N | N | N | N | S | S | S | S | N | N | N | N | N | S |
| 214.50 | S | S | O | N | N | N | N | S | S | S | S | N | N | N | N | N | S |
| 214.75 | S | S | S | N | N | N | N | S | S | S | S | O | N | N | N | N | S |
| 215.00 | S | S | S | N | N | N | N | S | S | S | S | S | N | N | N | N | S |
| 215.25 | S | S | S | N | N | N | N | S | S | S | S | S | N | N | N | N | S |
| 215.50 | S | S | S | N | N | N | N | S | S | S | S | S | N | N | N | N | S |
| 215.75 | S | S | S | N | N | N | N | O | S | S | S | S | N | N | N | N | S |

Page Row 18, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 204.00 | N | N | N | S | S | S | S | O | N | N | N | N | S | S | S | S | N |
| 204.25 | N | N | N | S | S | S | S | S | N | N | N | N | S | S | S | S | O |
| 204.50 | N | N | N | S | S | S | S | S | N | N | N | N | S | S | S | S | S |
| 204.75 | N | N | N | S | S | S | S | S | N | N | N | N | S | S | S | S | S |
| 205.00 | N | N | N | O | S | S | S | S | N | N | N | N | S | S | S | S | S |
| 205.25 | N | N | N | N | S | S | S | S | N | N | N | N | O | S | S | S | S |
| 205.50 | N | N | N | N | S | S | S | S | N | N | N | N | N | S | S | S | S |
| 205.75 | N | N | N | N | S | S | S | S | N | N | N | N | N | S | S | S | S |
| 206.00 | N | N | N | N | S | S | S | S | N | N | N | N | N | S | S | S | S |
| 206.25 | N | N | N | N | S | S | S | S | O | N | N | N | N | S | S | S | S |
| 206.50 | N | N | N | N | S | S | S | S | S | N | N | N | N | S | S | S | S |
| 206.75 | N | N | N | N | S | S | S | S | S | N | N | N | N | S | S | S | S |
| 207.00 | N | N | N | N | S | S | S | S | S | N | N | N | N | S | S | S | S |
| 207.25 | N | N | N | N | O | S | S | S | S | N | N | N | N | S | S | S | S |
| 207.50 | N | N | N | N | N | S | S | S | S | N | N | N | N | O | S | S | S |
| 207.75 | N | N | N | N | N | S | S | S | S | N | N | N | N | N | S | S | S |
| 208.00 | N | N | N | N | N | S | S | S | S | N | N | N | N | N | S | S | S |
| 208.25 | O | N | N | N | N | S | S | S | S | N | N | N | N | N | S | S | S |
| 208.50 | S | N | N | N | N | S | S | S | S | O | N | N | N | N | S | S | S |
| 208.75 | S | N | N | N | N | S | S | S | S | S | N | N | N | N | S | S | S |
| 209.00 | S | N | N | N | N | S | S | S | S | S | N | N | N | N | S | S | S |
| 209.25 | S | N | N | N | N | S | S | S | S | S | N | N | N | N | S | S | S |
| 209.50 | S | N | N | N | N | O | S | S | S | S | N | N | N | N | S | S | S |
| 209.75 | S | N | N | N | N | N | S | S | S | S | N | N | N | N | O | S | S |
| 210.00 | S | N | N | N | N | N | S | S | S | S | N | N | N | N | N | S | S |
| 210.25 | S | N | N | N | N | N | S | S | S | S | N | N | N | N | N | S | S |
| 210.50 | S | O | N | N | N | N | S | S | S | S | N | N | N | N | N | S | S |
| 210.75 | S | S | N | N | N | N | S | S | S | S | O | N | N | N | N | S | S |
| 211.00 | S | S | N | N | N | N | S | S | S | S | S | N | N | N | N | S | S |
| 211.25 | S | S | N | N | N | N | S | S | S | S | S | N | N | N | N | S | S |
| 211.50 | S | S | N | N | N | N | S | S | S | S | S | N | N | N | N | S | S |
| 211.75 | S | S | N | N | N | N | O | S | S | S | S | N | N | N | N | S | S |
| 212.00 | S | S | N | N | N | N | N | S | S | S | S | N | N | N | N | O | S |
| 212.25 | S | S | N | N | N | N | N | S | S | S | S | N | N | N | N | N | S |
| 212.50 | S | S | N | N | N | N | N | S | S | S | S | N | N | N | N | N | S |
| 212.75 | S | S | O | N | N | N | N | S | S | S | S | N | N | N | N | N | S |
| 213.00 | S | S | S | N | N | N | N | S | S | S | S | O | N | N | N | N | S |
| 213.25 | S | S | S | N | N | N | N | S | S | S | S | S | N | N | N | N | S |
| 213.50 | S | S | S | N | N | N | N | S | S | S | S | S | N | N | N | N | S |
| 213.75 | S | S | S | N | N | N | N | S | S | S | S | S | N | N | N | N | S |
| 214.00 | S | S | S | N | N | N | N | O | S | S | S | S | N | N | N | N | S |
| 214.25 | S | S | S | N | N | N | N | N | S | S | S | S | N | N | N | N | O |
| 214.50 | S | S | S | N | N | N | N | N | S | S | S | S | N | N | N | N | N |
| 214.75 | S | S | S | N | N | N | N | N | S | S | S | S | N | N | N | N | N |
| 215.00 | S | S | S | O | N | N | N | N | S | S | S | S | N | N | N | N | N |
| 215.25 | S | S | S | S | N | N | N | N | S | S | S | S | O | N | N | N | N |
| 215.50 | S | S | S | S | N | N | N | N | S | S | S | S | S | N | N | N | N |
| 215.75 | S | S | S | S | N | N | N | N | S | S | S | S | S | N | N | N | N |

Page Row 18, Page Column 2

-continued

Coil Excitation

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 204.00 | N | N | N | N | S | S | S | S | N | N | N | N | N | S | S | S | S |
| 204.25 | N | N | N | N | S | S | S | S | N | N | N | N | N | S | S | S | S |
| 204.50 | N | N | N | N | S | S | S | S | O | N | N | N | N | S | S | S | S |
| 204.75 | N | N | N | N | S | S | S | S | S | N | N | N | N | S | S | S | S |
| 205.00 | N | N | N | N | S | S | S | S | S | N | N | N | N | S | S | S | S |
| 205.25 | N | N | N | N | S | S | S | S | S | N | N | N | N | S | S | S | S |
| 205.50 | N | N | N | N | O | S | S | S | S | N | N | N | N | S | S | S | S |
| 205.75 | N | N | N | N | N | S | S | S | S | N | N | N | N | O | S | S | S |
| 206.00 | N | N | N | N | N | S | S | S | S | N | N | N | N | N | S | S | S |
| 206.25 | N | N | N | N | N | S | S | S | S | N | N | N | N | N | S | S | S |
| 206.50 | O | N | N | N | N | S | S | S | S | N | N | N | N | N | S | S | S |
| 206.75 | S | N | N | N | N | S | S | S | S | O | N | N | N | N | S | S | S |
| 207.00 | S | N | N | N | N | S | S | S | S | S | N | N | N | N | S | S | S |
| 207.25 | S | N | N | N | N | S | S | S | S | S | N | N | N | N | S | S | S |
| 207.50 | S | N | N | N | N | S | S | S | S | S | N | N | N | N | S | S | S |
| 207.75 | S | N | N | N | N | O | S | S | S | S | N | N | N | N | S | S | S |
| 208.00 | S | N | N | N | N | N | S | S | S | S | N | N | N | N | O | S | S |
| 208.25 | S | N | N | N | N | N | S | S | S | S | N | N | N | N | N | S | S |
| 208.50 | S | N | N | N | N | N | S | S | S | S | N | N | N | N | N | S | S |
| 208.75 | S | O | N | N | N | N | S | S | S | S | N | N | N | N | N | S | S |
| 209.00 | S | S | N | N | N | N | S | S | S | S | O | N | N | N | N | S | S |
| 209.25 | S | S | N | N | N | N | S | S | S | S | S | N | N | N | N | S | S |
| 209.50 | S | S | N | N | N | N | S | S | S | S | S | N | N | N | N | S | S |
| 209.75 | S | S | N | N | N | N | S | S | S | S | S | N | N | N | N | S | S |
| 210.00 | S | S | N | N | N | N | O | S | S | S | S | N | N | N | N | S | S |
| 210.25 | S | S | N | N | N | N | N | S | S | S | S | N | N | N | N | O | S |
| 210.50 | S | S | N | N | N | N | N | S | S | S | S | N | N | N | N | N | S |
| 210.75 | S | S | N | N | N | N | N | S | S | S | S | N | N | N | N | N | S |
| 211.00 | S | S | O | N | N | N | N | S | S | S | S | N | N | N | N | N | S |
| 211.25 | S | S | S | N | N | N | N | S | S | S | S | O | N | N | N | N | S |
| 211.50 | S | S | S | N | N | N | N | S | S | S | S | S | N | N | N | N | S |
| 211.75 | S | S | S | N | N | N | N | S | S | S | S | S | N | N | N | N | S |
| 212.00 | S | S | S | N | N | N | N | S | S | S | S | S | N | N | N | N | S |
| 212.25 | S | S | S | N | N | N | N | O | S | S | S | S | N | N | N | N | S |
| 212.50 | S | S | S | N | N | N | N | N | S | S | S | S | N | N | N | N | O |
| 212.75 | S | S | S | N | N | N | N | N | S | S | S | S | N | N | N | N | N |
| 213.00 | S | S | S | N | N | N | N | N | S | S | S | S | N | N | N | N | N |
| 213.25 | S | S | S | O | N | N | N | N | S | S | S | S | N | N | N | N | N |
| 213.50 | S | S | S | S | N | N | N | N | S | S | S | S | O | N | N | N | N |
| 213.75 | S | S | S | S | N | N | N | N | S | S | S | S | S | N | N | N | N |
| 214.00 | S | S | S | S | N | N | N | N | S | S | S | S | S | N | N | N | N |
| 214.25 | S | S | S | S | N | N | N | N | S | S | S | S | S | N | N | N | N |
| 214.50 | S | S | S | S | N | N | N | N | O | S | S | S | S | N | N | N | N |
| 214.75 | S | S | S | S | N | N | N | N | N | S | S | S | S | N | N | N | N |
| 215.00 | S | S | S | S | N | N | N | N | N | S | S | S | S | N | N | N | N |
| 215.25 | S | S | S | S | N | N | N | N | N | S | S | S | S | N | N | N | N |
| 215.50 | S | S | S | S | O | N | N | N | N | S | S | S | S | N | N | N | N |
| 215.75 | S | S | S | S | S | N | N | N | N | S | S | S | S | O | N | N | N |

Page Row 18, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 204.00 | N | N | N | N | N | S | S | S | S | N | N | N | N | O | S | S | S |
| 204.25 | N | N | N | N | N | S | S | S | S | N | N | N | N | N | S | S | S |
| 204.50 | N | N | N | N | N | S | S | S | S | N | N | N | N | N | S | S | S |
| 204.75 | O | N | N | N | N | S | S | S | S | N | N | N | N | N | S | S | S |
| 205.00 | S | N | N | N | N | S | S | S | S | O | N | N | N | N | S | S | S |
| 205.25 | S | N | N | N | N | S | S | S | S | S | N | N | N | N | S | S | S |
| 205.50 | S | N | N | N | N | S | S | S | S | S | N | N | N | N | S | S | S |
| 205.75 | S | N | N | N | N | S | S | S | S | S | N | N | N | N | S | S | S |
| 206.00 | S | N | N | N | N | O | S | S | S | S | N | N | N | N | S | S | S |
| 206.25 | S | N | N | N | N | N | S | S | S | S | N | N | N | N | O | S | S |
| 206.50 | S | N | N | N | N | N | S | S | S | S | N | N | N | N | N | S | S |
| 206.75 | S | N | N | N | N | N | S | S | S | S | N | N | N | N | N | S | S |
| 207.00 | S | O | N | N | N | N | S | S | S | S | N | N | N | N | N | S | S |
| 207.25 | S | S | N | N | N | N | S | S | S | S | O | N | N | N | N | S | S |
| 207.50 | S | S | N | N | N | N | S | S | S | S | S | N | N | N | N | S | S |
| 207.75 | S | S | N | N | N | N | S | S | S | S | S | N | N | N | N | S | S |
| 208.00 | S | S | N | N | N | N | S | S | S | S | S | N | N | N | N | S | S |
| 208.25 | S | S | N | N | N | N | O | S | S | S | S | N | N | N | N | S | S |
| 208.50 | S | S | N | N | N | N | N | S | S | S | S | N | N | N | N | O | S |
| 208.75 | S | S | N | N | N | N | N | S | S | S | S | N | N | N | N | N | S |
| 209.00 | S | S | N | N | N | N | N | S | S | S | S | N | N | N | N | N | S |
| 209.25 | S | S | O | N | N | N | N | S | S | S | S | N | N | N | N | N | S |
| 209.50 | S | S | S | N | N | N | N | S | S | S | S | O | N | N | N | N | S |

-continued

| Coil Excitation | | | | | | | | | | | | | | | | | |
|---|---|---|---|---|---|---|---|---|---|---|---|---|---|---|---|---|---|
| 209.75 | S | S | S | N | N | N | N | S | S | S | S | S | N | N | N | N | S |
| 210.00 | S | S | S | N | N | N | N | S | S | S | S | S | N | N | N | N | S |
| 210.25 | S | S | S | N | N | N | N | S | S | S | S | S | N | N | N | N | S |
| 210.50 | S | S | S | N | N | N | N | O | S | S | S | S | N | N | N | N | S |
| 210.75 | S | S | S | N | N | N | N | N | S | S | S | S | N | N | N | N | O |
| 211.00 | S | S | S | N | N | N | N | N | S | S | S | S | N | N | N | N | N |
| 211.25 | S | S | S | N | N | N | N | N | S | S | S | S | N | N | N | N | N |
| 211.50 | S | S | S | O | N | N | N | N | S | S | S | S | N | N | N | N | N |
| 211.75 | S | S | S | S | N | N | N | N | S | S | S | S | O | N | N | N | N |
| 212.00 | S | S | S | S | N | N | N | N | S | S | S | S | S | N | N | N | N |
| 212.25 | S | S | S | S | N | N | N | N | S | S | S | S | S | N | N | N | N |
| 212.50 | S | S | S | S | N | N | N | N | S | S | S | S | S | N | N | N | N |
| 212.75 | S | S | S | S | N | N | N | N | O | S | S | S | S | N | N | N | N |
| 213.00 | S | S | S | S | N | N | N | N | N | S | S | S | S | N | N | N | N |
| 213.25 | S | S | S | S | N | N | N | N | N | S | S | S | S | N | N | N | N |
| 213.50 | S | S | S | S | N | N | N | N | N | S | S | S | S | N | N | N | N |
| 213.75 | S | S | S | S | O | N | N | N | N | S | S | S | S | N | N | N | N |
| 214.00 | S | S | S | S | S | N | N | N | N | S | S | S | S | O | N | N | N |
| 214.25 | S | S | S | S | S | N | N | N | N | S | S | S | S | S | N | N | N |
| 214.50 | S | S | S | S | S | N | N | N | N | S | S | S | S | S | N | N | N |
| 214.75 | O | S | S | S | S | N | N | N | N | S | S | S | S | S | N | N | N |
| 215.00 | N | S | S | S | S | N | N | N | N | O | S | S | S | S | N | N | N |
| 215.25 | N | S | S | S | S | N | N | N | N | N | S | S | S | S | N | N | N |
| 215.50 | N | S | S | S | S | N | N | N | N | N | S | S | S | S | N | N | N |
| 215.75 | N | S | S | S | S | N | N | N | N | N | S | S | S | S | N | N | N |

Page Row 18, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 204.00 | S | N | N | N | N | S | S | S | S | S | N | N | N | N | S | S | S |
| 204.25 | S | N | N | N | N | O | S | S | S | S | N | N | N | N | S | S | S |
| 204.50 | S | N | N | N | N | N | S | S | S | S | N | N | N | N | O | S | S |
| 204.75 | S | N | N | N | N | N | S | S | S | S | N | N | N | N | N | S | S |
| 205.00 | S | N | N | N | N | N | S | S | S | S | N | N | N | N | N | S | S |
| 205.25 | S | O | N | N | N | N | S | S | S | S | N | N | N | N | N | S | S |
| 205.50 | S | S | N | N | N | N | S | S | S | S | O | N | N | N | N | S | S |
| 205.75 | S | S | N | N | N | N | S | S | S | S | S | N | N | N | N | S | S |
| 206.00 | S | S | N | N | N | N | S | S | S | S | S | N | N | N | N | S | S |
| 206.25 | S | S | N | N | N | N | S | S | S | S | S | N | N | N | N | S | S |
| 206.50 | S | S | N | N | N | N | O | S | S | S | S | N | N | N | N | S | S |
| 206.75 | S | S | N | N | N | N | N | S | S | S | S | N | N | N | N | O | S |
| 207.00 | S | S | N | N | N | N | N | S | S | S | S | N | N | N | N | N | S |
| 207.25 | S | S | N | N | N | N | N | S | S | S | S | N | N | N | N | N | S |
| 207.50 | S | S | O | N | N | N | N | S | S | S | S | N | N | N | N | N | S |
| 207.75 | S | S | S | N | N | N | N | S | S | S | S | O | N | N | N | N | S |
| 208.00 | S | S | S | N | N | N | N | S | S | S | S | S | N | N | N | N | S |
| 208.25 | S | S | S | N | N | N | N | S | S | S | S | S | N | N | N | N | S |
| 208.50 | S | S | S | N | N | N | N | S | S | S | S | S | N | N | N | N | S |
| 208.75 | S | S | S | N | N | N | N | O | S | S | S | S | N | N | N | N | S |
| 209.00 | S | S | S | N | N | N | N | N | S | S | S | S | N | N | N | N | O |
| 209.25 | S | S | S | N | N | N | N | N | S | S | S | S | N | N | N | N | N |
| 209.50 | S | S | S | N | N | N | N | N | S | S | S | S | N | N | N | N | N |
| 209.75 | S | S | S | O | N | N | N | N | S | S | S | S | N | N | N | N | N |
| 210.00 | S | S | S | S | N | N | N | N | S | S | S | S | O | N | N | N | N |
| 210.25 | S | S | S | S | N | N | N | N | S | S | S | S | S | N | N | N | N |
| 210.50 | S | S | S | S | N | N | N | N | S | S | S | S | S | N | N | N | N |
| 210.75 | S | S | S | S | N | N | N | N | S | S | S | S | S | N | N | N | N |
| 211.00 | S | S | S | S | N | N | N | N | O | S | S | S | S | N | N | N | N |
| 211.25 | S | S | S | S | N | N | N | N | N | S | S | S | S | N | N | N | N |
| 211.50 | S | S | S | S | N | N | N | N | N | S | S | S | S | N | N | N | N |
| 211.75 | S | S | S | S | N | N | N | N | N | S | S | S | S | N | N | N | N |
| 212.00 | S | S | S | S | O | N | N | N | N | S | S | S | S | N | N | N | N |
| 212.25 | S | S | S | S | S | N | N | N | N | S | S | S | S | O | N | N | N |
| 212.50 | S | S | S | S | S | N | N | N | N | S | S | S | S | S | N | N | N |
| 212.75 | S | S | S | S | S | N | N | N | N | S | S | S | S | S | N | N | N |
| 213.00 | O | S | S | S | S | N | N | N | N | S | S | S | S | S | N | N | N |
| 213.25 | N | S | S | S | S | N | N | N | N | O | S | S | S | S | N | N | N |
| 213.50 | N | S | S | S | S | N | N | N | N | N | S | S | S | S | N | N | N |
| 213.75 | N | S | S | S | S | N | N | N | N | N | S | S | S | S | N | N | N |
| 214.00 | N | S | S | S | S | N | N | N | N | N | S | S | S | S | N | N | N |
| 214.25 | N | S | S | S | S | O | N | N | N | N | S | S | S | S | N | N | N |
| 214.50 | N | S | S | S | S | S | N | N | N | N | S | S | S | S | O | N | N |
| 214.75 | N | S | S | S | S | S | N | N | N | N | S | S | S | S | S | N | N |
| 215.00 | N | S | S | S | S | S | N | N | N | N | S | S | S | S | S | N | N |
| 215.25 | N | O | S | S | S | S | N | N | N | N | S | S | S | S | S | N | N |

-continued

Coil Excitation

| | | | | | | | | | | | | | | | | | |
|---|---|---|---|---|---|---|---|---|---|---|---|---|---|---|---|---|---|
| 215.50 | N | N | S | S | S | S | N | N | N | N | O | S | S | S | S | N | N |
| 215.75 | N | N | S | S | S | S | N | N | N | N | N | S | S | S | S | N | N |

Page Row 18, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 204.00 | S | S | N | N | N | N | S | S | S | S | S | N | N | N | N | S | S |
| 204.25 | S | S | N | N | N | N | S | S | S | S | S | N | N | N | N | S | S |
| 204.50 | S | S | N | N | N | N | S | S | S | S | S | N | N | N | N | S | S |
| 204.75 | S | S | N | N | N | N | O | S | S | S | S | N | N | N | N | S | S |
| 205.00 | S | S | N | N | N | N | N | S | S | S | S | N | N | N | N | O | S |
| 205.25 | S | S | N | N | N | N | N | S | S | S | S | N | N | N | N | N | S |
| 205.50 | S | S | N | N | N | N | N | S | S | S | S | N | N | N | N | N | S |
| 205.75 | S | S | O | N | N | N | N | S | S | S | S | N | N | N | N | N | S |
| 206.00 | S | S | S | N | N | N | N | S | S | S | S | O | N | N | N | N | S |
| 206.25 | S | S | S | N | N | N | N | S | S | S | S | S | N | N | N | N | S |
| 206.50 | S | S | S | N | N | N | N | S | S | S | S | S | N | N | N | N | S |
| 206.75 | S | S | S | N | N | N | N | S | S | S | S | S | N | N | N | N | S |
| 207.00 | S | S | S | N | N | N | N | O | S | S | S | S | N | N | N | N | S |
| 207.25 | S | S | S | N | N | N | N | N | S | S | S | S | N | N | N | N | O |
| 207.50 | S | S | S | N | N | N | N | N | S | S | S | S | N | N | N | N | N |
| 207.75 | S | S | S | N | N | N | N | N | S | S | S | S | N | N | N | N | N |
| 208.00 | S | S | S | O | N | N | N | N | S | S | S | S | N | N | N | N | N |
| 208.25 | S | S | S | S | N | N | N | N | S | S | S | S | O | N | N | N | N |
| 208.50 | S | S | S | S | N | N | N | N | S | S | S | S | S | N | N | N | N |
| 208.75 | S | S | S | S | N | N | N | N | S | S | S | S | S | N | N | N | N |
| 209.00 | S | S | S | S | N | N | N | N | S | S | S | S | S | N | N | N | N |
| 209.25 | S | S | S | S | N | N | N | N | O | S | S | S | S | N | N | N | N |
| 209.50 | S | S | S | S | N | N | N | N | N | S | S | S | S | N | N | N | N |
| 209.75 | S | S | S | S | N | N | N | N | N | S | S | S | S | N | N | N | N |
| 210.00 | S | S | S | S | N | N | N | N | N | S | S | S | S | N | N | N | N |
| 210.25 | S | S | S | S | O | N | N | N | N | S | S | S | S | N | N | N | N |
| 210.50 | S | S | S | S | S | N | N | N | N | S | S | S | S | O | N | N | N |
| 210.75 | S | S | S | S | S | N | N | N | N | S | S | S | S | S | N | N | N |
| 211.00 | S | S | S | S | S | N | N | N | N | S | S | S | S | S | N | N | N |
| 211.25 | O | S | S | S | S | N | N | N | N | S | S | S | S | S | N | N | N |
| 211.50 | N | S | S | S | S | N | N | N | N | O | S | S | S | S | N | N | N |
| 211.75 | N | S | S | S | S | N | N | N | N | N | S | S | S | S | N | N | N |
| 212.00 | N | S | S | S | S | N | N | N | N | N | S | S | S | S | N | N | N |
| 212.25 | N | S | S | S | S | N | N | N | N | N | S | S | S | S | N | N | N |
| 212.50 | N | S | S | S | S | O | N | N | N | N | S | S | S | S | N | N | N |
| 212.75 | N | S | S | S | S | S | N | N | N | N | S | S | S | S | O | N | N |
| 213.00 | N | S | S | S | S | S | N | N | N | N | S | S | S | S | S | N | N |
| 213.25 | N | S | S | S | S | S | N | N | N | N | S | S | S | S | S | N | N |
| 213.50 | N | O | S | S | S | S | N | N | N | N | S | S | S | S | S | N | N |
| 213.75 | N | N | S | S | S | S | N | N | W | N | O | S | S | S | S | N | N |
| 214.00 | N | N | S | S | S | S | N | N | N | N | N | S | S | S | S | N | N |
| 214.25 | N | N | S | S | S | S | N | N | N | N | N | S | S | S | S | N | N |
| 214.50 | N | N | S | S | S | S | N | N | N | N | N | S | S | S | S | N | N |
| 214.75 | N | N | S | S | S | S | O | N | N | N | N | S | S | S | S | N | N |
| 215.00 | N | N | S | S | S | S | S | N | N | N | N | S | S | S | S | O | N |
| 215.25 | N | N | S | S | S | S | S | N | N | N | N | S | S | S | S | S | N |
| 215.50 | N | N | S | S | S | S | S | N | N | N | N | S | S | S | S | S | N |
| 215.75 | N | N | O | S | S | S | S | N | N | N | N | S | S | S | S | S | N |

Page Row 18, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 204.00 | S | S | O | N | N | N | N | S | S | S | S | N | N | N | N | N | S |
| 204.25 | S | S | S | N | N | N | N | S | S | S | S | O | N | N | N | N | S |
| 204.50 | S | S | S | N | N | N | N | S | S | S | S | S | N | N | N | N | S |
| 204.75 | S | S | S | N | N | N | N | S | S | S | S | S | N | N | N | N | S |
| 205.00 | S | S | S | N | N | N | N | S | S | S | S | S | N | N | N | N | S |
| 205.25 | S | S | S | N | N | N | N | O | S | S | S | S | N | N | N | N | S |
| 205.50 | S | S | S | N | N | N | N | N | S | S | S | S | N | N | N | N | O |
| 205.75 | S | S | S | N | N | N | N | N | S | S | S | S | N | N | N | N | N |
| 206.00 | S | S | S | N | N | N | N | N | S | S | S | S | N | N | N | N | N |
| 206.25 | S | S | S | O | N | N | N | N | S | S | S | S | N | N | N | N | N |
| 206.50 | S | S | S | S | N | N | N | N | S | S | S | S | O | N | N | N | N |
| 206.75 | S | S | S | S | N | N | N | N | S | S | S | S | S | N | N | N | N |
| 207.00 | S | S | S | S | N | N | N | N | S | S | S | S | S | N | N | N | N |
| 207.25 | S | S | S | S | N | N | N | N | S | S | S | S | S | N | N | N | N |
| 207.50 | S | S | S | S | N | N | N | N | O | S | S | S | S | N | N | N | N |
| 207.75 | S | S | S | S | N | N | N | N | N | S | S | S | S | N | N | N | N |
| 208.00 | S | S | S | S | N | N | N | N | N | S | S | S | S | N | N | N | N |
| 208.25 | S | S | S | S | N | N | N | N | N | S | S | S | S | N | N | N | N |
| 208.50 | S | S | S | S | O | N | N | N | N | S | S | S | S | N | N | N | N |

-continued

| Coil Excitation | | | | | | | | | | | | | | | | | |
|---|---|---|---|---|---|---|---|---|---|---|---|---|---|---|---|---|---|
| 208.75 | S | S | S | S | S | N | N | N | N | S | S | S | S | O | N | N | N |
| 209.00 | S | S | S | S | S | N | N | N | N | S | S | S | S | S | N | N | N |
| 209.25 | S | S | S | S | S | N | N | N | N | S | S | S | S | S | N | N | N |
| 209.50 | O | S | S | S | S | N | N | N | N | S | S | S | S | S | N | N | N |
| 209.75 | N | S | S | S | S | N | N | N | N | O | S | S | S | S | N | N | N |
| 210.00 | N | S | S | S | S | N | N | N | N | N | S | S | S | S | N | N | N |
| 210.25 | N | S | S | S | S | N | N | N | N | N | S | S | S | S | N | N | N |
| 210.50 | N | S | S | S | S | N | N | N | N | N | S | S | S | S | N | N | N |
| 210.75 | N | S | S | S | S | O | N | N | N | N | S | S | S | S | N | N | N |
| 211.00 | N | S | S | S | S | S | N | N | N | N | S | S | S | S | O | N | N |
| 211.25 | N | S | S | S | S | S | N | N | N | N | S | S | S | S | S | N | N |
| 211.50 | N | S | S | S | S | S | N | N | N | N | S | S | S | S | S | N | N |
| 211.75 | N | O | S | S | S | S | N | N | N | N | S | S | S | S | S | N | N |
| 212.00 | N | N | S | S | S | S | N | N | N | N | O | S | S | S | S | N | N |
| 212.25 | N | N | S | S | S | S | N | N | N | N | N | S | S | S | S | N | N |
| 212.50 | N | N | S | S | S | S | N | N | N | N | N | S | S | S | S | N | N |
| 212.75 | N | N | S | S | S | S | N | N | N | N | N | S | S | S | S | N | N |
| 213.00 | N | N | S | S | S | S | O | N | N | N | N | S | S | S | S | N | N |
| 213.25 | N | N | S | S | S | S | S | N | N | N | N | S | S | S | S | O | N |
| 213.50 | N | N | S | S | S | S | S | N | N | N | N | S | S | S | S | S | N |
| 213.75 | N | N | S | S | S | S | S | N | N | N | N | S | S | S | S | S | N |
| 214.00 | N | N | O | S | S | S | S | N | N | N | N | S | S | S | S | S | N |
| 214.25 | N | N | N | S | S | S | S | N | N | N | N | O | S | S | S | S | N |
| 214.50 | N | N | N | S | S | S | S | N | N | N | N | N | S | S | S | S | N |
| 214.75 | N | N | N | S | S | S | S | N | N | N | N | N | S | S | S | S | N |
| 215.00 | N | N | N | S | S | S | S | N | N | N | N | N | S | S | S | S | N |
| 215.25 | N | N | N | S | S | S | S | O | N | N | N | N | S | S | S | S | N |
| 215.50 | N | N | N | S | S | S | S | S | N | N | N | N | S | S | S | S | O |
| 215.75 | N | N | N | S | S | S | S | S | N | N | N | N | S | S | S | S | S |

Page Row 18, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 204.00 | S | S | S | N | N | N | N | N | S | S | S | S | N | N | N | N | N |
| 204.25 | S | S | S | N | N | N | N | N | S | S | S | S | N | N | N | N | N |
| 204.50 | S | S | S | O | N | N | N | N | S | S | S | S | N | N | N | N | N |
| 204.75 | S | S | S | S | N | N | N | N | S | S | S | S | O | N | N | N | N |
| 205.00 | S | S | S | S | N | N | N | N | S | S | S | S | S | N | N | N | N |
| 205.25 | S | S | S | S | N | N | N | N | S | S | S | S | S | N | N | N | N |
| 205.50 | S | S | S | S | N | N | N | N | S | S | S | S | S | N | N | N | N |
| 205.75 | S | S | S | S | N | N | N | N | O | S | S | S | S | N | N | N | N |
| 206.00 | S | S | S | S | N | N | N | N | N | S | S | S | S | N | N | N | N |
| 206.25 | S | S | S | S | N | N | N | N | N | S | S | S | S | N | N | N | N |
| 206.50 | S | S | S | S | N | N | N | N | N | S | S | S | S | N | N | N | N |
| 206.75 | S | S | S | S | O | N | N | N | N | S | S | S | S | N | N | N | N |
| 207.00 | S | S | S | S | S | N | N | N | N | S | S | S | S | O | N | N | N |
| 207.25 | S | S | S | S | S | N | N | N | N | S | S | S | S | S | N | N | N |
| 207.50 | S | S | S | S | S | N | N | N | N | S | S | S | S | S | N | N | N |
| 207.75 | O | S | S | S | S | N | N | N | N | S | S | S | S | S | N | N | N |
| 208.00 | N | S | S | S | S | N | N | N | N | O | S | S | S | S | N | N | N |
| 208.25 | N | S | S | S | S | N | N | N | N | N | S | S | S | S | N | N | N |
| 208.50 | N | S | S | S | S | N | N | N | N | N | S | S | S | S | N | N | N |
| 208.75 | N | S | S | S | S | N | N | N | N | N | S | S | S | S | N | N | N |
| 209.00 | N | S | S | S | S | O | N | N | N | N | S | S | S | S | N | N | N |
| 209.25 | N | S | S | S | S | S | N | N | N | N | S | S | S | S | O | N | N |
| 209.50 | N | S | S | S | S | S | N | N | N | N | S | S | S | S | S | N | N |
| 209.75 | N | S | S | S | S | S | N | N | N | N | S | S | S | S | S | N | N |
| 210.00 | N | O | S | S | S | S | N | N | N | N | S | S | S | S | S | N | N |
| 210.25 | N | N | S | S | S | S | N | N | N | N | O | S | S | S | S | N | N |
| 210.50 | N | N | S | S | S | S | N | N | N | N | N | S | S | S | S | N | N |
| 210.75 | N | N | S | S | S | S | N | N | N | N | N | S | S | S | S | N | N |
| 211.00 | N | N | S | S | S | S | N | N | N | N | N | S | S | S | S | N | N |
| 211.25 | N | N | S | S | S | S | O | N | N | N | N | S | S | S | S | N | N |
| 211.50 | N | N | S | S | S | S | S | N | N | N | N | S | S | S | S | O | N |
| 211.75 | N | N | S | S | S | S | S | N | N | N | N | S | S | S | S | S | N |
| 212.00 | N | N | S | S | S | S | S | N | N | N | N | S | S | S | S | S | N |
| 212.25 | N | N | O | S | S | S | S | N | N | N | N | S | S | S | S | S | N |
| 212.50 | N | N | N | S | S | S | S | N | N | N | N | O | S | S | S | S | N |
| 212.75 | N | N | N | S | S | S | S | N | N | N | N | N | S | S | S | S | N |
| 213.00 | N | N | N | S | S | S | S | N | N | N | N | N | S | S | S | S | N |
| 213.25 | N | N | N | S | S | S | S | N | N | N | N | N | S | S | S | S | N |
| 213.50 | N | N | N | S | S | S | S | O | N | N | N | N | S | S | S | S | N |
| 213.75 | N | N | N | S | S | S | S | S | N | N | N | N | S | S | S | S | O |
| 214.00 | N | N | N | S | S | S | S | S | N | N | N | N | S | S | S | S | S |
| 214.25 | N | N | N | S | S | S | S | S | N | N | N | N | S | S | S | S | S |
| 214.50 | N | N | N | O | S | S | S | S | N | N | N | N | S | S | S | S | S |
| 214.75 | N | N | N | N | S | S | S | S | N | N | N | N | O | S | S | S | S |

-continued

Coil Excitation

| | | | | | | | | | | | | | | | | | |
|---|---|---|---|---|---|---|---|---|---|---|---|---|---|---|---|---|---|
| 215.00 | N | N | N | N | S | S | S | S | N | N | N | N | N | S | S | S | S |
| 215.25 | N | N | N | N | S | S | S | S | N | N | N | N | N | S | S | S | S |
| 215.50 | N | N | N | N | S | S | S | S | N | N | N | N | N | S | S | S | S |
| 215.75 | N | N | N | N | S | S | S | S | O | N | N | N | N | S | S | S | S |

Page Row 18, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 204.00 | S | S | S | S | N | N | N | N | O | S | S | S | S | N | N | N | N |
| 204.25 | S | S | S | S | N | N | N | N | N | S | S | S | S | N | N | N | N |
| 204.50 | S | S | S | S | N | N | N | N | N | S | S | S | S | N | N | N | N |
| 204.75 | S | S | S | S | N | N | N | N | N | S | S | S | S | N | N | N | N |
| 205.00 | S | S | S | S | O | N | N | N | N | S | S | S | S | N | N | N | N |
| 205.25 | S | S | S | S | S | N | N | N | N | S | S | S | S | O | N | N | N |
| 205.50 | S | S | S | S | S | N | N | N | N | S | S | S | S | S | N | N | N |
| 205.75 | S | S | S | S | S | N | N | N | N | S | S | S | S | S | N | N | N |
| 206.00 | O | S | S | S | S | N | N | N | N | S | S | S | S | S | N | N | N |
| 206.25 | N | S | S | S | S | N | N | N | N | O | S | S | S | S | N | N | N |
| 206.50 | N | S | S | S | S | N | N | N | N | N | S | S | S | S | N | N | N |
| 206.75 | N | S | S | S | S | N | N | N | N | N | S | S | S | S | N | N | N |
| 207.00 | N | S | S | S | S | N | N | N | N | N | S | S | S | S | N | N | N |
| 207.25 | N | S | S | S | S | O | N | N | N | N | S | S | S | S | N | N | N |
| 207.50 | N | S | S | S | S | S | N | N | N | N | S | S | S | S | O | N | N |
| 207.75 | N | S | S | S | S | S | N | N | N | N | S | S | S | S | S | N | N |
| 208.00 | N | S | S | S | S | S | N | N | N | N | S | S | S | S | S | N | N |
| 208.25 | N | O | S | S | S | S | N | N | N | N | S | S | S | S | S | N | N |
| 208.50 | N | N | S | S | S | S | N | N | N | N | O | S | S | S | S | N | N |
| 208.75 | N | N | S | S | S | S | N | N | N | N | N | S | S | S | S | N | N |
| 209.00 | N | N | S | S | S | S | N | N | N | N | N | S | S | S | S | N | N |
| 209.25 | N | N | S | S | S | S | N | N | N | N | N | S | S | S | S | N | N |
| 209.50 | N | N | S | S | S | S | O | N | N | N | N | S | S | S | S | N | N |
| 209.75 | N | N | S | S | S | S | S | N | N | N | N | S | S | S | S | O | N |
| 210.00 | N | N | S | S | S | S | S | N | N | N | N | S | S | S | S | S | N |
| 210.25 | N | N | S | S | S | S | S | N | N | N | N | S | S | S | S | S | N |
| 210.50 | N | N | O | S | S | S | S | N | N | N | N | S | S | S | S | S | N |
| 210.75 | N | N | N | S | S | S | S | N | N | N | N | O | S | S | S | S | N |
| 211.00 | N | N | N | S | S | S | S | N | N | N | N | N | S | S | S | S | N |
| 211.25 | N | N | N | S | S | S | S | N | N | N | N | N | S | S | S | S | N |
| 211.50 | N | N | N | S | S | S | S | N | N | N | N | N | S | S | S | S | N |
| 211.75 | N | N | N | S | S | S | S | O | N | N | N | N | S | S | S | S | N |
| 212.00 | N | N | N | S | S | S | S | S | N | N | N | N | S | S | S | S | O |
| 212.25 | N | N | N | S | S | S | S | S | N | N | N | N | S | S | S | S | S |
| 212.50 | N | N | N | S | S | S | S | S | N | N | N | N | S | S | S | S | S |
| 212.75 | N | N | N | O | S | S | S | S | N | N | N | N | S | S | S | S | S |
| 213.00 | N | N | N | N | S | S | S | S | N | N | N | N | O | S | S | S | S |
| 213.25 | N | N | N | N | S | S | S | S | N | N | N | N | N | S | S | S | S |
| 213.50 | N | N | N | N | S | S | S | S | N | N | N | N | N | S | S | S | S |
| 213.75 | N | N | N | N | S | S | S | S | N | N | N | N | N | S | S | S | S |
| 214.00 | N | N | N | N | S | S | S | S | O | N | N | N | N | S | S | S | S |
| 214.25 | N | N | N | N | S | S | S | S | S | N | N | N | N | S | S | S | S |
| 214.50 | N | N | N | N | S | S | S | S | S | N | N | N | N | S | S | S | S |
| 214.75 | N | N | N | N | S | S | S | S | S | N | N | N | N | S | S | S | S |
| 215.00 | N | N | N | N | O | S | S | S | S | N | N | N | N | S | S | S | S |
| 215.25 | N | N | N | N | N | S | S | S | S | N | N | N | N | O | S | S | S |
| 215.50 | N | N | N | N | N | S | S | S | S | N | N | N | N | N | S | S | S |
| 215.75 | N | N | N | N | N | S | S | S | S | N | N | N | N | N | S | S | S |

Page Row 18, Page Column 9

| Coil | 154 | 155 | 156 | 157 | 158 | 159 | 160 |
|---|---|---|---|---|---|---|---|
| 204.00 | S | S | S | S | S | N | N |
| 204.25 | O | S | S | S | S | N | N |
| 204.50 | N | S | S | S | S | N | N |
| 204.75 | N | S | S | S | S | N | N |
| 205.00 | N | S | S | S | S | N | N |
| 205.25 | N | S | S | S | S | N | N |
| 205.50 | N | S | S | S | S | O | N |
| 205.75 | N | S | S | S | S | S | N |
| 206.00 | N | S | S | S | S | S | N |
| 206.25 | N | S | S | S | S | S | N |
| 206.50 | N | O | S | S | S | S | N |
| 206.75 | N | N | S | S | S | S | N |
| 207.00 | N | N | S | S | S | S | N |
| 207.25 | N | N | S | S | S | S | N |
| 207.50 | N | N | S | S | S | S | N |
| 207.75 | N | N | S | S | S | S | O |
| 208.00 | N | N | S | S | S | S | S |

-continued

| Coil Excitation | | | | | | | |
|---|---|---|---|---|---|---|---|
| 208.25 | N | N | S | S | S | S | S |
| 208.50 | N | N | S | S | S | S | S |
| 208.75 | N | N | O | S | S | S | S |
| 209.00 | N | N | N | S | S | S | S |
| 209.25 | N | N | N | S | S | S | S |
| 209.50 | N | N | N | S | S | S | S |
| 209.75 | N | N | N | S | S | S | S |
| 210.00 | N | N | N | S | S | S | S |
| 210.25 | N | N | N | S | S | S | S |
| 210.50 | N | N | N | S | S | S | S |
| 210.75 | N | N | N | S | S | S | S |
| 211.00 | N | N | N | O | S | S | S |
| 211.25 | N | N | N | N | S | S | S |
| 211.50 | N | N | N | N | S | S | S |
| 211.75 | N | N | N | N | S | S | S |
| 212.00 | N | N | N | N | S | S | S |
| 212.25 | N | N | N | N | S | S | S |
| 212.50 | N | N | N | N | S | S | S |
| 212.75 | N | N | N | N | S | S | S |
| 213.00 | N | N | N | N | S | S | S |
| 213.25 | N | N | N | N | O | S | S |
| 213.50 | N | N | N | N | N | S | S |
| 213.75 | N | N | N | N | N | S | S |
| 214.00 | N | N | N | N | N | S | S |
| 214.25 | O | N | N | N | N | S | S |
| 214.50 | S | N | N | N | N | S | S |
| 214.75 | S | N | N | N | N | S | S |
| 215.00 | S | N | N | N | N | S | S |
| 215.25 | S | N | N | N | N | S | S |
| 215.50 | S | N | N | N | N | O | S |
| 215.75 | S | N | N | N | N | N | S |

Page Row 18, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 216.00 | S | S | S | N | N | N | N | N | S | S | S | S | N | N | N | N | O |
| 216.25 | S | S | S | N | N | N | N | N | S | S | S | S | N | N | N | N | N |
| 216.50 | S | S | S | N | N | N | N | N | S | S | S | S | N | N | N | N | N |
| 216.75 | S | S | S | O | N | N | N | N | S | S | S | S | N | N | N | N | N |
| 217.00 | S | S | S | S | N | N | N | N | S | S | S | S | O | N | N | N | N |
| 217.25 | S | S | S | S | N | N | N | N | S | S | S | S | S | N | N | N | N |
| 217.50 | S | S | S | S | N | N | N | N | S | S | S | S | S | N | N | N | N |
| 217.75 | S | S | S | S | N | N | N | N | S | S | S | S | S | N | N | N | N |
| 218.00 | S | S | S | S | N | N | N | N | O | S | S | S | S | N | N | N | N |
| 218.25 | S | S | S | S | N | N | N | N | N | S | S | S | S | N | N | N | N |
| 218.50 | S | S | S | S | N | N | N | N | N | S | S | S | S | N | N | N | N |
| 218.75 | S | S | S | S | N | N | N | N | N | S | S | S | S | N | N | N | N |
| 219.00 | S | S | S | S | O | N | N | N | N | S | S | S | S | N | N | N | N |
| 219.25 | S | S | S | S | S | N | N | N | N | S | S | S | S | O | N | N | N |
| 219.50 | S | S | S | S | S | N | N | N | N | S | S | S | S | S | N | N | N |
| 219.75 | S | S | S | S | S | N | N | N | N | S | S | S | S | S | N | N | N |
| 220.00 | O | S | S | S | S | N | N | N | N | S | S | S | S | S | N | N | N |
| 220.25 | N | S | S | S | S | N | N | N | N | O | S | S | S | S | N | N | N |
| 220.50 | N | S | S | S | S | N | N | N | N | N | S | S | S | S | N | N | N |
| 220.75 | N | S | S | S | S | N | N | N | N | N | S | S | S | S | N | N | N |
| 221.00 | N | S | S | S | S | N | N | N | N | N | S | S | S | S | N | N | N |
| 221.25 | N | S | S | S | S | O | N | N | N | N | S | S | S | S | N | N | N |
| 221.50 | N | S | S | S | S | S | N | N | N | N | S | S | S | S | O | N | N |
| 221.75 | N | S | S | S | S | S | N | N | N | N | S | S | S | S | S | N | N |
| 222.00 | N | S | S | S | S | S | N | N | N | N | S | S | S | S | S | N | N |
| 222.25 | N | O | S | S | S | S | N | N | N | N | S | S | S | S | S | N | N |
| 222.50 | N | N | S | S | S | S | N | N | N | N | O | S | S | S | S | N | N |
| 222.75 | N | N | S | S | S | S | N | N | N | N | N | S | S | S | S | N | N |
| 223.00 | N | N | S | S | S | S | N | N | N | N | N | S | S | S | S | N | N |
| 223.25 | N | N | S | S | S | S | N | N | N | N | N | S | S | S | S | N | N |
| 223.50 | N | N | S | S | S | S | O | N | N | N | N | S | S | S | S | N | N |
| 223.75 | N | N | S | S | S | S | S | N | N | N | N | S | S | S | S | O | N |
| 224.00 | N | N | S | S | S | S | S | N | N | N | N | S | S | S | S | S | N |
| 224.25 | N | N | S | S | S | S | S | N | N | N | N | S | S | S | S | S | N |
| 224.50 | N | N | O | S | S | S | S | N | N | N | N | S | S | S | S | S | N |
| 224.75 | N | N | N | S | S | S | S | N | N | N | N | O | S | S | S | S | N |
| 225.00 | N | N | N | S | S | S | S | N | N | N | N | N | S | S | S | S | N |
| 225.25 | N | N | N | S | S | S | S | N | N | N | N | N | S | S | S | S | N |
| 225.50 | N | N | N | S | S | S | S | N | N | N | N | N | S | S | S | S | N |
| 225.75 | N | N | N | S | S | S | S | O | N | N | N | N | S | S | S | S | N |
| 226.00 | N | N | N | S | S | S | S | S | N | N | N | N | S | S | S | S | O |
| 226.25 | N | N | N | S | S | S | S | S | N | N | N | N | S | S | S | S | S |

-continued

| Coil Excitation | | | | | | | | | | | | | | | | | |
|---|---|---|---|---|---|---|---|---|---|---|---|---|---|---|---|---|---|
| 226.50 | N | N | N | S | S | S | S | S | N | N | N | N | S | S | S | S | S |
| 226.75 | N | N | N | O | S | S | S | S | N | N | N | N | S | S | S | S | S |
| 227.00 | N | N | N | N | S | S | S | S | N | N | N | N | O | S | S | S | S |
| 227.25 | N | N | N | N | S | S | S | S | N | N | N | N | N | S | S | S | S |
| 227.50 | N | N | N | N | S | S | S | S | N | N | N | N | N | S | S | S | S |
| 227.75 | N | N | N | N | S | S | S | S | N | N | N | N | N | S | S | S | S |

Page Row 19, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 216.00 | S | S | S | S | N | N | N | N | S | S | S | S | S | N | N | N | N |
| 216.25 | S | S | S | S | N | N | N | N | O | S | S | S | S | N | N | N | N |
| 216.50 | S | S | S | S | N | N | N | N | N | S | S | S | S | N | N | N | N |
| 216.75 | S | S | S | S | N | N | N | N | N | S | S | S | S | N | N | N | N |
| 217.00 | S | S | S | S | N | N | N | N | N | S | S | S | S | N | N | N | N |
| 217.25 | S | S | S | S | O | N | N | N | N | S | S | S | S | N | N | N | N |
| 217.50 | S | S | S | S | S | N | N | N | N | S | S | S | S | O | N | N | N |
| 217.75 | S | S | S | S | S | N | N | N | N | S | S | S | S | S | N | N | N |
| 218.00 | S | S | S | S | S | N | N | N | N | S | S | S | S | S | N | N | N |
| 218.25 | O | S | S | S | S | N | N | N | N | S | S | S | S | S | N | N | N |
| 218.50 | N | S | S | S | S | N | N | N | N | O | S | S | S | S | N | N | N |
| 218.75 | N | S | S | S | S | N | N | N | N | N | S | S | S | S | N | N | N |
| 219.00 | N | S | S | S | S | N | N | N | N | N | S | S | S | S | N | N | N |
| 219.25 | N | S | S | S | S | N | N | N | N | N | S | S | S | S | N | N | N |
| 219.50 | N | S | S | S | S | O | N | N | N | N | S | S | S | S | N | N | N |
| 219.75 | N | S | S | S | S | S | N | N | N | N | S | S | S | S | O | N | N |
| 220.00 | N | S | S | S | S | S | N | N | N | N | S | S | S | S | S | N | N |
| 220.25 | N | S | S | S | S | S | N | N | N | N | S | S | S | S | S | N | N |
| 220.50 | N | O | S | S | S | S | N | N | N | N | S | S | S | S | S | N | N |
| 220.75 | N | N | S | S | S | S | N | N | N | N | O | S | S | S | S | N | N |
| 221.00 | N | N | S | S | S | S | N | N | N | N | N | S | S | S | S | N | N |
| 221.25 | N | N | S | S | S | S | N | N | N | N | N | S | S | S | S | N | N |
| 221.50 | N | N | S | S | S | S | N | N | N | N | N | S | S | S | S | N | N |
| 221.75 | N | N | S | S | S | S | O | N | N | N | N | S | S | S | S | N | N |
| 222.00 | N | N | S | S | S | S | S | N | N | N | N | S | S | S | S | O | N |
| 222.25 | N | N | S | S | S | S | S | N | N | N | N | S | S | S | S | S | N |
| 222.50 | N | N | S | S | S | S | S | N | N | N | N | S | S | S | S | S | N |
| 222.75 | N | N | O | S | S | S | S | N | N | N | N | S | S | S | S | S | N |
| 223.00 | N | N | N | S | S | S | S | N | N | N | N | O | S | S | S | S | N |
| 223.25 | N | N | N | S | S | S | S | N | N | N | N | N | S | S | S | S | N |
| 223.50 | N | N | N | S | S | S | S | N | N | N | N | N | S | S | S | S | N |
| 223.75 | N | N | N | S | S | S | S | N | N | N | N | N | S | S | S | S | N |
| 224.00 | N | N | N | S | S | S | S | O | N | N | N | N | S | S | S | S | N |
| 224.25 | N | N | N | S | S | S | S | S | N | N | N | N | S | S | S | S | O |
| 224.50 | N | N | N | S | S | S | S | S | N | N | N | N | S | S | S | S | S |
| 224.75 | N | N | N | S | S | S | S | S | N | N | N | N | S | S | S | S | S |
| 225.00 | N | N | N | O | S | S | S | S | N | N | N | N | S | S | S | S | S |
| 225.25 | N | N | N | N | S | S | S | S | N | N | N | N | O | S | S | S | S |
| 225.50 | N | N | N | N | S | S | S | S | N | N | N | N | N | S | S | S | S |
| 225.75 | N | N | N | N | S | S | S | S | N | N | N | N | N | S | S | S | S |
| 226.00 | N | N | N | N | S | S | S | S | N | N | N | N | N | S | S | S | S |
| 226.25 | N | N | N | N | S | S | S | S | O | N | N | N | N | S | S | S | S |
| 226.50 | N | N | N | N | S | S | S | S | S | N | N | N | N | S | S | S | S |
| 226.75 | N | N | N | N | S | S | S | S | S | N | N | N | N | S | S | S | S |
| 227.00 | N | N | N | N | S | S | S | S | S | N | N | N | N | S | S | S | S |
| 227.25 | N | N | N | N | O | S | S | S | S | N | N | N | N | S | S | S | S |
| 227.50 | N | N | N | N | N | S | S | S | S | N | N | N | N | O | S | S | S |
| 227.75 | N | N | N | N | N | S | S | S | S | N | N | N | N | N | S | S | S |

Page Row 19, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 216.00 | S | S | S | S | S | N | N | N | N | S | S | S | S | S | N | N | N |
| 216.25 | S | S | S | S | S | N | N | N | N | S | S | S | S | S | N | N | N |
| 216.50 | O | S | S | S | S | N | N | N | N | S | S | S | S | S | N | N | N |
| 216.75 | N | S | S | S | S | N | N | N | N | O | S | S | S | S | N | N | N |
| 217.00 | N | S | S | S | S | N | N | N | N | N | S | S | S | S | N | N | N |
| 217.25 | N | S | S | S | S | N | N | N | N | N | S | S | S | S | N | N | N |
| 217.50 | N | S | S | S | S | N | N | N | N | N | S | S | S | S | N | N | N |
| 217.75 | N | S | S | S | S | O | N | N | N | N | S | S | S | S | N | N | N |
| 218.00 | N | S | S | S | S | S | N | N | N | N | S | S | S | S | O | N | N |
| 218.25 | N | S | S | S | S | S | N | N | N | N | S | S | S | S | S | N | N |
| 218.50 | N | S | S | S | S | S | N | N | N | N | S | S | S | S | S | N | N |
| 218.75 | N | O | S | S | S | S | N | N | N | N | S | S | S | S | S | N | N |
| 219.00 | N | N | S | S | S | S | N | N | N | N | O | S | S | S | S | N | N |
| 219.25 | N | N | S | S | S | S | N | N | N | N | N | S | S | S | S | N | N |
| 219.50 | N | N | S | S | S | S | N | N | N | N | N | S | S | S | S | N | N |

-continued

Coil Excitation

| | | | | | | | | | | | | | | | | | |
|---|---|---|---|---|---|---|---|---|---|---|---|---|---|---|---|---|---|
| 219.75 | N | N | S | S | S | S | N | N | N | N | N | S | S | S | S | N | N |
| 220.00 | N | N | S | S | S | S | O | N | N | N | N | S | S | S | S | N | N |
| 220.25 | N | N | S | S | S | S | S | N | N | N | N | S | S | S | S | O | N |
| 220.50 | N | N | S | S | S | S | S | N | N | N | N | S | S | S | S | S | N |
| 220.75 | N | N | S | S | S | S | S | N | N | N | N | S | S | S | S | S | N |
| 221.00 | N | N | O | S | S | S | S | N | N | N | N | S | S | S | S | S | N |
| 221.25 | N | N | N | S | S | S | S | N | N | N | N | O | S | S | S | S | N |
| 221.50 | N | N | N | S | S | S | S | N | N | N | N | N | S | S | S | S | N |
| 221.75 | N | N | N | S | S | S | S | N | N | N | N | N | S | S | S | S | N |
| 222.00 | N | N | N | S | S | S | S | N | N | N | N | N | S | S | S | S | N |
| 222.25 | N | N | N | S | S | S | S | O | N | N | N | N | S | S | S | S | N |
| 222.50 | N | N | N | S | S | S | S | S | N | N | N | N | S | S | S | S | O |
| 222.75 | N | N | N | S | S | S | S | S | N | N | N | N | S | S | S | S | S |
| 223.00 | N | N | N | S | S | S | S | S | N | N | N | N | S | S | S | S | S |
| 223.25 | N | N | N | O | S | S | S | S | N | N | N | N | S | S | S | S | S |
| 223.50 | N | N | N | N | S | S | S | S | N | N | N | N | O | S | S | S | S |
| 223.75 | N | N | N | N | S | S | S | S | N | N | N | N | N | S | S | S | S |
| 224.00 | N | N | N | N | S | S | S | S | N | N | N | N | N | S | S | S | S |
| 224.25 | N | N | N | N | S | S | S | S | N | N | N | N | N | S | S | S | S |
| 224.50 | N | N | N | N | S | S | S | S | O | N | N | N | N | S | S | S | S |
| 224.75 | N | N | N | N | S | S | S | S | S | N | N | N | N | S | S | S | S |
| 225.00 | N | N | N | N | S | S | S | S | S | N | N | N | N | S | S | S | S |
| 225.25 | N | N | N | N | S | S | S | S | S | N | N | N | N | S | S | S | S |
| 225.50 | N | N | N | N | O | S | S | S | S | N | N | N | N | S | S | S | S |
| 225.75 | N | N | N | N | N | S | S | S | S | N | N | N | N | O | S | S | S |
| 226.00 | N | N | N | N | N | S | S | S | S | N | N | N | N | N | S | S | S |
| 226.25 | N | N | N | N | N | S | S | S | S | N | N | N | N | N | S | S | S |
| 226.50 | O | N | N | N | N | S | S | S | S | N | N | N | N | N | S | S | S |
| 226.75 | S | N | N | N | N | S | S | S | S | O | N | N | N | N | S | S | S |
| 227.00 | S | N | N | N | N | S | S | S | S | S | N | N | N | N | S | S | S |
| 227.25 | S | N | N | N | N | S | S | S | S | S | N | N | N | N | S | S | S |
| 227.50 | S | N | N | N | N | S | S | S | S | S | N | N | N | N | S | S | S |
| 227.75 | S | N | N | N | N | O | S | S | S | S | N | N | N | N | S | S | S |

Page Row 19, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 216.00 | N | S | S | S | S | O | N | N | N | N | S | S | S | S | N | N | N |
| 216.25 | N | S | S | S | S | S | N | N | N | N | S | S | S | S | O | N | N |
| 216.50 | N | S | S | S | S | S | N | N | N | N | S | S | S | S | S | N | N |
| 216.75 | N | S | S | S | S | S | N | N | N | N | S | S | S | S | S | N | N |
| 217.00 | N | O | S | S | S | S | N | N | N | N | S | S | S | S | S | N | N |
| 217.25 | N | N | S | S | S | S | N | N | N | N | O | S | S | S | S | N | N |
| 217.50 | N | N | S | S | S | S | N | N | N | N | N | S | S | S | S | N | N |
| 217.75 | N | N | S | S | S | S | N | N | N | N | N | S | S | S | S | N | N |
| 218.00 | N | N | S | S | S | S | N | N | N | N | N | S | S | S | S | N | N |
| 218.25 | N | N | S | S | S | S | O | N | N | N | N | S | S | S | S | N | N |
| 218.50 | N | N | S | S | S | S | S | N | N | N | N | S | S | S | S | O | N |
| 218.75 | N | N | S | S | S | S | S | N | N | N | N | S | S | S | S | S | N |
| 219.00 | N | N | S | S | S | S | S | N | N | N | N | S | S | S | S | S | N |
| 219.25 | N | N | O | S | S | S | S | N | N | N | N | S | S | S | S | S | N |
| 219.50 | N | N | N | S | S | S | S | N | N | N | N | O | S | S | S | S | N |
| 219.75 | N | N | N | S | S | S | S | N | N | N | N | N | S | S | S | S | N |
| 220.00 | N | N | N | S | S | S | S | N | N | N | N | N | S | S | S | S | N |
| 220.25 | N | N | N | S | S | S | S | N | N | N | N | N | S | S | S | S | N |
| 220.50 | N | N | N | S | S | S | S | O | N | N | N | N | S | S | S | S | N |
| 220.75 | N | N | N | S | S | S | S | S | N | N | N | N | S | S | S | S | O |
| 221.00 | N | N | N | S | S | S | S | S | N | N | N | N | S | S | S | S | S |
| 221.25 | N | N | N | S | S | S | S | S | N | N | N | N | S | S | S | S | S |
| 221.50 | N | N | N | O | S | S | S | S | N | N | N | N | S | S | S | S | S |
| 221.75 | N | N | N | N | S | S | S | S | N | N | N | N | O | S | S | S | S |
| 222.00 | N | N | N | N | S | S | S | S | N | N | N | N | N | S | S | S | S |
| 222.25 | N | N | N | N | S | S | S | S | N | N | N | N | N | S | S | S | S |
| 222.50 | N | N | N | N | S | S | S | S | N | N | N | N | N | S | S | S | S |
| 222.75 | N | N | N | N | S | S | S | S | O | N | N | N | N | S | S | S | S |
| 223.00 | N | N | N | N | S | S | S | S | S | N | N | N | N | S | S | S | S |
| 223.25 | N | N | N | N | S | S | S | S | S | N | N | N | N | S | S | S | S |
| 223.50 | N | N | N | N | S | S | S | S | S | N | N | N | N | S | S | S | S |
| 223.75 | N | N | N | N | O | S | S | S | S | N | N | N | N | S | S | S | S |
| 224.00 | N | N | N | N | N | S | S | S | S | N | N | N | N | O | S | S | S |
| 224.25 | N | N | N | N | N | S | S | S | S | N | N | N | N | N | S | S | S |
| 224.50 | N | N | N | N | N | S | S | S | S | N | N | N | N | N | S | S | S |
| 224.75 | O | N | N | N | N | S | S | S | S | N | N | N | N | N | S | S | S |
| 225.00 | S | N | N | N | N | S | S | S | S | O | N | N | N | N | S | S | S |
| 225.25 | S | N | N | N | N | S | S | S | S | S | N | N | N | N | S | S | S |
| 225.50 | S | N | N | N | N | S | S | S | S | S | N | N | N | N | S | S | S |
| 225.75 | S | N | N | N | N | S | S | S | S | S | N | N | N | N | S | S | S |

-continued

Coil Excitation

| | | | | | | | | | | | | | | | | | |
|---|---|---|---|---|---|---|---|---|---|---|---|---|---|---|---|---|---|
| 226.00 | S | N | N | N | N | O | S | S | S | S | N | N | N | N | S | S | S |
| 226.25 | S | N | N | N | N | N | S | S | S | S | N | N | N | N | O | S | S |
| 226.50 | S | N | N | N | N | N | S | S | S | S | N | N | N | N | N | S | S |
| 226.75 | S | N | N | N | N | N | S | S | S | S | N | N | N | N | N | S | S |
| 227.00 | S | O | N | N | N | N | S | S | S | S | N | N | N | N | N | S | S |
| 227.25 | S | S | N | N | N | N | S | S | S | S | O | N | N | N | N | S | S |
| 227.50 | S | S | N | N | N | N | S | S | S | S | S | N | N | N | N | S | S |
| 227.75 | S | S | N | N | N | N | S | S | S | S | S | N | N | N | N | S | S |

Page Row 19, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 216.00 | N | N | S | S | S | S | N | N | N | N | N | S | S | S | S | N | N |
| 216.25 | N | N | S | S | S | S | N | N | N | N | N | S | S | S | S | N | N |
| 216.50 | N | N | S | S | S | S | O | N | N | N | N | S | S | S | S | N | N |
| 216.75 | N | N | S | S | S | S | S | N | N | N | N | S | S | S | S | O | N |
| 217.00 | N | N | S | S | S | S | S | N | N | N | N | S | S | S | S | S | N |
| 217.25 | N | N | S | S | S | S | S | N | N | N | N | S | S | S | S | S | N |
| 217.50 | N | N | O | S | S | S | S | N | N | N | N | S | S | S | S | S | N |
| 217.75 | N | N | N | S | S | S | S | N | N | N | N | O | S | S | S | S | N |
| 218.00 | N | N | N | S | S | S | S | N | N | N | N | N | S | S | S | S | N |
| 218.25 | N | N | N | S | S | S | S | N | N | N | N | N | S | S | S | S | N |
| 218.50 | N | N | N | S | S | S | S | N | N | N | N | N | S | S | S | S | N |
| 218.75 | N | N | N | S | S | S | S | O | N | N | N | N | S | S | S | S | N |
| 219.00 | N | N | N | S | S | S | S | S | N | N | N | N | S | S | S | S | O |
| 219.25 | N | N | N | S | S | S | S | S | N | N | N | N | S | S | S | S | S |
| 219.50 | N | N | N | S | S | S | S | S | N | N | N | N | S | S | S | S | S |
| 219.75 | N | N | N | O | S | S | S | S | N | N | N | N | S | S | S | S | S |
| 220.00 | N | N | N | N | S | S | S | S | N | N | N | N | O | S | S | S | S |
| 220.25 | N | N | N | N | S | S | S | S | N | N | N | N | N | S | S | S | S |
| 220.50 | N | N | N | N | S | S | S | S | N | N | N | N | N | S | S | S | S |
| 220.75 | N | N | N | N | S | S | S | S | N | N | N | N | N | S | S | S | S |
| 221.00 | N | N | N | N | S | S | S | S | O | N | N | N | N | S | S | S | S |
| 221.25 | N | N | N | N | S | S | S | S | S | N | N | N | N | S | S | S | S |
| 221.50 | N | N | N | N | S | S | S | S | S | N | N | N | N | S | S | S | S |
| 221.75 | N | N | N | N | S | S | S | S | S | N | N | N | N | S | S | S | S |
| 222.00 | N | N | N | N | O | S | S | S | S | N | N | N | N | S | S | S | S |
| 222.25 | N | N | N | N | N | S | S | S | S | N | N | N | N | O | S | S | S |
| 222.50 | N | N | N | N | N | S | S | S | S | N | N | N | N | N | S | S | S |
| 222.75 | N | N | N | N | N | S | S | S | S | N | N | N | N | N | S | S | S |
| 223.00 | O | N | N | N | N | S | S | S | S | N | N | N | N | N | S | S | S |
| 223.25 | S | N | N | N | N | S | S | S | S | O | N | N | N | N | S | S | S |
| 223.50 | S | N | N | N | N | S | S | S | S | S | N | N | N | N | S | S | S |
| 223.75 | S | N | N | N | N | S | S | S | S | S | N | N | N | N | S | S | S |
| 224.00 | S | N | N | N | N | S | S | S | S | S | N | N | N | N | S | S | S |
| 224.25 | S | N | N | N | N | O | S | S | S | S | N | N | N | N | S | S | S |
| 224.50 | S | N | N | N | N | N | S | S | S | S | N | N | N | N | O | S | S |
| 224.75 | S | N | N | N | N | N | S | S | S | S | N | N | N | N | N | S | S |
| 225.00 | S | N | N | N | N | N | S | S | S | S | N | N | N | N | N | S | S |
| 225.25 | S | O | N | N | N | N | S | S | S | S | N | N | N | N | N | S | S |
| 225.50 | S | S | N | N | N | N | S | S | S | S | O | N | N | N | N | S | S |
| 225.75 | S | S | N | N | N | N | S | S | S | S | S | N | N | N | N | S | S |
| 226.00 | S | S | N | N | N | N | S | S | S | S | S | N | N | N | N | S | S |
| 226.25 | S | S | N | N | N | N | S | S | S | S | S | N | N | N | N | S | S |
| 226.50 | S | S | N | N | N | N | O | S | S | S | S | N | N | N | N | S | S |
| 226.75 | S | S | N | N | N | N | N | S | S | S | S | N | N | N | N | O | S |
| 227.00 | S | S | N | N | N | N | N | S | S | S | S | N | N | N | N | N | S |
| 227.25 | S | S | N | N | N | N | N | S | S | S | S | N | N | N | N | N | S |
| 227.50 | S | S | O | N | N | N | N | S | S | S | S | N | N | N | N | N | S |
| 227.75 | S | S | S | N | N | N | N | S | S | S | S | O | N | N | N | N | S |

Page Row 19, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 216.00 | N | N | N | S | S | S | S | N | N | N | N | O | S | S | S | S | N |
| 216.25 | N | N | N | S | S | S | S | N | N | N | N | N | S | S | S | S | N |
| 216.50 | N | N | N | S | S | S | S | N | N | N | N | N | S | S | S | S | N |
| 216.75 | N | N | N | S | S | S | S | N | N | N | N | N | S | S | S | S | N |
| 217.00 | N | N | N | S | S | S | S | O | N | N | N | N | S | S | S | S | N |
| 217.25 | N | N | N | S | S | S | S | S | N | N | N | N | S | S | S | S | O |
| 217.50 | N | N | N | S | S | S | S | S | N | N | N | N | S | S | S | S | S |
| 217.75 | N | N | N | S | S | S | S | S | N | N | N | N | S | S | S | S | S |
| 218.00 | N | N | N | O | S | S | S | S | N | N | N | N | S | S | S | S | S |
| 218.25 | N | N | N | N | S | S | S | S | N | N | N | N | O | S | S | S | S |
| 218.50 | N | N | N | N | S | S | S | S | N | N | N | N | N | S | S | S | S |
| 218.75 | N | N | N | N | S | S | S | S | N | N | N | N | N | S | S | S | S |
| 219.00 | N | N | N | N | S | S | S | S | N | N | N | N | N | S | S | S | S |

-continued

| Coil Excitation | | | | | | | | | | | | | | | | | |
|---|---|---|---|---|---|---|---|---|---|---|---|---|---|---|---|---|---|
| 219.25 | N | N | N | N | S | S | S | S | O | N | N | N | N | S | S | S | S |
| 219.50 | N | N | N | N | S | S | S | S | S | N | N | N | N | S | S | S | S |
| 219.75 | N | N | N | N | S | S | S | S | S | N | N | N | N | S | S | S | S |
| 220.00 | N | N | N | N | S | S | S | S | S | N | N | N | N | S | S | S | S |
| 220.25 | N | N | N | N | O | S | S | S | S | N | N | N | N | S | S | S | S |
| 220.50 | N | N | N | N | N | S | S | S | S | N | N | N | N | O | S | S | S |
| 220.75 | N | N | N | N | N | S | S | S | S | N | N | N | N | N | S | S | S |
| 221.00 | N | N | N | N | N | S | S | S | S | N | N | N | N | N | S | S | S |
| 221.25 | O | N | N | N | N | S | S | S | S | N | N | N | N | N | S | S | S |
| 221.50 | S | N | N | N | N | S | S | S | S | O | N | N | N | N | S | S | S |
| 221.75 | S | N | N | N | N | S | S | S | S | S | N | N | N | N | S | S | S |
| 222.00 | S | N | N | N | N | S | S | S | S | S | N | N | N | N | S | S | S |
| 222.25 | S | N | N | N | N | S | S | S | S | S | N | N | N | N | S | S | S |
| 222.50 | S | N | N | N | N | O | S | S | S | S | N | N | N | N | S | S | S |
| 222.75 | S | N | N | N | N | N | S | S | S | S | N | N | N | N | O | S | S |
| 223.00 | S | N | N | N | N | N | S | S | S | S | N | N | N | N | N | S | S |
| 223.25 | S | N | N | N | N | N | S | S | S | S | N | N | N | N | N | S | S |
| 223.50 | S | O | N | N | N | N | S | S | S | S | N | N | N | N | N | S | S |
| 223.75 | S | S | N | N | N | N | S | S | S | S | O | N | N | N | N | S | S |
| 224.00 | S | S | N | N | N | N | S | S | S | S | S | N | N | N | N | S | S |
| 224.25 | S | S | N | N | N | N | S | S | S | S | S | N | N | N | N | S | S |
| 224.50 | S | S | N | N | N | N | S | S | S | S | S | N | N | N | N | S | S |
| 224.75 | S | S | N | N | N | N | O | S | S | S | S | N | N | N | N | S | S |
| 225.00 | S | S | N | N | N | N | N | S | S | S | S | N | N | N | N | O | S |
| 225.25 | S | S | N | N | N | N | N | S | S | S | S | N | N | N | N | N | S |
| 225.50 | S | S | N | N | N | N | N | S | S | S | S | N | N | N | N | N | S |
| 225.75 | S | S | O | N | N | N | N | S | S | S | S | N | N | N | N | N | S |
| 226.00 | S | S | S | N | N | N | N | S | S | S | S | O | N | N | N | N | S |
| 226.25 | S | S | S | N | N | N | N | S | S | S | S | S | N | N | N | N | S |
| 226.50 | S | S | S | N | N | N | N | S | S | S | S | S | N | N | N | N | S |
| 226.75 | S | S | S | N | N | N | N | S | S | S | S | S | N | N | N | N | S |
| 227.00 | S | S | S | N | N | N | N | O | S | S | S | S | N | N | N | N | S |
| 227.25 | S | S | S | N | N | N | N | N | S | S | S | S | N | N | N | N | O |
| 227.50 | S | S | S | N | N | N | N | N | S | S | S | S | N | N | N | N | N |
| 227.75 | S | S | S | N | N | N | N | N | S | S | S | S | N | N | N | N | N |

Page Row 19, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 216.00 | N | N | N | S | S | S | S | S | N | N | N | N | S | S | S | S | S |
| 216.25 | N | N | N | O | S | S | S | S | N | N | N | N | S | S | S | S | S |
| 216.50 | N | N | N | N | S | S | S | S | N | N | N | N | O | S | S | S | S |
| 216.75 | N | N | N | N | S | S | S | S | N | N | N | N | N | S | S | S | S |
| 217.00 | N | N | N | N | S | S | S | S | N | N | N | N | N | S | S | S | S |
| 217.25 | N | N | N | N | S | S | S | S | N | N | N | N | N | S | S | S | S |
| 217.50 | N | N | N | N | S | S | S | S | O | N | N | N | N | S | S | S | S |
| 217.75 | N | N | N | N | S | S | S | S | S | N | N | N | N | S | S | S | S |
| 218.00 | N | N | N | N | S | S | S | S | S | N | N | N | N | S | S | S | S |
| 218.25 | N | N | N | N | S | S | S | S | S | N | N | N | N | S | S | S | S |
| 218.50 | N | N | N | N | O | S | S | S | S | N | N | N | N | S | S | S | S |
| 218.75 | N | N | N | N | N | S | S | S | S | N | N | N | N | O | S | S | S |
| 219.00 | N | N | N | N | N | S | S | S | S | N | N | N | N | N | S | S | S |
| 219.25 | N | N | N | N | N | S | S | S | S | N | N | N | N | N | S | S | S |
| 219.50 | O | N | N | N | N | S | S | S | S | N | N | N | N | N | S | S | S |
| 219.75 | S | N | N | N | N | S | S | S | S | O | N | N | N | N | S | S | S |
| 220.00 | S | N | N | N | N | S | S | S | S | S | N | N | N | N | S | S | S |
| 220.25 | S | N | N | N | N | S | S | S | S | S | N | N | N | N | S | S | S |
| 220.50 | S | N | N | N | N | S | S | S | S | S | N | N | N | N | S | S | S |
| 220.75 | S | N | N | N | N | O | S | S | S | S | N | N | N | N | S | S | S |
| 221.00 | S | N | N | N | N | N | S | S | S | S | N | N | N | N | O | S | S |
| 221.25 | S | N | N | N | N | N | S | S | S | S | N | N | N | N | N | S | S |
| 221.50 | S | N | N | N | N | N | S | S | S | S | N | N | N | N | N | S | S |
| 221.75 | S | O | N | N | N | N | S | S | S | S | N | N | N | N | N | S | S |
| 222.00 | S | S | N | N | N | N | S | S | S | S | O | N | N | N | N | S | S |
| 222.25 | S | S | N | N | N | N | S | S | S | S | S | N | N | N | N | S | S |
| 222.50 | S | S | N | N | N | N | S | S | S | S | S | N | N | N | N | S | S |
| 222.75 | S | S | N | N | N | N | S | S | S | S | S | N | N | N | N | S | S |
| 223.00 | S | S | N | N | N | N | O | S | S | S | S | N | N | N | N | S | S |
| 223.25 | S | S | N | N | N | N | N | S | S | S | S | N | N | N | N | O | S |
| 223.50 | S | S | N | N | N | N | N | S | S | S | S | N | N | N | N | N | S |
| 223.75 | S | S | N | N | N | N | N | S | S | S | S | N | N | N | N | N | S |
| 224.00 | S | S | O | N | N | N | N | S | S | S | S | N | N | N | N | N | S |
| 224.25 | S | S | S | N | N | N | N | S | S | S | S | O | N | N | N | N | S |
| 224.50 | S | S | S | N | N | N | N | S | S | S | S | S | N | N | N | N | S |
| 224.75 | S | S | S | N | N | N | N | S | S | S | S | S | N | N | N | N | S |
| 225.00 | S | S | S | N | N | N | N | S | S | S | S | S | N | N | N | N | S |
| 225.25 | S | S | S | N | N | N | N | O | S | S | S | S | N | N | N | N | S |

-continued

Coil Excitation

| | | | | | | | | | | | | | | | | |
|---|---|---|---|---|---|---|---|---|---|---|---|---|---|---|---|---|
| 225.50 | S | S | S | N | N | N | N | N | S | S | S | S | N | N | N | N | O |
| 225.75 | S | S | S | N | N | N | N | N | S | S | S | S | N | N | N | N | N |
| 226.00 | S | S | S | N | N | N | N | N | S | S | S | S | N | N | N | N | N |
| 226.25 | S | S | S | O | N | N | N | N | S | S | S | S | N | N | N | N | N |
| 226.50 | S | S | S | S | N | N | N | N | S | S | S | S | O | N | N | N | N |
| 226.75 | S | S | S | S | N | N | N | N | S | S | S | S | S | N | N | N | N |
| 227.00 | S | S | S | S | N | N | N | N | S | S | S | S | S | N | N | N | N |
| 227.25 | S | S | S | S | N | N | N | N | S | S | S | S | S | N | N | N | N |
| 227.50 | S | S | S | S | N | N | N | N | O | S | S | S | S | N | N | N | N |
| 227.75 | S | S | S | S | N | N | N | N | N | S | S | S | S | N | N | N | N |

Page Row 19, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 216.00 | N | N | N | N | S | S | S | S | S | N | N | N | N | S | S | S | S |
| 216.25 | N | N | N | N | S | S | S | S | S | N | N | N | N | S | S | S | S |
| 216.50 | N | N | N | N | S | S | S | S | S | N | N | N | N | S | S | S | S |
| 216.75 | N | N | N | N | O | S | S | S | S | N | N | N | N | S | S | S | S |
| 217.00 | N | N | N | N | N | S | S | S | S | N | N | N | N | O | S | S | S |
| 217.25 | N | N | N | N | N | S | S | S | S | N | N | N | N | N | S | S | S |
| 217.50 | N | N | N | N | N | S | S | S | S | N | N | N | N | N | S | S | S |
| 217.75 | O | N | N | N | N | S | S | S | S | N | N | N | N | N | S | S | S |
| 218.00 | S | N | N | N | N | S | S | S | S | O | N | N | N | N | S | S | S |
| 218.25 | S | N | N | N | N | S | S | S | S | S | N | N | N | N | S | S | S |
| 218.50 | S | N | N | N | N | S | S | S | S | S | N | N | N | N | S | S | S |
| 218.75 | S | N | N | N | N | S | S | S | S | S | N | N | N | N | S | S | S |
| 219.00 | S | N | N | N | N | O | S | S | S | S | N | N | N | N | S | S | S |
| 219.25 | S | N | N | N | N | N | S | S | S | S | N | N | N | N | O | S | S |
| 219.50 | S | N | N | N | N | N | S | S | S | S | N | N | N | N | N | S | S |
| 219.75 | S | N | N | N | N | N | S | S | S | S | N | N | N | N | N | S | S |
| 220.00 | S | O | N | N | N | N | S | S | S | S | N | N | N | N | N | S | S |
| 220.25 | S | S | N | N | N | N | S | S | S | S | O | N | N | N | N | S | S |
| 220.50 | S | S | N | N | N | N | S | S | S | S | S | N | N | N | N | S | S |
| 220.75 | S | S | N | N | N | N | S | S | S | S | S | N | N | N | N | S | S |
| 221.00 | S | S | N | N | N | N | S | S | S | S | S | N | N | N | N | S | S |
| 221.25 | S | S | N | N | N | N | O | S | S | S | S | N | N | N | N | S | S |
| 221.50 | S | S | N | N | N | N | N | S | S | S | S | N | N | N | N | O | S |
| 221.75 | S | S | N | N | N | N | N | S | S | S | S | N | N | N | N | N | S |
| 222.00 | S | S | N | N | N | N | N | S | S | S | S | N | N | N | N | N | S |
| 222.25 | S | S | O | N | N | N | N | S | S | S | S | N | N | N | N | N | S |
| 222.50 | S | S | S | N | N | N | N | S | S | S | S | O | N | N | N | N | S |
| 222.75 | S | S | S | N | N | N | N | S | S | S | S | S | N | N | N | N | S |
| 223.00 | S | S | S | N | N | N | N | S | S | S | S | S | N | N | N | N | S |
| 223.25 | S | S | S | N | N | N | N | S | S | S | S | S | N | N | N | N | S |
| 223.50 | S | S | S | N | N | N | N | O | S | S | S | S | N | N | N | N | S |
| 223.75 | S | S | S | N | N | N | N | N | S | S | S | S | N | N | N | N | O |
| 224.00 | S | S | S | N | N | N | N | N | S | S | S | S | N | N | N | N | N |
| 224.25 | S | S | S | N | N | N | N | N | S | S | S | S | N | N | N | N | N |
| 224.50 | S | S | S | O | N | N | N | N | S | S | S | S | N | N | N | N | N |
| 224.75 | S | S | S | S | N | N | N | N | S | S | S | S | O | N | N | N | N |
| 225.00 | S | S | S | S | N | N | N | N | S | S | S | S | S | N | N | N | N |
| 225.25 | S | S | S | S | N | N | N | N | S | S | S | S | S | N | N | N | N |
| 225.50 | S | S | S | S | N | N | N | N | S | S | S | S | S | N | N | N | N |
| 225.75 | S | S | S | S | N | N | N | N | O | S | S | S | S | N | N | N | N |
| 226.00 | S | S | S | S | N | N | N | N | N | S | S | S | S | N | N | N | N |
| 226.25 | S | S | S | S | N | N | N | N | N | S | S | S | S | N | N | N | N |
| 226.50 | S | S | S | S | N | N | N | N | N | S | S | S | S | N | N | N | N |
| 226.75 | S | S | S | S | O | N | N | N | N | S | S | S | S | N | N | N | N |
| 227.00 | S | S | S | S | S | N | N | N | N | S | S | S | S | O | N | N | N |
| 227.25 | S | S | S | S | S | N | N | N | N | S | S | S | S | S | N | N | N |
| 227.50 | S | S | S | S | S | N | N | N | N | S | S | S | S | S | N | N | N |
| 227.75 | O | S | S | S | S | N | N | N | N | S | S | S | S | S | N | N | N |

Page Row 19, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 216.00 | O | N | N | N | N | S | S | S | S | N | N | N | N | N | S | S | S |
| 216.25 | S | N | N | N | N | S | S | S | S | O | N | N | N | N | S | S | S |
| 216.50 | S | N | N | N | N | S | S | S | S | S | N | N | N | N | S | S | S |
| 216.75 | S | N | N | N | N | S | S | S | S | S | N | N | N | N | S | S | S |
| 217.00 | S | N | N | N | N | S | S | S | S | S | N | N | N | N | S | S | S |
| 217.25 | S | N | N | N | N | O | S | S | S | S | N | N | N | N | S | S | S |
| 217.50 | S | N | N | N | N | N | S | S | S | S | N | N | N | N | O | S | S |
| 217.75 | S | N | N | N | N | N | S | S | S | S | N | N | N | N | N | S | S |
| 218.00 | S | N | N | N | N | N | S | S | S | S | N | N | N | N | N | S | S |
| 218.25 | S | O | N | N | N | N | S | S | S | S | N | N | N | N | N | S | S |
| 218.50 | S | S | N | N | N | N | S | S | S | S | O | N | N | N | N | S | S |

-continued

| Coil Excitation | | | | | | | | | | | | | | | | | |
|---|---|---|---|---|---|---|---|---|---|---|---|---|---|---|---|---|---|
| 218.75 | S | S | N | N | N | N | S | S | S | S | S | N | N | N | N | S | S |
| 219.00 | S | S | N | N | N | N | S | S | S | S | S | N | N | N | N | S | S |
| 219.25 | S | S | N | N | N | N | S | S | S | S | S | N | N | N | N | S | S |
| 219.50 | S | S | N | N | N | N | O | S | S | S | S | N | N | N | N | S | S |
| 219.75 | S | S | N | N | N | N | N | S | S | S | S | N | N | N | N | O | S |
| 220.00 | S | S | N | N | N | N | N | S | S | S | S | N | N | N | N | N | S |
| 220.25 | S | S | N | N | N | N | N | S | S | S | S | N | N | N | N | N | S |
| 220.50 | S | S | O | N | N | N | N | S | S | S | S | N | N | N | N | N | S |
| 220.75 | S | S | S | N | N | N | N | S | S | S | S | O | N | N | N | N | S |
| 221.00 | S | S | S | N | N | N | N | S | S | S | S | S | N | N | N | N | S |
| 221.25 | S | S | S | N | N | N | N | S | S | S | S | S | N | N | N | N | S |
| 221.50 | S | S | S | N | N | N | N | S | S | S | S | S | N | N | N | N | S |
| 221.75 | S | S | S | N | N | N | N | O | S | S | S | S | N | N | N | N | S |
| 222.00 | S | S | S | N | N | N | N | N | S | S | S | S | N | N | N | N | O |
| 222.25 | S | S | S | N | N | N | N | N | S | S | S | S | N | N | N | N | N |
| 222.50 | S | S | S | N | N | N | N | N | S | S | S | S | N | N | N | N | N |
| 222.75 | S | S | S | O | N | N | N | N | S | S | S | S | N | N | N | N | N |
| 223.00 | S | S | S | S | N | N | N | N | S | S | S | S | O | N | N | N | N |
| 223.25 | S | S | S | S | N | N | N | N | S | S | S | S | S | N | N | N | N |
| 223.50 | S | S | S | S | N | N | N | N | S | S | S | S | S | N | N | N | N |
| 223.75 | S | S | S | S | N | N | N | N | S | S | S | S | S | N | N | N | N |
| 224.00 | S | S | S | S | N | N | N | N | O | S | S | S | S | N | N | N | N |
| 224.25 | S | S | S | S | N | N | N | N | N | S | S | S | S | N | N | N | N |
| 224.50 | S | S | S | S | N | N | N | N | N | S | S | S | S | N | N | N | N |
| 224.75 | S | S | S | S | N | N | N | N | N | S | S | S | S | N | N | N | N |
| 225.00 | S | S | S | S | O | N | N | N | N | S | S | S | S | N | N | N | N |
| 225.25 | S | S | S | S | S | N | N | N | N | S | S | S | S | O | N | N | N |
| 225.50 | S | S | S | S | S | N | N | N | N | S | S | S | S | S | N | N | N |
| 225.75 | S | S | S | S | S | N | N | N | N | S | S | S | S | S | N | N | N |
| 226.00 | O | S | S | S | S | N | N | N | N | S | S | S | S | S | N | N | N |
| 226.25 | N | S | S | S | S | N | N | N | N | O | S | S | S | S | N | N | N |
| 226.50 | N | S | S | S | S | N | N | N | N | N | S | S | S | S | N | N | N |
| 226.75 | N | S | S | S | S | N | N | N | N | N | S | S | S | S | N | N | N |
| 227.00 | N | S | S | S | S | N | N | N | N | N | S | S | S | S | N | N | N |
| 227.25 | N | S | S | S | S | O | N | N | N | N | S | S | S | S | N | N | N |
| 227.50 | N | S | S | S | S | S | N | N | N | N | S | S | S | S | O | N | N |
| 227.75 | N | S | S | S | S | S | N | N | N | N | S | S | S | S | S | N | N |

Page Row 19, Page Column 9

| Coil | 154 | 155 | 156 | 157 | 158 | 159 | 160 |
|---|---|---|---|---|---|---|---|
| 216.00 | S | N | N | N | N | N | S |
| 216.25 | S | N | N | N | N | N | S |
| 216.50 | S | O | N | N | N | N | S |
| 216.75 | S | S | N | N | N | N | S |
| 217.00 | S | S | N | N | N | N | S |
| 217.25 | S | S | N | N | N | N | S |
| 217.50 | S | S | N | N | N | N | S |
| 217.75 | S | S | N | N | N | N | O |
| 218.00 | S | S | N | N | N | N | N |
| 218.25 | S | S | N | N | N | N | N |
| 218.50 | S | S | N | N | N | N | N |
| 218.75 | S | S | O | N | N | N | N |
| 219.00 | S | S | S | N | N | N | N |
| 219.25 | S | S | S | N | N | N | N |
| 219.50 | S | S | S | N | N | N | N |
| 219.75 | S | S | S | N | N | N | N |
| 220.00 | S | S | S | N | N | N | N |
| 220.25 | S | S | S | N | N | N | N |
| 220.50 | S | S | S | N | N | N | N |
| 220.75 | S | S | S | N | N | N | N |
| 221.00 | S | S | S | O | N | N | N |
| 221.25 | S | S | S | S | N | N | N |
| 221.50 | S | S | S | S | N | N | N |
| 221.75 | S | S | S | S | N | N | N |
| 222.00 | S | S | S | S | N | N | N |
| 222.25 | S | S | S | S | N | N | N |
| 222.50 | S | S | S | S | N | N | N |
| 222.75 | S | S | S | S | N | N | N |
| 223.00 | S | S | S | S | N | N | N |
| 223.25 | S | S | S | S | O | N | N |
| 223.50 | S | S | S | S | S | N | N |
| 223.75 | S | S | S | S | S | N | N |
| 224.00 | S | S | S | S | S | N | N |
| 224.25 | O | S | S | S | S | N | N |
| 224.50 | N | S | S | S | S | N | N |
| 224.75 | N | S | S | S | S | N | N |

-continued

Coil Excitation

| | | | | | | | |
|---|---|---|---|---|---|---|---|
| 225.00 | N | S | S | S | S | N | N |
| 225.25 | N | S | S | S | S | N | N |
| 225.50 | N | S | S | S | S | O | N |
| 225.75 | N | S | S | S | S | S | N |
| 226.00 | N | S | S | S | S | S | N |
| 226.25 | N | S | S | S | S | S | N |
| 226.50 | N | O | S | S | S | S | N |
| 226.75 | N | N | S | S | S | S | N |
| 227.00 | N | N | S | S | S | S | N |
| 227.25 | N | N | S | S | S | S | N |
| 227.50 | N | N | S | S | S | S | N |
| 227.75 | N | N | S | S | S | S | O |

Page Row 19, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 228.00 | N | N | N | N | S | S | S | S | O | N | N | N | N | S | S | S | S |
| 228.25 | N | N | N | N | S | S | S | S | S | N | N | N | N | S | S | S | S |
| 228.50 | N | N | N | N | S | S | S | S | S | N | N | N | N | S | S | S | S |
| 228.75 | N | N | N | N | S | S | S | S | S | N | N | N | N | S | S | S | S |
| 229.00 | N | N | N | N | O | S | S | S | S | N | N | N | N | S | S | S | S |
| 229.25 | N | N | N | N | N | S | S | S | S | N | N | N | N | O | S | S | S |
| 229.50 | N | N | N | N | N | S | S | S | S | N | N | N | N | N | S | S | S |
| 229.75 | N | N | N | N | N | S | S | S | S | N | N | N | N | N | S | S | S |
| 230.00 | O | N | N | N | N | S | S | S | S | N | N | N | N | N | S | S | S |
| 230.25 | S | N | N | N | N | S | S | S | S | O | N | N | N | N | S | S | S |
| 230.50 | S | N | N | N | N | S | S | S | S | S | N | N | N | N | S | S | S |
| 230.75 | S | N | N | N | N | S | S | S | S | S | N | N | N | N | S | S | S |
| 231.00 | S | N | N | N | N | S | S | S | S | S | N | N | N | N | S | S | S |
| 231.25 | S | N | N | N | N | O | S | S | S | S | N | N | N | N | S | S | S |
| 231.50 | S | N | N | N | N | N | S | S | S | S | N | N | N | N | O | S | S |
| 231.75 | S | N | N | N | N | N | S | S | S | S | N | N | N | N | N | S | S |
| 232.00 | S | N | N | N | N | N | S | S | S | S | N | N | N | N | N | S | S |
| 232.25 | S | O | N | N | N | N | S | S | S | S | N | N | N | N | N | S | S |
| 232.50 | S | S | N | N | N | N | S | S | S | S | O | N | N | N | N | S | S |
| 232.75 | S | S | N | N | N | N | S | S | S | S | S | N | N | N | N | S | S |
| 233.00 | S | S | N | N | N | N | S | S | S | S | S | N | N | N | N | S | S |
| 233.25 | S | S | N | N | N | N | S | S | S | S | S | N | N | N | N | S | S |
| 233.50 | S | S | N | N | N | N | O | S | S | S | S | N | N | N | N | S | S |
| 233.75 | S | S | N | N | N | N | N | S | S | S | S | N | N | N | N | O | S |
| 234.00 | S | S | N | N | N | N | N | S | S | S | S | N | N | N | N | N | S |
| 234.25 | S | S | N | N | N | N | N | S | S | S | S | N | N | N | N | N | S |
| 234.50 | S | S | O | N | N | N | N | S | S | S | S | N | N | N | N | N | S |
| 234.75 | S | S | S | N | N | N | N | S | S | S | S | O | N | N | N | N | S |
| 235.00 | S | S | S | N | N | N | N | S | S | S | S | S | N | N | N | N | S |
| 235.25 | S | S | S | N | N | N | N | S | S | S | S | S | N | N | N | N | S |
| 235.50 | S | S | S | N | N | N | N | S | S | S | S | S | N | N | N | N | S |
| 235.75 | S | S | S | N | N | N | N | O | S | S | S | S | N | N | N | N | S |
| 236.00 | S | S | S | N | N | N | N | N | S | S | S | S | N | N | N | N | O |
| 236.25 | S | S | S | N | N | N | N | N | S | S | S | S | N | N | N | N | N |
| 236.50 | S | S | S | N | N | N | N | N | S | S | S | S | N | N | N | N | N |
| 236.75 | S | S | S | O | N | N | N | N | S | S | S | S | N | N | N | N | N |
| 237.00 | S | S | S | S | N | N | N | N | S | S | S | S | O | N | N | N | N |
| 237.25 | S | S | S | S | N | N | N | N | S | S | S | S | S | N | N | N | N |
| 237.50 | S | S | S | S | N | N | N | N | S | S | S | S | S | N | N | N | N |
| 237.75 | S | S | S | S | N | N | N | N | S | S | S | S | S | N | N | N | N |
| 238.00 | S | S | S | S | N | N | N | N | O | S | S | S | S | N | N | N | N |
| 238.25 | S | S | S | S | N | N | N | N | N | S | S | S | S | N | N | N | N |
| 238.50 | S | S | S | S | N | N | N | N | N | S | S | S | S | N | N | N | N |
| 238.75 | S | S | S | S | N | N | N | N | N | S | S | S | S | N | N | N | N |
| 239.00 | S | S | S | S | O | N | N | N | N | S | S | S | S | N | N | N | N |
| 239.25 | S | S | S | S | S | N | N | N | N | S | S | S | S | O | N | N | N |
| 239.50 | S | S | S | S | S | N | N | N | N | S | S | S | S | S | N | N | N |
| 239.75 | S | S | S | S | S | N | N | N | N | S | S | S | S | S | N | N | N |

Page Row 20, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 228.00 | N | N | N | N | N | S | S | S | S | N | N | N | N | N | S | S | S |
| 228.25 | O | N | N | N | N | S | S | S | S | N | N | N | N | N | S | S | S |
| 228.50 | S | N | N | N | N | S | S | S | S | O | N | N | N | N | S | S | S |
| 228.75 | S | N | N | N | N | S | S | S | S | S | N | N | N | N | S | S | S |
| 229.00 | S | N | N | N | N | S | S | S | S | S | N | N | N | N | S | S | S |
| 229.25 | S | N | N | N | N | S | S | S | S | S | N | N | N | N | S | S | S |
| 229.50 | S | N | N | N | N | O | S | S | S | S | N | N | N | N | S | S | S |
| 229.75 | S | N | N | N | N | N | S | S | S | S | N | N | N | N | O | S | S |
| 230.00 | S | N | N | N | N | N | S | S | S | S | N | N | N | N | N | S | S |

-continued

| Coil Excitation | | | | | | | | | | | | | | | | | |
|---|---|---|---|---|---|---|---|---|---|---|---|---|---|---|---|---|---|
| 230.25 | S | N | N | N | N | N | S | S | S | S | N | N | N | N | N | S | S |
| 230.50 | S | O | N | N | N | N | S | S | S | S | N | N | N | N | N | S | S |
| 230.75 | S | S | N | N | N | N | S | S | S | S | O | N | N | N | N | S | S |
| 231.00 | S | S | N | N | N | N | S | S | S | S | S | N | N | N | N | S | S |
| 231.25 | S | S | N | N | N | N | S | S | S | S | S | N | N | N | N | S | S |
| 231.50 | S | S | N | N | N | N | S | S | S | S | S | N | N | N | N | S | S |
| 231.75 | S | S | N | N | N | N | O | S | S | S | S | N | N | N | N | S | S |
| 232.00 | S | S | N | N | N | N | N | S | S | S | S | N | N | N | N | O | S |
| 232.25 | S | S | N | N | N | N | N | S | S | S | S | N | N | N | N | N | S |
| 232.50 | S | S | N | N | N | N | N | S | S | S | S | N | N | N | N | N | S |
| 232.75 | S | S | O | N | N | N | N | S | S | S | S | N | N | N | N | N | S |
| 233.00 | S | S | S | N | N | N | N | S | S | S | S | O | N | N | N | N | S |
| 233.25 | S | S | S | N | N | N | N | S | S | S | S | S | N | N | N | N | S |
| 233.50 | S | S | S | N | N | N | N | S | S | S | S | S | N | N | N | N | S |
| 233.75 | S | S | S | N | N | N | N | S | S | S | S | S | N | N | N | N | S |
| 234.00 | S | S | S | N | N | N | N | O | S | S | S | S | N | N | N | N | S |
| 234.25 | S | S | S | N | N | N | N | N | S | S | S | S | N | N | N | N | O |
| 234.50 | S | S | S | N | N | N | N | N | S | S | S | S | N | N | N | N | N |
| 234.75 | S | S | S | N | N | N | N | N | S | S | S | S | N | N | N | N | N |
| 235.00 | S | S | S | O | N | N | N | N | S | S | S | S | N | N | N | N | N |
| 235.25 | S | S | S | S | N | N | N | N | S | S | S | S | O | N | N | N | N |
| 235.50 | S | S | S | S | N | N | N | N | S | S | S | S | S | N | N | N | N |
| 235.75 | S | S | S | S | N | N | N | N | S | S | S | S | S | N | N | N | N |
| 236.00 | S | S | S | S | N | N | N | N | S | S | S | S | S | N | N | N | N |
| 236.25 | S | S | S | S | N | N | N | N | O | S | S | S | S | N | N | N | N |
| 236.50 | S | S | S | S | N | N | N | N | N | S | S | S | S | N | N | N | N |
| 236.75 | S | S | S | S | N | N | N | N | N | S | S | S | S | N | N | N | N |
| 237.00 | S | S | S | S | N | N | N | N | N | S | S | S | S | N | N | N | N |
| 237.25 | S | S | S | S | O | N | N | N | N | S | S | S | S | N | N | N | N |
| 237.50 | S | S | S | S | S | N | N | N | N | S | S | S | S | O | N | N | N |
| 237.75 | S | S | S | S | S | N | N | N | N | S | S | S | S | S | N | N | N |
| 238.00 | S | S | S | S | S | N | N | N | N | S | S | S | S | S | N | N | N |
| 238.25 | O | S | S | S | S | N | N | N | N | S | S | S | S | S | N | N | N |
| 238.50 | N | S | S | S | S | N | N | N | N | O | S | S | S | S | N | N | N |
| 238.75 | N | S | S | S | S | N | N | N | N | N | S | S | S | S | N | N | N |
| 239.00 | N | S | S | S | S | N | N | N | N | N | S | S | S | S | N | N | N |
| 239.25 | N | S | S | S | S | N | N | N | N | N | S | S | S | S | N | N | N |
| 239.50 | N | S | S | S | S | O | N | N | N | N | S | S | S | S | N | N | N |
| 239.75 | N | S | S | S | S | S | N | N | N | N | S | S | S | S | O | N | N |

Page Row 20, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 228.00 | S | N | N | N | N | N | S | S | S | S | N | N | N | N | O | S | S |
| 228.25 | S | N | N | N | N | N | S | S | S | S | N | N | N | N | N | S | S |
| 228.50 | S | N | N | N | N | N | S | S | S | S | N | N | N | N | N | S | S |
| 228.75 | S | O | N | N | N | N | S | S | S | S | N | N | N | N | N | S | S |
| 229.00 | S | S | N | N | N | N | S | S | S | S | O | N | N | N | N | S | S |
| 229.25 | S | S | N | N | N | N | S | S | S | S | S | N | N | N | N | S | S |
| 229.50 | S | S | N | N | N | N | S | S | S | S | S | N | N | N | N | S | S |
| 229.75 | S | S | N | N | N | N | S | S | S | S | S | N | N | N | N | S | S |
| 230.00 | S | S | N | N | N | N | O | S | S | S | S | N | N | N | N | S | S |
| 230.25 | S | S | N | N | N | N | N | S | S | S | S | N | N | N | N | O | S |
| 230.50 | S | S | N | N | N | N | N | S | S | S | S | N | N | N | N | N | S |
| 230.75 | S | S | N | N | N | N | N | S | S | S | S | N | N | N | N | N | S |
| 231.00 | S | S | O | N | N | N | N | S | S | S | S | N | N | N | N | N | S |
| 231.25 | S | S | S | N | N | N | N | S | S | S | S | O | N | N | N | N | S |
| 231.50 | S | S | S | N | N | N | N | S | S | S | S | S | N | N | N | N | S |
| 231.75 | S | S | S | N | N | N | N | S | S | S | S | S | N | N | N | N | S |
| 232.00 | S | S | S | N | N | N | N | S | S | S | S | S | N | N | N | N | S |
| 232.25 | S | S | S | N | N | N | N | O | S | S | S | S | N | N | N | N | S |
| 232.50 | S | S | S | N | N | N | N | N | S | S | S | S | N | N | N | N | O |
| 232.75 | S | S | S | N | N | N | N | N | S | S | S | S | N | N | N | N | N |
| 233.00 | S | S | S | N | N | N | N | N | S | S | S | S | N | N | N | N | N |
| 233.25 | S | S | S | O | N | N | N | N | S | S | S | S | N | N | N | N | N |
| 233.50 | S | S | S | S | N | N | N | N | S | S | S | S | O | N | N | N | N |
| 233.75 | S | S | S | S | N | N | N | N | S | S | S | S | S | N | N | N | N |
| 234.00 | S | S | S | S | N | N | N | N | S | S | S | S | S | N | N | N | N |
| 234.25 | S | S | S | S | N | N | N | N | S | S | S | S | S | N | N | N | N |
| 234.50 | S | S | S | S | N | N | N | N | O | S | S | S | S | N | N | N | N |
| 234.75 | S | S | S | S | N | N | N | N | N | S | S | S | S | N | N | N | N |
| 235.00 | S | S | S | S | N | N | N | N | N | S | S | S | S | N | N | N | N |
| 235.25 | S | S | S | S | N | N | N | N | N | S | S | S | S | N | N | N | N |
| 235.50 | S | S | S | S | O | N | N | N | N | S | S | S | S | N | N | N | N |
| 235.75 | S | S | S | S | S | N | N | N | N | S | S | S | S | O | N | N | N |
| 236.00 | S | S | S | S | S | N | N | N | N | S | S | S | S | S | N | N | N |
| 236.25 | S | S | S | S | S | N | N | N | N | S | S | S | S | S | N | N | N |

-continued

Coil Excitation

| | | | | | | | | | | | | | | | | | |
|---|---|---|---|---|---|---|---|---|---|---|---|---|---|---|---|---|---|
| 236.50 | O | S | S | S | S | N | N | N | N | S | S | S | S | S | N | N | N |
| 236.75 | N | S | S | S | S | N | N | N | N | O | S | S | S | S | N | N | N |
| 237.00 | N | S | S | S | S | N | N | N | N | N | S | S | S | S | N | N | N |
| 237.25 | N | S | S | S | S | N | N | N | N | N | S | S | S | S | N | N | N |
| 237.50 | N | S | S | S | S | N | N | N | N | N | S | S | S | S | N | N | N |
| 237.75 | N | S | S | S | S | O | N | N | N | N | S | S | S | S | N | N | N |
| 238.00 | N | S | S | S | S | S | N | N | N | N | S | S | S | S | O | N | N |
| 238.25 | N | S | S | S | S | S | N | N | N | N | S | S | S | S | S | N | N |
| 238.50 | N | S | S | S | S | S | N | N | N | N | S | S | S | S | S | N | N |
| 238.75 | N | O | S | S | S | S | N | N | N | N | S | S | S | S | S | N | N |
| 239.00 | N | N | S | S | S | S | N | N | N | N | O | S | S | S | S | N | N |
| 239.25 | N | N | S | S | S | S | N | N | N | N | N | S | S | S | S | N | N |
| 239.50 | N | N | S | S | S | S | N | N | N | N | N | S | S | S | S | N | N |
| 239.75 | N | N | S | S | S | S | N | N | N | N | N | S | S | S | S | N | N |

Page Row 20, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 228.00 | S | S | N | N | N | N | S | S | S | S | S | N | N | N | N | S | S |
| 228.25 | S | S | N | N | N | N | O | S | S | S | S | N | N | N | N | S | S |
| 228.50 | S | S | N | N | N | N | N | S | S | S | S | N | N | N | N | O | S |
| 228.75 | S | S | N | N | N | N | N | S | S | S | S | N | N | N | N | N | S |
| 229.00 | S | S | N | N | N | N | N | S | S | S | S | N | N | N | N | N | S |
| 229.25 | S | S | O | N | N | N | N | S | S | S | S | N | N | N | N | N | S |
| 229.50 | S | S | S | N | N | N | N | S | S | S | S | O | N | N | N | N | S |
| 229.75 | S | S | S | N | N | N | N | S | S | S | S | S | N | N | N | N | S |
| 230.00 | S | S | S | N | N | N | N | S | S | S | S | S | N | N | N | N | S |
| 230.25 | S | S | S | N | N | N | N | S | S | S | S | S | N | N | N | N | S |
| 230.50 | S | S | S | N | N | N | N | O | S | S | S | S | N | N | N | N | S |
| 230.75 | S | S | S | N | N | N | N | N | S | S | S | S | N | N | N | N | O |
| 231.00 | S | S | S | N | N | N | N | N | S | S | S | S | N | N | N | N | N |
| 231.25 | S | S | S | N | N | N | N | N | S | S | S | S | N | N | N | N | N |
| 231.50 | S | S | S | O | N | N | N | N | S | S | S | S | N | N | N | N | N |
| 231.75 | S | S | S | S | N | N | N | N | S | S | S | S | O | N | N | N | N |
| 232.00 | S | S | S | S | N | N | N | N | S | S | S | S | S | N | N | N | N |
| 232.25 | S | S | S | S | N | N | N | N | S | S | S | S | S | N | N | N | N |
| 232.50 | S | S | S | S | N | N | N | N | S | S | S | S | S | N | N | N | N |
| 232.75 | S | S | S | S | N | N | N | N | O | S | S | S | S | N | N | N | N |
| 233.00 | S | S | S | S | N | N | N | N | N | S | S | S | S | N | N | N | N |
| 233.25 | S | S | S | S | N | N | N | N | N | S | S | S | S | N | N | N | N |
| 233.50 | S | S | S | S | N | N | N | N | N | S | S | S | S | N | N | N | N |
| 233.75 | S | S | S | S | O | N | N | N | N | S | S | S | S | N | N | N | N |
| 234.00 | S | S | S | S | S | N | N | N | N | S | S | S | S | O | N | N | N |
| 234.25 | S | S | S | S | S | N | N | N | N | S | S | S | S | S | N | N | N |
| 234.50 | S | S | S | S | S | N | N | N | N | S | S | S | S | S | N | N | N |
| 234.75 | O | S | S | S | S | N | N | N | N | S | S | S | S | S | N | N | N |
| 235.00 | N | S | S | S | S | N | N | N | N | O | S | S | S | S | N | N | N |
| 235.25 | N | S | S | S | S | N | N | N | N | N | S | S | S | S | N | N | N |
| 235.50 | N | S | S | S | S | N | N | N | N | N | S | S | S | S | N | N | N |
| 235.75 | N | S | S | S | S | N | N | N | N | N | S | S | S | S | N | N | N |
| 236.00 | N | S | S | S | S | O | N | N | N | N | S | S | S | S | N | N | N |
| 236.25 | N | S | S | S | S | S | N | N | N | N | S | S | S | S | O | N | N |
| 236.50 | N | S | S | S | S | S | N | N | N | N | S | S | S | S | S | N | N |
| 236.75 | N | S | S | S | S | S | N | N | N | N | S | S | S | S | S | N | N |
| 237.00 | N | O | S | S | S | S | N | N | N | N | S | S | S | S | S | N | N |
| 237.25 | N | N | S | S | S | S | N | N | N | N | O | S | S | S | S | N | N |
| 237.50 | N | N | S | S | S | S | N | N | N | N | N | S | S | S | S | N | N |
| 237.75 | N | N | S | S | S | S | N | N | N | N | N | S | S | S | S | N | N |
| 238.00 | N | N | S | S | S | S | N | N | N | N | N | S | S | S | S | N | N |
| 238.25 | N | N | S | S | S | S | O | N | N | N | N | S | S | S | S | N | N |
| 238.50 | N | N | S | S | S | S | S | N | N | N | N | S | S | S | S | O | N |
| 238.75 | N | N | S | S | S | S | S | N | N | N | N | S | S | S | S | S | N |
| 239.00 | N | N | S | S | S | S | S | N | N | N | N | S | S | S | S | S | N |
| 239.25 | N | N | O | S | S | S | S | N | N | N | N | S | S | S | S | S | N |
| 239.50 | N | N | N | S | S | S | S | N | N | N | N | O | S | S | S | S | N |
| 239.75 | N | N | N | S | S | S | S | N | N | N | N | N | S | S | S | S | N |

Page Row 20, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 228.00 | S | S | S | N | N | N | N | S | S | S | S | S | N | N | N | N | S |
| 228.25 | S | S | S | N | N | N | N | S | S | S | S | S | N | N | N | N | S |
| 228.50 | S | S | S | N | N | N | N | S | S | S | S | S | N | N | N | N | S |
| 228.75 | S | S | S | N | N | N | N | O | S | S | S | S | N | N | N | N | S |
| 229.00 | S | S | S | N | N | N | N | N | S | S | S | S | N | N | N | N | O |
| 229.25 | S | S | S | N | N | N | N | N | S | S | S | S | N | N | N | N | N |
| 229.50 | S | S | S | N | N | N | N | N | S | S | S | S | N | N | N | N | N |

-continued

| Coil Excitation | | | | | | | | | | | | | | | | | |
|---|---|---|---|---|---|---|---|---|---|---|---|---|---|---|---|---|---|
| 229.75 | S | S | S | O | N | N | N | N | S | S | S | S | N | N | N | N | N |
| 230.00 | S | S | S | S | N | N | N | N | S | S | S | S | O | N | N | N | N |
| 230.25 | S | S | S | S | N | N | N | N | S | S | S | S | S | N | N | N | N |
| 230.50 | S | S | S | S | N | N | N | N | S | S | S | S | S | N | N | N | N |
| 230.75 | S | S | S | S | N | N | N | N | S | S | S | S | S | N | N | N | N |
| 231.00 | S | S | S | S | N | N | N | N | O | S | S | S | S | N | N | N | N |
| 231.25 | S | S | S | S | N | N | N | N | N | S | S | S | S | N | N | N | N |
| 231.50 | S | S | S | S | N | N | N | N | N | S | S | S | S | N | N | N | N |
| 231.75 | S | S | S | S | N | N | N | N | N | S | S | S | S | N | N | N | N |
| 232.00 | S | S | S | S | O | N | N | N | N | S | S | S | S | N | N | N | N |
| 232.25 | S | S | S | S | S | N | N | N | N | S | S | S | S | O | N | N | N |
| 232.50 | S | S | S | S | S | N | N | N | N | S | S | S | S | S | N | N | N |
| 232.75 | S | S | S | S | S | N | N | N | N | S | S | S | S | S | N | N | N |
| 233.00 | O | S | S | S | S | N | N | N | N | S | S | S | S | S | N | N | N |
| 233.25 | N | S | S | S | S | N | N | N | N | O | S | S | S | S | N | N | N |
| 233.50 | N | S | S | S | S | N | N | N | N | N | S | S | S | S | N | N | N |
| 233.75 | N | S | S | S | S | N | N | N | N | N | S | S | S | S | N | N | N |
| 234.00 | N | S | S | S | S | N | N | N | N | N | S | S | S | S | N | N | N |
| 234.25 | N | S | S | S | S | O | N | N | N | N | S | S | S | S | N | N | N |
| 234.50 | N | S | S | S | S | S | N | N | N | N | S | S | S | S | O | N | N |
| 234.75 | N | S | S | S | S | S | N | N | N | N | S | S | S | S | S | N | N |
| 235.00 | N | S | S | S | S | S | N | N | N | N | S | S | S | S | S | N | N |
| 235.25 | N | O | S | S | S | S | N | N | N | N | S | S | S | S | S | N | N |
| 235.50 | N | N | S | S | S | S | N | N | N | N | O | S | S | S | S | N | N |
| 235.75 | N | N | S | S | S | S | N | N | N | N | N | S | S | S | S | N | N |
| 236.00 | N | N | S | S | S | S | N | N | N | N | N | S | S | S | S | N | N |
| 236.25 | N | N | S | S | S | S | N | N | N | N | N | S | S | S | S | N | N |
| 236.50 | N | N | S | S | S | S | O | N | N | N | N | S | S | S | S | N | N |
| 236.75 | N | N | S | S | S | S | S | N | N | N | N | S | S | S | S | O | N |
| 237.00 | N | N | S | S | S | S | S | N | N | N | N | S | S | S | S | S | N |
| 237.25 | N | N | S | S | S | S | S | N | N | N | N | S | S | S | S | S | N |
| 237.50 | N | N | O | S | S | S | S | N | N | N | N | S | S | S | S | S | N |
| 237.75 | N | N | N | S | S | S | S | N | N | N | N | O | S | S | S | S | N |
| 238.00 | N | N | N | S | S | S | S | N | N | N | N | N | S | S | S | S | N |
| 238.25 | N | N | N | S | S | S | S | N | N | N | N | N | S | S | S | S | N |
| 238.50 | N | N | N | S | S | S | S | N | N | N | N | N | S | S | S | S | N |
| 238.75 | N | N | N | S | S | S | S | O | N | N | N | N | S | S | S | S | N |
| 239.00 | N | N | N | S | S | S | S | S | N | N | N | N | S | S | S | S | O |
| 239.25 | N | N | N | S | S | S | S | S | N | N | N | N | S | S | S | S | S |
| 239.50 | N | N | N | S | S | S | S | S | N | N | N | N | S | S | S | S | S |
| 239.75 | N | N | N | O | S | S | S | S | N | N | N | N | S | S | S | S | S |

Page Row 20, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 228.00 | S | S | S | O | N | N | N | N | S | S | S | S | N | N | N | N | N |
| 228.25 | S | S | S | S | N | N | N | N | S | S | S | S | O | N | N | N | N |
| 228.50 | S | S | S | S | N | N | N | N | S | S | S | S | S | N | N | N | N |
| 228.75 | S | S | S | S | N | N | N | N | S | S | S | S | S | N | N | N | N |
| 229.00 | S | S | S | S | N | N | N | N | S | S | S | S | S | N | N | N | N |
| 229.25 | S | S | S | S | N | N | N | N | O | S | S | S | S | N | N | N | N |
| 229.50 | S | S | S | S | N | N | N | N | N | S | S | S | S | N | N | N | N |
| 229.75 | S | S | S | S | N | N | N | N | N | S | S | S | S | N | N | N | N |
| 230.00 | S | S | S | S | N | N | N | N | N | S | S | S | S | N | N | N | N |
| 230.25 | S | S | S | S | O | N | N | N | N | S | S | S | S | N | N | N | N |
| 230.50 | S | S | S | S | S | N | N | N | N | S | S | S | S | O | N | N | N |
| 230.75 | S | S | S | S | S | N | N | N | N | S | S | S | S | S | N | N | N |
| 231.00 | S | S | S | S | S | N | N | N | N | S | S | S | S | S | N | N | N |
| 231.25 | O | S | S | S | S | N | N | N | N | S | S | S | S | S | N | N | N |
| 231.50 | N | S | S | S | S | N | N | N | N | O | S | S | S | S | N | N | N |
| 231.75 | N | S | S | S | S | N | N | N | N | N | S | S | S | S | N | N | N |
| 232.00 | N | S | S | S | S | N | N | N | N | N | S | S | S | S | N | N | N |
| 232.25 | N | S | S | S | S | N | N | N | N | N | S | S | S | S | N | N | N |
| 232.50 | N | S | S | S | S | O | N | N | N | N | S | S | S | S | N | N | N |
| 232.75 | N | S | S | S | S | S | N | N | N | N | S | S | S | S | O | N | N |
| 233.00 | N | S | S | S | S | S | N | N | N | N | S | S | S | S | S | N | N |
| 233.25 | N | S | S | S | S | S | N | N | N | N | S | S | S | S | S | N | N |
| 233.50 | N | O | S | S | S | S | N | N | N | N | S | S | S | S | S | N | N |
| 233.75 | N | N | S | S | S | S | N | N | N | N | O | S | S | S | S | N | N |
| 234.00 | N | N | S | S | S | S | N | N | N | N | N | S | S | S | S | N | N |
| 234.25 | N | N | S | S | S | S | N | N | N | N | N | S | S | S | S | N | N |
| 234.50 | N | N | S | S | S | S | N | N | N | N | N | S | S | S | S | N | N |
| 234.75 | N | N | S | S | S | S | O | N | N | N | N | S | S | S | S | N | N |
| 235.00 | N | N | S | S | S | S | S | N | N | N | N | S | S | S | S | O | N |
| 235.25 | N | N | S | S | S | S | S | N | N | N | N | S | S | S | S | S | N |
| 235.50 | N | N | S | S | S | S | S | N | N | N | N | S | S | S | S | S | N |
| 235.75 | N | N | O | S | S | S | S | N | N | N | N | S | S | S | S | S | N |

-continued

| Coil Excitation | | | | | | | | | | | | | | | | | |
|---|---|---|---|---|---|---|---|---|---|---|---|---|---|---|---|---|---|
| 236.00 | N | N | N | S | S | S | S | N | N | N | N | O | S | S | S | S | N |
| 236.25 | N | N | N | S | S | S | S | N | N | N | N | N | S | S | S | S | N |
| 236.50 | N | N | N | S | S | S | S | N | N | N | N | N | S | S | S | S | N |
| 236.75 | N | N | N | S | S | S | S | N | N | N | N | N | S | S | S | S | N |
| 237.00 | N | N | N | S | S | S | S | O | N | N | N | N | S | S | S | S | N |
| 237.25 | N | N | N | S | S | S | S | S | N | N | N | N | S | S | S | S | O |
| 237.50 | N | N | N | S | S | S | S | S | N | N | N | N | S | S | S | S | S |
| 237.75 | N | N | N | S | S | S | S | S | N | N | N | N | S | S | S | S | S |
| 238.00 | N | N | N | O | S | S | S | S | N | N | N | N | S | S | S | S | S |
| 238.25 | N | N | N | N | S | S | S | S | N | N | N | N | O | S | S | S | S |
| 238.50 | N | N | N | N | S | S | S | S | N | N | N | N | N | S | S | S | S |
| 238.75 | N | N | N | N | S | S | S | S | N | N | N | N | N | S | S | S | S |
| 239.00 | N | N | N | N | S | S | S | S | N | N | N | N | N | S | S | S | S |
| 239.25 | N | N | N | N | S | S | S | S | O | N | N | N | N | S | S | S | S |
| 239.50 | N | N | N | N | S | S | S | S | S | N | N | N | N | S | S | S | S |
| 239.75 | N | N | N | N | S | S | S | S | S | N | N | N | N | S | S | S | S |

Page Row 20, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 228.00 | S | S | S | S | N | N | N | N | N | S | S | S | S | N | N | N | N |
| 228.25 | S | S | S | S | N | N | N | N | N | S | S | S | S | N | N | N | N |
| 228.50 | S | S | S | S | O | N | N | N | N | S | S | S | S | N | N | N | N |
| 228.75 | S | S | S | S | S | N | N | N | N | S | S | S | S | O | N | N | N |
| 229.00 | S | S | S | S | S | N | N | N | N | S | S | S | S | S | N | N | N |
| 229.25 | S | S | S | S | S | N | N | N | N | S | S | S | S | S | N | N | N |
| 229.50 | O | S | S | S | S | N | N | N | N | S | S | S | S | S | N | N | N |
| 229.75 | N | S | S | S | S | N | N | N | N | O | S | S | S | S | N | N | N |
| 230.00 | N | S | S | S | S | N | N | N | N | N | S | S | S | S | N | N | N |
| 230.25 | N | S | S | S | S | N | N | N | N | N | S | S | S | S | N | N | N |
| 230.50 | N | S | S | S | S | N | N | N | N | N | S | S | S | S | N | N | N |
| 230.75 | N | S | S | S | S | O | N | N | N | N | S | S | S | S | N | N | N |
| 231.00 | N | S | S | S | S | S | N | N | N | N | S | S | S | S | O | N | N |
| 231.25 | N | S | S | S | S | S | N | N | N | N | S | S | S | S | S | N | N |
| 231.50 | N | S | S | S | S | S | N | N | N | N | S | S | S | S | S | N | N |
| 231.75 | N | O | S | S | S | S | N | N | N | N | S | S | S | S | S | N | N |
| 232.00 | N | N | S | S | S | S | N | N | N | N | O | S | S | S | S | N | N |
| 232.25 | N | N | S | S | S | S | N | N | N | N | N | S | S | S | S | N | N |
| 232.50 | N | N | S | S | S | S | N | N | N | N | N | S | S | S | S | N | N |
| 232.75 | N | N | S | S | S | S | N | N | N | N | N | S | S | S | S | N | N |
| 233.00 | N | N | S | S | S | S | O | N | N | N | N | S | S | S | S | N | N |
| 233.25 | N | N | S | S | S | S | S | N | N | N | N | S | S | S | S | O | N |
| 233.50 | N | N | S | S | S | S | S | N | N | N | N | S | S | S | S | S | N |
| 233.75 | N | N | S | S | S | S | S | N | N | N | N | S | S | S | S | S | N |
| 234.00 | N | N | O | S | S | S | S | N | N | N | N | S | S | S | S | S | N |
| 234.25 | N | N | N | S | S | S | S | N | N | N | N | O | S | S | S | S | N |
| 234.50 | N | N | N | S | S | S | S | N | N | N | N | N | S | S | S | S | N |
| 234.75 | N | N | N | S | S | S | S | N | N | N | N | N | S | S | S | S | N |
| 235.00 | N | N | N | S | S | S | S | N | N | N | N | N | S | S | S | S | N |
| 235.25 | N | N | N | S | S | S | S | O | N | N | N | N | S | S | S | S | N |
| 235.50 | N | N | N | S | S | S | S | S | N | N | N | N | S | S | S | S | O |
| 235.75 | N | N | N | S | S | S | S | S | N | N | N | N | S | S | S | S | S |
| 236.00 | N | N | N | S | S | S | S | S | N | N | N | N | S | S | S | S | S |
| 236.25 | N | N | N | O | S | S | S | S | N | N | N | N | S | S | S | S | S |
| 236.50 | N | N | N | N | S | S | S | S | N | N | N | N | O | S | S | S | S |
| 236.75 | N | N | N | N | S | S | S | S | N | N | N | N | N | S | S | S | S |
| 237.00 | N | N | N | N | S | S | S | S | N | N | N | N | N | S | S | S | S |
| 237.25 | N | N | N | N | S | S | S | S | N | N | N | N | N | S | S | S | S |
| 237.50 | N | N | N | N | S | S | S | S | O | N | N | N | N | S | S | S | S |
| 237.75 | N | N | N | N | S | S | S | S | S | N | N | N | N | S | S | S | S |
| 238.00 | N | N | N | N | S | S | S | S | S | N | N | N | N | S | S | S | S |
| 238.25 | N | N | N | N | S | S | S | S | S | N | N | N | N | S | S | S | S |
| 238.50 | N | N | N | N | O | S | S | S | S | N | N | N | N | S | S | S | S |
| 238.75 | N | N | N | N | N | S | S | S | S | N | N | N | N | O | S | S | S |
| 239.00 | N | N | N | N | N | S | S | S | S | N | N | N | N | N | S | S | S |
| 239.25 | N | N | N | N | N | S | S | S | S | N | N | N | N | N | S | S | S |
| 239.50 | O | N | N | N | N | S | S | S | S | N | N | N | N | N | S | S | S |
| 239.75 | S | N | N | N | N | S | S | S | S | O | N | N | N | N | S | S | S |

Page Row 20, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 228.00 | N | S | S | S | S | N | N | N | N | O | S | S | S | S | N | N | N |
| 228.25 | N | S | S | S | S | N | N | N | N | N | S | S | S | S | N | N | N |
| 228.50 | N | S | S | S | S | N | N | N | N | N | S | S | S | S | N | N | N |
| 228.75 | N | S | S | S | S | N | N | N | N | N | S | S | S | S | N | N | N |
| 229.00 | N | S | S | S | S | O | N | N | N | N | S | S | S | S | N | N | N |

-continued

| Coil Excitation | | | | | | | | | | | | | | | | | |
|---|---|---|---|---|---|---|---|---|---|---|---|---|---|---|---|---|---|
| 229.25 | N | S | S | S | S | S | N | N | N | N | S | S | S | S | O | N | N |
| 229.50 | N | S | S | S | S | S | N | N | N | N | S | S | S | S | S | N | N |
| 229.75 | N | S | S | S | S | S | N | N | N | N | S | S | S | S | S | N | N |
| 230.00 | N | O | S | S | S | S | N | N | N | N | S | S | S | S | S | N | N |
| 230.25 | N | N | S | S | S | S | N | N | N | N | O | S | S | S | S | N | N |
| 230.50 | N | N | S | S | S | S | N | N | N | N | N | S | S | S | S | N | N |
| 230.75 | N | N | S | S | S | S | N | N | N | N | N | S | S | S | S | N | N |
| 231.00 | N | N | S | S | S | S | N | N | N | N | N | S | S | S | S | N | N |
| 231.25 | N | N | S | S | S | S | O | N | N | N | N | S | S | S | S | N | N |
| 231.50 | N | N | S | S | S | S | S | N | N | N | N | S | S | S | S | O | N |
| 231.75 | N | N | S | S | S | S | S | N | N | N | N | S | S | S | S | S | N |
| 232.00 | N | N | S | S | S | S | S | N | N | N | N | S | S | S | S | S | N |
| 232.25 | N | N | O | S | S | S | S | N | N | N | N | S | S | S | S | S | N |
| 232.50 | N | N | N | S | S | S | S | N | N | N | N | O | S | S | S | S | N |
| 232.75 | N | N | N | S | S | S | S | N | N | N | N | N | S | S | S | S | N |
| 233.00 | N | N | N | S | S | S | S | N | N | N | N | N | S | S | S | S | N |
| 233.25 | N | N | N | S | S | S | S | N | N | N | N | N | S | S | S | S | N |
| 233.50 | N | N | N | S | S | S | S | O | N | N | N | N | S | S | S | S | N |
| 233.75 | N | N | N | S | S | S | S | S | N | N | N | N | S | S | S | S | O |
| 234.00 | N | N | N | S | S | S | S | S | N | N | N | N | S | S | S | S | S |
| 234.25 | N | N | N | S | S | S | S | S | N | N | N | N | S | S | S | S | S |
| 234.50 | N | N | N | O | S | S | S | S | N | N | N | N | S | S | S | S | S |
| 234.75 | N | N | N | N | S | S | S | S | N | N | N | N | O | S | S | S | S |
| 235.00 | N | N | N | N | S | S | S | S | N | N | N | N | N | S | S | S | S |
| 235.25 | N | N | N | N | S | S | S | S | N | N | N | N | N | S | S | S | S |
| 235.50 | N | N | N | N | S | S | S | S | N | N | N | N | N | S | S | S | S |
| 235.75 | N | N | N | N | S | S | S | S | O | N | N | N | N | S | S | S | S |
| 236.00 | N | N | N | N | S | S | S | S | S | N | N | N | N | S | S | S | S |
| 236.25 | N | N | N | N | S | S | S | S | S | N | N | N | N | S | S | S | S |
| 236.50 | N | N | N | N | S | S | S | S | S | N | N | N | N | S | S | S | S |
| 236.75 | N | N | N | N | O | S | S | S | S | N | N | N | N | S | S | S | S |
| 237.00 | N | N | N | N | N | S | S | S | S | N | N | N | N | O | S | S | S |
| 237.25 | N | N | N | N | N | S | S | S | S | N | N | N | N | N | S | S | S |
| 237.50 | N | N | N | N | N | S | S | S | S | N | N | N | N | N | S | S | S |
| 237.75 | O | N | N | N | N | S | S | S | S | N | N | N | N | N | S | S | S |
| 238.00 | S | N | N | N | N | S | S | S | S | O | N | N | N | N | S | S | S |
| 238.25 | S | N | N | N | N | S | S | S | S | S | N | N | N | N | S | S | S |
| 238.50 | S | N | N | N | N | S | S | S | S | S | N | N | N | N | S | S | S |
| 238.75 | S | N | N | N | N | S | S | S | S | S | N | N | N | N | S | S | S |
| 239.00 | S | N | N | N | N | O | S | S | S | S | N | N | N | N | S | S | S |
| 239.25 | S | N | N | N | N | N | S | S | S | S | N | N | N | N | O | S | S |
| 239.50 | S | N | N | N | N | N | S | S | S | S | N | N | N | N | N | S | S |
| 239.75 | S | N | N | N | N | N | S | S | S | S | N | N | N | N | N | S | S |

Page Row 20, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 228.00 | N | S | S | S | S | S | N | N | N | N | S | S | S | S | S | N | N |
| 228.25 | N | O | S | S | S | S | N | N | N | N | S | S | S | S | S | N | N |
| 228.50 | N | N | S | S | S | S | N | N | N | N | O | S | S | S | S | N | N |
| 228.75 | N | N | S | S | S | S | N | N | N | N | N | S | S | S | S | N | N |
| 229.00 | N | N | S | S | S | S | N | N | N | N | N | S | S | S | S | N | N |
| 229.25 | N | N | S | S | S | S | N | N | N | N | N | S | S | S | S | N | N |
| 229.50 | N | N | S | S | S | S | O | N | N | N | N | S | S | S | S | N | N |
| 229.75 | N | N | S | S | S | S | S | N | N | N | N | S | S | S | S | O | N |
| 230.00 | N | N | S | S | S | S | S | N | N | N | N | S | S | S | S | S | N |
| 230.25 | N | N | S | S | S | S | S | N | N | N | N | S | S | S | S | S | N |
| 230.50 | N | N | O | S | S | S | S | N | N | N | N | S | S | S | S | S | N |
| 230.75 | N | N | N | S | S | S | S | N | N | N | N | O | S | S | S | S | N |
| 231.00 | N | N | N | S | S | S | S | N | N | N | N | N | S | S | S | S | N |
| 231.25 | N | N | N | S | S | S | S | N | N | N | N | N | S | S | S | S | N |
| 231.50 | N | N | N | S | S | S | S | N | N | N | N | N | S | S | S | S | N |
| 231.75 | N | N | N | S | S | S | S | O | N | N | N | N | S | S | S | S | N |
| 232.00 | N | N | N | S | S | S | S | S | N | N | N | N | S | S | S | S | O |
| 232.25 | N | N | N | S | S | S | S | S | N | N | N | N | S | S | S | S | S |
| 232.50 | N | N | N | S | S | S | S | S | N | N | N | N | S | S | S | S | S |
| 232.75 | N | N | N | O | S | S | S | S | N | N | N | N | S | S | S | S | S |
| 233.00 | N | N | N | N | S | S | S | S | N | N | N | N | O | S | S | S | S |
| 233.25 | N | N | N | N | S | S | S | S | N | N | N | N | N | S | S | S | S |
| 233.50 | N | N | N | N | S | S | S | S | N | N | N | N | N | S | S | S | S |
| 233.75 | N | N | N | N | S | S | S | S | N | N | N | N | N | S | S | S | S |
| 234.00 | N | N | N | N | S | S | S | S | O | N | N | N | N | S | S | S | S |
| 234.25 | N | N | N | N | S | S | S | S | S | N | N | N | N | S | S | S | S |
| 234.50 | N | N | N | N | S | S | S | S | S | N | N | N | N | S | S | S | S |
| 234.75 | N | N | N | N | S | S | S | S | S | N | N | N | N | S | S | S | S |
| 235.00 | N | N | N | N | O | S | S | S | S | N | N | N | N | S | S | S | S |
| 235.25 | N | N | N | N | N | S | S | S | S | N | N | N | N | O | S | S | S |

-continued

Coil Excitation

| | | | | | | | | | | | | | | | | | |
|---|---|---|---|---|---|---|---|---|---|---|---|---|---|---|---|---|---|
| 235.50 | N | N | N | N | N | S | S | S | S | N | N | N | N | N | S | S | S |
| 235.75 | N | N | N | N | N | S | S | S | S | N | N | N | N | N | S | S | S |
| 236.00 | O | N | N | N | N | S | S | S | S | N | N | N | N | N | S | S | S |
| 236.25 | S | N | N | N | N | S | S | S | S | O | N | N | N | N | S | S | S |
| 236.50 | S | N | N | N | N | S | S | S | S | S | N | N | N | N | S | S | S |
| 236.75 | S | N | N | N | N | S | S | S | S | S | N | N | N | N | S | S | S |
| 237.00 | S | N | N | N | N | S | S | S | S | S | N | N | N | N | S | S | S |
| 237.25 | S | N | N | N | N | O | S | S | S | S | N | N | N | N | S | S | S |
| 237.50 | S | N | N | N | N | N | S | S | S | S | N | N | N | N | O | S | S |
| 237.75 | S | N | N | N | N | N | S | S | S | S | N | N | N | N | N | S | S |
| 238.00 | S | N | N | N | N | N | S | S | S | S | N | N | N | N | N | S | S |
| 238.25 | S | O | N | N | N | N | S | S | S | S | N | N | N | N | N | S | S |
| 238.50 | S | S | N | N | N | N | S | S | S | S | O | N | N | N | N | S | S |
| 238.75 | S | S | N | N | N | N | S | S | S | S | S | N | N | N | N | S | S |
| 239.00 | S | S | N | N | N | N | S | S | S | S | S | N | N | N | N | S | S |
| 239.25 | S | S | N | N | N | N | S | S | S | S | S | N | N | N | N | S | S |
| 239.50 | S | S | N | N | N | N | O | S | S | S | S | N | N | N | N | S | S |
| 239.75 | S | S | N | N | N | N | N | S | S | S | S | N | N | N | N | O | S |

Page Row 20, Page Column 9

| Coil | 154 | 155 | 156 | 157 | 158 | 159 | 160 |
|---|---|---|---|---|---|---|---|
| 228.00 | N | N | S | S | S | S | S |
| 228.25 | N | N | S | S | S | S | S |
| 228.50 | N | N | S | S | S | S | S |
| 228.75 | N | N | O | S | S | S | S |
| 229.00 | N | N | N | S | S | S | S |
| 229.25 | N | N | N | S | S | S | S |
| 229.50 | N | N | N | S | S | S | S |
| 229.75 | N | N | N | S | S | S | S |
| 230.00 | N | N | N | S | S | S | S |
| 230.25 | N | N | N | S | S | S | S |
| 230.50 | N | N | N | S | S | S | S |
| 230.75 | N | N | N | S | S | S | S |
| 231.00 | N | N | N | O | S | S | S |
| 231.25 | N | N | N | N | S | S | S |
| 231.50 | N | N | N | N | S | S | S |
| 231.75 | N | N | N | N | S | S | S |
| 232.00 | N | N | N | N | S | S | S |
| 232.25 | N | N | N | N | S | S | S |
| 232.50 | N | N | N | N | S | S | S |
| 232.75 | N | N | N | N | S | S | S |
| 233.00 | N | N | N | N | S | S | S |
| 233.25 | N | N | N | N | O | S | S |
| 233.50 | N | N | N | N | N | S | S |
| 233.75 | N | N | N | N | N | S | S |
| 234.00 | N | N | N | N | N | S | S |
| 234.25 | O | N | N | N | N | S | S |
| 234.50 | S | N | N | N | N | S | S |
| 234.75 | S | N | N | N | N | S | S |
| 235.00 | S | N | N | N | N | S | S |
| 235.25 | S | N | N | N | N | S | S |
| 235.50 | S | N | N | N | N | O | S |
| 235.75 | S | N | N | N | N | N | S |
| 236.00 | S | N | N | N | N | N | S |
| 236.25 | S | N | N | N | N | N | S |
| 236.50 | S | O | N | N | N | N | S |
| 236.75 | S | S | N | N | N | N | S |
| 237.00 | S | S | N | N | N | N | S |
| 237.25 | S | S | N | N | N | N | S |
| 237.50 | S | S | N | N | N | N | S |
| 237.75 | S | S | N | N | N | N | O |
| 238.00 | S | S | N | N | N | N | N |
| 238.25 | S | S | N | N | N | N | N |
| 238.50 | S | S | N | N | N | N | N |
| 238.75 | S | S | O | N | N | N | N |
| 239.00 | S | S | S | N | N | N | N |
| 239.25 | S | S | S | N | N | N | N |
| 239.50 | S | S | S | N | N | N | N |
| 239.75 | S | S | S | N | N | N | N |

Page Row 20, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 240.00 | O | S | S | S | S | N | N | N | N | S | S | S | S | S | N | N | N |
| 240.25 | N | S | S | S | S | N | N | N | N | O | S | S | S | S | N | N | N |
| 240.50 | N | S | S | S | S | N | N | N | N | N | S | S | S | S | N | N | N |

-continued

| Coil Excitation | | | | | | | | | | | | | | | | | |
|---|---|---|---|---|---|---|---|---|---|---|---|---|---|---|---|---|---|
| 240.75 | N | S | S | S | S | N | N | N | N | N | S | S | S | S | N | N | N |
| 241.00 | N | S | S | S | S | N | N | N | N | N | S | S | S | S | N | N | N |
| 241.25 | N | S | S | S | S | O | N | N | N | N | S | S | S | S | N | N | N |
| 241.50 | N | S | S | S | S | S | N | N | N | N | S | S | S | S | O | N | N |
| 241.75 | N | S | S | S | S | S | N | N | N | N | S | S | S | S | S | N | N |
| 242.00 | N | S | S | S | S | S | N | N | N | N | S | S | S | S | S | N | N |
| 242.25 | N | O | S | S | S | S | N | N | N | N | S | S | S | S | S | N | N |
| 242.50 | N | N | S | S | S | S | N | N | N | N | O | S | S | S | S | N | N |
| 242.75 | N | N | S | S | S | S | N | N | N | N | N | S | S | S | S | N | N |
| 243.00 | N | N | S | S | S | S | N | N | N | N | N | S | S | S | S | N | N |
| 243.25 | N | N | S | S | S | S | N | N | N | N | N | S | S | S | S | N | N |
| 243.50 | N | N | S | S | S | S | O | N | N | N | N | S | S | S | S | N | N |
| 243.75 | N | N | S | S | S | S | S | N | N | N | N | S | S | S | S | O | N |
| 244.00 | N | N | S | S | S | S | S | N | N | N | N | S | S | S | S | S | N |
| 244.25 | N | N | S | S | S | S | S | N | N | N | N | S | S | S | S | S | N |
| 244.50 | N | N | O | S | S | S | S | N | N | N | N | S | S | S | S | S | N |
| 244.75 | N | N | N | S | S | S | S | N | N | N | N | O | S | S | S | S | N |
| 245.00 | N | N | N | S | S | S | S | N | N | N | N | N | S | S | S | S | N |
| 245.25 | N | N | N | S | S | S | S | N | N | N | N | N | S | S | S | S | N |
| 245.50 | N | N | N | S | S | S | S | N | N | N | N | N | S | S | S | S | N |
| 245.75 | N | N | N | S | S | S | S | O | N | N | N | N | S | S | S | S | N |
| 246.00 | N | N | N | S | S | S | S | S | N | N | N | N | S | S | S | S | O |
| 246.25 | N | N | N | S | S | S | S | S | N | N | N | N | S | S | S | S | S |
| 246.50 | N | N | N | S | S | S | S | S | N | N | N | N | S | S | S | S | S |
| 246.75 | N | N | N | O | S | S | S | S | N | N | N | N | S | S | S | S | S |
| 247.00 | N | N | N | N | S | S | S | S | N | N | N | N | O | S | S | S | S |
| 247.25 | N | N | N | N | S | S | S | S | N | N | N | N | N | S | S | S | S |
| 247.50 | N | N | N | N | S | S | S | S | N | N | N | N | N | S | S | S | S |
| 247.75 | N | N | N | N | S | S | S | S | N | N | N | N | N | S | S | S | S |
| 248.00 | N | N | N | N | S | S | S | S | O | N | N | N | N | S | S | S | S |
| 248.25 | N | N | N | N | S | S | S | S | S | N | N | N | N | S | S | S | S |
| 248.50 | N | N | N | N | S | S | S | S | S | N | N | N | N | S | S | S | S |
| 248.75 | N | N | N | N | S | S | S | S | S | N | N | N | N | S | S | S | S |
| 249.00 | N | N | N | N | O | S | S | S | S | N | N | N | N | S | S | S | S |
| 249.25 | N | N | N | N | N | S | S | S | S | N | N | N | N | O | S | S | S |
| 249.50 | N | N | N | N | N | S | S | S | S | N | N | N | N | N | S | S | S |
| 249.75 | N | N | N | N | N | S | S | S | S | N | N | N | N | N | S | S | S |
| 250.00 | O | N | N | N | N | S | S | S | S | N | N | N | N | N | S | S | S |
| 250.25 | S | N | N | N | N | S | S | S | S | O | N | N | N | N | S | S | S |
| 250.50 | S | N | N | N | N | S | S | S | S | S | N | N | N | N | S | S | S |
| 250.75 | S | N | N | N | N | S | S | S | S | S | N | N | N | N | S | S | S |
| 251.00 | S | N | N | N | N | S | S | S | S | S | N | N | N | N | S | S | S |
| 251.25 | S | N | N | N | N | O | S | S | S | S | N | N | N | N | S | S | S |
| 251.50 | S | N | N | N | N | N | S | S | S | S | N | N | N | N | O | S | S |
| 251.75 | S | N | N | N | N | N | S | S | S | S | N | N | N | N | N | S | S |

Page Row 21, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 240.00 | N | S | S | S | S | S | N | N | N | N | S | S | S | S | S | N | N |
| 240.25 | N | S | S | S | S | S | N | N | N | N | S | S | S | S | S | N | N |
| 240.50 | N | O | S | S | S | S | N | N | N | N | S | S | S | S | S | N | N |
| 240.75 | N | N | S | S | S | S | N | N | N | N | O | S | S | S | S | N | N |
| 241.00 | N | N | S | S | S | S | N | N | N | N | N | S | S | S | S | N | N |
| 241.25 | N | N | S | S | S | S | N | N | N | N | N | S | S | S | S | N | N |
| 241.50 | N | N | S | S | S | S | N | N | N | N | N | S | S | S | S | N | N |
| 241.75 | N | N | S | S | S | S | O | N | N | N | N | S | S | S | S | N | N |
| 242.00 | N | N | S | S | S | S | S | N | N | N | N | S | S | S | S | O | N |
| 242.25 | N | N | S | S | S | S | S | N | N | N | N | S | S | S | S | S | N |
| 242.50 | N | N | S | S | S | S | S | N | N | N | N | S | S | S | S | S | N |
| 242.75 | N | N | O | S | S | S | S | N | N | N | N | S | S | S | S | S | N |
| 243.00 | N | N | N | S | S | S | S | N | N | N | N | O | S | S | S | S | N |
| 243.25 | N | N | N | S | S | S | S | N | N | N | N | N | S | S | S | S | N |
| 243.50 | N | N | N | S | S | S | S | N | N | N | N | N | S | S | S | S | N |
| 243.75 | N | N | N | S | S | S | S | N | N | N | N | N | S | S | S | S | N |
| 244.00 | N | N | N | S | S | S | S | O | N | N | N | N | S | S | S | S | N |
| 244.25 | N | N | N | S | S | S | S | S | N | N | N | N | S | S | S | S | O |
| 244.50 | N | N | N | S | S | S | S | S | N | N | N | N | S | S | S | S | S |
| 244.75 | N | N | N | S | S | S | S | S | N | N | N | N | S | S | S | S | S |
| 245.00 | N | N | N | O | S | S | S | S | N | N | N | N | S | S | S | S | S |
| 245.25 | N | N | N | N | S | S | S | S | N | N | N | N | O | S | S | S | S |
| 245.50 | N | N | N | N | S | S | S | S | N | N | N | N | N | S | S | S | S |
| 245.75 | N | N | N | N | S | S | S | S | N | N | N | N | N | S | S | S | S |
| 246.00 | N | N | N | N | S | S | S | S | N | N | N | N | N | S | S | S | S |
| 246.25 | N | N | N | N | S | S | S | S | O | N | N | N | N | S | S | S | S |
| 246.50 | N | N | N | N | S | S | S | S | S | N | N | N | N | S | S | S | S |
| 246.75 | N | N | N | N | S | S | S | S | S | N | N | N | N | S | S | S | S |

-continued

| Coil Excitation | | | | | | | | | | | | | | | | |
|---|---|---|---|---|---|---|---|---|---|---|---|---|---|---|---|---|
| 247.00 | N | N | N | N | S | S | S | S | S | N | N | N | N | S | S | S | S |
| 247.25 | N | N | N | N | O | S | S | S | S | N | N | N | N | S | S | S | S |
| 247.50 | N | N | N | N | N | S | S | S | S | N | N | N | N | O | S | S | S |
| 247.75 | N | N | N | N | N | S | S | S | S | N | N | N | N | N | S | S | S |
| 248.00 | N | N | N | N | N | S | S | S | S | N | N | N | N | N | S | S | S |
| 248.25 | O | N | N | N | N | S | S | S | S | N | N | N | N | N | S | S | S |
| 248.50 | S | N | N | N | N | S | S | S | S | O | N | N | N | N | S | S | S |
| 248.75 | S | N | N | N | N | S | S | S | S | S | N | N | N | N | S | S | S |
| 249.00 | S | N | N | N | N | S | S | S | S | S | N | N | N | N | S | S | S |
| 249.25 | S | N | N | N | N | S | S | S | S | S | N | N | N | N | S | S | S |
| 249.50 | S | N | N | N | N | O | S | S | S | S | N | N | N | N | S | S | S |
| 249.75 | S | N | N | N | N | N | S | S | S | S | N | N | N | N | O | S | S |
| 250.00 | S | N | N | N | N | N | S | S | S | S | N | N | N | N | N | S | S |
| 250.25 | S | N | N | N | N | N | S | S | S | S | N | N | N | N | N | S | S |
| 250.50 | S | O | N | N | N | N | S | S | S | S | N | N | N | N | N | S | S |
| 250.75 | S | S | N | N | N | N | S | S | S | S | O | N | N | N | N | S | S |
| 251.00 | S | S | N | N | N | N | S | S | S | S | S | N | N | N | N | S | S |
| 251.25 | S | S | N | N | N | N | S | S | S | S | S | N | N | N | N | S | S |
| 251.50 | S | S | N | N | N | N | S | S | S | S | S | N | N | N | N | S | S |
| 251.75 | S | S | N | N | N | N | O | S | S | S | S | N | N | N | N | S | S |

Page Row 21, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 240.00 | N | N | S | S | S | S | O | N | N | N | N | S | S | S | S | N | N |
| 240.25 | N | N | S | S | S | S | S | N | N | N | N | S | S | S | S | O | N |
| 240.50 | N | N | S | S | S | S | S | N | N | N | N | S | S | S | S | S | N |
| 240.75 | N | N | S | S | S | S | S | N | N | N | N | S | S | S | S | S | N |
| 241.00 | N | N | O | S | S | S | S | N | N | N | N | S | S | S | S | S | N |
| 241.25 | N | N | N | S | S | S | S | N | N | N | N | O | S | S | S | S | N |
| 241.50 | N | N | N | S | S | S | S | N | N | N | N | N | S | S | S | S | N |
| 241.75 | N | N | N | S | S | S | S | N | N | N | N | N | S | S | S | S | N |
| 242.00 | N | N | N | S | S | S | S | N | N | N | N | N | S | S | S | S | N |
| 242.25 | N | N | N | S | S | S | S | O | N | N | N | N | S | S | S | S | N |
| 242.50 | N | N | N | S | S | S | S | S | N | N | N | N | S | S | S | S | O |
| 242.75 | N | N | N | S | S | S | S | S | N | N | N | N | S | S | S | S | S |
| 243.00 | N | N | N | S | S | S | S | S | N | N | N | N | S | S | S | S | S |
| 243.25 | N | N | N | O | S | S | S | S | N | N | N | N | S | S | S | S | S |
| 243.50 | N | N | N | N | S | S | S | S | N | N | N | N | O | S | S | S | S |
| 243.75 | N | N | N | N | S | S | S | S | N | N | N | N | N | S | S | S | S |
| 244.00 | N | N | N | N | S | S | S | S | N | N | N | N | N | S | S | S | S |
| 244.25 | N | N | N | N | S | S | S | S | N | N | N | N | N | S | S | S | S |
| 244.50 | N | N | N | N | S | S | S | S | O | N | N | N | N | S | S | S | S |
| 244.75 | N | N | N | N | S | S | S | S | S | N | N | N | N | S | S | S | S |
| 245.00 | N | N | N | N | S | S | S | S | S | N | N | N | N | S | S | S | S |
| 245.25 | N | N | N | N | S | S | S | S | S | N | N | N | N | S | S | S | S |
| 245.50 | N | N | N | N | O | S | S | S | S | N | N | N | N | S | S | S | S |
| 245.75 | N | N | N | N | N | S | S | S | S | N | N | N | N | O | S | S | S |
| 246.00 | N | N | N | N | N | S | S | S | S | N | N | N | N | N | S | S | S |
| 246.25 | N | N | N | N | N | S | S | S | S | N | N | N | N | N | S | S | S |
| 246.50 | O | N | N | N | N | S | S | S | S | N | N | N | N | N | S | S | S |
| 246.75 | S | N | N | N | N | S | S | S | S | O | N | N | N | N | S | S | S |
| 247.00 | S | N | N | N | N | S | S | S | S | S | N | N | N | N | S | S | S |
| 247.25 | S | N | N | N | N | S | S | S | S | S | N | N | N | N | S | S | S |
| 247.50 | S | N | N | N | N | S | S | S | S | S | N | N | N | N | S | S | S |
| 247.75 | S | N | N | N | N | O | S | S | S | S | N | N | N | N | S | S | S |
| 248.00 | S | N | N | N | N | N | S | S | S | S | N | N | N | N | O | S | S |
| 248.25 | S | N | N | N | N | N | S | S | S | S | N | N | N | N | N | S | S |
| 248.50 | S | N | N | N | N | N | S | S | S | S | N | N | N | N | N | S | S |
| 248.75 | S | O | N | N | N | N | S | S | S | S | N | N | N | N | N | S | S |
| 249.00 | S | S | N | N | N | N | S | S | S | S | O | N | N | N | N | S | S |
| 249.25 | S | S | N | N | N | N | S | S | S | S | S | N | N | N | N | S | S |
| 249.50 | S | S | N | N | N | N | S | S | S | S | S | N | N | N | N | S | S |
| 249.75 | S | S | N | N | N | N | S | S | S | S | S | N | N | N | N | S | S |
| 250.00 | S | S | N | N | N | N | O | S | S | S | S | N | N | N | N | S | S |
| 250.25 | S | S | N | N | N | N | N | S | S | S | S | N | N | N | N | O | S |
| 250.50 | S | S | N | N | N | N | N | S | S | S | S | N | N | N | N | N | S |
| 250.75 | S | S | N | N | N | N | N | S | S | S | S | N | N | N | N | N | S |
| 251.00 | S | S | O | N | N | N | N | S | S | S | S | N | N | N | N | N | S |
| 251.25 | S | S | S | N | N | N | N | S | S | S | S | O | N | N | N | N | S |
| 251.50 | S | S | S | N | N | N | N | S | S | S | S | S | N | N | N | N | S |
| 251.75 | S | S | S | N | N | N | N | S | S | S | S | S | N | N | N | N | S |

Page Row 21, Page Column 3

-continued

Coil Excitation

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 240.00 | N | N | N | S | S | S | S | N | N | N | N | N | S | S | S | S | N |
| 240.25 | N | N | N | S | S | S | S | N | N | N | N | N | S | S | S | S | N |
| 240.50 | N | N | N | S | S | S | S | O | N | N | N | N | S | S | S | S | N |
| 240.75 | N | N | N | S | S | S | S | S | N | N | N | N | S | S | S | S | O |
| 241.00 | N | N | N | S | S | S | S | S | N | N | N | N | S | S | S | S | S |
| 241.25 | N | N | N | S | S | S | S | S | N | N | N | N | S | S | S | S | S |
| 241.50 | N | N | N | O | S | S | S | S | N | N | N | N | S | S | S | S | S |
| 241.75 | N | N | N | N | S | S | S | S | N | N | N | N | O | S | S | S | S |
| 242.00 | N | N | N | N | S | S | S | S | N | N | N | N | N | S | S | S | S |
| 242.25 | N | N | N | N | S | S | S | S | N | N | N | N | N | S | S | S | S |
| 242.50 | N | N | N | N | S | S | S | S | N | N | N | N | N | S | S | S | S |
| 242.75 | N | N | N | N | S | S | S | S | O | N | N | N | N | S | S | S | S |
| 243.00 | N | N | N | N | S | S | S | S | S | N | N | N | N | S | S | S | S |
| 243.25 | N | N | N | N | S | S | S | S | S | N | N | N | N | S | S | S | S |
| 243.50 | N | N | N | N | S | S | S | S | S | N | N | N | N | S | S | S | S |
| 243.75 | N | N | N | N | O | S | S | S | S | N | N | N | N | S | S | S | S |
| 244.00 | N | N | N | N | N | S | S | S | S | N | N | N | N | O | S | S | S |
| 244.25 | N | N | N | N | N | S | S | S | S | N | N | N | N | N | S | S | S |
| 244.50 | N | N | N | N | N | S | S | S | S | N | N | N | N | N | S | S | S |
| 244.75 | O | N | N | N | N | S | S | S | S | N | N | N | N | N | S | S | S |
| 245.00 | S | N | N | N | N | S | S | S | S | O | N | N | N | N | S | S | S |
| 245.25 | S | N | N | N | N | S | S | S | S | S | N | N | N | N | S | S | S |
| 245.50 | S | N | N | N | N | S | S | S | S | S | N | N | N | N | S | S | S |
| 245.75 | S | N | N | N | N | S | S | S | S | S | N | N | N | N | S | S | S |
| 246.00 | S | N | N | N | N | O | S | S | S | S | N | N | N | N | S | S | S |
| 246.25 | S | N | N | N | N | N | S | S | S | S | N | N | N | N | O | S | S |
| 246.50 | S | N | N | N | N | N | S | S | S | S | N | N | N | N | N | S | S |
| 246.75 | S | N | N | N | N | N | S | S | S | S | N | N | N | N | N | S | S |
| 247.00 | S | O | N | N | N | N | S | S | S | S | N | N | N | N | N | S | S |
| 247.25 | S | S | N | N | N | N | S | S | S | S | O | N | N | N | N | S | S |
| 247.50 | S | S | N | N | N | N | S | S | S | S | S | N | N | N | N | S | S |
| 247.75 | S | S | N | N | N | N | S | S | S | S | S | N | N | N | N | S | S |
| 248.00 | S | S | N | N | N | N | S | S | S | S | S | N | N | N | N | S | S |
| 248.25 | S | S | N | N | N | N | O | S | S | S | S | N | N | N | N | S | S |
| 248.50 | S | S | N | N | N | N | N | S | S | S | S | N | N | N | N | O | S |
| 248.75 | S | S | N | N | N | N | N | S | S | S | S | N | N | N | N | N | S |
| 249.00 | S | S | N | N | N | N | N | S | S | S | S | N | N | N | N | N | S |
| 249.25 | S | S | O | N | N | N | N | S | S | S | S | N | N | N | N | N | S |
| 249.50 | S | S | S | N | N | N | N | S | S | S | S | O | N | N | N | N | S |
| 249.75 | S | S | S | N | N | N | N | S | S | S | S | S | N | N | N | N | S |
| 250.00 | S | S | S | N | N | N | N | S | S | S | S | S | N | N | N | N | S |
| 250.25 | S | S | S | N | N | N | N | S | S | S | S | S | N | N | N | N | S |
| 250.50 | S | S | S | N | N | N | N | O | S | S | S | S | N | N | N | N | S |
| 250.75 | S | S | S | N | N | N | N | N | S | S | S | S | N | N | N | N | O |
| 251.00 | S | S | S | N | N | N | N | N | S | S | S | S | N | N | N | N | N |
| 251.25 | S | S | S | N | N | N | N | N | S | S | S | S | N | N | N | N | N |
| 251.50 | S | S | S | O | N | N | N | N | S | S | S | S | N | N | N | N | N |
| 251.75 | S | S | S | S | N | N | N | N | S | S | S | S | O | N | N | N | N |

Page Row 21, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 240.00 | N | N | N | N | S | S | S | S | N | N | N | N | O | S | S | S | S |
| 240.25 | N | N | N | N | S | S | S | S | N | N | N | N | N | S | S | S | S |
| 240.50 | N | N | N | N | S | S | S | S | N | N | N | N | N | S | S | S | S |
| 240.75 | N | N | N | N | S | S | S | S | N | N | N | N | N | S | S | S | S |
| 241.00 | N | N | N | N | S | S | S | S | O | N | N | N | N | S | S | S | S |
| 241.25 | N | N | N | N | S | S | S | S | S | N | N | N | N | S | S | S | S |
| 241.50 | N | N | N | N | S | S | S | S | S | N | N | N | N | S | S | S | S |
| 241.75 | N | N | N | N | S | S | S | S | S | N | N | N | N | S | S | S | S |
| 242.00 | N | N | N | N | O | S | S | S | S | N | N | N | N | S | S | S | S |
| 242.25 | N | N | N | N | N | S | S | S | S | N | N | N | N | O | S | S | S |
| 242.50 | N | N | N | N | N | S | S | S | S | N | N | N | N | N | S | S | S |
| 242.75 | N | N | N | N | N | S | S | S | S | N | N | N | N | N | S | S | S |
| 243.00 | O | N | N | N | N | S | S | S | S | N | N | N | N | N | S | S | S |
| 243.25 | S | N | N | N | N | S | S | S | S | O | N | N | N | N | S | S | S |
| 243.50 | S | N | N | N | N | S | S | S | S | S | N | N | N | N | S | S | S |
| 243.75 | S | N | N | N | N | S | S | S | S | S | N | N | N | N | S | S | S |
| 244.00 | S | N | N | N | N | S | S | S | S | S | N | N | N | N | S | S | S |
| 244.25 | S | N | N | N | N | O | S | S | S | S | N | N | N | N | S | S | S |
| 244.50 | S | N | N | N | N | N | S | S | S | S | N | N | N | N | O | S | S |
| 244.75 | S | N | N | N | N | N | S | S | S | S | N | N | N | N | N | S | S |
| 245.00 | S | N | N | N | N | N | S | S | S | S | N | N | N | N | N | S | S |
| 245.25 | S | O | N | N | N | N | S | S | S | S | N | N | N | N | N | S | S |
| 245.50 | S | S | N | N | N | N | S | S | S | S | O | N | N | N | N | S | S |

-continued

| | Coil Excitation | | | | | | | | | | | | | | | | |
|---|---|---|---|---|---|---|---|---|---|---|---|---|---|---|---|---|---|
| 245.75 | S | S | N | N | N | N | S | S | S | S | S | N | N | N | N | S | S |
| 246.00 | S | S | N | N | N | N | S | S | S | S | S | N | N | N | N | S | S |
| 246.25 | S | S | N | N | N | N | S | S | S | S | S | N | N | N | N | S | S |
| 246.50 | S | S | N | N | N | N | O | S | S | S | S | N | N | N | N | S | S |
| 246.75 | S | S | N | N | N | N | N | S | S | S | S | N | N | N | N | O | S |
| 247.00 | S | S | N | N | N | N | N | S | S | S | S | N | N | N | N | N | S |
| 247.25 | S | S | N | N | N | N | N | S | S | S | S | N | N | N | N | N | S |
| 247.50 | S | S | O | N | N | N | N | S | S | S | S | N | N | N | N | N | S |
| 247.75 | S | S | S | N | N | N | N | S | S | S | S | O | N | N | N | N | S |
| 248.00 | S | S | S | N | N | N | N | S | S | S | S | S | N | N | N | N | S |
| 248.25 | S | S | S | N | N | N | N | S | S | S | S | S | N | N | N | N | S |
| 248.50 | S | S | S | N | N | N | N | S | S | S | S | S | N | N | N | N | S |
| 248.75 | S | S | S | N | N | N | N | O | S | S | S | S | N | N | N | N | S |
| 249.00 | S | S | S | N | N | N | N | N | S | S | S | S | N | N | N | N | O |
| 249.25 | S | S | S | N | N | N | N | N | S | S | S | S | N | N | N | N | N |
| 249.50 | S | S | S | N | N | N | N | N | S | S | S | S | N | N | N | N | N |
| 249.75 | S | S | S | O | N | N | N | N | S | S | S | S | N | N | N | N | N |
| 250.00 | S | S | S | S | N | N | N | N | S | S | S | S | O | N | N | N | N |
| 250.25 | S | S | S | S | N | N | N | N | S | S | S | S | S | N | N | N | N |
| 250.50 | S | S | S | S | N | N | N | N | S | S | S | S | S | N | N | N | N |
| 250.75 | S | S | S | S | N | N | N | N | S | S | S | S | S | N | N | N | N |
| 251.00 | S | S | S | S | N | N | N | N | O | S | S | S | S | N | N | N | N |
| 251.25 | S | S | S | S | N | N | N | N | N | S | S | S | S | N | N | N | N |
| 251.50 | S | S | S | S | N | N | N | N | N | S | S | S | S | N | N | N | N |
| 251.75 | S | S | S | S | N | N | N | N | N | S | S | S | S | N | N | N | N |

Page Row 21, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 240.00 | N | N | N | N | S | S | S | S | S | N | N | N | N | S | S | S | S |
| 240.25 | N | N | N | N | O | S | S | S | S | N | N | N | N | S | S | S | S |
| 240.50 | N | N | N | N | N | S | S | S | S | N | N | N | N | O | S | S | S |
| 240.75 | N | N | N | N | N | S | S | S | S | N | N | N | N | N | S | S | S |
| 241.00 | N | N | N | N | N | S | S | S | S | N | N | N | N | N | S | S | S |
| 241.25 | O | N | N | N | N | S | S | S | S | N | N | N | N | N | S | S | S |
| 241.50 | S | N | N | N | N | S | S | S | S | O | N | N | N | N | S | S | S |
| 241.75 | S | N | N | N | N | S | S | S | S | S | N | N | N | N | S | S | S |
| 242.00 | S | N | N | N | N | S | S | S | S | S | N | N | N | N | S | S | S |
| 242.25 | S | N | N | N | N | S | S | S | S | S | N | N | N | N | S | S | S |
| 242.50 | S | N | N | N | N | O | S | S | S | S | N | N | N | N | S | S | S |
| 242.75 | S | N | N | N | N | N | S | S | S | S | N | N | N | N | O | S | S |
| 243.00 | S | N | N | N | N | N | S | S | S | S | N | N | N | N | N | S | S |
| 243.25 | S | N | N | N | N | N | S | S | S | S | N | N | N | N | N | S | S |
| 243.50 | S | O | N | N | N | N | S | S | S | S | N | N | N | N | N | S | S |
| 243.75 | S | S | N | N | N | N | S | S | S | S | O | N | N | N | N | S | S |
| 244.00 | S | S | N | N | N | N | S | S | S | S | S | N | N | N | N | S | S |
| 244.25 | S | S | N | N | N | N | S | S | S | S | S | N | N | N | N | S | S |
| 244.50 | S | S | N | N | N | N | S | S | S | S | S | N | N | N | N | S | S |
| 244.75 | S | S | N | N | N | N | O | S | S | S | S | N | N | N | N | S | S |
| 245.00 | S | S | N | N | N | N | N | S | S | S | S | N | N | N | N | O | S |
| 245.25 | S | S | N | N | N | N | N | S | S | S | S | N | N | N | N | N | S |
| 245.50 | S | S | N | N | N | N | N | S | S | S | S | N | N | N | N | N | S |
| 245.75 | S | S | O | N | N | N | N | S | S | S | S | N | N | N | N | N | S |
| 246.00 | S | S | S | N | N | N | N | S | S | S | S | O | N | N | N | N | S |
| 246.25 | S | S | S | N | N | N | N | S | S | S | S | S | N | N | N | N | S |
| 246.50 | S | S | S | N | N | N | N | S | S | S | S | S | N | N | N | N | S |
| 246.75 | S | S | S | N | N | N | N | S | S | S | S | S | N | N | N | N | S |
| 247.00 | S | S | S | N | N | N | N | O | S | S | S | S | N | N | N | N | S |
| 247.25 | S | S | S | N | N | N | N | N | S | S | S | S | N | N | N | N | O |
| 247.50 | S | S | S | N | N | N | N | N | S | S | S | S | N | N | N | N | N |
| 247.75 | S | S | S | N | N | N | N | N | S | S | S | S | N | N | N | N | N |
| 248.00 | S | S | S | O | N | N | N | N | S | S | S | S | N | N | N | N | N |
| 248.25 | S | S | S | S | N | N | N | N | S | S | S | S | O | N | N | N | N |
| 248.50 | S | S | S | S | N | N | N | N | S | S | S | S | S | N | N | N | N |
| 248.75 | S | S | S | S | N | N | N | N | S | S | S | S | S | N | N | N | N |
| 249.00 | S | S | S | S | N | N | N | N | S | S | S | S | S | N | N | N | N |
| 249.25 | S | S | S | S | N | N | N | N | O | S | S | S | S | N | N | N | N |
| 249.50 | S | S | S | S | N | N | N | N | N | S | S | S | S | N | N | N | N |
| 249.75 | S | S | S | S | N | N | N | N | N | S | S | S | S | N | N | N | N |
| 250.00 | S | S | S | S | N | N | N | N | N | S | S | S | S | N | N | N | N |
| 250.25 | S | S | S | S | O | N | N | N | N | S | S | S | S | N | N | N | N |
| 250.50 | S | S | S | S | S | N | N | N | N | S | S | S | S | O | N | N | N |
| 250.75 | S | S | S | S | S | N | N | N | N | S | S | S | S | S | N | N | N |
| 251.00 | S | S | S | S | S | N | N | N | N | S | S | S | S | S | N | N | N |
| 251.25 | O | S | S | S | S | N | N | N | N | S | S | S | S | S | N | N | N |

-continued

| Coil Excitation | | | | | | | | | | | | | | | | | |
|---|---|---|---|---|---|---|---|---|---|---|---|---|---|---|---|---|---|
| 251.50 | N | S | S | S | S | N | N | N | N | O | S | S | S | S | N | N | N |
| 251.75 | N | S | S | S | S | N | N | N | N | N | S | S | S | S | N | N | N |

Page Row 21, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 240.00 | S | N | N | N | N | S | S | S | S | S | N | N | N | N | S | S | S |
| 240.25 | S | N | N | N | N | S | S | S | S | S | N | N | N | N | S | S | S |
| 240.50 | S | N | N | N | N | S | S | S | S | S | N | N | N | N | S | S | S |
| 240.75 | S | N | N | N | N | O | S | S | S | S | N | N | N | N | S | S | S |
| 241.00 | S | N | N | N | N | N | S | S | S | S | N | N | N | N | O | S | S |
| 241.25 | S | N | N | N | N | N | S | S | S | S | N | N | N | N | N | S | S |
| 241.50 | S | N | N | N | N | N | S | S | S | S | N | N | N | N | N | S | S |
| 241.75 | S | O | N | N | N | N | S | S | S | S | N | N | N | N | N | S | S |
| 242.00 | S | S | N | N | N | N | S | S | S | S | O | N | N | N | N | S | S |
| 242.25 | S | S | N | N | N | N | S | S | S | S | S | N | N | N | N | S | S |
| 242.50 | S | S | N | N | N | N | S | S | S | S | S | N | N | N | N | S | S |
| 242.75 | S | S | N | N | N | N | S | S | S | S | S | N | N | N | N | S | S |
| 243.00 | S | S | N | N | N | N | O | S | S | S | S | N | N | N | N | S | S |
| 243.25 | S | S | N | N | N | N | N | S | S | S | S | N | N | N | N | O | S |
| 243.50 | S | S | N | N | N | N | N | S | S | S | S | N | N | N | N | N | S |
| 243.75 | S | S | N | N | N | N | N | S | S | S | S | N | N | N | N | N | S |
| 244.00 | S | S | O | N | N | N | N | S | S | S | S | N | N | N | N | N | S |
| 244.25 | S | S | S | N | N | N | N | S | S | S | S | O | N | N | N | N | S |
| 244.50 | S | S | S | N | N | N | N | S | S | S | S | S | N | N | N | N | S |
| 244.75 | S | S | S | N | N | N | N | S | S | S | S | S | N | N | N | N | S |
| 245.00 | S | S | S | N | N | N | N | S | S | S | S | S | N | N | N | N | S |
| 245.25 | S | S | S | N | N | N | N | O | S | S | S | S | N | N | N | N | S |
| 245.50 | S | S | S | N | N | N | N | N | S | S | S | S | N | N | N | N | O |
| 245.75 | S | S | S | N | N | N | N | N | S | S | S | S | N | N | N | N | N |
| 246.00 | S | S | S | N | N | N | N | N | S | S | S | S | N | N | N | N | N |
| 246.25 | S | S | S | O | N | N | N | N | S | S | S | S | N | N | N | N | N |
| 246.50 | S | S | S | S | N | N | N | N | S | S | S | S | O | N | N | N | N |
| 246.75 | S | S | S | S | N | N | N | N | S | S | S | S | S | N | N | N | N |
| 247.00 | S | S | S | S | N | N | N | N | S | S | S | S | S | N | N | N | N |
| 247.25 | S | S | S | S | N | N | N | N | S | S | S | S | S | N | N | N | N |
| 247.50 | S | S | S | S | N | N | N | N | O | S | S | S | S | N | N | N | N |
| 247.75 | S | S | S | S | N | N | N | N | N | S | S | S | S | N | N | N | N |
| 248.00 | S | S | S | S | N | N | N | N | N | S | S | S | S | N | N | N | N |
| 248.25 | S | S | S | S | N | N | N | N | N | S | S | S | S | N | N | N | N |
| 248.50 | S | S | S | S | O | N | N | N | N | S | S | S | S | N | N | N | N |
| 248.75 | S | S | S | S | S | N | N | N | N | S | S | S | S | O | N | N | N |
| 249.00 | S | S | S | S | S | N | N | N | N | S | S | S | S | S | N | N | N |
| 249.25 | S | S | S | S | S | N | N | N | N | S | S | S | S | S | N | N | N |
| 249.50 | O | S | S | S | S | N | N | N | N | S | S | S | S | S | N | N | N |
| 249.75 | N | S | S | S | S | N | N | N | N | O | S | S | S | S | N | N | N |
| 250.00 | N | S | S | S | S | N | N | N | N | N | S | S | S | S | N | N | N |
| 250.25 | N | S | S | S | S | N | N | N | N | N | S | S | S | S | N | N | N |
| 250.50 | N | S | S | S | S | N | N | N | N | N | S | S | S | S | N | N | N |
| 250.75 | N | S | S | S | S | O | N | N | N | N | S | S | S | S | N | N | N |
| 251.00 | N | S | S | S | S | S | N | N | N | N | S | S | S | S | O | N | N |
| 251.25 | N | S | S | S | S | S | N | N | N | N | S | S | S | S | S | N | N |
| 251.50 | N | S | S | S | S | S | N | N | N | N | S | S | S | S | S | N | N |
| 251.75 | N | O | S | S | S | S | N | N | N | N | S | S | S | S | S | N | N |

Page Row 21, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 240.00 | S | O | N | N | N | N | S | S | S | S | N | N | N | N | N | S | S |
| 240.25 | S | S | N | N | N | N | S | S | S | S | O | N | N | N | N | S | S |
| 240.50 | S | S | N | N | N | N | S | S | S | S | S | N | N | N | N | S | S |
| 240.75 | S | S | N | N | N | N | S | S | S | S | S | N | N | N | N | S | S |
| 241.00 | S | S | N | N | N | N | S | S | S | S | S | N | N | N | N | S | S |
| 241.25 | S | S | N | N | N | N | O | S | S | S | S | N | N | N | N | S | S |
| 241.50 | S | S | N | N | N | N | N | S | S | S | S | N | N | N | N | O | S |
| 241.75 | S | S | N | N | N | N | N | S | S | S | S | N | N | N | N | N | S |
| 242.00 | S | S | N | N | N | N | N | S | S | S | S | N | N | N | N | N | S |
| 242.25 | S | S | O | N | N | N | N | S | S | S | S | N | N | N | N | N | S |
| 242.50 | S | S | S | N | N | N | N | S | S | S | S | O | N | N | N | N | S |
| 242.75 | S | S | S | N | N | N | N | S | S | S | S | S | N | N | N | N | S |
| 243.00 | S | S | S | N | N | N | N | S | S | S | S | S | N | N | N | N | S |
| 243.25 | S | S | S | N | N | N | N | S | S | S | S | S | N | N | N | N | S |
| 243.50 | S | S | S | N | N | N | N | O | S | S | S | S | N | N | N | N | S |
| 243.75 | S | S | S | N | N | N | N | N | S | S | S | S | N | N | N | N | O |
| 244.00 | S | S | S | N | N | N | N | N | S | S | S | S | N | N | N | N | N |
| 244.25 | S | S | S | N | N | N | N | N | S | S | S | S | N | N | N | N | N |
| 244.50 | S | S | S | O | N | N | N | N | S | S | S | S | N | N | N | N | N |

-continued

| Coil Excitation | | | | | | | | | | | | | | | | | |
|---|---|---|---|---|---|---|---|---|---|---|---|---|---|---|---|---|---|
| 244.75 | S | S | S | S | N | N | N | N | S | S | S | S | O | N | N | N | N |
| 245.00 | S | S | S | S | N | N | N | N | S | S | S | S | S | N | N | N | N |
| 245.25 | S | S | S | S | N | N | N | N | S | S | S | S | S | N | N | N | N |
| 245.50 | S | S | S | S | N | N | N | N | S | S | S | S | S | N | N | N | N |
| 245.75 | S | S | S | S | N | N | N | N | O | S | S | S | S | N | N | N | N |
| 246.00 | S | S | S | S | N | N | N | N | N | S | S | S | S | N | N | N | N |
| 246.25 | S | S | S | S | N | N | N | N | N | S | S | S | S | N | N | N | N |
| 246.50 | S | S | S | S | N | N | N | N | N | S | S | S | S | N | N | N | N |
| 246.75 | S | S | S | S | O | N | N | N | N | S | S | S | S | N | N | N | N |
| 247.00 | S | S | S | S | S | N | N | N | N | S | S | S | S | O | N | N | N |
| 247.25 | S | S | S | S | S | N | N | N | N | S | S | S | S | S | N | N | N |
| 247.50 | S | S | S | S | S | N | N | N | N | S | S | S | S | S | N | N | N |
| 247.75 | O | S | S | S | S | N | N | N | N | S | S | S | S | S | N | N | N |
| 248.00 | N | S | S | S | S | N | N | N | N | O | S | S | S | S | N | N | N |
| 248.25 | N | S | S | S | S | N | N | N | N | N | S | S | S | S | N | N | N |
| 248.50 | N | S | S | S | S | N | N | N | N | N | S | S | S | S | N | N | N |
| 248.75 | N | S | S | S | S | N | N | N | N | N | S | S | S | S | N | N | N |
| 249.00 | N | S | S | S | S | O | N | N | N | N | S | S | S | S | N | N | N |
| 249.25 | N | S | S | S | S | S | N | N | N | N | S | S | S | S | O | N | N |
| 249.50 | N | S | S | S | S | S | N | N | N | N | S | S | S | S | S | N | N |
| 249.75 | N | S | S | S | S | S | N | N | N | N | S | S | S | S | S | N | N |
| 250.00 | N | O | S | S | S | S | N | N | N | N | S | S | S | S | S | N | N |
| 250.25 | N | N | S | S | S | S | N | N | N | N | O | S | S | S | S | N | N |
| 250.50 | N | N | S | S | S | S | N | N | N | N | N | S | S | S | S | N | N |
| 250.75 | N | N | S | S | S | S | N | N | N | N | N | S | S | S | S | N | N |
| 251.00 | N | N | S | S | S | S | N | N | N | N | N | S | S | S | S | N | N |
| 251.25 | N | N | S | S | S | S | O | N | N | N | N | S | S | S | S | N | N |
| 251.50 | N | N | S | S | S | S | S | N | N | N | N | S | S | S | S | O | N |
| 251.75 | N | N | S | S | S | S | S | N | N | N | N | S | S | S | S | S | N |

Page Row 21, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 240.00 | S | S | N | N | N | N | N | S | S | S | S | N | N | N | N | N | S |
| 240.25 | S | S | N | N | N | N | N | S | S | S | S | N | N | N | N | N | S |
| 240.50 | S | S | O | N | N | N | N | S | S | S | S | N | N | N | N | N | S |
| 240.75 | S | S | S | N | N | N | N | S | S | S | S | O | N | N | N | N | S |
| 241.00 | S | S | S | N | N | N | N | S | S | S | S | S | N | N | N | N | S |
| 241.25 | S | S | S | N | N | N | N | S | S | S | S | S | N | N | N | N | S |
| 241.50 | S | S | S | N | N | N | N | S | S | S | S | S | N | N | N | N | S |
| 241.75 | S | S | S | N | N | N | N | O | S | S | S | S | N | N | N | N | S |
| 242.00 | S | S | S | N | N | N | N | N | S | S | S | S | N | N | N | N | O |
| 242.25 | S | S | S | N | N | N | N | N | S | S | S | S | N | N | N | N | N |
| 242.50 | S | S | S | N | N | N | N | N | S | S | S | S | N | N | N | N | N |
| 242.75 | S | S | S | O | N | N | N | N | S | S | S | S | N | N | N | N | N |
| 243.00 | S | S | S | S | N | N | N | N | S | S | S | S | O | N | N | N | N |
| 243.25 | S | S | S | S | N | N | N | N | S | S | S | S | S | N | N | N | N |
| 243.50 | S | S | S | S | N | N | N | N | S | S | S | S | S | N | N | N | N |
| 243.75 | S | S | S | S | N | N | N | N | S | S | S | S | S | N | N | N | N |
| 244.00 | S | S | S | S | N | N | N | N | O | S | S | S | S | N | N | N | N |
| 244.25 | S | S | S | S | N | N | N | N | N | S | S | S | S | N | N | N | N |
| 244.50 | S | S | S | S | N | N | N | N | N | S | S | S | S | N | N | N | N |
| 244.75 | S | S | S | S | N | N | N | N | N | S | S | S | S | N | N | N | N |
| 245.00 | S | S | S | S | O | N | N | N | N | S | S | S | S | N | N | N | N |
| 245.25 | S | S | S | S | S | N | N | N | N | S | S | S | S | O | N | N | N |
| 245.50 | S | S | S | S | S | N | N | N | N | S | S | S | S | S | N | N | N |
| 245.75 | S | S | S | S | S | N | N | N | N | S | S | S | S | S | N | N | N |
| 246.00 | O | S | S | S | S | N | N | N | N | S | S | S | S | S | N | N | N |
| 246.25 | N | S | S | S | S | N | N | N | N | O | S | S | S | S | N | N | N |
| 246.50 | N | S | S | S | S | N | N | N | N | N | S | S | S | S | N | N | N |
| 246.75 | N | S | S | S | S | N | N | N | N | N | S | S | S | S | N | N | N |
| 247.00 | N | S | S | S | S | N | N | N | N | N | S | S | S | S | N | N | N |
| 247.25 | N | S | S | S | S | O | N | N | N | N | S | S | S | S | N | N | N |
| 247.50 | N | S | S | S | S | S | N | N | N | N | S | S | S | S | O | N | N |
| 247.75 | N | S | S | S | S | S | N | N | N | N | S | S | S | S | S | N | N |
| 248.00 | N | S | S | S | S | S | N | N | N | N | S | S | S | S | S | N | N |
| 248.25 | N | O | S | S | S | S | N | N | N | N | S | S | S | S | S | N | N |
| 248.50 | N | N | S | S | S | S | N | N | N | N | O | S | S | S | S | N | N |
| 248.75 | N | N | S | S | S | S | N | N | N | N | N | S | S | S | S | N | N |
| 249.00 | N | N | S | S | S | S | N | N | N | N | N | S | S | S | S | N | N |
| 249.25 | N | N | S | S | S | S | N | N | N | N | N | S | S | S | S | N | N |
| 249.50 | N | N | S | S | S | S | O | N | N | N | N | S | S | S | S | N | N |
| 249.75 | N | N | S | S | S | S | S | N | N | N | N | S | S | S | S | O | N |
| 250.00 | N | N | S | S | S | S | S | N | N | N | N | S | S | S | S | S | N |
| 250.25 | N | N | S | S | S | S | S | N | N | N | N | S | S | S | S | S | N |
| 250.50 | N | N | O | S | S | S | S | N | N | N | N | S | S | S | S | S | N |
| 250.75 | N | N | N | S | S | S | S | N | N | N | N | O | S | S | S | S | N |

-continued

| Coil Excitation | | | | | | | | | | | | | | | | | |
|---|---|---|---|---|---|---|---|---|---|---|---|---|---|---|---|---|---|
| 251.00 | N | N | N | S | S | S | S | N | N | N | N | N | S | S | S | S | N |
| 251.25 | N | N | N | S | S | S | S | N | N | N | N | N | S | S | S | S | N |
| 251.50 | N | N | N | S | S | S | S | N | N | N | N | N | S | S | S | S | N |
| 251.75 | N | N | N | S | S | S | S | O | N | N | N | N | S | S | S | S | N |

Page Row 21, Page Column 9

| Coil | 154 | 155 | 156 | 157 | 158 | 159 | 160 |
|---|---|---|---|---|---|---|---|
| 240.00 | S | S | S | N | N | N | N |
| 240.25 | S | S | S | N | N | N | N |
| 240.50 | S | S | S | N | N | N | N |
| 240.75 | S | S | S | N | N | N | N |
| 241.00 | S | S | S | O | N | N | N |
| 241.25 | S | S | S | S | N | N | N |
| 241.50 | S | S | S | S | N | N | N |
| 241.75 | S | S | S | S | N | N | N |
| 242.00 | S | S | S | S | N | N | N |
| 242.25 | S | S | S | S | N | N | N |
| 242.50 | S | S | S | S | N | N | N |
| 242.75 | S | S | S | S | N | N | N |
| 243.00 | S | S | S | S | N | N | N |
| 243.25 | S | S | S | S | O | N | N |
| 243.50 | S | S | S | S | S | N | N |
| 243.75 | S | S | S | S | S | N | N |
| 244.00 | S | S | S | S | S | N | N |
| 244.25 | O | S | S | S | S | N | N |
| 244.50 | N | S | S | S | S | N | N |
| 244.75 | N | S | S | S | S | N | N |
| 245.00 | N | S | S | S | S | N | N |
| 245.25 | N | S | S | S | S | N | N |
| 245.50 | N | S | S | S | S | O | N |
| 245.75 | N | S | S | S | S | S | N |
| 246.00 | N | S | S | S | S | S | N |
| 246.25 | N | S | S | S | S | S | N |
| 246.50 | N | O | S | S | S | S | N |
| 246.75 | N | N | S | S | S | S | N |
| 247.00 | N | N | S | S | S | S | N |
| 247.25 | N | N | S | S | S | S | N |
| 247.50 | N | N | S | S | S | S | N |
| 247.75 | N | N | S | S | S | S | O |
| 248.00 | N | N | S | S | S | S | S |
| 248.25 | N | N | S | S | S | S | S |
| 248.50 | N | N | S | S | S | S | S |
| 248.75 | N | N | O | S | S | S | S |
| 249.00 | N | N | N | S | S | S | S |
| 249.25 | N | N | N | S | S | S | S |
| 249.50 | N | N | N | S | S | S | S |
| 249.75 | N | N | N | S | S | S | S |
| 250.00 | N | N | N | S | S | S | S |
| 250.25 | N | N | N | S | S | S | S |
| 250.50 | N | N | N | S | S | S | S |
| 250.75 | N | N | N | S | S | S | S |
| 251.00 | N | N | N | O | S | S | S |
| 251.25 | N | N | N | N | S | S | S |
| 251.50 | N | N | N | N | S | S | S |
| 251.75 | N | N | N | N | S | S | S |

Page Row 21, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 252.00 | S | N | N | N | N | N | S | S | S | S | N | N | N | N | N | S | S |
| 252.25 | S | O | N | N | N | N | S | S | S | S | N | N | N | N | N | S | S |
| 252.50 | S | S | N | N | N | N | S | S | S | S | O | N | N | N | N | S | S |
| 252.75 | S | S | N | N | N | N | S | S | S | S | S | N | N | N | N | S | S |
| 253.00 | S | S | N | N | N | N | S | S | S | S | S | N | N | N | N | S | S |
| 253.25 | S | S | N | N | N | N | S | S | S | S | S | N | N | N | N | S | S |
| 253.50 | S | S | N | N | N | N | O | S | S | S | S | N | N | N | N | S | S |
| 253.75 | S | S | N | N | N | N | N | S | S | S | S | N | N | N | N | O | S |
| 254.00 | S | S | N | N | N | N | N | S | S | S | S | N | N | N | N | N | S |
| 254.25 | S | S | N | N | N | N | N | S | S | S | S | N | N | N | N | N | S |
| 254.50 | S | S | O | N | N | N | N | S | S | S | S | N | N | N | N | N | S |
| 254.75 | S | S | S | N | N | N | N | S | S | S | S | O | N | N | N | N | S |
| 255.00 | S | S | S | N | N | N | N | S | S | S | S | S | N | N | N | N | S |
| 255.25 | S | S | S | N | N | N | N | S | S | S | S | S | N | N | N | N | S |
| 255.50 | S | S | S | N | N | N | N | S | S | S | S | S | N | N | N | N | S |
| 255.75 | S | S | S | N | N | N | N | O | S | S | S | S | N | N | N | N | S |
| 256.00 | S | S | S | N | N | N | N | N | S | S | S | S | N | N | N | N | O |

-continued

Coil Excitation

| | | | | | | | | | | | | | | | | | |
|---|---|---|---|---|---|---|---|---|---|---|---|---|---|---|---|---|---|
| 256.25 | S | S | S | N | N | N | N | N | S | S | S | S | N | N | N | N | N |
| 256.50 | S | S | S | N | N | N | N | N | S | S | S | S | N | N | N | N | N |
| 256.75 | S | S | S | O | N | N | N | N | S | S | S | S | N | N | N | N | N |
| 257.00 | S | S | S | S | N | N | N | N | S | S | S | S | O | N | N | N | N |
| 257.25 | S | S | S | S | N | N | N | N | S | S | S | S | S | N | N | N | N |
| 257.50 | S | S | S | S | N | N | N | N | S | S | S | S | S | N | N | N | N |
| 257.75 | S | S | S | S | N | N | N | N | S | S | S | S | S | N | N | N | N |
| 258.00 | S | S | S | S | N | N | N | N | O | S | S | S | S | N | N | N | N |
| 258.25 | S | S | S | S | N | N | N | N | N | S | S | S | S | N | N | N | N |
| 258.50 | S | S | S | S | N | N | N | N | N | S | S | S | S | N | N | N | N |
| 258.75 | S | S | S | S | N | N | N | N | N | S | S | S | S | N | N | N | N |
| 259.00 | S | S | S | S | O | N | N | N | N | S | S | S | S | N | N | N | N |
| 259.25 | S | S | S | S | S | N | N | N | N | S | S | S | S | O | N | N | N |
| 259.50 | S | S | S | S | S | N | N | N | N | S | S | S | S | S | N | N | N |
| 259.75 | S | S | S | S | S | N | N | N | N | S | S | S | S | S | N | N | N |
| 260.00 | O | S | S | S | S | N | N | N | N | S | S | S | S | S | N | N | N |
| 260.25 | N | S | S | S | S | N | N | N | N | O | S | S | S | S | N | N | N |
| 260.50 | N | S | S | S | S | N | N | N | N | N | S | S | S | S | N | N | N |
| 260.75 | N | S | S | S | S | N | N | N | N | N | S | S | S | S | N | N | N |
| 261.00 | N | S | S | S | S | N | N | N | N | N | S | S | S | S | N | N | N |
| 261.25 | N | S | S | S | S | O | N | N | N | N | S | S | S | S | N | N | N |
| 261.50 | N | S | S | S | S | S | N | N | N | N | S | S | S | S | O | N | N |
| 261.75 | N | S | S | S | S | S | N | N | N | N | S | S | S | S | S | N | N |
| 262.00 | N | S | S | S | S | S | N | N | N | N | S | S | S | S | S | N | N |
| 262.25 | N | O | S | S | S | S | N | N | N | N | S | S | S | S | S | N | N |
| 262.50 | N | N | S | S | S | S | N | N | N | N | O | S | S | S | S | N | N |
| 262.75 | N | N | S | S | S | S | N | N | N | N | N | S | S | S | S | N | N |
| 263.00 | N | N | S | S | S | S | N | N | N | N | N | S | S | S | S | N | N |
| 263.25 | N | N | S | S | S | S | N | N | N | N | N | S | S | S | S | N | N |
| 263.50 | N | N | S | S | S | S | O | N | N | N | N | S | S | S | S | N | N |
| 263.75 | N | N | S | S | S | S | S | N | N | N | N | S | S | S | S | O | N |

Page Row 22, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 252.00 | S | S | N | N | N | N | N | S | S | S | S | N | N | N | N | O | S |
| 252.25 | S | S | N | N | N | N | N | S | S | S | S | N | N | N | N | N | S |
| 252.50 | S | S | N | N | N | N | N | S | S | S | S | N | N | N | N | N | S |
| 252.75 | S | S | O | N | N | N | N | S | S | S | S | N | N | N | N | N | S |
| 253.00 | S | S | S | N | N | N | N | S | S | S | S | O | N | N | N | N | S |
| 253.25 | S | S | S | N | N | N | N | S | S | S | S | S | N | N | N | N | S |
| 253.50 | S | S | S | N | N | N | N | S | S | S | S | S | N | N | N | N | S |
| 253.75 | S | S | S | N | N | N | N | S | S | S | S | S | N | N | N | N | S |
| 254.00 | S | S | S | N | N | N | N | O | S | S | S | S | N | N | N | N | S |
| 254.25 | S | S | S | N | N | N | N | N | S | S | S | S | N | N | N | N | O |
| 254.50 | S | S | S | N | N | N | N | N | S | S | S | S | N | N | N | N | N |
| 254.75 | S | S | S | N | N | N | N | N | S | S | S | S | N | N | N | N | N |
| 255.00 | S | S | S | O | N | N | N | N | S | S | S | S | N | N | N | N | N |
| 255.25 | S | S | S | S | N | N | N | N | S | S | S | S | O | N | N | N | N |
| 255.50 | S | S | S | S | N | N | N | N | S | S | S | S | S | N | N | N | N |
| 255.75 | S | S | S | S | N | N | N | N | S | S | S | S | S | N | N | N | N |
| 256.00 | S | S | S | S | N | N | N | N | S | S | S | S | S | N | N | N | N |
| 256.25 | S | S | S | S | N | N | N | N | O | S | S | S | S | N | N | N | N |
| 256.50 | S | S | S | S | N | N | N | N | N | S | S | S | S | N | N | N | N |
| 256.75 | S | S | S | S | N | N | N | N | N | S | S | S | S | N | N | N | N |
| 257.00 | S | S | S | S | N | N | N | N | N | S | S | S | S | N | N | N | N |
| 257.25 | S | S | S | S | O | N | N | N | N | S | S | S | S | N | N | N | N |
| 257.50 | S | S | S | S | S | N | N | N | N | S | S | S | S | O | N | N | N |
| 257.75 | S | S | S | S | S | N | N | N | N | S | S | S | S | S | N | N | N |
| 258.00 | S | S | S | S | S | N | N | N | N | S | S | S | S | S | N | N | N |
| 258.25 | O | S | S | S | S | N | N | N | N | S | S | S | S | S | N | N | N |
| 258.50 | N | S | S | S | S | N | N | N | N | O | S | S | S | S | N | N | N |
| 258.75 | N | S | S | S | S | N | N | N | N | N | S | S | S | S | N | N | N |
| 259.00 | N | S | S | S | S | N | N | N | N | N | S | S | S | S | N | N | N |
| 259.25 | N | S | S | S | S | N | N | N | N | N | S | S | S | S | N | N | N |
| 259.50 | N | S | S | S | S | O | N | N | N | N | S | S | S | S | N | N | N |
| 259.75 | N | S | S | S | S | S | N | N | N | N | S | S | S | S | O | N | N |
| 260.00 | N | S | S | S | S | S | N | N | N | N | S | S | S | S | S | N | N |
| 260.25 | N | S | S | S | S | S | N | N | N | N | S | S | S | S | S | N | N |
| 260.50 | N | O | S | S | S | S | N | N | N | N | S | S | S | S | S | N | N |
| 260.75 | N | N | S | S | S | S | N | N | N | N | O | S | S | S | S | N | N |
| 261.00 | N | N | S | S | S | S | N | N | N | N | N | S | S | S | S | N | N |
| 261.25 | N | N | S | S | S | S | N | N | N | N | N | S | S | S | S | N | N |
| 261.50 | N | N | S | S | S | S | N | N | N | N | N | S | S | S | S | N | N |
| 261.75 | N | N | S | S | S | S | O | N | N | N | N | S | S | S | S | N | N |
| 262.00 | N | N | S | S | S | S | S | N | N | N | N | S | S | S | S | O | N |
| 262.25 | N | N | S | S | S | S | S | N | N | N | N | S | S | S | S | S | N |

-continued

| Coil Excitation | | | | | | | | | | | | | | | | | |
|---|---|---|---|---|---|---|---|---|---|---|---|---|---|---|---|---|---|
| 262.50 | N | N | S | S | S | S | S | N | N | N | N | S | S | S | S | S | N |
| 262.75 | N | N | O | S | S | S | S | N | N | N | N | S | S | S | S | S | N |
| 263.00 | N | N | N | S | S | S | S | N | N | N | N | O | S | S | S | S | N |
| 263.25 | N | N | N | S | S | S | S | N | N | N | N | N | S | S | S | S | N |
| 263.50 | N | N | N | S | S | S | S | N | N | N | N | N | S | S | S | S | N |
| 263.75 | N | N | N | S | S | S | S | N | N | N | N | N | S | S | S | S | N |

Page Row 22, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 252.00 | S | S | S | N | N | N | N | S | S | S | S | S | N | N | N | N | S |
| 252.25 | S | S | S | N | N | N | N | O | S | S | S | S | N | N | N | N | S |
| 252.50 | S | S | S | N | N | N | N | N | S | S | S | S | N | N | N | N | O |
| 252.75 | S | S | S | N | N | N | N | N | S | S | S | S | N | N | N | N | N |
| 253.00 | S | S | S | N | N | N | N | N | S | S | S | S | N | N | N | N | N |
| 253.25 | S | S | S | O | N | N | N | N | S | S | S | S | N | N | N | N | N |
| 253.50 | S | S | S | S | N | N | N | N | S | S | S | S | O | N | N | N | N |
| 253.75 | S | S | S | S | N | N | N | N | S | S | S | S | S | N | N | N | N |
| 254.00 | S | S | S | S | N | N | N | N | S | S | S | S | S | N | N | N | N |
| 254.25 | S | S | S | S | N | N | N | N | S | S | S | S | S | N | N | N | N |
| 254.50 | S | S | S | S | N | N | N | N | O | S | S | S | S | N | N | N | N |
| 254.75 | S | S | S | S | N | N | N | N | N | S | S | S | S | N | N | N | N |
| 255.00 | S | S | S | S | N | N | N | N | N | S | S | S | S | N | N | N | N |
| 255.25 | S | S | S | S | N | N | N | N | N | S | S | S | S | N | N | N | N |
| 255.50 | S | S | S | S | O | N | N | N | N | S | S | S | S | N | N | N | N |
| 255.75 | S | S | S | S | S | N | N | N | N | S | S | S | S | O | N | N | N |
| 256.00 | S | S | S | S | S | N | N | N | N | S | S | S | S | S | N | N | N |
| 256.25 | S | S | S | S | S | N | N | N | N | S | S | S | S | S | N | N | N |
| 256.50 | O | S | S | S | S | N | N | N | N | S | S | S | S | S | N | N | N |
| 256.75 | N | S | S | S | S | N | N | N | N | O | S | S | S | S | N | N | N |
| 257.00 | N | S | S | S | S | N | N | N | N | N | S | S | S | S | N | N | N |
| 257.25 | N | S | S | S | S | N | N | N | N | N | S | S | S | S | N | N | N |
| 257.50 | N | S | S | S | S | N | N | N | N | N | S | S | S | S | N | N | N |
| 257.75 | N | S | S | S | S | O | N | N | N | N | S | S | S | S | N | N | N |
| 258.00 | N | S | S | S | S | S | N | N | N | N | S | S | S | S | O | N | N |
| 258.25 | N | S | S | S | S | S | N | N | N | N | S | S | S | S | S | N | N |
| 258.50 | N | S | S | S | S | S | N | N | N | N | S | S | S | S | S | N | N |
| 258.75 | N | O | S | S | S | S | N | N | N | N | S | S | S | S | S | N | N |
| 259.00 | N | N | S | S | S | S | N | N | N | N | O | S | S | S | S | N | N |
| 259.25 | N | N | S | S | S | S | N | N | N | N | N | S | S | S | S | N | N |
| 259.50 | N | N | S | S | S | S | N | N | N | N | N | S | S | S | S | N | N |
| 259.75 | N | N | S | S | S | S | N | N | N | N | N | S | S | S | S | N | N |
| 260.00 | N | N | S | S | S | S | O | N | N | N | N | S | S | S | S | N | N |
| 260.25 | N | N | S | S | S | S | S | N | N | N | N | S | S | S | S | O | N |
| 260.50 | N | N | S | S | S | S | S | N | N | N | N | S | S | S | S | S | N |
| 260.75 | N | N | S | S | S | S | S | N | N | N | N | S | S | S | S | S | N |
| 261.00 | N | N | O | S | S | S | S | N | N | N | N | S | S | S | S | S | N |
| 261.25 | N | N | N | S | S | S | S | N | N | N | N | O | S | S | S | S | N |
| 261.50 | N | N | N | S | S | S | S | N | N | N | N | N | S | S | S | S | N |
| 261.75 | N | N | N | S | S | S | S | N | N | N | N | N | S | S | S | S | N |
| 262.00 | N | N | N | S | S | S | S | N | N | N | N | N | S | S | S | S | N |
| 262.25 | N | N | N | S | S | S | S | O | N | N | N | N | S | S | S | S | N |
| 262.50 | N | N | N | S | S | S | S | S | N | N | N | N | S | S | S | S | O |
| 262.75 | N | N | N | S | S | S | S | S | N | N | N | N | S | S | S | S | S |
| 263.00 | N | N | N | S | S | S | S | S | N | N | N | N | S | S | S | S | S |
| 263.25 | N | N | N | O | S | S | S | S | N | N | N | N | S | S | S | S | S |
| 263.50 | N | N | N | N | S | S | S | S | N | N | N | N | O | S | S | S | S |
| 263.75 | N | N | N | N | S | S | S | S | N | N | N | N | N | S | S | S | S |

Page Row 22, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 252.00 | S | S | S | S | N | N | N | N | S | S | S | S | S | N | N | N | N |
| 252.25 | S | S | S | S | N | N | N | N | S | S | S | S | S | N | N | N | N |
| 252.50 | S | S | S | S | N | N | N | N | S | S | S | S | S | N | N | N | N |
| 252.75 | S | S | S | S | N | N | N | N | O | S | S | S | S | N | N | N | N |
| 253.00 | S | S | S | S | N | N | N | N | N | S | S | S | S | N | N | N | N |
| 253.25 | S | S | S | S | N | N | N | N | N | S | S | S | S | N | N | N | N |
| 253.50 | S | S | S | S | N | N | N | N | N | S | S | S | S | N | N | N | N |
| 253.75 | S | S | S | S | O | N | N | N | N | S | S | S | S | N | N | N | N |
| 254.00 | S | S | S | S | S | N | N | N | N | S | S | S | S | O | N | N | N |
| 254.25 | S | S | S | S | S | N | N | N | N | S | S | S | S | S | N | N | N |
| 254.50 | S | S | S | S | S | N | N | N | N | S | S | S | S | S | N | N | N |
| 254.75 | O | S | S | S | S | N | N | N | N | S | S | S | S | S | N | N | N |
| 255.00 | N | S | S | S | S | N | N | N | N | O | S | S | S | S | N | N | N |
| 255.25 | N | S | S | S | S | N | N | N | N | N | S | S | S | S | N | N | N |
| 255.50 | N | S | S | S | S | N | N | N | N | N | S | S | S | S | N | N | N |

-continued

| Coil Excitation | | | | | | | | | | | | | | | | | |
|---|---|---|---|---|---|---|---|---|---|---|---|---|---|---|---|---|---|
| 255.75 | N | S | S | S | S | N | N | N | N | N | S | S | S | S | N | N | N |
| 256.00 | N | S | S | S | S | O | N | N | N | N | S | S | S | S | N | N | N |
| 256.25 | N | S | S | S | S | S | N | N | N | N | S | S | S | S | O | N | N |
| 256.50 | N | S | S | S | S | S | N | N | N | N | S | S | S | S | S | N | N |
| 256.75 | N | S | S | S | S | S | N | N | N | N | S | S | S | S | S | N | N |
| 257.00 | N | O | S | S | S | S | N | N | N | N | S | S | S | S | S | N | N |
| 257.25 | N | N | S | S | S | S | N | N | N | N | O | S | S | S | S | N | N |
| 257.50 | N | N | S | S | S | S | N | N | N | N | N | S | S | S | S | N | N |
| 257.75 | N | N | S | S | S | S | N | N | N | N | N | S | S | S | S | N | N |
| 258.00 | N | N | S | S | S | S | N | N | N | N | N | S | S | S | S | N | N |
| 258.25 | N | N | S | S | S | S | O | N | N | N | N | S | S | S | S | N | N |
| 258.50 | N | N | S | S | S | S | S | N | N | N | N | S | S | S | S | O | N |
| 258.75 | N | N | S | S | S | S | S | N | N | N | N | S | S | S | S | S | N |
| 259.00 | N | N | S | S | S | S | S | N | N | N | N | S | S | S | S | S | N |
| 259.25 | N | N | O | S | S | S | S | N | N | N | N | S | S | S | S | S | N |
| 259.50 | N | N | N | S | S | S | S | N | N | N | N | O | S | S | S | S | N |
| 259.75 | N | N | N | S | S | S | S | N | N | N | N | N | S | S | S | S | N |
| 260.00 | N | N | N | S | S | S | S | N | N | N | N | N | S | S | S | S | N |
| 260.25 | N | N | N | S | S | S | S | N | N | N | N | N | S | S | S | S | N |
| 260.50 | N | N | N | S | S | S | S | O | N | N | N | N | S | S | S | S | N |
| 260.75 | N | N | N | S | S | S | S | S | N | N | N | N | S | S | S | S | O |
| 261.00 | N | N | N | S | S | S | S | S | N | N | N | N | S | S | S | S | S |
| 261.25 | N | N | N | S | S | S | S | S | N | N | N | N | S | S | S | S | S |
| 261.50 | N | N | N | O | S | S | S | S | N | N | N | N | S | S | S | S | S |
| 261.75 | N | N | N | N | S | S | S | S | N | N | N | N | O | S | S | S | S |
| 262.00 | N | N | N | N | S | S | S | S | N | N | N | N | N | S | S | S | S |
| 262.25 | N | N | N | N | S | S | S | S | N | N | N | N | N | S | S | S | S |
| 262.50 | N | N | N | N | S | S | S | S | N | N | N | N | N | S | S | S | S |
| 262.75 | N | N | N | N | S | S | S | S | O | N | N | N | N | S | S | S | S |
| 263.00 | N | N | N | N | S | S | S | S | S | N | N | N | N | S | S | S | S |
| 263.25 | N | N | N | N | S | S | S | S | S | N | N | N | N | S | S | S | S |
| 263.50 | N | N | N | N | S | S | S | S | S | N | N | N | N | S | S | S | S |
| 263.75 | N | N | N | N | O | S | S | S | S | N | N | N | N | S | S | S | S |

Page Row 22, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 252.00 | S | S | S | S | O | N | N | N | N | S | S | S | S | N | N | N | N |
| 252.25 | S | S | S | S | S | N | N | N | N | S | S | S | S | O | N | N | N |
| 252.50 | S | S | S | S | S | N | N | N | N | S | S | S | S | S | N | N | N |
| 252.75 | S | S | S | S | S | N | N | N | N | S | S | S | S | S | N | N | N |
| 253.00 | O | S | S | S | S | N | N | N | N | S | S | S | S | S | N | N | N |
| 253.25 | N | S | S | S | S | N | N | N | N | O | S | S | S | S | N | N | N |
| 253.50 | N | S | S | S | S | N | N | N | N | N | S | S | S | S | N | N | N |
| 253.75 | N | S | S | S | S | N | N | N | N | N | S | S | S | S | N | N | N |
| 254.00 | N | S | S | S | S | N | N | N | N | N | S | S | S | S | N | N | N |
| 254.25 | N | S | S | S | S | O | N | N | N | N | S | S | S | S | N | N | N |
| 254.50 | N | S | S | S | S | S | N | N | N | N | S | S | S | S | O | N | N |
| 254.75 | N | S | S | S | S | S | N | N | N | N | S | S | S | S | S | N | N |
| 255.00 | N | S | S | S | S | S | N | N | N | N | S | S | S | S | S | N | N |
| 255.25 | N | O | S | S | S | S | N | N | N | N | S | S | S | S | S | N | N |
| 255.50 | N | N | S | S | S | S | N | N | N | N | O | S | S | S | S | N | N |
| 255.75 | N | N | S | S | S | S | N | N | N | N | N | S | S | S | S | N | N |
| 256.00 | N | N | S | S | S | S | N | N | N | N | N | S | S | S | S | N | N |
| 256.25 | N | N | S | S | S | S | N | N | N | N | N | S | S | S | S | N | N |
| 256.50 | N | N | S | S | S | S | O | N | N | N | N | S | S | S | S | N | N |
| 256.75 | N | N | S | S | S | S | S | N | N | N | N | S | S | S | S | O | N |
| 257.00 | N | N | S | S | S | S | S | N | N | N | N | S | S | S | S | S | N |
| 257.25 | N | N | S | S | S | S | S | N | N | N | N | S | S | S | S | S | N |
| 257.50 | N | N | O | S | S | S | S | N | N | N | N | S | S | S | S | S | N |
| 257.75 | N | N | N | S | S | S | S | N | N | N | N | O | S | S | S | S | N |
| 258.00 | N | N | N | S | S | S | S | N | N | N | N | N | S | S | S | S | N |
| 258.25 | N | N | N | S | S | S | S | N | N | N | N | N | S | S | S | S | N |
| 258.50 | N | N | N | S | S | S | S | N | N | N | N | N | S | S | S | S | N |
| 258.75 | N | N | N | S | S | S | S | O | N | N | N | N | S | S | S | S | N |
| 259.00 | N | N | N | S | S | S | S | S | N | N | N | N | S | S | S | S | O |
| 259.25 | N | N | N | S | S | S | S | S | N | N | N | N | S | S | S | S | S |
| 259.50 | N | N | N | S | S | S | S | S | N | N | N | N | S | S | S | S | S |
| 259.75 | N | N | N | O | S | S | S | S | N | N | N | N | S | S | S | S | S |
| 260.00 | N | N | N | N | S | S | S | S | N | N | N | N | O | S | S | S | S |
| 260.25 | N | N | N | N | S | S | S | S | N | N | N | N | N | S | S | S | S |
| 260.50 | N | N | N | N | S | S | S | S | N | N | N | N | N | S | S | S | S |
| 260.75 | N | N | N | N | S | S | S | S | N | N | N | N | N | S | S | S | S |
| 261.00 | N | N | N | N | S | S | S | S | O | N | N | N | N | S | S | S | S |
| 261.25 | N | N | N | N | S | S | S | S | S | N | N | N | N | S | S | S | S |
| 261.50 | N | N | N | N | S | S | S | S | S | N | N | N | N | S | S | S | S |
| 261.75 | N | N | N | N | S | S | S | S | S | N | N | N | N | S | S | S | S |

-continued

Coil Excitation

| | | | | | | | | | | | | | | | | | |
|---|---|---|---|---|---|---|---|---|---|---|---|---|---|---|---|---|---|
| 262.00 | N | N | N | N | O | S | S | S | S | N | N | N | N | S | S | S | S |
| 262.25 | N | N | N | N | N | S | S | S | S | N | N | N | N | O | S | S | S |
| 262.50 | N | N | N | N | N | S | S | S | S | N | N | N | N | N | S | S | S |
| 262.75 | N | N | N | N | N | S | S | S | S | N | N | N | N | N | S | S | S |
| 263.00 | O | N | N | N | N | S | S | S | S | N | N | N | N | N | S | S | S |
| 263.25 | S | N | N | N | N | S | S | S | S | O | N | N | N | N | S | S | S |
| 263.50 | S | N | N | N | N | S | S | S | S | S | N | N | N | N | S | S | S |
| 263.75 | S | N | N | N | N | S | S | S | S | S | N | N | N | N | S | S | S |

Page Row 22, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 252.00 | N | S | S | S | S | N | N | N | N | N | S | S | S | S | N | N | N |
| 252.25 | N | S | S | S | S | N | N | N | N | N | S | S | S | S | N | N | N |
| 252.50 | N | S | S | S | S | O | N | N | N | N | S | S | S | S | N | N | N |
| 252.75 | N | S | S | S | S | S | N | N | N | N | S | S | S | S | O | N | N |
| 253.00 | N | S | S | S | S | S | N | N | N | N | S | S | S | S | S | N | N |
| 253.25 | N | S | S | S | S | S | N | N | N | N | S | S | S | S | S | N | N |
| 253.50 | N | O | S | S | S | S | N | N | N | N | S | S | S | S | S | N | N |
| 253.75 | N | N | S | S | S | S | N | N | N | N | O | S | S | S | S | N | N |
| 254.00 | N | N | S | S | S | S | N | N | N | N | N | S | S | S | S | N | N |
| 254.25 | N | N | S | S | S | S | N | N | N | N | N | S | S | S | S | N | N |
| 254.50 | N | N | S | S | S | S | N | N | N | N | N | S | S | S | S | N | N |
| 254.75 | N | N | S | S | S | S | O | N | N | N | N | S | S | S | S | N | N |
| 255.00 | N | N | S | S | S | S | S | N | N | N | N | S | S | S | S | O | N |
| 255.25 | N | N | S | S | S | S | S | N | N | N | N | S | S | S | S | S | N |
| 255.50 | N | N | S | S | S | S | S | N | N | N | N | S | S | S | S | S | N |
| 255.75 | N | N | O | S | S | S | S | N | N | N | N | S | S | S | S | S | N |
| 256.00 | N | N | N | S | S | S | S | N | N | N | N | O | S | S | S | S | N |
| 256.25 | N | N | N | S | S | S | S | N | N | N | N | N | S | S | S | S | N |
| 256.50 | N | N | N | S | S | S | S | N | N | N | N | N | S | S | S | S | N |
| 256.75 | N | N | N | S | S | S | S | N | N | N | N | N | S | S | S | S | N |
| 257.00 | N | N | N | S | S | S | S | O | N | N | N | N | S | S | S | S | N |
| 257.25 | N | N | N | S | S | S | S | S | N | N | N | N | S | S | S | S | O |
| 257.50 | N | N | N | S | S | S | S | S | N | N | N | N | S | S | S | S | S |
| 257.75 | N | N | N | S | S | S | S | S | N | N | N | N | S | S | S | S | S |
| 258.00 | N | N | N | O | S | S | S | S | N | N | N | N | S | S | S | S | S |
| 258.25 | N | N | N | N | S | S | S | S | N | N | N | N | O | S | S | S | S |
| 258.50 | N | N | N | N | S | S | S | S | N | N | N | N | N | S | S | S | S |
| 258.75 | N | N | N | N | S | S | S | S | N | N | N | N | N | S | S | S | S |
| 259.00 | N | N | N | N | S | S | S | S | N | N | N | N | N | S | S | S | S |
| 259.25 | N | N | N | N | S | S | S | S | O | N | N | N | N | S | S | S | S |
| 259.50 | N | N | N | N | S | S | S | S | S | N | N | N | N | S | S | S | S |
| 259.75 | N | N | N | N | S | S | S | S | S | N | N | N | N | S | S | S | S |
| 260.00 | N | N | N | N | S | S | S | S | S | N | N | N | N | S | S | S | S |
| 260.25 | N | N | N | N | O | S | S | S | S | N | N | N | N | S | S | S | S |
| 260.50 | N | N | N | N | N | S | S | S | S | N | N | N | N | O | S | S | S |
| 260.75 | N | N | N | N | N | S | S | S | S | N | N | N | N | N | S | S | S |
| 261.00 | N | N | N | N | N | S | S | S | S | N | N | N | N | N | S | S | S |
| 261.25 | O | N | N | N | N | S | S | S | S | N | N | N | N | N | S | S | S |
| 261.50 | S | N | N | N | N | S | S | S | S | O | N | N | N | N | S | S | S |
| 261.75 | S | N | N | N | N | S | S | S | S | S | N | N | N | N | S | S | S |
| 262.00 | S | N | N | N | N | S | S | S | S | S | N | N | N | N | S | S | S |
| 262.25 | S | N | N | N | N | S | S | S | S | S | N | N | N | N | S | S | S |
| 262.50 | S | N | N | N | N | O | S | S | S | S | N | N | N | N | S | S | S |
| 262.75 | S | N | N | N | N | N | S | S | S | S | N | N | N | N | O | S | S |
| 263.00 | S | N | N | N | N | N | S | S | S | S | N | N | N | N | N | S | S |
| 263.25 | S | N | N | N | N | N | S | S | S | S | N | N | N | N | N | S | S |
| 263.50 | S | O | N | N | N | N | S | S | S | S | N | N | N | N | N | S | S |
| 263.75 | S | S | N | N | N | N | S | S | S | S | O | N | N | N | N | S | S |

Page Row 22, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 252.00 | N | N | S | S | S | S | N | N | N | N | O | S | S | S | S | N | N |
| 252.25 | N | N | S | S | S | S | N | N | N | N | N | S | S | S | S | N | N |
| 252.50 | N | N | S | S | S | S | N | N | N | N | N | S | S | S | S | N | N |
| 252.75 | N | N | S | S | S | S | N | N | N | N | N | S | S | S | S | N | N |
| 253.00 | N | N | S | S | S | S | O | N | N | N | N | S | S | S | S | N | N |
| 253.25 | N | N | S | S | S | S | S | N | N | N | N | S | S | S | S | O | N |
| 253.50 | N | N | S | S | S | S | S | N | N | N | N | S | S | S | S | S | N |
| 253.75 | N | N | S | S | S | S | S | N | N | N | N | S | S | S | S | S | N |
| 254.00 | N | N | O | S | S | S | S | N | N | N | N | S | S | S | S | S | N |
| 254.25 | N | N | N | S | S | S | S | N | N | N | N | O | S | S | S | S | N |
| 254.50 | N | N | N | S | S | S | S | N | N | N | N | N | S | S | S | S | N |
| 254.75 | N | N | N | S | S | S | S | N | N | N | N | N | S | S | S | S | N |
| 255.00 | N | N | N | S | S | S | S | N | N | N | N | N | S | S | S | S | N |

-continued

| Coil Excitation | | | | | | | | | | | | | | | | | |
|---|---|---|---|---|---|---|---|---|---|---|---|---|---|---|---|---|---|
| 255.25 | N | N | N | S | S | S | S | O | N | N | N | N | S | S | S | S | N |
| 255.50 | N | N | N | S | S | S | S | S | N | N | N | N | S | S | S | S | O |
| 255.75 | N | N | N | S | S | S | S | S | N | N | N | N | S | S | S | S | S |
| 256.00 | N | N | N | S | S | S | S | S | N | N | N | N | S | S | S | S | S |
| 256.25 | N | N | N | O | S | S | S | S | N | N | N | N | S | S | S | S | S |
| 256.50 | N | N | N | N | S | S | S | S | N | N | N | N | O | S | S | S | S |
| 256.75 | N | N | N | N | S | S | S | S | N | N | N | N | N | S | S | S | S |
| 257.00 | N | N | N | N | S | S | S | S | N | N | N | N | N | S | S | S | S |
| 257.25 | N | N | N | N | S | S | S | S | N | N | N | N | N | S | S | S | S |
| 257.50 | N | N | N | N | S | S | S | S | O | N | N | N | N | S | S | S | S |
| 257.75 | N | N | N | N | S | S | S | S | S | N | N | N | N | S | S | S | S |
| 258.00 | N | N | N | N | S | S | S | S | S | N | N | N | N | S | S | S | S |
| 258.25 | N | N | N | N | S | S | S | S | S | N | N | N | N | S | S | S | S |
| 258.50 | N | N | N | N | O | S | S | S | S | N | N | N | N | S | S | S | S |
| 258.75 | N | N | N | N | N | S | S | S | S | N | N | N | N | O | S | S | S |
| 259.00 | N | N | N | N | N | S | S | S | S | N | N | N | N | N | S | S | S |
| 259.25 | N | N | N | N | N | S | S | S | S | N | N | N | N | N | S | S | S |
| 259.50 | O | N | N | N | N | S | S | S | S | N | N | N | N | N | S | S | S |
| 259.75 | S | N | N | N | N | S | S | S | S | O | N | N | N | N | S | S | S |
| 260.00 | S | N | N | N | N | S | S | S | S | S | N | N | N | N | S | S | S |
| 260.25 | S | N | N | N | N | S | S | S | S | S | N | N | N | N | S | S | S |
| 260.50 | S | N | N | N | N | S | S | S | S | S | N | N | N | N | S | S | S |
| 260.75 | S | N | N | N | N | O | S | S | S | S | N | N | N | N | S | S | S |
| 261.00 | S | N | N | N | N | N | S | S | S | S | N | N | N | N | O | S | S |
| 261.25 | S | N | N | N | N | N | S | S | S | S | N | N | N | N | N | S | S |
| 261.50 | S | N | N | N | N | N | S | S | S | S | N | N | N | N | N | S | S |
| 261.75 | S | O | N | N | N | N | S | S | S | S | N | N | N | N | N | S | S |
| 262.00 | S | S | N | N | N | N | S | S | S | S | O | N | N | N | N | S | S |
| 262.25 | S | S | N | N | N | N | S | S | S | S | S | N | N | N | N | S | S |
| 262.50 | S | S | N | N | N | N | S | S | S | S | S | N | N | N | N | S | S |
| 262.75 | S | S | N | N | N | N | S | S | S | S | S | N | N | N | N | S | S |
| 263.00 | S | S | N | N | N | N | O | S | S | S | S | N | N | N | N | S | S |
| 263.25 | S | S | N | N | N | N | N | S | S | S | S | N | N | N | N | O | S |
| 263.50 | S | S | N | N | N | N | N | S | S | S | S | N | N | N | N | N | S |
| 263.75 | S | S | N | N | N | N | N | S | S | S | S | N | N | N | N | N | S |

Page Row 22, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 252.00 | N | N | S | S | S | S | S | N | N | N | N | S | S | S | S | S | N |
| 252.25 | N | N | O | S | S | S | S | N | N | N | N | S | S | S | S | S | N |
| 252.50 | N | N | N | S | S | S | S | N | N | N | N | O | S | S | S | S | N |
| 252.75 | N | N | N | S | S | S | S | N | N | N | N | N | S | S | S | S | N |
| 253.00 | N | N | N | S | S | S | S | N | N | N | N | N | S | S | S | S | N |
| 253.25 | N | N | N | S | S | S | S | N | N | N | N | N | S | S | S | S | N |
| 253.50 | N | N | N | S | S | S | S | O | N | N | N | N | S | S | S | S | N |
| 253.75 | N | N | N | S | S | S | S | S | N | N | N | N | S | S | S | S | O |
| 254.00 | N | N | N | S | S | S | S | S | N | N | N | N | S | S | S | S | S |
| 254.25 | N | N | N | S | S | S | S | S | N | N | N | N | S | S | S | S | S |
| 254.50 | N | N | N | O | S | S | S | S | N | N | N | N | S | S | S | S | S |
| 254.75 | N | N | N | N | S | S | S | S | N | N | N | N | O | S | S | S | S |
| 255.00 | N | N | N | N | S | S | S | S | N | N | N | N | N | S | S | S | S |
| 255.25 | N | N | N | N | S | S | S | S | N | N | N | N | N | S | S | S | S |
| 255.50 | N | N | N | N | S | S | S | S | N | N | N | N | N | S | S | S | S |
| 255.75 | N | N | N | N | S | S | S | S | O | N | N | N | N | S | S | S | S |
| 256.00 | N | N | N | N | S | S | S | S | S | N | N | N | N | S | S | S | S |
| 256.25 | N | N | N | N | S | S | S | S | S | N | N | N | N | S | S | S | S |
| 256.50 | N | N | N | N | S | S | S | S | S | N | N | N | N | S | S | S | S |
| 256.75 | N | N | N | N | O | S | S | S | S | N | N | N | N | S | S | S | S |
| 257.00 | N | N | N | N | N | S | S | S | S | N | N | N | N | O | S | S | S |
| 257.25 | N | N | N | N | N | S | S | S | S | N | N | N | N | N | S | S | S |
| 257.50 | N | N | N | N | N | S | S | S | S | N | N | N | N | N | S | S | S |
| 257.75 | O | N | N | N | N | S | S | S | S | N | N | N | N | N | S | S | S |
| 258.00 | S | N | N | N | N | S | S | S | S | O | N | N | N | N | S | S | S |
| 258.25 | S | N | N | N | N | S | S | S | S | S | N | N | N | N | S | S | S |
| 258.50 | S | N | N | N | N | S | S | S | S | S | N | N | N | N | S | S | S |
| 258.75 | S | N | N | N | N | S | S | S | S | S | N | N | N | N | S | S | S |
| 259.00 | S | N | N | N | N | O | S | S | S | S | N | N | N | N | S | S | S |
| 259.25 | S | N | N | N | N | N | S | S | S | S | N | N | N | N | O | S | S |
| 259.50 | S | N | N | N | N | N | S | S | S | S | N | N | N | N | N | S | S |
| 259.75 | S | N | N | N | N | N | S | S | S | S | N | N | N | N | N | S | S |
| 260.00 | S | O | N | N | N | N | S | S | S | S | N | N | N | N | N | S | S |
| 260.25 | S | S | N | N | N | N | S | S | S | S | O | N | N | N | N | S | S |
| 260.50 | S | S | N | N | N | N | S | S | S | S | S | N | N | N | N | S | S |
| 260.75 | S | S | N | N | N | N | S | S | S | S | S | N | N | N | N | S | S |
| 261.00 | S | S | N | N | N | N | S | S | S | S | S | N | N | N | N | S | S |
| 261.25 | S | S | N | N | N | N | O | S | S | S | S | N | N | N | N | S | S |

-continued

| Coil Excitation | | | | | | | | | | | | | | | | | |
|---|---|---|---|---|---|---|---|---|---|---|---|---|---|---|---|---|---|
| 261.50 | S | S | N | N | N | N | N | S | S | S | S | N | N | N | N | O | S |
| 261.75 | S | S | N | N | N | N | N | S | S | S | S | N | N | N | N | N | S |
| 262.00 | S | S | N | N | N | N | N | S | S | S | S | N | N | N | N | N | S |
| 262.25 | S | S | O | N | N | N | N | S | S | S | S | N | N | N | N | N | S |
| 262.50 | S | S | S | N | N | N | N | S | S | S | S | O | N | N | N | N | S |
| 262.75 | S | S | S | N | N | N | N | S | S | S | S | S | N | N | N | N | S |
| 263.00 | S | S | S | N | N | N | N | S | S | S | S | S | N | N | N | N | S |
| 263.25 | S | S | S | N | N | N | N | S | S | S | S | S | N | N | N | N | S |
| 263.50 | S | S | S | N | N | N | N | O | S | S | S | S | N | N | N | N | S |
| 263.75 | S | S | S | N | N | N | N | N | S | S | S | S | N | N | N | N | O |

Page Row 22, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 252.00 | N | N | N | S | S | S | S | S | N | N | N | N | S | S | S | S | O |
| 252.25 | N | N | N | S | S | S | S | S | N | N | N | N | S | S | S | S | S |
| 252.50 | N | N | N | S | S | S | S | S | N | N | N | N | S | S | S | S | S |
| 252.75 | N | N | N | O | S | S | S | S | N | N | N | N | S | S | S | S | S |
| 253.00 | N | N | N | N | S | S | S | S | N | N | N | N | O | S | S | S | S |
| 253.25 | N | N | N | N | S | S | S | S | N | N | N | N | N | S | S | S | S |
| 253.50 | N | N | N | N | S | S | S | S | N | N | N | N | N | S | S | S | S |
| 253.75 | N | N | N | N | S | S | S | S | N | N | N | N | N | S | S | S | S |
| 254.00 | N | N | N | N | S | S | S | S | O | N | N | N | N | S | S | S | S |
| 254.25 | N | N | N | N | S | S | S | S | S | N | N | N | N | S | S | S | S |
| 254.50 | N | N | N | N | S | S | S | S | S | N | N | N | N | S | S | S | S |
| 254.75 | N | N | N | N | S | S | S | S | S | N | N | N | N | S | S | S | S |
| 255.00 | N | N | N | N | O | S | S | S | S | N | N | N | N | S | S | S | S |
| 255.25 | N | N | N | N | N | S | S | S | S | N | N | N | N | O | S | S | S |
| 255.50 | N | N | N | N | N | S | S | S | S | N | N | N | N | N | S | S | S |
| 255.75 | N | N | N | N | N | S | S | S | S | N | N | N | N | N | S | S | S |
| 256.00 | O | N | N | N | N | S | S | S | S | N | N | N | N | N | S | S | S |
| 256.25 | S | N | N | N | N | S | S | S | S | O | N | N | N | N | S | S | S |
| 256.50 | S | N | N | N | N | S | S | S | S | S | N | N | N | N | S | S | S |
| 256.75 | S | N | N | N | N | S | S | S | S | S | N | N | N | N | S | S | S |
| 257.00 | S | N | N | N | N | S | S | S | S | S | N | N | N | N | S | S | S |
| 257.25 | S | N | N | N | N | O | S | S | S | S | N | N | N | N | S | S | S |
| 257.50 | S | N | N | N | N | N | S | S | S | S | N | N | N | N | O | S | S |
| 257.75 | S | N | N | N | N | N | S | S | S | S | N | N | N | N | N | S | S |
| 258.00 | S | N | N | N | N | N | S | S | S | S | N | N | N | N | N | S | S |
| 258.25 | S | O | N | N | N | N | S | S | S | S | N | N | N | N | N | S | S |
| 258.50 | S | S | N | N | N | N | S | S | S | S | O | N | N | N | N | S | S |
| 258.75 | S | S | N | N | N | N | S | S | S | S | S | N | N | N | N | S | S |
| 259.00 | S | S | N | N | N | N | S | S | S | S | S | N | N | N | N | S | S |
| 259.25 | S | S | N | N | N | N | S | S | S | S | S | N | N | N | N | S | S |
| 259.50 | S | S | N | N | N | N | O | S | S | S | S | N | N | N | N | S | S |
| 259.75 | S | S | N | N | N | N | N | S | S | S | S | N | N | N | N | O | S |
| 260.00 | S | S | N | N | N | N | N | S | S | S | S | N | N | N | N | N | S |
| 260.25 | S | S | N | N | N | N | N | S | S | S | S | N | N | N | N | N | S |
| 260.50 | S | S | O | N | N | N | N | S | S | S | S | N | N | N | N | N | S |
| 260.75 | S | S | S | N | N | N | N | S | S | S | S | O | N | N | N | N | S |
| 261.00 | S | S | S | N | N | N | N | S | S | S | S | S | N | N | N | N | S |
| 261.25 | S | S | S | N | N | N | N | S | S | S | S | S | N | N | N | N | S |
| 261.50 | S | S | S | N | N | N | N | S | S | S | S | S | N | N | N | N | S |
| 261.75 | S | S | S | N | N | N | N | O | S | S | S | S | N | N | N | N | S |
| 262.00 | S | S | S | N | N | N | N | N | S | S | S | S | N | N | N | N | O |
| 262.25 | S | S | S | N | N | N | N | N | S | S | S | S | N | N | N | N | N |
| 262.50 | S | S | S | N | N | N | N | N | S | S | S | S | N | N | N | N | N |
| 262.75 | S | S | S | O | N | N | N | N | S | S | S | S | N | N | N | N | N |
| 263.00 | S | S | S | S | N | N | N | N | S | S | S | S | O | N | N | N | N |
| 263.25 | S | S | S | S | N | N | N | N | S | S | S | S | S | N | N | N | N |
| 263.50 | S | S | S | S | N | N | N | N | S | S | S | S | S | N | N | N | N |
| 263.75 | S | S | S | S | N | N | N | N | S | S | S | S | S | N | N | N | N |

Page Row 22, Page Column 9

| Coil | 154 | 155 | 156 | 157 | 158 | 159 | 160 |
|---|---|---|---|---|---|---|---|
| 252.00 | N | N | N | N | S | S | S |
| 252.25 | N | N | N | N | S | S | S |
| 252.50 | N | N | N | N | S | S | S |
| 252.75 | N | N | N | N | S | S | S |
| 253.00 | N | N | N | N | S | S | S |
| 253.25 | N | N | N | N | O | S | S |
| 253.50 | N | N | N | N | N | S | S |
| 253.75 | N | N | N | N | N | S | S |
| 254.00 | N | N | N | N | N | S | S |
| 254.25 | O | N | N | N | N | S | S |
| 254.50 | S | N | N | N | N | S | S |

-continued

| Coil Excitation | | | | | | | |
|---|---|---|---|---|---|---|---|
| 254.75 | S | N | N | N | N | S | S |
| 255.00 | S | N | N | N | N | S | S |
| 255.25 | S | N | N | N | N | S | S |
| 255.50 | S | N | N | N | N | O | S |
| 255.75 | S | N | N | N | N | N | S |
| 256.00 | S | N | N | N | N | N | S |
| 256.25 | S | N | N | N | N | N | S |
| 256.50 | S | O | N | N | N | N | S |
| 256.75 | S | S | N | N | N | N | S |
| 257.00 | S | S | N | N | N | N | S |
| 257.25 | S | S | N | N | N | N | S |
| 257.50 | S | S | N | N | N | N | S |
| 257.75 | S | S | N | N | N | N | O |
| 258.00 | S | S | N | N | N | N | N |
| 258.25 | S | S | N | N | N | N | N |
| 258.50 | S | S | N | N | N | N | N |
| 258.75 | S | S | O | N | N | N | N |
| 259.00 | S | S | S | N | N | N | N |
| 259.25 | S | S | S | N | N | N | N |
| 259.50 | S | S | S | N | N | N | N |
| 259.75 | S | S | S | N | N | N | N |
| 260.00 | S | S | S | N | N | N | N |
| 260.25 | S | S | S | N | N | N | N |
| 260.50 | S | S | S | N | N | N | N |
| 260.75 | S | S | S | N | N | N | N |
| 261.00 | S | S | S | O | N | N | N |
| 261.25 | S | S | S | S | N | N | N |
| 261.50 | S | S | S | S | N | N | N |
| 261.75 | S | S | S | S | N | N | N |
| 262.00 | S | S | S | S | N | N | N |
| 262.25 | S | S | S | S | N | N | N |
| 262.50 | S | S | S | S | N | N | N |
| 262.75 | S | S | S | S | N | N | N |
| 263.00 | S | S | S | S | N | N | N |
| 263.25 | S | S | S | S | O | N | N |
| 263.50 | S | S | S | S | S | N | N |
| 263.75 | S | S | S | S | S | N | N |

Page Row 22, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 264.00 | N | N | S | S | S | S | S | N | N | N | N | S | S | S | S | S | N |
| 264.25 | N | N | S | S | S | S | S | N | N | N | N | S | S | S | S | S | N |
| 264.50 | N | N | O | S | S | S | S | N | N | N | N | S | S | S | S | S | N |
| 264.75 | N | N | N | S | S | S | S | N | N | N | N | O | S | S | S | S | N |
| 265.00 | N | N | N | S | S | S | S | N | N | N | N | N | S | S | S | S | N |
| 265.25 | N | N | N | S | S | S | S | N | N | N | N | N | S | S | S | S | N |
| 265.50 | N | N | N | S | S | S | S | N | N | N | N | N | S | S | S | S | N |
| 265.75 | N | N | N | S | S | S | S | O | N | N | N | N | S | S | S | S | N |
| 266.00 | N | N | N | S | S | S | S | S | N | N | N | N | S | S | S | S | O |
| 266.25 | N | N | N | S | S | S | S | S | N | N | N | N | S | S | S | S | S |
| 266.50 | N | N | N | S | S | S | S | S | N | N | N | N | S | S | S | S | S |
| 266.75 | N | N | N | O | S | S | S | S | N | N | N | N | S | S | S | S | S |
| 267.00 | N | N | N | N | S | S | S | S | N | N | N | N | O | S | S | S | S |
| 267.25 | N | N | N | N | S | S | S | S | N | N | N | N | N | S | S | S | S |
| 267.50 | N | N | N | N | S | S | S | S | N | N | N | N | N | S | S | S | S |
| 267.75 | N | N | N | N | S | S | S | S | N | N | N | N | N | S | S | S | S |
| 268.00 | N | N | N | N | S | S | S | S | O | N | N | N | N | S | S | S | S |
| 268.25 | N | N | N | N | S | S | S | S | S | N | N | N | N | S | S | S | S |
| 268.50 | N | N | N | N | S | S | S | S | S | N | N | N | N | S | S | S | S |
| 268.75 | N | N | N | N | S | S | S | S | S | N | N | N | N | S | S | S | S |
| 269.00 | N | N | N | N | O | S | S | S | S | N | N | N | N | S | S | S | S |
| 269.25 | N | N | N | N | N | S | S | S | S | N | N | N | N | O | S | S | S |
| 269.50 | N | N | N | N | N | S | S | S | S | N | N | N | N | N | S | S | S |
| 269.75 | N | N | N | N | N | S | S | S | S | N | N | N | N | N | S | S | S |
| 270.00 | O | N | N | N | N | S | S | S | S | N | N | N | N | N | S | S | S |
| 270.25 | S | N | N | N | N | S | S | S | S | O | N | N | N | N | S | S | S |
| 270.50 | S | N | N | N | N | S | S | S | S | S | N | N | N | N | S | S | S |
| 270.75 | S | N | N | N | N | S | S | S | S | S | N | N | N | N | S | S | S |
| 271.00 | S | N | N | N | N | S | S | S | S | S | N | N | N | N | S | S | S |
| 271.25 | S | N | N | N | N | O | S | S | S | S | N | N | N | N | S | S | S |
| 271.50 | S | N | N | N | N | N | S | S | S | S | N | N | N | N | O | S | S |
| 271.75 | S | N | N | N | N | N | S | S | S | S | N | N | N | N | N | S | S |
| 272.00 | S | N | N | N | N | N | S | S | S | S | N | N | N | N | N | S | S |
| 272.25 | S | O | N | N | N | N | S | S | S | S | N | N | N | N | N | S | S |
| 272.50 | S | S | N | N | N | N | S | S | S | S | O | N | N | N | N | S | S |
| 272.75 | S | S | N | N | N | N | S | S | S | S | S | N | N | N | N | S | S |

-continued

| Coil Excitation | | | | | | | | | | | | | | | | | |
|---|---|---|---|---|---|---|---|---|---|---|---|---|---|---|---|---|---|
| 273.00 | S | S | N | N | N | N | S | S | S | S | S | N | N | N | N | S | S |
| 273.25 | S | S | N | N | N | N | S | S | S | S | S | N | N | N | N | S | S |
| 273.50 | S | S | N | N | N | N | O | S | S | S | S | N | N | N | N | S | S |
| 273.75 | S | S | N | N | N | N | N | S | S | S | S | N | N | N | N | O | S |
| 274.00 | S | S | N | N | N | N | N | S | S | S | S | N | N | N | N | N | S |
| 274.25 | S | S | N | N | N | N | N | S | S | S | S | N | N | N | N | N | S |
| 274.50 | S | S | O | N | N | N | N | S | S | S | S | N | N | N | N | N | S |
| 274.75 | S | S | S | N | N | N | N | S | S | S | S | O | N | N | N | N | S |
| 275.00 | S | S | S | N | N | N | N | S | S | S | S | S | N | N | N | N | S |
| 275.25 | S | S | S | N | N | N | N | S | S | S | S | S | N | N | N | N | S |
| 275.50 | S | S | S | N | N | N | N | S | S | S | S | S | N | N | N | N | S |
| 275.75 | S | S | S | N | N | N | N | O | S | S | S | S | N | N | N | N | S |

Page Row 23, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 264.00 | N | N | N | S | S | S | S | O | N | N | N | N | S | S | S | S | N |
| 264.25 | N | N | N | S | S | S | S | S | N | N | N | N | S | S | S | S | O |
| 264.50 | N | N | N | S | S | S | S | S | N | N | N | N | S | S | S | S | S |
| 264.75 | N | N | N | S | S | S | S | S | N | N | N | N | S | S | S | S | S |
| 265.00 | N | N | N | O | S | S | S | S | N | N | N | N | S | S | S | S | S |
| 265.25 | N | N | N | N | S | S | S | S | N | N | N | N | O | S | S | S | S |
| 265.50 | N | N | N | N | S | S | S | S | N | N | N | N | N | S | S | S | S |
| 265.75 | N | N | N | N | S | S | S | S | N | N | N | N | N | S | S | S | S |
| 266.00 | N | N | N | N | S | S | S | S | N | N | N | N | N | S | S | S | S |
| 266.25 | N | N | N | N | S | S | S | S | O | N | N | N | N | S | S | S | S |
| 266.50 | N | N | N | N | S | S | S | S | S | N | N | N | N | S | S | S | S |
| 266.75 | N | N | N | N | S | S | S | S | S | N | N | N | N | S | S | S | S |
| 267.00 | N | N | N | N | S | S | S | S | S | N | N | N | N | S | S | S | S |
| 267.25 | N | N | N | N | O | S | S | S | S | N | N | N | N | S | S | S | S |
| 267.50 | N | N | N | N | N | S | S | S | S | N | N | N | N | O | S | S | S |
| 267.75 | N | N | N | N | N | S | S | S | S | N | N | N | N | N | S | S | S |
| 268.00 | N | N | N | N | N | S | S | S | S | N | N | N | N | N | S | S | S |
| 268.25 | O | N | N | N | N | S | S | S | S | N | N | N | N | N | S | S | S |
| 268.50 | S | N | N | N | N | S | S | S | S | O | N | N | N | N | S | S | S |
| 268.75 | S | N | N | N | N | S | S | S | S | S | N | N | N | N | S | S | S |
| 269.00 | S | N | N | N | N | S | S | S | S | S | N | N | N | N | S | S | S |
| 269.25 | S | N | N | N | N | S | S | S | S | S | N | N | N | N | S | S | S |
| 269.50 | S | N | N | N | N | O | S | S | S | S | N | N | N | N | S | S | S |
| 269.75 | S | N | N | N | N | N | S | S | S | S | N | N | N | N | O | S | S |
| 270.00 | S | N | N | N | N | N | S | S | S | S | N | N | N | N | N | S | S |
| 270.25 | S | N | N | N | N | N | S | S | S | S | N | N | N | N | N | S | S |
| 270.50 | S | O | N | N | N | N | S | S | S | S | N | N | N | N | N | S | S |
| 270.75 | S | S | N | N | N | N | S | S | S | S | O | N | N | N | N | S | S |
| 271.00 | S | S | N | N | N | N | S | S | S | S | S | N | N | N | N | S | S |
| 271.25 | S | S | N | N | N | N | S | S | S | S | S | N | N | N | N | S | S |
| 271.50 | S | S | N | N | N | N | S | S | S | S | S | N | N | N | N | S | S |
| 271.75 | S | S | N | N | N | N | O | S | S | S | S | N | N | N | N | S | S |
| 272.00 | S | S | N | N | N | N | N | S | S | S | S | N | N | N | N | O | S |
| 272.25 | S | S | N | N | N | N | N | S | S | S | S | N | N | N | N | N | S |
| 272.50 | S | S | N | N | N | N | N | S | S | S | S | N | N | N | N | N | S |
| 272.75 | S | S | O | N | N | N | N | S | S | S | S | N | N | N | N | N | S |
| 273.00 | S | S | S | N | N | N | N | S | S | S | S | O | N | N | N | N | S |
| 273.25 | S | S | S | N | N | N | N | S | S | S | S | S | N | N | N | N | S |
| 273.50 | S | S | S | N | N | N | N | S | S | S | S | S | N | N | N | N | S |
| 273.75 | S | S | S | N | N | N | N | S | S | S | S | S | N | N | N | N | S |
| 274.00 | S | S | S | N | N | N | N | O | S | S | S | S | N | N | N | N | S |
| 274.25 | S | S | S | N | N | N | N | N | S | S | S | S | N | N | N | N | O |
| 274.50 | S | S | S | N | N | N | N | N | S | S | S | S | N | N | N | N | N |
| 274.75 | S | S | S | N | N | N | N | N | S | S | S | S | N | N | N | N | N |
| 275.00 | S | S | S | O | N | N | N | N | S | S | S | S | N | N | N | N | N |
| 275.25 | S | S | S | S | N | N | N | N | S | S | S | S | O | N | N | N | N |
| 275.50 | S | S | S | S | N | N | N | N | S | S | S | S | S | N | N | N | N |
| 275.75 | S | S | S | S | N | N | N | N | S | S | S | S | S | N | N | N | N |

Page Row 23, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 264.00 | N | N | N | N | S | S | S | S | N | N | N | N | N | S | S | S | S |
| 264.25 | N | N | N | N | S | S | S | S | N | N | N | N | N | S | S | S | S |
| 264.50 | N | N | N | N | S | S | S | S | O | N | N | N | N | S | S | S | S |
| 264.75 | N | N | N | N | S | S | S | S | S | N | N | N | N | S | S | S | S |
| 265.00 | N | N | N | N | S | S | S | S | S | N | N | N | N | S | S | S | S |
| 265.25 | N | N | N | N | S | S | S | S | S | N | N | N | N | S | S | S | S |
| 265.50 | N | N | N | N | O | S | S | S | S | N | N | N | N | S | S | S | S |
| 265.75 | N | N | N | N | N | S | S | S | S | N | N | N | N | O | S | S | S |
| 266.00 | N | N | N | N | N | S | S | S | S | N | N | N | N | N | S | S | S |

-continued

| Coil Excitation | | | | | | | | | | | | | | | | | |
|---|---|---|---|---|---|---|---|---|---|---|---|---|---|---|---|---|---|
| 266.25 | N | N | N | N | N | S | S | S | S | N | N | N | N | N | S | S | S |
| 266.50 | O | N | N | N | N | S | S | S | S | N | N | N | N | N | S | S | S |
| 266.75 | S | N | N | N | N | S | S | S | S | O | N | N | N | N | S | S | S |
| 267.00 | S | N | N | N | N | S | S | S | S | S | N | N | N | N | S | S | S |
| 267.25 | S | N | N | N | N | S | S | S | S | S | N | N | N | N | S | S | S |
| 267.50 | S | N | N | N | N | S | S | S | S | S | N | N | N | N | S | S | S |
| 267.75 | S | N | N | N | N | O | S | S | S | S | N | N | N | N | S | S | S |
| 268.00 | S | N | N | N | N | N | S | S | S | S | N | N | N | N | O | S | S |
| 268.25 | S | N | N | N | N | N | S | S | S | S | N | N | N | N | N | S | S |
| 268.50 | S | N | N | N | N | N | S | S | S | S | N | N | N | N | N | S | S |
| 268.75 | S | O | N | N | N | N | S | S | S | S | N | N | N | N | N | S | S |
| 269.00 | S | S | N | N | N | N | S | S | S | S | O | N | N | N | N | S | S |
| 269.25 | S | S | N | N | N | N | S | S | S | S | S | N | N | N | N | S | S |
| 269.50 | S | S | N | N | N | N | S | S | S | S | S | N | N | N | N | S | S |
| 269.75 | S | S | N | N | N | N | S | S | S | S | S | N | N | N | N | S | S |
| 270.00 | S | S | N | N | N | N | O | S | S | S | S | N | N | N | N | S | S |
| 270.25 | S | S | N | N | N | N | N | S | S | S | S | N | N | N | N | O | S |
| 270.50 | S | S | N | N | N | N | N | S | S | S | S | N | N | N | N | N | S |
| 270.75 | S | S | N | N | N | N | N | S | S | S | S | N | N | N | N | N | S |
| 271.00 | S | S | O | N | N | N | N | S | S | S | S | N | N | N | N | N | S |
| 271.25 | S | S | S | N | N | N | N | S | S | S | S | O | N | N | N | N | S |
| 271.50 | S | S | S | N | N | N | N | S | S | S | S | S | N | N | N | N | S |
| 271.75 | S | S | S | N | N | N | N | S | S | S | S | S | N | N | N | N | S |
| 272.00 | S | S | S | N | N | N | N | S | S | S | S | S | N | N | N | N | S |
| 272.25 | S | S | S | N | N | N | N | O | S | S | S | S | N | N | N | N | S |
| 272.50 | S | S | S | N | N | N | N | N | S | S | S | S | N | N | N | N | O |
| 272.75 | S | S | S | N | N | N | N | N | S | S | S | S | N | N | N | N | N |
| 273.00 | S | S | S | N | N | N | N | N | S | S | S | S | N | N | N | N | N |
| 273.25 | S | S | S | O | N | N | N | N | S | S | S | S | N | N | N | N | N |
| 273.50 | S | S | S | S | N | N | N | N | S | S | S | S | O | N | N | N | N |
| 273.75 | S | S | S | S | N | N | N | N | S | S | S | S | S | N | N | N | N |
| 274.00 | S | S | S | S | N | N | N | N | S | S | S | S | S | N | N | N | N |
| 274.25 | S | S | S | S | N | N | N | N | S | S | S | S | S | N | N | N | N |
| 274.50 | S | S | S | S | N | N | N | N | O | S | S | S | S | N | N | N | N |
| 274.75 | S | S | S | S | N | N | N | N | N | S | S | S | S | N | N | N | N |
| 275.00 | S | S | S | S | N | N | N | N | N | S | S | S | S | N | N | N | N |
| 275.25 | S | S | S | S | N | N | N | N | N | S | S | S | S | N | N | N | N |
| 275.50 | S | S | S | S | O | N | N | N | N | S | S | S | S | N | N | N | N |
| 275.75 | S | S | S | S | S | N | N | N | N | S | S | S | S | O | N | N | N |

Page Row 23, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 264.00 | N | N | N | N | N | S | S | S | S | N | N | N | N | O | S | S | S |
| 264.25 | N | N | N | N | N | S | S | S | S | N | N | N | N | N | S | S | S |
| 264.50 | N | N | N | N | N | S | S | S | S | N | N | N | N | N | S | S | S |
| 264.75 | O | N | N | N | N | S | S | S | S | N | N | N | N | N | S | S | S |
| 265.00 | S | N | N | N | N | S | S | S | S | O | N | N | N | N | S | S | S |
| 265.25 | S | N | N | N | N | S | S | S | S | S | N | N | N | N | S | S | S |
| 265.50 | S | N | N | N | N | S | S | S | S | S | N | N | N | N | S | S | S |
| 265.75 | S | N | N | N | N | S | S | S | S | S | N | N | N | N | S | S | S |
| 266.00 | S | N | N | N | N | O | S | S | S | S | N | N | N | N | S | S | S |
| 266.25 | S | N | N | N | N | N | S | S | S | S | N | N | N | N | O | S | S |
| 266.50 | S | N | N | N | N | N | S | S | S | S | N | N | N | N | N | S | S |
| 266.75 | S | N | N | N | N | N | S | S | S | S | N | N | N | N | N | S | S |
| 267.00 | S | O | N | N | N | N | S | S | S | S | N | N | N | N | N | S | S |
| 267.25 | S | S | N | N | N | N | S | S | S | S | O | N | N | N | N | S | S |
| 267.50 | S | S | N | N | N | N | S | S | S | S | S | N | N | N | N | S | S |
| 267.75 | S | S | N | N | N | N | S | S | S | S | S | N | N | N | N | S | S |
| 268.00 | S | S | N | N | N | N | S | S | S | S | S | N | N | N | N | S | S |
| 268.25 | S | S | N | N | N | N | O | S | S | S | S | N | N | N | N | S | S |
| 268.50 | S | S | N | N | N | N | N | S | S | S | S | N | N | N | N | O | S |
| 268.75 | S | S | N | N | N | N | N | S | S | S | S | N | N | N | N | N | S |
| 269.00 | S | S | N | N | N | N | N | S | S | S | S | N | N | N | N | N | S |
| 269.25 | S | S | O | N | N | N | N | S | S | S | S | N | N | N | N | N | S |
| 269.50 | S | S | S | N | N | N | N | S | S | S | S | O | N | N | N | N | S |
| 269.75 | S | S | S | N | N | N | N | S | S | S | S | S | N | N | N | N | S |
| 270.00 | S | S | S | N | N | N | N | S | S | S | S | S | N | N | N | N | S |
| 270.25 | S | S | S | N | N | N | N | S | S | S | S | S | N | N | N | N | S |
| 270.50 | S | S | S | N | N | N | N | O | S | S | S | S | N | N | N | N | S |
| 270.75 | S | S | S | N | N | N | N | N | S | S | S | S | N | N | N | N | O |
| 271.00 | S | S | S | N | N | N | N | N | S | S | S | S | N | N | N | N | N |
| 271.25 | S | S | S | N | N | N | N | N | S | S | S | S | N | N | N | N | N |
| 271.50 | S | S | S | O | N | N | N | N | S | S | S | S | N | N | N | N | N |
| 271.75 | S | S | S | S | N | N | N | N | S | S | S | S | O | N | N | N | N |
| 272.00 | S | S | S | S | N | N | N | N | S | S | S | S | S | N | N | N | N |
| 272.25 | S | S | S | S | N | N | N | N | S | S | S | S | S | N | N | N | N |

-continued

Coil Excitation

| | | | | | | | | | | | | | | | | | |
|---|---|---|---|---|---|---|---|---|---|---|---|---|---|---|---|---|---|
| 272.50 | S | S | S | S | N | N | N | N | S | S | S | S | S | N | N | N | N |
| 272.75 | S | S | S | S | N | N | N | N | O | S | S | S | S | N | N | N | N |
| 273.00 | S | S | S | S | N | N | N | N | N | S | S | S | S | N | N | N | N |
| 273.25 | S | S | S | S | N | N | N | N | N | S | S | S | S | N | N | N | N |
| 273.50 | S | S | S | S | N | N | N | N | N | S | S | S | S | N | N | N | N |
| 273.75 | S | S | S | S | O | N | N | N | N | S | S | S | S | N | N | N | N |
| 274.00 | S | S | S | S | S | N | N | N | N | S | S | S | S | O | N | N | N |
| 274.25 | S | S | S | S | S | N | N | N | N | S | S | S | S | S | N | N | N |
| 274.50 | S | S | S | S | S | N | N | N | N | S | S | S | S | S | N | N | N |
| 274.75 | O | S | S | S | S | N | N | N | N | S | S | S | S | S | N | N | N |
| 275.00 | N | S | S | S | S | N | N | N | N | O | S | S | S | S | N | N | N |
| 275.25 | N | S | S | S | S | N | N | N | N | N | S | S | S | S | N | N | N |
| 275.50 | N | S | S | S | S | N | N | N | N | N | S | S | S | S | N | N | N |
| 275.75 | N | S | S | S | S | N | N | N | N | N | S | S | S | S | N | N | N |

Page Row 23, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 264.00 | S | N | N | N | N | S | S | S | S | S | N | N | N | N | S | S | S |
| 264.25 | S | N | N | N | N | O | S | S | S | S | N | N | N | N | S | S | S |
| 264.50 | S | N | N | N | N | N | S | S | S | S | N | N | N | N | O | S | S |
| 264.75 | S | N | N | N | N | N | S | S | S | S | N | N | N | N | N | S | S |
| 265.00 | S | N | N | N | N | N | S | S | S | S | N | N | N | N | N | S | S |
| 265.25 | S | O | N | N | N | N | S | S | S | S | N | N | N | N | N | S | S |
| 265.50 | S | S | N | N | N | N | S | S | S | S | O | N | N | N | N | S | S |
| 265.75 | S | S | N | N | N | N | S | S | S | S | S | N | N | N | N | S | S |
| 266.00 | S | S | N | N | N | N | S | S | S | S | S | N | N | N | N | S | S |
| 266.25 | S | S | N | N | N | N | S | S | S | S | S | N | N | N | N | S | S |
| 266.50 | S | S | N | N | N | N | O | S | S | S | S | N | N | N | N | S | S |
| 266.75 | S | S | N | N | N | N | N | S | S | S | S | N | N | N | N | O | S |
| 267.00 | S | S | N | N | N | N | N | S | S | S | S | N | N | N | N | N | S |
| 267.25 | S | S | N | N | N | N | N | S | S | S | S | N | N | N | N | N | S |
| 267.50 | S | S | O | N | N | N | N | S | S | S | S | N | N | N | N | N | S |
| 267.75 | S | S | S | N | N | N | N | S | S | S | S | O | N | N | N | N | S |
| 268.00 | S | S | S | N | N | N | N | S | S | S | S | S | N | N | N | N | S |
| 268.25 | S | S | S | N | N | N | N | S | S | S | S | S | N | N | N | N | S |
| 268.50 | S | S | S | N | N | N | N | S | S | S | S | S | N | N | N | N | S |
| 268.75 | S | S | S | N | N | N | N | O | S | S | S | S | N | N | N | N | S |
| 269.00 | S | S | S | N | N | N | N | N | S | S | S | S | N | N | N | N | O |
| 269.25 | S | S | S | N | N | N | N | N | S | S | S | S | N | N | N | N | N |
| 269.50 | S | S | S | N | N | N | N | N | S | S | S | S | N | N | N | N | N |
| 269.75 | S | S | S | O | N | N | N | N | S | S | S | S | N | N | N | N | N |
| 270.00 | S | S | S | S | N | N | N | N | S | S | S | S | O | N | N | N | N |
| 270.25 | S | S | S | S | N | N | N | N | S | S | S | S | S | N | N | N | N |
| 270.50 | S | S | S | S | N | N | N | N | S | S | S | S | S | N | N | N | N |
| 270.75 | S | S | S | S | N | N | N | N | S | S | S | S | S | N | N | N | N |
| 271.00 | S | S | S | S | N | N | N | N | O | S | S | S | S | N | N | N | N |
| 271.25 | S | S | S | S | N | N | N | N | N | S | S | S | S | N | N | N | N |
| 271.50 | S | S | S | S | N | N | N | N | N | S | S | S | S | N | N | N | N |
| 271.75 | S | S | S | S | N | N | N | N | N | S | S | S | S | N | N | N | N |
| 272.00 | S | S | S | S | O | N | N | N | N | S | S | S | S | N | N | N | N |
| 272.25 | S | S | S | S | S | N | N | N | N | S | S | S | S | O | N | N | N |
| 272.50 | S | S | S | S | S | N | N | N | N | S | S | S | S | S | N | N | N |
| 272.75 | S | S | S | S | S | N | N | N | N | S | S | S | S | S | N | N | N |
| 273.00 | O | S | S | S | S | N | N | N | N | S | S | S | S | S | N | N | N |
| 273.25 | N | S | S | S | S | N | N | N | N | O | S | S | S | S | N | N | N |
| 273.50 | N | S | S | S | S | N | N | N | N | N | S | S | S | S | N | N | N |
| 273.75 | N | S | S | S | S | N | N | N | N | N | S | S | S | S | N | N | N |
| 274.00 | N | S | S | S | S | N | N | N | N | N | S | S | S | S | N | N | N |
| 274.25 | N | S | S | S | S | O | N | N | N | N | S | S | S | S | N | N | N |
| 274.50 | N | S | S | S | S | S | N | N | N | N | S | S | S | S | O | N | N |
| 274.75 | N | S | S | S | S | S | N | N | N | N | S | S | S | S | S | N | N |
| 275.00 | N | S | S | S | S | S | N | N | N | N | S | S | S | S | S | N | N |
| 275.25 | N | O | S | S | S | S | N | N | N | N | S | S | S | S | S | N | N |
| 275.50 | N | N | S | S | S | S | N | N | N | N | O | S | S | S | S | N | N |
| 275.75 | N | N | S | S | S | S | N | N | N | N | N | S | S | S | S | N | N |

Page Row 23, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 264.00 | S | S | N | N | N | N | S | S | S | S | S | N | N | N | N | S | S |
| 264.25 | S | S | N | N | N | N | S | S | S | S | S | N | N | N | N | S | S |
| 264.50 | S | S | N | N | N | N | S | S | S | S | S | N | N | N | N | S | S |
| 264.75 | S | S | N | N | N | N | O | S | S | S | S | N | N | N | N | S | S |
| 265.00 | S | S | N | N | N | N | N | S | S | S | S | N | N | N | N | O | S |
| 265.25 | S | S | N | N | N | N | N | S | S | S | S | N | N | N | N | N | S |
| 265.50 | S | S | N | N | N | N | N | S | S | S | S | N | N | N | N | N | S |

-continued

| Coil Excitation | | | | | | | | | | | | | | | | | |
|---|---|---|---|---|---|---|---|---|---|---|---|---|---|---|---|---|---|
| 265.75 | S | S | O | N | N | N | N | S | S | S | S | N | N | N | N | N | S |
| 266.00 | S | S | S | N | N | N | N | S | S | S | S | O | N | N | N | N | S |
| 266.25 | S | S | S | N | N | N | N | S | S | S | S | S | N | N | N | N | S |
| 266.50 | S | S | S | N | N | N | N | S | S | S | S | S | N | N | N | N | S |
| 266.75 | S | S | S | N | N | N | N | S | S | S | S | S | N | N | N | N | S |
| 267.00 | S | S | S | N | N | N | N | O | S | S | S | S | N | N | N | N | S |
| 267.25 | S | S | S | N | N | N | N | N | S | S | S | S | N | N | N | N | O |
| 267.50 | S | S | S | N | N | N | N | N | S | S | S | S | N | N | N | N | N |
| 267.75 | S | S | S | N | N | N | N | N | S | S | S | S | N | N | N | N | N |
| 268.00 | S | S | S | O | N | N | N | N | S | S | S | S | N | N | N | N | N |
| 268.25 | S | S | S | S | N | N | N | N | S | S | S | S | O | N | N | N | N |
| 268.50 | S | S | S | S | N | N | N | N | S | S | S | S | S | N | N | N | N |
| 268.75 | S | S | S | S | N | N | N | N | S | S | S | S | S | N | N | N | N |
| 269.00 | S | S | S | S | N | N | N | N | S | S | S | S | S | N | N | N | N |
| 269.25 | S | S | S | S | N | N | N | N | O | S | S | S | S | N | N | N | N |
| 269.50 | S | S | S | S | N | N | N | N | N | S | S | S | S | N | N | N | N |
| 269.75 | S | S | S | S | N | N | N | N | N | S | S | S | S | N | N | N | N |
| 270.00 | S | S | S | S | N | N | N | N | N | S | S | S | S | N | N | N | N |
| 270.25 | S | S | S | S | O | N | N | N | N | S | S | S | S | N | N | N | N |
| 270.50 | S | S | S | S | S | N | N | N | N | S | S | S | S | O | N | N | N |
| 270.75 | S | S | S | S | S | N | N | N | N | S | S | S | S | S | N | N | N |
| 271.00 | S | S | S | S | S | N | N | N | N | S | S | S | S | S | N | N | N |
| 271.25 | O | S | S | S | S | N | N | N | N | S | S | S | S | S | N | N | N |
| 271.50 | N | S | S | S | S | N | N | N | N | O | S | S | S | S | N | N | N |
| 271.75 | N | S | S | S | S | N | N | N | N | N | S | S | S | S | N | N | N |
| 272.00 | N | S | S | S | S | N | N | N | N | N | S | S | S | S | N | N | N |
| 272.25 | N | S | S | S | S | N | N | N | N | N | S | S | S | S | N | N | N |
| 272.50 | N | S | S | S | S | O | N | N | N | N | S | S | S | S | N | N | N |
| 272.75 | N | S | S | S | S | S | N | N | N | N | S | S | S | S | O | N | N |
| 273.00 | N | S | S | S | S | S | N | N | N | N | S | S | S | S | S | N | N |
| 273.25 | N | S | S | S | S | S | N | N | N | N | S | S | S | S | S | N | N |
| 273.50 | N | O | S | S | S | S | N | N | N | N | S | S | S | S | S | N | N |
| 273.75 | N | N | S | S | S | S | N | N | N | N | O | S | S | S | S | N | N |
| 274.00 | N | N | S | S | S | S | N | N | N | N | N | S | S | S | S | N | N |
| 274.25 | N | N | S | S | S | S | N | N | N | N | N | S | S | S | S | N | N |
| 274.50 | N | N | S | S | S | S | N | N | N | N | N | S | S | S | S | N | N |
| 274.75 | N | N | S | S | S | S | O | N | N | N | N | S | S | S | S | N | N |
| 275.00 | N | N | S | S | S | S | S | N | N | N | N | S | S | S | S | O | N |
| 275.25 | N | N | S | S | S | S | S | N | N | N | N | S | S | S | S | S | N |
| 275.50 | N | N | S | S | S | S | S | N | N | N | N | S | S | S | S | S | N |
| 275.75 | N | N | O | S | S | S | S | N | N | N | N | S | S | S | S | S | N |

Page Row 23, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 264.00 | S | S | O | N | N | N | N | S | S | S | S | N | N | N | N | N | S |
| 264.25 | S | S | S | N | N | N | N | S | S | S | S | O | N | N | N | N | S |
| 264.50 | S | S | S | N | N | N | N | S | S | S | S | S | N | N | N | N | S |
| 264.75 | S | S | S | N | N | N | N | S | S | S | S | S | N | N | N | N | S |
| 265.00 | S | S | S | N | N | N | N | S | S | S | S | S | N | N | N | N | S |
| 265.25 | S | S | S | N | N | N | N | O | S | S | S | S | N | N | N | N | S |
| 265.50 | S | S | S | N | N | N | N | N | S | S | S | S | N | N | N | N | O |
| 265.75 | S | S | S | N | N | N | N | N | S | S | S | S | N | N | N | N | N |
| 266.00 | S | S | S | N | N | N | N | N | S | S | S | S | N | N | N | N | N |
| 266.25 | S | S | S | O | N | N | N | N | S | S | S | S | N | N | N | N | N |
| 266.50 | S | S | S | S | N | N | N | N | S | S | S | S | O | N | N | N | N |
| 266.75 | S | S | S | S | N | N | N | N | S | S | S | S | S | N | N | N | N |
| 267.00 | S | S | S | S | N | N | N | N | S | S | S | S | S | N | N | N | N |
| 267.25 | S | S | S | S | N | N | N | N | S | S | S | S | S | N | N | N | N |
| 267.50 | S | S | S | S | N | N | N | N | O | S | S | S | S | N | N | N | N |
| 267.75 | S | S | S | S | N | N | N | N | N | S | S | S | S | N | N | N | N |
| 268.00 | S | S | S | S | N | N | N | N | N | S | S | S | S | N | N | N | N |
| 268.25 | S | S | S | S | N | N | N | N | N | S | S | S | S | N | N | N | N |
| 268.50 | S | S | S | S | O | N | N | N | N | S | S | S | S | N | N | N | N |
| 268.75 | S | S | S | S | S | N | N | N | N | S | S | S | S | O | N | N | N |
| 269.00 | S | S | S | S | S | N | N | N | N | S | S | S | S | S | N | N | N |
| 269.25 | S | S | S | S | S | N | N | N | N | S | S | S | S | S | N | N | N |
| 269.50 | O | S | S | S | S | N | N | N | N | S | S | S | S | S | N | N | N |
| 269.75 | N | S | S | S | S | N | N | N | N | O | S | S | S | S | N | N | N |
| 270.00 | N | S | S | S | S | N | N | N | N | N | S | S | S | S | N | N | N |
| 270.25 | N | S | S | S | S | N | N | N | N | N | S | S | S | S | N | N | N |
| 270.50 | N | S | S | S | S | N | N | N | N | N | S | S | S | S | N | N | N |
| 270.75 | N | S | S | S | S | O | N | N | N | N | S | S | S | S | N | N | N |
| 271.00 | N | S | S | S | S | S | N | N | N | N | S | S | S | S | O | N | N |
| 271.25 | N | S | S | S | S | S | N | N | N | N | S | S | S | S | S | N | N |
| 271.50 | N | S | S | S | S | S | N | N | N | N | S | S | S | S | S | N | N |
| 271.75 | N | O | S | S | S | S | N | N | N | N | S | S | S | S | S | N | N |

-continued

Coil Excitation

| | | | | | | | | | | | | | | | | | |
|---|---|---|---|---|---|---|---|---|---|---|---|---|---|---|---|---|---|
| 272.00 | N | N | S | S | S | S | N | N | N | N | O | S | S | S | S | N | N |
| 272.25 | N | N | S | S | S | S | N | N | N | N | N | S | S | S | S | N | N |
| 272.50 | N | N | S | S | S | S | N | N | N | N | N | S | S | S | S | N | N |
| 272.75 | N | N | S | S | S | S | N | N | N | N | N | S | S | S | S | N | N |
| 273.00 | N | N | S | S | S | S | O | N | N | N | N | S | S | S | S | N | N |
| 273.25 | N | N | S | S | S | S | S | N | N | N | N | S | S | S | S | O | N |
| 273.50 | N | N | S | S | S | S | S | N | N | N | N | S | S | S | S | S | N |
| 273.75 | N | N | S | S | S | S | S | N | N | N | N | S | S | S | S | S | N |
| 274.00 | N | N | O | S | S | S | S | N | N | N | N | S | S | S | S | S | N |
| 274.25 | N | N | N | S | S | S | S | N | N | N | N | O | S | S | S | S | N |
| 274.50 | N | N | N | S | S | S | S | N | N | N | N | N | S | S | S | S | N |
| 274.75 | N | N | N | S | S | S | S | N | N | N | N | N | S | S | S | S | N |
| 275.00 | N | N | N | S | S | S | S | N | N | N | N | N | S | S | S | S | N |
| 275.25 | N | N | N | S | S | S | S | O | N | N | N | N | S | S | S | S | N |
| 275.50 | N | N | N | S | S | S | S | S | N | N | N | N | S | S | S | S | O |
| 275.75 | N | N | N | S | S | S | S | S | N | N | N | N | S | S | S | S | S |

Page Row 23, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 264.00 | S | S | S | N | N | N | N | N | S | S | S | S | N | N | N | N | N |
| 264.25 | S | S | S | N | N | N | N | N | S | S | S | S | N | N | N | N | N |
| 264.50 | S | S | S | O | N | N | N | N | S | S | S | S | N | N | N | N | N |
| 264.75 | S | S | S | S | N | N | N | N | S | S | S | S | O | N | N | N | N |
| 265.00 | S | S | S | S | N | N | N | N | S | S | S | S | S | N | N | N | N |
| 265.25 | S | S | S | S | N | N | N | N | S | S | S | S | S | N | N | N | N |
| 265.50 | S | S | S | S | N | N | N | N | S | S | S | S | S | N | N | N | N |
| 265.75 | S | S | S | S | N | N | N | N | O | S | S | S | S | N | N | N | N |
| 266.00 | S | S | S | S | N | N | N | N | N | S | S | S | S | N | N | N | N |
| 266.25 | S | S | S | S | N | N | N | N | N | S | S | S | S | N | N | N | N |
| 266.50 | S | S | S | S | N | N | N | N | N | S | S | S | S | N | N | N | N |
| 266.75 | S | S | S | S | O | N | N | N | N | S | S | S | S | N | N | N | N |
| 267.00 | S | S | S | S | S | N | N | N | N | S | S | S | S | O | N | N | N |
| 267.25 | S | S | S | S | S | N | N | N | N | S | S | S | S | S | N | N | N |
| 267.50 | S | S | S | S | S | N | N | N | N | S | S | S | S | S | N | N | N |
| 267.75 | O | S | S | S | S | N | N | N | N | S | S | S | S | S | N | N | N |
| 268.00 | N | S | S | S | S | N | N | N | N | O | S | S | S | S | N | N | N |
| 268.25 | N | S | S | S | S | N | N | N | N | N | S | S | S | S | N | N | N |
| 268.50 | N | S | S | S | S | N | N | N | N | N | S | S | S | S | N | N | N |
| 268.75 | N | S | S | S | S | N | N | N | N | N | S | S | S | S | N | N | N |
| 269.00 | N | S | S | S | S | O | N | N | N | N | S | S | S | S | N | N | N |
| 269.25 | N | S | S | S | S | S | N | N | N | N | S | S | S | S | O | N | N |
| 269.50 | N | S | S | S | S | S | N | N | N | N | S | S | S | S | S | N | N |
| 269.75 | N | S | S | S | S | S | N | N | N | N | S | S | S | S | S | N | N |
| 270.00 | N | O | S | S | S | S | N | N | N | N | S | S | S | S | S | N | N |
| 270.25 | N | N | S | S | S | S | N | N | N | N | O | S | S | S | S | N | N |
| 270.50 | N | N | S | S | S | S | N | N | N | N | N | S | S | S | S | N | N |
| 270.75 | N | N | S | S | S | S | N | N | N | N | N | S | S | S | S | N | N |
| 271.00 | N | N | S | S | S | S | N | N | N | N | N | S | S | S | S | N | N |
| 271.25 | N | N | S | S | S | S | O | N | N | N | N | S | S | S | S | N | N |
| 271.50 | N | N | S | S | S | S | S | N | N | N | N | S | S | S | S | O | N |
| 271.75 | N | N | S | S | S | S | S | N | N | N | N | S | S | S | S | S | N |
| 272.00 | N | N | S | S | S | S | S | N | N | N | N | S | S | S | S | S | N |
| 272.25 | N | N | O | S | S | S | S | N | N | N | N | S | S | S | S | S | N |
| 272.50 | N | N | N | S | S | S | S | N | N | N | N | O | S | S | S | S | N |
| 272.75 | N | N | N | S | S | S | S | N | N | N | N | N | S | S | S | S | N |
| 273.00 | N | N | N | S | S | S | S | N | N | N | N | N | S | S | S | S | N |
| 273.25 | N | N | N | S | S | S | S | N | N | N | N | N | S | S | S | S | N |
| 273.50 | N | N | N | S | S | S | S | O | N | N | N | N | S | S | S | S | N |
| 273.75 | N | N | N | S | S | S | S | S | N | N | N | N | S | S | S | S | O |
| 274.00 | N | N | N | S | S | S | S | S | N | N | N | N | S | S | S | S | S |
| 274.25 | N | N | N | S | S | S | S | S | N | N | N | N | S | S | S | S | S |
| 274.50 | N | N | N | O | S | S | S | S | N | N | N | N | S | S | S | S | S |
| 274.75 | N | N | N | N | S | S | S | S | N | N | N | N | O | S | S | S | S |
| 275.00 | N | N | N | N | S | S | S | S | N | N | N | N | N | S | S | S | S |
| 275.25 | N | N | N | N | S | S | S | S | N | N | N | N | N | S | S | S | S |
| 275.50 | N | N | N | N | S | S | S | S | N | N | N | N | N | S | S | S | S |
| 275.75 | N | N | N | N | S | S | S | S | O | N | N | N | N | S | S | S | S |

Page Row 23, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 264.00 | S | S | S | S | N | N | N | N | O | S | S | S | S | N | N | N | N |
| 264.25 | S | S | S | S | N | N | N | N | N | S | S | S | S | N | N | N | N |
| 264.50 | S | S | S | S | N | N | N | N | N | S | S | S | S | N | N | N | N |
| 264.75 | S | S | S | S | N | N | N | N | N | S | S | S | S | N | N | N | N |
| 265.00 | S | S | S | S | O | N | N | N | N | S | S | S | S | N | N | N | N |

-continued

| Coil Excitation | | | | | | | | | | | | | | | | | |
|---|---|---|---|---|---|---|---|---|---|---|---|---|---|---|---|---|---|
| 265.25 | S | S | S | S | S | N | N | N | N | S | S | S | S | O | N | N | N |
| 265.50 | S | S | S | S | S | N | N | N | N | S | S | S | S | S | N | N | N |
| 265.75 | S | S | S | S | S | N | N | N | N | S | S | S | S | S | N | N | N |
| 266.00 | O | S | S | S | S | N | N | N | N | S | S | S | S | S | N | N | N |
| 266.25 | N | S | S | S | S | N | N | N | N | O | S | S | S | S | N | N | N |
| 266.50 | N | S | S | S | S | N | N | N | N | N | S | S | S | S | N | N | N |
| 266.75 | N | S | S | S | S | N | N | N | N | N | S | S | S | S | N | N | N |
| 267.00 | N | S | S | S | S | N | N | N | N | N | S | S | S | S | N | N | N |
| 267.25 | N | S | S | S | S | O | N | N | N | N | S | S | S | S | N | N | N |
| 267.50 | N | S | S | S | S | S | N | N | N | N | S | S | S | S | O | N | N |
| 267.75 | N | S | S | S | S | S | N | N | N | N | S | S | S | S | S | N | N |
| 268.00 | N | S | S | S | S | S | N | N | N | N | S | S | S | S | S | N | N |
| 268.25 | N | O | S | S | S | S | N | N | N | N | S | S | S | S | S | N | N |
| 268.50 | N | N | S | S | S | S | N | N | N | N | O | S | S | S | S | N | N |
| 268.75 | N | N | S | S | S | S | N | N | N | N | N | S | S | S | S | N | N |
| 269.00 | N | N | S | S | S | S | N | N | N | N | N | S | S | S | S | N | N |
| 269.25 | N | N | S | S | S | S | N | N | N | N | N | S | S | S | S | N | N |
| 269.50 | N | N | S | S | S | S | O | N | N | N | N | S | S | S | S | N | N |
| 269.75 | N | N | S | S | S | S | S | N | N | N | N | S | S | S | S | O | N |
| 270.00 | N | N | S | S | S | S | S | N | N | N | N | S | S | S | S | S | N |
| 270.25 | N | N | S | S | S | S | S | N | N | N | N | S | S | S | S | S | N |
| 270.50 | N | N | O | S | S | S | S | N | N | N | N | S | S | S | S | S | N |
| 270.75 | N | N | N | S | S | S | S | N | N | N | N | O | S | S | S | S | N |
| 271.00 | N | N | N | S | S | S | S | N | N | N | N | N | S | S | S | S | N |
| 271.25 | N | N | N | S | S | S | S | N | N | N | N | N | S | S | S | S | N |
| 271.50 | N | N | N | S | S | S | S | N | N | N | N | N | S | S | S | S | N |
| 271.75 | N | N | N | S | S | S | S | O | N | N | N | N | S | S | S | S | N |
| 272.00 | N | N | N | S | S | S | S | S | N | N | N | N | S | S | S | S | O |
| 272.25 | N | N | N | S | S | S | S | S | N | N | N | N | S | S | S | S | S |
| 272.50 | N | N | N | S | S | S | S | S | N | N | N | N | S | S | S | S | S |
| 272.75 | N | N | N | O | S | S | S | S | N | N | N | N | S | S | S | S | S |
| 273.00 | N | N | N | N | S | S | S | S | N | N | N | N | O | S | S | S | S |
| 273.25 | N | N | N | N | S | S | S | S | N | N | N | N | N | S | S | S | S |
| 273.50 | N | N | N | N | S | S | S | S | N | N | N | N | N | S | S | S | S |
| 273.75 | N | N | N | N | S | S | S | S | N | N | N | N | N | S | S | S | S |
| 274.00 | N | N | N | N | S | S | S | S | O | N | N | N | N | S | S | S | S |
| 274.25 | N | N | N | N | S | S | S | S | S | N | N | N | N | S | S | S | S |
| 274.50 | N | N | N | N | S | S | S | S | S | N | N | N | N | S | S | S | S |
| 274.75 | N | N | N | N | S | S | S | S | S | N | N | N | N | S | S | S | S |
| 275.00 | N | N | N | N | O | S | S | S | S | N | N | N | N | S | S | S | S |
| 275.25 | N | N | N | N | N | S | S | S | S | N | N | N | N | O | S | S | S |
| 275.50 | N | N | N | N | N | S | S | S | S | N | N | N | N | N | S | S | S |
| 275.75 | N | N | N | N | N | S | S | S | S | N | N | N | N | N | S | S | S |

Page Row 23, Page Column 9

| Coil | 154 | 155 | 156 | 157 | 158 | 159 | 160 |
|---|---|---|---|---|---|---|---|
| 264.00 | S | S | S | S | S | N | N |
| 264.25 | O | S | S | S | S | N | N |
| 264.50 | N | S | S | S | S | N | N |
| 264.75 | N | S | S | S | S | N | N |
| 265.00 | N | S | S | S | S | N | N |
| 265.25 | N | S | S | S | S | N | N |
| 265.50 | N | S | S | S | S | O | N |
| 265.75 | N | S | S | S | S | S | N |
| 266.00 | N | S | S | S | S | S | N |
| 266.25 | N | S | S | S | S | S | N |
| 266.50 | N | O | S | S | S | S | N |
| 266.75 | N | N | S | S | S | S | N |
| 267.00 | N | N | S | S | S | S | N |
| 267.25 | N | N | S | S | S | S | N |
| 267.50 | N | N | S | S | S | S | N |
| 267.75 | N | N | S | S | S | S | O |
| 268.00 | N | N | S | S | S | S | S |
| 268.25 | N | N | S | S | S | S | S |
| 268.50 | N | N | S | S | S | S | S |
| 268.75 | N | N | O | S | S | S | S |
| 269.00 | N | N | N | S | S | S | S |
| 269.25 | N | N | N | S | S | S | S |
| 269.50 | N | N | N | S | S | S | S |
| 269.75 | N | N | N | S | S | S | S |
| 270.00 | N | N | N | S | S | S | S |
| 270.25 | N | N | N | S | S | S | S |
| 270.50 | N | N | N | S | S | S | S |
| 270.75 | N | N | N | S | S | S | S |
| 271.00 | N | N | N | O | S | S | S |
| 271.25 | N | N | N | N | S | S | S |

-continued

| Coil Excitation | | | | | | | |
|---|---|---|---|---|---|---|---|
| 271.50 | N | N | N | N | S | S | S |
| 271.75 | N | N | N | N | S | S | S |
| 272.00 | N | N | N | N | S | S | S |
| 272.25 | N | N | N | N | S | S | S |
| 272.50 | N | N | N | N | S | S | S |
| 272.75 | N | N | N | N | S | S | S |
| 273.00 | N | N | N | N | S | S | S |
| 273.25 | N | N | N | N | O | S | S |
| 273.50 | N | N | N | N | N | S | S |
| 273.75 | N | N | N | N | N | S | S |
| 274.00 | N | N | N | N | N | S | S |
| 274.25 | O | N | N | N | N | S | S |
| 274.50 | S | N | N | N | N | S | S |
| 274.75 | S | N | N | N | N | S | S |
| 275.00 | S | N | N | N | N | S | S |
| 275.25 | S | N | N | N | N | S | S |
| 275.50 | S | N | N | N | N | O | S |
| 275.75 | S | N | N | N | N | N | S |

Page Row 23, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 276.00 | S | S | S | N | N | N | N | N | S | S | S | S | N | N | N | N | O |
| 276.25 | S | S | S | N | N | N | N | N | S | S | S | S | N | N | N | N | N |
| 276.50 | S | S | S | N | N | N | N | N | S | S | S | S | N | N | N | N | N |
| 276.75 | S | S | S | O | N | N | N | N | S | S | S | S | N | N | N | N | N |
| 277.00 | S | S | S | S | N | N | N | N | S | S | S | S | O | N | N | N | N |
| 277.25 | S | S | S | S | N | N | N | N | S | S | S | S | S | N | N | N | N |
| 277.50 | S | S | S | S | N | N | N | N | S | S | S | S | S | N | N | N | N |
| 277.75 | S | S | S | S | N | N | N | N | S | S | S | S | S | N | N | N | N |
| 278.00 | S | S | S | S | N | N | N | N | O | S | S | S | S | N | N | N | N |
| 278.25 | S | S | S | S | N | N | N | N | N | S | S | S | S | N | N | N | N |
| 278.50 | S | S | S | S | N | N | N | N | N | S | S | S | S | N | N | N | N |
| 278.75 | S | S | S | S | N | N | N | N | N | S | S | S | S | N | N | N | N |
| 279.00 | S | S | S | S | O | N | N | N | N | S | S | S | S | N | N | N | N |
| 279.25 | S | S | S | S | S | N | N | N | N | S | S | S | S | O | N | N | N |
| 279.50 | S | S | S | S | S | N | N | N | N | S | S | S | S | S | N | N | N |
| 279.75 | S | S | S | S | S | N | N | N | N | S | S | S | S | S | N | N | N |
| 280.00 | O | S | S | S | S | N | N | N | N | S | S | S | S | S | N | N | N |
| 280.25 | N | S | S | S | S | N | N | N | N | O | S | S | S | S | N | N | N |
| 280.50 | N | S | S | S | S | N | N | N | N | N | S | S | S | S | N | N | N |
| 280.75 | N | S | S | S | S | N | N | N | N | N | S | S | S | S | N | N | N |
| 281.00 | N | S | S | S | S | N | N | N | N | N | S | S | S | S | N | N | N |
| 281.25 | N | S | S | S | S | O | N | N | N | N | S | S | S | S | N | N | N |
| 281.50 | N | S | S | S | S | S | N | N | N | N | S | S | S | S | O | N | N |
| 281.75 | N | S | S | S | S | S | N | N | N | N | S | S | S | S | S | N | N |
| 282.00 | N | S | S | S | S | S | N | N | N | N | S | S | S | S | S | N | N |
| 282.25 | N | O | S | S | S | S | N | N | N | N | S | S | S | S | S | N | N |
| 282.50 | N | N | S | S | S | S | N | N | N | N | O | S | S | S | S | N | N |
| 282.75 | N | N | S | S | S | S | N | N | N | N | N | S | S | S | S | N | N |
| 283.00 | N | N | S | S | S | S | N | N | N | N | N | S | S | S | S | N | N |
| 283.25 | N | N | S | S | S | S | N | N | N | N | N | S | S | S | S | N | N |
| 283.50 | N | N | S | S | S | S | O | N | N | N | N | S | S | S | S | N | N |
| 283.75 | N | N | S | S | S | S | S | N | N | N | N | S | S | S | S | O | N |
| 284.00 | N | N | S | S | S | S | S | N | N | N | N | S | S | S | S | S | N |
| 284.25 | N | N | S | S | S | S | S | N | N | N | N | S | S | S | S | S | N |
| 284.50 | N | N | O | S | S | S | S | N | N | N | N | S | S | S | S | S | N |
| 284.75 | N | N | N | S | S | S | S | N | N | N | N | O | S | S | S | S | N |
| 285.00 | N | N | N | S | S | S | S | N | N | N | N | N | S | S | S | S | N |
| 285.25 | N | N | N | S | S | S | S | N | N | N | N | N | S | S | S | S | N |
| 285.50 | N | N | N | S | S | S | S | N | N | N | N | N | S | S | S | S | N |
| 285.75 | N | N | N | S | S | S | S | O | N | N | N | N | S | S | S | S | N |
| 286.00 | N | N | N | S | S | S | S | S | N | N | N | N | S | S | S | S | O |
| 286.25 | N | N | N | S | S | S | S | S | N | N | N | N | S | S | S | S | S |
| 286.50 | N | N | N | S | S | S | S | S | N | N | N | N | S | S | S | S | S |
| 286.75 | N | N | N | O | S | S | S | S | N | N | N | N | S | S | S | S | S |
| 287.00 | N | N | N | N | S | S | S | S | N | N | N | N | O | S | S | S | S |
| 287.25 | N | N | N | N | S | S | S | S | N | N | N | N | N | S | S | S | S |
| 287.50 | N | N | N | N | S | S | S | S | N | N | N | N | N | S | S | S | S |
| 287.75 | N | N | N | N | S | S | S | S | N | N | N | N | N | S | S | S | S |

Page Row 24, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 276.00 | S | S | S | S | N | N | N | N | S | S | S | S | S | N | N | N | N |
| 276.25 | S | S | S | S | N | N | N | N | O | S | S | S | S | N | N | N | N |
| 276.50 | S | S | S | S | N | N | N | N | N | S | S | S | S | N | N | N | N |

-continued

Coil Excitation

| | | | | | | | | | | | | | | | | | |
|---|---|---|---|---|---|---|---|---|---|---|---|---|---|---|---|---|---|
| 276.75 | S | S | S | S | N | N | N | N | N | S | S | S | S | N | N | N | N |
| 277.00 | S | S | S | S | N | N | N | N | N | S | S | S | S | N | N | N | N |
| 277.25 | S | S | S | S | O | N | N | N | N | S | S | S | S | N | N | N | N |
| 277.50 | S | S | S | S | S | N | N | N | N | S | S | S | S | O | N | N | N |
| 277.75 | S | S | S | S | S | N | N | N | N | S | S | S | S | S | N | N | N |
| 278.00 | S | S | S | S | S | N | N | N | N | S | S | S | S | S | N | N | N |
| 278.25 | O | S | S | S | S | N | N | N | N | S | S | S | S | S | N | N | N |
| 278.50 | N | S | S | S | S | N | N | N | N | O | S | S | S | S | N | N | N |
| 278.75 | N | S | S | S | S | N | N | N | N | N | S | S | S | S | N | N | N |
| 279.00 | N | S | S | S | S | N | N | N | N | N | S | S | S | S | N | N | N |
| 279.25 | N | S | S | S | S | N | N | N | N | N | S | S | S | S | N | N | N |
| 279.50 | N | S | S | S | S | O | N | N | N | N | S | S | S | S | N | N | N |
| 279.75 | N | S | S | S | S | S | N | N | N | N | S | S | S | S | O | N | N |
| 280.00 | N | S | S | S | S | S | N | N | N | N | S | S | S | S | S | N | N |
| 280.25 | N | S | S | S | S | S | N | N | N | N | S | S | S | S | S | N | N |
| 280.50 | N | O | S | S | S | S | N | N | N | N | S | S | S | S | S | N | N |
| 280.75 | N | N | S | S | S | S | N | N | N | N | O | S | S | S | S | N | N |
| 281.00 | N | N | S | S | S | S | N | N | N | N | N | S | S | S | S | N | N |
| 281.25 | N | N | S | S | S | S | N | N | N | N | N | S | S | S | S | N | N |
| 281.50 | N | N | S | S | S | S | N | N | N | N | N | S | S | S | S | N | N |
| 281.75 | N | N | S | S | S | S | O | N | N | N | N | S | S | S | S | N | N |
| 282.00 | N | N | S | S | S | S | S | N | N | N | N | S | S | S | S | O | N |
| 282.25 | N | N | S | S | S | S | S | N | N | N | N | S | S | S | S | S | N |
| 282.50 | N | N | S | S | S | S | S | N | N | N | N | S | S | S | S | S | N |
| 282.75 | N | N | O | S | S | S | S | N | N | N | N | S | S | S | S | S | N |
| 283.00 | N | N | N | S | S | S | S | N | N | N | N | O | S | S | S | S | N |
| 283.25 | N | N | N | S | S | S | S | N | N | N | N | N | S | S | S | S | N |
| 283.50 | N | N | N | S | S | S | S | N | N | N | N | N | S | S | S | S | N |
| 283.75 | N | N | N | S | S | S | S | N | N | N | N | N | S | S | S | S | N |
| 284.00 | N | N | N | S | S | S | S | O | N | N | N | N | S | S | S | S | N |
| 284.25 | N | N | N | S | S | S | S | S | N | N | N | N | S | S | S | S | O |
| 284.50 | N | N | N | S | S | S | S | S | N | N | N | N | S | S | S | S | S |
| 284.75 | N | N | N | S | S | S | S | S | N | N | N | N | S | S | S | S | S |
| 285.00 | N | N | N | O | S | S | S | S | N | N | N | N | S | S | S | S | S |
| 285.25 | N | N | N | N | S | S | S | S | N | N | N | N | O | S | S | S | S |
| 285.50 | N | N | N | N | S | S | S | S | N | N | N | N | N | S | S | S | S |
| 285.75 | N | N | N | N | S | S | S | S | N | N | N | N | N | S | S | S | S |
| 286.00 | N | N | N | N | S | S | S | S | N | N | N | N | N | S | S | S | S |
| 286.25 | N | N | N | N | S | S | S | S | O | N | N | N | N | S | S | S | S |
| 286.50 | N | N | N | N | S | S | S | S | S | N | N | N | N | S | S | S | S |
| 286.75 | N | N | N | N | S | S | S | S | S | N | N | N | N | S | S | S | S |
| 287.00 | N | N | N | N | S | S | S | S | S | N | N | N | N | S | S | S | S |
| 287.25 | N | N | N | N | O | S | S | S | S | N | N | N | N | S | S | S | S |
| 287.50 | N | N | N | N | N | S | S | S | S | N | N | N | N | O | S | S | S |
| 287.75 | N | N | N | N | N | S | S | S | S | N | N | N | N | N | S | S | S |

Page Row 24, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 276.00 | S | S | S | S | S | N | N | N | N | S | S | S | S | S | N | N | N |
| 276.25 | S | S | S | S | S | N | N | N | N | S | S | S | S | S | N | N | N |
| 276.50 | O | S | S | S | S | N | N | N | N | S | S | S | S | S | N | N | N |
| 276.75 | N | S | S | S | S | N | N | N | N | O | S | S | S | S | N | N | N |
| 277.00 | N | S | S | S | S | N | N | N | N | N | S | S | S | S | N | N | N |
| 277.25 | N | S | S | S | S | N | N | N | N | N | S | S | S | S | N | N | N |
| 277.50 | N | S | S | S | S | N | N | N | N | N | S | S | S | S | N | N | N |
| 277.75 | N | S | S | S | S | O | N | N | N | N | S | S | S | S | N | N | N |
| 278.00 | N | S | S | S | S | S | N | N | N | N | S | S | S | S | O | N | N |
| 278.25 | N | S | S | S | S | S | N | N | N | N | S | S | S | S | S | N | N |
| 278.50 | N | S | S | S | S | S | N | N | N | N | S | S | S | S | S | N | N |
| 278.75 | N | O | S | S | S | S | N | N | N | N | S | S | S | S | S | N | N |
| 279.00 | N | N | S | S | S | S | N | N | N | N | O | S | S | S | S | N | N |
| 279.25 | N | N | S | S | S | S | N | N | N | N | N | S | S | S | S | N | N |
| 279.50 | N | N | S | S | S | S | N | N | N | N | N | S | S | S | S | N | N |
| 279.75 | N | N | S | S | S | S | N | N | N | N | N | S | S | S | S | N | N |
| 280.00 | N | N | S | S | S | S | O | N | N | N | N | S | S | S | S | N | N |
| 280.25 | N | N | S | S | S | S | S | N | N | N | N | S | S | S | S | O | N |
| 280.50 | N | N | S | S | S | S | S | N | N | N | N | S | S | S | S | S | N |
| 280.75 | N | N | S | S | S | S | S | N | N | N | N | S | S | S | S | S | N |
| 281.00 | N | N | O | S | S | S | S | N | N | N | N | S | S | S | S | S | N |
| 281.25 | N | N | N | S | S | S | S | N | N | N | N | O | S | S | S | S | N |
| 281.50 | N | N | N | S | S | S | S | N | N | N | N | N | S | S | S | S | N |
| 281.75 | N | N | N | S | S | S | S | N | N | N | N | N | S | S | S | S | N |
| 282.00 | N | N | N | S | S | S | S | N | N | N | N | N | S | S | S | S | N |
| 282.25 | N | N | N | S | S | S | S | O | N | N | N | N | S | S | S | S | N |
| 282.50 | N | N | N | S | S | S | S | S | N | N | N | N | S | S | S | S | O |
| 282.75 | N | N | N | S | S | S | S | S | N | N | N | N | S | S | S | S | S |

-continued

| Coil Excitation | | | | | | | | | | | | | | | | | |
|---|---|---|---|---|---|---|---|---|---|---|---|---|---|---|---|---|---|
| 283.00 | N | N | N | S | S | S | S | S | N | N | N | N | S | S | S | S | S |
| 283.25 | N | N | N | O | S | S | S | S | N | N | N | N | S | S | S | S | S |
| 283.50 | N | N | N | N | S | S | S | S | N | N | N | N | O | S | S | S | S |
| 283.75 | N | N | N | N | S | S | S | S | N | N | N | N | N | S | S | S | S |
| 284.00 | N | N | N | N | S | S | S | S | N | N | N | N | N | S | S | S | S |
| 284.25 | N | N | N | N | S | S | S | S | N | N | N | N | N | S | S | S | S |
| 284.50 | N | N | N | N | S | S | S | S | O | N | N | N | N | S | S | S | S |
| 284.75 | N | N | N | N | S | S | S | S | S | N | N | N | N | S | S | S | S |
| 285.00 | N | N | N | N | S | S | S | S | S | N | N | N | N | S | S | S | S |
| 285.25 | N | N | N | N | S | S | S | S | S | N | N | N | N | S | S | S | S |
| 285.50 | N | N | N | N | O | S | S | S | S | N | N | N | N | S | S | S | S |
| 285.75 | N | N | N | N | N | S | S | S | S | N | N | N | N | O | S | S | S |
| 286.00 | N | N | N | N | N | S | S | S | S | N | N | N | N | N | S | S | S |
| 286.25 | N | N | N | N | N | S | S | S | S | N | N | N | N | N | S | S | S |
| 286.50 | O | N | N | N | N | S | S | S | S | N | N | N | N | N | S | S | S |
| 286.75 | S | N | N | N | N | S | S | S | S | O | N | N | N | N | S | S | S |
| 287.00 | S | N | N | N | N | S | S | S | S | S | N | N | N | N | S | S | S |
| 287.25 | S | N | N | N | N | S | S | S | S | S | N | N | N | N | S | S | S |
| 287.50 | S | N | N | N | N | S | S | S | S | S | N | N | N | N | S | S | S |
| 287.75 | S | N | N | N | N | O | S | S | S | S | N | N | N | N | S | S | S |

Page Row 24, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 276.00 | N | S | S | S | S | O | N | N | N | N | S | S | S | S | N | N | N |
| 276.25 | N | S | S | S | S | S | N | N | N | N | S | S | S | S | O | N | N |
| 276.50 | N | S | S | S | S | S | N | N | N | N | S | S | S | S | S | N | N |
| 276.75 | N | S | S | S | S | S | N | N | N | N | S | S | S | S | S | N | N |
| 277.00 | N | O | S | S | S | S | N | N | N | N | S | S | S | S | S | N | N |
| 277.25 | N | N | S | S | S | S | N | N | N | N | O | S | S | S | S | N | N |
| 277.50 | N | N | S | S | S | S | N | N | N | N | N | S | S | S | S | N | N |
| 277.75 | N | N | S | S | S | S | N | N | N | N | N | S | S | S | S | N | N |
| 278.00 | N | N | S | S | S | S | N | N | N | N | N | S | S | S | S | N | N |
| 278.25 | N | N | S | S | S | S | O | N | N | N | N | S | S | S | S | N | N |
| 278.50 | N | N | S | S | S | S | S | N | N | N | N | S | S | S | S | O | N |
| 278.75 | N | N | S | S | S | S | S | N | N | N | N | S | S | S | S | S | N |
| 279.00 | N | N | S | S | S | S | S | N | N | N | N | S | S | S | S | S | N |
| 279.25 | N | N | O | S | S | S | S | N | N | N | N | S | S | S | S | S | N |
| 279.50 | N | N | N | S | S | S | S | N | N | N | N | O | S | S | S | S | N |
| 279.75 | N | N | N | S | S | S | S | N | N | N | N | N | S | S | S | S | N |
| 280.00 | N | N | N | S | S | S | S | N | N | N | N | N | S | S | S | S | N |
| 280.25 | N | N | N | S | S | S | S | N | N | N | N | N | S | S | S | S | N |
| 280.50 | N | N | N | S | S | S | S | O | N | N | N | N | S | S | S | S | N |
| 280.75 | N | N | N | S | S | S | S | S | N | N | N | N | S | S | S | S | O |
| 281.00 | N | N | N | S | S | S | S | S | N | N | N | N | S | S | S | S | S |
| 281.25 | N | N | N | S | S | S | S | S | N | N | N | N | S | S | S | S | S |
| 281.50 | N | N | N | O | S | S | S | S | N | N | N | N | S | S | S | S | S |
| 281.75 | N | N | N | N | S | S | S | S | N | N | N | N | O | S | S | S | S |
| 282.00 | N | N | N | N | S | S | S | S | N | N | N | N | N | S | S | S | S |
| 282.25 | N | N | N | N | S | S | S | S | N | N | N | N | N | S | S | S | S |
| 282.50 | N | N | N | N | S | S | S | S | N | N | N | N | N | S | S | S | S |
| 282.75 | N | N | N | N | S | S | S | S | O | N | N | N | N | S | S | S | S |
| 283.00 | N | N | N | N | S | S | S | S | S | N | N | N | N | S | S | S | S |
| 283.25 | N | N | N | N | S | S | S | S | S | N | N | N | N | S | S | S | S |
| 283.50 | N | N | N | N | S | S | S | S | S | N | N | N | N | S | S | S | S |
| 283.75 | N | N | N | N | O | S | S | S | S | N | N | N | N | S | S | S | S |
| 284.00 | N | N | N | N | N | S | S | S | S | N | N | N | N | O | S | S | S |
| 284.25 | N | N | N | N | N | S | S | S | S | N | N | N | N | N | S | S | S |
| 284.50 | N | N | N | N | N | S | S | S | S | N | N | N | N | N | S | S | S |
| 284.75 | O | N | N | N | N | S | S | S | S | N | N | N | N | N | S | S | S |
| 285.00 | S | N | N | N | N | S | S | S | S | O | N | N | N | N | S | S | S |
| 285.25 | S | N | N | N | N | S | S | S | S | S | N | N | N | N | S | S | S |
| 285.50 | S | N | N | N | N | S | S | S | S | S | N | N | N | N | S | S | S |
| 285.75 | S | N | N | N | N | S | S | S | S | S | N | N | N | N | S | S | S |
| 286.00 | S | N | N | N | N | O | S | S | S | S | N | N | N | N | S | S | S |
| 286.25 | S | N | N | N | N | N | S | S | S | S | N | N | N | N | O | S | S |
| 286.50 | S | N | N | N | N | N | S | S | S | S | N | N | N | N | N | S | S |
| 286.75 | S | N | N | N | N | N | S | S | S | S | N | N | N | N | N | S | S |
| 287.00 | S | O | N | N | N | N | S | S | S | S | N | N | N | N | N | S | S |
| 287.25 | S | S | N | N | N | N | S | S | S | S | O | N | N | N | N | S | S |
| 287.50 | S | S | N | N | N | N | S | S | S | S | S | N | N | N | N | S | S |
| 287.75 | S | S | N | N | N | N | S | S | S | S | S | N | N | N | N | S | S |

Page Row 24, Page Column 4

-continued

| Coil Excitation | | | | | | | | | | | | | | | | | |
|---|---|---|---|---|---|---|---|---|---|---|---|---|---|---|---|---|---|
| Coil | 69 | 70 | 71 | 72 | 73 | 74 | 75 | 76 | 77 | 78 | 79 | 80 | 81 | 82 | 83 | 84 | 85 |
| 276.00 | N | N | S | S | S | S | N | N | N | N | N | S | S | S | S | N | N |
| 276.25 | N | N | S | S | S | S | N | N | N | N | N | S | S | S | S | N | N |
| 276.50 | N | N | S | S | S | S | O | N | N | N | N | S | S | S | S | N | N |
| 276.75 | N | N | S | S | S | S | S | N | N | N | N | S | S | S | S | O | N |
| 277.00 | N | N | S | S | S | S | S | N | N | N | N | S | S | S | S | S | N |
| 277.25 | N | N | S | S | S | S | S | N | N | N | N | S | S | S | S | S | N |
| 277.50 | N | N | O | S | S | S | S | N | N | N | N | S | S | S | S | S | N |
| 277.75 | N | N | N | S | S | S | S | N | N | N | N | O | S | S | S | S | N |
| 278.00 | N | N | N | S | S | S | S | N | N | N | N | N | S | S | S | S | N |
| 278.25 | N | N | N | S | S | S | S | N | N | N | N | N | S | S | S | S | N |
| 278.50 | N | N | N | S | S | S | S | N | N | N | N | N | S | S | S | S | N |
| 278.75 | N | N | N | S | S | S | S | O | N | N | N | N | S | S | S | S | N |
| 279.00 | N | N | N | S | S | S | S | S | N | N | N | N | S | S | S | S | O |
| 279.25 | N | N | N | S | S | S | S | S | N | N | N | N | S | S | S | S | S |
| 279.50 | N | N | N | S | S | S | S | S | N | N | N | N | S | S | S | S | S |
| 279.75 | N | N | N | O | S | S | S | S | N | N | N | N | S | S | S | S | S |
| 280.00 | N | N | N | N | S | S | S | S | N | N | N | N | O | S | S | S | S |
| 280.25 | N | N | N | N | S | S | S | S | N | N | N | N | N | S | S | S | S |
| 280.50 | N | N | N | N | S | S | S | S | N | N | N | N | N | S | S | S | S |
| 280.75 | N | N | N | N | S | S | S | S | N | N | N | N | N | S | S | S | S |
| 281.00 | N | N | N | N | S | S | S | S | O | N | N | N | N | S | S | S | S |
| 281.25 | N | N | N | N | S | S | S | S | S | N | N | N | N | S | S | S | S |
| 281.50 | N | N | N | N | S | S | S | S | S | N | N | N | N | S | S | S | S |
| 281.75 | N | N | N | N | S | S | S | S | S | N | N | N | N | S | S | S | S |
| 282.00 | N | N | N | N | O | S | S | S | S | N | N | N | N | S | S | S | S |
| 282.25 | N | N | N | N | N | S | S | S | S | N | N | N | N | O | S | S | S |
| 282.50 | N | N | N | N | N | S | S | S | S | N | N | N | N | N | S | S | S |
| 282.75 | N | N | N | N | N | S | S | S | S | N | N | N | N | N | S | S | S |
| 283.00 | O | N | N | N | N | S | S | S | S | N | N | N | N | N | S | S | S |
| 283.25 | S | N | N | N | N | S | S | S | S | O | N | N | N | N | S | S | S |
| 283.50 | S | N | N | N | N | S | S | S | S | S | N | N | N | N | S | S | S |
| 283.75 | S | N | N | N | N | S | S | S | S | S | N | N | N | N | S | S | S |
| 284.00 | S | N | N | N | N | S | S | S | S | S | N | N | N | N | S | S | S |
| 284.25 | S | N | N | N | N | O | S | S | S | S | N | N | N | N | S | S | S |
| 284.50 | S | N | N | N | N | N | S | S | S | S | N | N | N | N | O | S | S |
| 284.75 | S | N | N | N | N | N | S | S | S | S | N | N | N | N | N | S | S |
| 285.00 | S | N | N | N | N | N | S | S | S | S | N | N | N | N | N | S | S |
| 285.25 | S | O | N | N | N | N | S | S | S | S | N | N | N | N | N | S | S |
| 285.50 | S | S | N | N | N | N | S | S | S | S | O | N | N | N | N | S | S |
| 285.75 | S | S | N | N | N | N | S | S | S | S | S | N | N | N | N | S | S |
| 286.00 | S | S | N | N | N | N | S | S | S | S | S | N | N | N | N | S | S |
| 286.25 | S | S | N | N | N | N | S | S | S | S | S | N | N | N | N | S | S |
| 286.50 | S | S | N | N | N | N | O | S | S | S | S | N | N | N | N | S | S |
| 286.75 | S | S | N | N | N | N | N | S | S | S | S | N | N | N | N | O | S |
| 287.00 | S | S | N | N | N | N | N | S | S | S | S | N | N | N | N | N | S |
| 287.25 | S | S | N | N | N | N | N | S | S | S | S | N | N | N | N | N | S |
| 287.50 | S | S | O | N | N | N | N | S | S | S | S | N | N | N | N | N | S |
| 287.75 | S | S | S | N | N | N | N | S | S | S | S | O | N | N | N | N | S |

Page Row 24, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 276.00 | N | N | N | S | S | S | S | N | N | N | N | O | S | S | S | S | N |
| 276.25 | N | N | N | S | S | S | S | N | N | N | N | N | S | S | S | S | N |
| 276.50 | N | N | N | S | S | S | S | N | N | N | N | N | S | S | S | S | N |
| 276.75 | N | N | N | S | S | S | S | N | N | N | N | N | S | S | S | S | N |
| 277.00 | N | N | N | S | S | S | S | O | N | N | N | N | S | S | S | S | N |
| 277.25 | N | N | N | S | S | S | S | S | N | N | N | N | S | S | S | S | O |
| 277.50 | N | N | N | S | S | S | S | S | N | N | N | N | S | S | S | S | S |
| 277.75 | N | N | N | S | S | S | S | S | N | N | N | N | S | S | S | S | S |
| 278.00 | N | N | N | O | S | S | S | S | N | N | N | N | S | S | S | S | S |
| 278.25 | N | N | N | N | S | S | S | S | N | N | N | N | O | S | S | S | S |
| 278.50 | N | N | N | N | S | S | S | S | N | N | N | N | N | S | S | S | S |
| 278.75 | N | N | N | N | S | S | S | S | N | N | N | N | N | S | S | S | S |
| 279.00 | N | N | N | N | S | S | S | S | N | N | N | N | N | S | S | S | S |
| 279.25 | N | N | N | N | S | S | S | S | O | N | N | N | N | S | S | S | S |
| 279.50 | N | N | N | N | S | S | S | S | S | N | N | N | N | S | S | S | S |
| 279.75 | N | N | N | N | S | S | S | S | S | N | N | N | N | S | S | S | S |
| 280.00 | N | N | N | N | S | S | S | S | S | N | N | N | N | S | S | S | S |
| 280.25 | N | N | N | N | O | S | S | S | S | N | N | N | N | S | S | S | S |
| 280.50 | N | N | N | N | N | S | S | S | S | N | N | N | N | O | S | S | S |
| 280.75 | N | N | N | N | N | S | S | S | S | N | N | N | N | N | S | S | S |
| 281.00 | N | N | N | N | N | S | S | S | S | N | N | N | N | N | S | S | S |
| 281.25 | O | N | N | N | N | S | S | S | S | N | N | N | N | N | S | S | S |
| 281.50 | S | N | N | N | N | S | S | S | S | O | N | N | N | N | S | S | S |

-continued

Coil Excitation

| | | | | | | | | | | | | | | | | | |
|---|---|---|---|---|---|---|---|---|---|---|---|---|---|---|---|---|---|
| 281.75 | S | N | N | N | N | S | S | S | S | S | N | N | N | N | S | S | S |
| 282.00 | S | N | N | N | N | S | S | S | S | S | N | N | N | N | S | S | S |
| 282.25 | S | N | N | N | N | S | S | S | S | S | N | N | N | N | S | S | S |
| 282.50 | S | N | N | N | N | O | S | S | S | S | N | N | N | N | S | S | S |
| 282.75 | S | N | N | N | N | N | S | S | S | S | N | N | N | N | O | S | S |
| 283.00 | S | N | N | N | N | N | S | S | S | S | N | N | N | N | N | S | S |
| 283.25 | S | N | N | N | N | N | S | S | S | S | N | N | N | N | N | S | S |
| 283.50 | S | O | N | N | N | N | S | S | S | S | N | N | N | N | N | S | S |
| 283.75 | S | S | N | N | N | N | S | S | S | S | O | N | N | N | N | S | S |
| 284.00 | S | S | N | N | N | N | S | S | S | S | S | N | N | N | N | S | S |
| 284.25 | S | S | N | N | N | N | S | S | S | S | S | N | N | N | N | S | S |
| 284.50 | S | S | N | N | N | N | S | S | S | S | S | N | N | N | N | S | S |
| 284.75 | S | S | N | N | N | N | O | S | S | S | S | N | N | N | N | S | S |
| 285.00 | S | S | N | N | N | N | N | S | S | S | S | N | N | N | N | O | S |
| 285.25 | S | S | N | N | N | N | N | S | S | S | S | N | N | N | N | N | S |
| 285.50 | S | S | N | N | N | N | N | S | S | S | S | N | N | N | N | N | S |
| 285.75 | S | S | O | N | N | N | N | S | S | S | S | N | N | N | N | N | S |
| 286.00 | S | S | S | N | N | N | N | S | S | S | S | O | N | N | N | N | S |
| 286.25 | S | S | S | N | N | N | N | S | S | S | S | S | N | N | N | N | S |
| 286.50 | S | S | S | N | N | N | N | S | S | S | S | S | N | N | N | N | S |
| 286.75 | S | S | S | N | N | N | N | S | S | S | S | S | N | N | N | N | S |
| 287.00 | S | S | S | N | N | N | N | O | S | S | S | S | N | N | N | N | S |
| 287.25 | S | S | S | N | N | N | N | N | S | S | S | S | N | N | N | N | O |
| 287.50 | S | S | S | N | N | N | N | N | S | S | S | S | N | N | N | N | N |
| 287.75 | S | S | S | N | N | N | N | N | S | S | S | S | N | N | N | N | N |

Page Row 24, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 276.00 | N | N | N | S | S | S | S | S | N | N | N | N | S | S | S | S | S |
| 276.25 | N | N | N | O | S | S | S | S | N | N | N | N | S | S | S | S | S |
| 276.50 | N | N | N | N | S | S | S | S | N | N | N | N | O | S | S | S | S |
| 276.75 | N | N | N | N | S | S | S | S | N | N | N | N | N | S | S | S | S |
| 277.00 | N | N | N | N | S | S | S | S | N | N | N | N | N | S | S | S | S |
| 277.25 | N | N | N | N | S | S | S | S | N | N | N | N | N | S | S | S | S |
| 277.50 | N | N | N | N | S | S | S | S | O | N | N | N | N | S | S | S | S |
| 277.75 | N | N | N | N | S | S | S | S | S | N | N | N | N | S | S | S | S |
| 278.00 | N | N | N | N | S | S | S | S | S | N | N | N | N | S | S | S | S |
| 278.25 | N | N | N | N | S | S | S | S | S | N | N | N | N | S | S | S | S |
| 278.50 | N | N | N | N | O | S | S | S | S | N | N | N | N | S | S | S | S |
| 278.75 | N | N | N | N | N | S | S | S | S | N | N | N | N | O | S | S | S |
| 279.00 | N | N | N | N | N | S | S | S | S | N | N | N | N | N | S | S | S |
| 279.25 | N | N | N | N | N | S | S | S | S | N | N | N | N | N | S | S | S |
| 279.50 | O | N | N | N | N | S | S | S | S | N | N | N | N | N | S | S | S |
| 279.75 | S | N | N | N | N | S | S | S | S | O | N | N | N | N | S | S | S |
| 280.00 | S | N | N | N | N | S | S | S | S | S | N | N | N | N | S | S | S |
| 280.25 | S | N | N | N | N | S | S | S | S | S | N | N | N | N | S | S | S |
| 280.50 | S | N | N | N | N | S | S | S | S | S | N | N | N | N | S | S | S |
| 280.75 | S | N | N | N | N | O | S | S | S | S | N | N | N | N | S | S | S |
| 281.00 | S | N | N | N | N | N | S | S | S | S | N | N | N | N | O | S | S |
| 281.25 | S | N | N | N | N | N | S | S | S | S | N | N | N | N | N | S | S |
| 281.50 | S | N | N | N | N | N | S | S | S | S | N | N | N | N | N | S | S |
| 281.75 | S | O | N | N | N | N | S | S | S | S | N | N | N | N | N | S | S |
| 282.00 | S | S | N | N | N | N | S | S | S | S | O | N | N | N | N | S | S |
| 282.25 | S | S | N | N | N | N | S | S | S | S | S | N | N | N | N | S | S |
| 282.50 | S | S | N | N | N | N | S | S | S | S | S | N | N | N | N | S | S |
| 282.75 | S | S | N | N | N | N | S | S | S | S | S | N | N | N | N | S | S |
| 283.00 | S | S | N | N | N | N | O | S | S | S | S | N | N | N | N | S | S |
| 283.25 | S | S | N | N | N | N | N | S | S | S | S | N | N | N | N | O | S |
| 283.50 | S | S | N | N | N | N | N | S | S | S | S | N | N | N | N | N | S |
| 283.75 | S | S | N | N | N | N | N | S | S | S | S | N | N | N | N | N | S |
| 284.00 | S | S | O | N | N | N | N | S | S | S | S | N | N | N | N | N | S |
| 284.25 | S | S | S | N | N | N | N | S | S | S | S | O | N | N | N | N | S |
| 284.50 | S | S | S | N | N | N | N | S | S | S | S | S | N | N | N | N | S |
| 284.75 | S | S | S | N | N | N | N | S | S | S | S | S | N | N | N | N | S |
| 285.00 | S | S | S | N | N | N | N | S | S | S | S | S | N | N | N | N | S |
| 285.25 | S | S | S | N | N | N | N | O | S | S | S | S | N | N | N | N | S |
| 285.50 | S | S | S | N | N | N | N | N | S | S | S | S | N | N | N | N | O |
| 285.75 | S | S | S | N | N | N | N | N | S | S | S | S | N | N | N | N | N |
| 286.00 | S | S | S | N | N | N | N | N | S | S | S | S | N | N | N | N | N |
| 286.25 | S | S | S | O | N | N | N | N | S | S | S | S | N | N | N | N | N |
| 286.50 | S | S | S | S | N | N | N | N | S | S | S | S | O | N | N | N | N |
| 286.75 | S | S | S | S | N | N | N | N | S | S | S | S | S | N | N | N | N |
| 287.00 | S | S | S | S | N | N | N | N | S | S | S | S | S | N | N | N | N |
| 287.25 | S | S | S | S | N | N | N | N | S | S | S | S | S | N | N | N | N |

-continued

| Coil Excitation | | | | | | | | | | | | | | | | | |
|---|---|---|---|---|---|---|---|---|---|---|---|---|---|---|---|---|---|
| 287.50 | S | S | S | S | N | N | N | N | O | S | S | S | S | N | N | N | N |
| 287.75 | S | S | S | S | N | N | N | N | N | S | S | S | S | N | N | N | N |

Page Row 24, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 276.00 | N | N | N | N | S | S | S | S | S | N | N | N | N | S | S | S | S |
| 276.25 | N | N | N | N | S | S | S | S | S | N | N | N | N | S | S | S | S |
| 276.50 | N | N | N | N | S | S | S | S | S | N | N | N | N | S | S | S | S |
| 276.75 | N | N | N | N | O | S | S | S | S | N | N | N | N | S | S | S | S |
| 277.00 | N | N | N | N | N | S | S | S | S | N | N | N | N | O | S | S | S |
| 277.25 | N | N | N | N | N | S | S | S | S | N | N | N | N | N | S | S | S |
| 277.50 | N | N | N | N | N | S | S | S | S | N | N | N | N | N | S | S | S |
| 277.75 | O | N | N | N | N | S | S | S | S | N | N | N | N | N | S | S | S |
| 278.00 | S | N | N | N | N | S | S | S | S | O | N | N | N | N | S | S | S |
| 278.25 | S | N | N | N | N | S | S | S | S | S | N | N | N | N | S | S | S |
| 278.50 | S | N | N | N | N | S | S | S | S | S | N | N | N | N | S | S | S |
| 278.75 | S | N | N | N | N | S | S | S | S | S | N | N | N | N | S | S | S |
| 279.00 | S | N | N | N | N | O | S | S | S | S | N | N | N | N | S | S | S |
| 279.25 | S | N | N | N | N | N | S | S | S | S | N | N | N | N | O | S | S |
| 279.50 | S | N | N | N | N | N | S | S | S | S | N | N | N | N | N | S | S |
| 279.75 | S | N | N | N | N | N | S | S | S | S | N | N | N | N | N | S | S |
| 280.00 | S | O | N | N | N | N | S | S | S | S | N | N | N | N | N | S | S |
| 280.25 | S | S | N | N | N | N | S | S | S | S | O | N | N | N | N | S | S |
| 280.50 | S | S | N | N | N | N | S | S | S | S | S | N | N | N | N | S | S |
| 280.75 | S | S | N | N | N | N | S | S | S | S | S | N | N | N | N | S | S |
| 281.00 | S | S | N | N | N | N | S | S | S | S | S | N | N | N | N | S | S |
| 281.25 | S | S | N | N | N | N | O | S | S | S | S | N | N | N | N | S | S |
| 281.50 | S | S | N | N | N | N | N | S | S | S | S | N | N | N | N | O | S |
| 281.75 | S | S | N | N | N | N | N | S | S | S | S | N | N | N | N | N | S |
| 282.00 | S | S | N | N | N | N | N | S | S | S | S | N | N | N | N | N | S |
| 282.25 | S | S | O | N | N | N | N | S | S | S | S | N | N | N | N | N | S |
| 282.50 | S | S | S | N | N | N | N | S | S | S | S | O | N | N | N | N | S |
| 282.75 | S | S | S | N | N | N | N | S | S | S | S | S | N | N | N | N | S |
| 283.00 | S | S | S | N | N | N | N | S | S | S | S | S | N | N | N | N | S |
| 283.25 | S | S | S | N | N | N | N | S | S | S | S | S | N | N | N | N | S |
| 283.50 | S | S | S | N | N | N | N | O | S | S | S | S | N | N | N | N | S |
| 283.75 | S | S | S | N | N | N | N | N | S | S | S | S | N | N | N | N | O |
| 284.00 | S | S | S | N | N | N | N | N | S | S | S | S | N | N | N | N | N |
| 284.25 | S | S | S | N | N | N | N | N | S | S | S | S | N | N | N | N | N |
| 284.50 | S | S | S | O | N | N | N | N | S | S | S | S | N | N | N | N | N |
| 284.75 | S | S | S | S | N | N | N | N | S | S | S | S | O | N | N | N | N |
| 285.00 | S | S | S | S | N | N | N | N | S | S | S | S | S | N | N | N | N |
| 285.25 | S | S | S | S | N | N | N | N | S | S | S | S | S | N | N | N | N |
| 285.50 | S | S | S | S | N | N | N | N | S | S | S | S | S | N | N | N | N |
| 285.75 | S | S | S | S | N | N | N | N | O | S | S | S | S | N | N | N | N |
| 286.00 | S | S | S | S | N | N | N | N | N | S | S | S | S | N | N | N | N |
| 286.25 | S | S | S | S | N | N | N | N | N | S | S | S | S | N | N | N | N |
| 286.50 | S | S | S | S | N | N | N | N | N | S | S | S | S | N | N | N | N |
| 286.75 | S | S | S | S | O | N | N | N | N | S | S | S | S | N | N | N | N |
| 287.00 | S | S | S | S | S | N | N | N | N | S | S | S | S | O | N | N | N |
| 287.25 | S | S | S | S | S | N | N | N | N | S | S | S | S | S | N | N | N |
| 287.50 | S | S | S | S | S | N | N | N | N | S | S | S | S | S | N | N | N |
| 287.75 | O | S | S | S | S | N | N | N | N | S | S | S | S | S | N | N | N |

Page Row 24, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 276.00 | O | N | N | N | N | S | S | S | S | N | N | N | N | N | S | S | S |
| 276.25 | S | N | N | N | N | S | S | S | S | O | N | N | N | N | S | S | S |
| 276.50 | S | N | N | N | N | S | S | S | S | S | N | N | N | N | S | S | S |
| 276.75 | S | N | N | N | N | S | S | S | S | S | N | N | N | N | S | S | S |
| 277.00 | S | N | N | N | N | S | S | S | S | S | N | N | N | N | S | S | S |
| 277.25 | S | N | N | N | N | O | S | S | S | S | N | N | N | N | S | S | S |
| 277.50 | S | N | N | N | N | N | S | S | S | S | N | N | N | N | O | S | S |
| 277.75 | S | N | N | N | N | N | S | S | S | S | N | N | N | N | N | S | S |
| 278.00 | S | N | N | N | N | N | S | S | S | S | N | N | N | N | N | S | S |
| 278.25 | S | O | N | N | N | N | S | S | S | S | N | N | N | N | N | S | S |
| 278.50 | S | S | N | N | N | N | S | S | S | S | O | N | N | N | N | S | S |
| 278.75 | S | S | N | N | N | N | S | S | S | S | S | N | N | N | N | S | S |
| 279.00 | S | S | N | N | N | N | S | S | S | S | S | N | N | N | N | S | S |
| 279.25 | S | S | N | N | N | N | S | S | S | S | S | N | N | N | N | S | S |
| 279.50 | S | S | N | N | N | N | O | S | S | S | S | N | N | N | N | S | S |
| 279.75 | S | S | N | N | N | N | N | S | S | S | S | N | N | N | N | O | S |
| 280.00 | S | S | N | N | N | N | N | S | S | S | S | N | N | N | N | N | S |
| 280.25 | S | S | N | N | N | N | N | S | S | S | S | N | N | N | N | N | S |
| 280.50 | S | S | O | N | N | N | N | S | S | S | S | N | N | N | N | N | S |

-continued

| Coil Excitation | | | | | | | | | | | | | | | | | |
|---|---|---|---|---|---|---|---|---|---|---|---|---|---|---|---|---|---|
| 280.75 | S | S | S | N | N | N | N | S | S | S | S | O | N | N | N | N | S |
| 281.00 | S | S | S | N | N | N | N | S | S | S | S | S | N | N | N | N | S |
| 281.25 | S | S | S | N | N | N | N | S | S | S | S | S | N | N | N | N | S |
| 281.50 | S | S | S | N | N | N | N | S | S | S | S | S | N | N | N | N | S |
| 281.75 | S | S | S | N | N | N | N | O | S | S | S | S | N | N | N | N | S |
| 282.00 | S | S | S | N | N | N | N | N | S | S | S | S | N | N | N | N | O |
| 282.25 | S | S | S | N | N | N | N | N | S | S | S | S | N | N | N | N | N |
| 282.50 | S | S | S | N | N | N | N | N | S | S | S | S | N | N | N | N | N |
| 282.75 | S | S | S | O | N | N | N | N | S | S | S | S | N | N | N | N | N |
| 283.00 | S | S | S | S | N | N | N | N | S | S | S | S | O | N | N | N | N |
| 283.25 | S | S | S | S | N | N | N | N | S | S | S | S | S | N | N | N | N |
| 283.50 | S | S | S | S | N | N | N | N | S | S | S | S | S | N | N | N | N |
| 283.75 | S | S | S | S | N | N | N | N | S | S | S | S | S | N | N | N | N |
| 284.00 | S | S | S | S | N | N | N | N | O | S | S | S | S | N | N | N | N |
| 284.25 | S | S | S | S | N | N | N | N | N | S | S | S | S | N | N | N | N |
| 284.50 | S | S | S | S | N | N | N | N | N | S | S | S | S | N | N | N | N |
| 284.75 | S | S | S | S | N | N | N | N | N | S | S | S | S | N | N | N | N |
| 285.00 | S | S | S | S | O | N | N | N | N | S | S | S | S | N | N | N | N |
| 285.25 | S | S | S | S | S | N | N | N | N | S | S | S | S | O | N | N | N |
| 285.50 | S | S | S | S | S | N | N | N | N | S | S | S | S | S | N | N | N |
| 285.75 | S | S | S | S | S | N | N | N | N | S | S | S | S | S | N | N | N |
| 286.00 | O | S | S | S | S | N | N | N | N | S | S | S | S | S | N | N | N |
| 286.25 | N | S | S | S | S | N | N | N | N | O | S | S | S | S | N | N | N |
| 286.50 | N | S | S | S | S | N | N | N | N | N | S | S | S | S | N | N | N |
| 286.75 | N | S | S | S | S | N | N | N | N | N | S | S | S | S | N | N | N |
| 287.00 | N | S | S | S | S | N | N | N | N | N | S | S | S | S | N | N | N |
| 287.25 | N | S | S | S | S | O | N | N | N | N | S | S | S | S | N | N | N |
| 287.50 | N | S | S | S | S | S | N | N | N | N | S | S | S | S | O | N | N |
| 287.75 | N | S | S | S | S | S | N | N | N | N | S | S | S | S | S | N | N |

Page Row 24, Page Column 9

| Coil | 154 | 155 | 156 | 157 | 158 | 159 | 160 |
|---|---|---|---|---|---|---|---|
| 276.00 | S | N | N | N | N | N | S |
| 276.25 | S | N | N | N | N | N | S |
| 276.50 | S | O | N | N | N | N | S |
| 276.75 | S | S | N | N | N | N | S |
| 277.00 | S | S | N | N | N | N | S |
| 277.25 | S | S | N | N | N | N | S |
| 277.50 | S | S | N | N | N | N | S |
| 277.75 | S | S | N | N | N | N | O |
| 278.00 | S | S | N | N | N | N | N |
| 278.25 | S | S | N | N | N | N | N |
| 278.50 | S | S | N | N | N | N | N |
| 278.75 | S | S | O | N | N | N | N |
| 279.00 | S | S | S | N | N | N | N |
| 279.25 | S | S | S | N | N | N | N |
| 279.50 | S | S | S | N | N | N | N |
| 279.75 | S | S | S | N | N | N | N |
| 280.00 | S | S | S | N | N | N | N |
| 280.25 | S | S | S | N | N | N | N |
| 280.50 | S | S | S | N | N | N | N |
| 280.75 | S | S | S | N | N | N | N |
| 281.00 | S | S | S | O | N | N | N |
| 281.25 | S | S | S | S | N | N | N |
| 281.50 | S | S | S | S | N | N | N |
| 281.75 | S | S | S | S | N | N | N |
| 282.00 | S | S | S | S | N | N | N |
| 282.25 | S | S | S | S | N | N | N |
| 282.50 | S | S | S | S | N | N | N |
| 282.75 | S | S | S | S | N | N | N |
| 283.00 | S | S | S | S | N | N | N |
| 283.25 | S | S | S | S | O | N | N |
| 283.50 | S | S | S | S | S | N | N |
| 283.75 | S | S | S | S | S | N | N |
| 284.00 | S | S | S | S | S | N | N |
| 284.25 | O | S | S | S | S | N | N |
| 284.50 | N | S | S | S | S | N | N |
| 284.75 | N | S | S | S | S | N | N |
| 285.00 | N | S | S | S | S | N | N |
| 285.25 | N | S | S | S | S | N | N |
| 285.50 | N | S | S | S | S | O | N |
| 285.75 | N | S | S | S | S | S | N |
| 286.00 | N | S | S | S | S | S | N |
| 286.25 | N | S | S | S | S | S | N |
| 286.50 | N | O | S | S | S | S | N |
| 286.75 | N | N | S | S | S | S | N |

-continued

| Coil Excitation | | | | | | | | | | | | | | | | | |
|---|---|---|---|---|---|---|---|---|---|---|---|---|---|---|---|---|---|
| 287.00 | N | N | S | S | S | S | N | | | | | | | | | | |
| 287.25 | N | N | S | S | S | S | N | | | | | | | | | | |
| 287.50 | N | N | S | S | S | S | N | | | | | | | | | | |
| 287.75 | N | N | S | S | S | S | O | | | | | | | | | | |

Page Row 24, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 288.00 | N | N | N | N | S | S | S | S | O | N | N | N | N | S | S | S | S |
| 288.25 | N | N | N | N | S | S | S | S | S | N | N | N | N | S | S | S | S |
| 288.50 | N | N | N | N | S | S | S | S | S | N | N | N | N | S | S | S | S |
| 288.75 | N | N | N | N | S | S | S | S | S | N | N | N | N | S | S | S | S |
| 289.00 | N | N | N | N | O | S | S | S | S | N | N | N | N | S | S | S | S |
| 289.25 | N | N | N | N | N | S | S | S | S | N | N | N | N | O | S | S | S |
| 289.50 | N | N | N | N | N | S | S | S | S | N | N | N | N | N | S | S | S |
| 289.75 | N | N | N | N | N | S | S | S | S | N | N | N | N | N | S | S | S |
| 290.00 | O | N | N | N | N | S | S | S | S | N | N | N | N | N | S | S | S |
| 290.25 | S | N | N | N | N | S | S | S | S | O | N | N | N | N | S | S | S |
| 290.50 | S | N | N | N | N | S | S | S | S | S | N | N | N | N | S | S | S |
| 290.75 | S | N | N | N | N | S | S | S | S | S | N | N | N | N | S | S | S |
| 291.00 | S | N | N | N | N | S | S | S | S | S | N | N | N | N | S | S | S |
| 291.25 | S | N | N | N | N | O | S | S | S | S | N | N | N | N | S | S | S |
| 291.50 | S | N | N | N | N | N | S | S | S | S | N | N | N | N | O | S | S |
| 291.75 | S | N | N | N | N | N | S | S | S | S | N | N | N | N | N | S | S |
| 292.00 | S | N | N | N | N | N | S | S | S | S | N | N | N | N | N | S | S |
| 292.25 | S | O | N | N | N | N | S | S | S | S | N | N | N | N | N | S | S |
| 292.50 | S | S | N | N | N | N | S | S | S | S | O | N | N | N | N | S | S |
| 292.75 | S | S | N | N | N | N | S | S | S | S | S | N | N | N | N | S | S |
| 293.00 | S | S | N | N | N | N | S | S | S | S | S | N | N | N | N | S | S |
| 293.25 | S | S | N | N | N | N | S | S | S | S | S | N | N | N | N | S | S |
| 293.50 | S | S | N | N | N | N | O | S | S | S | S | N | N | N | N | S | S |
| 293.75 | S | S | N | N | N | N | N | S | S | S | S | N | N | N | N | O | S |
| 294.00 | S | S | N | N | N | N | N | S | S | S | S | N | N | N | N | N | S |
| 294.25 | S | S | N | N | N | N | N | S | S | S | S | N | N | N | N | N | S |
| 294.50 | S | S | O | N | N | N | N | S | S | S | S | N | N | N | N | N | S |
| 294.75 | S | S | S | N | N | N | N | S | S | S | S | O | N | N | N | N | S |
| 295.00 | S | S | S | N | N | N | N | S | S | S | S | S | N | N | N | N | S |
| 295.25 | S | S | S | N | N | N | N | S | S | S | S | S | N | N | N | N | S |
| 295.50 | S | S | S | N | N | N | N | S | S | S | S | S | N | N | N | N | S |
| 295.75 | S | S | S | N | N | N | N | O | S | S | S | S | N | N | N | N | S |
| 296.00 | S | S | S | N | N | N | N | N | S | S | S | S | N | N | N | N | O |
| 296.25 | S | S | S | N | N | N | N | N | S | S | S | S | N | N | N | N | N |
| 296.50 | S | S | S | N | N | N | N | N | S | S | S | S | N | N | N | N | N |
| 296.75 | S | S | S | O | N | N | N | N | S | S | S | S | N | N | N | N | N |
| 297.00 | S | S | S | S | N | N | N | N | S | S | S | S | O | N | N | N | N |
| 297.25 | S | S | S | S | N | N | N | N | S | S | S | S | S | N | N | N | N |
| 297.50 | S | S | S | S | N | N | N | N | S | S | S | S | S | N | N | N | N |
| 297.75 | S | S | S | S | N | N | N | N | S | S | S | S | S | N | N | N | N |
| 298.00 | S | S | S | S | N | N | N | N | O | S | S | S | S | N | N | N | N |
| 298.25 | S | S | S | S | N | N | N | N | N | S | S | S | S | N | N | N | N |
| 298.50 | S | S | S | S | N | N | N | N | N | S | S | S | S | N | N | N | N |
| 298.75 | S | S | S | S | N | N | N | N | N | S | S | S | S | N | N | N | N |
| 299.00 | S | S | S | S | O | N | N | N | N | S | S | S | S | N | N | N | N |
| 299.25 | S | S | S | S | S | N | N | N | N | S | S | S | S | O | N | N | N |
| 299.50 | S | S | S | S | S | N | N | N | N | S | S | S | S | S | N | N | N |
| 299.75 | S | S | S | S | S | N | N | N | N | S | S | S | S | S | N | N | N |

Page Row 25, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 288.00 | N | N | N | N | N | S | S | S | S | N | N | N | N | N | S | S | S |
| 288.25 | O | N | N | N | N | S | S | S | S | N | N | N | N | N | S | S | S |
| 288.50 | S | N | N | N | N | S | S | S | S | O | N | N | N | N | S | S | S |
| 288.75 | S | N | N | N | N | S | S | S | S | S | N | N | N | N | S | S | S |
| 289.00 | S | N | N | N | N | S | S | S | S | S | N | N | N | N | S | S | S |
| 289.25 | S | N | N | N | N | S | S | S | S | S | N | N | N | N | S | S | S |
| 289.50 | S | N | N | N | N | O | S | S | S | S | N | N | N | N | S | S | S |
| 289.75 | S | N | N | N | N | N | S | S | S | S | N | N | N | N | O | S | S |
| 290.00 | S | N | N | N | N | N | S | S | S | S | N | N | N | N | N | S | S |
| 290.25 | S | N | N | N | N | N | S | S | S | S | N | N | N | N | N | S | S |
| 290.50 | S | O | N | N | N | N | S | S | S | S | N | N | N | N | N | S | S |
| 290.75 | S | S | N | N | N | N | S | S | S | S | O | N | N | N | N | S | S |
| 291.00 | S | S | N | N | N | N | S | S | S | S | S | N | N | N | N | S | S |
| 291.25 | S | S | N | N | N | N | S | S | S | S | S | N | N | N | N | S | S |
| 291.50 | S | S | N | N | N | N | S | S | S | S | S | N | N | N | N | S | S |
| 291.75 | S | S | N | N | N | N | O | S | S | S | S | N | N | N | N | S | S |
| 292.00 | S | S | N | N | N | N | N | S | S | S | S | N | N | N | N | O | S |

-continued

| Coil Excitation | | | | | | | | | | | | | | | | | |
|---|---|---|---|---|---|---|---|---|---|---|---|---|---|---|---|---|---|
| 292.25 | S | S | N | N | N | N | N | S | S | S | S | N | N | N | N | N | S |
| 292.50 | S | S | N | N | N | N | N | S | S | S | S | N | N | N | N | N | S |
| 292.75 | S | S | O | N | N | N | N | S | S | S | S | N | N | N | N | N | S |
| 293.00 | S | S | S | N | N | N | N | S | S | S | S | O | N | N | N | N | S |
| 293.25 | S | S | S | N | N | N | N | S | S | S | S | S | N | N | N | N | S |
| 293.50 | S | S | S | N | N | N | N | S | S | S | S | S | N | N | N | N | S |
| 293.75 | S | S | S | N | N | N | N | S | S | S | S | S | N | N | N | N | S |
| 294.00 | S | S | S | N | N | N | N | O | S | S | S | S | N | N | N | N | S |
| 294.25 | S | S | S | N | N | N | N | N | S | S | S | S | N | N | N | N | O |
| 294.50 | S | S | S | N | N | N | N | N | S | S | S | S | N | N | N | N | N |
| 294.75 | S | S | S | N | N | N | N | N | S | S | S | S | N | N | N | N | N |
| 295.00 | S | S | S | O | N | N | N | N | S | S | S | S | N | N | N | N | N |
| 295.25 | S | S | S | S | N | N | N | N | S | S | S | S | O | N | N | N | N |
| 295.50 | S | S | S | S | N | N | N | N | S | S | S | S | S | N | N | N | N |
| 295.75 | S | S | S | S | N | N | N | N | S | S | S | S | S | N | N | N | N |
| 296.00 | S | S | S | S | N | N | N | N | S | S | S | S | S | N | N | N | N |
| 296.25 | S | S | S | S | N | N | N | N | O | S | S | S | S | N | N | N | N |
| 296.50 | S | S | S | S | N | N | N | N | N | S | S | S | S | N | N | N | N |
| 296.75 | S | S | S | S | N | N | N | N | N | S | S | S | S | N | N | N | N |
| 297.00 | S | S | S | S | N | N | N | N | N | S | S | S | S | N | N | N | N |
| 297.25 | S | S | S | S | O | N | N | N | N | S | S | S | S | N | N | N | N |
| 297.50 | S | S | S | S | S | N | N | N | N | S | S | S | S | O | N | N | N |
| 297.75 | S | S | S | S | S | N | N | N | N | S | S | S | S | S | N | N | N |
| 298.00 | S | S | S | S | S | N | N | N | N | S | S | S | S | S | N | N | N |
| 298.25 | O | S | S | S | S | N | N | N | N | S | S | S | S | S | N | N | N |
| 298.50 | N | S | S | S | S | N | N | N | N | O | S | S | S | S | N | N | N |
| 298.75 | N | S | S | S | S | N | N | N | N | N | S | S | S | S | N | N | N |
| 299.00 | N | S | S | S | S | N | N | N | N | N | S | S | S | S | N | N | N |
| 299.25 | N | S | S | S | S | N | N | N | N | N | S | S | S | S | N | N | N |
| 299.50 | N | S | S | S | S | O | N | N | N | N | S | S | S | S | N | N | N |
| 299.75 | N | S | S | S | S | S | N | N | N | N | S | S | S | S | O | N | N |

Page Row 25, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 288.00 | S | N | N | N | N | N | S | S | S | S | N | N | N | N | O | S | S |
| 288.25 | S | N | N | N | N | N | S | S | S | S | N | N | N | N | N | S | S |
| 288.50 | S | N | N | N | N | N | S | S | S | S | N | N | N | N | N | S | S |
| 288.75 | S | O | N | N | N | N | S | S | S | S | N | N | N | N | N | S | S |
| 289.00 | S | S | N | N | N | N | S | S | S | S | O | N | N | N | N | S | S |
| 289.25 | S | S | N | N | N | N | S | S | S | S | S | N | N | N | N | S | S |
| 289.50 | S | S | N | N | N | N | S | S | S | S | S | N | N | N | N | S | S |
| 289.75 | S | S | N | N | N | N | S | S | S | S | S | N | N | N | N | S | S |
| 290.00 | S | S | N | N | N | N | O | S | S | S | S | N | N | N | N | S | S |
| 290.25 | S | S | N | N | N | N | N | S | S | S | S | N | N | N | N | O | S |
| 290.50 | S | S | N | N | N | N | N | S | S | S | S | N | N | N | N | N | S |
| 290.75 | S | S | N | N | N | N | N | S | S | S | S | N | N | N | N | N | S |
| 291.00 | S | S | O | N | N | N | N | S | S | S | S | N | N | N | N | N | S |
| 291.25 | S | S | S | N | N | N | N | S | S | S | S | O | N | N | N | N | S |
| 291.50 | S | S | S | N | N | N | N | S | S | S | S | S | N | N | N | N | S |
| 291.75 | S | S | S | N | N | N | N | S | S | S | S | S | N | N | N | N | S |
| 292.00 | S | S | S | N | N | N | N | S | S | S | S | S | N | N | N | N | S |
| 292.25 | S | S | S | N | N | N | N | O | S | S | S | S | N | N | N | N | S |
| 292.50 | S | S | S | N | N | N | N | N | S | S | S | S | N | N | N | N | O |
| 292.75 | S | S | S | N | N | N | N | N | S | S | S | S | N | N | N | N | N |
| 293.00 | S | S | S | N | N | N | N | N | S | S | S | S | N | N | N | N | N |
| 293.25 | S | S | S | O | N | N | N | N | S | S | S | S | N | N | N | N | N |
| 293.50 | S | S | S | S | N | N | N | N | S | S | S | S | O | N | N | N | N |
| 293.75 | S | S | S | S | N | N | N | N | S | S | S | S | S | N | N | N | N |
| 294.00 | S | S | S | S | N | N | N | N | S | S | S | S | S | N | N | N | N |
| 294.25 | S | S | S | S | N | N | N | N | S | S | S | S | S | N | N | N | N |
| 294.50 | S | S | S | S | N | N | N | N | O | S | S | S | S | N | N | N | N |
| 294.75 | S | S | S | S | N | N | N | N | N | S | S | S | S | N | N | N | N |
| 295.00 | S | S | S | S | N | N | N | N | N | S | S | S | S | N | N | N | N |
| 295.25 | S | S | S | S | N | N | N | N | N | S | S | S | S | N | N | N | N |
| 295.50 | S | S | S | S | O | N | N | N | N | S | S | S | S | N | N | N | N |
| 295.75 | S | S | S | S | S | N | N | N | N | S | S | S | S | O | N | N | N |
| 296.00 | S | S | S | S | S | N | N | N | N | S | S | S | S | S | N | N | N |
| 296.25 | S | S | S | S | S | N | N | N | N | S | S | S | S | S | N | N | N |
| 296.50 | O | S | S | S | S | N | N | N | N | S | S | S | S | S | N | N | N |
| 296.75 | N | S | S | S | S | N | N | N | N | O | S | S | S | S | N | N | N |
| 297.00 | N | S | S | S | S | N | N | N | N | N | S | S | S | S | N | N | N |
| 297.25 | N | S | S | S | S | N | N | N | N | N | S | S | S | S | N | N | N |
| 297.50 | N | S | S | S | S | N | N | N | N | N | S | S | S | S | N | N | N |
| 297.75 | N | S | S | S | S | O | N | N | N | N | S | S | S | S | N | N | N |
| 298.00 | N | S | S | S | S | S | N | N | N | N | S | S | S | S | O | N | N |
| 298.25 | N | S | S | S | S | S | N | N | N | N | S | S | S | S | S | N | N |

-continued

| Coil Excitation | | | | | | | | | | | | | | | | | |
|---|---|---|---|---|---|---|---|---|---|---|---|---|---|---|---|---|---|
| 298.50 | N | S | S | S | S | S | N | N | N | N | S | S | S | S | S | N | N |
| 298.75 | N | O | S | S | S | S | N | N | N | N | S | S | S | S | S | N | N |
| 299.00 | N | N | S | S | S | S | N | N | N | N | O | S | S | S | S | N | N |
| 299.25 | N | N | S | S | S | S | N | N | N | N | N | S | S | S | S | N | N |
| 299.50 | N | N | S | S | S | S | N | N | N | N | N | S | S | S | S | N | N |
| 299.75 | N | N | S | S | S | S | N | N | N | N | N | S | S | S | S | N | N |

Page Row 25, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 288.00 | S | S | N | N | N | N | S | S | S | S | S | N | N | N | N | S | S |
| 288.25 | S | S | N | N | N | N | O | S | S | S | S | N | N | N | N | S | S |
| 288.50 | S | S | N | N | N | N | N | S | S | S | S | N | N | N | N | O | S |
| 288.75 | S | S | N | N | N | N | N | S | S | S | S | N | N | N | N | N | S |
| 289.00 | S | S | N | N | N | N | N | S | S | S | S | N | N | N | N | N | S |
| 289.25 | S | S | O | N | N | N | N | S | S | S | S | N | N | N | N | N | S |
| 289.50 | S | S | S | N | N | N | N | S | S | S | S | O | N | N | N | N | S |
| 289.75 | S | S | S | N | N | N | N | S | S | S | S | S | N | N | N | N | S |
| 290.00 | S | S | S | N | N | N | N | S | S | S | S | S | N | N | N | N | S |
| 290.25 | S | S | S | N | N | N | N | S | S | S | S | S | N | N | N | N | S |
| 290.50 | S | S | S | N | N | N | N | O | S | S | S | S | N | N | N | N | S |
| 290.75 | S | S | S | N | N | N | N | N | S | S | S | S | N | N | N | N | O |
| 291.00 | S | S | S | N | N | N | N | N | S | S | S | S | N | N | N | N | N |
| 291.25 | S | S | S | N | N | N | N | N | S | S | S | S | N | N | N | N | N |
| 291.50 | S | S | S | O | N | N | N | N | S | S | S | S | N | N | N | N | N |
| 291.75 | S | S | S | S | N | N | N | N | S | S | S | S | O | N | N | N | N |
| 292.00 | S | S | S | S | N | N | N | N | S | S | S | S | S | N | N | N | N |
| 292.25 | S | S | S | S | N | N | N | N | S | S | S | S | S | N | N | N | N |
| 292.50 | S | S | S | S | N | N | N | N | S | S | S | S | S | N | N | N | N |
| 292.75 | S | S | S | S | N | N | N | N | O | S | S | S | S | N | N | N | N |
| 293.00 | S | S | S | S | N | N | N | N | N | S | S | S | S | N | N | N | N |
| 293.25 | S | S | S | S | N | N | N | N | N | S | S | S | S | N | N | N | N |
| 293.50 | S | S | S | S | N | N | N | N | N | S | S | S | S | N | N | N | N |
| 293.75 | S | S | S | S | O | N | N | N | N | S | S | S | S | N | N | N | N |
| 294.00 | S | S | S | S | S | N | N | N | N | S | S | S | S | O | N | N | N |
| 294.25 | S | S | S | S | S | N | N | N | N | S | S | S | S | S | N | N | N |
| 294.50 | S | S | S | S | S | N | N | N | N | S | S | S | S | S | N | N | N |
| 294.75 | O | S | S | S | S | N | N | N | N | S | S | S | S | S | N | N | N |
| 295.00 | N | S | S | S | S | N | N | N | N | O | S | S | S | S | N | N | N |
| 295.25 | N | S | S | S | S | N | N | N | N | N | S | S | S | S | N | N | N |
| 295.50 | N | S | S | S | S | N | N | N | N | N | S | S | S | S | N | N | N |
| 295.75 | N | S | S | S | S | N | N | N | N | N | S | S | S | S | N | N | N |
| 296.00 | N | S | S | S | S | O | N | N | N | N | S | S | S | S | N | N | N |
| 296.25 | N | S | S | S | S | S | N | N | N | N | S | S | S | S | O | N | N |
| 296.50 | N | S | S | S | S | S | N | N | N | N | S | S | S | S | S | N | N |
| 296.75 | N | S | S | S | S | S | N | N | N | N | S | S | S | S | S | N | N |
| 297.00 | N | O | S | S | S | S | N | N | N | N | S | S | S | S | S | N | N |
| 297.25 | N | N | S | S | S | S | N | N | N | N | O | S | S | S | S | N | N |
| 297.50 | N | N | S | S | S | S | N | N | N | N | N | S | S | S | S | N | N |
| 297.75 | N | N | S | S | S | S | N | N | N | N | N | S | S | S | S | N | N |
| 298.00 | N | N | S | S | S | S | N | N | N | N | N | S | S | S | S | N | N |
| 298.25 | N | N | S | S | S | S | O | N | N | N | N | S | S | S | S | N | N |
| 298.50 | N | N | S | S | S | S | S | N | N | N | N | S | S | S | S | O | N |
| 298.75 | N | N | S | S | S | S | S | N | N | N | N | S | S | S | S | S | N |
| 299.00 | N | N | S | S | S | S | S | N | N | N | N | S | S | S | S | S | N |
| 299.25 | N | N | O | S | S | S | S | N | N | N | N | S | S | S | S | S | N |
| 299.50 | N | N | N | S | S | S | S | N | N | N | N | O | S | S | S | S | N |
| 299.75 | N | N | N | S | S | S | S | N | N | N | N | N | S | S | S | S | N |

Page Row 25, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 288.00 | S | S | S | N | N | N | N | S | S | S | S | S | N | N | N | N | S |
| 288.25 | S | S | S | N | N | N | N | S | S | S | S | S | N | N | N | N | S |
| 288.50 | S | S | S | N | N | N | N | S | S | S | S | S | N | N | N | N | S |
| 288.75 | S | S | S | N | N | N | N | O | S | S | S | S | N | N | N | N | S |
| 289.00 | S | S | S | N | N | N | N | N | S | S | S | S | N | N | N | N | O |
| 289.25 | S | S | S | N | N | N | N | N | S | S | S | S | N | N | N | N | N |
| 289.50 | S | S | S | N | N | N | N | N | S | S | S | S | N | N | N | N | N |
| 289.75 | S | S | S | O | N | N | N | N | S | S | S | S | N | N | N | N | N |
| 290.00 | S | S | S | S | N | N | N | N | S | S | S | S | O | N | N | N | N |
| 290.25 | S | S | S | S | N | N | N | N | S | S | S | S | S | N | N | N | N |
| 290.50 | S | S | S | S | N | N | N | N | S | S | S | S | S | N | N | N | N |
| 290.75 | S | S | S | S | N | N | N | N | S | S | S | S | S | N | N | N | N |
| 291.00 | S | S | S | S | N | N | N | N | O | S | S | S | S | N | N | N | N |
| 291.25 | S | S | S | S | N | N | N | N | N | S | S | S | S | N | N | N | N |
| 291.50 | S | S | S | S | N | N | N | N | N | S | S | S | S | N | N | N | N |

-continued

| Coil Excitation | | | | | | | | | | | | | | | | | |
|---|---|---|---|---|---|---|---|---|---|---|---|---|---|---|---|---|---|
| 291.75 | S | S | S | S | N | N | N | N | N | S | S | S | S | N | N | N | N |
| 292.00 | S | S | S | S | O | N | N | N | N | S | S | S | S | N | N | N | N |
| 292.25 | S | S | S | S | S | N | N | N | N | S | S | S | S | O | N | N | N |
| 292.50 | S | S | S | S | S | N | N | N | N | S | S | S | S | S | N | N | N |
| 292.75 | S | S | S | S | S | N | N | N | N | S | S | S | S | S | N | N | N |
| 293.00 | O | S | S | S | S | N | N | N | N | S | S | S | S | S | N | N | N |
| 293.25 | N | S | S | S | S | N | N | N | N | O | S | S | S | S | N | N | N |
| 293.50 | N | S | S | S | S | N | N | N | N | N | S | S | S | S | N | N | N |
| 293.75 | N | S | S | S | S | N | N | N | N | N | S | S | S | S | N | N | N |
| 294.00 | N | S | S | S | S | N | N | N | N | N | S | S | S | S | N | N | N |
| 294.25 | N | S | S | S | S | O | N | N | N | N | S | S | S | S | N | N | N |
| 294.50 | N | S | S | S | S | S | N | N | N | N | S | S | S | S | O | N | N |
| 294.75 | N | S | S | S | S | S | N | N | N | N | S | S | S | S | S | N | N |
| 295.00 | N | S | S | S | S | S | N | N | N | N | S | S | S | S | S | N | N |
| 295.25 | N | O | S | S | S | S | N | N | N | N | S | S | S | S | S | N | N |
| 295.50 | N | N | S | S | S | S | N | N | N | N | O | S | S | S | S | N | N |
| 295.75 | N | N | S | S | S | S | N | N | N | N | N | S | S | S | S | N | N |
| 296.00 | N | N | S | S | S | S | N | N | N | N | N | S | S | S | S | N | N |
| 296.25 | N | N | S | S | S | S | N | N | N | N | N | S | S | S | S | N | N |
| 296.50 | N | N | S | S | S | S | O | N | N | N | N | S | S | S | S | N | N |
| 296.75 | N | N | S | S | S | S | S | N | N | N | N | S | S | S | S | O | N |
| 297.00 | N | N | S | S | S | S | S | N | N | N | N | S | S | S | S | S | N |
| 297.25 | N | N | S | S | S | S | S | N | N | N | N | S | S | S | S | S | N |
| 297.50 | N | N | O | S | S | S | S | N | N | N | N | S | S | S | S | S | N |
| 297.75 | N | N | N | S | S | S | S | N | N | N | N | O | S | S | S | S | N |
| 298.00 | N | N | N | S | S | S | S | N | N | N | N | N | S | S | S | S | N |
| 298.25 | N | N | N | S | S | S | S | N | N | N | N | N | S | S | S | S | N |
| 298.50 | N | N | N | S | S | S | S | N | N | N | N | N | S | S | S | S | N |
| 298.75 | N | N | N | S | S | S | S | O | N | N | N | N | S | S | S | S | N |
| 299.00 | N | N | N | S | S | S | S | S | N | N | N | N | S | S | S | S | O |
| 299.25 | N | N | N | S | S | S | S | S | N | N | N | N | S | S | S | S | S |
| 299.50 | N | N | N | S | S | S | S | S | N | N | N | N | S | S | S | S | S |
| 299.75 | N | N | N | O | S | S | S | S | N | N | N | N | S | S | S | S | S |

Page Row 25, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 288.00 | S | S | S | O | N | N | N | N | S | S | S | S | N | N | N | N | N |
| 288.25 | S | S | S | S | N | N | N | N | S | S | S | S | O | N | N | N | N |
| 288.50 | S | S | S | S | N | N | N | N | S | S | S | S | S | N | N | N | N |
| 288.75 | S | S | S | S | N | N | N | N | S | S | S | S | S | N | N | N | N |
| 289.00 | S | S | S | S | N | N | N | N | S | S | S | S | S | N | N | N | N |
| 289.25 | S | S | S | S | N | N | N | N | O | S | S | S | S | N | N | N | N |
| 289.50 | S | S | S | S | N | N | N | N | N | S | S | S | S | N | N | N | N |
| 289.75 | S | S | S | S | N | N | N | N | N | S | S | S | S | N | N | N | N |
| 290.00 | S | S | S | S | N | N | N | N | N | S | S | S | S | N | N | N | N |
| 290.25 | S | S | S | S | O | N | N | N | N | S | S | S | S | N | N | N | N |
| 290.50 | S | S | S | S | S | N | N | N | N | S | S | S | S | O | N | N | N |
| 290.75 | S | S | S | S | S | N | N | N | N | S | S | S | S | S | N | N | N |
| 291.00 | S | S | S | S | S | N | N | N | N | S | S | S | S | S | N | N | N |
| 291.25 | O | S | S | S | S | N | N | N | N | S | S | S | S | S | N | N | N |
| 291.50 | N | S | S | S | S | N | N | N | N | O | S | S | S | S | N | N | N |
| 291.75 | N | S | S | S | S | N | N | N | N | N | S | S | S | S | N | N | N |
| 292.00 | N | S | S | S | S | N | N | N | N | N | S | S | S | S | N | N | N |
| 292.25 | N | S | S | S | S | N | N | N | N | N | S | S | S | S | N | N | N |
| 292.50 | N | S | S | S | S | O | N | N | N | N | S | S | S | S | N | N | N |
| 292.75 | N | S | S | S | S | S | N | N | N | N | S | S | S | S | O | N | N |
| 293.00 | N | S | S | S | S | S | N | N | N | N | S | S | S | S | S | N | N |
| 293.25 | N | S | S | S | S | S | N | N | N | N | S | S | S | S | S | N | N |
| 293.50 | N | O | S | S | S | S | N | N | N | N | S | S | S | S | S | N | N |
| 293.75 | N | N | S | S | S | S | N | N | N | N | O | S | S | S | S | N | N |
| 294.00 | N | N | S | S | S | S | N | N | N | N | N | S | S | S | S | N | N |
| 294.25 | N | N | S | S | S | S | N | N | N | N | N | S | S | S | S | N | N |
| 294.50 | N | N | S | S | S | S | N | N | N | N | N | S | S | S | S | N | N |
| 294.75 | N | N | S | S | S | S | O | N | N | N | N | S | S | S | S | N | N |
| 295.00 | N | N | S | S | S | S | S | N | N | N | N | S | S | S | S | O | N |
| 295.25 | N | N | S | S | S | S | S | N | N | N | N | S | S | S | S | S | N |
| 295.50 | N | N | S | S | S | S | S | N | N | N | N | S | S | S | S | S | N |
| 295.75 | N | N | O | S | S | S | S | N | N | N | N | S | S | S | S | S | N |
| 296.00 | N | N | N | S | S | S | S | N | N | N | N | O | S | S | S | S | N |
| 296.25 | N | N | N | S | S | S | S | N | N | N | N | N | S | S | S | S | N |
| 296.50 | N | N | N | S | S | S | S | N | N | N | N | N | S | S | S | S | N |
| 296.75 | N | N | N | S | S | S | S | N | N | N | N | N | S | S | S | S | N |
| 297.00 | N | N | N | S | S | S | S | O | N | N | N | N | S | S | S | S | N |
| 297.25 | N | N | N | S | S | S | S | S | N | N | N | N | S | S | S | S | O |
| 297.50 | N | N | N | S | S | S | S | S | N | N | N | N | S | S | S | S | S |
| 297.75 | N | N | N | S | S | S | S | S | N | N | N | N | S | S | S | S | S |

-continued

Coil Excitation

| | | | | | | | | | | | | | | | | | |
|---|---|---|---|---|---|---|---|---|---|---|---|---|---|---|---|---|---|
| 298.00 | N | N | N | O | S | S | S | S | N | N | N | N | S | S | S | S | S |
| 298.25 | N | N | N | N | S | S | S | S | N | N | N | N | O | S | S | S | S |
| 298.50 | N | N | N | N | S | S | S | S | N | N | N | N | N | S | S | S | S |
| 298.75 | N | N | N | N | S | S | S | S | N | N | N | N | N | S | S | S | S |
| 299.00 | N | N | N | N | S | S | S | S | N | N | N | N | N | S | S | S | S |
| 299.25 | N | N | N | N | S | S | S | S | O | N | N | N | N | S | S | S | S |
| 299.50 | N | N | N | N | S | S | S | S | S | N | N | N | N | S | S | S | S |
| 299.75 | N | N | N | N | S | S | S | S | S | N | N | N | N | S | S | S | S |

Page Row 25, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 288.00 | S | S | S | S | N | N | N | N | N | S | S | S | S | N | N | N | N |
| 288.25 | S | S | S | S | N | N | N | N | N | S | S | S | S | N | N | N | N |
| 288.50 | S | S | S | S | O | N | N | N | N | S | S | S | S | N | N | N | N |
| 288.75 | S | S | S | S | S | N | N | N | N | S | S | S | S | O | N | N | N |
| 289.00 | S | S | S | S | S | N | N | N | N | S | S | S | S | S | N | N | N |
| 289.25 | S | S | S | S | S | N | N | N | N | S | S | S | S | S | N | N | N |
| 289.50 | O | S | S | S | S | N | N | N | N | S | S | S | S | S | N | N | N |
| 289.75 | N | S | S | S | S | N | N | N | N | O | S | S | S | S | N | N | N |
| 290.00 | N | S | S | S | S | N | N | N | N | N | S | S | S | S | N | N | N |
| 290.25 | N | S | S | S | S | N | N | N | N | N | S | S | S | S | N | N | N |
| 290.50 | N | S | S | S | S | N | N | N | N | N | S | S | S | S | N | N | N |
| 290.75 | N | S | S | S | S | O | N | N | N | N | S | S | S | S | N | N | N |
| 291.00 | N | S | S | S | S | S | N | N | N | N | S | S | S | S | O | N | N |
| 291.25 | N | S | S | S | S | S | N | N | N | N | S | S | S | S | S | N | N |
| 291.50 | N | S | S | S | S | S | N | N | N | N | S | S | S | S | S | N | N |
| 291.75 | N | O | S | S | S | S | N | N | N | N | S | S | S | S | S | N | N |
| 292.00 | N | N | S | S | S | S | N | N | N | N | O | S | S | S | S | N | N |
| 292.25 | N | N | S | S | S | S | N | N | N | N | N | S | S | S | S | N | N |
| 292.50 | N | N | S | S | S | S | N | N | N | N | N | S | S | S | S | N | N |
| 292.75 | N | N | S | S | S | S | N | N | N | N | N | S | S | S | S | N | N |
| 293.00 | N | N | S | S | S | S | O | N | N | N | N | S | S | S | S | N | N |
| 293.25 | N | N | S | S | S | S | S | N | N | N | N | S | S | S | S | O | N |
| 293.50 | N | N | S | S | S | S | S | N | N | N | N | S | S | S | S | S | N |
| 293.75 | N | N | S | S | S | S | S | N | N | N | N | S | S | S | S | S | N |
| 294.00 | N | N | O | S | S | S | S | N | N | N | N | S | S | S | S | S | N |
| 294.25 | N | N | N | S | S | S | S | N | N | N | N | O | S | S | S | S | N |
| 294.50 | N | N | N | S | S | S | S | N | N | N | N | N | S | S | S | S | N |
| 294.75 | N | N | N | S | S | S | S | N | N | N | N | N | S | S | S | S | N |
| 295.00 | N | N | N | S | S | S | S | N | N | N | N | N | S | S | S | S | N |
| 295.25 | N | N | N | S | S | S | S | O | N | N | N | N | S | S | S | S | N |
| 295.50 | N | N | N | S | S | S | S | S | N | N | N | N | S | S | S | S | O |
| 295.75 | N | N | N | S | S | S | S | S | N | N | N | N | S | S | S | S | S |
| 296.00 | N | N | N | S | S | S | S | S | N | N | N | N | S | S | S | S | S |
| 296.25 | N | N | N | O | S | S | S | S | N | N | N | N | S | S | S | S | S |
| 296.50 | N | N | N | N | S | S | S | S | N | N | N | N | O | S | S | S | S |
| 296.75 | N | N | N | N | S | S | S | S | N | N | N | N | N | S | S | S | S |
| 297.00 | N | N | N | N | S | S | S | S | N | N | N | N | N | S | S | S | S |
| 297.25 | N | N | N | N | S | S | S | S | N | N | N | N | N | S | S | S | S |
| 297.50 | N | N | N | N | S | S | S | S | O | N | N | N | N | S | S | S | S |
| 297.75 | N | N | N | N | S | S | S | S | S | N | N | N | N | S | S | S | S |
| 298.00 | N | N | N | N | S | S | S | S | S | N | N | N | N | S | S | S | S |
| 298.25 | N | N | N | N | S | S | S | S | S | N | N | N | N | S | S | S | S |
| 298.50 | N | N | N | N | O | S | S | S | S | N | N | N | N | S | S | S | S |
| 298.75 | N | N | N | N | N | S | S | S | S | N | N | N | N | O | S | S | S |
| 299.00 | N | N | N | N | N | S | S | S | S | N | N | N | N | N | S | S | S |
| 299.25 | N | N | N | N | N | S | S | S | S | N | N | N | N | N | S | S | S |
| 299.50 | O | N | N | N | N | S | S | S | S | N | N | N | N | N | S | S | S |
| 299.75 | S | N | N | N | N | S | S | S | S | O | N | N | N | N | S | S | S |

Page Row 25, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 288.00 | N | S | S | S | S | N | N | N | N | O | S | S | S | S | N | N | N |
| 288.25 | N | S | S | S | S | N | N | N | N | N | S | S | S | S | N | N | N |
| 288.50 | N | S | S | S | S | N | N | N | N | N | S | S | S | S | N | N | N |
| 288.75 | N | S | S | S | S | N | N | N | N | N | S | S | S | S | N | N | N |
| 289.00 | N | S | S | S | S | O | N | N | N | N | S | S | S | S | N | N | N |
| 289.25 | N | S | S | S | S | S | N | N | N | N | S | S | S | S | O | N | N |
| 289.50 | N | S | S | S | S | S | N | N | N | N | S | S | S | S | S | N | N |
| 289.75 | N | S | S | S | S | S | N | N | N | N | S | S | S | S | S | N | N |
| 290.00 | N | O | S | S | S | S | N | N | N | N | S | S | S | S | S | N | N |
| 290.25 | N | N | S | S | S | S | N | N | N | N | O | S | S | S | S | N | N |
| 290.50 | N | N | S | S | S | S | N | N | N | N | N | S | S | S | S | N | N |
| 290.75 | N | N | S | S | S | S | N | N | N | N | N | S | S | S | S | N | N |
| 291.00 | N | N | S | S | S | S | N | N | N | N | N | S | S | S | S | N | N |

-continued

Coil Excitation

| | | | | | | | | | | | | | | | | | |
|---|---|---|---|---|---|---|---|---|---|---|---|---|---|---|---|---|---|
| 291.25 | N | N | S | S | S | S | O | N | N | N | N | S | S | S | S | N | N |
| 291.50 | N | N | S | S | S | S | S | N | N | N | N | S | S | S | S | O | N |
| 291.75 | N | N | S | S | S | S | S | N | N | N | N | S | S | S | S | S | N |
| 292.00 | N | N | S | S | S | S | S | N | N | N | N | S | S | S | S | S | N |
| 292.25 | N | N | O | S | S | S | S | N | N | N | N | S | S | S | S | S | N |
| 292.50 | N | N | N | S | S | S | S | N | N | N | N | O | S | S | S | S | N |
| 292.75 | N | N | N | S | S | S | S | N | N | N | N | N | S | S | S | S | N |
| 293.00 | N | N | N | S | S | S | S | N | N | N | N | N | S | S | S | S | N |
| 293.25 | N | N | N | S | S | S | S | N | N | N | N | N | S | S | S | S | N |
| 293.50 | N | N | N | S | S | S | S | O | N | N | N | N | S | S | S | S | N |
| 293.75 | N | N | N | S | S | S | S | S | N | N | N | N | S | S | S | S | O |
| 294.00 | N | N | N | S | S | S | S | S | N | N | N | N | S | S | S | S | S |
| 294.25 | N | N | N | S | S | S | S | S | N | N | N | N | S | S | S | S | S |
| 294.50 | N | N | N | O | S | S | S | S | N | N | N | N | S | S | S | S | S |
| 294.75 | N | N | N | N | S | S | S | S | N | N | N | N | O | S | S | S | S |
| 295.00 | N | N | N | N | S | S | S | S | N | N | N | N | N | S | S | S | S |
| 295.25 | N | N | N | N | S | S | S | S | N | N | N | N | N | S | S | S | S |
| 295.50 | N | N | N | N | S | S | S | S | N | N | N | N | N | S | S | S | S |
| 295.75 | N | N | N | N | S | S | S | S | O | N | N | N | N | S | S | S | S |
| 296.00 | N | N | N | N | S | S | S | S | S | N | N | N | N | S | S | S | S |
| 296.25 | N | N | N | N | S | S | S | S | S | N | N | N | N | S | S | S | S |
| 296.50 | N | N | N | N | S | S | S | S | S | N | N | N | N | S | S | S | S |
| 296.75 | N | N | N | N | O | S | S | S | S | N | N | N | N | S | S | S | S |
| 297.00 | N | N | N | N | N | S | S | S | S | N | N | N | N | O | S | S | S |
| 297.25 | N | N | N | N | N | S | S | S | S | N | N | N | N | N | S | S | S |
| 297.50 | N | N | N | N | N | S | S | S | S | N | N | N | N | N | S | S | S |
| 297.75 | O | N | N | N | N | S | S | S | S | N | N | N | N | N | S | S | S |
| 298.00 | S | N | N | N | N | S | S | S | S | O | N | N | N | N | S | S | S |
| 298.25 | S | N | N | N | N | S | S | S | S | S | N | N | N | N | S | S | S |
| 298.50 | S | N | N | N | N | S | S | S | S | S | N | N | N | N | S | S | S |
| 298.75 | S | N | N | N | N | S | S | S | S | S | N | N | N | N | S | S | S |
| 299.00 | S | N | N | N | N | O | S | S | S | S | N | N | N | N | S | S | S |
| 299.25 | S | N | N | N | N | N | S | S | S | S | N | N | N | N | O | S | S |
| 299.50 | S | N | N | N | N | N | S | S | S | S | N | N | N | N | N | S | S |
| 299.75 | S | N | N | N | N | N | S | S | S | S | N | N | N | N | N | S | S |

Page Row 25, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 288.00 | N | S | S | S | S | S | N | N | N | N | S | S | S | S | S | N | N |
| 288.25 | N | O | S | S | S | S | N | N | N | N | S | S | S | S | S | N | N |
| 288.50 | N | N | S | S | S | S | N | N | N | N | O | S | S | S | S | N | N |
| 288.75 | N | N | S | S | S | S | N | N | N | N | N | S | S | S | S | N | N |
| 289.00 | N | N | S | S | S | S | N | N | N | N | N | S | S | S | S | N | N |
| 289.25 | N | N | S | S | S | S | N | N | N | N | N | S | S | S | S | N | N |
| 289.50 | N | N | S | S | S | S | O | N | N | N | N | S | S | S | S | N | N |
| 289.75 | N | N | S | S | S | S | S | N | N | N | N | S | S | S | S | O | N |
| 290.00 | N | N | S | S | S | S | S | N | N | N | N | S | S | S | S | S | N |
| 290.25 | N | N | S | S | S | S | S | N | N | N | N | S | S | S | S | S | N |
| 290.50 | N | N | O | S | S | S | S | N | N | N | N | S | S | S | S | S | N |
| 290.75 | N | N | N | S | S | S | S | N | N | N | N | O | S | S | S | S | N |
| 291.00 | N | N | N | S | S | S | S | N | N | N | N | N | S | S | S | S | N |
| 291.25 | N | N | N | S | S | S | S | N | N | N | N | N | S | S | S | S | N |
| 291.50 | N | N | N | S | S | S | S | N | N | N | N | N | S | S | S | S | N |
| 291.75 | N | N | N | S | S | S | S | O | N | N | N | N | S | S | S | S | N |
| 292.00 | N | N | N | S | S | S | S | S | N | N | N | N | S | S | S | S | O |
| 292.25 | N | N | N | S | S | S | S | S | N | N | N | N | S | S | S | S | S |
| 292.50 | N | N | N | S | S | S | S | S | N | N | N | N | S | S | S | S | S |
| 292.75 | N | N | N | O | S | S | S | S | N | N | N | N | S | S | S | S | S |
| 293.00 | N | N | N | N | S | S | S | S | N | N | N | N | O | S | S | S | S |
| 293.25 | N | N | N | N | S | S | S | S | N | N | N | N | N | S | S | S | S |
| 293.50 | N | N | N | N | S | S | S | S | N | N | N | N | N | S | S | S | S |
| 293.75 | N | N | N | N | S | S | S | S | N | N | N | N | N | S | S | S | S |
| 294.00 | N | N | N | N | S | S | S | S | O | N | N | N | N | S | S | S | S |
| 294.25 | N | N | N | N | S | S | S | S | S | N | N | N | N | S | S | S | S |
| 294.50 | N | N | N | N | S | S | S | S | S | N | N | N | N | S | S | S | S |
| 294.75 | N | N | N | N | S | S | S | S | S | N | N | N | N | S | S | S | S |
| 295.00 | N | N | N | N | O | S | S | S | S | N | N | N | N | S | S | S | S |
| 295.25 | N | N | N | N | N | S | S | S | S | N | N | N | N | O | S | S | S |
| 295.50 | N | N | N | N | N | S | S | S | S | N | N | N | N | N | S | S | S |
| 295.75 | N | N | N | N | N | S | S | S | S | N | N | N | N | N | S | S | S |
| 296.00 | O | N | N | N | N | S | S | S | S | N | N | N | N | N | S | S | S |
| 296.25 | S | N | N | N | N | S | S | S | S | O | N | N | N | N | S | S | S |
| 296.50 | S | N | N | N | N | S | S | S | S | S | N | N | N | N | S | S | S |
| 296.75 | S | N | N | N | N | S | S | S | S | S | N | N | N | N | S | S | S |
| 297.00 | S | N | N | N | N | S | S | S | S | S | N | N | N | N | S | S | S |
| 297.25 | S | N | N | N | N | O | S | S | S | S | N | N | N | N | S | S | S |

-continued

| Coil Excitation | | | | | | | | | | | | | | | | | |
|---|---|---|---|---|---|---|---|---|---|---|---|---|---|---|---|---|---|
| 297.50 | S | N | N | N | N | N | S | S | S | S | N | N | N | N | O | S | S |
| 297.75 | S | N | N | N | N | N | S | S | S | S | N | N | N | N | N | S | S |
| 298.00 | S | N | N | N | N | N | S | S | S | S | N | N | N | N | N | S | S |
| 298.25 | S | O | N | N | N | N | S | S | S | S | N | N | N | N | N | S | S |
| 298.50 | S | S | N | N | N | N | S | S | S | S | O | N | N | N | N | S | S |
| 298.75 | S | S | N | N | N | N | S | S | S | S | S | N | N | N | N | S | S |
| 299.00 | S | S | N | N | N | N | S | S | S | S | S | N | N | N | N | S | S |
| 299.25 | S | S | N | N | N | N | S | S | S | S | S | N | N | N | N | S | S |
| 299.50 | S | S | N | N | N | N | O | S | S | S | S | N | N | N | N | S | S |
| 299.75 | S | S | N | N | N | N | N | S | S | S | S | N | N | N | N | O | S |

Page Row 25, Page Column 9

| Coil | 154 | 155 | 156 | 157 | 158 | 159 | 160 |
|---|---|---|---|---|---|---|---|
| 288.00 | N | N | S | S | S | S | S |
| 288.25 | N | N | S | S | S | S | S |
| 288.50 | N | N | S | S | S | S | S |
| 288.75 | N | N | O | S | S | S | S |
| 289.00 | N | N | N | S | S | S | S |
| 289.25 | N | N | N | S | S | S | S |
| 289.50 | N | N | N | S | S | S | S |
| 289.75 | N | N | N | S | S | S | S |
| 290.00 | N | N | N | S | S | S | S |
| 290.25 | N | N | N | S | S | S | S |
| 290.50 | N | N | N | S | S | S | S |
| 290.75 | N | N | N | S | S | S | S |
| 291.00 | N | N | N | O | S | S | S |
| 291.25 | N | N | N | N | S | S | S |
| 291.50 | N | N | N | N | S | S | S |
| 291.75 | N | N | N | N | S | S | S |
| 292.00 | N | N | N | N | S | S | S |
| 292.25 | N | N | N | N | S | S | S |
| 292.50 | N | N | N | N | S | S | S |
| 292.75 | N | N | N | N | S | S | S |
| 293.00 | N | N | N | N | S | S | S |
| 293.25 | N | N | N | N | O | S | S |
| 293.50 | N | N | N | N | N | S | S |
| 293.75 | N | N | N | N | N | S | S |
| 294.00 | N | N | N | N | N | S | S |
| 294.25 | O | N | N | N | N | S | S |
| 294.50 | S | N | N | N | N | S | S |
| 294.75 | S | N | N | N | N | S | S |
| 295.00 | S | N | N | N | N | S | S |
| 295.25 | S | N | N | N | N | S | S |
| 295.50 | S | N | N | N | N | O | S |
| 295.75 | S | N | N | N | N | N | S |
| 296.00 | S | N | N | N | N | N | S |
| 296.25 | S | N | N | N | N | N | S |
| 296.50 | S | O | N | N | N | N | S |
| 296.75 | S | S | N | N | N | N | S |
| 297.00 | S | S | N | N | N | N | S |
| 297.25 | S | S | N | N | N | N | S |
| 297.50 | S | S | N | N | N | N | S |
| 297.75 | S | S | N | N | N | N | O |
| 298.00 | S | S | N | N | N | N | N |
| 298.25 | S | S | N | N | N | N | N |
| 298.50 | S | S | N | N | N | N | N |
| 298.75 | S | S | O | N | N | N | N |
| 299.00 | S | S | S | N | N | N | N |
| 299.25 | S | S | S | N | N | N | N |
| 299.50 | S | S | S | N | N | N | N |
| 299.75 | S | S | S | N | N | N | N |

Page Row 25, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 300.00 | O | S | S | S | S | N | N | N | N | S | S | S | S | S | N | N | N |
| 300.25 | N | S | S | S | S | N | N | N | N | O | S | S | S | S | N | N | N |
| 300.50 | N | S | S | S | S | N | N | N | N | N | S | S | S | S | N | N | N |
| 300.75 | N | S | S | S | S | N | N | N | N | N | S | S | S | S | N | N | N |
| 301.00 | N | S | S | S | S | N | N | N | N | N | S | S | S | S | N | N | N |
| 301.25 | N | S | S | S | S | O | N | N | N | N | S | S | S | S | N | N | N |
| 301.50 | N | S | S | S | S | S | N | N | N | N | S | S | S | S | O | N | N |
| 301.75 | N | S | S | S | S | S | N | N | N | N | S | S | S | S | S | N | N |
| 302.00 | N | S | S | S | S | S | N | N | N | N | S | S | S | S | S | N | N |
| 302.25 | N | O | S | S | S | S | N | N | N | N | S | S | S | S | S | N | N |
| 302.50 | N | N | S | S | S | S | N | N | N | N | O | S | S | S | S | N | N |

-continued

| | Coil Excitation | | | | | | | | | | | | | | | | |
|---|---|---|---|---|---|---|---|---|---|---|---|---|---|---|---|---|---|
| 302.75 | N | N | S | S | S | S | N | N | N | N | N | S | S | S | S | N | N |
| 303.00 | N | N | S | S | S | S | N | N | N | N | N | S | S | S | S | N | N |
| 303.25 | N | N | S | S | S | S | N | N | N | N | N | S | S | S | S | N | N |
| 303.50 | N | N | S | S | S | S | O | N | N | N | N | S | S | S | S | N | N |
| 303.75 | N | N | S | S | S | S | S | N | N | N | N | S | S | S | S | O | N |
| 304.00 | N | N | S | S | S | S | S | N | N | N | N | S | S | S | S | S | N |
| 304.25 | N | N | S | S | S | S | S | N | N | N | N | S | S | S | S | S | N |
| 304.50 | N | N | O | S | S | S | S | N | N | N | N | S | S | S | S | S | N |
| 304.75 | N | N | N | S | S | S | S | N | N | N | N | O | S | S | S | S | N |
| 305.00 | N | N | N | S | S | S | S | N | N | N | N | N | S | S | S | S | N |
| 305.25 | N | N | N | S | S | S | S | N | N | N | N | N | S | S | S | S | N |
| 305.50 | N | N | N | S | S | S | S | N | N | N | N | N | S | S | S | S | N |
| 305.75 | N | N | N | S | S | S | S | O | N | N | N | N | S | S | S | S | N |
| 306.00 | N | N | N | S | S | S | S | S | N | N | N | N | S | S | S | S | O |
| 306.25 | N | N | N | S | S | S | S | S | N | N | N | N | S | S | S | S | S |
| 306.50 | N | N | N | S | S | S | S | S | N | N | N | N | S | S | S | S | S |
| 306.75 | N | N | N | O | S | S | S | S | N | N | N | N | S | S | S | S | S |
| 307.00 | N | N | N | N | S | S | S | S | N | N | N | N | O | S | S | S | S |
| 307.25 | N | N | N | N | S | S | S | S | N | N | N | N | N | S | S | S | S |
| 307.50 | N | N | N | N | S | S | S | S | N | N | N | N | N | S | S | S | S |
| 307.75 | N | N | N | N | S | S | S | S | N | N | N | N | N | S | S | S | S |
| 308.00 | N | N | N | N | S | S | S | S | O | N | N | N | N | S | S | S | S |
| 308.25 | N | N | N | N | S | S | S | S | S | N | N | N | N | S | S | S | S |
| 308.50 | N | N | N | N | S | S | S | S | S | N | N | N | N | S | S | S | S |
| 308.75 | N | N | N | N | S | S | S | S | S | N | N | N | N | S | S | S | S |
| 309.00 | N | N | N | N | O | S | S | S | S | N | N | N | N | S | S | S | S |
| 309.25 | N | N | N | N | N | S | S | S | S | N | N | N | N | O | S | S | S |
| 309.50 | N | N | N | N | N | S | S | S | S | N | N | N | N | N | S | S | S |
| 309.75 | N | N | N | N | N | S | S | S | S | N | N | N | N | N | S | S | S |
| 310.00 | O | N | N | N | N | S | S | S | S | N | N | N | N | N | S | S | S |
| 310.25 | S | N | N | N | N | S | S | S | S | O | N | N | N | N | S | S | S |
| 310.50 | S | N | N | N | N | S | S | S | S | S | N | N | N | N | S | S | S |
| 310.75 | S | N | N | N | N | S | S | S | S | S | N | N | N | N | S | S | S |
| 311.00 | S | N | N | N | N | S | S | S | S | S | N | N | N | N | S | S | S |
| 311.25 | S | N | N | N | N | O | S | S | S | S | N | N | N | N | S | S | S |
| 311.50 | S | N | N | N | N | N | S | S | S | S | N | N | N | N | O | S | S |
| 311.75 | S | N | N | N | N | N | S | S | S | S | N | N | N | N | N | S | S |

Page Row 26, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 300.00 | N | S | S | S | S | S | N | N | N | N | S | S | S | S | S | N | N |
| 300.25 | N | S | S | S | S | S | N | N | N | N | S | S | S | S | S | N | N |
| 300.50 | N | O | S | S | S | S | N | N | N | N | S | S | S | S | S | N | N |
| 300.75 | N | N | S | S | S | S | N | N | N | N | O | S | S | S | S | N | N |
| 301.00 | N | N | S | S | S | S | N | N | N | N | N | S | S | S | S | N | N |
| 301.25 | N | N | S | S | S | S | N | N | N | N | N | S | S | S | S | N | N |
| 301.50 | N | N | S | S | S | S | N | N | N | N | N | S | S | S | S | N | N |
| 301.75 | N | N | S | S | S | S | O | N | N | N | N | S | S | S | S | N | N |
| 302.00 | N | N | S | S | S | S | S | N | N | N | N | S | S | S | S | O | N |
| 302.25 | N | N | S | S | S | S | S | N | N | N | N | S | S | S | S | S | N |
| 302.50 | N | N | S | S | S | S | S | N | N | N | N | S | S | S | S | S | N |
| 302.75 | N | N | O | S | S | S | S | N | N | N | N | S | S | S | S | S | N |
| 303.00 | N | N | N | S | S | S | S | N | N | N | N | O | S | S | S | S | N |
| 303.25 | N | N | N | S | S | S | S | N | N | N | N | N | S | S | S | S | N |
| 303.50 | N | N | N | S | S | S | S | N | N | N | N | N | S | S | S | S | N |
| 303.75 | N | N | N | S | S | S | S | N | N | N | N | N | S | S | S | S | N |
| 304.00 | N | N | N | S | S | S | S | O | N | N | N | N | S | S | S | S | N |
| 304.25 | N | N | N | S | S | S | S | S | N | N | N | N | S | S | S | S | O |
| 304.50 | N | N | N | S | S | S | S | S | N | N | N | N | S | S | S | S | S |
| 304.75 | N | N | N | S | S | S | S | S | N | N | N | N | S | S | S | S | S |
| 305.00 | N | N | N | O | S | S | S | S | N | N | N | N | S | S | S | S | S |
| 305.25 | N | N | N | N | S | S | S | S | N | N | N | N | O | S | S | S | S |
| 305.50 | N | N | N | N | S | S | S | S | N | N | N | N | N | S | S | S | S |
| 305.75 | N | N | N | N | S | S | S | S | N | N | N | N | N | S | S | S | S |
| 306.00 | N | N | N | N | S | S | S | S | N | N | N | N | N | S | S | S | S |
| 306.25 | N | N | N | N | S | S | S | S | O | N | N | N | N | S | S | S | S |
| 306.50 | N | N | N | N | S | S | S | S | S | N | N | N | N | S | S | S | S |
| 306.75 | N | N | N | N | S | S | S | S | S | N | N | N | N | S | S | S | S |
| 307.00 | N | N | N | N | S | S | S | S | S | N | N | N | N | S | S | S | S |
| 307.25 | N | N | N | N | O | S | S | S | S | N | N | N | N | S | S | S | S |
| 307.50 | N | N | N | N | N | S | S | S | S | N | N | N | N | O | S | S | S |
| 307.75 | N | N | N | N | N | S | S | S | S | N | N | N | N | N | S | S | S |
| 308.00 | N | N | N | N | N | S | S | S | S | N | N | N | N | N | S | S | S |
| 308.25 | O | N | N | N | N | S | S | S | S | N | N | N | N | N | S | S | S |
| 308.50 | S | N | N | N | N | S | S | S | S | O | N | N | N | N | S | S | S |
| 308.75 | S | N | N | N | N | S | S | S | S | S | N | N | N | N | S | S | S |

-continued

| Coil Excitation | | | | | | | | | | | | | | | | | |
|---|---|---|---|---|---|---|---|---|---|---|---|---|---|---|---|---|---|
| 309.00 | S | N | N | N | N | S | S | S | S | S | N | N | N | N | S | S | S |
| 309.25 | S | N | N | N | N | S | S | S | S | S | N | N | N | N | S | S | S |
| 309.50 | S | N | N | N | N | O | S | S | S | S | N | N | N | N | S | S | S |
| 309.75 | S | N | N | N | N | N | S | S | S | S | N | N | N | N | O | S | S |
| 310.00 | S | N | N | N | N | N | S | S | S | S | N | N | N | N | N | S | S |
| 310.25 | S | N | N | N | N | N | S | S | S | S | N | N | N | N | N | S | S |
| 310.50 | S | O | N | N | N | N | S | S | S | S | N | N | N | N | N | S | S |
| 310.75 | S | S | N | N | N | N | S | S | S | S | O | N | N | N | N | S | S |
| 311.00 | S | S | N | N | N | N | S | S | S | S | S | N | N | N | N | S | S |
| 311.25 | S | S | N | N | N | N | S | S | S | S | S | N | N | N | N | S | S |
| 311.50 | S | S | N | N | N | N | S | S | S | S | S | N | N | N | N | S | S |
| 311.75 | S | S | N | N | N | N | O | S | S | S | S | N | N | N | N | S | S |

Page Row 26, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 300.00 | N | N | S | S | S | S | O | N | N | N | N | S | S | S | S | N | N |
| 300.25 | N | N | S | S | S | S | S | N | N | N | N | S | S | S | S | O | N |
| 300.50 | N | N | S | S | S | S | S | N | N | N | N | S | S | S | S | S | N |
| 300.75 | N | N | S | S | S | S | S | N | N | N | N | S | S | S | S | S | N |
| 301.00 | N | N | O | S | S | S | S | N | N | N | N | S | S | S | S | S | N |
| 301.25 | N | N | N | S | S | S | S | N | N | N | N | O | S | S | S | S | N |
| 301.50 | N | N | N | S | S | S | S | N | N | N | N | N | S | S | S | S | N |
| 301.75 | N | N | N | S | S | S | S | N | N | N | N | N | S | S | S | S | N |
| 302.00 | N | N | N | S | S | S | S | N | N | N | N | N | S | S | S | S | N |
| 302.25 | N | N | N | S | S | S | S | O | N | N | N | N | S | S | S | S | N |
| 302.50 | N | N | N | S | S | S | S | S | N | N | N | N | S | S | S | S | O |
| 302.75 | N | N | N | S | S | S | S | S | N | N | N | N | S | S | S | S | S |
| 303.00 | N | N | N | S | S | S | S | S | N | N | N | N | S | S | S | S | S |
| 303.25 | N | N | N | O | S | S | S | S | N | N | N | N | S | S | S | S | S |
| 303.50 | N | N | N | N | S | S | S | S | N | N | N | N | O | S | S | S | S |
| 303.75 | N | N | N | N | S | S | S | S | N | N | N | N | N | S | S | S | S |
| 304.00 | N | N | N | N | S | S | S | S | N | N | N | N | N | S | S | S | S |
| 304.25 | N | N | N | N | S | S | S | S | N | N | N | N | N | S | S | S | S |
| 304.50 | N | N | N | N | S | S | S | S | O | N | N | N | N | S | S | S | S |
| 304.75 | N | N | N | N | S | S | S | S | S | N | N | N | N | S | S | S | S |
| 305.00 | N | N | N | N | S | S | S | S | S | N | N | N | N | S | S | S | S |
| 305.25 | N | N | N | N | S | S | S | S | S | N | N | N | N | S | S | S | S |
| 305.50 | N | N | N | N | O | S | S | S | S | N | N | N | N | S | S | S | S |
| 305.75 | N | N | N | N | N | S | S | S | S | N | N | N | N | O | S | S | S |
| 306.00 | N | N | N | N | N | S | S | S | S | N | N | N | N | N | S | S | S |
| 306.25 | N | N | N | N | N | S | S | S | S | N | N | N | N | N | S | S | S |
| 306.50 | O | N | N | N | N | S | S | S | S | N | N | N | N | N | S | S | S |
| 306.75 | S | N | N | N | N | S | S | S | S | O | N | N | N | N | S | S | S |
| 307.00 | S | N | N | N | N | S | S | S | S | S | N | N | N | N | S | S | S |
| 307.25 | S | N | N | N | N | S | S | S | S | S | N | N | N | N | S | S | S |
| 307.50 | S | N | N | N | N | S | S | S | S | S | N | N | N | N | S | S | S |
| 307.75 | S | N | N | N | N | O | S | S | S | S | N | N | N | N | S | S | S |
| 308.00 | S | N | N | N | N | N | S | S | S | S | N | N | N | N | O | S | S |
| 308.25 | S | N | N | N | N | N | S | S | S | S | N | N | N | N | N | S | S |
| 308.50 | S | N | N | N | N | N | S | S | S | S | N | N | N | N | N | S | S |
| 308.75 | S | O | N | N | N | N | S | S | S | S | N | N | N | N | N | S | S |
| 309.00 | S | S | N | N | N | N | S | S | S | S | O | N | N | N | N | S | S |
| 309.25 | S | S | N | N | N | N | S | S | S | S | S | N | N | N | N | S | S |
| 309.50 | S | S | N | N | N | N | S | S | S | S | S | N | N | N | N | S | S |
| 309.75 | S | S | N | N | N | N | S | S | S | S | S | N | N | N | N | S | S |
| 310.00 | S | S | N | N | N | N | O | S | S | S | S | N | N | N | N | S | S |
| 310.25 | S | S | N | N | N | N | N | S | S | S | S | N | N | N | N | O | S |
| 310.50 | S | S | N | N | N | N | N | S | S | S | S | N | N | N | N | N | S |
| 310.75 | S | S | N | N | N | N | N | S | S | S | S | N | N | N | N | N | S |
| 311.00 | S | S | O | N | N | N | N | S | S | S | S | N | N | N | N | N | S |
| 311.25 | S | S | S | N | N | N | N | S | S | S | S | O | N | N | N | N | S |
| 311.50 | S | S | S | N | N | N | N | S | S | S | S | S | N | N | N | N | S |
| 311.75 | S | S | S | N | N | N | N | S | S | S | S | S | N | N | N | N | S |

Page Row 26, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 300.00 | N | N | N | S | S | S | S | N | N | N | N | N | S | S | S | S | N |
| 300.25 | N | N | N | S | S | S | S | N | N | N | N | N | S | S | S | S | N |
| 300.50 | N | N | N | S | S | S | S | O | N | N | N | N | S | S | S | S | N |
| 300.75 | N | N | N | S | S | S | S | S | N | N | N | N | S | S | S | S | O |
| 301.00 | N | N | N | S | S | S | S | S | N | N | N | N | S | S | S | S | S |
| 301.25 | N | N | N | S | S | S | S | S | N | N | N | N | S | S | S | S | S |
| 301.50 | N | N | N | O | S | S | S | S | N | N | N | N | S | S | S | S | S |
| 301.75 | N | N | N | N | S | S | S | S | N | N | N | N | O | S | S | S | S |
| 302.00 | N | N | N | N | S | S | S | S | N | N | N | N | N | S | S | S | S |

-continued

| | Coil Excitation | | | | | | | | | | | | | | | |
|---|---|---|---|---|---|---|---|---|---|---|---|---|---|---|---|---|---|
| 302.25 | N | N | N | N | S | S | S | S | N | N | N | N | N | S | S | S | S |
| 302.50 | N | N | N | N | S | S | S | S | N | N | N | N | N | S | S | S | S |
| 302.75 | N | N | N | N | S | S | S | S | O | N | N | N | N | S | S | S | S |
| 303.00 | N | N | N | N | S | S | S | S | S | N | N | N | N | S | S | S | S |
| 303.25 | N | N | N | N | S | S | S | S | S | N | N | N | N | S | S | S | S |
| 303.50 | N | N | N | N | S | S | S | S | S | N | N | N | N | S | S | S | S |
| 303.75 | N | N | N | N | O | S | S | S | S | N | N | N | N | S | S | S | S |
| 304.00 | N | N | N | N | N | S | S | S | S | N | N | N | N | O | S | S | S |
| 304.25 | N | N | N | N | N | S | S | S | S | N | N | N | N | N | S | S | S |
| 304.50 | N | N | N | N | N | S | S | S | S | N | N | N | N | N | S | S | S |
| 304.75 | O | N | N | N | N | S | S | S | S | N | N | N | N | N | S | S | S |
| 305.00 | S | N | N | N | N | S | S | S | S | O | N | N | N | N | S | S | S |
| 305.25 | S | N | N | N | N | S | S | S | S | S | N | N | N | N | S | S | S |
| 305.50 | S | N | N | N | N | S | S | S | S | S | N | N | N | N | S | S | S |
| 305.75 | S | N | N | N | N | S | S | S | S | S | N | N | N | N | S | S | S |
| 306.00 | S | N | N | N | N | O | S | S | S | S | N | N | N | N | S | S | S |
| 306.25 | S | N | N | N | N | N | S | S | S | S | N | N | N | N | O | S | S |
| 306.50 | S | N | N | N | N | N | S | S | S | S | N | N | N | N | N | S | S |
| 306.75 | S | N | N | N | N | N | S | S | S | S | N | N | N | N | N | S | S |
| 307.00 | S | O | N | N | N | N | S | S | S | S | N | N | N | N | N | S | S |
| 307.25 | S | S | N | N | N | N | S | S | S | S | O | N | N | N | N | S | S |
| 307.50 | S | S | N | N | N | N | S | S | S | S | S | N | N | N | N | S | S |
| 307.75 | S | S | N | N | N | N | S | S | S | S | S | N | N | N | N | S | S |
| 308.00 | S | S | N | N | N | N | S | S | S | S | S | N | N | N | N | S | S |
| 308.25 | S | S | N | N | N | N | O | S | S | S | S | N | N | N | N | S | S |
| 308.50 | S | S | N | N | N | N | N | S | S | S | S | N | N | N | N | O | S |
| 308.75 | S | S | N | N | N | N | N | S | S | S | S | N | N | N | N | N | S |
| 309.00 | S | S | N | N | N | N | N | S | S | S | S | N | N | N | N | N | S |
| 309.25 | S | S | O | N | N | N | N | S | S | S | S | N | N | N | N | N | S |
| 309.50 | S | S | S | N | N | N | N | S | S | S | S | O | N | N | N | N | S |
| 309.75 | S | S | S | N | N | N | N | S | S | S | S | S | N | N | N | N | S |
| 310.00 | S | S | S | N | N | N | N | S | S | S | S | S | N | N | N | N | S |
| 310.25 | S | S | S | N | N | N | N | S | S | S | S | S | N | N | N | N | S |
| 310.50 | S | S | S | N | N | N | N | O | S | S | S | S | N | N | N | N | S |
| 310.75 | S | S | S | N | N | N | N | N | S | S | S | S | N | N | N | N | O |
| 311.00 | S | S | S | N | N | N | N | N | S | S | S | S | N | N | N | N | N |
| 311.25 | S | S | S | N | N | N | N | N | S | S | S | S | N | N | N | N | N |
| 311.50 | S | S | S | O | N | N | N | N | S | S | S | S | N | N | N | N | N |
| 311.75 | S | S | S | S | N | N | N | N | S | S | S | S | O | N | N | N | N |

Page Row 26, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 300.00 | N | N | N | N | S | S | S | S | N | N | N | N | O | S | S | S | S |
| 300.25 | N | N | N | N | S | S | S | S | N | N | N | N | N | S | S | S | S |
| 300.50 | N | N | N | N | S | S | S | S | N | N | N | N | N | S | S | S | S |
| 300.75 | N | N | N | N | S | S | S | S | N | N | N | N | N | S | S | S | S |
| 301.00 | N | N | N | N | S | S | S | S | O | N | N | N | N | S | S | S | S |
| 301.25 | N | N | N | N | S | S | S | S | S | N | N | N | N | S | S | S | S |
| 301.50 | N | N | N | N | S | S | S | S | S | N | N | N | N | S | S | S | S |
| 301.75 | N | N | N | N | S | S | S | S | S | N | N | N | N | S | S | S | S |
| 302.00 | N | N | N | N | O | S | S | S | S | N | N | N | N | S | S | S | S |
| 302.25 | N | N | N | N | N | S | S | S | S | N | N | N | N | O | S | S | S |
| 302.50 | N | N | N | N | N | S | S | S | S | N | N | N | N | N | S | S | S |
| 302.75 | N | N | N | N | N | S | S | S | S | N | N | N | N | N | S | S | S |
| 303.00 | O | N | N | N | N | S | S | S | S | N | N | N | N | N | S | S | S |
| 303.25 | S | N | N | N | N | S | S | S | S | O | N | N | N | N | S | S | S |
| 303.50 | S | N | N | N | N | S | S | S | S | S | N | N | N | N | S | S | S |
| 303.75 | S | N | N | N | N | S | S | S | S | S | N | N | N | N | S | S | S |
| 304.00 | S | N | N | N | N | S | S | S | S | S | N | N | N | N | S | S | S |
| 304.25 | S | N | N | N | N | O | S | S | S | S | N | N | N | N | S | S | S |
| 304.50 | S | N | N | N | N | N | S | S | S | S | N | N | N | N | O | S | S |
| 304.75 | S | N | N | N | N | N | S | S | S | S | N | N | N | N | N | S | S |
| 305.00 | S | N | N | N | N | N | S | S | S | S | N | N | N | N | N | S | S |
| 305.25 | S | O | N | N | N | N | S | S | S | S | N | N | N | N | N | S | S |
| 305.50 | S | S | N | N | N | N | S | S | S | S | O | N | N | N | N | S | S |
| 305.75 | S | S | N | N | N | N | S | S | S | S | S | N | N | N | N | S | S |
| 306.00 | S | S | N | N | N | N | S | S | S | S | S | N | N | N | N | S | S |
| 306.25 | S | S | N | N | N | N | S | S | S | S | S | N | N | N | N | S | S |
| 306.50 | S | S | N | N | N | N | O | S | S | S | S | N | N | N | N | S | S |
| 306.75 | S | S | N | N | N | N | N | S | S | S | S | N | N | N | N | O | S |
| 307.00 | S | S | N | N | N | N | N | S | S | S | S | N | N | N | N | N | S |
| 307.25 | S | S | N | N | N | N | N | S | S | S | S | N | N | N | N | N | S |
| 307.50 | S | S | O | N | N | N | N | S | S | S | S | N | N | N | N | N | S |
| 307.75 | S | S | S | N | N | N | N | S | S | S | S | O | N | N | N | N | S |
| 308.00 | S | S | S | N | N | N | N | S | S | S | S | S | N | N | N | N | S |
| 308.25 | S | S | S | N | N | N | N | S | S | S | S | S | N | N | N | N | S |

-continued

| Coil Excitation | | | | | | | | | | | | | | | | | |
|---|---|---|---|---|---|---|---|---|---|---|---|---|---|---|---|---|---|
| 308.50 | S | S | S | N | N | N | N | S | S | S | S | S | N | N | N | N | S |
| 308.75 | S | S | S | N | N | N | N | O | S | S | S | S | N | N | N | N | S |
| 309.00 | S | S | S | N | N | N | N | N | S | S | S | S | N | N | N | N | O |
| 309.25 | S | S | S | N | N | N | N | N | S | S | S | S | N | N | N | N | N |
| 309.50 | S | S | S | N | N | N | N | N | S | S | S | S | N | N | N | N | N |
| 309.75 | S | S | S | O | N | N | N | N | S | S | S | S | N | N | N | N | N |
| 310.00 | S | S | S | S | N | N | N | N | S | S | S | S | O | N | N | N | N |
| 310.25 | S | S | S | S | N | N | N | N | S | S | S | S | S | N | N | N | N |
| 310.50 | S | S | S | S | N | N | N | N | S | S | S | S | S | N | N | N | N |
| 310.75 | S | S | S | S | N | N | N | N | S | S | S | S | S | N | N | N | N |
| 311.00 | S | S | S | S | N | N | N | N | O | S | S | S | S | N | N | N | N |
| 311.25 | S | S | S | S | N | N | N | N | N | S | S | S | S | N | N | N | N |
| 311.50 | S | S | S | S | N | N | N | N | N | S | S | S | S | N | N | N | N |
| 311.75 | S | S | S | S | N | N | N | N | N | S | S | S | S | N | N | N | N |

Page Row 26, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 300.00 | N | N | N | N | S | S | S | S | S | N | N | N | N | S | S | S | S |
| 300.25 | N | N | N | N | O | S | S | S | S | N | N | N | N | S | S | S | S |
| 300.50 | N | N | N | N | N | S | S | S | S | N | N | N | N | O | S | S | S |
| 300.75 | N | N | N | N | N | S | S | S | S | N | N | N | N | N | S | S | S |
| 301.00 | N | N | N | N | N | S | S | S | S | N | N | N | N | N | S | S | S |
| 301.25 | O | N | N | N | N | S | S | S | S | N | N | N | N | N | S | S | S |
| 301.50 | S | N | N | N | N | S | S | S | S | O | N | N | N | N | S | S | S |
| 301.75 | S | N | N | N | N | S | S | S | S | S | N | N | N | N | S | S | S |
| 302.00 | S | N | N | N | N | S | S | S | S | S | N | N | N | N | S | S | S |
| 302.25 | S | N | N | N | N | S | S | S | S | S | N | N | N | N | S | S | S |
| 302.50 | S | N | N | N | N | O | S | S | S | S | N | N | N | N | S | S | S |
| 302.75 | S | N | N | N | N | N | S | S | S | S | N | N | N | N | O | S | S |
| 303.00 | S | N | N | N | N | N | S | S | S | S | N | N | N | N | N | S | S |
| 303.25 | S | N | N | N | N | N | S | S | S | S | N | N | N | N | N | S | S |
| 303.50 | S | O | N | N | N | N | S | S | S | S | N | N | N | N | N | S | S |
| 303.75 | S | S | N | N | N | N | S | S | S | S | O | N | N | N | N | S | S |
| 304.00 | S | S | N | N | N | N | S | S | S | S | S | N | N | N | N | S | S |
| 304.25 | S | S | N | N | N | N | S | S | S | S | S | N | N | N | N | S | S |
| 304.50 | S | S | N | N | N | N | S | S | S | S | S | N | N | N | N | S | S |
| 304.75 | S | S | N | N | N | N | O | S | S | S | S | N | N | N | N | S | S |
| 305.00 | S | S | N | N | N | N | N | S | S | S | S | N | N | N | N | O | S |
| 305.25 | S | S | N | N | N | N | N | S | S | S | S | N | N | N | N | N | S |
| 305.50 | S | S | N | N | N | N | N | S | S | S | S | N | N | N | N | N | S |
| 305.75 | S | S | O | N | N | N | N | S | S | S | S | N | N | N | N | N | S |
| 306.00 | S | S | S | N | N | N | N | S | S | S | S | O | N | N | N | N | S |
| 306.25 | S | S | S | N | N | N | N | S | S | S | S | S | N | N | N | N | S |
| 306.50 | S | S | S | N | N | N | N | S | S | S | S | S | N | N | N | N | S |
| 306.75 | S | S | S | N | N | N | N | S | S | S | S | S | N | N | N | N | S |
| 307.00 | S | S | S | N | N | N | N | O | S | S | S | S | N | N | N | N | S |
| 307.25 | S | S | S | N | N | N | N | N | S | S | S | S | N | N | N | N | O |
| 307.50 | S | S | S | N | N | N | N | N | S | S | S | S | N | N | N | N | N |
| 307.75 | S | S | S | N | N | N | N | N | S | S | S | S | N | N | N | N | N |
| 308.00 | S | S | S | O | N | N | N | N | S | S | S | S | N | N | N | N | N |
| 308.25 | S | S | S | S | N | N | N | N | S | S | S | S | O | N | N | N | N |
| 308.50 | S | S | S | S | N | N | N | N | S | S | S | S | S | N | N | N | N |
| 308.75 | S | S | S | S | N | N | N | N | S | S | S | S | S | N | N | N | N |
| 309.00 | S | S | S | S | N | N | N | N | S | S | S | S | S | N | N | N | N |
| 309.25 | S | S | S | S | N | N | N | N | O | S | S | S | S | N | N | N | N |
| 309.50 | S | S | S | S | N | N | N | N | N | S | S | S | S | N | N | N | N |
| 309.75 | S | S | S | S | N | N | N | N | N | S | S | S | S | N | N | N | N |
| 310.00 | S | S | S | S | N | N | N | N | N | S | S | S | S | N | N | N | N |
| 310.25 | S | S | S | S | O | N | N | N | N | S | S | S | S | N | N | N | N |
| 310.50 | S | S | S | S | S | N | N | N | N | S | S | S | S | O | N | N | N |
| 310.75 | S | S | S | S | S | N | N | N | N | S | S | S | S | S | N | N | N |
| 311.00 | S | S | S | S | S | N | N | N | N | S | S | S | S | S | N | N | N |
| 311.25 | O | S | S | S | S | N | N | N | N | S | S | S | S | S | N | N | N |
| 311.50 | N | S | S | S | S | N | N | N | N | O | S | S | S | S | N | N | N |
| 311.75 | N | S | S | S | S | N | N | N | N | N | S | S | S | S | N | N | N |

Page Row 26, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 300.00 | S | N | N | N | N | S | S | S | S | S | N | N | N | N | S | S | S |
| 300.25 | S | N | N | N | N | S | S | S | S | S | N | N | N | N | S | S | S |
| 300.50 | S | N | N | N | N | S | S | S | S | S | N | N | N | N | S | S | S |
| 300.75 | S | N | N | N | N | O | S | S | S | S | N | N | N | N | S | S | S |
| 301.00 | S | N | N | N | N | N | S | S | S | S | N | N | N | N | O | S | S |
| 301.25 | S | N | N | N | N | N | S | S | S | S | N | N | N | N | N | S | S |
| 301.50 | S | N | N | N | N | N | S | S | S | S | N | N | N | N | N | S | S |

-continued

| Coil Excitation | | | | | | | | | | | | | | | | | |
|---|---|---|---|---|---|---|---|---|---|---|---|---|---|---|---|---|---|
| 301.75 | S | O | N | N | N | N | S | S | S | S | N | N | N | N | N | S | S |
| 302.00 | S | S | N | N | N | N | S | S | S | S | O | N | N | N | N | S | S |
| 302.25 | S | S | N | N | N | N | S | S | S | S | S | N | N | N | N | S | S |
| 302.50 | S | S | N | N | N | N | S | S | S | S | S | N | N | N | N | S | S |
| 302.75 | S | S | N | N | N | N | S | S | S | S | S | N | N | N | N | S | S |
| 303.00 | S | S | N | N | N | N | O | S | S | S | S | N | N | N | N | S | S |
| 303.25 | S | S | N | N | N | N | N | S | S | S | S | N | N | N | N | O | S |
| 303.50 | S | S | N | N | N | N | N | S | S | S | S | N | N | N | N | N | S |
| 303.75 | S | S | N | N | N | N | N | S | S | S | S | N | N | N | N | N | S |
| 304.00 | S | S | O | N | N | N | N | S | S | S | S | N | N | N | N | N | S |
| 304.25 | S | S | S | N | N | N | N | S | S | S | S | O | N | N | N | N | S |
| 304.50 | S | S | S | N | N | N | N | S | S | S | S | S | N | N | N | N | S |
| 304.75 | S | S | S | N | N | N | N | S | S | S | S | S | N | N | N | N | S |
| 305.00 | S | S | S | N | N | N | N | S | S | S | S | S | N | N | N | N | S |
| 305.25 | S | S | S | N | N | N | N | O | S | S | S | S | N | N | N | N | S |
| 305.50 | S | S | S | N | N | N | N | N | S | S | S | S | N | N | N | N | O |
| 305.75 | S | S | S | N | N | N | N | N | S | S | S | S | N | N | N | N | N |
| 306.00 | S | S | S | N | N | N | N | N | S | S | S | S | N | N | N | N | N |
| 306.25 | S | S | S | O | N | N | N | N | S | S | S | S | N | N | N | N | N |
| 306.50 | S | S | S | S | N | N | N | N | S | S | S | S | O | N | N | N | N |
| 306.75 | S | S | S | S | N | N | N | N | S | S | S | S | S | N | N | N | N |
| 307.00 | S | S | S | S | N | N | N | N | S | S | S | S | S | N | N | N | N |
| 307.25 | S | S | S | S | N | N | N | N | S | S | S | S | S | N | N | N | N |
| 307.50 | S | S | S | S | N | N | N | N | O | S | S | S | S | N | N | N | N |
| 307.75 | S | S | S | S | N | N | N | N | N | S | S | S | S | N | N | N | N |
| 308.00 | S | S | S | S | N | N | N | N | N | S | S | S | S | N | N | N | N |
| 308.25 | S | S | S | S | N | N | N | N | N | S | S | S | S | N | N | N | N |
| 308.50 | S | S | S | S | O | N | N | N | N | S | S | S | S | N | N | N | N |
| 308.75 | S | S | S | S | S | N | N | N | N | S | S | S | S | O | N | N | N |
| 309.00 | S | S | S | S | S | N | N | N | N | S | S | S | S | S | N | N | N |
| 309.25 | S | S | S | S | S | N | N | N | N | S | S | S | S | S | N | N | N |
| 309.50 | O | S | S | S | S | N | N | N | N | S | S | S | S | S | N | N | N |
| 309.75 | N | S | S | S | S | N | N | N | N | O | S | S | S | S | N | N | N |
| 310.00 | N | S | S | S | S | N | N | N | N | N | S | S | S | S | N | N | N |
| 310.25 | N | S | S | S | S | N | N | N | N | N | S | S | S | S | N | N | N |
| 310.50 | N | S | S | S | S | N | N | N | N | N | S | S | S | S | N | N | N |
| 310.75 | N | S | S | S | S | O | N | N | N | N | S | S | S | S | N | N | N |
| 311.00 | N | S | S | S | S | S | N | N | N | N | S | S | S | S | O | N | N |
| 311.25 | N | S | S | S | S | S | N | N | N | N | S | S | S | S | S | N | N |
| 311.50 | N | S | S | S | S | S | N | N | N | N | S | S | S | S | S | N | N |
| 311.75 | N | O | S | S | S | S | N | N | N | N | S | S | S | S | S | N | N |

Page Row 26, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 300.00 | S | O | N | N | N | N | S | S | S | S | N | N | N | N | N | S | S |
| 300.25 | S | S | N | N | N | N | S | S | S | S | O | N | N | N | N | S | S |
| 300.50 | S | S | N | N | N | N | S | S | S | S | S | N | N | N | N | S | S |
| 300.75 | S | S | N | N | N | N | S | S | S | S | S | N | N | N | N | S | S |
| 301.00 | S | S | N | N | N | N | S | S | S | S | S | N | N | N | N | S | S |
| 301.25 | S | S | N | N | N | N | O | S | S | S | S | N | N | N | N | S | S |
| 301.50 | S | S | N | N | N | N | N | S | S | S | S | N | N | N | N | O | S |
| 301.75 | S | S | N | N | N | N | N | S | S | S | S | N | N | N | N | N | S |
| 302.00 | S | S | N | N | N | N | N | S | S | S | S | N | N | N | N | N | S |
| 302.25 | S | S | O | N | N | N | N | S | S | S | S | N | N | N | N | N | S |
| 302.50 | S | S | S | N | N | N | N | S | S | S | S | O | N | N | N | N | S |
| 302.75 | S | S | S | N | N | N | N | S | S | S | S | S | N | N | N | N | S |
| 303.00 | S | S | S | N | N | N | N | S | S | S | S | S | N | N | N | N | S |
| 303.25 | S | S | S | N | N | N | N | S | S | S | S | S | N | N | N | N | S |
| 303.50 | S | S | S | N | N | N | N | O | S | S | S | S | N | N | N | N | S |
| 303.75 | S | S | S | N | N | N | N | N | S | S | S | S | N | N | N | N | O |
| 304.00 | S | S | S | N | N | N | N | N | S | S | S | S | N | N | N | N | N |
| 304.25 | S | S | S | N | N | N | N | N | S | S | S | S | N | N | N | N | N |
| 304.50 | S | S | S | O | N | N | N | N | S | S | S | S | N | N | N | N | N |
| 304.75 | S | S | S | S | N | N | N | N | S | S | S | S | O | N | N | N | N |
| 305.00 | S | S | S | S | N | N | N | N | S | S | S | S | S | N | N | N | N |
| 305.25 | S | S | S | S | N | N | N | N | S | S | S | S | S | N | N | N | N |
| 305.50 | S | S | S | S | N | N | N | N | S | S | S | S | S | N | N | N | N |
| 305.75 | S | S | S | S | N | N | N | N | O | S | S | S | S | N | N | N | N |
| 306.00 | S | S | S | S | N | N | N | N | N | S | S | S | S | N | N | N | N |
| 306.25 | S | S | S | S | N | N | N | N | N | S | S | S | S | N | N | N | N |
| 306.50 | S | S | S | S | N | N | N | N | N | S | S | S | S | N | N | N | N |
| 306.75 | S | S | S | S | O | N | N | N | N | S | S | S | S | N | N | N | N |
| 307.00 | S | S | S | S | S | N | N | N | N | S | S | S | S | O | N | N | N |
| 307.25 | S | S | S | S | S | N | N | N | N | S | S | S | S | S | N | N | N |
| 307.50 | S | S | S | S | S | N | N | N | N | S | S | S | S | S | N | N | N |
| 307.75 | O | S | S | S | S | N | N | N | N | S | S | S | S | S | N | N | N |

-continued

Coil Excitation

| | | | | | | | | | | | | | | | | | |
|---|---|---|---|---|---|---|---|---|---|---|---|---|---|---|---|---|---|
| 308.00 | N | S | S | S | S | N | N | N | N | O | S | S | S | S | N | N | N |
| 308.25 | N | S | S | S | S | N | N | N | N | N | S | S | S | S | N | N | N |
| 308.50 | N | S | S | S | S | N | N | N | N | N | S | S | S | S | N | N | N |
| 308.75 | N | S | S | S | S | N | N | N | N | N | S | S | S | S | N | N | N |
| 309.00 | N | S | S | S | S | O | N | N | N | N | S | S | S | S | N | N | N |
| 309.25 | N | S | S | S | S | S | N | N | N | N | S | S | S | S | O | N | N |
| 309.50 | N | S | S | S | S | S | N | N | N | N | S | S | S | S | S | N | N |
| 309.75 | N | S | S | S | S | S | N | N | N | N | S | S | S | S | S | N | N |
| 310.00 | N | O | S | S | S | S | N | N | N | N | S | S | S | S | S | N | N |
| 310.25 | N | N | S | S | S | S | N | N | N | N | O | S | S | S | S | N | N |
| 310.50 | N | N | S | S | S | S | N | N | N | N | N | S | S | S | S | N | N |
| 310.75 | N | N | S | S | S | S | N | N | N | N | N | S | S | S | S | N | N |
| 311.00 | N | N | S | S | S | S | N | N | N | N | N | S | S | S | S | N | N |
| 311.25 | N | N | S | S | S | S | O | N | N | N | N | S | S | S | S | N | N |
| 311.50 | N | N | S | S | S | S | S | N | N | N | N | S | S | S | S | O | N |
| 311.75 | N | N | S | S | S | S | S | N | N | N | N | S | S | S | S | S | N |

Page Row 26, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 300.00 | S | S | N | N | N | N | N | S | S | S | S | N | N | N | N | N | S |
| 300.25 | S | S | N | N | N | N | N | S | S | S | S | N | N | N | N | N | S |
| 300.50 | S | S | O | N | N | N | N | S | S | S | S | N | N | N | N | N | S |
| 300.75 | S | S | S | N | N | N | N | S | S | S | S | O | N | N | N | N | S |
| 301.00 | S | S | S | N | N | N | N | S | S | S | S | S | N | N | N | N | S |
| 301.25 | S | S | S | N | N | N | N | S | S | S | S | S | N | N | N | N | S |
| 301.50 | S | S | S | N | N | N | N | S | S | S | S | S | N | N | N | N | S |
| 301.75 | S | S | S | N | N | N | N | O | S | S | S | S | N | N | N | N | S |
| 302.00 | S | S | S | N | N | N | N | N | S | S | S | S | N | N | N | N | O |
| 302.25 | S | S | S | N | N | N | N | N | S | S | S | S | N | N | N | N | N |
| 302.50 | S | S | S | N | N | N | N | N | S | S | S | S | N | N | N | N | N |
| 302.75 | S | S | S | O | N | N | N | N | S | S | S | S | N | N | N | N | N |
| 303.00 | S | S | S | S | N | N | N | N | S | S | S | S | O | N | N | N | N |
| 303.25 | S | S | S | S | N | N | N | N | S | S | S | S | S | N | N | N | N |
| 303.50 | S | S | S | S | N | N | N | N | S | S | S | S | S | N | N | N | N |
| 303.75 | S | S | S | S | N | N | N | N | S | S | S | S | S | N | N | N | N |
| 304.00 | S | S | S | S | N | N | N | N | O | S | S | S | S | N | N | N | N |
| 304.25 | S | S | S | S | N | N | N | N | N | S | S | S | S | N | N | N | N |
| 304.50 | S | S | S | S | N | N | N | N | N | S | S | S | S | N | N | N | N |
| 304.75 | S | S | S | S | N | N | N | N | N | S | S | S | S | N | N | N | N |
| 305.00 | S | S | S | S | O | N | N | N | N | S | S | S | S | N | N | N | N |
| 305.25 | S | S | S | S | S | N | N | N | N | S | S | S | S | O | N | N | N |
| 305.50 | S | S | S | S | S | N | N | N | N | S | S | S | S | S | N | N | N |
| 305.75 | S | S | S | S | S | N | N | N | N | S | S | S | S | S | N | N | N |
| 306.00 | O | S | S | S | S | N | N | N | N | S | S | S | S | S | N | N | N |
| 306.25 | N | S | S | S | S | N | N | N | N | O | S | S | S | S | N | N | N |
| 306.50 | N | S | S | S | S | N | N | N | N | N | S | S | S | S | N | N | N |
| 306.75 | N | S | S | S | S | N | N | N | N | N | S | S | S | S | N | N | N |
| 307.00 | N | S | S | S | S | N | N | N | N | N | S | S | S | S | N | N | N |
| 307.25 | N | S | S | S | S | O | N | N | N | N | S | S | S | S | N | N | N |
| 307.50 | N | S | S | S | S | S | N | N | N | N | S | S | S | S | O | N | N |
| 307.75 | N | S | S | S | S | S | N | N | N | N | S | S | S | S | S | N | N |
| 308.00 | N | S | S | S | S | S | N | N | N | N | S | S | S | S | S | N | N |
| 308.25 | N | O | S | S | S | S | N | N | N | N | S | S | S | S | S | N | N |
| 308.50 | N | N | S | S | S | S | N | N | N | N | O | S | S | S | S | N | N |
| 308.75 | N | N | S | S | S | S | N | N | N | N | N | S | S | S | S | N | N |
| 309.00 | N | N | S | S | S | S | N | N | N | N | N | S | S | S | S | N | N |
| 309.25 | N | N | S | S | S | S | N | N | N | N | N | S | S | S | S | N | N |
| 309.50 | N | N | S | S | S | S | O | N | N | N | N | S | S | S | S | N | N |
| 309.75 | N | N | S | S | S | S | S | N | N | N | N | S | S | S | S | O | N |
| 310.00 | N | N | S | S | S | S | S | N | N | N | N | S | S | S | S | S | N |
| 310.25 | N | N | S | S | S | S | S | N | N | N | N | S | S | S | S | S | N |
| 310.50 | N | N | O | S | S | S | S | N | N | N | N | S | S | S | S | S | N |
| 310.75 | N | N | N | S | S | S | S | N | N | N | N | O | S | S | S | S | N |
| 311.00 | N | N | N | S | S | S | S | N | N | N | N | N | S | S | S | S | N |
| 311.25 | N | N | N | S | S | S | S | N | N | N | N | N | S | S | S | S | N |
| 311.50 | N | N | N | S | S | S | S | N | N | N | N | N | S | S | S | S | N |
| 311.75 | N | N | N | S | S | S | S | O | N | N | N | N | S | S | S | S | N |

Page Row 26, Page Column 9

| Coil | 154 | 155 | 156 | 157 | 158 | 159 | 160 |
|---|---|---|---|---|---|---|---|
| 300.00 | S | S | S | N | N | N | N |
| 300.25 | S | S | S | N | N | N | N |
| 300.50 | S | S | S | N | N | N | N |
| 300.75 | S | S | S | N | N | N | N |
| 301.00 | S | S | S | O | N | N | N |

-continued

| Coil Excitation | | | | | | | |
|---|---|---|---|---|---|---|---|
| 301.25 | S | S | S | S | N | N | N |
| 301.50 | S | S | S | S | N | N | N |
| 301.75 | S | S | S | S | N | N | N |
| 302.00 | S | S | S | S | N | N | N |
| 302.25 | S | S | S | S | N | N | N |
| 302.50 | S | S | S | S | N | N | N |
| 302.75 | S | S | S | S | N | N | N |
| 303.00 | S | S | S | S | N | N | N |
| 303.25 | S | S | S | S | O | N | N |
| 303.50 | S | S | S | S | S | N | N |
| 303.75 | S | S | S | S | S | N | N |
| 304.00 | S | S | S | S | S | N | N |
| 304.25 | O | S | S | S | S | N | N |
| 304.50 | N | S | S | S | S | N | N |
| 304.75 | N | S | S | S | S | N | N |
| 305.00 | N | S | S | S | S | N | N |
| 305.25 | N | S | S | S | S | N | N |
| 305.50 | N | S | S | S | S | O | N |
| 305.75 | N | S | S | S | S | S | N |
| 306.00 | N | S | S | S | S | S | N |
| 306.25 | N | S | S | S | S | S | N |
| 306.50 | N | O | S | S | S | S | N |
| 306.75 | N | N | S | S | S | S | N |
| 307.00 | N | N | S | S | S | S | N |
| 307.25 | N | N | S | S | S | S | N |
| 307.50 | N | N | S | S | S | S | N |
| 307.75 | N | N | S | S | S | S | O |
| 308.00 | N | N | S | S | S | S | S |
| 308.25 | N | N | S | S | S | S | S |
| 308.50 | N | N | S | S | S | S | S |
| 308.75 | N | N | O | S | S | S | S |
| 309.00 | N | N | N | S | S | S | S |
| 309.25 | N | N | N | S | S | S | S |
| 309.50 | N | N | N | S | S | S | S |
| 309.75 | N | N | N | S | S | S | S |
| 310.00 | N | N | N | S | S | S | S |
| 310.25 | N | N | N | S | S | S | S |
| 310.50 | N | N | N | S | S | S | S |
| 310.75 | N | N | N | S | S | S | S |
| 311.00 | N | N | N | O | S | S | S |
| 311.25 | N | N | N | N | S | S | S |
| 311.50 | N | N | N | N | S | S | S |
| 311.75 | N | N | N | N | S | S | S |

Page Row 26, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 312.00 | S | N | N | N | N | N | S | S | S | S | N | N | N | N | N | S | S |
| 312.25 | S | O | N | N | N | N | S | S | S | S | N | N | N | N | N | S | S |
| 312.50 | S | S | N | N | N | N | S | S | S | S | O | N | N | N | N | S | S |
| 312.75 | S | S | N | N | N | N | S | S | S | S | S | N | N | N | N | S | S |
| 313.00 | S | S | N | N | N | N | S | S | S | S | S | N | N | N | N | S | S |
| 313.25 | S | S | N | N | N | N | S | S | S | S | S | N | N | N | N | S | S |
| 313.50 | S | S | N | N | N | N | O | S | S | S | S | N | N | N | N | S | S |
| 313.75 | S | S | N | N | N | N | N | S | S | S | S | N | N | N | N | O | S |
| 314.00 | S | S | N | N | N | N | N | S | S | S | S | N | N | N | N | N | S |
| 314.25 | S | S | N | N | N | N | N | S | S | S | S | N | N | N | N | N | S |
| 314.50 | S | S | O | N | N | N | N | S | S | S | S | N | N | N | N | N | S |
| 314.75 | S | S | S | N | N | N | N | S | S | S | S | O | N | N | N | N | S |
| 315.00 | S | S | S | N | N | N | N | S | S | S | S | S | N | N | N | N | S |
| 315.25 | S | S | S | N | N | N | N | S | S | S | S | S | N | N | N | N | S |
| 315.50 | S | S | S | N | N | N | N | S | S | S | S | S | N | N | N | N | S |
| 315.75 | S | S | S | N | N | N | N | O | S | S | S | S | N | N | N | N | S |
| 316.00 | S | S | S | N | N | N | N | N | S | S | S | S | N | N | N | N | O |
| 316.25 | S | S | S | N | N | N | N | N | S | S | S | S | N | N | N | N | N |
| 316.50 | S | S | S | N | N | N | N | N | S | S | S | S | N | N | N | N | N |
| 316.75 | S | S | S | O | N | N | N | N | S | S | S | S | N | N | N | N | N |
| 317.00 | S | S | S | S | N | N | N | N | S | S | S | S | O | N | N | N | N |
| 317.25 | S | S | S | S | N | N | N | N | S | S | S | S | S | N | N | N | N |
| 317.50 | S | S | S | S | N | N | N | N | S | S | S | S | S | N | N | N | N |
| 317.75 | S | S | S | S | N | N | N | N | S | S | S | S | S | N | N | N | N |
| 318.00 | S | S | S | S | N | N | N | N | O | S | S | S | S | N | N | N | N |
| 318.25 | S | S | S | S | N | N | N | N | N | S | S | S | S | N | N | N | N |
| 318.50 | S | S | S | S | N | N | N | N | N | S | S | S | S | N | N | N | N |
| 318.75 | S | S | S | S | N | N | N | N | N | S | S | S | S | N | N | N | N |
| 319.00 | S | S | S | S | O | N | N | N | N | S | S | S | S | N | N | N | N |
| 319.25 | S | S | S | S | S | N | N | N | N | S | S | S | S | O | N | N | N |

-continued

| Coil Excitation | | | | | | | | | | | | | | | | | |
|---|---|---|---|---|---|---|---|---|---|---|---|---|---|---|---|---|---|
| 319.50 | S | S | S | S | S | N | N | N | N | S | S | S | S | S | N | N | N |
| 319.75 | S | S | S | S | S | N | N | N | N | S | S | S | S | S | N | N | N |
| 320.00 | O | S | S | S | S | N | N | N | N | S | S | S | S | S | N | N | N |
| 320.25 | N | S | S | S | S | N | N | N | N | O | S | S | S | S | N | N | N |
| 320.50 | N | S | S | S | S | N | N | N | N | N | S | S | S | S | N | N | N |
| 320.75 | N | S | S | S | S | N | N | N | N | N | S | S | S | S | N | N | N |
| 321.00 | N | S | S | S | S | N | N | N | N | N | S | S | S | S | N | N | N |
| 321.25 | N | S | S | S | S | O | N | N | N | N | S | S | S | S | N | N | N |
| 321.50 | N | S | S | S | S | S | N | N | N | N | S | S | S | S | O | N | N |
| 321.75 | N | S | S | S | S | S | N | N | N | N | S | S | S | S | S | N | N |
| 322.00 | N | S | S | S | S | S | N | N | N | N | S | S | S | S | S | N | N |
| 322.25 | N | O | S | S | S | S | N | N | N | N | S | S | S | S | S | N | N |
| 322.50 | N | N | S | S | S | S | N | N | N | N | O | S | S | S | S | N | N |
| 322.75 | N | N | S | S | S | S | N | N | N | N | N | S | S | S | S | N | N |
| 323.00 | N | N | S | S | S | S | N | N | N | N | N | S | S | S | S | N | N |
| 323.25 | N | N | S | S | S | S | N | N | N | N | N | S | S | S | S | N | N |
| 323.50 | N | N | S | S | S | S | O | N | N | N | N | S | S | S | S | N | N |
| 323.75 | N | N | S | S | S | S | S | N | N | N | N | S | S | S | S | O | N |

Page Row 27, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 312.00 | S | S | N | N | N | N | N | S | S | S | S | N | N | N | N | O | S |
| 312.25 | S | S | N | N | N | N | N | S | S | S | S | N | N | N | N | N | S |
| 312.50 | S | S | N | N | N | N | N | S | S | S | S | N | N | N | N | N | S |
| 312.75 | S | S | O | N | N | N | N | S | S | S | S | N | N | N | N | N | S |
| 313.00 | S | S | S | N | N | N | N | S | S | S | S | O | N | N | N | N | S |
| 313.25 | S | S | S | N | N | N | N | S | S | S | S | S | N | N | N | N | S |
| 313.50 | S | S | S | N | N | N | N | S | S | S | S | S | N | N | N | N | S |
| 313.75 | S | S | S | N | N | N | N | S | S | S | S | S | N | N | N | N | S |
| 314.00 | S | S | S | N | N | N | N | O | S | S | S | S | N | N | N | N | S |
| 314.25 | S | S | S | N | N | N | N | N | S | S | S | S | N | N | N | N | O |
| 314.50 | S | S | S | N | N | N | N | N | S | S | S | S | N | N | N | N | N |
| 314.75 | S | S | S | N | N | N | N | N | S | S | S | S | N | N | N | N | N |
| 315.00 | S | S | S | O | N | N | N | N | S | S | S | S | N | N | N | N | N |
| 315.25 | S | S | S | S | N | N | N | N | S | S | S | S | O | N | N | N | N |
| 315.50 | S | S | S | S | N | N | N | N | S | S | S | S | S | N | N | N | N |
| 315.75 | S | S | S | S | N | N | N | N | S | S | S | S | S | N | N | N | N |
| 316.00 | S | S | S | S | N | N | N | N | S | S | S | S | S | N | N | N | N |
| 316.25 | S | S | S | S | N | N | N | N | O | S | S | S | S | N | N | N | N |
| 316.50 | S | S | S | S | N | N | N | N | N | S | S | S | S | N | N | N | N |
| 316.75 | S | S | S | S | N | N | N | N | N | S | S | S | S | N | N | N | N |
| 317.00 | S | S | S | S | N | N | N | N | N | S | S | S | S | N | N | N | N |
| 317.25 | S | S | S | S | O | N | N | N | N | S | S | S | S | N | N | N | N |
| 317.50 | S | S | S | S | S | N | N | N | N | S | S | S | S | O | N | N | N |
| 317.75 | S | S | S | S | S | N | N | N | N | S | S | S | S | S | N | N | N |
| 318.00 | S | S | S | S | S | N | N | N | N | S | S | S | S | S | N | N | N |
| 318.25 | O | S | S | S | S | N | N | N | N | S | S | S | S | S | N | N | N |
| 318.50 | N | S | S | S | S | N | N | N | N | O | S | S | S | S | N | N | N |
| 318.75 | N | S | S | S | S | N | N | N | N | N | S | S | S | S | N | N | N |
| 319.00 | N | S | S | S | S | N | N | N | N | N | S | S | S | S | N | N | N |
| 319.25 | N | S | S | S | S | N | N | N | N | N | S | S | S | S | N | N | N |
| 319.50 | N | S | S | S | S | O | N | N | N | N | S | S | S | S | N | N | N |
| 319.75 | N | S | S | S | S | S | N | N | N | N | S | S | S | S | O | N | N |
| 320.00 | N | S | S | S | S | S | N | N | N | N | S | S | S | S | S | N | N |
| 320.25 | N | S | S | S | S | S | N | N | N | N | S | S | S | S | S | N | N |
| 320.50 | N | O | S | S | S | S | N | N | N | N | S | S | S | S | S | N | N |
| 320.75 | N | N | S | S | S | S | N | N | N | N | O | S | S | S | S | N | N |
| 321.00 | N | N | S | S | S | S | N | N | N | N | N | S | S | S | S | N | N |
| 321.25 | N | N | S | S | S | S | N | N | N | N | N | S | S | S | S | N | N |
| 321.50 | N | N | S | S | S | S | N | N | N | N | N | S | S | S | S | N | N |
| 321.75 | N | N | S | S | S | S | O | N | N | N | N | S | S | S | S | N | N |
| 322.00 | N | N | S | S | S | S | S | N | N | N | N | S | S | S | S | O | N |
| 322.25 | N | N | S | S | S | S | S | N | N | N | N | S | S | S | S | S | N |
| 322.50 | N | N | S | S | S | S | S | N | N | N | N | S | S | S | S | S | N |
| 322.75 | N | N | O | S | S | S | S | N | N | N | N | S | S | S | S | S | N |
| 323.00 | N | N | N | S | S | S | S | N | N | N | N | O | S | S | S | S | N |
| 323.25 | N | N | N | S | S | S | S | N | N | N | N | N | S | S | S | S | N |
| 323.50 | N | N | N | S | S | S | S | N | N | N | N | N | S | S | S | S | N |
| 323.75 | N | N | N | S | S | S | S | N | N | N | N | N | S | S | S | S | N |

Page Row 27, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 312.00 | S | S | S | N | N | N | N | S | S | S | S | S | N | N | N | N | S |
| 312.25 | S | S | S | N | N | N | N | O | S | S | S | S | N | N | N | N | S |
| 312.50 | S | S | S | N | N | N | N | N | S | S | S | S | N | N | N | N | O |

-continued

| Coil Excitation | | | | | | | | | | | | | | | | | |
|---|---|---|---|---|---|---|---|---|---|---|---|---|---|---|---|---|---|
| 312.75 | S | S | S | N | N | N | N | N | S | S | S | S | N | N | N | N | N |
| 313.00 | S | S | S | N | N | N | N | N | S | S | S | S | N | N | N | N | N |
| 313.25 | S | S | S | O | N | N | N | N | S | S | S | S | N | N | N | N | N |
| 313.50 | S | S | S | S | N | N | N | N | S | S | S | S | O | N | N | N | N |
| 313.75 | S | S | S | S | N | N | N | N | S | S | S | S | S | N | N | N | N |
| 314.00 | S | S | S | S | N | N | N | N | S | S | S | S | S | N | N | N | N |
| 314.25 | S | S | S | S | N | N | N | N | S | S | S | S | S | N | N | N | N |
| 314.50 | S | S | S | S | N | N | N | N | O | S | S | S | S | N | N | N | N |
| 314.75 | S | S | S | S | N | N | N | N | N | S | S | S | S | N | N | N | N |
| 315.00 | S | S | S | S | N | N | N | N | N | S | S | S | S | N | N | N | N |
| 315.25 | S | S | S | S | N | N | N | N | N | S | S | S | S | N | N | N | N |
| 315.50 | S | S | S | S | O | N | N | N | N | S | S | S | S | N | N | N | N |
| 315.75 | S | S | S | S | S | N | N | N | N | S | S | S | S | O | N | N | N |
| 316.00 | S | S | S | S | S | N | N | N | N | S | S | S | S | S | N | N | N |
| 316.25 | S | S | S | S | S | N | N | N | N | S | S | S | S | S | N | N | N |
| 316.50 | O | S | S | S | S | N | N | N | N | S | S | S | S | S | N | N | N |
| 316.75 | N | S | S | S | S | N | N | N | N | O | S | S | S | S | N | N | N |
| 317.00 | N | S | S | S | S | N | N | N | N | N | S | S | S | S | N | N | N |
| 317.25 | N | S | S | S | S | N | N | N | N | N | S | S | S | S | N | N | N |
| 317.50 | N | S | S | S | S | N | N | N | N | N | S | S | S | S | N | N | N |
| 317.75 | N | S | S | S | S | O | N | N | N | N | S | S | S | S | N | N | N |
| 318.00 | N | S | S | S | S | S | N | N | N | N | S | S | S | S | O | N | N |
| 318.25 | N | S | S | S | S | S | N | N | N | N | S | S | S | S | S | N | N |
| 318.50 | N | S | S | S | S | S | N | N | N | N | S | S | S | S | S | N | N |
| 318.75 | N | O | S | S | S | S | N | N | N | N | S | S | S | S | S | N | N |
| 319.00 | N | N | S | S | S | S | N | N | N | N | O | S | S | S | S | N | N |
| 319.25 | N | N | S | S | S | S | N | N | N | N | N | S | S | S | S | N | N |
| 319.50 | N | N | S | S | S | S | N | N | N | N | N | S | S | S | S | N | N |
| 319.75 | N | N | S | S | S | S | N | N | N | N | N | S | S | S | S | N | N |
| 320.00 | N | N | S | S | S | S | O | N | N | N | N | S | S | S | S | N | N |
| 320.25 | N | N | S | S | S | S | S | N | N | N | N | S | S | S | S | O | N |
| 320.50 | N | N | S | S | S | S | S | N | N | N | N | S | S | S | S | S | N |
| 320.75 | N | N | S | S | S | S | S | N | N | N | N | S | S | S | S | S | N |
| 321.00 | N | N | O | S | S | S | S | N | N | N | N | S | S | S | S | S | N |
| 321.25 | N | N | N | S | S | S | S | N | N | N | N | O | S | S | S | S | N |
| 321.50 | N | N | N | S | S | S | S | N | N | N | N | N | S | S | S | S | N |
| 321.75 | N | N | N | S | S | S | S | N | N | N | N | N | S | S | S | S | N |
| 322.00 | N | N | N | S | S | S | S | N | N | N | N | N | S | S | S | S | N |
| 322.25 | N | N | N | S | S | S | S | O | N | N | N | N | S | S | S | S | N |
| 322.50 | N | N | N | S | S | S | S | S | N | N | N | N | S | S | S | S | O |
| 322.75 | N | N | N | S | S | S | S | S | N | N | N | N | S | S | S | S | S |
| 323.00 | N | N | N | S | S | S | S | S | N | N | N | N | S | S | S | S | S |
| 323.25 | N | N | N | O | S | S | S | S | N | N | N | N | S | S | S | S | S |
| 323.50 | N | N | N | N | S | S | S | S | N | N | N | N | O | S | S | S | S |
| 323.75 | N | N | N | N | S | S | S | S | N | N | N | N | N | S | S | S | S |

Page Row 27, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 312.00 | S | S | S | S | N | N | N | N | S | S | S | S | S | N | N | N | N |
| 312.25 | S | S | S | S | N | N | N | N | S | S | S | S | S | N | N | N | N |
| 312.50 | S | S | S | S | N | N | N | N | S | S | S | S | S | N | N | N | N |
| 312.75 | S | S | S | S | N | N | N | N | O | S | S | S | S | N | N | N | N |
| 313.00 | S | S | S | S | N | N | N | N | N | S | S | S | S | N | N | N | N |
| 313.25 | S | S | S | S | N | N | N | N | N | S | S | S | S | N | N | N | N |
| 313.50 | S | S | S | S | N | N | N | N | N | S | S | S | S | N | N | N | N |
| 313.75 | S | S | S | S | O | N | N | N | N | S | S | S | S | N | N | N | N |
| 314.00 | S | S | S | S | S | N | N | N | N | S | S | S | S | O | N | N | N |
| 314.25 | S | S | S | S | S | N | N | N | N | S | S | S | S | S | N | N | N |
| 314.50 | S | S | S | S | S | N | N | N | N | S | S | S | S | S | N | N | N |
| 314.75 | O | S | S | S | S | N | N | N | N | S | S | S | S | S | N | N | N |
| 315.00 | N | S | S | S | S | N | N | N | N | O | S | S | S | S | N | N | N |
| 315.25 | N | S | S | S | S | N | N | N | N | N | S | S | S | S | N | N | N |
| 315.50 | N | S | S | S | S | N | N | N | N | N | S | S | S | S | N | N | N |
| 315.75 | N | S | S | S | S | N | N | N | N | N | S | S | S | S | N | N | N |
| 316.00 | N | S | S | S | S | O | N | N | N | N | S | S | S | S | N | N | N |
| 316.25 | N | S | S | S | S | S | N | N | N | N | S | S | S | S | O | N | N |
| 316.50 | N | S | S | S | S | S | N | N | N | N | S | S | S | S | S | N | N |
| 316.75 | N | S | S | S | S | S | N | N | N | N | S | S | S | S | S | N | N |
| 317.00 | N | O | S | S | S | S | N | N | N | N | S | S | S | S | S | N | N |
| 317.25 | N | N | S | S | S | S | N | N | N | N | O | S | S | S | S | N | N |
| 317.50 | N | N | S | S | S | S | N | N | N | N | N | S | S | S | S | N | N |
| 317.75 | N | N | S | S | S | S | N | N | N | N | N | S | S | S | S | N | N |
| 318.00 | N | N | S | S | S | S | N | N | N | N | N | S | S | S | S | N | N |
| 318.25 | N | N | S | S | S | S | O | N | N | N | N | S | S | S | S | N | N |
| 318.50 | N | N | S | S | S | S | S | N | N | N | N | S | S | S | S | O | N |
| 318.75 | N | N | S | S | S | S | S | N | N | N | N | S | S | S | S | S | N |

-continued

| Coil Excitation | | | | | | | | | | | | | | | | | |
|---|---|---|---|---|---|---|---|---|---|---|---|---|---|---|---|---|---|
| 319.00 | N | N | S | S | S | S | S | N | N | N | N | S | S | S | S | S | N |
| 319.25 | N | N | O | S | S | S | S | N | N | N | N | S | S | S | S | S | N |
| 319.50 | N | N | N | S | S | S | S | N | N | N | N | O | S | S | S | S | N |
| 319.75 | N | N | N | S | S | S | S | N | N | N | N | N | S | S | S | S | N |
| 320.00 | N | N | N | S | S | S | S | N | N | N | N | N | S | S | S | S | N |
| 320.25 | N | N | N | S | S | S | S | N | N | N | N | N | S | S | S | S | N |
| 320.50 | N | N | N | S | S | S | S | O | N | N | N | N | S | S | S | S | N |
| 320.75 | N | N | N | S | S | S | S | S | N | N | N | N | S | S | S | S | O |
| 321.00 | N | N | N | S | S | S | S | S | N | N | N | N | S | S | S | S | S |
| 321.25 | N | N | N | S | S | S | S | S | N | N | N | N | S | S | S | S | S |
| 321.50 | N | N | N | O | S | S | S | S | N | N | N | N | S | S | S | S | S |
| 321.75 | N | N | N | N | S | S | S | S | N | N | N | N | O | S | S | S | S |
| 322.00 | N | N | N | N | S | S | S | S | N | N | N | N | N | S | S | S | S |
| 322.25 | N | N | N | N | S | S | S | S | N | N | N | N | N | S | S | S | S |
| 322.50 | N | N | N | N | S | S | S | S | N | N | N | N | N | S | S | S | S |
| 322.75 | N | N | N | N | S | S | S | S | O | N | N | N | N | S | S | S | S |
| 323.00 | N | N | N | N | S | S | S | S | S | N | N | N | N | S | S | S | S |
| 323.25 | N | N | N | N | S | S | S | S | S | N | N | N | N | S | S | S | S |
| 323.50 | N | N | N | N | S | S | S | S | S | N | N | N | N | S | S | S | S |
| 323.75 | N | N | N | N | O | S | S | S | S | N | N | N | N | S | S | S | S |

Page Row 27, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 312.00 | S | S | S | S | O | N | N | N | N | S | S | S | S | N | N | N | N |
| 312.25 | S | S | S | S | S | N | N | N | N | S | S | S | S | O | N | N | N |
| 312.50 | S | S | S | S | S | N | N | N | N | S | S | S | S | S | N | N | N |
| 312.75 | S | S | S | S | S | N | N | N | N | S | S | S | S | S | N | N | N |
| 313.00 | O | S | S | S | S | N | N | N | N | S | S | S | S | S | N | N | N |
| 313.25 | N | S | S | S | S | N | N | N | N | O | S | S | S | S | N | N | N |
| 313.50 | N | S | S | S | S | N | N | N | N | N | S | S | S | S | N | N | N |
| 313.75 | N | S | S | S | S | N | N | N | N | N | S | S | S | S | N | N | N |
| 314.00 | N | S | S | S | S | N | N | N | N | N | S | S | S | S | N | N | N |
| 314.25 | N | S | S | S | S | O | N | N | N | N | S | S | S | S | N | N | N |
| 314.50 | N | S | S | S | S | S | N | N | N | N | S | S | S | S | O | N | N |
| 314.75 | N | S | S | S | S | S | N | N | N | N | S | S | S | S | S | N | N |
| 315.00 | N | S | S | S | S | S | N | N | N | N | S | S | S | S | S | N | N |
| 315.25 | N | O | S | S | S | S | N | N | N | N | S | S | S | S | S | N | N |
| 315.50 | N | N | S | S | S | S | N | N | N | N | O | S | S | S | S | N | N |
| 315.75 | N | N | S | S | S | S | N | N | N | N | N | S | S | S | S | N | N |
| 316.00 | N | N | S | S | S | S | N | N | N | N | N | S | S | S | S | N | N |
| 316.25 | N | N | S | S | S | S | N | N | N | N | N | S | S | S | S | N | N |
| 316.50 | N | N | S | S | S | S | O | N | N | N | N | S | S | S | S | N | N |
| 316.75 | N | N | S | S | S | S | S | N | N | N | N | S | S | S | S | O | N |
| 317.00 | N | N | S | S | S | S | S | N | N | N | N | S | S | S | S | S | N |
| 317.25 | N | N | S | S | S | S | S | N | N | N | N | S | S | S | S | S | N |
| 317.50 | N | N | O | S | S | S | S | N | N | N | N | S | S | S | S | S | N |
| 317.75 | N | N | N | S | S | S | S | N | N | N | N | O | S | S | S | S | N |
| 318.00 | N | N | N | S | S | S | S | N | N | N | N | N | S | S | S | S | N |
| 318.25 | N | N | N | S | S | S | S | N | N | N | N | N | S | S | S | S | N |
| 318.50 | N | N | N | S | S | S | S | N | N | N | N | N | S | S | S | S | N |
| 318.75 | N | N | N | S | S | S | S | O | N | N | N | N | S | S | S | S | N |
| 319.00 | N | N | N | S | S | S | S | S | N | N | N | N | S | S | S | S | O |
| 319.25 | N | N | N | S | S | S | S | S | N | N | N | N | S | S | S | S | S |
| 319.50 | N | N | N | S | S | S | S | S | N | N | N | N | S | S | S | S | S |
| 319.75 | N | N | N | O | S | S | S | S | N | N | N | N | S | S | S | S | S |
| 320.00 | N | N | N | N | S | S | S | S | N | N | N | N | O | S | S | S | S |
| 320.25 | N | N | N | N | S | S | S | S | N | N | N | N | N | S | S | S | S |
| 320.50 | N | N | N | N | S | S | S | S | N | N | N | N | N | S | S | S | S |
| 320.75 | N | N | N | N | S | S | S | S | N | N | N | N | N | S | S | S | S |
| 321.00 | N | N | N | N | S | S | S | S | O | N | N | N | N | S | S | S | S |
| 321.25 | N | N | N | N | S | S | S | S | S | N | N | N | N | S | S | S | S |
| 321.50 | N | N | N | N | S | S | S | S | S | N | N | N | N | S | S | S | S |
| 321.75 | N | N | N | N | S | S | S | S | S | N | N | N | N | S | S | S | S |
| 322.00 | N | N | N | N | O | S | S | S | S | N | N | N | N | S | S | S | S |
| 322.25 | N | N | N | N | N | S | S | S | S | N | N | N | N | O | S | S | S |
| 322.50 | N | N | N | N | N | S | S | S | S | N | N | N | N | N | S | S | S |
| 322.75 | N | N | N | N | N | S | S | S | S | N | N | N | N | N | S | S | S |
| 323.00 | O | N | N | N | N | S | S | S | S | N | N | N | N | N | S | S | S |
| 323.25 | S | N | N | N | N | S | S | S | S | O | N | N | N | N | S | S | S |
| 323.50 | S | N | N | N | N | S | S | S | S | S | N | N | N | N | S | S | S |
| 323.75 | S | N | N | N | N | S | S | S | S | S | N | N | N | N | S | S | S |

Page Row 27, Page Column 5

-continued

| Coil Excitation | | | | | | | | | | | | | | | | | |
|---|---|---|---|---|---|---|---|---|---|---|---|---|---|---|---|---|---|
| Coil | 86 | 87 | 88 | 89 | 90 | 91 | 92 | 93 | 94 | 95 | 96 | 97 | 98 | 99 | 100 | 101 | 102 |
| 312.00 | N | S | S | S | S | N | N | N | N | N | S | S | S | S | N | N | N |
| 312.25 | N | S | S | S | S | N | N | N | N | N | S | S | S | S | N | N | N |
| 312.50 | N | S | S | S | S | O | N | N | N | N | S | S | S | S | N | N | N |
| 312.75 | N | S | S | S | S | S | N | N | N | N | S | S | S | S | O | N | N |
| 313.00 | N | S | S | S | S | S | N | N | N | N | S | S | S | S | S | N | N |
| 313.25 | N | S | S | S | S | S | N | N | N | N | S | S | S | S | S | N | N |
| 313.50 | N | O | S | S | S | S | N | N | N | N | S | S | S | S | S | N | N |
| 313.75 | N | N | S | S | S | S | N | N | N | N | O | S | S | S | S | N | N |
| 314.00 | N | N | S | S | S | S | N | N | N | N | N | S | S | S | S | N | N |
| 314.25 | N | N | S | S | S | S | N | N | N | N | N | S | S | S | S | N | N |
| 314.50 | N | N | S | S | S | S | N | N | N | N | N | S | S | S | S | N | N |
| 314.75 | N | N | S | S | S | S | O | N | N | N | N | S | S | S | S | N | N |
| 315.00 | N | N | S | S | S | S | S | N | N | N | N | S | S | S | S | O | N |
| 315.25 | N | N | S | S | S | S | S | N | N | N | N | S | S | S | S | S | N |
| 315.50 | N | N | S | S | S | S | S | N | N | N | N | S | S | S | S | S | N |
| 315.75 | N | N | O | S | S | S | S | N | N | N | N | S | S | S | S | S | N |
| 316.00 | N | N | N | S | S | S | S | N | N | N | N | O | S | S | S | S | N |
| 316.25 | N | N | N | S | S | S | S | N | N | N | N | N | S | S | S | S | N |
| 316.50 | N | N | N | S | S | S | S | N | N | N | N | N | S | S | S | S | N |
| 316.75 | N | N | N | S | S | S | S | N | N | N | N | N | S | S | S | S | N |
| 317.00 | N | N | N | S | S | S | S | O | N | N | N | N | S | S | S | S | N |
| 317.25 | N | N | N | S | S | S | S | S | N | N | N | N | S | S | S | S | O |
| 317.50 | N | N | N | S | S | S | S | S | N | N | N | N | S | S | S | S | S |
| 317.75 | N | N | N | S | S | S | S | S | N | N | N | N | S | S | S | S | S |
| 318.00 | N | N | N | O | S | S | S | S | N | N | N | N | S | S | S | S | S |
| 318.25 | N | N | N | N | S | S | S | S | N | N | N | N | O | S | S | S | S |
| 318.50 | N | N | N | N | S | S | S | S | N | N | N | N | N | S | S | S | S |
| 318.75 | N | N | N | N | S | S | S | S | N | N | N | N | N | S | S | S | S |
| 319.00 | N | N | N | N | S | S | S | S | N | N | N | N | N | S | S | S | S |
| 319.25 | N | N | N | N | S | S | S | S | O | N | N | N | N | S | S | S | S |
| 319.50 | N | N | N | N | S | S | S | S | S | N | N | N | N | S | S | S | S |
| 319.75 | N | N | N | N | S | S | S | S | S | N | N | N | N | S | S | S | S |
| 320.00 | N | N | N | N | S | S | S | S | S | N | N | N | N | S | S | S | S |
| 320.25 | N | N | N | N | O | S | S | S | S | N | N | N | N | S | S | S | S |
| 320.50 | N | N | N | N | N | S | S | S | S | N | N | N | N | O | S | S | S |
| 320.75 | N | N | N | N | N | S | S | S | S | N | N | N | N | N | S | S | S |
| 321.00 | N | N | N | N | N | S | S | S | S | N | N | N | N | N | S | S | S |
| 321.25 | O | N | N | N | N | S | S | S | S | N | N | N | N | N | S | S | S |
| 321.50 | S | N | N | N | N | S | S | S | S | O | N | N | N | N | S | S | S |
| 321.75 | S | N | N | N | N | S | S | S | S | S | N | N | N | N | S | S | S |
| 322.00 | S | N | N | N | N | S | S | S | S | S | N | N | N | N | S | S | S |
| 322.25 | S | N | N | N | N | S | S | S | S | S | N | N | N | N | S | S | S |
| 322.50 | S | N | N | N | N | O | S | S | S | S | N | N | N | N | S | S | S |
| 322.75 | S | N | N | N | N | N | S | S | S | S | N | N | N | N | O | S | S |
| 323.00 | S | N | N | N | N | N | S | S | S | S | N | N | N | N | N | S | S |
| 323.25 | S | N | N | N | N | N | S | S | S | S | N | N | N | N | N | S | S |
| 323.50 | S | O | N | N | N | N | S | S | S | S | N | N | N | N | N | S | S |
| 323.75 | S | S | N | N | N | N | S | S | S | S | O | N | N | N | N | S | S |

Page Row 27, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 312.00 | N | N | S | S | S | S | N | N | N | N | O | S | S | S | S | N | N |
| 312.25 | N | N | S | S | S | S | N | N | N | N | N | S | S | S | S | N | N |
| 312.50 | N | N | S | S | S | S | N | N | N | N | N | S | S | S | S | N | N |
| 312.75 | N | N | S | S | S | S | N | N | N | N | N | S | S | S | S | N | N |
| 313.00 | N | N | S | S | S | S | O | N | N | N | N | S | S | S | S | N | N |
| 313.25 | N | N | S | S | S | S | S | N | N | N | N | S | S | S | S | O | N |
| 313.50 | N | N | S | S | S | S | S | N | N | N | N | S | S | S | S | S | N |
| 313.75 | N | N | S | S | S | S | S | N | N | N | N | S | S | S | S | S | N |
| 314.00 | N | N | O | S | S | S | S | N | N | N | N | S | S | S | S | S | N |
| 314.25 | N | N | N | S | S | S | S | N | N | N | N | O | S | S | S | S | N |
| 314.50 | N | N | N | S | S | S | S | N | N | N | N | N | S | S | S | S | N |
| 314.75 | N | N | N | S | S | S | S | N | N | N | N | N | S | S | S | S | N |
| 315.00 | N | N | N | S | S | S | S | N | N | N | N | N | S | S | S | S | N |
| 315.25 | N | N | N | S | S | S | S | O | N | N | N | N | S | S | S | S | N |
| 315.50 | N | N | N | S | S | S | S | S | N | N | N | N | S | S | S | S | O |
| 315.75 | N | N | N | S | S | S | S | S | N | N | N | N | S | S | S | S | S |
| 316.00 | N | N | N | S | S | S | S | S | N | N | N | N | S | S | S | S | S |
| 316.25 | N | N | N | O | S | S | S | S | N | N | N | N | S | S | S | S | S |
| 316.50 | N | N | N | N | S | S | S | S | N | N | N | N | O | S | S | S | S |
| 316.75 | N | N | N | N | S | S | S | S | N | N | N | N | N | S | S | S | S |
| 317.00 | N | N | N | N | S | S | S | S | N | N | N | N | N | S | S | S | S |
| 317.25 | N | N | N | N | S | S | S | S | N | N | N | N | N | S | S | S | S |
| 317.50 | N | N | N | N | S | S | S | S | O | N | N | N | N | S | S | S | S |

-continued

| Coil Excitation | | | | | | | | | | | | | | | | | |
|---|---|---|---|---|---|---|---|---|---|---|---|---|---|---|---|---|---|
| 317.75 | N | N | N | N | S | S | S | S | S | N | N | N | N | S | S | S | S |
| 318.00 | N | N | N | N | S | S | S | S | S | N | N | N | N | S | S | S | S |
| 318.25 | N | N | N | N | S | S | S | S | S | N | N | N | N | S | S | S | S |
| 318.50 | N | N | N | N | O | S | S | S | S | N | N | N | N | S | S | S | S |
| 318.75 | N | N | N | N | N | S | S | S | S | N | N | N | N | O | S | S | S |
| 319.00 | N | N | N | N | N | S | S | S | S | N | N | N | N | N | S | S | S |
| 319.25 | N | N | N | N | N | S | S | S | S | N | N | N | N | N | S | S | S |
| 319.50 | O | N | N | N | N | S | S | S | S | N | N | N | N | N | S | S | S |
| 319.75 | S | N | N | N | N | S | S | S | S | O | N | N | N | N | S | S | S |
| 320.00 | S | N | N | N | N | S | S | S | S | S | N | N | N | N | S | S | S |
| 320.25 | S | N | N | N | N | S | S | S | S | S | N | N | N | N | S | S | S |
| 320.50 | S | N | N | N | N | S | S | S | S | S | N | N | N | N | S | S | S |
| 320.75 | S | N | N | N | N | O | S | S | S | S | N | N | N | N | S | S | S |
| 321.00 | S | N | N | N | N | N | S | S | S | S | N | N | N | N | O | S | S |
| 321.25 | S | N | N | N | N | N | S | S | S | S | N | N | N | N | N | S | S |
| 321.50 | S | N | N | N | N | N | S | S | S | S | N | N | N | N | N | S | S |
| 321.75 | S | O | N | N | N | N | S | S | S | S | N | N | N | N | N | S | S |
| 322.00 | S | S | N | N | N | N | S | S | S | S | O | N | N | N | N | S | S |
| 322.25 | S | S | N | N | N | N | S | S | S | S | S | N | N | N | N | S | S |
| 322.50 | S | S | N | N | N | N | S | S | S | S | S | N | N | N | N | S | S |
| 322.75 | S | S | N | N | N | N | S | S | S | S | S | N | N | N | N | S | S |
| 323.00 | S | S | N | N | N | N | O | S | S | S | S | N | N | N | N | S | S |
| 323.25 | S | S | N | N | N | N | N | S | S | S | S | N | N | N | N | O | S |
| 323.50 | S | S | N | N | N | N | N | S | S | S | S | N | N | N | N | N | S |
| 323.75 | S | S | N | N | N | N | N | S | S | S | S | N | N | N | N | N | S |

Page Row 27, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 312.00 | N | N | S | S | S | S | S | N | N | N | N | S | S | S | S | S | N |
| 312.25 | N | N | O | S | S | S | S | N | N | N | N | S | S | S | S | S | N |
| 312.50 | N | N | N | S | S | S | S | N | N | N | N | O | S | S | S | S | N |
| 312.75 | N | N | N | S | S | S | S | N | N | N | N | N | S | S | S | S | N |
| 313.00 | N | N | N | S | S | S | S | N | N | N | N | N | S | S | S | S | N |
| 313.25 | N | N | N | S | S | S | S | N | N | N | N | N | S | S | S | S | N |
| 313.50 | N | N | N | S | S | S | S | O | N | N | N | N | S | S | S | S | N |
| 313.75 | N | N | N | S | S | S | S | S | N | N | N | N | S | S | S | S | O |
| 314.00 | N | N | N | S | S | S | S | S | N | N | N | N | S | S | S | S | S |
| 314.25 | N | N | N | S | S | S | S | S | N | N | N | N | S | S | S | S | S |
| 314.50 | N | N | N | O | S | S | S | S | N | N | N | N | S | S | S | S | S |
| 314.75 | N | N | N | N | S | S | S | S | N | N | N | N | O | S | S | S | S |
| 315.00 | N | N | N | N | S | S | S | S | N | N | N | N | N | S | S | S | S |
| 315.25 | N | N | N | N | S | S | S | S | N | N | N | N | N | S | S | S | S |
| 315.50 | N | N | N | N | S | S | S | S | N | N | N | N | N | S | S | S | S |
| 315.75 | N | N | N | N | S | S | S | S | O | N | N | N | N | S | S | S | S |
| 316.00 | N | N | N | N | S | S | S | S | S | N | N | N | N | S | S | S | S |
| 316.25 | N | N | N | N | S | S | S | S | S | N | N | N | N | S | S | S | S |
| 316.50 | N | N | N | N | S | S | S | S | S | N | N | N | N | S | S | S | S |
| 316.75 | N | N | N | N | O | S | S | S | S | N | N | N | N | S | S | S | S |
| 317.00 | N | N | N | N | N | S | S | S | S | N | N | N | N | O | S | S | S |
| 317.25 | N | N | N | N | N | S | S | S | S | N | N | N | N | N | S | S | S |
| 317.50 | N | N | N | N | N | S | S | S | S | N | N | N | N | N | S | S | S |
| 317.75 | O | N | N | N | N | S | S | S | S | N | N | N | N | N | S | S | S |
| 318.00 | S | N | N | N | N | S | S | S | S | O | N | N | N | N | S | S | S |
| 318.25 | S | N | N | N | N | S | S | S | S | S | N | N | N | N | S | S | S |
| 318.50 | S | N | N | N | N | S | S | S | S | S | N | N | N | N | S | S | S |
| 318.75 | S | N | N | N | N | S | S | S | S | S | N | N | N | N | S | S | S |
| 319.00 | S | N | N | N | N | O | S | S | S | S | N | N | N | N | S | S | S |
| 319.25 | S | N | N | N | N | N | S | S | S | S | N | N | N | N | O | S | S |
| 319.50 | S | N | N | N | N | N | S | S | S | S | N | N | N | N | N | S | S |
| 319.75 | S | N | N | N | N | N | S | S | S | S | N | N | N | N | N | S | S |
| 320.00 | S | O | N | N | N | N | S | S | S | S | N | N | N | N | N | S | S |
| 320.25 | S | S | N | N | N | N | S | S | S | S | O | N | N | N | N | S | S |
| 320.50 | S | S | N | N | N | N | S | S | S | S | S | N | N | N | N | S | S |
| 320.75 | S | S | N | N | N | N | S | S | S | S | S | N | N | N | N | S | S |
| 321.00 | S | S | N | N | N | N | S | S | S | S | S | N | N | N | N | S | S |
| 321.25 | S | S | N | N | N | N | O | S | S | S | S | N | N | N | N | S | S |
| 321.50 | S | S | N | N | N | N | N | S | S | S | S | N | N | N | N | O | S |
| 321.75 | S | S | N | N | N | N | N | S | S | S | S | N | N | N | N | N | S |
| 322.00 | S | S | N | N | N | N | N | S | S | S | S | N | N | N | N | N | S |
| 322.25 | S | S | O | N | N | N | N | S | S | S | S | N | N | N | N | N | S |
| 322.50 | S | S | S | N | N | N | N | S | S | S | S | O | N | N | N | N | S |
| 322.75 | S | S | S | N | N | N | N | S | S | S | S | S | N | N | N | N | S |
| 323.00 | S | S | S | N | N | N | N | S | S | S | S | S | N | N | N | N | S |
| 323.25 | S | S | S | N | N | N | N | S | S | S | S | S | N | N | N | N | S |

-continued

Coil Excitation

| | | | | | | | | | | | | | | | | | |
|---|---|---|---|---|---|---|---|---|---|---|---|---|---|---|---|---|---|
| 323.50 | S | S | S | N | N | N | N | O | S | S | S | S | N | N | N | N | S |
| 323.75 | S | S | S | N | N | N | N | N | S | S | S | S | N | N | N | N | O |

Page Row 27, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 312.00 | N | N | N | S | S | S | S | S | N | N | N | N | S | S | S | S | O |
| 312.25 | N | N | N | S | S | S | S | S | N | N | N | N | S | S | S | S | S |
| 312.50 | N | N | N | S | S | S | S | S | N | N | N | N | S | S | S | S | S |
| 312.75 | N | N | N | O | S | S | S | S | N | N | N | N | S | S | S | S | S |
| 313.00 | N | N | N | N | S | S | S | S | N | N | N | N | O | S | S | S | S |
| 313.25 | N | N | N | N | S | S | S | S | N | N | N | N | N | S | S | S | S |
| 313.50 | N | N | N | N | S | S | S | S | N | N | N | N | N | S | S | S | S |
| 313.75 | N | N | N | N | S | S | S | S | N | N | N | N | N | S | S | S | S |
| 314.00 | N | N | N | N | S | S | S | S | O | N | N | N | N | S | S | S | S |
| 314.25 | N | N | N | N | S | S | S | S | S | N | N | N | N | S | S | S | S |
| 314.50 | N | N | N | N | S | S | S | S | S | N | N | N | N | S | S | S | S |
| 314.75 | N | N | N | N | S | S | S | S | S | N | N | N | N | S | S | S | S |
| 315.00 | N | N | N | N | O | S | S | S | S | N | N | N | N | S | S | S | S |
| 315.25 | N | N | N | N | N | S | S | S | S | N | N | N | N | O | S | S | S |
| 315.50 | N | N | N | N | N | S | S | S | S | N | N | N | N | N | S | S | S |
| 315.75 | N | N | N | N | N | S | S | S | S | N | N | N | N | N | S | S | S |
| 316.00 | O | N | N | N | N | S | S | S | S | N | N | N | N | N | S | S | S |
| 316.25 | S | N | N | N | N | S | S | S | S | O | N | N | N | N | S | S | S |
| 316.50 | S | N | N | N | N | S | S | S | S | S | N | N | N | N | S | S | S |
| 316.75 | S | N | N | N | N | S | S | S | S | S | N | N | N | N | S | S | S |
| 317.00 | S | N | N | N | N | S | S | S | S | S | N | N | N | N | S | S | S |
| 317.25 | S | N | N | N | N | O | S | S | S | S | N | N | N | N | S | S | S |
| 317.50 | S | N | N | N | N | N | S | S | S | S | N | N | N | N | O | S | S |
| 317.75 | S | N | N | N | N | N | S | S | S | S | N | N | N | N | N | S | S |
| 318.00 | S | N | N | N | N | N | S | S | S | S | N | N | N | N | N | S | S |
| 318.25 | S | O | N | N | N | N | S | S | S | S | N | N | N | N | N | S | S |
| 318.50 | S | S | N | N | N | N | S | S | S | S | O | N | N | N | N | S | S |
| 318.75 | S | S | N | N | N | N | S | S | S | S | S | N | N | N | N | S | S |
| 319.00 | S | S | N | N | N | N | S | S | S | S | S | N | N | N | N | S | S |
| 319.25 | S | S | N | N | N | N | S | S | S | S | S | N | N | N | N | S | S |
| 319.50 | S | S | N | N | N | N | O | S | S | S | S | N | N | N | N | S | S |
| 319.75 | S | S | N | N | N | N | N | S | S | S | S | N | N | N | N | O | S |
| 320.00 | S | S | N | N | N | N | N | S | S | S | S | N | N | N | N | N | S |
| 320.25 | S | S | N | N | N | N | N | S | S | S | S | N | N | N | N | N | S |
| 320.50 | S | S | O | N | N | N | N | S | S | S | S | N | N | N | N | N | S |
| 320.75 | S | S | S | N | N | N | N | S | S | S | S | O | N | N | N | N | S |
| 321.00 | S | S | S | N | N | N | N | S | S | S | S | S | N | N | N | N | S |
| 321.25 | S | S | S | N | N | N | N | S | S | S | S | S | N | N | N | N | S |
| 321.50 | S | S | S | N | N | N | N | S | S | S | S | S | N | N | N | N | S |
| 321.75 | S | S | S | N | N | N | N | O | S | S | S | S | N | N | N | N | S |
| 322.00 | S | S | S | N | N | N | N | N | S | S | S | S | N | N | N | N | O |
| 322.25 | S | S | S | N | N | N | N | N | S | S | S | S | N | N | N | N | N |
| 322.50 | S | S | S | N | N | N | N | N | S | S | S | S | N | N | N | N | N |
| 322.75 | S | S | S | O | N | N | N | N | S | S | S | S | N | N | N | N | N |
| 323.00 | S | S | S | S | N | N | N | N | S | S | S | S | O | N | N | N | N |
| 323.25 | S | S | S | S | N | N | N | N | S | S | S | S | S | N | N | N | N |
| 323.50 | S | S | S | S | N | N | N | N | S | S | S | S | S | N | N | N | N |
| 323.75 | S | S | S | S | N | N | N | N | S | S | S | S | S | N | N | N | N |

Page Row 27, Page Column 9

| Coil | 154 | 155 | 156 | 157 | 158 | 159 | 160 |
|---|---|---|---|---|---|---|---|
| 312.00 | N | N | N | N | S | S | S |
| 312.25 | N | N | N | N | S | S | S |
| 312.50 | N | N | N | N | S | S | S |
| 312.75 | N | N | N | N | S | S | S |
| 313.00 | N | N | N | N | S | S | S |
| 313.25 | N | N | N | N | O | S | S |
| 313.50 | N | N | N | N | N | S | S |
| 313.75 | N | N | N | N | N | S | S |
| 314.00 | N | N | N | N | N | S | S |
| 314.25 | O | N | N | N | N | S | S |
| 314.50 | S | N | N | N | N | S | S |
| 314.75 | S | N | N | N | N | S | S |
| 315.00 | S | N | N | N | N | S | S |
| 315.25 | S | N | N | N | N | S | S |
| 315.50 | S | N | N | N | N | O | S |
| 315.75 | S | N | N | N | N | N | S |
| 316.00 | S | N | N | N | N | N | S |
| 316.25 | S | N | N | N | N | N | S |
| 316.50 | S | O | N | N | N | N | S |

-continued

| Coil Excitation | | | | | | | |
|---|---|---|---|---|---|---|---|
| 316.75 | S | S | N | N | N | N | S |
| 317.00 | S | S | N | N | N | N | S |
| 317.25 | S | S | N | N | N | N | S |
| 317.50 | S | S | N | N | N | N | S |
| 317.75 | S | S | N | N | N | N | O |
| 318.00 | S | S | N | N | N | N | N |
| 318.25 | S | S | N | N | N | N | N |
| 318.50 | S | S | N | N | N | N | N |
| 318.75 | S | S | O | N | N | N | N |
| 319.00 | S | S | S | N | N | N | N |
| 319.25 | S | S | S | N | N | N | N |
| 319.50 | S | S | S | N | N | N | N |
| 319.75 | S | S | S | N | N | N | N |
| 320.00 | S | S | S | N | N | N | N |
| 320.25 | S | S | S | N | N | N | N |
| 320.50 | S | S | S | N | N | N | N |
| 320.75 | S | S | S | N | N | N | N |
| 321.00 | S | S | S | O | N | N | N |
| 321.25 | S | S | S | S | N | N | N |
| 321.50 | S | S | S | S | N | N | N |
| 321.75 | S | S | S | S | N | N | N |
| 322.00 | S | S | S | S | N | N | N |
| 322.25 | S | S | S | S | N | N | N |
| 322.50 | S | S | S | S | N | N | N |
| 322.75 | S | S | S | S | N | N | N |
| 323.00 | S | S | S | S | N | N | N |
| 323.25 | S | S | S | S | O | N | N |
| 323.50 | S | S | S | S | S | N | N |
| 323.75 | S | S | S | S | S | N | N |

Page Row 27, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 324.00 | N | N | S | S | S | S | S | N | N | N | N | S | S | S | S | S | N |
| 324.25 | N | N | S | S | S | S | S | N | N | N | N | S | S | S | S | S | N |
| 324.50 | N | N | O | S | S | S | S | N | N | N | N | S | S | S | S | S | N |
| 324.75 | N | N | N | S | S | S | S | N | N | N | N | O | S | S | S | S | N |
| 325.00 | N | N | N | S | S | S | S | N | N | N | N | N | S | S | S | S | N |
| 325.25 | N | N | N | S | S | S | S | N | N | N | N | N | S | S | S | S | N |
| 325.50 | N | N | N | S | S | S | S | N | N | N | N | N | S | S | S | S | N |
| 325.75 | N | N | N | S | S | S | S | O | N | N | N | N | S | S | S | S | N |
| 326.00 | N | N | N | S | S | S | S | S | N | N | N | N | S | S | S | S | O |
| 326.25 | N | N | N | S | S | S | S | S | N | N | N | N | S | S | S | S | S |
| 326.50 | N | N | N | S | S | S | S | S | N | N | N | N | S | S | S | S | S |
| 326.75 | N | N | N | O | S | S | S | S | N | N | N | N | S | S | S | S | S |
| 327.00 | N | N | N | N | S | S | S | S | N | N | N | N | O | S | S | S | S |
| 327.25 | N | N | N | N | S | S | S | S | N | N | N | N | N | S | S | S | S |
| 327.50 | N | N | N | N | S | S | S | S | N | N | N | N | N | S | S | S | S |
| 327.75 | N | N | N | N | S | S | S | S | N | N | N | N | N | S | S | S | S |
| 328.00 | N | N | N | N | S | S | S | S | O | N | N | N | N | S | S | S | S |
| 328.25 | N | N | N | N | S | S | S | S | S | N | N | N | N | S | S | S | S |
| 328.50 | N | N | N | N | S | S | S | S | S | N | N | N | N | S | S | S | S |
| 328.75 | N | N | N | N | S | S | S | S | S | N | N | N | N | S | S | S | S |
| 329.00 | N | N | N | N | O | S | S | S | S | N | N | N | N | S | S | S | S |
| 329.25 | N | N | N | N | N | S | S | S | S | N | N | N | N | O | S | S | S |
| 329.50 | N | N | N | N | N | S | S | S | S | N | N | N | N | N | S | S | S |
| 329.75 | N | N | N | N | N | S | S | S | S | N | N | N | N | N | S | S | S |
| 330.00 | O | N | N | N | N | S | S | S | S | N | N | N | N | N | S | S | S |
| 330.25 | S | N | N | N | N | S | S | S | S | O | N | N | N | N | S | S | S |
| 330.50 | S | N | N | N | N | S | S | S | S | S | N | N | N | N | S | S | S |
| 330.75 | S | N | N | N | N | S | S | S | S | S | N | N | N | N | S | S | S |
| 331.00 | S | N | N | N | N | S | S | S | S | S | N | N | N | N | S | S | S |
| 331.25 | S | N | N | N | N | O | S | S | S | S | N | N | N | N | S | S | S |
| 331.50 | S | N | N | N | N | N | S | S | S | S | N | N | N | N | O | S | S |
| 331.75 | S | N | N | N | N | N | S | S | S | S | N | N | N | N | N | S | S |
| 332.00 | S | N | N | N | N | N | S | S | S | S | N | N | N | N | N | S | S |
| 332.25 | S | O | N | N | N | N | S | S | S | S | N | N | N | N | N | S | S |
| 332.50 | S | S | N | N | N | N | S | S | S | S | O | N | N | N | N | S | S |
| 332.75 | S | S | N | N | N | N | S | S | S | S | S | N | N | N | N | S | S |
| 333.00 | S | S | N | N | N | N | S | S | S | S | S | N | N | N | N | S | S |
| 333.25 | S | S | N | N | N | N | S | S | S | S | S | N | N | N | N | S | S |
| 333.50 | S | S | N | N | N | N | O | S | S | S | S | N | N | N | N | S | S |
| 333.75 | S | S | N | N | N | N | N | S | S | S | S | N | N | N | N | O | S |
| 334.00 | S | S | N | N | N | N | N | S | S | S | S | N | N | N | N | N | S |
| 334.25 | S | S | N | N | N | N | N | S | S | S | S | N | N | N | N | N | S |
| 334.50 | S | S | O | N | N | N | N | S | S | S | S | N | N | N | N | N | S |
| 334.75 | S | S | S | N | N | N | N | S | S | S | S | O | N | N | N | N | S |

-continued

Coil Excitation

| | | | | | | | | | | | | | | | | | |
|---|---|---|---|---|---|---|---|---|---|---|---|---|---|---|---|---|---|
| 335.00 | S | S | S | N | N | N | N | S | S | S | S | S | N | N | N | N | S |
| 335.25 | S | S | S | N | N | N | N | S | S | S | S | S | N | N | N | N | S |
| 335.50 | S | S | S | N | N | N | N | S | S | S | S | S | N | N | N | N | S |
| 335.75 | S | S | S | N | N | N | N | O | S | S | S | S | N | N | N | N | S |

Page Row 28, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 324.00 | N | N | N | S | S | S | S | O | N | N | N | N | S | S | S | S | N |
| 324.25 | N | N | N | S | S | S | S | S | N | N | N | N | S | S | S | S | O |
| 324.50 | N | N | N | S | S | S | S | S | N | N | N | N | S | S | S | S | S |
| 324.75 | N | N | N | S | S | S | S | S | N | N | N | N | S | S | S | S | S |
| 325.00 | N | N | N | O | S | S | S | S | N | N | N | N | S | S | S | S | S |
| 325.25 | N | N | N | N | S | S | S | S | N | N | N | N | O | S | S | S | S |
| 325.50 | N | N | N | N | S | S | S | S | N | N | N | N | N | S | S | S | S |
| 325.75 | N | N | N | N | S | S | S | S | N | N | N | N | N | S | S | S | S |
| 326.00 | N | N | N | N | S | S | S | S | N | N | N | N | N | S | S | S | S |
| 326.25 | N | N | N | N | S | S | S | S | O | N | N | N | N | S | S | S | S |
| 326.50 | N | N | N | N | S | S | S | S | S | N | N | N | N | S | S | S | S |
| 326.75 | N | N | N | N | S | S | S | S | S | N | N | N | N | S | S | S | S |
| 327.00 | N | N | N | N | S | S | S | S | S | N | N | N | N | S | S | S | S |
| 327.25 | N | N | N | N | O | S | S | S | S | N | N | N | N | S | S | S | S |
| 327.50 | N | N | N | N | N | S | S | S | S | N | N | N | N | O | S | S | S |
| 327.75 | N | N | N | N | N | S | S | S | S | N | N | N | N | N | S | S | S |
| 328.00 | N | N | N | N | N | S | S | S | S | N | N | N | N | N | S | S | S |
| 328.25 | O | N | N | N | N | S | S | S | S | N | N | N | N | N | S | S | S |
| 328.50 | S | N | N | N | N | S | S | S | S | O | N | N | N | N | S | S | S |
| 328.75 | S | N | N | N | N | S | S | S | S | S | N | N | N | N | S | S | S |
| 329.00 | S | N | N | N | N | S | S | S | S | S | N | N | N | N | S | S | S |
| 329.25 | S | N | N | N | N | S | S | S | S | S | N | N | N | N | S | S | S |
| 329.50 | S | N | N | N | N | O | S | S | S | S | N | N | N | N | S | S | S |
| 329.75 | S | N | N | N | N | N | S | S | S | S | N | N | N | N | O | S | S |
| 330.00 | S | N | N | N | N | N | S | S | S | S | N | N | N | N | N | S | S |
| 330.25 | S | N | N | N | N | N | S | S | S | S | N | N | N | N | N | S | S |
| 330.50 | S | O | N | N | N | N | S | S | S | S | N | N | N | N | N | S | S |
| 330.75 | S | S | N | N | N | N | S | S | S | S | O | N | N | N | N | S | S |
| 331.00 | S | S | N | N | N | N | S | S | S | S | S | N | N | N | N | S | S |
| 331.25 | S | S | N | N | N | N | S | S | S | S | S | N | N | N | N | S | S |
| 331.50 | S | S | N | N | N | N | S | S | S | S | S | N | N | N | N | S | S |
| 331.75 | S | S | N | N | N | N | O | S | S | S | S | N | N | N | N | S | S |
| 332.00 | S | S | N | N | N | N | N | S | S | S | S | N | N | N | N | O | S |
| 332.25 | S | S | N | N | N | N | N | S | S | S | S | N | N | N | N | N | S |
| 332.50 | S | S | N | N | N | N | N | S | S | S | S | N | N | N | N | N | S |
| 332.75 | S | S | O | N | N | N | N | S | S | S | S | N | N | N | N | N | S |
| 333.00 | S | S | S | N | N | N | N | S | S | S | S | O | N | N | N | N | S |
| 333.25 | S | S | S | N | N | N | N | S | S | S | S | S | N | N | N | N | S |
| 333.50 | S | S | S | N | N | N | N | S | S | S | S | S | N | N | N | N | S |
| 333.75 | S | S | S | N | N | N | N | S | S | S | S | S | N | N | N | N | S |
| 334.00 | S | S | S | N | N | N | N | O | S | S | S | S | N | N | N | N | S |
| 334.25 | S | S | S | N | N | N | N | N | S | S | S | S | N | N | N | N | O |
| 334.50 | S | S | S | N | N | N | N | N | S | S | S | S | N | N | N | N | N |
| 334.75 | S | S | S | N | N | N | N | N | S | S | S | S | N | N | N | N | N |
| 335.00 | S | S | S | O | N | N | N | N | S | S | S | S | N | N | N | N | N |
| 335.25 | S | S | S | S | N | N | N | N | S | S | S | S | O | N | N | N | N |
| 335.50 | S | S | S | S | N | N | N | N | S | S | S | S | S | N | N | N | N |
| 335.75 | S | S | S | S | N | N | N | N | S | S | S | S | S | N | N | N | N |

Page Row 28, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 324.00 | N | N | N | N | S | S | S | S | N | N | N | N | N | S | S | S | S |
| 324.25 | N | N | N | N | S | S | S | S | N | N | N | N | N | S | S | S | S |
| 324.50 | N | N | N | N | S | S | S | S | O | N | N | N | N | S | S | S | S |
| 324.75 | N | N | N | N | S | S | S | S | S | N | N | N | N | S | S | S | S |
| 325.00 | N | N | N | N | S | S | S | S | S | N | N | N | N | S | S | S | S |
| 325.25 | N | N | N | N | S | S | S | S | S | N | N | N | N | S | S | S | S |
| 325.50 | N | N | N | N | O | S | S | S | S | N | N | N | N | S | S | S | S |
| 325.75 | N | N | N | N | N | S | S | S | S | N | N | N | N | O | S | S | S |
| 326.00 | N | N | N | N | N | S | S | S | S | N | N | N | N | N | S | S | S |
| 326.25 | N | N | N | N | N | S | S | S | S | N | N | N | N | N | S | S | S |
| 326.50 | O | N | N | N | N | S | S | S | S | N | N | N | N | N | S | S | S |
| 326.75 | S | N | N | N | N | S | S | S | S | O | N | N | N | N | S | S | S |
| 327.00 | S | N | N | N | N | S | S | S | S | S | N | N | N | N | S | S | S |
| 327.25 | S | N | N | N | N | S | S | S | S | S | N | N | N | N | S | S | S |
| 327.50 | S | N | N | N | N | S | S | S | S | S | N | N | N | N | S | S | S |
| 327.75 | S | N | N | N | N | O | S | S | S | S | N | N | N | N | S | S | S |
| 328.00 | S | N | N | N | N | N | S | S | S | S | N | N | N | N | O | S | S |

-continued

| Coil Excitation | | | | | | | | | | | | | | | | | |
|---|---|---|---|---|---|---|---|---|---|---|---|---|---|---|---|---|---|
| 328.25 | S | N | N | N | N | N | S | S | S | S | N | N | N | N | N | S | S |
| 328.50 | S | N | N | N | N | N | S | S | S | S | N | N | N | N | N | S | S |
| 328.75 | S | O | N | N | N | N | S | S | S | S | N | N | N | N | N | S | S |
| 329.00 | S | S | N | N | N | N | S | S | S | S | O | N | N | N | N | S | S |
| 329.25 | S | S | N | N | N | N | S | S | S | S | S | N | N | N | N | S | S |
| 329.50 | S | S | N | N | N | N | S | S | S | S | S | N | N | N | N | S | S |
| 329.75 | S | S | N | N | N | N | S | S | S | S | S | N | N | N | N | S | S |
| 330.00 | S | S | N | N | N | N | O | S | S | S | S | N | N | N | N | S | S |
| 330.25 | S | S | N | N | N | N | N | S | S | S | S | N | N | N | N | O | S |
| 330.50 | S | S | N | N | N | N | N | S | S | S | S | N | N | N | N | N | S |
| 330.75 | S | S | N | N | N | N | N | S | S | S | S | N | N | N | N | N | S |
| 331.00 | S | S | O | N | N | N | N | S | S | S | S | N | N | N | N | N | S |
| 331.25 | S | S | S | N | N | N | N | S | S | S | S | O | N | N | N | N | S |
| 331.50 | S | S | S | N | N | N | N | S | S | S | S | S | N | N | N | N | S |
| 331.75 | S | S | S | N | N | N | N | S | S | S | S | S | N | N | N | N | S |
| 332.00 | S | S | S | N | N | N | N | S | S | S | S | S | N | N | N | N | S |
| 332.25 | S | S | S | N | N | N | N | O | S | S | S | S | N | N | N | N | S |
| 332.50 | S | S | S | N | N | N | N | N | S | S | S | S | N | N | N | N | O |
| 332.75 | S | S | S | N | N | N | N | N | S | S | S | S | N | N | N | N | N |
| 333.00 | S | S | S | N | N | N | N | N | S | S | S | S | N | N | N | N | N |
| 333.25 | S | S | S | O | N | N | N | N | S | S | S | S | N | N | N | N | N |
| 333.50 | S | S | S | S | N | N | N | N | S | S | S | S | O | N | N | N | N |
| 333.75 | S | S | S | S | N | N | N | N | S | S | S | S | S | N | N | N | N |
| 334.00 | S | S | S | S | N | N | N | N | S | S | S | S | S | N | N | N | N |
| 334.25 | S | S | S | S | N | N | N | N | S | S | S | S | S | N | N | N | N |
| 334.50 | S | S | S | S | N | N | N | N | O | S | S | S | S | N | N | N | N |
| 334.75 | S | S | S | S | N | N | N | N | N | S | S | S | S | N | N | N | N |
| 335.00 | S | S | S | S | N | N | N | N | N | S | S | S | S | N | N | N | N |
| 335.25 | S | S | S | S | N | N | N | N | N | S | S | S | S | N | N | N | N |
| 335.50 | S | S | S | S | O | N | N | N | N | S | S | S | S | N | N | N | N |
| 335.75 | S | S | S | S | S | N | N | N | N | S | S | S | S | O | N | N | N |

Page Row 28, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 324.00 | N | N | N | N | N | S | S | S | S | N | N | N | N | O | S | S | S |
| 324.25 | N | N | N | N | N | S | S | S | S | N | N | N | N | N | S | S | S |
| 324.50 | N | N | N | N | N | S | S | S | S | N | N | N | N | N | S | S | S |
| 324.75 | O | N | N | N | N | S | S | S | S | N | N | N | N | N | S | S | S |
| 325.00 | S | N | N | N | N | S | S | S | S | O | N | N | N | N | S | S | S |
| 325.25 | S | N | N | N | N | S | S | S | S | S | N | N | N | N | S | S | S |
| 325.50 | S | N | N | N | N | S | S | S | S | S | N | N | N | N | S | S | S |
| 325.75 | S | N | N | N | N | S | S | S | S | S | N | N | N | N | S | S | S |
| 326.00 | S | N | N | N | N | O | S | S | S | S | N | N | N | N | S | S | S |
| 326.25 | S | N | N | N | N | N | S | S | S | S | N | N | N | N | O | S | S |
| 326.50 | S | N | N | N | N | N | S | S | S | S | N | N | N | N | N | S | S |
| 326.75 | S | N | N | N | N | N | S | S | S | S | N | N | N | N | N | S | S |
| 327.00 | S | O | N | N | N | N | S | S | S | S | N | N | N | N | N | S | S |
| 327.25 | S | S | N | N | N | N | S | S | S | S | O | N | N | N | N | S | S |
| 327.50 | S | S | N | N | N | N | S | S | S | S | S | N | N | N | N | S | S |
| 327.75 | S | S | N | N | N | N | S | S | S | S | S | N | N | N | N | S | S |
| 328.00 | S | S | N | N | N | N | S | S | S | S | S | N | N | N | N | S | S |
| 328.25 | S | S | N | N | N | N | O | S | S | S | S | N | N | N | N | S | S |
| 328.50 | S | S | N | N | N | N | N | S | S | S | S | N | N | N | N | O | S |
| 328.75 | S | S | N | N | N | N | N | S | S | S | S | N | N | N | N | N | S |
| 329.00 | S | S | N | N | N | N | N | S | S | S | S | N | N | N | N | N | S |
| 329.25 | S | S | O | N | N | N | N | S | S | S | S | N | N | N | N | N | S |
| 329.50 | S | S | S | N | N | N | N | S | S | S | S | O | N | N | N | N | S |
| 329.75 | S | S | S | N | N | N | N | S | S | S | S | S | N | N | N | N | S |
| 330.00 | S | S | S | N | N | N | N | S | S | S | S | S | N | N | N | N | S |
| 330.25 | S | S | S | N | N | N | N | S | S | S | S | S | N | N | N | N | S |
| 330.50 | S | S | S | N | N | N | N | O | S | S | S | S | N | N | N | N | S |
| 330.75 | S | S | S | N | N | N | N | N | S | S | S | S | N | N | N | N | O |
| 331.00 | S | S | S | N | N | N | N | N | S | S | S | S | N | N | N | N | N |
| 331.25 | S | S | S | N | N | N | N | N | S | S | S | S | N | N | N | N | N |
| 331.50 | S | S | S | O | N | N | N | N | S | S | S | S | N | N | N | N | N |
| 331.75 | S | S | S | S | N | N | N | N | S | S | S | S | O | N | N | N | N |
| 332.00 | S | S | S | S | N | N | N | N | S | S | S | S | S | N | N | N | N |
| 332.25 | S | S | S | S | N | N | N | N | S | S | S | S | S | N | N | N | N |
| 332.50 | S | S | S | S | N | N | N | N | S | S | S | S | S | N | N | N | N |
| 332.75 | S | S | S | S | N | N | N | N | O | S | S | S | S | N | N | N | N |
| 333.00 | S | S | S | S | N | N | N | N | N | S | S | S | S | N | N | N | N |
| 333.25 | S | S | S | S | N | N | N | N | N | S | S | S | S | N | N | N | N |
| 333.50 | S | S | S | S | N | N | N | N | N | S | S | S | S | N | N | N | N |
| 333.75 | S | S | S | S | O | N | N | N | N | S | S | S | S | N | N | N | N |
| 334.00 | S | S | S | S | S | N | N | N | N | S | S | S | S | O | N | N | N |
| 334.25 | S | S | S | S | S | N | N | N | N | S | S | S | S | S | N | N | N |

-continued

| Coil Excitation | | | | | | | | | | | | | | | | | |
|---|---|---|---|---|---|---|---|---|---|---|---|---|---|---|---|---|---|
| 334.50 | S | S | S | S | S | N | N | N | N | S | S | S | S | S | N | N | N |
| 334.75 | O | S | S | S | S | N | N | N | N | S | S | S | S | S | N | N | N |
| 335.00 | N | S | S | S | S | N | N | N | N | O | S | S | S | S | N | N | N |
| 335.25 | N | S | S | S | S | N | N | N | N | N | S | S | S | S | N | N | N |
| 335.50 | N | S | S | S | S | N | N | N | N | N | S | S | S | S | N | N | N |
| 335.75 | N | S | S | S | S | N | N | N | N | N | S | S | S | S | N | N | N |

Page Row 28, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 324.00 | S | N | N | N | N | S | S | S | S | S | N | N | N | N | S | S | S |
| 324.25 | S | N | N | N | N | O | S | S | S | S | N | N | N | N | S | S | S |
| 324.50 | S | N | N | N | N | N | S | S | S | S | N | N | N | N | O | S | S |
| 324.75 | S | N | N | N | N | N | S | S | S | S | N | N | N | N | N | S | S |
| 325.00 | S | N | N | N | N | N | S | S | S | S | N | N | N | N | N | S | S |
| 325.25 | S | O | N | N | N | N | S | S | S | S | N | N | N | N | N | S | S |
| 325.50 | S | S | N | N | N | N | S | S | S | S | O | N | N | N | N | S | S |
| 325.75 | S | S | N | N | N | N | S | S | S | S | S | N | N | N | N | S | S |
| 326.00 | S | S | N | N | N | N | S | S | S | S | S | N | N | N | N | S | S |
| 326.25 | S | S | N | N | N | N | S | S | S | S | S | N | N | N | N | S | S |
| 326.50 | S | S | N | N | N | N | O | S | S | S | S | N | N | N | N | S | S |
| 326.75 | S | S | N | N | N | N | N | S | S | S | S | N | N | N | N | O | S |
| 327.00 | S | S | N | N | N | N | N | S | S | S | S | N | N | N | N | N | S |
| 327.25 | S | S | N | N | N | N | N | S | S | S | S | N | N | N | N | N | S |
| 327.50 | S | S | O | N | N | N | N | S | S | S | S | N | N | N | N | N | S |
| 327.75 | S | S | S | N | N | N | N | S | S | S | S | O | N | N | N | N | S |
| 328.00 | S | S | S | N | N | N | N | S | S | S | S | S | N | N | N | N | S |
| 328.25 | S | S | S | N | N | N | N | S | S | S | S | S | N | N | N | N | S |
| 328.50 | S | S | S | N | N | N | N | S | S | S | S | S | N | N | N | N | S |
| 328.75 | S | S | S | N | N | N | N | O | S | S | S | S | N | N | N | N | S |
| 329.00 | S | S | S | N | N | N | N | N | S | S | S | S | N | N | N | N | O |
| 329.25 | S | S | S | N | N | N | N | N | S | S | S | S | N | N | N | N | N |
| 329.50 | S | S | S | N | N | N | N | N | S | S | S | S | N | N | N | N | N |
| 329.75 | S | S | S | O | N | N | N | N | S | S | S | S | N | N | N | N | N |
| 330.00 | S | S | S | S | N | N | N | N | S | S | S | S | O | N | N | N | N |
| 330.25 | S | S | S | S | N | N | N | N | S | S | S | S | S | N | N | N | N |
| 330.50 | S | S | S | S | N | N | N | N | S | S | S | S | S | N | N | N | N |
| 330.75 | S | S | S | S | N | N | N | N | S | S | S | S | S | N | N | N | N |
| 331.00 | S | S | S | S | N | N | N | N | O | S | S | S | S | N | N | N | N |
| 331.25 | S | S | S | S | N | N | N | N | N | S | S | S | S | N | N | N | N |
| 331.50 | S | S | S | S | N | N | N | N | N | S | S | S | S | N | N | N | N |
| 331.75 | S | S | S | S | N | N | N | N | N | S | S | S | S | N | N | N | N |
| 332.00 | S | S | S | S | O | N | N | N | N | S | S | S | S | N | N | N | N |
| 332.25 | S | S | S | S | S | N | N | N | N | S | S | S | S | O | N | N | N |
| 332.50 | S | S | S | S | S | N | N | N | N | S | S | S | S | S | N | N | N |
| 332.75 | S | S | S | S | S | N | N | N | N | S | S | S | S | S | N | N | N |
| 333.00 | O | S | S | S | S | N | N | N | N | S | S | S | S | S | N | N | N |
| 333.25 | N | S | S | S | S | N | N | N | N | O | S | S | S | S | N | N | N |
| 333.50 | N | S | S | S | S | N | N | N | N | N | S | S | S | S | N | N | N |
| 333.75 | N | S | S | S | S | N | N | N | N | N | S | S | S | S | N | N | N |
| 334.00 | N | S | S | S | S | N | N | N | N | N | S | S | S | S | N | N | N |
| 334.25 | N | S | S | S | S | O | N | N | N | N | S | S | S | S | N | N | N |
| 334.50 | N | S | S | S | S | S | N | N | N | N | S | S | S | S | O | N | N |
| 334.75 | N | S | S | S | S | S | N | N | N | N | S | S | S | S | S | N | N |
| 335.00 | N | S | S | S | S | S | N | N | N | N | S | S | S | S | S | N | N |
| 335.25 | N | O | S | S | S | S | N | N | N | N | S | S | S | S | S | N | N |
| 335.50 | N | N | S | S | S | S | N | N | N | N | O | S | S | S | S | N | N |
| 335.75 | N | N | S | S | S | S | N | N | N | N | N | S | S | S | S | N | N |

Page Row 28, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 324.00 | S | S | N | N | N | N | S | S | S | S | S | N | N | N | N | S | S |
| 324.25 | S | S | N | N | N | N | S | S | S | S | S | N | N | N | N | S | S |
| 324.50 | S | S | N | N | N | N | S | S | S | S | S | N | N | N | N | S | S |
| 324.75 | S | S | N | N | N | N | O | S | S | S | S | N | N | N | N | S | S |
| 325.00 | S | S | N | N | N | N | N | S | S | S | S | N | N | N | N | O | S |
| 325.25 | S | S | N | N | N | N | N | S | S | S | S | N | N | N | N | N | S |
| 325.50 | S | S | N | N | N | N | N | S | S | S | S | N | N | N | N | N | S |
| 325.75 | S | S | O | N | N | N | N | S | S | S | S | N | N | N | N | N | S |
| 326.00 | S | S | S | N | N | N | N | S | S | S | S | O | N | N | N | N | S |
| 326.25 | S | S | S | N | N | N | N | S | S | S | S | S | N | N | N | N | S |
| 326.50 | S | S | S | N | N | N | N | S | S | S | S | S | N | N | N | N | S |
| 326.75 | S | S | S | N | N | N | N | S | S | S | S | S | N | N | N | N | S |
| 327.00 | S | S | S | N | N | N | N | O | S | S | S | S | N | N | N | N | S |
| 327.25 | S | S | S | N | N | N | N | N | S | S | S | S | N | N | N | N | O |
| 327.50 | S | S | S | N | N | N | N | N | S | S | S | S | N | N | N | N | N |

-continued

| Coil Excitation | | | | | | | | | | | | | | | | | |
|---|---|---|---|---|---|---|---|---|---|---|---|---|---|---|---|---|---|
| 327.75 | S | S | S | N | N | N | N | N | S | S | S | S | N | N | N | N | N |
| 328.00 | S | S | S | O | N | N | N | N | S | S | S | S | N | N | N | N | N |
| 328.25 | S | S | S | S | N | N | N | N | S | S | S | S | O | N | N | N | N |
| 328.50 | S | S | S | S | N | N | N | N | S | S | S | S | S | N | N | N | N |
| 328.75 | S | S | S | S | N | N | N | N | S | S | S | S | S | N | N | N | N |
| 329.00 | S | S | S | S | N | N | N | N | S | S | S | S | S | N | N | N | N |
| 329.25 | S | S | S | S | N | N | N | N | O | S | S | S | S | N | N | N | N |
| 329.50 | S | S | S | S | N | N | N | N | N | S | S | S | S | N | N | N | N |
| 329.75 | S | S | S | S | N | N | N | N | N | S | S | S | S | N | N | N | N |
| 330.00 | S | S | S | S | N | N | N | N | N | S | S | S | S | N | N | N | N |
| 330.25 | S | S | S | S | O | N | N | N | N | S | S | S | S | N | N | N | N |
| 330.50 | S | S | S | S | S | N | N | N | N | S | S | S | S | O | N | N | N |
| 330.75 | S | S | S | S | S | N | N | N | N | S | S | S | S | S | N | N | N |
| 331.00 | S | S | S | S | S | N | N | N | N | S | S | S | S | S | N | N | N |
| 331.25 | O | S | S | S | S | N | N | N | N | S | S | S | S | S | N | N | N |
| 331.50 | N | S | S | S | S | N | N | N | N | O | S | S | S | S | N | N | N |
| 331.75 | N | S | S | S | S | N | N | N | N | N | S | S | S | S | N | N | N |
| 332.00 | N | S | S | S | S | N | N | N | N | N | S | S | S | S | N | N | N |
| 332.25 | N | S | S | S | S | N | N | N | N | N | S | S | S | S | N | N | N |
| 332.50 | N | S | S | S | S | O | N | N | N | N | S | S | S | S | N | N | N |
| 332.75 | N | S | S | S | S | S | N | N | N | N | S | S | S | S | O | N | N |
| 333.00 | N | S | S | S | S | S | N | N | N | N | S | S | S | S | S | N | N |
| 333.25 | N | S | S | S | S | S | N | N | N | N | S | S | S | S | S | N | N |
| 333.50 | N | O | S | S | S | S | N | N | N | N | S | S | S | S | S | N | N |
| 333.75 | N | N | S | S | S | S | N | N | N | N | O | S | S | S | S | N | N |
| 334.00 | N | N | S | S | S | S | N | N | N | N | N | S | S | S | S | N | N |
| 334.25 | N | N | S | S | S | S | N | N | N | N | N | S | S | S | S | N | N |
| 334.50 | N | N | S | S | S | S | N | N | N | N | N | S | S | S | S | N | N |
| 334.75 | N | N | S | S | S | S | O | N | N | N | N | S | S | S | S | N | N |
| 335.00 | N | N | S | S | S | S | S | N | N | N | N | S | S | S | S | O | N |
| 335.25 | N | N | S | S | S | S | S | N | N | N | N | S | S | S | S | S | N |
| 335.50 | N | N | S | S | S | S | S | N | N | N | N | S | S | S | S | S | N |
| 335.75 | N | N | O | S | S | S | S | N | N | N | N | S | S | S | S | S | N |

Page Row 28, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 324.00 | S | S | O | N | N | N | N | S | S | S | S | N | N | N | N | N | S |
| 324.25 | S | S | S | N | N | N | N | S | S | S | S | O | N | N | N | N | S |
| 324.50 | S | S | S | N | N | N | N | S | S | S | S | S | N | N | N | N | S |
| 324.75 | S | S | S | N | N | N | N | S | S | S | S | S | N | N | N | N | S |
| 325.00 | S | S | S | N | N | N | N | S | S | S | S | S | N | N | N | N | S |
| 325.25 | S | S | S | N | N | N | N | O | S | S | S | S | N | N | N | N | S |
| 325.50 | S | S | S | N | N | N | N | N | S | S | S | S | N | N | N | N | O |
| 325.75 | S | S | S | N | N | N | N | N | S | S | S | S | N | N | N | N | N |
| 326.00 | S | S | S | N | N | N | N | N | S | S | S | S | N | N | N | N | N |
| 326.25 | S | S | S | O | N | N | N | N | S | S | S | S | N | N | N | N | N |
| 326.50 | S | S | S | S | N | N | N | N | S | S | S | S | O | N | N | N | N |
| 326.75 | S | S | S | S | N | N | N | N | S | S | S | S | S | N | N | N | N |
| 327.00 | S | S | S | S | N | N | N | N | S | S | S | S | S | N | N | N | N |
| 327.25 | S | S | S | S | N | N | N | N | S | S | S | S | S | N | N | N | N |
| 327.50 | S | S | S | S | N | N | N | N | O | S | S | S | S | N | N | N | N |
| 327.75 | S | S | S | S | N | N | N | N | N | S | S | S | S | N | N | N | N |
| 328.00 | S | S | S | S | N | N | N | N | N | S | S | S | S | N | N | N | N |
| 328.25 | S | S | S | S | N | N | N | N | N | S | S | S | S | N | N | N | N |
| 328.50 | S | S | S | S | O | N | N | N | N | S | S | S | S | N | N | N | N |
| 328.75 | S | S | S | S | S | N | N | N | N | S | S | S | S | O | N | N | N |
| 329.00 | S | S | S | S | S | N | N | N | N | S | S | S | S | S | N | N | N |
| 329.25 | S | S | S | S | S | N | N | N | N | S | S | S | S | S | N | N | N |
| 329.50 | O | S | S | S | S | N | N | N | N | S | S | S | S | S | N | N | N |
| 329.75 | N | S | S | S | S | N | N | N | N | O | S | S | S | S | N | N | N |
| 330.00 | N | S | S | S | S | N | N | N | N | N | S | S | S | S | N | N | N |
| 330.25 | N | S | S | S | S | N | N | N | N | N | S | S | S | S | N | N | N |
| 330.50 | N | S | S | S | S | N | N | N | N | N | S | S | S | S | N | N | N |
| 330.75 | N | S | S | S | S | O | N | N | N | N | S | S | S | S | N | N | N |
| 331.00 | N | S | S | S | S | S | N | N | N | N | S | S | S | S | O | N | N |
| 331.25 | N | S | S | S | S | S | N | N | N | N | S | S | S | S | S | N | N |
| 331.50 | N | S | S | S | S | S | N | N | N | N | S | S | S | S | S | N | N |
| 331.75 | N | O | S | S | S | S | N | N | N | N | S | S | S | S | S | N | N |
| 332.00 | N | N | S | S | S | S | N | N | N | N | O | S | S | S | S | N | N |
| 332.25 | N | N | S | S | S | S | N | N | N | N | N | S | S | S | S | N | N |
| 332.50 | N | N | S | S | S | S | N | N | N | N | N | S | S | S | S | N | N |
| 332.75 | N | N | S | S | S | S | N | N | N | N | N | S | S | S | S | N | N |
| 333.00 | N | N | S | S | S | S | O | N | N | N | N | S | S | S | S | N | N |
| 333.25 | N | N | S | S | S | S | S | N | N | N | N | S | S | S | S | O | N |
| 333.50 | N | N | S | S | S | S | S | N | N | N | N | S | S | S | S | S | N |
| 333.75 | N | N | S | S | S | S | S | N | N | N | N | S | S | S | S | S | N |

-continued

Coil Excitation

| | | | | | | | | | | | | | | | | | |
|---|---|---|---|---|---|---|---|---|---|---|---|---|---|---|---|---|---|
| 334.00 | N | N | O | S | S | S | S | N | N | N | N | S | S | S | S | S | N |
| 334.25 | N | N | N | S | S | S | S | N | N | N | N | O | S | S | S | S | N |
| 334.50 | N | N | N | S | S | S | S | N | N | N | N | N | S | S | S | S | N |
| 334.75 | N | N | N | S | S | S | S | N | N | N | N | N | S | S | S | S | N |
| 335.00 | N | N | N | S | S | S | S | N | N | N | N | N | S | S | S | S | N |
| 335.25 | N | N | N | S | S | S | S | O | N | N | N | N | S | S | S | S | N |
| 335.50 | N | N | N | S | S | S | S | S | N | N | N | N | S | S | S | S | O |
| 335.75 | N | N | N | S | S | S | S | S | N | N | N | N | S | S | S | S | S |

Page Row 28, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 324.00 | S | S | S | N | N | N | N | N | S | S | S | S | N | N | N | N | N |
| 324.25 | S | S | S | N | N | N | N | N | S | S | S | S | N | N | N | N | N |
| 324.50 | S | S | S | O | N | N | N | N | S | S | S | S | N | N | N | N | N |
| 324.75 | S | S | S | S | N | N | N | N | S | S | S | S | O | N | N | N | N |
| 325.00 | S | S | S | S | N | N | N | N | S | S | S | S | S | N | N | N | N |
| 325.25 | S | S | S | S | N | N | N | N | S | S | S | S | S | N | N | N | N |
| 325.50 | S | S | S | S | N | N | N | N | S | S | S | S | S | N | N | N | N |
| 325.75 | S | S | S | S | N | N | N | N | O | S | S | S | S | N | N | N | N |
| 326.00 | S | S | S | S | N | N | N | N | N | S | S | S | S | N | N | N | N |
| 326.25 | S | S | S | S | N | N | N | N | N | S | S | S | S | N | N | N | N |
| 326.50 | S | S | S | S | N | N | N | N | N | S | S | S | S | N | N | N | N |
| 326.75 | S | S | S | S | O | N | N | N | N | S | S | S | S | N | N | N | N |
| 327.00 | S | S | S | S | S | N | N | N | N | S | S | S | S | O | N | N | N |
| 327.25 | S | S | S | S | S | N | N | N | N | S | S | S | S | S | N | N | N |
| 327.50 | S | S | S | S | S | N | N | N | N | S | S | S | S | S | N | N | N |
| 327.75 | O | S | S | S | S | N | N | N | N | S | S | S | S | S | N | N | N |
| 328.00 | N | S | S | S | S | N | N | N | N | O | S | S | S | S | N | N | N |
| 328.25 | N | S | S | S | S | N | N | N | N | N | S | S | S | S | N | N | N |
| 328.50 | N | S | S | S | S | N | N | N | N | N | S | S | S | S | N | N | N |
| 328.75 | N | S | S | S | S | N | N | N | N | N | S | S | S | S | N | N | N |
| 329.00 | N | S | S | S | S | O | N | N | N | N | S | S | S | S | N | N | N |
| 329.25 | N | S | S | S | S | S | N | N | N | N | S | S | S | S | O | N | N |
| 329.50 | N | S | S | S | S | S | N | N | N | N | S | S | S | S | S | N | N |
| 329.75 | N | S | S | S | S | S | N | N | N | N | S | S | S | S | S | N | N |
| 330.00 | N | O | S | S | S | S | N | N | N | N | S | S | S | S | S | N | N |
| 330.25 | N | N | S | S | S | S | N | N | N | N | O | S | S | S | S | N | N |
| 330.50 | N | N | S | S | S | S | N | N | N | N | N | S | S | S | S | N | N |
| 330.75 | N | N | S | S | S | S | N | N | N | N | N | S | S | S | S | N | N |
| 331.00 | N | N | S | S | S | S | N | N | N | N | N | S | S | S | S | N | N |
| 331.25 | N | N | S | S | S | S | O | N | N | N | N | S | S | S | S | N | N |
| 331.50 | N | N | S | S | S | S | S | N | N | N | N | S | S | S | S | O | N |
| 331.75 | N | N | S | S | S | S | S | N | N | N | N | S | S | S | S | S | N |
| 332.00 | N | N | S | S | S | S | S | N | N | N | N | S | S | S | S | S | N |
| 332.25 | N | N | O | S | S | S | S | N | N | N | N | S | S | S | S | S | N |
| 332.50 | N | N | N | S | S | S | S | N | N | N | N | O | S | S | S | S | N |
| 332.75 | N | N | N | S | S | S | S | N | N | N | N | N | S | S | S | S | N |
| 333.00 | N | N | N | S | S | S | S | N | N | N | N | N | S | S | S | S | N |
| 333.25 | N | N | N | S | S | S | S | N | N | N | N | N | S | S | S | S | N |
| 333.50 | N | N | N | S | S | S | S | O | N | N | N | N | S | S | S | S | N |
| 333.75 | N | N | N | S | S | S | S | S | N | N | N | N | S | S | S | S | O |
| 334.00 | N | N | N | S | S | S | S | S | N | N | N | N | S | S | S | S | S |
| 334.25 | N | N | N | S | S | S | S | S | N | N | N | N | S | S | S | S | S |
| 334.50 | N | N | N | O | S | S | S | S | N | N | N | N | S | S | S | S | S |
| 334.75 | N | N | N | N | S | S | S | S | N | N | N | N | O | S | S | S | S |
| 335.00 | N | N | N | N | S | S | S | S | N | N | N | N | N | S | S | S | S |
| 335.25 | N | N | N | N | S | S | S | S | N | N | N | N | N | S | S | S | S |
| 335.50 | N | N | N | N | S | S | S | S | N | N | N | N | N | S | S | S | S |
| 335.75 | N | N | N | N | S | S | S | S | O | N | N | N | N | S | S | S | S |

Page Row 28, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 324.00 | S | S | S | S | N | N | N | N | O | S | S | S | S | N | N | N | N |
| 324.25 | S | S | S | S | N | N | N | N | N | S | S | S | S | N | N | N | N |
| 324.50 | S | S | S | S | N | N | N | N | N | S | S | S | S | N | N | N | N |
| 324.75 | S | S | S | S | N | N | N | N | N | S | S | S | S | N | N | N | N |
| 325.00 | S | S | S | S | O | N | N | N | N | S | S | S | S | N | N | N | N |
| 325.25 | S | S | S | S | S | N | N | N | N | S | S | S | S | O | N | N | N |
| 325.50 | S | S | S | S | S | N | N | N | N | S | S | S | S | S | N | N | N |
| 325.75 | S | S | S | S | S | N | N | N | N | S | S | S | S | S | N | N | N |
| 326.00 | O | S | S | S | S | N | N | N | N | S | S | S | S | S | N | N | N |
| 326.25 | N | S | S | S | S | N | N | N | N | O | S | S | S | S | N | N | N |
| 326.50 | N | S | S | S | S | N | N | N | N | N | S | S | S | S | N | N | N |
| 326.75 | N | S | S | S | S | N | N | N | N | N | S | S | S | S | N | N | N |
| 327.00 | N | S | S | S | S | N | N | N | N | N | S | S | S | S | N | N | N |

-continued

| Coil Excitation | | | | | | | | | | | | | | | | | |
|---|---|---|---|---|---|---|---|---|---|---|---|---|---|---|---|---|---|
| 327.25 | N | S | S | S | S | O | N | N | N | N | S | S | S | S | N | N | N |
| 327.50 | N | S | S | S | S | S | N | N | N | N | S | S | S | S | O | N | N |
| 327.75 | N | S | S | S | S | S | N | N | N | N | S | S | S | S | S | N | N |
| 328.00 | N | S | S | S | S | S | N | N | N | N | S | S | S | S | S | N | N |
| 328.25 | N | O | S | S | S | S | N | N | N | N | S | S | S | S | S | N | N |
| 328.50 | N | N | S | S | S | S | N | N | N | N | O | S | S | S | S | N | N |
| 328.75 | N | N | S | S | S | S | N | N | N | N | N | S | S | S | S | N | N |
| 329.00 | N | N | S | S | S | S | N | N | N | N | N | S | S | S | S | N | N |
| 329.25 | N | N | S | S | S | S | N | N | N | N | N | S | S | S | S | N | N |
| 329.50 | N | N | S | S | S | S | O | N | N | N | N | S | S | S | S | N | N |
| 329.75 | N | N | S | S | S | S | S | N | N | N | N | S | S | S | S | O | N |
| 330.00 | N | N | S | S | S | S | S | N | N | N | N | S | S | S | S | S | N |
| 330.25 | N | N | S | S | S | S | S | N | N | N | N | S | S | S | S | S | N |
| 330.50 | N | N | O | S | S | S | S | N | N | N | N | S | S | S | S | S | N |
| 330.75 | N | N | N | S | S | S | S | N | N | N | N | O | S | S | S | S | N |
| 331.00 | N | N | N | S | S | S | S | N | N | N | N | N | S | S | S | S | N |
| 331.25 | N | N | N | S | S | S | S | N | N | N | N | N | S | S | S | S | N |
| 331.50 | N | N | N | S | S | S | S | N | N | N | N | N | S | S | S | S | N |
| 331.75 | N | N | N | S | S | S | S | O | N | N | N | N | S | S | S | S | N |
| 332.00 | N | N | N | S | S | S | S | S | N | N | N | N | S | S | S | S | O |
| 332.25 | N | N | N | S | S | S | S | S | N | N | N | N | S | S | S | S | S |
| 332.50 | N | N | N | S | S | S | S | S | N | N | N | N | S | S | S | S | S |
| 332.75 | N | N | N | O | S | S | S | S | N | N | N | N | S | S | S | S | S |
| 333.00 | N | N | N | N | S | S | S | S | N | N | N | N | O | S | S | S | S |
| 333.25 | N | N | N | N | S | S | S | S | N | N | N | N | N | S | S | S | S |
| 333.50 | N | N | N | N | S | S | S | S | N | N | N | N | N | S | S | S | S |
| 333.75 | N | N | N | N | S | S | S | S | N | N | N | N | N | S | S | S | S |
| 334.00 | N | N | N | N | S | S | S | S | O | N | N | N | N | S | S | S | S |
| 334.25 | N | N | N | N | S | S | S | S | S | N | N | N | N | S | S | S | S |
| 334.50 | N | N | N | N | S | S | S | S | S | N | N | N | N | S | S | S | S |
| 334.75 | N | N | N | N | S | S | S | S | S | N | N | N | N | S | S | S | S |
| 335.00 | N | N | N | N | O | S | S | S | S | N | N | N | N | S | S | S | S |
| 335.25 | N | N | N | N | N | S | S | S | S | N | N | N | N | O | S | S | S |
| 335.50 | N | N | N | N | N | S | S | S | S | N | N | N | N | N | S | S | S |
| 335.75 | N | N | N | N | N | S | S | S | S | N | N | N | N | N | S | S | S |

Page Row 28, Page Column 9

| Coil | 154 | 155 | 156 | 157 | 158 | 159 | 160 |
|---|---|---|---|---|---|---|---|
| 324.00 | S | S | S | S | S | N | N |
| 324.25 | O | S | S | S | S | N | N |
| 324.50 | N | S | S | S | S | N | N |
| 324.75 | N | S | S | S | S | N | N |
| 325.00 | N | S | S | S | S | N | N |
| 325.25 | N | S | S | S | S | N | N |
| 325.50 | N | S | S | S | S | O | N |
| 325.75 | N | S | S | S | S | S | N |
| 326.00 | N | S | S | S | S | S | N |
| 326.25 | N | S | S | S | S | S | N |
| 326.50 | N | O | S | S | S | S | N |
| 326.75 | N | N | S | S | S | S | N |
| 327.00 | N | N | S | S | S | S | N |
| 327.25 | N | N | S | S | S | S | N |
| 327.50 | N | N | S | S | S | S | N |
| 327.75 | N | N | S | S | S | S | O |
| 328.00 | N | N | S | S | S | S | S |
| 328.25 | N | N | S | S | S | S | S |
| 328.50 | N | N | S | S | S | S | S |
| 328.75 | N | N | O | S | S | S | S |
| 329.00 | N | N | N | S | S | S | S |
| 329.25 | N | N | N | S | S | S | S |
| 329.50 | N | N | N | S | S | S | S |
| 329.75 | N | N | N | S | S | S | S |
| 330.00 | N | N | N | S | S | S | S |
| 330.25 | N | N | N | S | S | S | S |
| 330.50 | N | N | N | S | S | S | S |
| 330.75 | N | N | N | S | S | S | S |
| 331.00 | N | N | N | O | S | S | S |
| 331.25 | N | N | N | N | S | S | S |
| 331.50 | N | N | N | N | S | S | S |
| 331.75 | N | N | N | N | S | S | S |
| 332.00 | N | N | N | N | S | S | S |
| 332.25 | N | N | N | N | S | S | S |
| 332.50 | N | N | N | N | S | S | S |
| 332.75 | N | N | N | N | S | S | S |
| 333.00 | N | N | N | N | S | S | S |
| 333.25 | N | N | N | N | O | S | S |

-continued

| Coil Excitation | | | | | | | |
|---|---|---|---|---|---|---|---|
| 333.50 | N | N | N | N | N | S | S |
| 333.75 | N | N | N | N | N | S | S |
| 334.00 | N | N | N | N | N | S | S |
| 334.25 | O | N | N | N | N | S | S |
| 334.50 | S | N | N | N | N | S | S |
| 334.75 | S | N | N | N | N | S | S |
| 335.00 | S | N | N | N | N | S | S |
| 335.25 | S | N | N | N | N | S | S |
| 335.50 | S | N | N | N | N | O | S |
| 335.75 | S | N | N | N | N | N | S |

Page Row 28, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 336.00 | S | S | S | N | N | N | N | N | S | S | S | S | N | N | N | N | O |
| 336.25 | S | S | S | N | N | N | N | N | S | S | S | S | N | N | N | N | N |
| 336.50 | S | S | S | N | N | N | N | N | S | S | S | S | N | N | N | N | N |
| 336.75 | S | S | S | O | N | N | N | N | S | S | S | S | N | N | N | N | N |
| 337.00 | S | S | S | S | N | N | N | N | S | S | S | S | O | N | N | N | N |
| 337.25 | S | S | S | S | N | N | N | N | S | S | S | S | S | N | N | N | N |
| 337.50 | S | S | S | S | N | N | N | N | S | S | S | S | S | N | N | N | N |
| 337.75 | S | S | S | S | N | N | N | N | S | S | S | S | S | N | N | N | N |
| 338.00 | S | S | S | S | N | N | N | N | O | S | S | S | S | N | N | N | N |
| 338.25 | S | S | S | S | N | N | N | N | N | S | S | S | S | N | N | N | N |
| 338.50 | S | S | S | S | N | N | N | N | N | S | S | S | S | N | N | N | N |
| 338.75 | S | S | S | S | N | N | N | N | N | S | S | S | S | N | N | N | N |
| 339.00 | S | S | S | S | O | N | N | N | N | S | S | S | S | N | N | N | N |
| 339.25 | S | S | S | S | S | N | N | N | N | S | S | S | S | O | N | N | N |
| 339.50 | S | S | S | S | S | N | N | N | N | S | S | S | S | S | N | N | N |
| 339.75 | S | S | S | S | S | N | N | N | N | S | S | S | S | S | N | N | N |
| 340.00 | O | S | S | S | S | N | N | N | N | S | S | S | S | S | N | N | N |
| 340.25 | N | S | S | S | S | N | N | N | N | O | S | S | S | S | N | N | N |
| 340.50 | N | S | S | S | S | N | N | N | N | N | S | S | S | S | N | N | N |
| 340.75 | N | S | S | S | S | N | N | N | N | N | S | S | S | S | N | N | N |
| 341.00 | N | S | S | S | S | N | N | N | N | N | S | S | S | S | N | N | N |
| 341.25 | N | S | S | S | S | O | N | N | N | N | S | S | S | S | N | N | N |
| 341.50 | N | S | S | S | S | S | N | N | N | N | S | S | S | S | O | N | N |
| 341.75 | N | S | S | S | S | S | N | N | N | N | S | S | S | S | S | N | N |
| 342.00 | N | S | S | S | S | S | N | N | N | N | S | S | S | S | S | N | N |
| 342.25 | N | O | S | S | S | S | N | N | N | N | S | S | S | S | S | N | N |
| 342.50 | N | N | S | S | S | S | N | N | N | N | O | S | S | S | S | N | N |
| 342.75 | N | N | S | S | S | S | N | N | N | N | N | S | S | S | S | N | N |
| 343.00 | N | N | S | S | S | S | N | N | N | N | N | S | S | S | S | N | N |
| 343.25 | N | N | S | S | S | S | N | N | N | N | N | S | S | S | S | N | N |
| 343.50 | N | N | S | S | S | S | O | N | N | N | N | S | S | S | S | N | N |
| 343.75 | N | N | S | S | S | S | S | N | N | N | N | S | S | S | S | O | N |
| 344.00 | N | N | S | S | S | S | S | N | N | N | N | S | S | S | S | S | N |
| 344.25 | N | N | S | S | S | S | S | N | N | N | N | S | S | S | S | S | N |
| 344.50 | N | N | O | S | S | S | S | N | N | N | N | S | S | S | S | S | N |
| 344.75 | N | N | N | S | S | S | S | N | N | N | N | O | S | S | S | S | N |
| 345.00 | N | N | N | S | S | S | S | N | N | N | N | N | S | S | S | S | N |
| 345.25 | N | N | N | S | S | S | S | N | N | N | N | N | S | S | S | S | N |
| 345.50 | N | N | N | S | S | S | S | N | N | N | N | N | S | S | S | S | N |
| 345.75 | N | N | N | S | S | S | S | O | N | N | N | N | S | S | S | S | N |
| 346.00 | N | N | N | S | S | S | S | S | N | N | N | N | S | S | S | S | O |
| 346.25 | N | N | N | S | S | S | S | S | N | N | N | N | S | S | S | S | S |
| 346.50 | N | N | N | S | S | S | S | S | N | N | N | N | S | S | S | S | S |
| 346.75 | N | N | N | O | S | S | S | S | N | N | N | N | S | S | S | S | S |
| 347.00 | N | N | N | N | S | S | S | S | N | N | N | N | O | S | S | S | S |
| 347.25 | N | N | N | N | S | S | S | S | N | N | N | N | N | S | S | S | S |
| 347.50 | N | N | N | N | S | S | S | S | N | N | N | N | N | S | S | S | S |
| 347.75 | N | N | N | N | S | S | S | S | N | N | N | N | N | S | S | S | S |

Page Row 29, Page Column 1

| Coil | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 336.00 | S | S | S | S | N | N | N | N | S | S | S | S | S | N | N | N | N |
| 336.25 | S | S | S | S | N | N | N | N | O | S | S | S | S | N | N | N | N |
| 336.50 | S | S | S | S | N | N | N | N | N | S | S | S | S | N | N | N | N |
| 336.75 | S | S | S | S | N | N | N | N | N | S | S | S | S | N | N | N | N |
| 337.00 | S | S | S | S | N | N | N | N | N | S | S | S | S | N | N | N | N |
| 337.25 | S | S | S | S | O | N | N | N | N | S | S | S | S | N | N | N | N |
| 337.50 | S | S | S | S | S | N | N | N | N | S | S | S | S | O | N | N | N |
| 337.75 | S | S | S | S | S | N | N | N | N | S | S | S | S | S | N | N | N |
| 338.00 | S | S | S | S | S | N | N | N | N | S | S | S | S | S | N | N | N |
| 338.25 | O | S | S | S | S | N | N | N | N | S | S | S | S | S | N | N | N |
| 338.50 | N | S | S | S | S | N | N | N | N | O | S | S | S | S | N | N | N |

-continued

| | Coil Excitation | | | | | | | | | | | | | | | | |
|---|---|---|---|---|---|---|---|---|---|---|---|---|---|---|---|---|---|
| 338.75 | N | S | S | S | S | N | N | N | N | N | S | S | S | S | N | N | N |
| 339.00 | N | S | S | S | S | N | N | N | N | N | S | S | S | S | N | N | N |
| 339.25 | N | S | S | S | S | N | N | N | N | N | S | S | S | S | N | N | N |
| 339.50 | N | S | S | S | S | O | N | N | N | N | S | S | S | S | N | N | N |
| 339.75 | N | S | S | S | S | S | N | N | N | N | S | S | S | S | O | N | N |
| 340.00 | N | S | S | S | S | S | N | N | N | N | S | S | S | S | S | N | N |
| 340.25 | N | S | S | S | S | S | N | N | N | N | S | S | S | S | S | N | N |
| 340.50 | N | O | S | S | S | S | N | N | N | N | S | S | S | S | S | N | N |
| 340.75 | N | N | S | S | S | S | N | N | N | N | O | S | S | S | S | N | N |
| 341.00 | N | N | S | S | S | S | N | N | N | N | N | S | S | S | S | N | N |
| 341.25 | N | N | S | S | S | S | N | N | N | N | N | S | S | S | S | N | N |
| 341.50 | N | N | S | S | S | S | N | N | N | N | N | S | S | S | S | N | N |
| 341.75 | N | N | S | S | S | S | O | N | N | N | N | S | S | S | S | N | N |
| 342.00 | N | N | S | S | S | S | S | N | N | N | N | S | S | S | S | O | N |
| 342.25 | N | N | S | S | S | S | S | N | N | N | N | S | S | S | S | S | N |
| 342.50 | N | N | S | S | S | S | S | N | N | N | N | S | S | S | S | S | N |
| 342.75 | N | N | O | S | S | S | S | N | N | N | N | S | S | S | S | S | N |
| 343.00 | N | N | N | S | S | S | S | N | N | N | N | O | S | S | S | S | N |
| 343.25 | N | N | N | S | S | S | S | N | N | N | N | N | S | S | S | S | N |
| 343.50 | N | N | N | S | S | S | S | N | N | N | N | N | S | S | S | S | N |
| 343.75 | N | N | N | S | S | S | S | N | N | N | N | N | S | S | S | S | N |
| 344.00 | N | N | N | S | S | S | S | O | N | N | N | N | S | S | S | S | N |
| 344.25 | N | N | N | S | S | S | S | S | N | N | N | N | S | S | S | S | O |
| 344.50 | N | N | N | S | S | S | S | S | N | N | N | N | S | S | S | S | S |
| 344.75 | N | N | N | S | S | S | S | S | N | N | N | N | S | S | S | S | S |
| 345.00 | N | N | N | O | S | S | S | S | N | N | N | N | S | S | S | S | S |
| 345.25 | N | N | N | N | S | S | S | S | N | N | N | N | O | S | S | S | S |
| 345.50 | N | N | N | N | S | S | S | S | N | N | N | N | N | S | S | S | S |
| 345.75 | N | N | N | N | S | S | S | S | N | N | N | N | N | S | S | S | S |
| 346.00 | N | N | N | N | S | S | S | S | N | N | N | N | N | S | S | S | S |
| 346.25 | N | N | N | N | S | S | S | S | O | N | N | N | N | S | S | S | S |
| 346.50 | N | N | N | N | S | S | S | S | S | N | N | N | N | S | S | S | S |
| 346.75 | N | N | N | N | S | S | S | S | S | N | N | N | N | S | S | S | S |
| 347.00 | N | N | N | N | S | S | S | S | S | N | N | N | N | S | S | S | S |
| 347.25 | N | N | N | N | O | S | S | S | S | N | N | N | N | S | S | S | S |
| 347.50 | N | N | N | N | N | S | S | S | S | N | N | N | N | O | S | S | S |
| 347.75 | N | N | N | N | N | S | S | S | S | N | N | N | N | N | S | S | S |

Page Row 29, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 336.00 | S | S | S | S | S | N | N | N | N | S | S | S | S | S | N | N | N |
| 336.25 | S | S | S | S | S | N | N | N | N | S | S | S | S | S | N | N | N |
| 336.50 | O | S | S | S | S | N | N | N | N | S | S | S | S | S | N | N | N |
| 336.75 | N | S | S | S | S | N | N | N | N | O | S | S | S | S | N | N | N |
| 337.00 | N | S | S | S | S | N | N | N | N | N | S | S | S | S | N | N | N |
| 337.25 | N | S | S | S | S | N | N | N | N | N | S | S | S | S | N | N | N |
| 337.50 | N | S | S | S | S | N | N | N | N | N | S | S | S | S | N | N | N |
| 337.75 | N | S | S | S | S | O | N | N | N | N | S | S | S | S | N | N | N |
| 338.00 | N | S | S | S | S | S | N | N | N | N | S | S | S | S | O | N | N |
| 338.25 | N | S | S | S | S | S | N | N | N | N | S | S | S | S | S | N | N |
| 338.50 | N | S | S | S | S | S | N | N | N | N | S | S | S | S | S | N | N |
| 338.75 | N | O | S | S | S | S | N | N | N | N | S | S | S | S | S | N | N |
| 339.00 | N | N | S | S | S | S | N | N | N | N | O | S | S | S | S | N | N |
| 339.25 | N | N | S | S | S | S | N | N | N | N | N | S | S | S | S | N | N |
| 339.50 | N | N | S | S | S | S | N | N | N | N | N | S | S | S | S | N | N |
| 339.75 | N | N | S | S | S | S | N | N | N | N | N | S | S | S | S | N | N |
| 340.00 | N | N | S | S | S | S | O | N | N | N | N | S | S | S | S | N | N |
| 340.25 | N | N | S | S | S | S | S | N | N | N | N | S | S | S | S | O | N |
| 340.50 | N | N | S | S | S | S | S | N | N | N | N | S | S | S | S | S | N |
| 340.75 | N | N | S | S | S | S | S | N | N | N | N | S | S | S | S | S | N |
| 341.00 | N | N | O | S | S | S | S | N | N | N | N | S | S | S | S | S | N |
| 341.25 | N | N | N | S | S | S | S | N | N | N | N | O | S | S | S | S | N |
| 341.50 | N | N | N | S | S | S | S | N | N | N | N | N | S | S | S | S | N |
| 341.75 | N | N | N | S | S | S | S | N | N | N | N | N | S | S | S | S | N |
| 342.00 | N | N | N | S | S | S | S | N | N | N | N | N | S | S | S | S | N |
| 342.25 | N | N | N | S | S | S | S | O | N | N | N | N | S | S | S | S | N |
| 342.50 | N | N | N | S | S | S | S | S | N | N | N | N | S | S | S | S | O |
| 342.75 | N | N | N | S | S | S | S | S | N | N | N | N | S | S | S | S | S |
| 343.00 | N | N | N | S | S | S | S | S | N | N | N | N | S | S | S | S | S |
| 343.25 | N | N | N | O | S | S | S | S | N | N | N | N | S | S | S | S | S |
| 343.50 | N | N | N | N | S | S | S | S | N | N | N | N | O | S | S | S | S |
| 343.75 | N | N | N | N | S | S | S | S | N | N | N | N | N | S | S | S | S |
| 344.00 | N | N | N | N | S | S | S | S | N | N | N | N | N | S | S | S | S |
| 344.25 | N | N | N | N | S | S | S | S | N | N | N | N | N | S | S | S | S |
| 344.50 | N | N | N | N | S | S | S | S | O | N | N | N | N | S | S | S | S |
| 344.75 | N | N | N | N | S | S | S | S | S | N | N | N | N | S | S | S | S |

-continued

Coil Excitation

| | | | | | | | | | | | | | | | | | |
|---|---|---|---|---|---|---|---|---|---|---|---|---|---|---|---|---|---|
| 345.00 | N | N | N | N | S | S | S | S | S | N | N | N | N | S | S | S | S |
| 345.25 | N | N | N | N | S | S | S | S | S | N | N | N | N | S | S | S | S |
| 345.50 | N | N | N | N | O | S | S | S | S | N | N | N | N | S | S | S | S |
| 345.75 | N | N | N | N | N | S | S | S | S | N | N | N | N | O | S | S | S |
| 346.00 | N | N | N | N | N | S | S | S | S | N | N | N | N | N | S | S | S |
| 346.25 | N | N | N | N | N | S | S | S | S | N | N | N | N | N | S | S | S |
| 346.50 | O | N | N | N | N | S | S | S | S | N | N | N | N | N | S | S | S |
| 346.75 | S | N | N | N | N | S | S | S | S | O | N | N | N | N | S | S | S |
| 347.00 | S | N | N | N | N | S | S | S | S | S | N | N | N | N | S | S | S |
| 347.25 | S | N | N | N | N | S | S | S | S | S | N | N | N | N | S | S | S |
| 347.50 | S | N | N | N | N | S | S | S | S | S | N | N | N | N | S | S | S |
| 347.75 | S | N | N | N | N | O | S | S | S | S | N | N | N | N | S | S | S |

Page Row 29, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 336.00 | N | S | S | S | S | O | N | N | N | N | S | S | S | S | N | N | N |
| 336.25 | N | S | S | S | S | S | N | N | N | N | S | S | S | S | O | N | N |
| 336.50 | N | S | S | S | S | S | N | N | N | N | S | S | S | S | S | N | N |
| 336.75 | N | S | S | S | S | S | N | N | N | N | S | S | S | S | S | N | N |
| 337.00 | N | O | S | S | S | S | N | N | N | N | S | S | S | S | S | N | N |
| 337.25 | N | N | S | S | S | S | N | N | N | N | O | S | S | S | S | N | N |
| 337.50 | N | N | S | S | S | S | N | N | N | N | N | S | S | S | S | N | N |
| 337.75 | N | N | S | S | S | S | N | N | N | N | N | S | S | S | S | N | N |
| 338.00 | N | N | S | S | S | S | N | N | N | N | N | S | S | S | S | N | N |
| 338.25 | N | N | S | S | S | S | O | N | N | N | N | S | S | S | S | N | N |
| 338.50 | N | N | S | S | S | S | S | N | N | N | N | S | S | S | S | O | N |
| 338.75 | N | N | S | S | S | S | S | N | N | N | N | S | S | S | S | S | N |
| 339.00 | N | N | S | S | S | S | S | N | N | N | N | S | S | S | S | S | N |
| 339.25 | N | N | O | S | S | S | S | N | N | N | N | S | S | S | S | S | N |
| 339.50 | N | N | N | S | S | S | S | N | N | N | N | O | S | S | S | S | N |
| 339.75 | N | N | N | S | S | S | S | N | N | N | N | N | S | S | S | S | N |
| 340.00 | N | N | N | S | S | S | S | N | N | N | N | N | S | S | S | S | N |
| 340.25 | N | N | N | S | S | S | S | N | N | N | N | N | S | S | S | S | N |
| 340.50 | N | N | N | S | S | S | S | O | N | N | N | N | S | S | S | S | N |
| 340.75 | N | N | N | S | S | S | S | S | N | N | N | N | S | S | S | S | O |
| 341.00 | N | N | N | S | S | S | S | S | N | N | N | N | S | S | S | S | S |
| 341.25 | N | N | N | S | S | S | S | S | N | N | N | N | S | S | S | S | S |
| 341.50 | N | N | N | O | S | S | S | S | N | N | N | N | S | S | S | S | S |
| 341.75 | N | N | N | N | S | S | S | S | N | N | N | N | O | S | S | S | S |
| 342.00 | N | N | N | N | S | S | S | S | N | N | N | N | N | S | S | S | S |
| 342.25 | N | N | N | N | S | S | S | S | N | N | N | N | N | S | S | S | S |
| 342.50 | N | N | N | N | S | S | S | S | N | N | N | N | N | S | S | S | S |
| 342.75 | N | N | N | N | S | S | S | S | O | N | N | N | N | S | S | S | S |
| 343.00 | N | N | N | N | S | S | S | S | S | N | N | N | N | S | S | S | S |
| 343.25 | N | N | N | N | S | S | S | S | S | N | N | N | N | S | S | S | S |
| 343.50 | N | N | N | N | S | S | S | S | S | N | N | N | N | S | S | S | S |
| 343.75 | N | N | N | N | O | S | S | S | S | N | N | N | N | S | S | S | S |
| 344.00 | N | N | N | N | N | S | S | S | S | N | N | N | N | O | S | S | S |
| 344.25 | N | N | N | N | N | S | S | S | S | N | N | N | N | N | S | S | S |
| 344.50 | N | N | N | N | N | S | S | S | S | N | N | N | N | N | S | S | S |
| 344.75 | O | N | N | N | N | S | S | S | S | N | N | N | N | N | S | S | S |
| 345.00 | S | N | N | N | N | S | S | S | S | O | N | N | N | N | S | S | S |
| 345.25 | S | N | N | N | N | S | S | S | S | S | N | N | N | N | S | S | S |
| 345.50 | S | N | N | N | N | S | S | S | S | S | N | N | N | N | S | S | S |
| 345.75 | S | N | N | N | N | S | S | S | S | S | N | N | N | N | S | S | S |
| 346.00 | S | N | N | N | N | O | S | S | S | S | N | N | N | N | S | S | S |
| 346.25 | S | N | N | N | N | N | S | S | S | S | N | N | N | N | O | S | S |
| 346.50 | S | N | N | N | N | N | S | S | S | S | N | N | N | N | N | S | S |
| 346.75 | S | N | N | N | N | N | S | S | S | S | N | N | N | N | N | S | S |
| 347.00 | S | O | N | N | N | N | S | S | S | S | N | N | N | N | N | S | S |
| 347.25 | S | S | N | N | N | N | S | S | S | S | O | N | N | N | N | S | S |
| 347.50 | S | S | N | N | N | N | S | S | S | S | S | N | N | N | N | S | S |
| 347.75 | S | S | N | N | N | N | S | S | S | S | S | N | N | N | N | S | S |

Page Row 29, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 336.00 | N | N | S | S | S | S | N | N | N | N | N | S | S | S | S | N | N |
| 336.25 | N | N | S | S | S | S | N | N | N | N | N | S | S | S | S | N | N |
| 336.50 | N | N | S | S | S | S | O | N | N | N | N | S | S | S | S | N | N |
| 336.75 | N | N | S | S | S | S | S | N | N | N | N | S | S | S | S | O | N |
| 337.00 | N | N | S | S | S | S | S | N | N | N | N | S | S | S | S | S | N |
| 337.25 | N | N | S | S | S | S | S | N | N | N | N | S | S | S | S | S | N |
| 337.50 | N | N | O | S | S | S | S | N | N | N | N | S | S | S | S | S | N |
| 337.75 | N | N | N | S | S | S | S | N | N | N | N | O | S | S | S | S | N |
| 338.00 | N | N | N | S | S | S | S | N | N | N | N | N | S | S | S | S | N |

-continued

| Coil Excitation | | | | | | | | | | | | | | | | | |
|---|---|---|---|---|---|---|---|---|---|---|---|---|---|---|---|---|---|
| 338.25 | N | N | N | S | S | S | S | N | N | N | N | N | S | S | S | S | N |
| 338.50 | N | N | N | S | S | S | S | N | N | N | N | N | S | S | S | S | N |
| 338.75 | N | N | N | S | S | S | S | O | N | N | N | N | S | S | S | S | N |
| 339.00 | N | N | N | S | S | S | S | S | N | N | N | N | S | S | S | S | O |
| 339.25 | N | N | N | S | S | S | S | S | N | N | N | N | S | S | S | S | S |
| 339.50 | N | N | N | S | S | S | S | S | N | N | N | N | S | S | S | S | S |
| 339.75 | N | N | N | O | S | S | S | S | N | N | N | N | S | S | S | S | S |
| 340.00 | N | N | N | N | S | S | S | S | N | N | N | N | O | S | S | S | S |
| 340.25 | N | N | N | N | S | S | S | S | N | N | N | N | N | S | S | S | S |
| 340.50 | N | N | N | N | S | S | S | S | N | N | N | N | N | S | S | S | S |
| 340.75 | N | N | N | N | S | S | S | S | N | N | N | N | N | S | S | S | S |
| 341.00 | N | N | N | N | S | S | S | S | O | N | N | N | N | S | S | S | S |
| 341.25 | N | N | N | N | S | S | S | S | S | N | N | N | N | S | S | S | S |
| 341.50 | N | N | N | N | S | S | S | S | S | N | N | N | N | S | S | S | S |
| 341.75 | N | N | N | N | S | S | S | S | S | N | N | N | N | S | S | S | S |
| 342.00 | N | N | N | N | O | S | S | S | S | N | N | N | N | S | S | S | S |
| 342.25 | N | N | N | N | N | S | S | S | S | N | N | N | N | O | S | S | S |
| 342.50 | N | N | N | N | N | S | S | S | S | N | N | N | N | N | S | S | S |
| 342.75 | N | N | N | N | N | S | S | S | S | N | N | N | N | N | S | S | S |
| 343.00 | O | N | N | N | N | S | S | S | S | N | N | N | N | N | S | S | S |
| 343.25 | S | N | N | N | N | S | S | S | S | O | N | N | N | N | S | S | S |
| 343.50 | S | N | N | N | N | S | S | S | S | S | N | N | N | N | S | S | S |
| 343.75 | S | N | N | N | N | S | S | S | S | S | N | N | N | N | S | S | S |
| 344.00 | S | N | N | N | N | S | S | S | S | S | N | N | N | N | S | S | S |
| 344.25 | S | N | N | N | N | O | S | S | S | S | N | N | N | N | S | S | S |
| 344.50 | S | N | N | N | N | N | S | S | S | S | N | N | N | N | O | S | S |
| 344.75 | S | N | N | N | N | N | S | S | S | S | N | N | N | N | N | S | S |
| 345.00 | S | N | N | N | N | N | S | S | S | S | N | N | N | N | N | S | S |
| 345.25 | S | O | N | N | N | N | S | S | S | S | N | N | N | N | N | S | S |
| 345.50 | S | S | N | N | N | N | S | S | S | S | O | N | N | N | N | S | S |
| 345.75 | S | S | N | N | N | N | S | S | S | S | S | N | N | N | N | S | S |
| 346.00 | S | S | N | N | N | N | S | S | S | S | S | N | N | N | N | S | S |
| 346.25 | S | S | N | N | N | N | S | S | S | S | S | N | N | N | N | S | S |
| 346.50 | S | S | N | N | N | N | O | S | S | S | S | N | N | N | N | S | S |
| 346.75 | S | S | N | N | N | N | N | S | S | S | S | N | N | N | N | O | S |
| 347.00 | S | S | N | N | N | N | N | S | S | S | S | N | N | N | N | N | S |
| 347.25 | S | S | N | N | N | N | N | S | S | S | S | N | N | N | N | N | S |
| 347.50 | S | S | O | N | N | N | N | S | S | S | S | N | N | N | N | N | S |
| 347.75 | S | S | S | N | N | N | N | S | S | S | S | O | N | N | N | N | S |

Page Row 29, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 336.00 | N | N | N | S | S | S | S | N | N | N | N | O | S | S | S | S | N |
| 336.25 | N | N | N | S | S | S | S | N | N | N | N | N | S | S | S | S | N |
| 336.50 | N | N | N | S | S | S | S | N | N | N | N | N | S | S | S | S | N |
| 336.75 | N | N | N | S | S | S | S | N | N | N | N | N | S | S | S | S | N |
| 337.00 | N | N | N | S | S | S | S | O | N | N | N | N | S | S | S | S | N |
| 337.25 | N | N | N | S | S | S | S | S | N | N | N | N | S | S | S | S | O |
| 337.50 | N | N | N | S | S | S | S | S | N | N | N | N | S | S | S | S | S |
| 337.75 | N | N | N | S | S | S | S | S | N | N | N | N | S | S | S | S | S |
| 338.00 | N | N | N | O | S | S | S | S | N | N | N | N | S | S | S | S | S |
| 338.25 | N | N | N | N | S | S | S | S | N | N | N | N | O | S | S | S | S |
| 338.50 | N | N | N | N | S | S | S | S | N | N | N | N | N | S | S | S | S |
| 338.75 | N | N | N | N | S | S | S | S | N | N | N | N | N | S | S | S | S |
| 339.00 | N | N | N | N | S | S | S | S | N | N | N | N | N | S | S | S | S |
| 339.25 | N | N | N | N | S | S | S | S | O | N | N | N | N | S | S | S | S |
| 339.50 | N | N | N | N | S | S | S | S | S | N | N | N | N | S | S | S | S |
| 339.75 | N | N | N | N | S | S | S | S | S | N | N | N | N | S | S | S | S |
| 340.00 | N | N | N | N | S | S | S | S | S | N | N | N | N | S | S | S | S |
| 340.25 | N | N | N | N | O | S | S | S | S | N | N | N | N | S | S | S | S |
| 340.50 | N | N | N | N | N | S | S | S | S | N | N | N | N | O | S | S | S |
| 340.75 | N | N | N | N | N | S | S | S | S | N | N | N | N | N | S | S | S |
| 341.00 | N | N | N | N | N | S | S | S | S | N | N | N | N | N | S | S | S |
| 341.25 | O | N | N | N | N | S | S | S | S | N | N | N | N | N | S | S | S |
| 341.50 | S | N | N | N | N | S | S | S | S | O | N | N | N | N | S | S | S |
| 341.75 | S | N | N | N | N | S | S | S | S | S | N | N | N | N | S | S | S |
| 342.00 | S | N | N | N | N | S | S | S | S | S | N | N | N | N | S | S | S |
| 342.25 | S | N | N | N | N | S | S | S | S | S | N | N | N | N | S | S | S |
| 342.50 | S | N | N | N | N | O | S | S | S | S | N | N | N | N | S | S | S |
| 342.75 | S | N | N | N | N | N | S | S | S | S | N | N | N | N | O | S | S |
| 343.00 | S | N | N | N | N | N | S | S | S | S | N | N | N | N | N | S | S |
| 343.25 | S | N | N | N | N | N | S | S | S | S | N | N | N | N | N | S | S |
| 343.50 | S | O | N | N | N | N | S | S | S | S | N | N | N | N | N | S | S |
| 343.75 | S | S | N | N | N | N | S | S | S | S | O | N | N | N | N | S | S |
| 344.00 | S | S | N | N | N | N | S | S | S | S | S | N | N | N | N | S | S |
| 344.25 | S | S | N | N | N | N | S | S | S | S | S | N | N | N | N | S | S |

-continued

| Coil Excitation | | | | | | | | | | | | | | | | | |
|---|---|---|---|---|---|---|---|---|---|---|---|---|---|---|---|---|---|
| 344.50 | S | S | N | N | N | N | S | S | S | S | S | N | N | N | N | S | S |
| 344.75 | S | S | N | N | N | N | O | S | S | S | S | N | N | N | N | S | S |
| 345.00 | S | S | N | N | N | N | N | S | S | S | S | N | N | N | N | O | S |
| 345.25 | S | S | N | N | N | N | N | S | S | S | S | N | N | N | N | N | S |
| 345.50 | S | S | N | N | N | N | N | S | S | S | S | N | N | N | N | N | S |
| 345.75 | S | S | O | N | N | N | N | S | S | S | S | N | N | N | N | N | S |
| 346.00 | S | S | S | N | N | N | N | S | S | S | S | O | N | N | N | N | S |
| 346.25 | S | S | S | N | N | N | N | S | S | S | S | S | N | N | N | N | S |
| 346.50 | S | S | S | N | N | N | N | S | S | S | S | S | N | N | N | N | S |
| 346.75 | S | S | S | N | N | N | N | S | S | S | S | S | N | N | N | N | S |
| 347.00 | S | S | S | N | N | N | N | O | S | S | S | S | N | N | N | N | S |
| 347.25 | S | S | S | N | N | N | N | N | S | S | S | S | N | N | N | N | O |
| 347.50 | S | S | S | N | N | N | N | N | S | S | S | S | N | N | N | N | N |
| 347.75 | S | S | S | N | N | N | N | N | S | S | S | S | N | N | N | N | N |

Page Row 29, Page Column 6

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 336.00 | N | N | N | S | S | S | S | S | N | N | N | N | S | S | S | S | S |
| 336.25 | N | N | N | O | S | S | S | S | N | N | N | N | S | S | S | S | S |
| 336.50 | N | N | N | N | S | S | S | S | N | N | N | N | O | S | S | S | S |
| 336.75 | N | N | N | N | S | S | S | S | N | N | N | N | N | S | S | S | S |
| 337.00 | N | N | N | N | S | S | S | S | N | N | N | N | N | S | S | S | S |
| 337.25 | N | N | N | N | S | S | S | S | N | N | N | N | N | S | S | S | S |
| 337.50 | N | N | N | N | S | S | S | S | O | N | N | N | N | S | S | S | S |
| 337.75 | N | N | N | N | S | S | S | S | S | N | N | N | N | S | S | S | S |
| 338.00 | N | N | N | N | S | S | S | S | S | N | N | N | N | S | S | S | S |
| 338.25 | N | N | N | N | S | S | S | S | S | N | N | N | N | S | S | S | S |
| 338.50 | N | N | N | N | O | S | S | S | S | N | N | N | N | S | S | S | S |
| 338.75 | N | N | N | N | N | S | S | S | S | N | N | N | N | O | S | S | S |
| 339.00 | N | N | N | N | N | S | S | S | S | N | N | N | N | N | S | S | S |
| 339.25 | N | N | N | N | N | S | S | S | S | N | N | N | N | N | S | S | S |
| 339.50 | O | N | N | N | N | S | S | S | S | N | N | N | N | N | S | S | S |
| 339.75 | S | N | N | N | N | S | S | S | S | O | N | N | N | N | S | S | S |
| 340.00 | S | N | N | N | N | S | S | S | S | S | N | N | N | N | S | S | S |
| 340.25 | S | N | N | N | N | S | S | S | S | S | N | N | N | N | S | S | S |
| 340.50 | S | N | N | N | N | S | S | S | S | S | N | N | N | N | S | S | S |
| 340.75 | S | N | N | N | N | O | S | S | S | S | N | N | N | N | S | S | S |
| 341.00 | S | N | N | N | N | N | S | S | S | S | N | N | N | N | O | S | S |
| 341.25 | S | N | N | N | N | N | S | S | S | S | N | N | N | N | N | S | S |
| 341.50 | S | N | N | N | N | N | S | S | S | S | N | N | N | N | N | S | S |
| 341.75 | S | O | N | N | N | N | S | S | S | S | N | N | N | N | N | S | S |
| 342.00 | S | S | N | N | N | N | S | S | S | S | O | N | N | N | N | S | S |
| 342.25 | S | S | N | N | N | N | S | S | S | S | S | N | N | N | N | S | S |
| 342.50 | S | S | N | N | N | N | S | S | S | S | S | N | N | N | N | S | S |
| 342.75 | S | S | N | N | N | N | S | S | S | S | S | N | N | N | N | S | S |
| 343.00 | S | S | N | N | N | N | O | S | S | S | S | N | N | N | N | S | S |
| 343.25 | S | S | N | N | N | N | N | S | S | S | S | N | N | N | N | O | S |
| 343.50 | S | S | N | N | N | N | N | S | S | S | S | N | N | N | N | N | S |
| 343.75 | S | S | N | N | N | N | N | S | S | S | S | N | N | N | N | N | S |
| 344.00 | S | S | O | N | N | N | N | S | S | S | S | N | N | N | N | N | S |
| 344.25 | S | S | S | N | N | N | N | S | S | S | S | O | N | N | N | N | S |
| 344.50 | S | S | S | N | N | N | N | S | S | S | S | S | N | N | N | N | S |
| 344.75 | S | S | S | N | N | N | N | S | S | S | S | S | N | N | N | N | S |
| 345.00 | S | S | S | N | N | N | N | S | S | S | S | S | N | N | N | N | S |
| 345.25 | S | S | S | N | N | N | N | O | S | S | S | S | N | N | N | N | S |
| 345.50 | S | S | S | N | N | N | N | N | S | S | S | S | N | N | N | N | O |
| 345.75 | S | S | S | N | N | N | N | N | S | S | S | S | N | N | N | N | N |
| 346.00 | S | S | S | N | N | N | N | N | S | S | S | S | N | N | N | N | N |
| 346.25 | S | S | S | O | N | N | N | N | S | S | S | S | N | N | N | N | N |
| 346.50 | S | S | S | S | N | N | N | N | S | S | S | S | O | N | N | N | N |
| 346.75 | S | S | S | S | N | N | N | N | S | S | S | S | S | N | N | N | N |
| 347.00 | S | S | S | S | N | N | N | N | S | S | S | S | S | N | N | N | N |
| 347.25 | S | S | S | S | N | N | N | N | S | S | S | S | S | N | N | N | N |
| 347.50 | S | S | S | S | N | N | N | N | O | S | S | S | S | N | N | N | N |
| 347.75 | S | S | S | S | N | N | N | N | N | S | S | S | S | N | N | N | N |

Page Row 29, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 336.00 | N | N | N | N | S | S | S | S | S | N | N | N | N | S | S | S | S |
| 336.25 | N | N | N | N | S | S | S | S | S | N | N | N | N | S | S | S | S |
| 336.50 | N | N | N | N | S | S | S | S | S | N | N | N | N | S | S | S | S |
| 336.75 | N | N | N | N | O | S | S | S | S | N | N | N | N | S | S | S | S |
| 337.00 | N | N | N | N | N | S | S | S | S | N | N | N | N | O | S | S | S |
| 337.25 | N | N | N | N | N | S | S | S | S | N | N | N | N | N | S | S | S |
| 337.50 | N | N | N | N | N | S | S | S | S | N | N | N | N | N | S | S | S |

-continued

| Coil Excitation | | | | | | | | | | | | | | | | | |
|---|---|---|---|---|---|---|---|---|---|---|---|---|---|---|---|---|---|
| 337.75 | O | N | N | N | N | S | S | S | S | N | N | N | N | N | S | S | S |
| 338.00 | S | N | N | N | N | S | S | S | S | O | N | N | N | N | S | S | S |
| 338.25 | S | N | N | N | N | S | S | S | S | S | N | N | N | N | S | S | S |
| 338.50 | S | N | N | N | N | S | S | S | S | S | N | N | N | N | S | S | S |
| 338.75 | S | N | N | N | N | S | S | S | S | S | N | N | N | N | S | S | S |
| 339.00 | S | N | N | N | N | O | S | S | S | S | N | N | N | N | S | S | S |
| 339.25 | S | N | N | N | N | N | S | S | S | S | N | N | N | N | O | S | S |
| 339.50 | S | N | N | N | N | N | S | S | S | S | N | N | N | N | N | S | S |
| 339.75 | S | N | N | N | N | N | S | S | S | S | N | N | N | N | N | S | S |
| 340.00 | S | O | N | N | N | N | S | S | S | S | N | N | N | N | N | S | S |
| 340.25 | S | S | N | N | N | N | S | S | S | S | O | N | N | N | N | S | S |
| 340.50 | S | S | N | N | N | N | S | S | S | S | S | N | N | N | N | S | S |
| 340.75 | S | S | N | N | N | N | S | S | S | S | S | N | N | N | N | S | S |
| 341.00 | S | S | N | N | N | N | S | S | S | S | S | N | N | N | N | S | S |
| 341.25 | S | S | N | N | N | N | O | S | S | S | S | N | N | N | N | S | S |
| 341.50 | S | S | N | N | N | N | N | S | S | S | S | N | N | N | N | O | S |
| 341.75 | S | S | N | N | N | N | N | S | S | S | S | N | N | N | N | N | S |
| 342.00 | S | S | N | N | N | N | N | S | S | S | S | N | N | N | N | N | S |
| 342.25 | S | S | O | N | N | N | N | S | S | S | S | N | N | N | N | N | S |
| 342.50 | S | S | S | N | N | N | N | S | S | S | S | O | N | N | N | N | S |
| 342.75 | S | S | S | N | N | N | N | S | S | S | S | S | N | N | N | N | S |
| 343.00 | S | S | S | N | N | N | N | S | S | S | S | S | N | N | N | N | S |
| 343.25 | S | S | S | N | N | N | N | S | S | S | S | S | N | N | N | N | S |
| 343.50 | S | S | S | N | N | N | N | O | S | S | S | S | N | N | N | N | S |
| 343.75 | S | S | S | N | N | N | N | N | S | S | S | S | N | N | N | N | O |
| 344.00 | S | S | S | N | N | N | N | N | S | S | S | S | N | N | N | N | N |
| 344.25 | S | S | S | N | N | N | N | N | S | S | S | S | N | N | N | N | N |
| 344.50 | S | S | S | O | N | N | N | N | S | S | S | S | N | N | N | N | N |
| 344.75 | S | S | S | S | N | N | N | N | S | S | S | S | O | N | N | N | N |
| 345.00 | S | S | S | S | N | N | N | N | S | S | S | S | S | N | N | N | N |
| 345.25 | S | S | S | S | N | N | N | N | S | S | S | S | S | N | N | N | N |
| 345.50 | S | S | S | S | N | N | N | N | S | S | S | S | S | N | N | N | N |
| 345.75 | S | S | S | S | N | N | N | N | O | S | S | S | S | N | N | N | N |
| 346.00 | S | S | S | S | N | N | N | N | N | S | S | S | S | N | N | N | N |
| 346.25 | S | S | S | S | N | N | N | N | N | S | S | S | S | N | N | N | N |
| 346.50 | S | S | S | S | N | N | N | N | N | S | S | S | S | N | N | N | N |
| 346.75 | S | S | S | S | O | N | N | N | N | S | S | S | S | N | N | N | N |
| 347.00 | S | S | S | S | S | N | N | N | N | S | S | S | S | O | N | N | N |
| 347.25 | S | S | S | S | S | N | N | N | N | S | S | S | S | S | N | N | N |
| 347.50 | S | S | S | S | S | N | N | N | N | S | S | S | S | S | N | N | N |
| 347.75 | O | S | S | S | S | N | N | N | N | S | S | S | S | S | N | N | N |

Page Row 29, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 336.00 | O | N | N | N | N | S | S | S | S | N | N | N | N | N | S | S | S |
| 336.25 | S | N | N | N | N | S | S | S | S | O | N | N | N | N | S | S | S |
| 336.50 | S | N | N | N | N | S | S | S | S | S | N | N | N | N | S | S | S |
| 336.75 | S | N | N | N | N | S | S | S | S | S | N | N | N | N | S | S | S |
| 337.00 | S | N | N | N | N | S | S | S | S | S | N | N | N | N | S | S | S |
| 337.25 | S | N | N | N | N | O | S | S | S | S | N | N | N | N | S | S | S |
| 337.50 | S | N | N | N | N | N | S | S | S | S | N | N | N | N | O | S | S |
| 337.75 | S | N | N | N | N | N | S | S | S | S | N | N | N | N | N | S | S |
| 338.00 | S | N | N | N | N | N | S | S | S | S | N | N | N | N | N | S | S |
| 338.25 | S | O | N | N | N | N | S | S | S | S | N | N | N | N | N | S | S |
| 338.50 | S | S | N | N | N | N | S | S | S | S | O | N | N | N | N | S | S |
| 338.75 | S | S | N | N | N | N | S | S | S | S | S | N | N | N | N | S | S |
| 339.00 | S | S | N | N | N | N | S | S | S | S | S | N | N | N | N | S | S |
| 339.25 | S | S | N | N | N | N | S | S | S | S | S | N | N | N | N | S | S |
| 339.50 | S | S | N | N | N | N | O | S | S | S | S | N | N | N | N | S | S |
| 339.75 | S | S | N | N | N | N | N | S | S | S | S | N | N | N | N | O | S |
| 340.00 | S | S | N | N | N | N | N | S | S | S | S | N | N | N | N | N | S |
| 340.25 | S | S | N | N | N | N | N | S | S | S | S | N | N | N | N | N | S |
| 340.50 | S | S | O | N | N | N | N | S | S | S | S | N | N | N | N | N | S |
| 340.75 | S | S | S | N | N | N | N | S | S | S | S | O | N | N | N | N | S |
| 341.00 | S | S | S | N | N | N | N | S | S | S | S | S | N | N | N | N | S |
| 341.25 | S | S | S | N | N | N | N | S | S | S | S | S | N | N | N | N | S |
| 341.50 | S | S | S | N | N | N | N | S | S | S | S | S | N | N | N | N | S |
| 341.75 | S | S | S | N | N | N | N | O | S | S | S | S | N | N | N | N | S |
| 342.00 | S | S | S | N | N | N | N | N | S | S | S | S | N | N | N | N | O |
| 342.25 | S | S | S | N | N | N | N | N | S | S | S | S | N | N | N | N | N |
| 342.50 | S | S | S | N | N | N | N | N | S | S | S | S | N | N | N | N | N |
| 342.75 | S | S | S | O | N | N | N | N | S | S | S | S | N | N | N | N | N |
| 343.00 | S | S | S | S | N | N | N | N | S | S | S | S | O | N | N | N | N |
| 343.25 | S | S | S | S | N | N | N | N | S | S | S | S | S | N | N | N | N |
| 343.50 | S | S | S | S | N | N | N | N | S | S | S | S | S | N | N | N | N |
| 343.75 | S | S | S | S | N | N | N | N | S | S | S | S | S | N | N | N | N |

-continued

Coil Excitation

| | | | | | | | | | | | | | | | | | |
|---|---|---|---|---|---|---|---|---|---|---|---|---|---|---|---|---|---|
| 344.00 | S | S | S | S | N | N | N | N | O | S | S | S | S | N | N | N | N |
| 344.25 | S | S | S | S | N | N | N | N | N | S | S | S | S | N | N | N | N |
| 344.50 | S | S | S | S | N | N | N | N | N | S | S | S | S | N | N | N | N |
| 344.75 | S | S | S | S | N | N | N | N | N | S | S | S | S | N | N | N | N |
| 345.00 | S | S | S | S | O | N | N | N | N | S | S | S | S | N | N | N | N |
| 345.25 | S | S | S | S | S | N | N | N | N | S | S | S | S | O | N | N | N |
| 345.50 | S | S | S | S | S | N | N | N | N | S | S | S | S | S | N | N | N |
| 345.75 | S | S | S | S | S | N | N | N | N | S | S | S | S | S | N | N | N |
| 346.00 | O | S | S | S | S | N | N | N | N | S | S | S | S | S | N | N | N |
| 346.25 | N | S | S | S | S | N | N | N | N | O | S | S | S | S | N | N | N |
| 346.50 | N | S | S | S | S | N | N | N | N | N | S | S | S | S | N | N | N |
| 346.75 | N | S | S | S | S | N | N | N | N | N | S | S | S | S | N | N | N |
| 347.00 | N | S | S | S | S | N | N | N | N | N | S | S | S | S | N | N | N |
| 347.25 | N | S | S | S | S | O | N | N | N | N | S | S | S | S | N | N | N |
| 347.50 | N | S | S | S | S | S | N | N | N | N | S | S | S | S | O | N | N |
| 347.75 | N | S | S | S | S | S | N | N | N | N | S | S | S | S | S | N | N |

Page Row 29, Page Column 9

| Coil | 154 | 155 | 156 | 157 | 158 | 159 | 160 |
|---|---|---|---|---|---|---|---|
| 336.00 | S | N | N | N | N | N | S |
| 336.25 | S | N | N | N | N | N | S |
| 336.50 | S | O | N | N | N | N | S |
| 336.75 | S | S | N | N | N | N | S |
| 337.00 | S | S | N | N | N | N | S |
| 337.25 | S | S | N | N | N | N | S |
| 337.50 | S | S | N | N | N | N | S |
| 337.75 | S | S | N | N | N | N | O |
| 338.00 | S | S | N | N | N | N | N |
| 338.25 | S | S | N | N | N | N | N |
| 338.50 | S | S | N | N | N | N | N |
| 338.75 | S | S | O | N | N | N | N |
| 339.00 | S | S | S | N | N | N | N |
| 339.25 | S | S | S | N | N | N | N |
| 339.50 | S | S | S | N | N | N | N |
| 339.75 | S | S | S | N | N | N | N |
| 340.00 | S | S | S | N | N | N | N |
| 340.25 | S | S | S | N | N | N | N |
| 340.50 | S | S | S | N | N | N | N |
| 340.75 | S | S | S | N | N | N | N |
| 341.00 | S | S | S | O | N | N | N |
| 341.25 | S | S | S | S | N | N | N |
| 341.50 | S | S | S | S | N | N | N |
| 341.75 | S | S | S | S | N | N | N |
| 342.00 | S | S | S | S | N | N | N |
| 342.25 | S | S | S | S | N | N | N |
| 342.50 | S | S | S | S | N | N | N |
| 342.75 | S | S | S | S | N | N | N |
| 343.00 | S | S | S | S | N | N | N |
| 343.25 | S | S | S | S | O | N | N |
| 343.50 | S | S | S | S | S | N | N |
| 343.75 | S | S | S | S | S | N | N |
| 344.00 | S | S | S | S | S | N | N |
| 344.25 | O | S | S | S | S | N | N |
| 344.50 | N | S | S | S | S | N | N |
| 344.75 | N | S | S | S | S | N | N |
| 345.00 | N | S | S | S | S | N | N |
| 345.25 | N | S | S | S | S | N | N |
| 345.50 | N | S | S | S | S | O | N |
| 345.75 | N | S | S | S | S | S | N |
| 346.00 | N | S | S | S | S | S | N |
| 346.25 | N | S | S | S | S | S | N |
| 346.50 | N | O | S | S | S | S | N |
| 346.75 | N | N | S | S | S | S | N |
| 347.00 | N | N | S | S | S | S | N |
| 347.25 | N | N | S | S | S | S | N |
| 347.50 | N | N | S | S | S | S | N |
| 347.75 | N | N | S | S | S | S | O |

Page Row 29, Page Column 10

| Coil | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 348.00 | N | N | N | N | S | S | S | S | O | N | N | N | N | S | S | S | S |
| 348.25 | N | N | N | N | S | S | S | S | S | N | N | N | N | S | S | S | S |
| 348.50 | N | N | N | N | S | S | S | S | S | N | N | N | N | S | S | S | S |
| 348.75 | N | N | N | N | S | S | S | S | S | N | N | N | N | S | S | S | S |
| 349.00 | N | N | N | N | O | S | S | S | S | N | N | N | N | S | S | S | S |

-continued

| Coil Excitation | | | | | | | | | | | | | | | | | |
|---|---|---|---|---|---|---|---|---|---|---|---|---|---|---|---|---|---|
| 349.25 | N | N | N | N | N | S | S | S | S | N | N | N | N | O | S | S | S |
| 349.50 | N | N | N | N | N | S | S | S | S | N | N | N | N | N | S | S | S |
| 349.75 | N | N | N | N | N | S | S | S | S | N | N | N | N | N | S | S | S |
| 350.00 | O | N | N | N | N | S | S | S | S | N | N | N | N | N | S | S | S |
| 350.25 | S | N | N | N | N | S | S | S | S | O | N | N | N | N | S | S | S |
| 350.50 | S | N | N | N | N | S | S | S | S | S | N | N | N | N | S | S | S |
| 350.75 | S | N | N | N | N | S | S | S | S | S | N | N | N | N | S | S | S |
| 351.00 | S | N | N | N | N | S | S | S | S | S | N | N | N | N | S | S | S |
| 351.25 | S | N | N | N | N | O | S | S | S | S | N | N | N | N | S | S | S |
| 351.50 | S | N | N | N | N | N | S | S | S | S | N | N | N | N | O | S | S |
| 351.75 | S | N | N | N | N | N | S | S | S | S | N | N | N | N | N | S | S |
| 352.00 | S | N | N | N | N | N | S | S | S | S | N | N | N | N | N | S | S |
| 352.25 | S | O | N | N | N | N | S | S | S | S | N | N | N | N | N | S | S |
| 352.50 | S | S | N | N | N | N | S | S | S | S | O | N | N | N | N | S | S |
| 352.75 | S | S | N | N | N | N | S | S | S | S | S | N | N | N | N | S | S |
| 353.00 | S | S | N | N | N | N | S | S | S | S | S | N | N | N | N | S | S |
| 353.25 | S | S | N | N | N | N | S | S | S | S | S | N | N | N | N | S | S |
| 353.50 | S | S | N | N | N | N | O | S | S | S | S | N | N | N | N | S | S |
| 353.75 | S | S | N | N | N | N | N | S | S | S | S | N | N | N | N | O | S |
| 354.00 | S | S | N | N | N | N | N | S | S | S | S | N | N | N | N | N | S |
| 354.25 | S | S | N | N | N | N | N | S | S | S | S | N | N | N | N | N | S |
| 354.50 | S | S | O | N | N | N | N | S | S | S | S | N | N | N | N | N | S |
| 354.75 | S | S | S | N | N | N | N | S | S | S | S | O | N | N | N | N | S |
| 355.00 | S | S | S | N | N | N | N | S | S | S | S | S | N | N | N | N | S |
| 355.25 | S | S | S | N | N | N | N | S | S | S | S | S | N | N | N | N | S |
| 355.50 | S | S | S | N | N | N | N | S | S | S | S | S | N | N | N | N | S |
| 355.75 | S | S | S | N | N | N | N | O | S | S | S | S | N | N | N | N | S |
| 356.00 | S | S | S | N | N | N | N | N | S | S | S | S | N | N | N | N | O |
| 356.25 | S | S | S | N | N | N | N | N | S | S | S | S | N | N | N | N | N |
| 356.50 | S | S | S | N | N | N | N | N | S | S | S | S | N | N | N | N | N |
| 356.75 | S | S | S | O | N | N | N | N | S | S | S | S | N | N | N | N | N |
| 357.00 | S | S | S | S | N | N | N | N | S | S | S | S | O | N | N | N | N |
| 357.25 | S | S | S | S | N | N | N | N | S | S | S | S | S | N | N | N | N |
| 357.50 | S | S | S | S | N | N | N | N | S | S | S | S | S | N | N | N | N |
| 357.75 | S | S | S | S | N | N | N | N | S | S | S | S | S | N | N | N | N |
| 358.00 | S | S | S | S | N | N | N | N | O | S | S | S | S | N | N | N | N |
| 358.25 | S | S | S | S | N | N | N | N | N | S | S | S | S | N | N | N | N |
| 358.50 | S | S | S | S | N | N | N | N | N | S | S | S | S | N | N | N | N |
| 358.75 | S | S | S | S | N | N | N | N | N | S | S | S | S | N | N | N | N |
| 359.00 | S | S | S | S | O | N | N | N | N | S | S | S | S | N | N | N | N |
| 359.25 | S | S | S | S | S | N | N | N | N | S | S | S | S | O | N | N | N |
| 359.50 | S | S | S | S | S | N | N | N | N | S | S | S | S | S | N | N | N |
| 359.75 | S | S | S | S | S | N | N | N | N | S | S | S | S | S | N | N | N |
| Page Row 30, Page Column 1 | | | | | | | | | | | | | | | | | |
| Coil | 18 | 19 | 20 | 21 | 22 | 23 | 24 | 25 | 26 | 27 | 28 | 29 | 30 | 31 | 32 | 33 | 34 |
| 348.00 | N | N | N | N | N | S | S | S | S | N | N | N | N | N | S | S | S |
| 348.25 | O | N | N | N | N | S | S | S | S | N | N | N | N | N | S | S | S |
| 348.50 | S | N | N | N | N | S | S | S | S | O | N | N | N | N | S | S | S |
| 348.75 | S | N | N | N | N | S | S | S | S | S | N | N | N | N | S | S | S |
| 349.00 | S | N | N | N | N | S | S | S | S | S | N | N | N | N | S | S | S |
| 349.25 | S | N | N | N | N | S | S | S | S | S | N | N | N | N | S | S | S |
| 349.50 | S | N | N | N | N | O | S | S | S | S | N | N | N | N | S | S | S |
| 349.75 | S | N | N | N | N | N | S | S | S | S | N | N | N | N | O | S | S |
| 350.00 | S | N | N | N | N | N | S | S | S | S | N | N | N | N | N | S | S |
| 350.25 | S | N | N | N | N | N | S | S | S | S | N | N | N | N | N | S | S |
| 350.50 | S | O | N | N | N | N | S | S | S | S | N | N | N | N | N | S | S |
| 350.75 | S | S | N | N | N | N | S | S | S | S | O | N | N | N | N | S | S |
| 351.00 | S | S | N | N | N | N | S | S | S | S | S | N | N | N | N | S | S |
| 351.25 | S | S | N | N | N | N | S | S | S | S | S | N | N | N | N | S | S |
| 351.50 | S | S | N | N | N | N | S | S | S | S | S | N | N | N | N | S | S |
| 351.75 | S | S | N | N | N | N | O | S | S | S | S | N | N | N | N | S | S |
| 352.00 | S | S | N | N | N | N | N | S | S | S | S | N | N | N | N | O | S |
| 352.25 | S | S | N | N | N | N | N | S | S | S | S | N | N | N | N | N | S |
| 352.50 | S | S | N | N | N | N | N | S | S | S | S | N | N | N | N | N | S |
| 352.75 | S | S | O | N | N | N | N | S | S | S | S | N | N | N | N | N | S |
| 353.00 | S | S | S | N | N | N | N | S | S | S | S | O | N | N | N | N | S |
| 353.25 | S | S | S | N | N | N | N | S | S | S | S | S | N | N | N | N | S |
| 353.50 | S | S | S | N | N | N | N | S | S | S | S | S | N | N | N | N | S |
| 353.75 | S | S | S | N | N | N | N | S | S | S | S | S | N | N | N | N | S |
| 354.00 | S | S | S | N | N | N | N | O | S | S | S | S | N | N | N | N | S |
| 354.25 | S | S | S | N | N | N | N | N | S | S | S | S | N | N | N | N | O |
| 354.50 | S | S | S | N | N | N | N | N | S | S | S | S | N | N | N | N | N |
| 354.75 | S | S | S | N | N | N | N | N | S | S | S | S | N | N | N | N | N |
| 355.00 | S | S | S | O | N | N | N | N | S | S | S | S | N | N | N | N | N |
| 355.25 | S | S | S | S | N | N | N | N | S | S | S | S | O | N | N | N | N |

-continued

| Coil Excitation | | | | | | | | | | | | | | | | | |
|---|---|---|---|---|---|---|---|---|---|---|---|---|---|---|---|---|---|
| 355.50 | S | S | S | S | N | N | N | N | S | S | S | S | S | N | N | N | N |
| 355.75 | S | S | S | S | N | N | N | N | S | S | S | S | S | N | N | N | N |
| 356.00 | S | S | S | S | N | N | N | N | S | S | S | S | S | N | N | N | N |
| 356.25 | S | S | S | S | N | N | N | N | O | S | S | S | S | N | N | N | N |
| 356.50 | S | S | S | S | N | N | N | N | N | S | S | S | S | N | N | N | N |
| 356.75 | S | S | S | S | N | N | N | N | N | S | S | S | S | N | N | N | N |
| 357.00 | S | S | S | S | N | N | N | N | N | S | S | S | S | N | N | N | N |
| 357.25 | S | S | S | S | O | N | N | N | N | S | S | S | S | N | N | N | N |
| 357.50 | S | S | S | S | S | N | N | N | N | S | S | S | S | O | N | N | N |
| 357.75 | S | S | S | S | S | N | N | N | N | S | S | S | S | S | N | N | N |
| 358.00 | S | S | S | S | S | N | N | N | N | S | S | S | S | S | N | N | N |
| 358.25 | O | S | S | S | S | N | N | N | N | S | S | S | S | S | N | N | N |
| 358.50 | N | S | S | S | S | N | N | N | N | O | S | S | S | S | N | N | N |
| 358.75 | N | S | S | S | S | N | N | N | N | N | S | S | S | S | N | N | N |
| 359.00 | N | S | S | S | S | N | N | N | N | N | S | S | S | S | N | N | N |
| 359.25 | N | S | S | S | S | N | N | N | N | N | S | S | S | S | N | N | N |
| 359.50 | N | S | S | S | S | O | N | N | N | N | S | S | S | S | N | N | N |
| 359.75 | N | S | S | S | S | S | N | N | N | N | S | S | S | S | O | N | N |

Page Row 30, Page Column 2

| Coil | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| 348.00 | S | N | N | N | N | N | S | S | S | S | N | N | N | N | O | S | S |
| 348.25 | S | N | N | N | N | N | S | S | S | S | N | N | N | N | N | S | S |
| 348.50 | S | N | N | N | N | N | S | S | S | S | N | N | N | N | N | S | S |
| 348.75 | S | O | N | N | N | N | S | S | S | S | N | N | N | N | N | S | S |
| 349.00 | S | S | N | N | N | N | S | S | S | S | O | N | N | N | N | S | S |
| 349.25 | S | S | N | N | N | N | S | S | S | S | S | N | N | N | N | S | S |
| 349.50 | S | S | N | N | N | N | S | S | S | S | S | N | N | N | N | S | S |
| 349.75 | S | S | N | N | N | N | S | S | S | S | S | N | N | N | N | S | S |
| 350.00 | S | S | N | N | N | N | O | S | S | S | S | N | N | N | N | S | S |
| 350.25 | S | S | N | N | N | N | N | S | S | S | S | N | N | N | N | O | S |
| 350.50 | S | S | N | N | N | N | N | S | S | S | S | N | N | N | N | N | S |
| 350.75 | S | S | N | N | N | N | N | S | S | S | S | N | N | N | N | N | S |
| 351.00 | S | S | O | N | N | N | N | S | S | S | S | N | N | N | N | N | S |
| 351.25 | S | S | S | N | N | N | N | S | S | S | S | O | N | N | N | N | S |
| 351.50 | S | S | S | N | N | N | N | S | S | S | S | S | N | N | N | N | S |
| 351.75 | S | S | S | N | N | N | N | S | S | S | S | S | N | N | N | N | S |
| 352.00 | S | S | S | N | N | N | N | S | S | S | S | S | N | N | N | N | S |
| 352.25 | S | S | S | N | N | N | N | O | S | S | S | S | N | N | N | N | S |
| 352.50 | S | S | S | N | N | N | N | N | S | S | S | S | N | N | N | N | O |
| 352.75 | S | S | S | N | N | N | N | N | S | S | S | S | N | N | N | N | N |
| 353.00 | S | S | S | N | N | N | N | N | S | S | S | S | N | N | N | N | N |
| 353.25 | S | S | S | O | N | N | N | N | S | S | S | S | N | N | N | N | N |
| 353.50 | S | S | S | S | N | N | N | N | S | S | S | S | O | N | N | N | N |
| 353.75 | S | S | S | S | N | N | N | N | S | S | S | S | S | N | N | N | N |
| 354.00 | S | S | S | S | N | N | N | N | S | S | S | S | S | N | N | N | N |
| 354.25 | S | S | S | S | N | N | N | N | S | S | S | S | S | N | N | N | N |
| 354.50 | S | S | S | S | N | N | N | N | O | S | S | S | S | N | N | N | N |
| 354.75 | S | S | S | S | N | N | N | N | N | S | S | S | S | N | N | N | N |
| 355.00 | S | S | S | S | N | N | N | N | N | S | S | S | S | N | N | N | N |
| 355.25 | S | S | S | S | N | N | N | N | N | S | S | S | S | N | N | N | N |
| 355.50 | S | S | S | S | O | N | N | N | N | S | S | S | S | N | N | N | N |
| 355.75 | S | S | S | S | S | N | N | N | N | S | S | S | S | O | N | N | N |
| 356.00 | S | S | S | S | S | N | N | N | N | S | S | S | S | S | N | N | N |
| 356.25 | S | S | S | S | S | N | N | N | N | S | S | S | S | S | N | N | N |
| 356.50 | O | S | S | S | S | N | N | N | N | S | S | S | S | S | N | N | N |
| 356.75 | N | S | S | S | S | N | N | N | N | O | S | S | S | S | N | N | N |
| 357.00 | N | S | S | S | S | N | N | N | N | N | S | S | S | S | N | N | N |
| 357.25 | N | S | S | S | S | N | N | N | N | N | S | S | S | S | N | N | N |
| 357.50 | N | S | S | S | S | N | N | N | N | N | S | S | S | S | N | N | N |
| 357.75 | N | S | S | S | S | O | N | N | N | N | S | S | S | S | N | N | N |
| 358.00 | N | S | S | S | S | S | N | N | N | N | S | S | S | S | O | N | N |
| 358.25 | N | S | S | S | S | S | N | N | N | N | S | S | S | S | S | N | N |
| 358.50 | N | S | S | S | S | S | N | N | N | N | S | S | S | S | S | N | N |
| 358.75 | N | O | S | S | S | S | N | N | N | N | S | S | S | S | S | N | N |
| 359.00 | N | N | S | S | S | S | N | N | N | N | O | S | S | S | S | N | N |
| 359.25 | N | N | S | S | S | S | N | N | N | N | N | S | S | S | S | N | N |
| 359.50 | N | N | S | S | S | S | N | N | N | N | N | S | S | S | S | N | N |
| 359.75 | N | N | S | S | S | S | N | N | N | N | N | S | S | S | S | N | N |

Page Row 30, Page Column 3

| Coil | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|
| 348.00 | S | S | N | N | N | N | S | S | S | S | S | N | N | N | N | S | S |
| 348.25 | S | S | N | N | N | N | O | S | S | S | S | N | N | N | N | S | S |
| 348.50 | S | S | N | N | N | N | N | S | S | S | S | N | N | N | N | O | S |

-continued

| Coil Excitation | | | | | | | | | | | | | | | | | |
|---|---|---|---|---|---|---|---|---|---|---|---|---|---|---|---|---|---|
| 348.75 | S | S | N | N | N | N | N | S | S | S | S | N | N | N | N | N | S |
| 349.00 | S | S | N | N | N | N | N | S | S | S | S | N | N | N | N | N | S |
| 349.25 | S | S | O | N | N | N | N | S | S | S | S | N | N | N | N | N | S |
| 349.50 | S | S | S | N | N | N | N | S | S | S | S | O | N | N | N | N | S |
| 349.75 | S | S | S | N | N | N | N | S | S | S | S | S | N | N | N | N | S |
| 350.00 | S | S | S | N | N | N | N | S | S | S | S | S | N | N | N | N | S |
| 350.25 | S | S | S | N | N | N | N | S | S | S | S | S | N | N | N | N | S |
| 350.50 | S | S | S | N | N | N | N | O | S | S | S | S | N | N | N | N | S |
| 350.75 | S | S | S | N | N | N | N | N | S | S | S | S | N | N | N | N | O |
| 351.00 | S | S | S | N | N | N | N | N | S | S | S | S | N | N | N | N | N |
| 351.25 | S | S | S | N | N | N | N | N | S | S | S | S | N | N | N | N | N |
| 351.50 | S | S | S | O | N | N | N | N | S | S | S | S | N | N | N | N | N |
| 351.75 | S | S | S | S | N | N | N | N | S | S | S | S | O | N | N | N | N |
| 352.00 | S | S | S | S | N | N | N | N | S | S | S | S | S | N | N | N | N |
| 352.25 | S | S | S | S | N | N | N | N | S | S | S | S | S | N | N | N | N |
| 352.50 | S | S | S | S | N | N | N | N | S | S | S | S | S | N | N | N | N |
| 352.75 | S | S | S | S | N | N | N | N | O | S | S | S | S | N | N | N | N |
| 353.00 | S | S | S | S | N | N | N | N | N | S | S | S | S | N | N | N | N |
| 353.25 | S | S | S | S | N | N | N | N | N | S | S | S | S | N | N | N | N |
| 353.50 | S | S | S | S | N | N | N | N | N | S | S | S | S | N | N | N | N |
| 353.75 | S | S | S | S | O | N | N | N | N | S | S | S | S | N | N | N | N |
| 354.00 | S | S | S | S | S | N | N | N | N | S | S | S | S | O | N | N | N |
| 354.25 | S | S | S | S | S | N | N | N | N | S | S | S | S | S | N | N | N |
| 354.50 | S | S | S | S | S | N | N | N | N | S | S | S | S | S | N | N | N |
| 354.75 | O | S | S | S | S | N | N | N | N | S | S | S | S | S | N | N | N |
| 355.00 | N | S | S | S | S | N | N | N | N | O | S | S | S | S | N | N | N |
| 355.25 | N | S | S | S | S | N | N | N | N | N | S | S | S | S | N | N | N |
| 355.50 | N | S | S | S | S | N | N | N | N | N | S | S | S | S | N | N | N |
| 355.75 | N | S | S | S | S | N | N | N | N | N | S | S | S | S | N | N | N |
| 356.00 | N | S | S | S | S | O | N | N | N | N | S | S | S | S | N | N | N |
| 356.25 | N | S | S | S | S | S | N | N | N | N | S | S | S | S | O | N | N |
| 356.50 | N | S | S | S | S | S | N | N | N | N | S | S | S | S | S | N | N |
| 356.75 | N | S | S | S | S | S | N | N | N | N | S | S | S | S | S | N | N |
| 357.00 | N | O | S | S | S | S | N | N | N | N | S | S | S | S | S | N | N |
| 357.25 | N | N | S | S | S | S | N | N | N | N | O | S | S | S | S | N | N |
| 357.50 | N | N | S | S | S | S | N | N | N | N | N | S | S | S | S | N | N |
| 357.75 | N | N | S | S | S | S | N | N | N | N | N | S | S | S | S | N | N |
| 358.00 | N | N | S | S | S | S | N | N | N | N | N | S | S | S | S | N | N |
| 358.25 | N | N | S | S | S | S | O | N | N | N | N | S | S | S | S | N | N |
| 358.50 | N | N | S | S | S | S | S | N | N | N | N | S | S | S | S | O | N |
| 358.75 | N | N | S | S | S | S | S | N | N | N | N | S | S | S | S | S | N |
| 359.00 | N | N | S | S | S | S | S | N | N | N | N | S | S | S | S | S | N |
| 359.25 | N | N | O | S | S | S | S | N | N | N | N | S | S | S | S | S | N |
| 359.50 | N | N | N | S | S | S | S | N | N | N | N | O | S | S | S | S | N |
| 359.75 | N | N | N | S | S | S | S | N | N | N | N | N | S | S | S | S | N |

Page Row 30, Page Column 4

| Coil | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|
| 348.00 | S | S | S | N | N | N | N | S | S | S | S | S | N | N | N | N | S |
| 348.25 | S | S | S | N | N | N | N | S | S | S | S | S | N | N | N | N | S |
| 348.50 | S | S | S | N | N | N | N | S | S | S | S | S | N | N | N | N | S |
| 348.75 | S | S | S | N | N | N | N | O | S | S | S | S | N | N | N | N | S |
| 349.00 | S | S | S | N | N | N | N | N | S | S | S | S | N | N | N | N | O |
| 349.25 | S | S | S | N | N | N | N | N | S | S | S | S | N | N | N | N | N |
| 349.50 | S | S | S | N | N | N | N | N | S | S | S | S | N | N | N | N | N |
| 349.75 | S | S | S | O | N | N | N | N | S | S | S | S | N | N | N | N | N |
| 350.00 | S | S | S | S | N | N | N | N | S | S | S | S | O | N | N | N | N |
| 350.25 | S | S | S | S | N | N | N | N | S | S | S | S | S | N | N | N | N |
| 350.50 | S | S | S | S | N | N | N | N | S | S | S | S | S | N | N | N | N |
| 350.75 | S | S | S | S | N | N | N | N | S | S | S | S | S | N | N | N | N |
| 351.00 | S | S | S | S | N | N | N | N | O | S | S | S | S | N | N | N | N |
| 351.25 | S | S | S | S | N | N | N | N | N | S | S | S | S | N | N | N | N |
| 351.50 | S | S | S | S | N | N | N | N | N | S | S | S | S | N | N | N | N |
| 351.75 | S | S | S | S | N | N | N | N | N | S | S | S | S | N | N | N | N |
| 352.00 | S | S | S | S | O | N | N | N | N | S | S | S | S | N | N | N | N |
| 352.25 | S | S | S | S | S | N | N | N | N | S | S | S | S | O | N | N | N |
| 352.50 | S | S | S | S | S | N | N | N | N | S | S | S | S | S | N | N | N |
| 352.75 | S | S | S | S | S | N | N | N | N | S | S | S | S | S | N | N | N |
| 353.00 | O | S | S | S | S | N | N | N | N | S | S | S | S | S | N | N | N |
| 353.25 | N | S | S | S | S | N | N | N | N | O | S | S | S | S | N | N | N |
| 353.50 | N | S | S | S | S | N | N | N | N | N | S | S | S | S | N | N | N |
| 353.75 | N | S | S | S | S | N | N | N | N | N | S | S | S | S | N | N | N |
| 354.00 | N | S | S | S | S | N | N | N | N | N | S | S | S | S | N | N | N |
| 354.25 | N | S | S | S | S | O | N | N | N | N | S | S | S | S | N | N | N |
| 354.50 | N | S | S | S | S | S | N | N | N | N | S | S | S | S | O | N | N |
| 354.75 | N | S | S | S | S | S | N | N | N | N | S | S | S | S | S | N | N |

-continued

| Coil Excitation | | | | | | | | | | | | | | | | | |
|---|---|---|---|---|---|---|---|---|---|---|---|---|---|---|---|---|---|
| 355.00 | N | S | S | S | S | S | N | N | N | N | S | S | S | S | S | N | N |
| 355.25 | N | O | S | S | S | S | N | N | N | N | S | S | S | S | S | N | N |
| 355.50 | N | N | S | S | S | S | N | N | N | N | O | S | S | S | S | N | N |
| 355.75 | N | N | S | S | S | S | N | N | N | N | N | S | S | S | S | N | N |
| 356.00 | N | N | S | S | S | S | N | N | N | N | N | S | S | S | S | N | N |
| 356.25 | N | N | S | S | S | S | N | N | N | N | N | S | S | S | S | N | N |
| 356.50 | N | N | S | S | S | S | O | N | N | N | N | S | S | S | S | N | N |
| 356.75 | N | N | S | S | S | S | S | N | N | N | N | S | S | S | S | O | N |
| 357.00 | N | N | S | S | S | S | S | N | N | N | N | S | S | S | S | S | N |
| 357.25 | N | N | S | S | S | S | S | N | N | N | N | S | S | S | S | S | N |
| 357.50 | N | N | O | S | S | S | S | N | N | N | N | S | S | S | S | S | N |
| 357.75 | N | N | N | S | S | S | S | N | N | N | N | O | S | S | S | S | N |
| 358.00 | N | N | N | S | S | S | S | N | N | N | N | N | S | S | S | S | N |
| 358.25 | N | N | N | S | S | S | S | N | N | N | N | N | S | S | S | S | N |
| 358.50 | N | N | N | S | S | S | S | N | N | N | N | N | S | S | S | S | N |
| 358.75 | N | N | N | S | S | S | S | O | N | N | N | N | S | S | S | S | N |
| 359.00 | N | N | N | S | S | S | S | S | N | N | N | N | S | S | S | S | O |
| 359.25 | N | N | N | S | S | S | S | S | N | N | N | N | S | S | S | S | S |
| 359.50 | N | N | N | S | S | S | S | S | N | N | N | N | S | S | S | S | S |
| 359.75 | N | N | N | O | S | S | S | S | N | N | N | N | S | S | S | S | S |

Page Row 30, Page Column 5

| Coil | 86 | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|
| 348.00 | S | S | S | O | N | N | N | N | S | S | S | S | N | N | N | N | N |
| 348.25 | S | S | S | S | N | N | N | N | S | S | S | S | O | N | N | N | N |
| 348.50 | S | S | S | S | N | N | N | N | S | S | S | S | S | N | N | N | N |
| 348.75 | S | S | S | S | N | N | N | N | S | S | S | S | S | N | N | N | N |
| 349.00 | S | S | S | S | N | N | N | N | S | S | S | S | S | N | N | N | N |
| 349.25 | S | S | S | S | N | N | N | N | O | S | S | S | S | N | N | N | N |
| 349.50 | S | S | S | S | N | N | N | N | N | S | S | S | S | N | N | N | N |
| 349.75 | S | S | S | S | N | N | N | N | N | S | S | S | S | N | N | N | N |
| 350.00 | S | S | S | S | N | N | N | N | N | S | S | S | S | N | N | N | N |
| 350.25 | S | S | S | S | O | N | N | N | N | S | S | S | S | N | N | N | N |
| 350.50 | S | S | S | S | S | N | N | N | N | S | S | S | S | O | N | N | N |
| 350.75 | S | S | S | S | S | N | N | N | N | S | S | S | S | S | N | N | N |
| 351.00 | S | S | S | S | S | N | N | N | N | S | S | S | S | S | N | N | N |
| 351.25 | O | S | S | S | S | N | N | N | N | S | S | S | S | S | N | N | N |
| 351.50 | N | S | S | S | S | N | N | N | N | O | S | S | S | S | N | N | N |
| 351.75 | N | S | S | S | S | N | N | N | N | N | S | S | S | S | N | N | N |
| 352.00 | N | S | S | S | S | N | N | N | N | N | S | S | S | S | N | N | N |
| 352.25 | N | S | S | S | S | N | N | N | N | N | S | S | S | S | N | N | N |
| 352.50 | N | S | S | S | S | O | N | N | N | N | S | S | S | S | N | N | N |
| 352.75 | N | S | S | S | S | S | N | N | N | N | S | S | S | S | O | N | N |
| 353.00 | N | S | S | S | S | S | N | N | N | N | S | S | S | S | S | N | N |
| 353.25 | N | S | S | S | S | S | N | N | N | N | S | S | S | S | S | N | N |
| 353.50 | N | O | S | S | S | S | N | N | N | N | S | S | S | S | S | N | N |
| 353.75 | N | N | S | S | S | S | N | N | N | N | O | S | S | S | S | N | N |
| 354.00 | N | N | S | S | S | S | N | N | N | N | N | S | S | S | S | N | N |
| 354.25 | N | N | S | S | S | S | N | N | N | N | N | S | S | S | S | N | N |
| 354.50 | N | N | S | S | S | S | N | N | N | N | N | S | S | S | S | N | N |
| 354.75 | N | N | S | S | S | S | O | N | N | N | N | S | S | S | S | N | N |
| 355.00 | N | N | S | S | S | S | S | N | N | N | N | S | S | S | S | O | N |
| 355.25 | N | N | S | S | S | S | S | N | N | N | N | S | S | S | S | S | N |
| 355.50 | N | N | S | S | S | S | S | N | N | N | N | S | S | S | S | S | N |
| 355.75 | N | N | O | S | S | S | S | N | N | N | N | S | S | S | S | S | N |
| 356.00 | N | N | N | S | S | S | S | N | N | N | N | O | S | S | S | S | N |
| 356.25 | N | N | N | S | S | S | S | N | N | N | N | N | S | S | S | S | N |
| 356.50 | N | N | N | S | S | S | S | N | N | N | N | N | S | S | S | S | N |
| 356.75 | N | N | N | S | S | S | S | N | N | N | N | N | S | S | S | S | N |
| 357.00 | N | N | N | S | S | S | S | O | N | N | N | N | S | S | S | S | N |
| 357.25 | N | N | N | S | S | S | S | S | N | N | N | N | S | S | S | S | O |
| 357.50 | N | N | N | S | S | S | S | S | N | N | N | N | S | S | S | S | S |
| 357.75 | N | N | N | S | S | S | S | S | N | N | N | N | S | S | S | S | S |
| 358.00 | N | N | N | O | S | S | S | S | N | N | N | N | S | S | S | S | S |
| 358.25 | N | N | N | N | S | S | S | S | N | N | N | N | O | S | S | S | S |
| 358.50 | N | N | N | N | S | S | S | S | N | N | N | N | N | S | S | S | S |
| 358.75 | N | N | N | N | S | S | S | S | N | N | N | N | N | S | S | S | S |
| 359.00 | N | N | N | N | S | S | S | S | N | N | N | N | N | S | S | S | S |
| 359.25 | N | N | N | N | S | S | S | S | O | N | N | N | N | S | S | S | S |
| 359.50 | N | N | N | N | S | S | S | S | S | N | N | N | N | S | S | S | S |
| 359.75 | N | N | N | N | S | S | S | S | S | N | N | N | N | S | S | S | S |

Page Row 30, Page Column 6

-continued

Coil Excitation

| Coil | 103 | 104 | 105 | 106 | 107 | 108 | 109 | 110 | 111 | 112 | 113 | 114 | 115 | 116 | 117 | 118 | 119 |
|---|---|---|---|---|---|---|---|---|---|---|---|---|---|---|---|---|---|
| 348.00 | S | S | S | S | N | N | N | N | N | S | S | S | S | N | N | N | N |
| 348.25 | S | S | S | S | N | N | N | N | N | S | S | S | S | N | N | N | N |
| 348.50 | S | S | S | S | O | N | N | N | N | S | S | S | S | N | N | N | N |
| 348.75 | S | S | S | S | S | N | N | N | N | S | S | S | S | O | N | N | N |
| 349.00 | S | S | S | S | S | N | N | N | N | S | S | S | S | S | N | N | N |
| 349.25 | S | S | S | S | S | N | N | N | N | S | S | S | S | S | N | N | N |
| 349.50 | O | S | S | S | S | N | N | N | N | S | S | S | S | S | N | N | N |
| 349.75 | N | S | S | S | S | N | N | N | N | O | S | S | S | S | N | N | N |
| 350.00 | N | S | S | S | S | N | N | N | N | N | S | S | S | S | N | N | N |
| 350.25 | N | S | S | S | S | N | N | N | N | N | S | S | S | S | N | N | N |
| 350.50 | N | S | S | S | S | N | N | N | N | N | S | S | S | S | N | N | N |
| 350.75 | N | S | S | S | S | O | N | N | N | N | S | S | S | S | N | N | N |
| 351.00 | N | S | S | S | S | S | N | N | N | N | S | S | S | S | O | N | N |
| 351.25 | N | S | S | S | S | S | N | N | N | N | S | S | S | S | S | N | N |
| 351.50 | N | S | S | S | S | S | N | N | N | N | S | S | S | S | S | N | N |
| 351.75 | N | O | S | S | S | S | N | N | N | N | S | S | S | S | S | N | N |
| 352.00 | N | N | S | S | S | S | N | N | N | N | O | S | S | S | S | N | N |
| 352.25 | N | N | S | S | S | S | N | N | N | N | N | S | S | S | S | N | N |
| 352.50 | N | N | S | S | S | S | N | N | N | N | N | S | S | S | S | N | N |
| 352.75 | N | N | S | S | S | S | N | N | N | N | N | S | S | S | S | N | N |
| 353.00 | N | N | S | S | S | S | O | N | N | N | N | S | S | S | S | N | N |
| 353.25 | N | N | S | S | S | S | S | N | N | N | N | S | S | S | S | O | N |
| 353.50 | N | N | S | S | S | S | S | N | N | N | N | S | S | S | S | S | N |
| 353.75 | N | N | S | S | S | S | S | N | N | N | N | S | S | S | S | S | N |
| 354.00 | N | N | O | S | S | S | S | N | N | N | N | S | S | S | S | S | N |
| 354.25 | N | N | N | S | S | S | S | N | N | N | N | O | S | S | S | S | N |
| 354.50 | N | N | N | S | S | S | S | N | N | N | N | N | S | S | S | S | N |
| 354.75 | N | N | N | S | S | S | S | N | N | N | N | N | S | S | S | S | N |
| 355.00 | N | N | N | S | S | S | S | N | N | N | N | N | S | S | S | S | N |
| 355.25 | N | N | N | S | S | S | S | O | N | N | N | N | S | S | S | S | N |
| 355.50 | N | N | N | S | S | S | S | S | N | N | N | N | S | S | S | S | O |
| 355.75 | N | N | N | S | S | S | S | S | N | N | N | N | S | S | S | S | S |
| 356.00 | N | N | N | S | S | S | S | S | N | N | N | N | S | S | S | S | S |
| 356.25 | N | N | N | O | S | S | S | S | N | N | N | N | S | S | S | S | S |
| 356.50 | N | N | N | N | S | S | S | S | N | N | N | N | O | S | S | S | S |
| 356.75 | N | N | N | N | S | S | S | S | N | N | N | N | N | S | S | S | S |
| 357.00 | N | N | N | N | S | S | S | S | N | N | N | N | N | S | S | S | S |
| 357.25 | N | N | N | N | S | S | S | S | N | N | N | N | N | S | S | S | S |
| 357.50 | N | N | N | N | S | S | S | S | O | N | N | N | N | S | S | S | S |
| 357.75 | N | N | N | N | S | S | S | S | S | N | N | N | N | S | S | S | S |
| 358.00 | N | N | N | N | S | S | S | S | S | N | N | N | N | S | S | S | S |
| 358.25 | N | N | N | N | S | S | S | S | S | N | N | N | N | S | S | S | S |
| 358.50 | N | N | N | N | O | S | S | S | S | N | N | N | N | S | S | S | S |
| 358.75 | N | N | N | N | N | S | S | S | S | N | N | N | N | O | S | S | S |
| 359.00 | N | N | N | N | N | S | S | S | S | N | N | N | N | N | S | S | S |
| 359.25 | N | N | N | N | N | S | S | S | S | N | N | N | N | N | S | S | S |
| 359.50 | O | N | N | N | N | S | S | S | S | N | N | N | N | N | S | S | S |
| 359.75 | S | N | N | N | N | S | S | S | S | O | N | N | N | N | S | S | S |

Page Row 30, Page Column 7

| Coil | 120 | 121 | 122 | 123 | 124 | 125 | 126 | 127 | 128 | 129 | 130 | 131 | 132 | 133 | 134 | 135 | 136 |
|---|---|---|---|---|---|---|---|---|---|---|---|---|---|---|---|---|---|
| 348.00 | N | S | S | S | S | N | N | N | N | O | S | S | S | S | N | N | N |
| 348.25 | N | S | S | S | S | N | N | N | N | N | S | S | S | S | N | N | N |
| 348.50 | N | S | S | S | S | N | N | N | N | N | S | S | S | S | N | N | N |
| 348.75 | N | S | S | S | S | N | N | N | N | N | S | S | S | S | N | N | N |
| 349.00 | N | S | S | S | S | O | N | N | N | N | S | S | S | S | N | N | N |
| 349.25 | N | S | S | S | S | S | N | N | N | N | S | S | S | S | O | N | N |
| 349.50 | N | S | S | S | S | S | N | N | N | N | S | S | S | S | S | N | N |
| 349.75 | N | S | S | S | S | S | N | N | N | N | S | S | S | S | S | N | N |
| 350.00 | N | O | S | S | S | S | N | N | N | N | S | S | S | S | S | N | N |
| 350.25 | N | N | S | S | S | S | N | N | N | N | O | S | S | S | S | N | N |
| 350.50 | N | N | S | S | S | S | N | N | N | N | N | S | S | S | S | N | N |
| 350.75 | N | N | S | S | S | S | N | N | N | N | N | S | S | S | S | N | N |
| 351.00 | N | N | S | S | S | S | N | N | N | N | N | S | S | S | S | N | N |
| 351.25 | N | N | S | S | S | S | O | N | N | N | N | S | S | S | S | N | N |
| 351.50 | N | N | S | S | S | S | S | N | N | N | N | S | S | S | S | O | N |
| 351.75 | N | N | S | S | S | S | S | N | N | N | N | S | S | S | S | S | N |
| 352.00 | N | N | S | S | S | S | S | N | N | N | N | S | S | S | S | S | N |
| 352.25 | N | N | O | S | S | S | S | N | N | N | N | S | S | S | S | S | N |
| 352.50 | N | N | N | S | S | S | S | N | N | N | N | O | S | S | S | S | N |
| 352.75 | N | N | N | S | S | S | S | N | N | N | N | N | S | S | S | S | N |
| 353.00 | N | N | N | S | S | S | S | N | N | N | N | N | S | S | S | S | N |
| 353.25 | N | N | N | S | S | S | S | N | N | N | N | N | S | S | S | S | N |
| 353.50 | N | N | N | S | S | S | S | O | N | N | N | N | S | S | S | S | N |

-continued

Coil Excitation

| | | | | | | | | | | | | | | | | | |
|---|---|---|---|---|---|---|---|---|---|---|---|---|---|---|---|---|---|
| 353.75 | N | N | N | S | S | S | S | S | N | N | N | N | S | S | S | S | O |
| 354.00 | N | N | N | S | S | S | S | S | N | N | N | N | S | S | S | S | S |
| 354.25 | N | N | N | S | S | S | S | S | N | N | N | N | S | S | S | S | S |
| 354.50 | N | N | N | O | S | S | S | S | N | N | N | N | S | S | S | S | S |
| 354.75 | N | N | N | N | S | S | S | S | N | N | N | N | O | S | S | S | S |
| 355.00 | N | N | N | N | S | S | S | S | N | N | N | N | N | S | S | S | S |
| 355.25 | N | N | N | N | S | S | S | S | N | N | N | N | N | S | S | S | S |
| 355.50 | N | N | N | N | S | S | S | S | N | N | N | N | N | S | S | S | S |
| 355.75 | N | N | N | N | S | S | S | S | O | N | N | N | N | S | S | S | S |
| 356.00 | N | N | N | N | S | S | S | S | S | N | N | N | N | S | S | S | S |
| 356.25 | N | N | N | N | S | S | S | S | S | N | N | N | N | S | S | S | S |
| 356.50 | N | N | N | N | S | S | S | S | S | N | N | N | N | S | S | S | S |
| 356.75 | N | N | N | N | O | S | S | S | S | N | N | N | N | S | S | S | S |
| 357.00 | N | N | N | N | N | S | S | S | S | N | N | N | N | O | S | S | S |
| 357.25 | N | N | N | N | N | S | S | S | S | N | N | N | N | N | S | S | S |
| 357.50 | N | N | N | N | N | S | S | S | S | N | N | N | N | N | S | S | S |
| 357.75 | O | N | N | N | N | S | S | S | S | N | N | N | N | N | S | S | S |
| 358.00 | S | N | N | N | N | S | S | S | S | O | N | N | N | N | S | S | S |
| 358.25 | S | N | N | N | N | S | S | S | S | S | N | N | N | N | S | S | S |
| 358.50 | S | N | N | N | N | S | S | S | S | S | N | N | N | N | S | S | S |
| 358.75 | S | N | N | N | N | S | S | S | S | S | N | N | N | N | S | S | S |
| 359.00 | S | N | N | N | N | O | S | S | S | S | N | N | N | N | S | S | S |
| 359.25 | S | N | N | N | N | N | S | S | S | S | N | N | N | N | O | S | S |
| 359.50 | S | N | N | N | N | N | S | S | S | S | N | N | N | N | N | S | S |
| 359.75 | S | N | N | N | N | N | S | S | S | S | N | N | N | N | N | S | S |

Page Row 30, Page Column 8

| Coil | 137 | 138 | 139 | 140 | 141 | 142 | 143 | 144 | 145 | 146 | 147 | 148 | 149 | 150 | 151 | 152 | 153 |
|---|---|---|---|---|---|---|---|---|---|---|---|---|---|---|---|---|---|
| 348.00 | N | S | S | S | S | S | N | N | N | N | S | S | S | S | S | N | N |
| 348.25 | N | O | S | S | S | S | N | N | N | N | S | S | S | S | S | N | N |
| 348.50 | N | N | S | S | S | S | N | N | N | N | O | S | S | S | S | N | N |
| 348.75 | N | N | S | S | S | S | N | N | N | N | N | S | S | S | S | N | N |
| 349.00 | N | N | S | S | S | S | N | N | N | N | N | S | S | S | S | N | N |
| 349.25 | N | N | S | S | S | S | N | N | N | N | N | S | S | S | S | N | N |
| 349.50 | N | N | S | S | S | S | O | N | N | N | N | S | S | S | S | N | N |
| 349.75 | N | N | S | S | S | S | S | N | N | N | N | S | S | S | S | O | N |
| 350.00 | N | N | S | S | S | S | S | N | N | N | N | S | S | S | S | S | N |
| 350.25 | N | N | S | S | S | S | S | N | N | N | N | S | S | S | S | S | N |
| 350.50 | N | N | O | S | S | S | S | N | N | N | N | S | S | S | S | S | N |
| 350.75 | N | N | N | S | S | S | S | N | N | N | N | O | S | S | S | S | N |
| 351.00 | N | N | N | S | S | S | S | N | N | N | N | N | S | S | S | S | N |
| 351.25 | N | N | N | S | S | S | S | N | N | N | N | N | S | S | S | S | N |
| 351.50 | N | N | N | S | S | S | S | N | N | N | N | N | S | S | S | S | N |
| 351.75 | N | N | N | S | S | S | S | O | N | N | N | N | S | S | S | S | N |
| 352.00 | N | N | N | S | S | S | S | S | N | N | N | N | S | S | S | S | O |
| 352.25 | N | N | N | S | S | S | S | S | N | N | N | N | S | S | S | S | S |
| 352.50 | N | N | N | S | S | S | S | S | N | N | N | N | S | S | S | S | S |
| 352.75 | N | N | N | O | S | S | S | S | N | N | N | N | S | S | S | S | S |
| 353.00 | N | N | N | N | S | S | S | S | N | N | N | N | O | S | S | S | S |
| 353.25 | N | N | N | N | S | S | S | S | N | N | N | N | N | S | S | S | S |
| 353.50 | N | N | N | N | S | S | S | S | N | N | N | N | N | S | S | S | S |
| 353.75 | N | N | N | N | S | S | S | S | N | N | N | N | N | S | S | S | S |
| 354.00 | N | N | N | N | S | S | S | S | O | N | N | N | N | S | S | S | S |
| 354.25 | N | N | N | N | S | S | S | S | S | N | N | N | N | S | S | S | S |
| 354.50 | N | N | N | N | S | S | S | S | S | N | N | N | N | S | S | S | S |
| 354.75 | N | N | N | N | S | S | S | S | S | N | N | N | N | S | S | S | S |
| 355.00 | N | N | N | N | O | S | S | S | S | N | N | N | N | S | S | S | S |
| 355.25 | N | N | N | N | N | S | S | S | S | N | N | N | N | O | S | S | S |
| 355.50 | N | N | N | N | N | S | S | S | S | N | N | N | N | N | S | S | S |
| 355.75 | N | N | N | N | N | S | S | S | S | N | N | N | N | N | S | S | S |
| 356.00 | O | N | N | N | N | S | S | S | S | N | N | N | N | N | S | S | S |
| 356.25 | S | N | N | N | N | S | S | S | S | O | N | N | N | N | S | S | S |
| 356.50 | S | N | N | N | N | S | S | S | S | S | N | N | N | N | S | S | S |
| 356.75 | S | N | N | N | N | S | S | S | S | S | N | N | N | N | S | S | S |
| 357.00 | S | N | N | N | N | S | S | S | S | S | N | N | N | N | S | S | S |
| 357.25 | S | N | N | N | N | O | S | S | S | S | N | N | N | N | S | S | S |
| 357.50 | S | N | N | N | N | N | S | S | S | S | N | N | N | N | O | S | S |
| 357.75 | S | N | N | N | N | N | S | S | S | S | N | N | N | N | N | S | S |
| 358.00 | S | N | N | N | N | N | S | S | S | S | N | N | N | N | N | S | S |
| 358.25 | S | O | N | N | N | N | S | S | S | S | N | N | N | N | N | S | S |
| 358.50 | S | S | N | N | N | N | S | S | S | S | O | N | N | N | N | S | S |
| 358.75 | S | S | N | N | N | N | S | S | S | S | S | N | N | N | N | S | S |
| 359.00 | S | S | N | N | N | N | S | S | S | S | S | N | N | N | N | S | S |
| 359.25 | S | S | N | N | N | N | S | S | S | S | S | N | N | N | N | S | S |
| 359.50 | S | S | N | N | N | N | O | S | S | S | S | N | N | N | N | S | S |
| 359.75 | S | S | N | N | N | N | N | S | S | S | S | N | N | N | N | O | S |

-continued

| Coil Excitation | | | | | | | |
|---|---|---|---|---|---|---|---|
| Page Row 30, Page Column 9 | | | | | | | |
| Coil | 154 | 155 | 156 | 157 | 158 | 159 | 160 |
| 348.00 | N | N | S | S | S | S | S |
| 348.25 | N | N | S | S | S | S | S |
| 348.50 | N | N | S | S | S | S | S |
| 348.75 | N | N | O | S | S | S | S |
| 349.00 | N | N | N | S | S | S | S |
| 349.25 | N | N | N | S | S | S | S |
| 349.50 | N | N | N | S | S | S | S |
| 349.75 | N | N | N | S | S | S | S |
| 350.00 | N | N | N | S | S | S | S |
| 350.25 | N | N | N | S | S | S | S |
| 350.50 | N | N | N | S | S | S | S |
| 350.75 | N | N | N | S | S | S | S |
| 351.00 | N | N | N | O | S | S | S |
| 351.25 | N | N | N | N | S | S | S |
| 351.50 | N | N | N | N | S | S | S |
| 351.75 | N | N | N | N | S | S | S |
| 352.00 | N | N | N | N | S | S | S |
| 352.25 | N | N | N | N | S | S | S |
| 352.50 | N | N | N | N | S | S | S |
| 352.75 | N | N | N | N | S | S | S |
| 353.00 | N | N | N | N | S | S | S |
| 353.25 | N | N | N | N | O | S | S |
| 353.50 | N | N | N | N | N | S | S |
| 353.75 | N | N | N | N | N | S | S |
| 354.00 | N | N | N | N | N | S | S |
| 354.25 | O | N | N | N | N | S | S |
| 354.50 | S | N | N | N | N | S | S |
| 354.75 | S | N | N | N | N | S | S |
| 355.00 | S | N | N | N | N | S | S |
| 355.25 | S | N | N | N | N | S | S |
| 355.50 | S | N | N | N | N | O | S |
| 355.75 | S | N | N | N | N | N | S |
| 356.00 | S | N | N | N | N | N | S |
| 356.25 | S | N | N | N | N | N | S |
| 356.50 | S | O | N | N | N | N | S |
| 356.75 | S | S | N | N | N | N | S |
| 357.00 | S | S | N | N | N | N | S |
| 357.25 | S | S | N | N | N | N | S |
| 357.50 | S | S | N | N | N | N | S |
| 357.75 | S | S | N | N | N | N | O |
| 358.00 | S | S | N | N | N | N | N |
| 358.25 | S | S | N | N | N | N | N |
| 358.50 | S | S | N | N | N | N | N |
| 358.75 | S | S | O | N | N | N | N |
| 359.00 | S | S | S | N | N | N | N |
| 359.25 | S | S | S | N | N | N | N |
| 359.50 | S | S | S | N | N | N | N |
| 359.75 | S | S | S | N | N | N | N |
| Page Row 30, Page Column 10 | | | | | | | |

I claim:

1. In a method of rotating a shaft connected to a load, the steps of:

providing an electric motor comprising a rotor having a plurality of similar rotor sections, each rotor section of said plurality of similar rotor sections having a circular periphery and having a plurality of permanent magnets having north and south poles alternately disposed with equal spacing therebetween along said periphery;

coaxially connecting said rotor to said shaft;

providing a stator with a plurality of similar stator sections equal in number to said plurality of similar rotor sections, each stator section of said plurality of similar stator sections having a group of stator coils;

coaxially disposing said stator coils of said stator section about said shaft with equal angular spacing between said stator coils for each of said plurality of similar stator sections;

said stator coils of said stator section are angularly displaced from each other in accordance with a relationship which is given as:

$$d=S/n$$

where d is the angular displacement of the stator coils of adjacent stator sections from each other;

S the angular spacing between adjacent stator coils of a stator section; and n is the number of stator sections;

wherein each of said stator coils of said stator section, and said plurality of permanent magnets of said rotor section in a single said stator section and a single said rotor section combination have a relationship in the range defined by the following table:

Required Combinations Table For Each Rotor Section and Stator Section Combination

| | | Number of Permanent Magnets For A Rotor Section | | | | | | | | | | | |
|---|---|---|---|---|---|---|---|---|---|---|---|---|---|
| | | 10 | 12 | 16 | 18 | 20 | 24 | 30 | 32 | 36 | 40 | 48 | 50 |
| Num- | 8 | x | 3 | x | 1 | x | 3 | x | 2.25 | 1 | x | 1.5 | 1.8 |
| ber | 10 | x | 1.2 | 0.9 | 0.8 | x | 0.6 | 2.4 | 0.9 | 0.8 | 1.8 | 0.3 | x |
| of | 12 | x | X | 1.5 | 2 | x | x | x | 0.75 | 2 | x | 1.5 | 1.2 |
| Stator | 16 | x | x | x | 0.5 | x | 1.5 | x | x | 0.5 | x | x | 0.9 |
| Coils | 18 | x | X | x | x | x | 1 | x | 0.25 | x | 1 | 0.5 | 0.8 |
| For A | 20 | x | x | x | x | x | 0.6 | 1.2 | 0.45 | 0.4 | x | 0.3 | x |
| Stator | 24 | x | x | x | x | x | x | x | 0.75 | 1 | x | x | 0.6 |
| Sec- | 30 | x | X | x | x | x | x | x | 0.15 | 0.4 | 0.6 | 0.6 | x |
| tion | 32 | x | x | x | x | x | x | x | x | 0.25 | x | 0.75 | 0.45 |
| | 36 | x | X | x | x | x | x | x | x | x | x | 0.5 | 0.8 |
| | 40 | x | X | x | x | x | x | x | x | x | x | 0.3 | x |
| | 48 | x | X | x | x | x | x | x | x | x | x | x | 0.3 |

wherein the above Number is a minimum and maximum number of said stator coils and said permanent magnets for a single said rotor section and a single said stator section combination resulting in four of said permanent magnets having no angular displacement from four of said stator coils;

wherein the letter x indicates a specific combination of said stator coils for each said stator section and permanent magnets for each said rotor section that is not useable; and wherein a numerical designation other than the letter x specifies a least angular displacement for each stator coil in its stator section relative to a stator coil in an adjacent stator section;

coaxially maintaining said stator sections about said rotor sections, respectively, with proximal ends of the stator coils of each of said stator sections being separated from each corresponding rotor section by an air gap; and selecting at least two of said stator coils and variably magnetically polarizing an induced magnetic field at said proximal ends of said at least two of said stator coils that are angularly positioned between two adjacent and radially disposed permanent magnets.

2. The method of claim 1 further including the steps of:

varying said induced magnetic field's strength by computer control means;

causing said rotor to rotate in selected direction and velocity, smoothly and continuously by use of said computer control means providing to said computer control means a signal representation of the torque loading of said rotor;

providing to said computer control means a signal representation of the angular displacement of said rotor from a reference position.

3. The method of claim 1 wherein said plurality of similar rotor sections being formed by the steps of:

providing a Neodymium plastic bonded magnetic ceramic annulus comprising said plurality of permanent magnets;

providing a plastic disc; and pressing said annulus onto said disc about a periphery of said disc thereby forming each one of said plurality of similar rotor sections.

4. The method of claim 1 including the additional step of locating each of said plurality of similar rotor sections about said shaft to cause like poles of said permanent magnets of each of said plurality of similar rotor sections to be in angular alignment with each other.

5. A method of providing an electric motor comprising, the steps of:

providing a rotor having a plurality of similar rotor sections, each rotor section of said plurality of similar rotor sections having a circular periphery and having a plurality of permanent magnets having north and south poles alternately disposed with equal spacing therebetween along said periphery;

providing a stator spaced from said rotor and comprising an equal plurality of stator sections, each stator section of said plurality of stator sections having a plurality of stator coils;

wherein each of said stator coils of said stator section, and said plurality of permanent magnets of said rotor section in a single said stator section and a single said rotor section combination have a relationship in the range defined by the following table:

Required Combinations Table For Each Rotor and Stator Section Combination

| | | Number of Permanent Magnets For A Rotor Section | | | | | | | | | | | |
|---|---|---|---|---|---|---|---|---|---|---|---|---|---|
| | | 10 | 12 | 16 | 18 | 20 | 24 | 30 | 32 | 36 | 40 | 48 | 50 |
| Num- | 8 | x | 3 | x | 1 | x | 3 | x | 2.25 | 1 | x | 1.5 | 1.8 |
| ber | 10 | x | 1.2 | 0.9 | 0.8 | x | 0.6 | 2.4 | 0.9 | 0.8 | 1.8 | 0.3 | x |
| of | 12 | x | X | 1.5 | 2 | x | x | x | 0.75 | 2 | x | 1.5 | 1.2 |
| Stator | 16 | x | x | x | 0.5 | x | 1.5 | x | x | 0.5 | x | x | 0.9 |
| Coils | 18 | x | X | x | x | x | 1 | x | 0.25 | x | 1 | 0.5 | 0.8 |
| For A | 20 | x | x | x | x | x | 0.6 | 1.2 | 0.45 | 0.4 | x | 0.3 | x |
| Stator | 24 | x | x | x | x | x | x | x | 0.75 | 1 | x | x | 0.6 |
| Sec- | 30 | x | X | x | x | x | x | x | 0.15 | 0.4 | 0.6 | 0.6 | x |
| tion | 32 | x | x | x | x | x | x | x | x | 0.25 | x | 0.75 | 0.45 |
| | 36 | x | X | x | x | x | x | x | x | x | x | 0.5 | 0.8 |
| | 40 | x | X | x | x | x | x | x | x | x | x | 0.3 | x |
| | 48 | x | X | x | x | x | x | x | x | x | x | x | 0.3 |

wherein the above Number is a minimum and maximum number of said stator coils and said permanent magnets for a single said rotor section and a single said stator section combination resulting in four of said permanent magnets having no angular displacement from four of said stator coils;

wherein the letter x indicates a specific combination of said stator coils for each said stator section and said permanent magnets for each said rotor section that is not useable; and wherein a numerical designation other than the letter x specifies a least angular displacement for each stator coil in its stator section relative to a stator coil in an adjacent stator section; and providing computer control means for selectively exciting at least two of said stator coils to variably magnetically polarize an induced magnetic field at said at least two of said stator coils, each of said stator coils being angularly positioned between two adjacent and radially disposed permanent magnets to rotate said rotor sections in a selected direction and velocity, smoothly and continuously, and to rotate a shaft connected thereto.

6. A method of providing an electric motor comprising, the steps of:

providing at least one rotor section having a circular periphery and having a plurality of permanent magnets having north and south poles alternately disposed with equal spacing therebetween along said periphery;

providing at least one stator section spaced from said at least one rotor section, said stator section having a plurality of stator coils;

wherein each of said stator coils of said stator section, and said plurality of permanent magnets of said rotor section in a single said stator section and a single said rotor section combination have a relationship in the range defined by the following table:

Required Combinations Table For Each Rotor Section and Stator Section Combination

| | | Number of Permanent Magnets For A Rotor Section | | | | | | | | | | | |
|---|---|---|---|---|---|---|---|---|---|---|---|---|---|
| | | 10 | 12 | 16 | 18 | 20 | 24 | 30 | 32 | 36 | 40 | 48 | 50 |
| Number of Stator Coils For A Stator Section | 8 | x | 3 | x | 1 | x | 3 | x | 2.25 | 1 | x | 1.5 | 1.8 |
| | 10 | x | 1.2 | 0.9 | 0.8 | x | 0.6 | 2.4 | 0.9 | 0.8 | 1.8 | 0.3 | x |
| | 12 | x | x | 1.5 | 2 | x | x | x | 0.75 | 2 | x | 1.5 | 1.2 |
| | 16 | x | x | x | 0.5 | x | 1.5 | x | x | 0.5 | x | x | 0.9 |
| | 18 | x | x | x | x | x | 1 | x | 0.25 | x | 1 | 0.5 | 0.8 |
| | 20 | x | x | x | x | x | 0.6 | 1.2 | 0.45 | 0.4 | x | 0.3 | x |
| | 24 | x | x | x | x | x | x | x | 0.75 | 1 | x | x | 0.6 |
| | 30 | x | x | x | x | x | x | x | 0.15 | 0.4 | 0.6 | 0.6 | x |
| | 32 | x | x | x | x | x | x | x | x | 0.25 | x | 0.75 | 0.45 |
| | 36 | x | x | x | x | x | x | x | x | x | x | 0.5 | 0.8 |
| | 40 | x | x | x | x | x | x | x | x | x | x | 0.3 | x |
| | 48 | x | x | x | x | x | x | x | x | x | x | x | 0.3 |

wherein the above Number is a minimum and maximum number of said stator coils and said permanent magnets for a single said rotor section and a single said stator section combination resulting in four of said permanent magnets having no angular displacement from four of said stator coils;

wherein the letter x indicates a specific combination of said stator coils for said stator section and said plurality of permanent magnets for said rotor section that is not useable; and wherein a numerical designation other than the letter x specifies a least angular displacement for each stator coil in its stator section relative to a stator coil in an adjacent stator section; and providing computer control means for selectively exciting at least two of said stator coils to variably magnetically polarize an induced magnetic field at said at least two of said stator coils, said stator coils being angularly positioned between two radially disposed permanent magnets to rotate said rotor section in a selected direction and velocity, smoothly and continuously, and to rotate a shaft connected thereto.

* * * * *